(12) United States Patent
Ganz

(10) Patent No.: US 11,222,074 B2
(45) Date of Patent: Jan. 11, 2022

(54) METHODS FOR THE AUGMENTATION, EXPLORATION, AND MAINTENANCE OF PROJECT HIERARCHIES

(71) Applicant: Steven Ganz, Emerald Hills, CA (US)

(72) Inventor: Steven Ganz, Emerald Hills, CA (US)

(73) Assignee: Teamifier, Inc., Emerald Hills, CA (US)

( * ) Notice: Subject to any disclaimer, the term of this patent is extended or adjusted under 35 U.S.C. 154(b) by 714 days.

(21) Appl. No.: 15/361,343

(22) Filed: Nov. 25, 2016

(65) Prior Publication Data
US 2017/0147709 A1    May 25, 2017

Related U.S. Application Data

(60) Provisional application No. 62/260,072, filed on Nov. 25, 2015.

(51) Int. Cl.
*G06F 16/901*      (2019.01)
*G06F 16/31*       (2019.01)
(Continued)

(52) U.S. Cl.
CPC ...... *G06F 16/9027* (2019.01); *G06F 3/04845* (2013.01); *G06F 16/322* (2019.01);
(Continued)

(58) Field of Classification Search
CPC ........... G06F 17/30961; G06F 3/04845; G06F 17/30958; H04L 65/403; H04L 67/10
(Continued)

(56) References Cited

U.S. PATENT DOCUMENTS 5,515,487 A * 5/1996 Beaudet ............... G06T 11/206
                                                                345/440
5,701,137 A * 12/1997 Kiernan ................. G06F 9/451
                                                                715/853
(Continued)

FOREIGN PATENT DOCUMENTS

CN          109121436 A       1/2019
JP          2000-259841 A     9/2000
(Continued)

OTHER PUBLICATIONS

Rebane, George et al., "The Recovery of Causal Poly-Trees from Statistical Data," Proceedings of the Third Conference on Uncertainty in Artificial Intelligence (UAI'87), pp. 222-228, Jul. 1987.
(Continued)

*Primary Examiner* — Sherief Badawi
*Assistant Examiner* — Koorosh Nehchiri

(57) ABSTRACT

A method is provided for graphically representing a portion of a directed acyclic graph as a hierarchical tree structure to facilitate user collaboration over a network, the method comprising obtaining a collaborative project shared among a plurality of users over a communication network, the project represented by a directed acyclic graph structure comprising a plurality of entities and a plurality of associations, the plurality of entities including one or more locus entities, each of the locus entities associated with a locus node from which ancestor entities in the directed acyclic graph of each locus entity are traversed as an inverted tree structure, each child node in the inverted tree indicating a respective entity related as a parent in the directed acyclic graph to the entity of its parent in the inverted tree; and expanding a subtree rooted at a leaf node of the inverted tree in response to user input.

33 Claims, 178 Drawing Sheets
(26 of 178 Drawing Sheet(s) Filed in Color)

(51) Int. Cl.
*G06F 3/0484* (2013.01)
*H04L 29/06* (2006.01)
*H04L 29/08* (2006.01)

(52) U.S. Cl.
CPC ........ *G06F 16/9024* (2019.01); *H04L 65/403* (2013.01); *H04L 67/10* (2013.01); *G06F 16/319* (2019.01)

(58) Field of Classification Search
USPC ........................................................ 715/753
See application file for complete search history.

(56) References Cited

U.S. PATENT DOCUMENTS

| | | | | |
|---|---|---|---|---|
| 6,711,585 | B1* | 3/2004 | Copperman | G06F 16/367 |
| 6,760,721 | B1 | 7/2004 | Chasen | |
| 7,036,044 | B1* | 4/2006 | Verma | G06F 11/1471 |
| | | | | 714/16 |
| 7,203,701 | B1* | 4/2007 | Packebush | G06F 16/9027 |
| 7,954,083 | B2* | 5/2011 | Berenbach | G06F 30/00 |
| | | | | 717/105 |
| 10,409,770 | B1* | 9/2019 | Ye | G06F 16/162 |
| 2004/0216095 | A1* | 10/2004 | Wu | G06F 8/445 |
| | | | | 717/151 |
| 2004/0239683 | A1* | 12/2004 | Chu | G06F 9/451 |
| | | | | 345/619 |
| 2005/0132320 | A1* | 6/2005 | Allen | G06F 17/5068 |
| | | | | 716/103 |
| 2005/0234943 | A1* | 10/2005 | Clarke | H04L 67/38 |
| 2006/0059027 | A1 | 3/2006 | Berenbach et al. | |
| 2006/0265364 | A1* | 11/2006 | Keith, Jr. | G06F 17/30327 |
| 2007/0276843 | A1* | 11/2007 | Lillibridge | G06F 16/125 |
| 2009/0064053 | A1* | 3/2009 | Crawford | G06F 3/04845 |
| | | | | 715/854 |
| 2009/0240723 | A1* | 9/2009 | Engle | G06Q 10/06312 |
| 2011/0107297 | A1* | 5/2011 | Chandra | G06F 8/433 |
| | | | | 717/110 |
| 2011/0249002 | A1* | 10/2011 | Duplessis | G06T 11/206 |
| | | | | 345/440 |
| 2013/0173667 | A1* | 7/2013 | Soderberg | G06T 11/206 |
| | | | | 707/798 |
| 2014/0324935 | A1* | 10/2014 | Zhang | G06F 17/16 |
| | | | | 708/400 |
| 2015/0019463 | A1* | 1/2015 | Simard | G06F 17/2785 |
| | | | | 706/12 |
| 2016/0139901 | A1* | 5/2016 | Margiolas | G06F 8/456 |
| | | | | 717/150 |

FOREIGN PATENT DOCUMENTS

| | | |
|---|---|---|
| JP | 2006-190262 A | 7/2006 |
| JP | 2019-505877 A | 2/2019 |

OTHER PUBLICATIONS

International Application No. PCT/US2016/063789, International Search Report and Written Opinion dated Mar. 31, 2017.
Swedish Patent and Registration Office, Notice, dated Oct. 15, 2019 in Swedish patent application #1850784-8, which is the national entry of PCT/US2016/063789.
Office of the Controller General of Patents, Designs & Trade Marks, Department for Promotion of Industry and Internal Trade, Ministry of Commerce & Industry, Government of India, Examination Report, dated Mar. 4, 2021 in Indian patent application #201827023686, which is the national entry of PCT/US2016/063789.
Japan Patent Office, Decision to Grant a Patent, dated Feb. 9, 2021 in Japanese patent application #2018-527974, which is the national entry of PCT/US2016/063789.

* cited by examiner

3221

40

41

42

44

48

46 (Locus) } Context

43

45

49

47 (Locus) } Context o: node 0 with context o: node 0.0 c: node 0.0.0 c: ...

c: node $0.0.(n_{0.0} - 2)$ c: node $0.0.(n_{0.0} - 1)$ c: ...

o: node $0.(n_0\text{-}2)$ c: node $0.(n_0 - 2).0$ c: ...

c: node $0.(n_0 - 2).(n_{0.(n_0-2)} - 2)$ c: node $0.(n_0 - 2).(n_{0.(n_0-2)} - 1)$ c: node $0.(n_0\text{-}1)$

FIG. 175 c: node 0.0.0 c: ...

c: node $0.0.(n_{0.0}-2)$ c: node $0.0.(n_{0.0}-1)$ o: node 0.0
   c: ...

c: node $0.(n_0 - 2).0$ c: ...

c: node $0.(n_0 - 2).(n_{0.(n_0-2)} - 2)$ c: node $0.(n_0 - 2).(n_{0.(n_0-2)} - 1)$ o: node $0.(n_0 - 2)$
   c: node $0.(n_0 - 1)$ o: node 0 with substructure

FIG. 187

METHODS FOR THE AUGMENTATION, EXPLORATION, AND MAINTENANCE OF PROJECT HIERARCHIES

CROSS-REFERENCE TO RELATED APPLICATIONS

The present application claims the benefit of U.S. Provisional Patent Application Ser. No. 62/260,072, filed Nov. 25, 2015 and entitled "Methods for the Augmentation, Exploration, and Maintenance of Project Hierarchies," which is hereby incorporated by reference herein.

BACKGROUND

This disclosure relates to the layout and augmentation of hierarchical structures representing project information, including projects themselves and related information; to exploration through hierarchical structures; and to maintenance of those structures when modified in a collaborative setting.

SUMMARY

In some embodiments, this disclosure provides a method, when augmenting a DAG (possibly a tree) that presents entities of at least two kinds and for which one entity of the first (independent) kind may be directly associated with an entity of the second (dependent) kind, for extending this relation such that every entity of the second kind is indirectly associated with one entity of the first kind.

In some embodiments, this disclosure provides a method, when navigating a DAG such that one or more locus nodes are central, for providing access to information that is neither strictly in the substructure of the locus nodes nor strictly in their context, but rather is inherited into the substructure via an association with the context. Moreover, top-down augmentation of such inherited structure implies refinement of that structure with respect to one or more locus nodes that inherit that structure, in a manner that we will define more precisely. It may also be appropriate to inherit information into the context via association with the substructure. Likewise, bottom-up augmentation of such inherited structure implies refinement of that structure with respect to one or more locus nodes that inherit that structure. Alternatively, top-down augmentation of a node in the context may imply generalization of the preceding context with respect to the relevant locus nodes.

Some embodiments described herein first represent a state of navigation of a DAG as either one or a pair of logical trees (one for substructure and another, inverted, for context), as is initially done for "A Method for Exploration of Hierarchical Structures and Representation of Context Thereof", or using Venn diagrams or any other means, and then augments the substructure with additional information inherited from the context (or vice versa). Upon augmentation of such inherited structure, the native substructure is built out as necessary with refinements of inherited structure, initially with respect to the locus nodes and continuing incrementally with respect to the recently added native substructure. The process is similar for augmenting context with information inherited from the substructure.

This disclosure includes other related aspects of DAGs presenting project information and their augmentation.

Furthermore, this disclosure provides a method, when navigating a DAG, for constraining a subDAG and its context so that they can be visualized and focused on as a tree, such that any entity is only represented by a single node in the visualization at any point in time. In some embodiments, we describe three operations: tree initialization, node expansion, and node collapse. A preliminary process to tree initialization, tree construction, is relevant for the Static Lifetime Strategy; the Dynamic Lifetime Strategy incorporates node construction into the initialization process. The latter two operations support exploration of the hierarchy and may potentially apply to either substructure nodes or context nodes. From the locus node or any visible substructure node, e.g., we might expand or collapse to view or hide, respectively, deeper substructure, and from the locus node or any visible context node we might expand or collapse to view or hide, respectively, more lofty context. The disclosure also provides a method for regulating the set of locus nodes by selecting and deselecting facet values and revealing the common ancestors and descendants of the various locus nodes.

This disclosure, in a simplified exposition, first represents a state of navigation of a DAG as a pair of logical trees (for substructure and context) and then represents these in a substrate tree. Then, in a more complex exposition, it first represents a state of navigation of a DAG-forest as a sequence of pairs of logical trees (for substructure and context, with substructures potentially overlapping with substructures and contexts potentially overlapping with contexts) and then represents these in a substrate tree.

Some embodiments maintain the state of the frontier of expansion of substructure or context, or both, so that a single user action applied to substructure nodes (along with the locus node) can expand or collapse that node's substructure, and a single user action applied to context nodes (along with the locus node) can expand or collapse that node's context.

One key insight is that upon expanding substructure or context for a node, it is necessary to automatically collapse any potentially conflicting substructure or context, respectively. Another key insight is that substructure and context can be represented as a nested sequence of lists of two varieties to facilitate visualization of common descendants and ancestors, respectively, as will be described herein.

References to parents and children of entities refer to the underlying DAG. References to parents and children that specifically mention substructure or context generally refer to the corresponding logical tree. References to parents and children of nodes otherwise refer to an abstracted substrate tree and must be adapted to apply to HTML or any other particular substrate tree.

Additionally, some embodiments maintain system history by arranging change records in a DAG, not by explicit branching and merging directives, but by branching and merging on the basis of the content that is affected by each change, so that distinct content is modified in separate branches while the same content must be modified sequentially.

Some embodiments may also maintain the visibility of system data such that different views of the global DAG are provided depending on the role of a user with respect to a project (or related project in the hierarchy) or the user's prior history in creating or modifying the entities involved. The configuration of system data is dependent upon relationships that may be formed between users.

In various embodiments, a method is presented for allowing a user to safely and efficiently jointly specialize one or more nodes in a DAG, each of which shares a common ancestor with a locus node, while associating the new refining node with a locus node, by presenting the nodes to be refined as inherited descendants of the locus node; a method for allowing a user to safely and efficiently jointly generalize one or more nodes in a DAG, each of which shares a common ancestor with a node, while associating the new refined node with the common ancestor, by treating the refining nodes as locus nodes and initiating the operation from the common ancestor.

In various embodiments, a method is presented for allowing a user to explore a hierarchical structure in the form of a directed acyclic graph such that one or more nodes are distinguished as loci. Descendants of locus nodes can be explored as a tree and ancestors of locus nodes can be explored as an inverted tree. As some nodes are expanded, others are collapsed such that any entity is only represented by a single visible node. Where the same entity is reached through the ancestors or descendants of multiple locus nodes, that entity is represented by a single node.

In various embodiments, a method is presented for allowing various users to coordinate their access to and modifications of project structure that allows rollbacks via a hierarchy-based user interface of sequential changes to particular independently generated content without disturbing other content and supports intuitive merging of conflicting changes.

Various embodiments provide systems, methods, and non-transitory computer readable medium for graphically representing a portion of a directed acyclic graph as a hierarchical tree structure to facilitate user collaboration over a communication network. The systems, methods, and computer readable medium may be configured to perform obtaining a collaborative project shared among a plurality of users over a communication network, the collaborative project represented by a directed acyclic graph structure comprising a plurality of entities and a plurality of associations, the plurality of entities including one or more locus entities, each of the one or more locus entities associated with a locus node from which descendant entities, in the directed acyclic graph, of each locus entity are traversed as a tree structure, each child node in the tree indicating a respective entity related as a child in the directed acyclic graph to the entity of its parent in the tree; and expanding a subtree rooted at a leaf node of the tree in response to user input.

Various embodiments provide systems, methods, and non-transitory computer readable medium for graphically representing a portion of a directed acyclic graph as a hierarchical tree structure to facilitate user collaboration over a communication network. The systems, methods, and computer readable medium may be configured to perform obtaining a collaborative project shared among a plurality of users over a communication network, the collaborative project represented by a directed acyclic graph structure comprising a plurality of entities and a plurality of associations, the plurality of entities including one or more locus entities, each of the one or more locus entities associated with a locus node from which ancestor entities in the directed acyclic graph of each locus entity are traversed as an inverted tree structure, each child node in the inverted tree indicating a respective entity related as a parent in the directed acyclic graph to the entity of its parent in the inverted tree; and expanding a subtree rooted at a leaf node of the inverted tree in response to user input.

In some embodiments, the systems, methods, and non-transitory computer readable medium are configured to collapse the subtrees rooted at least one other node of the tree in response to the expanding the at least one node of the plurality of nodes in response to the user input, thereby allowing a particular entity of the plurality of entities to be graphically represented by a single visible node of the plurality of nodes.

In some embodiments, the systems, methods, and non-transitory computer readable medium are configured to collapse the subtrees rooted at least one other node of the inverted tree in response to the expanding the at least one node of the plurality of nodes in response to the user input, thereby allowing a particular entity of the plurality of entities to be graphically represented by at most a single visible node of the plurality of nodes.

In some embodiments, some entities are associated with any of one or more files, one or more progress reports each covering a time period, one or more records of contributions to the project, related entities that can be set as locus nodes whose substructure can be explored by a user, or other auxiliary data; and the systems, methods, and non-transitory computer readable medium are configured to display an aggregation of any of the one or more files, progress reports each covering a time period, one or more records of contributions to the project, or any other auxiliary data associated with the particular entities indicated by each visible node.

In some embodiments, entities are each of a particular kind and associations are each of a particular kind, one such kind of association being refinement; and where at least one proper refinement ancestor of one or more of the locus entities is further associated with one or more other descendants that are not descendants of the corresponding one or more locus entities, and the one or more other descendants are represented distinctly as inherited descendants of the corresponding one or more locus nodes indicating the respective one or more locus entities.

In some embodiments, entities are each of a particular kind and associations are each of a particular kind, one such kind of association being refinement; and the systems, methods, and non-transitory computer readable medium are configured to cause an augmentation of the directed acyclic graph by a first operation, the first operation adding a new node to the plurality of nodes, the first operation initiated from a particular node of the plurality of nodes, the new node appearing as a child of the particular node; and creating a new entity associated with the new node and an association between the new entity and the particular entity, the kinds of the new node and association based on the first operation.

In some embodiments, entities are each of a particular kind and associations are each of a particular kind, one such kind of association being refinement; and the systems, methods, and non-transitory computer readable medium are configured to perform, upon initiation by a user from an initiating inherited node from among the plurality of nodes, connected to a locus node by a path comprised of inherited nodes, of a restatement operation or of a second operation to be performed upon the final restating node of the path and as a precursor to that second operation, for each inherited node on the path from the locus node, exclusive of the locus node: creating a restating entity; creating a first association between the restating entity and the entity indicated by the locus node, wherein the first association being of the same kind as the association between the inherited entity and the proper refinement ancestor, if the locus node is the parent of the inherited node, or between the restating entity and the result of restating the parent of the inherited node along the path, wherein the first association being of the same kind as the association between the entity indicated by the inherited node and the entity indicated by its parent node, if the locus node is not the parent of the inherited node; and creating a second association between the restating entity and the inherited entity being restated, wherein the restating entity refines the inherited entity being restated.

In some embodiments, entities are each of a particular kind and associations are each of a particular kind, one such kind of association being refinement; and the systems, methods, and non-transitory computer readable medium are configured to perform, upon initiation by a user from an initiating inherited node from among the plurality of nodes, connected to a locus node by a path comprised of inherited and noninherited nodes, of a restatement operation or of a second operation to be performed upon the final restating node of the path and as a precursor to that second operation, for each node on the path from the locus node, exclusive of the locus node: creating a restating entity if the path node was inherited; creating a first association, if the parent of the path node was inherited or is the locus node, between the restating entity if the path node was inherited or else the path node and either the entity indicated by the locus node, wherein the first association being of the same kind as the association between the path entity and the proper refinement ancestor, if the locus node is the parent of the path node or the result of restating the parent of the path node along the path, wherein the first association being of the same kind as the association between the entity indicated by the path node and the entity indicated by its parent node, if the locus node is not the parent of the path node; and creating a second association, if the path node was inherited, between the restating entity and the inherited path entity being restated wherein the restating entity refines the inherited path entity being restated.

In some embodiments, entities are each of a particular kind and associations are each of a particular kind, one such kind of association being refinement; and the systems, methods, and non-transitory computer readable medium are configured to perform, upon initiation by a user from a plurality of inherited initiating nodes from among the plurality of nodes, each inherited initiating node connected to a locus node by a corresponding path comprised of inherited nodes of a restatement operation or of a second operation to be performed upon the final restating nodes of each path and as a precursor to that second operation, for each node on any path from among the plurality of paths, exclusive of the locus node: creating a restating entity; creating a first association between the restating entity and the entity indicated by the locus node, wherein the first association being of the same kind as the association between the inherited entity and the proper refinement ancestor, if the locus node is the parent of the inherited node, or between the restating entity and the result of restating the parent of the inherited node along the corresponding path, wherein the first association being of the same kind as the association between the entity indicated by the inherited node and the entity indicated by its parent node, if the locus node is not the parent of the inherited node; and creating a second association between the restating entity and the inherited entity being restated wherein the restating entity refines the inherited entity being restated.

In some embodiments, the at least one other child may be associated with one or more descendants that are not descendants of the locus node, and the one or more descendants are represented distinctly as inherited descendants of the locus node; and the at least one other child is associated with one or more descendants that are not descendants of the locus node, and the descendants may include a restating refinement; and the restating node and its descendants may be excluded from the inherited descendants of the locus node.

In some embodiments, the at least one other child is associated with one or more descendants that are not descendants of the locus node, and the one or more descendants may be represented distinctly as inherited descendants of the locus node; and the at least one other child may be restated by a descendant of the locus node; and the other child may be excluded from the inherited descendants of the locus node.

In some embodiments, entities are each of a particular kind and associations are each of a particular kind, one such kind of association being refinement; and the systems, methods, and non-transitory computer readable medium are configured to cause an augmentation of the directed acyclic graph by a first operation, the first operation adding a new node to the plurality of nodes, the first operation initiated from a particular node of the plurality of nodes, the new node appearing as a child within the inverted tree of the particular node; and creating a new entity associated with the new node and an association between the new entity and the particular entity, the kind of the new node being the same as the kind of the particular node and the kind of the association being refinement, with the particular node refining the new node.

In some embodiments, entities are each of a particular kind and associations are each of a particular kind, one such kind of association being refinement; and the systems, methods, and non-transitory computer readable medium are configured to perform upon initiation of an operation by a user from an initiating context node from among the plurality of nodes, for each of a plurality of context nodes on the path between the initiating context node and the corresponding locus node, exclusive of the initiating context node: creating a generalizing entity, the kind of the new entity being the same as the kind of the context node; creating a first association between the generalizing entity and the entity indicated by the initiating context node, wherein the first association being of the same kind as the association between the context entity and the entity indicated by the initiating context node, if the context node is the parent within the inverted tree of the initiating context node, wherein the first association being of the same kind as the association between the entity indicated by the context node and the entity indicated by its child node within the inverted tree, if the context node is not the parent within the inverted tree of the initiating context node; and creating a second association between the generalizing entity and the entity indicated by the context node wherein the generalizing entity is refined by the entity indicated by the context node.

In some embodiments, the inverted tree structures are formed within a forest structure comprising a plurality of tree structures, such that each tree structure comprises two lists presented in a substrate tree by nesting one within the other: a first list of tree structures a second list of nodes, wherein: all nodes in any second list except the last node have no children in the substrate tree; locus nodes have no siblings or children in the substrate tree; the entities indicated by each node in any second list are parents in the directed acyclic graph of the first child in the substrate tree's second list of each child in the substrate tree's first list of the last node in the second list.

In some embodiments, the tree structures are formed within a forest structure comprising a plurality of tree structures, such that each tree structure comprises two lists presented in a substrate tree by nesting one within the other: a first list of tree structures including a designated node a second list of nodes, wherein: each entity indicated by a node in any second list has no children and is a child in the directed acyclic graph of the entity indicated by the designated node of their parent tree structure in the substrate tree the outermost tree structures have lists of only locus nodes; the entity indicated by the designated node of each tree structure in any first list are children in the directed acyclic graph of the entity indicated by the designated node of the parent of their parent in the substrate tree.

In some embodiments, entities are each of a particular kind and associations are each of a particular kind, one such kind of association being refinement; and the systems, methods, and non-transitory computer readable medium are configured to perform upon initiation of an operation by a user from an initiating context node from among the plurality of nodes, for each of a plurality of context nodes on any path through the substrate tree between the initiating context node and a locus node, exclusive of the initiating context node, comprising the first element of each first list other than that including the initiating context node: creating a generalizing entity; creating a first association between the generalizing entity and the entity indicated by the initiating context node, wherein the first association being of the same kind as the association between the context entity and the entity indicated by the initiating context node if the context node is the parent within the inverted tree of the initiating context node, wherein the first association being of the same kind as the association between the entity indicated by the context node and the entity indicated by its child node within the inverted tree, if the context node is not the parent within the inverted tree of the initiating context node; and creating a second association between the generalizing entity and the entity indicated by the context node wherein the generalizing entity is refined by the entity indicated by the context node.

In some embodiments, the created generalizing refinements comprise restatements.

Various embodiments provide systems, methods, and non-transitory computer readable medium for graphically representing a portion of a directed acyclic graph as a hierarchical tree structure to facilitate user collaboration over a communication network. The systems, methods, and non-transitory computer readable medium may be configured to perform obtaining a collaborative project shared among a plurality of users over a communication network, the collaborative project represented by a directed acyclic graph structure comprising a plurality of entities each of a particular kind and a plurality of associations, each of a particular kind, one such kind being refinement, the plurality of entities including at least one locus entity, each of the at least one locus entity is associated with a locus node from which descendant entities, in the directed acyclic graph, of each locus entity are traversed as a tree structure, each child node in the tree indicating a respective entity related as a child in the directed acyclic graph to the entity of its parent in the tree, such that where at least one proper refinement ancestor of one or more of the locus entities is further associated with one or more other descendants that are not descendants of the corresponding one or more locus entities, and each of the at least one other descendants is represented distinctly as an inherited descendant of the corresponding at least one locus node indicating the at least one locus entity; and expanding a subtree rooted at a leaf node of the tree in response to user input.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Arrows in data flow diagrams indicate a flow of information from the processing unit at the tail to the processing unit at the head. The data flow diagrams use a double arrow head to indicate that an inflow may cause a change in the state of a component and a single arrow head otherwise.

Process flow diagrams make use various directives in ovals including START, STOP, CONTINUE, and FAIL directives. Statement blocks appear as rectangles and decision points appear as diamonds. Iteration over a data structure is indicated by a "for" block, which appears as a large rectangle containing instructions to be executed for each iteration.

Arrows in process flow diagrams indicate a flow of control from the processing unit at the tail to the processing unit at the head. If a line meets a processing unit at an arrow head, control flows to that processing unit, otherwise it flows away from the processing unit. When multiple lines leave a processing unit, all paths are to be taken in any order, or simultaneously, with proper attention to any shared resources as is familiar to those skilled in the art of software development. An exception may be a fork from a diamond-shaped node, at which all paths succeeding in their specified condition are to be taken in any order, or simultaneously, with the same caveat. The above conventions are only for purposes of presenting intuition about the relationships between various processing steps, and not to provide an exhaustive exposition of all of the processing steps or all possible orderings of such steps through which embodiments might be realized.

The process flow diagrams may make use of arrows to clusters of steps to indicate subroutine calls on component data, including recursive subroutine calls. If additional work remains to be done after a recursive call, the execution of such remaining work may be indicated explicitly by a CONTINUE directive or implicitly with a STOP directive. This recursion is an expository mechanism. The underlying computation may be implemented using recursion, iteration, macro expansion, and the like.

An arc from the inside of a processing unit to the outside can be interpreted as any other arrow, although such arrows are candidates for implementation via recursive calls. To aid intuition, we informally use the language of recursion to describe such arrows in the text descriptions, although embodiments may or may not choose to implement them as such. When descriptions refer to a stack, it is often the case that the system stack assumed by most programming languages will suffice.

Disjunction symbols (V) at branches indicate that exactly one path should be taken. Conjunction symbols (A) at branches indicate that all paths are taken independently, with no constraints on the respective flow of the branches other than those imposed by shared resources at lower levels of implementation. We intend that all such computations meet at join points before one proceeds.

Arrows in block structure diagrams indicate that the module at the head is implemented using the module at the tail.

Drawing elements occurring in more than one place but assigned the same code are assumed to refer to the same thing in the presented embodiment, although other embodiments may distinguish them.

Figure 1:
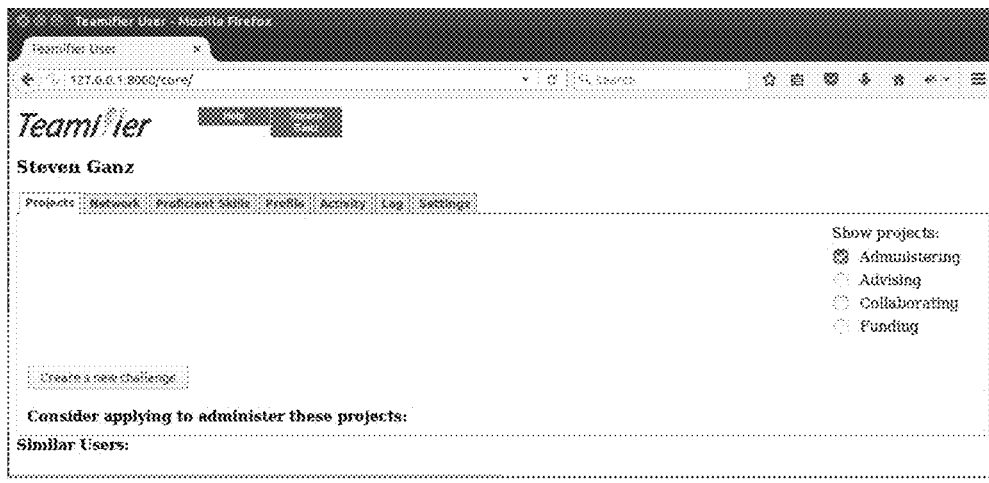

FIG. 1 is an initial user screen according to some embodiments.

Figure 2:
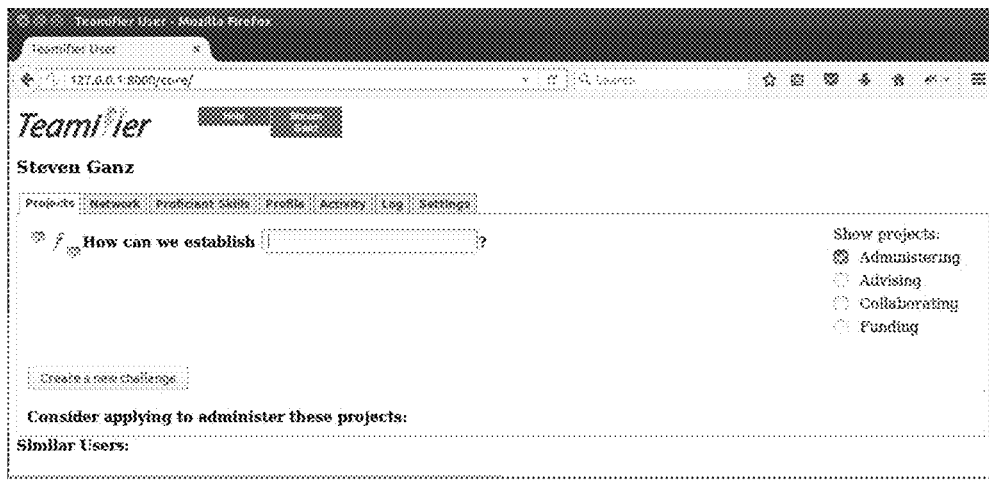

FIG. 2 is a user screen after clicking on "Create a new challenge" according to some embodiments.

Figure 3:

FIG. 3 is a user screen after typing an initial problem name according to some embodiments.

Figure 4:
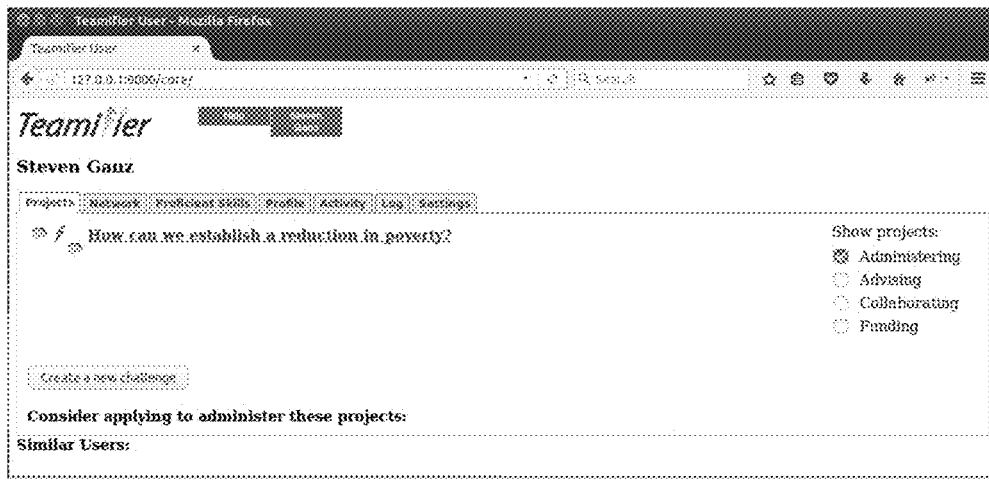

FIG. 4 is a user screen after action creating an initial problem according to some embodiments.

Figure 5:
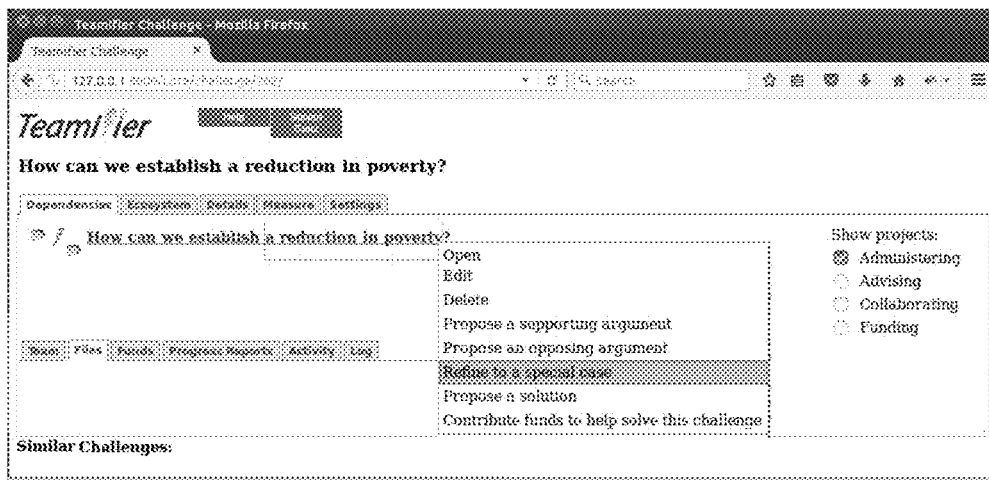

FIG. 5 is a project screen selecting the specializing action on a root problem according to some embodiments.

Figure 6:
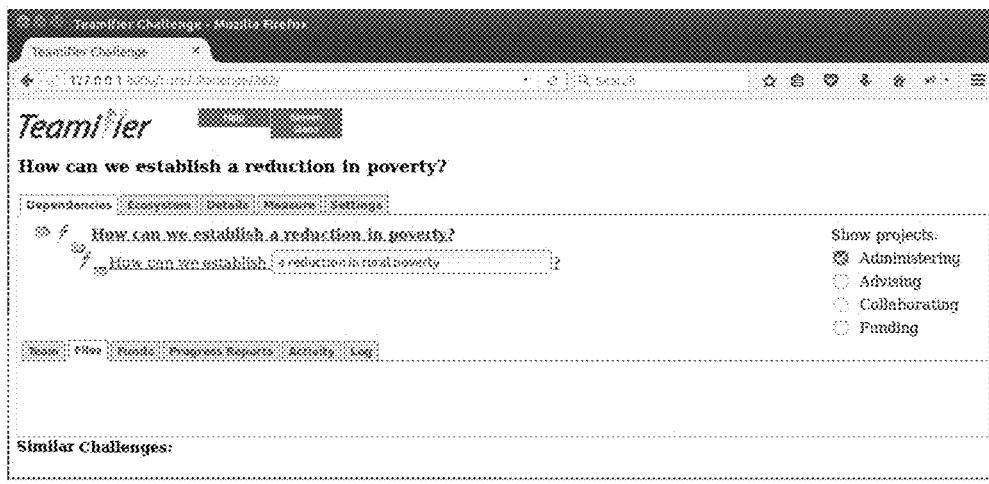

FIG. 6 is a project screen after typing a refining problem name.

Figure 7:
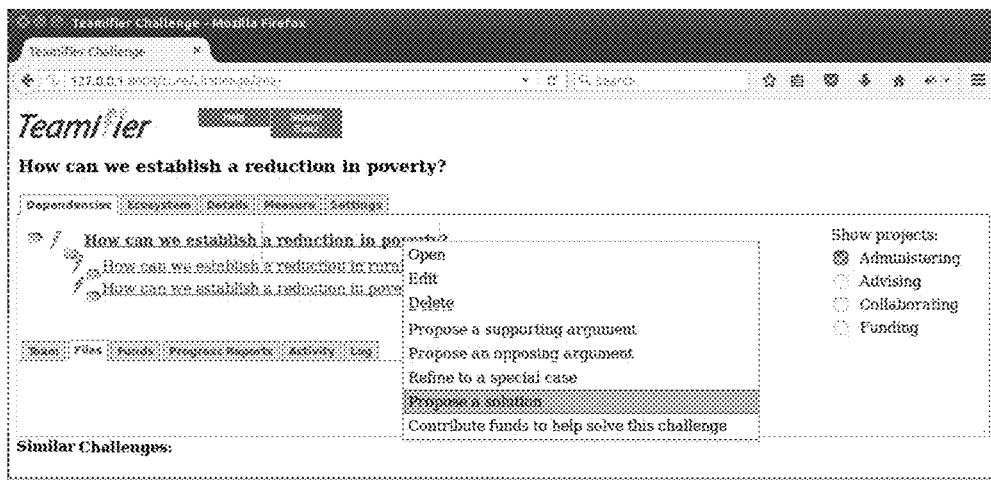

FIG. 7 is a project screen selecting the solving action on a root problem according to some embodiments.

Figure 8:
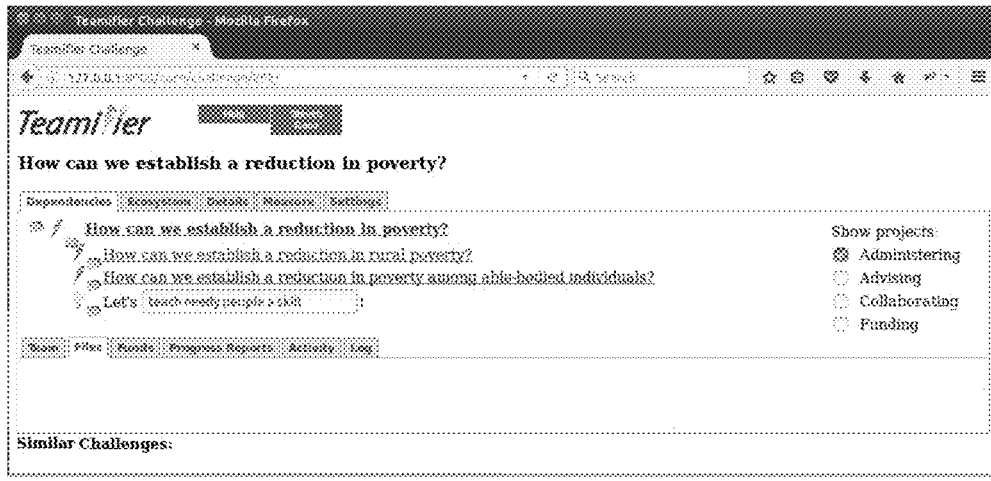

FIG. 8 is a project screen after typing a solution name according to some embodiments.

Figure 9:
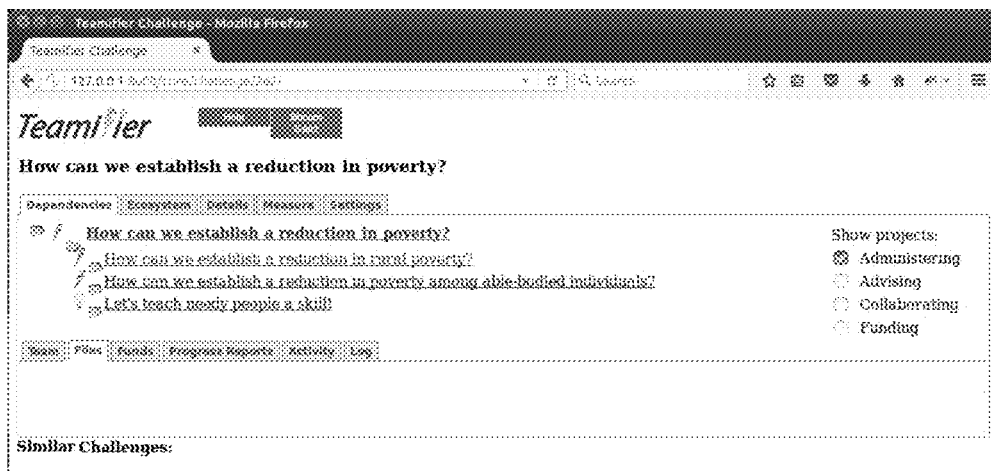

FIG. 9 is a project screen after action to solve a root problem according to some embodiments.

Figure 10:
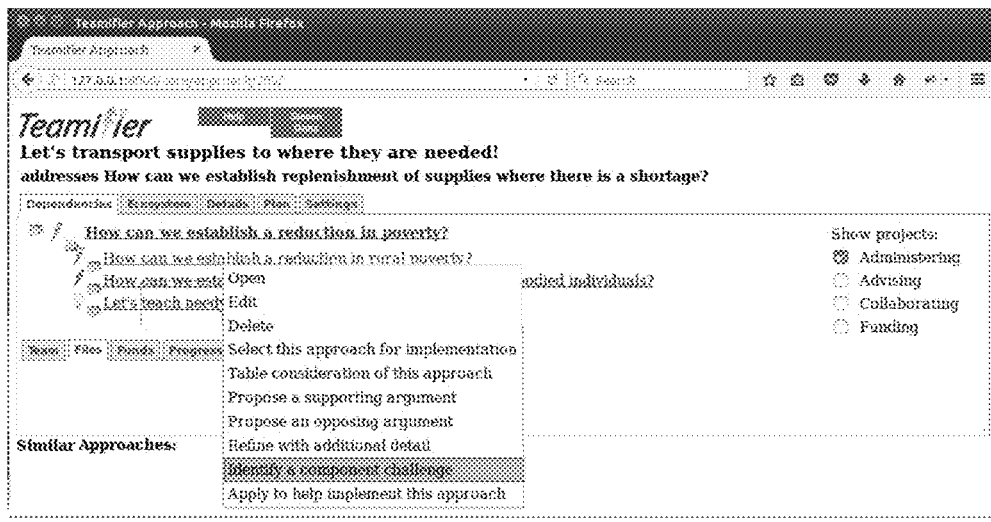

FIG. 10 is a project screen selecting the componentizing action on a solution according to some embodiments.

Figure 11:
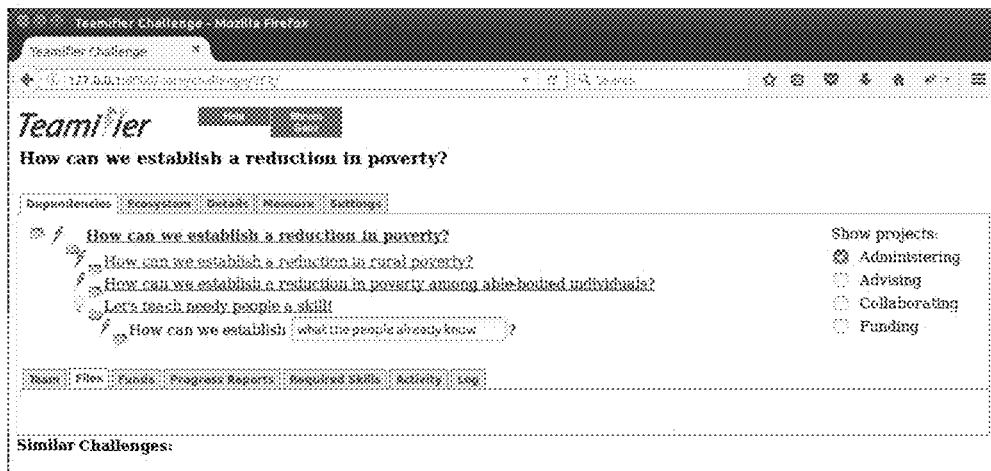

FIG. 11 is a project screen after typing a component problem name according to some embodiments.

Figure 12:
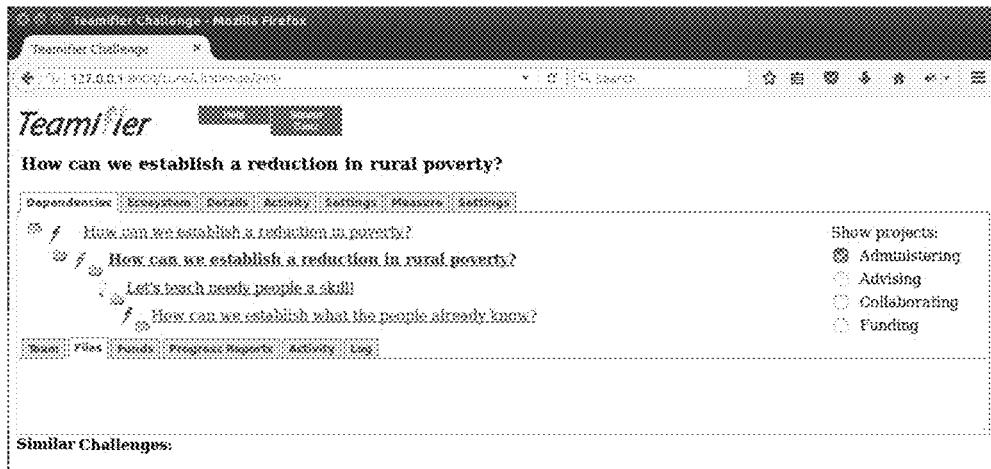

FIG. 12 is a project screen showing inheritance of projects by a refining problem according to some embodiments.

Figure 13:

FIG. 13 is a project screen showing inheritance of a project by a refining solution according to some embodiments.

Figure 14:
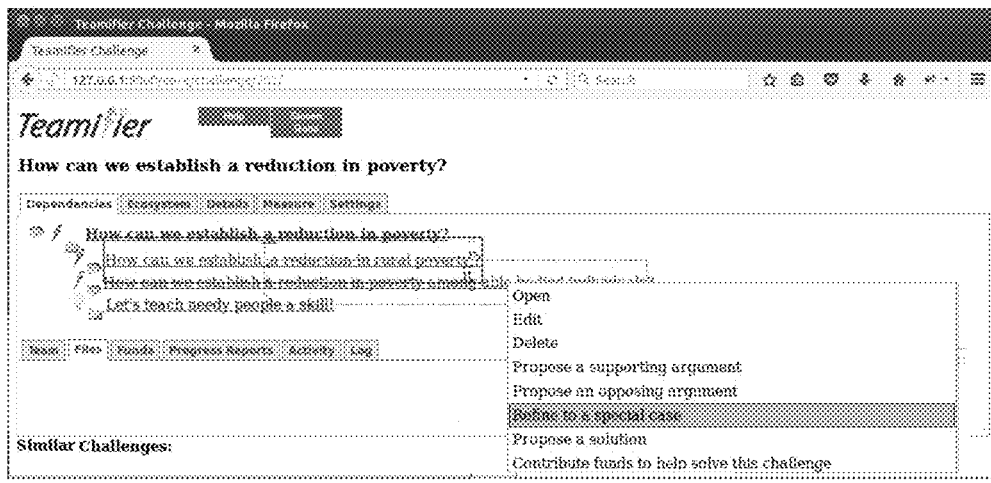

FIG. 14 is a project screen selecting the specializing action on two problems according to some embodiments.

Figure 15:
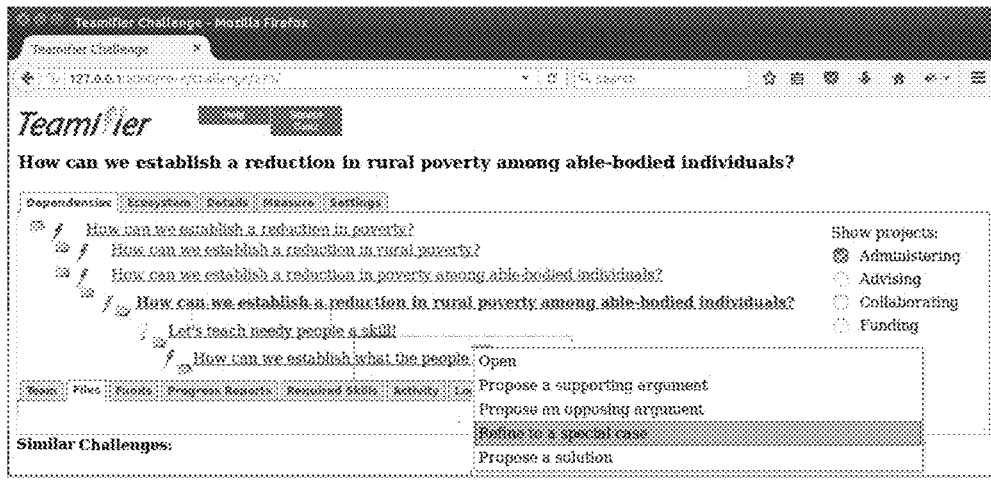

FIG. 15 is a project screen selecting the specializing action on an inherited project according to some embodiments.

Figure 16:
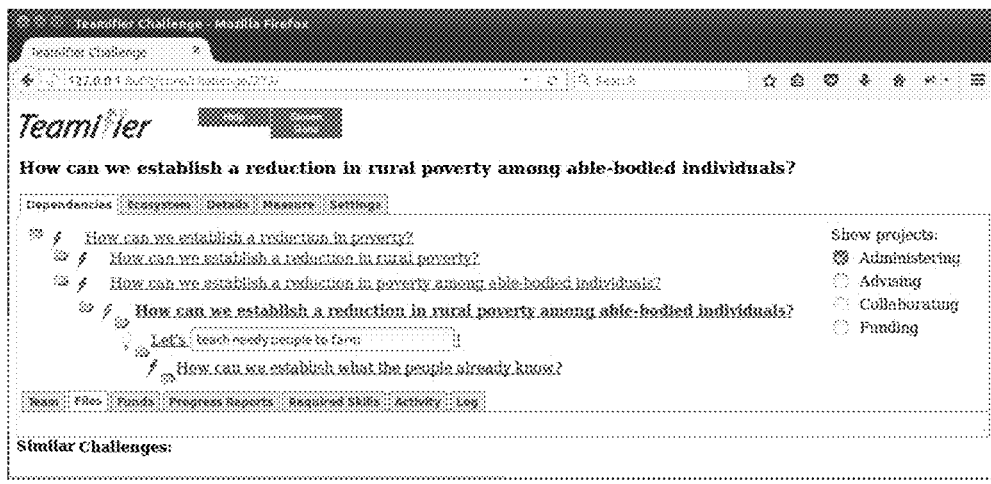

FIG. 16 is a project screen restating an inherited solution in-place according to some embodiments.

Figure 17:
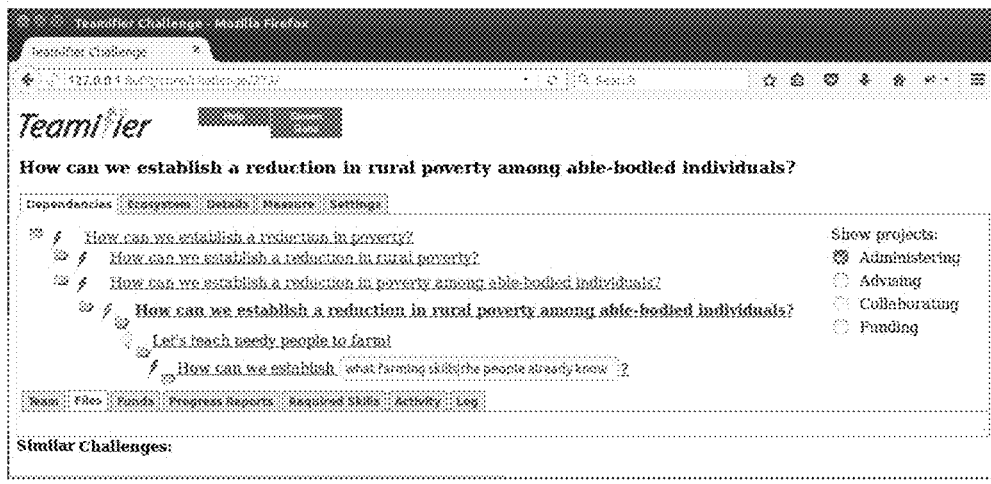

FIG. 17 is a project screen restating an inherited problem in-place according to some embodiments.

Figure 18:
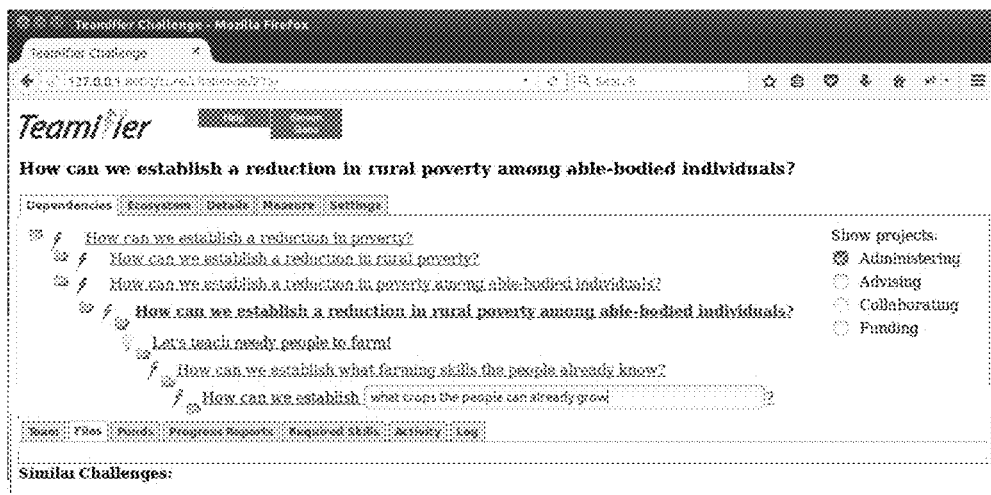

FIG. 18 is a project screen refining a restated problem according to some embodiments.

Figure 19:
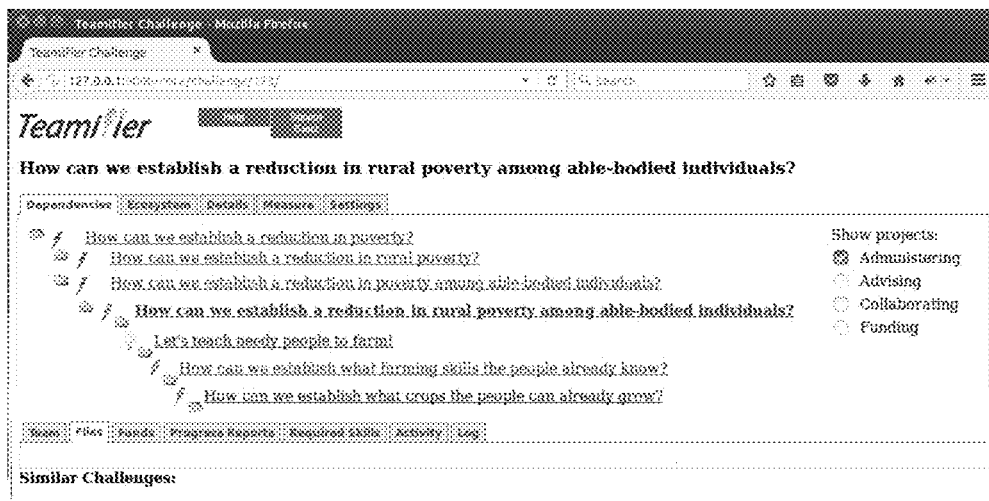

FIG. 19 is a project screen after restating of inherited projects according to some embodiments.

Figure 20:
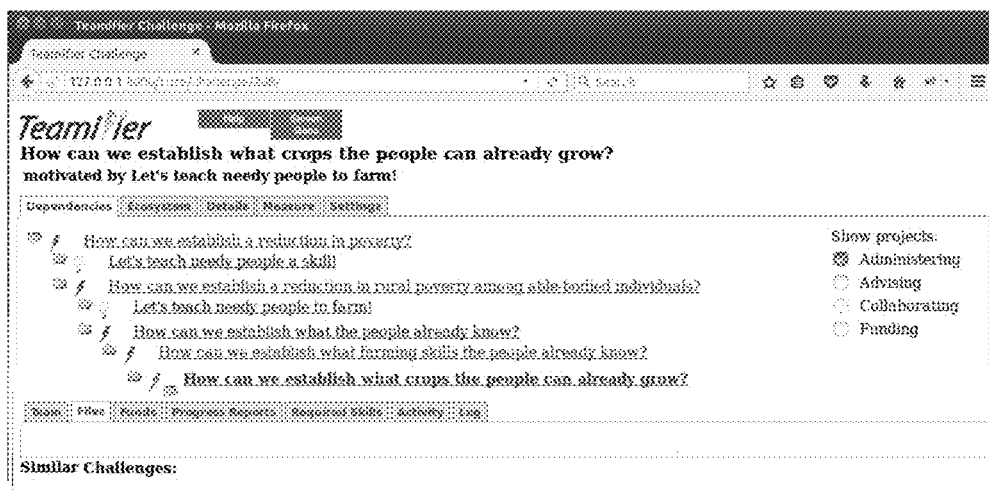

FIG. 20 is a project screen showing parents of projects resulting from restating inherited projects according to some embodiments.

Figure 21:
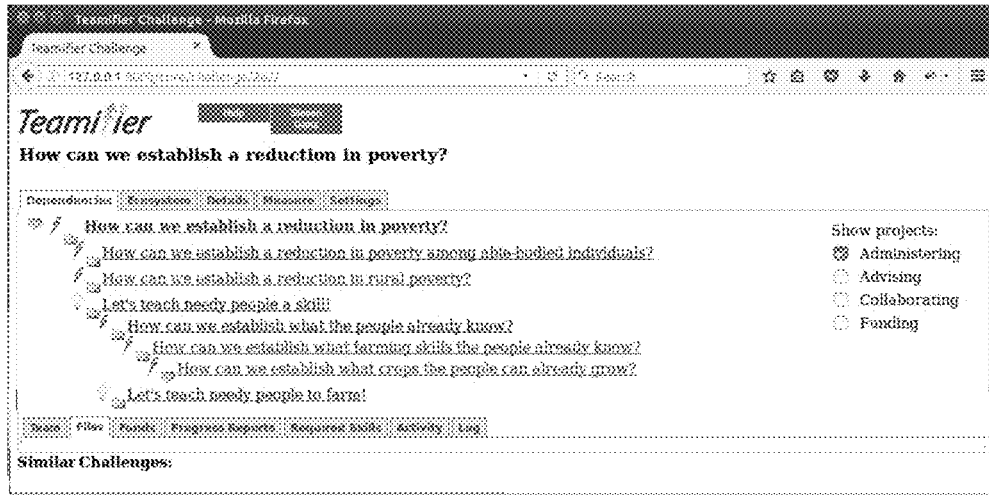

FIG. 21 is the ancestor project screen showing restated projects and their restatements according to some embodiments.

Figure 22:
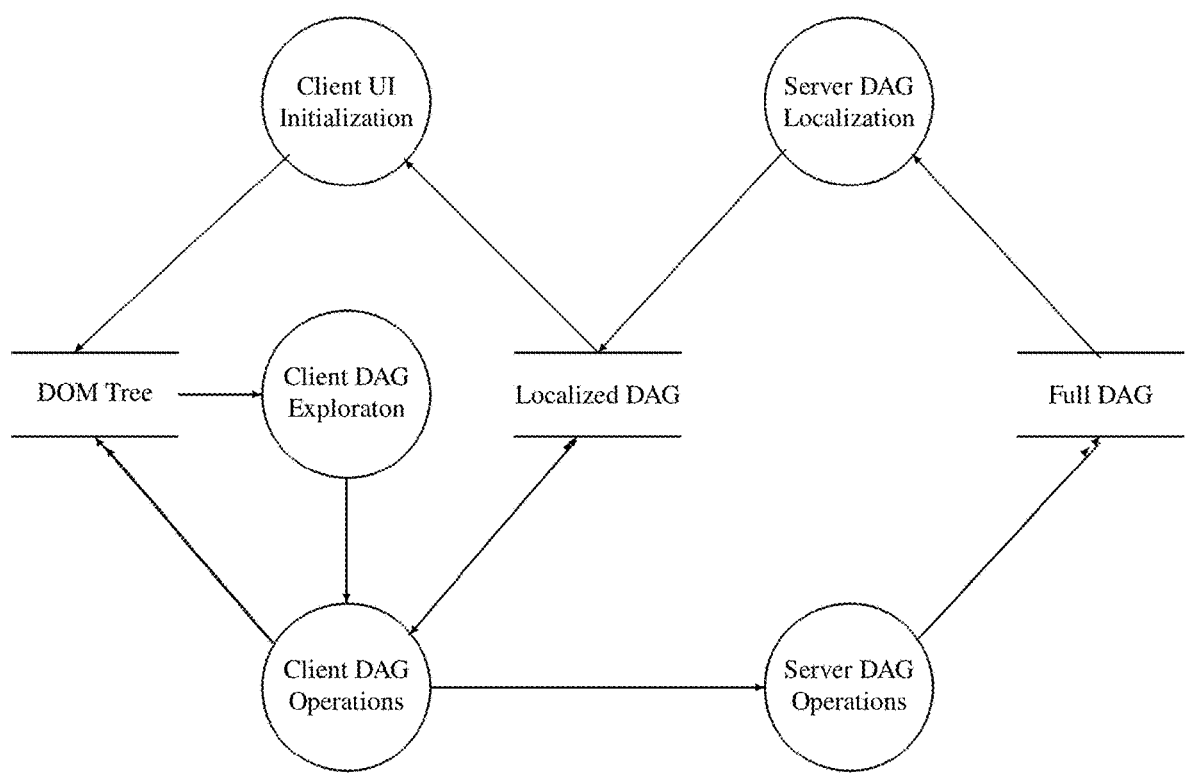

FIG. 22 is a top-level data flow diagram of an embodiment.

Figure 23:
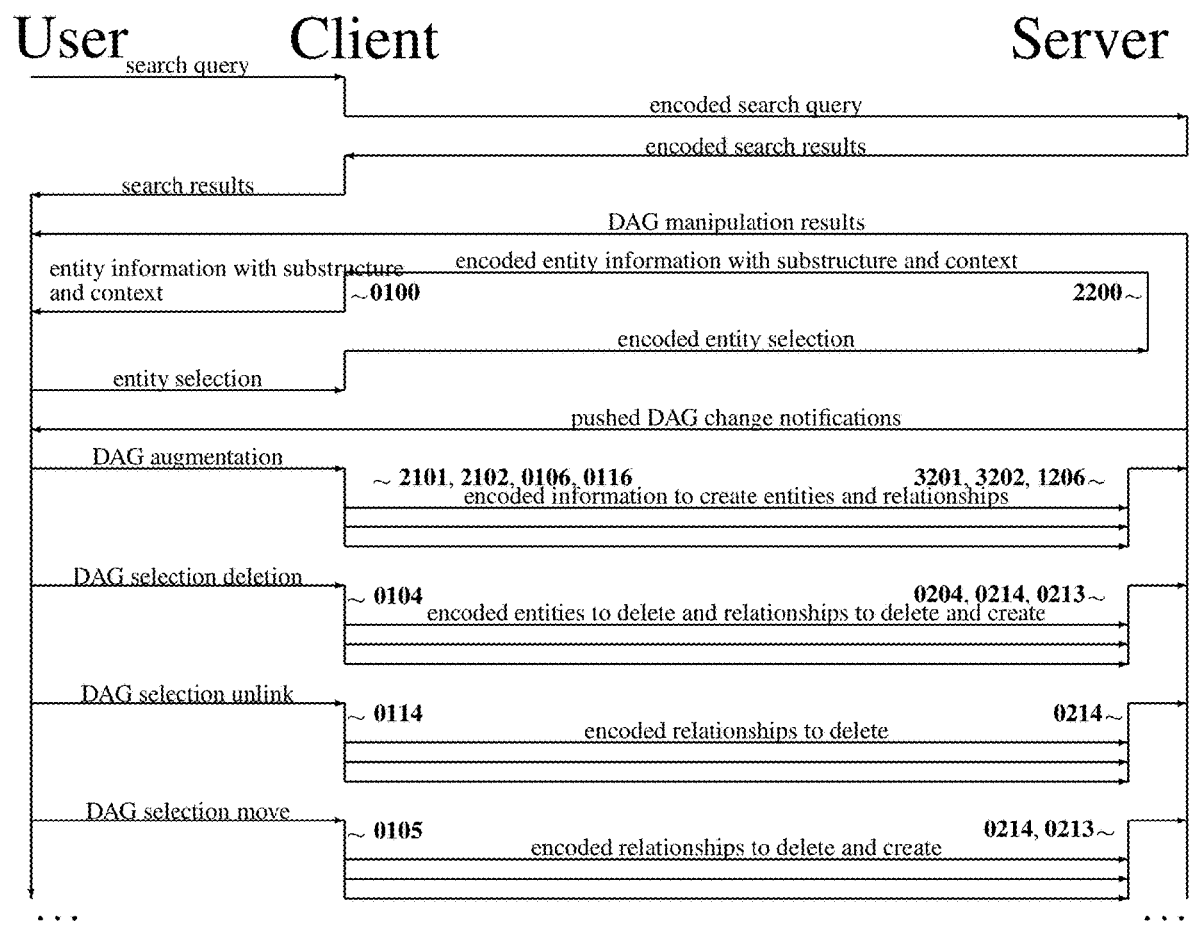

FIG. 23 is an interaction sequence diagram of several use cases of an embodiment.

In example DAGs and trees, for concreteness we assume that circles represent problems and squares represent solutions, and collectively number these sequentially. We do not indicate the kinds of association, since this is evident for this embodiment from the kinds of the source and the target of the association. Selected nodes are shown with a border, and nodes from which an operation is initiated are shown with a border and four evenly spaced notches.

Figure 24:
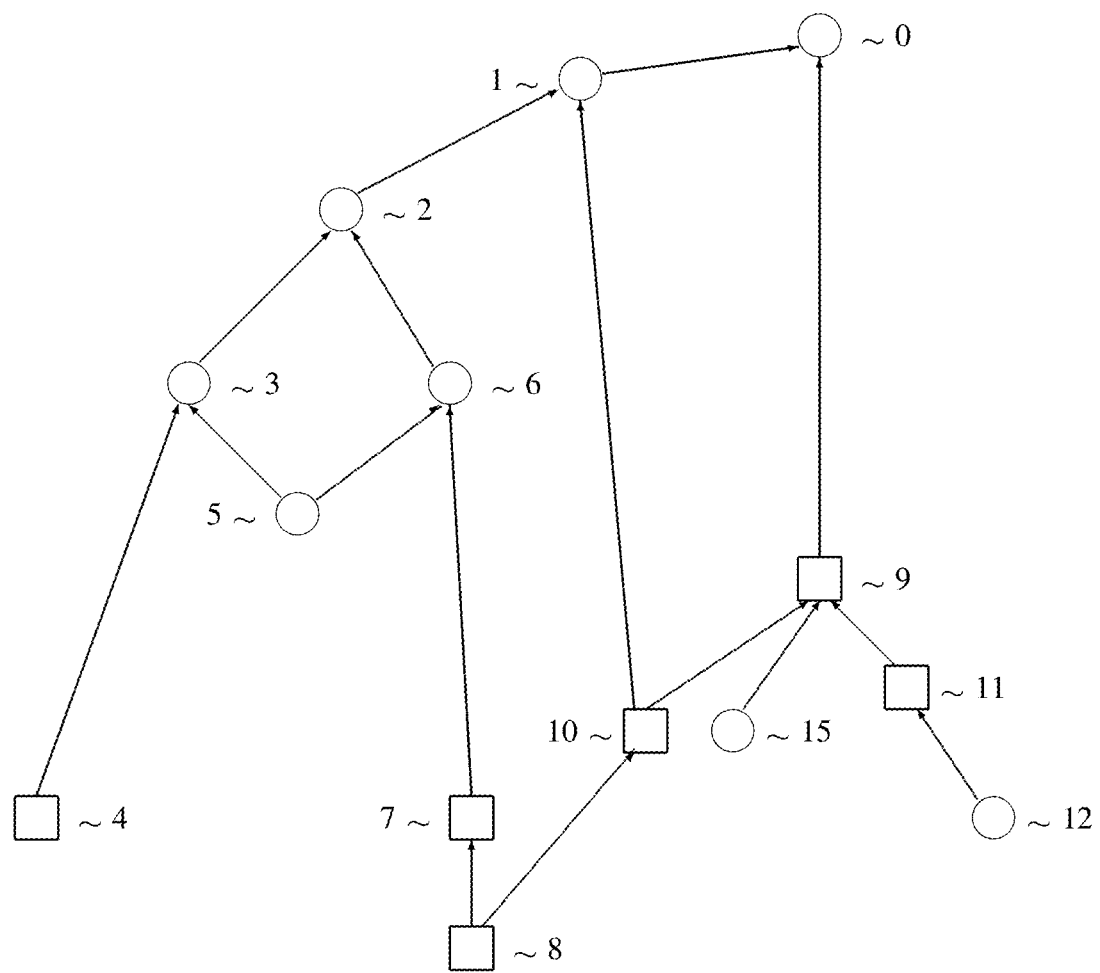

FIG. 24 is a diagram displaying an example DAG representing a problem and solution space according to some embodiments.

Figure 25:
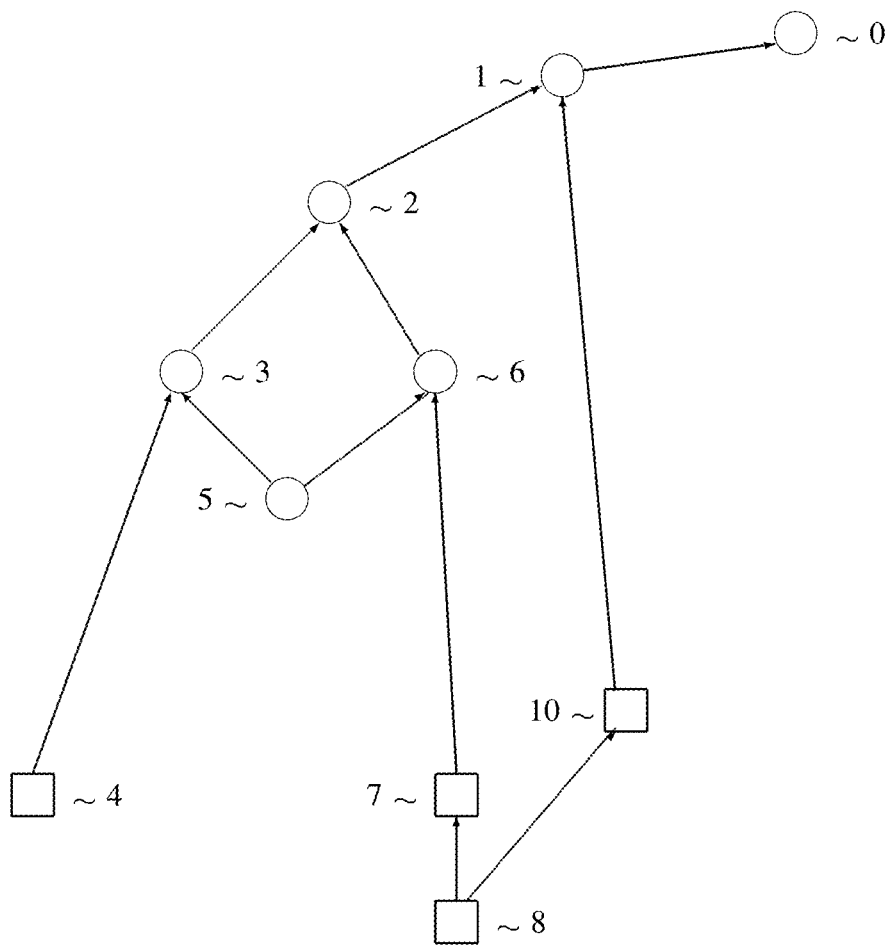

FIG. 25 is a diagram displaying a subDAG of the example DAG from FIG. 24 with navigation centered on one node (1), according to some embodiments.

Figure 26:
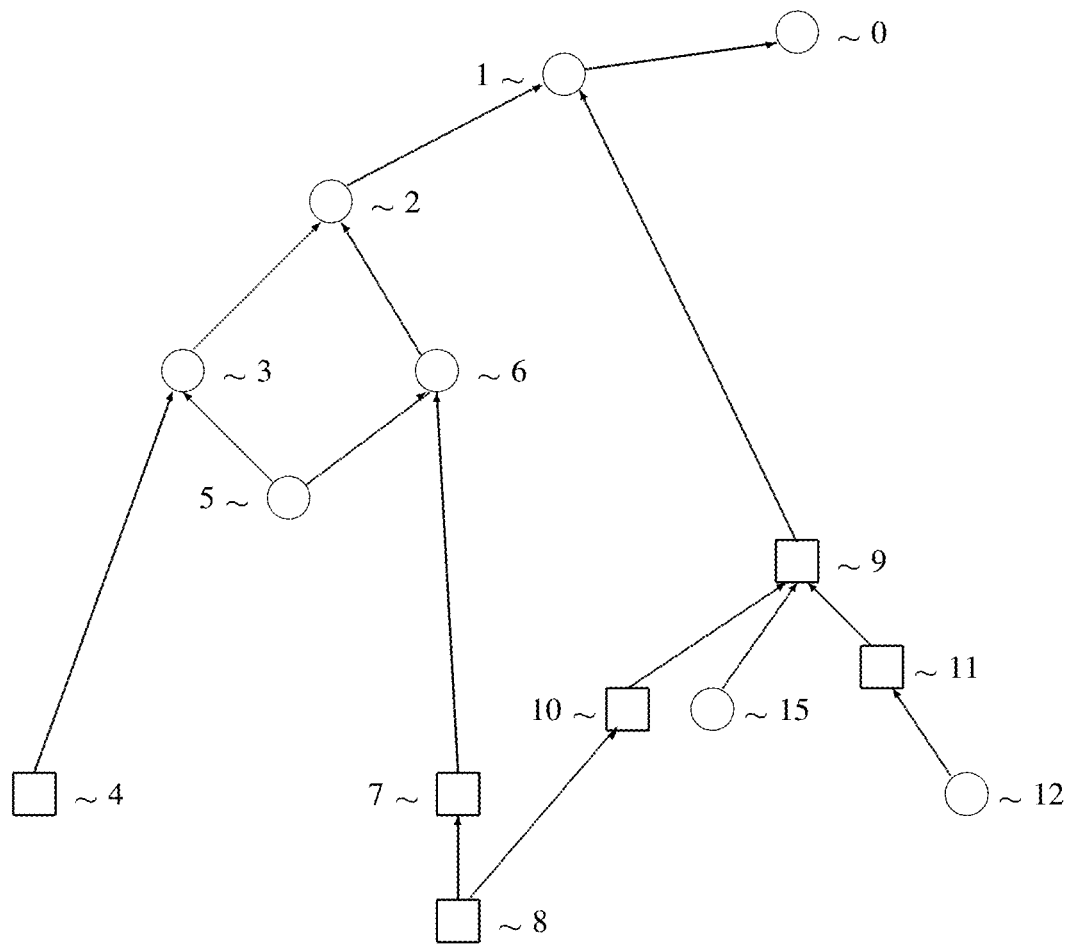

FIG. 26 is a diagram displaying the subDAG of the example DAG centered on one node (1) from FIG. 25 with navigation and some structure (including nodes 9, 11, 12, and 15) inherited, according to some embodiments. The link from node 10 to node 1 has been spliced out.

Figure 27:
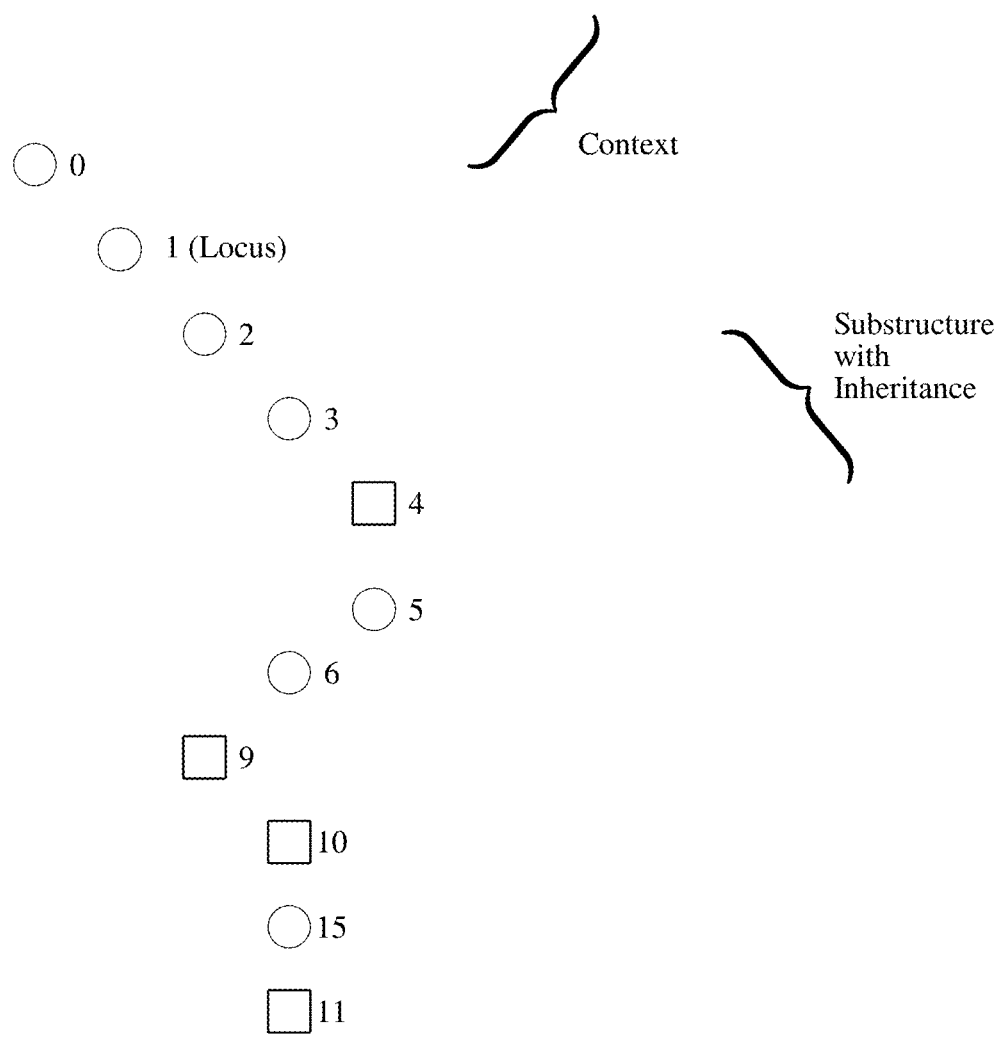

FIG. 27 is a diagram displaying the subDAG of the example DAG from FIG. 26, presented as a tree exploring nodes 4 and 10, according to some embodiments.

Figure 28:
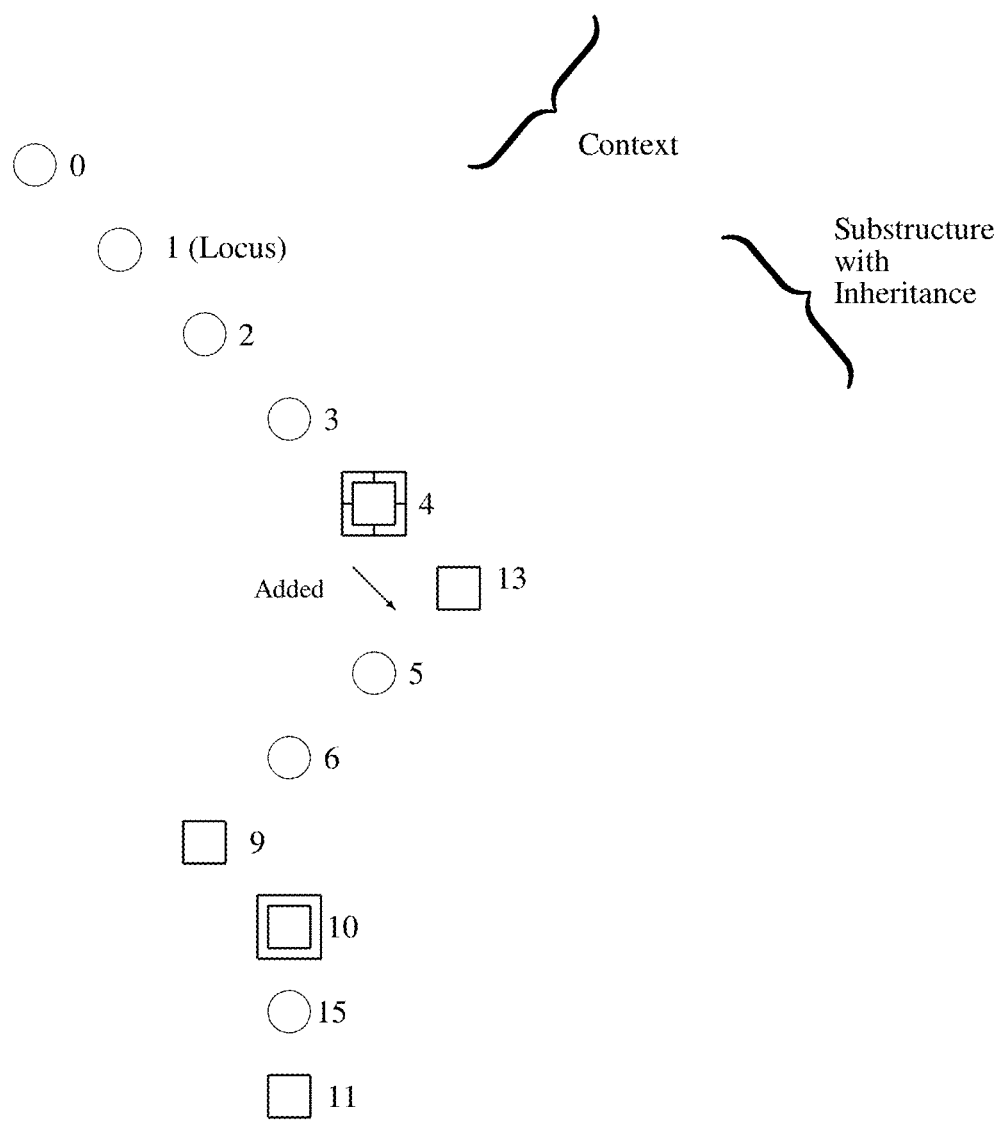

FIG. 28 is a diagram displaying the exploration from FIG. 27 with navigation centered on one node (1) during the process of explicitly refining solution nodes from the substructure (4 and 10) with a new solution node (13), while presented as a tree, according to some embodiments.

Figure 29:
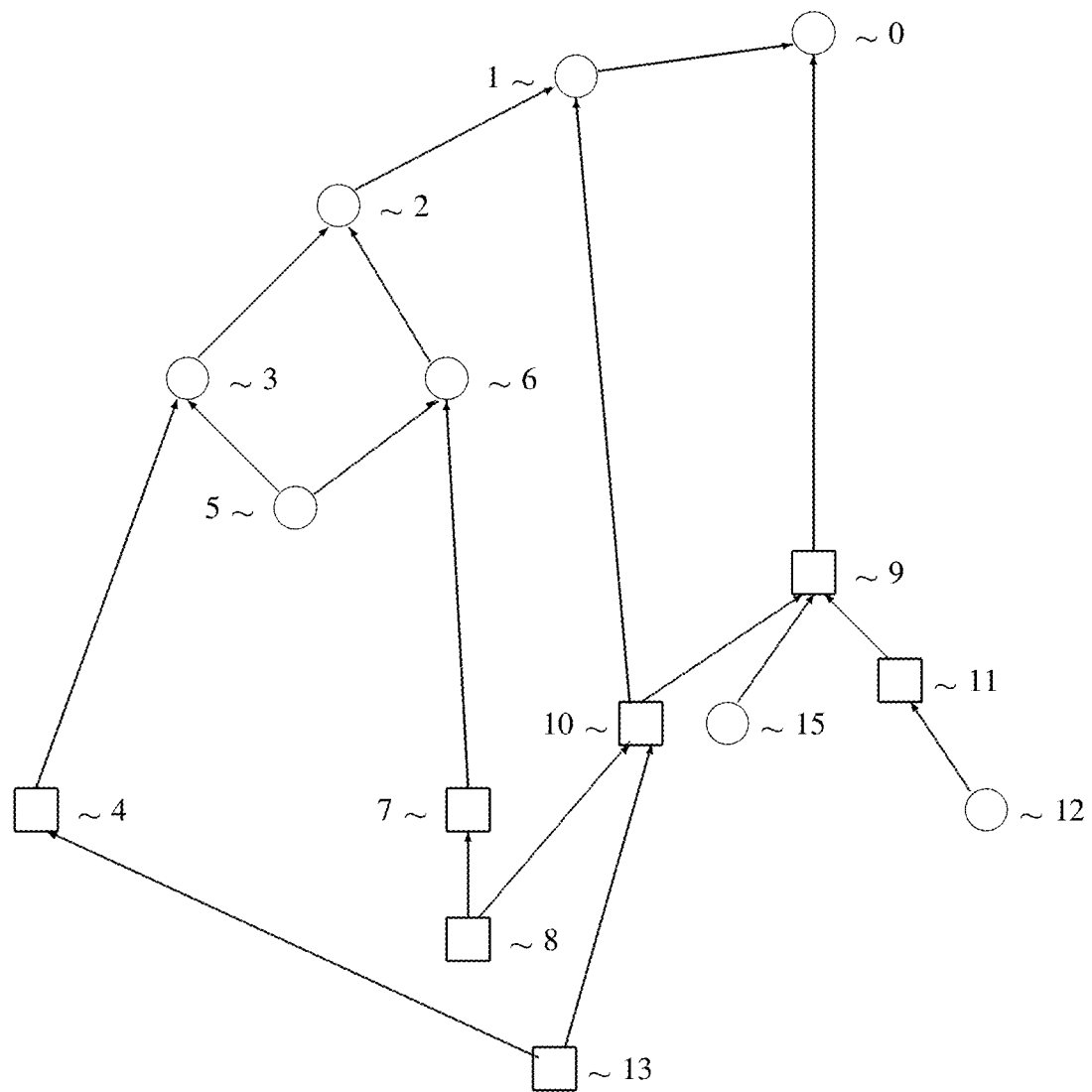

FIG. 29 is a diagram displaying the example DAG after explicit refinement of solution nodes 4 and 10 with new solution node 13 as shown in FIG. 28, according to some embodiments.

Figure 30:
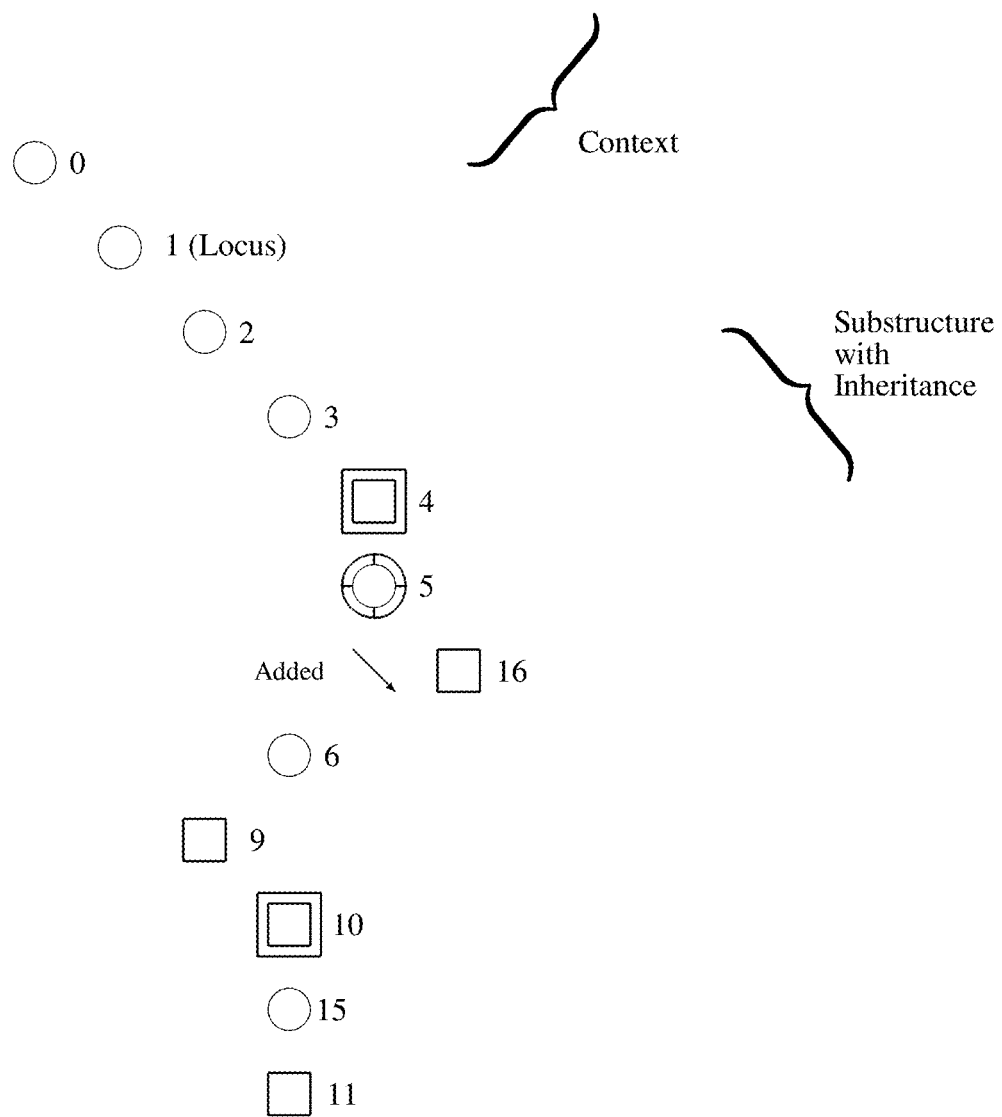

FIG. 30 is a diagram displaying the exploration from FIG. 27 with navigation centered on one node (1) during the process of explicitly refining a solution nodes from the substructure (4) and an inherited solution node (10) with a new solution node (16) that solves problem node 5, while presented as a tree, according to some embodiments.

Figure 31:
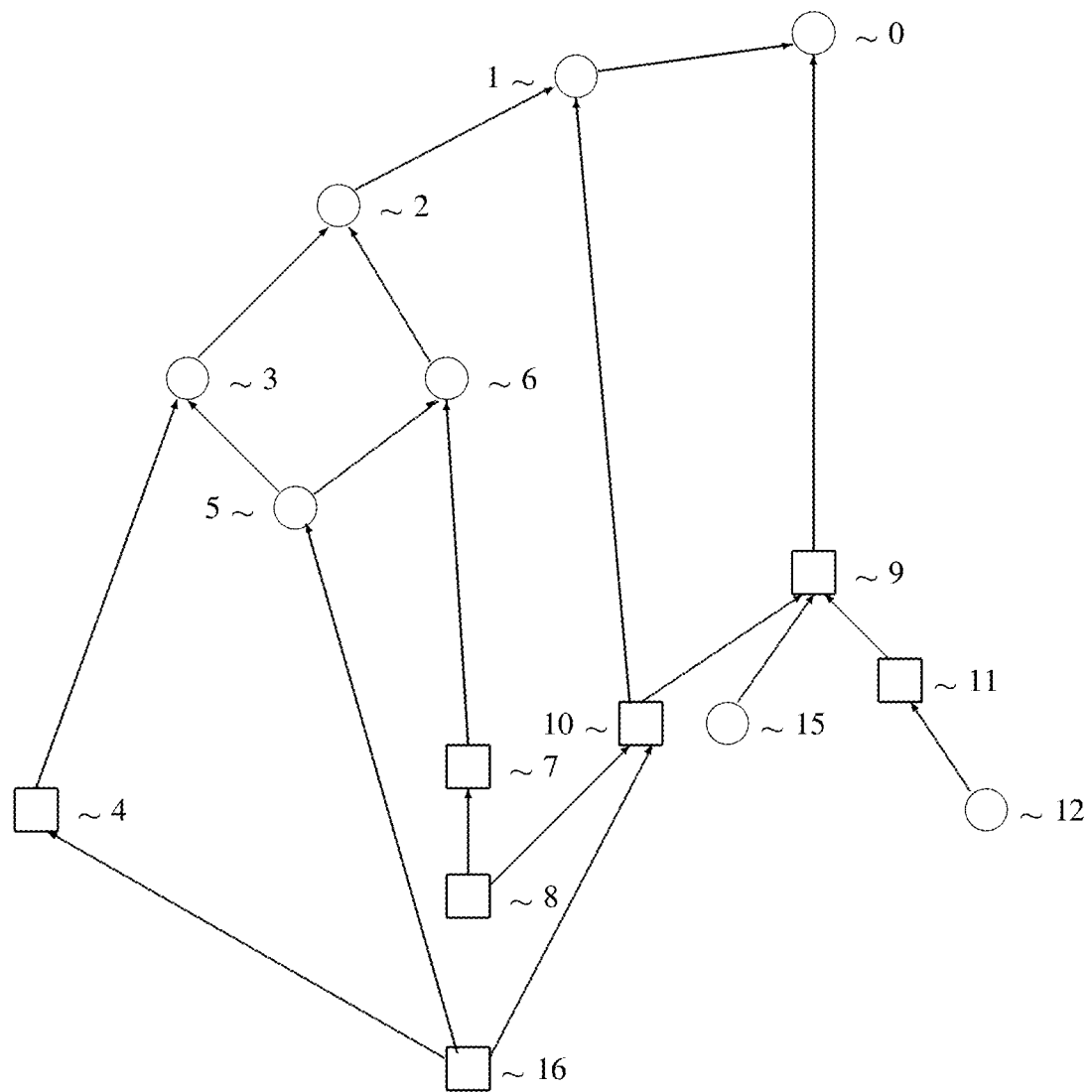

FIG. 31 is a diagram displaying the example DAG after explicit refinement of solution nodes 4 and 10 with new solution node 16 that solves problem node 5 as shown in FIG. 28, according to some embodiments.

Figure 32:
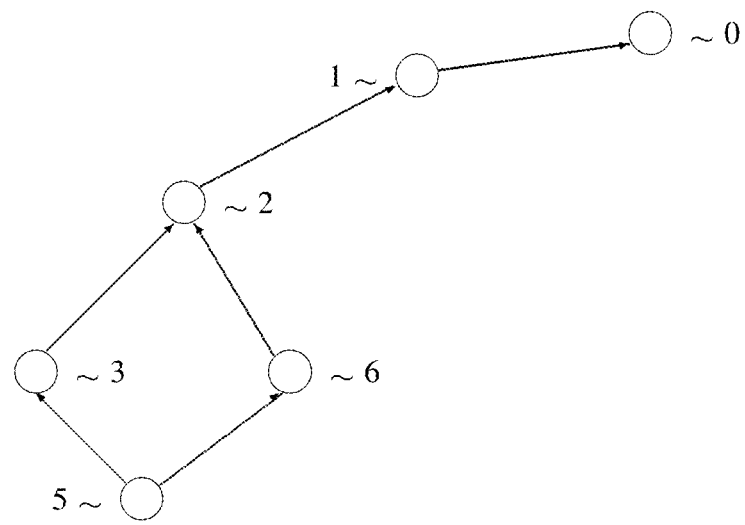

FIG. 32 is a diagram displaying a subDAG of the example DAG from FIG. 24 with navigation centered on one node (5), according to some embodiments.

Figure 33:
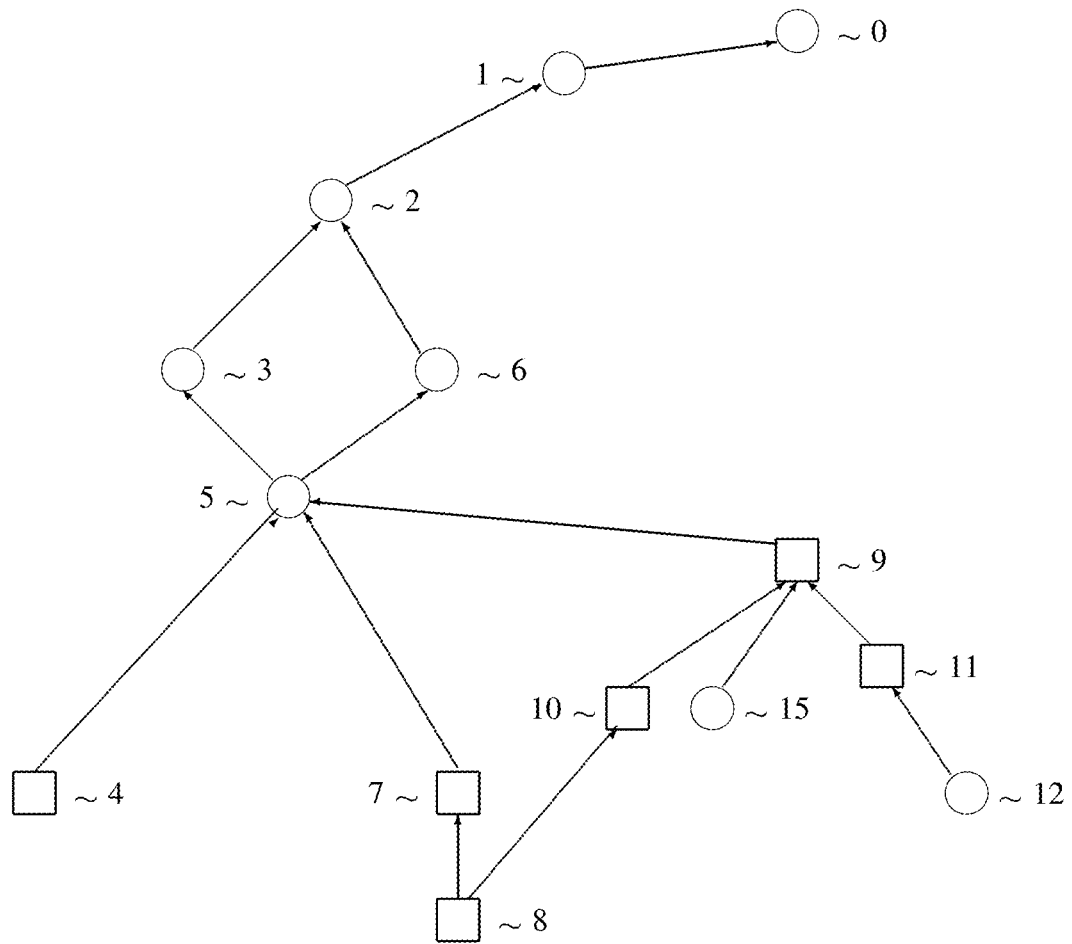

FIG. 33 is a diagram displaying the subDAG of the example DAG with navigation centered on one node (5) from FIG. 32 and some structure (including nodes 4, 7, 8, 9, 10, 11, 12, and 15) inherited, according to some embodiments.

Figure 34:
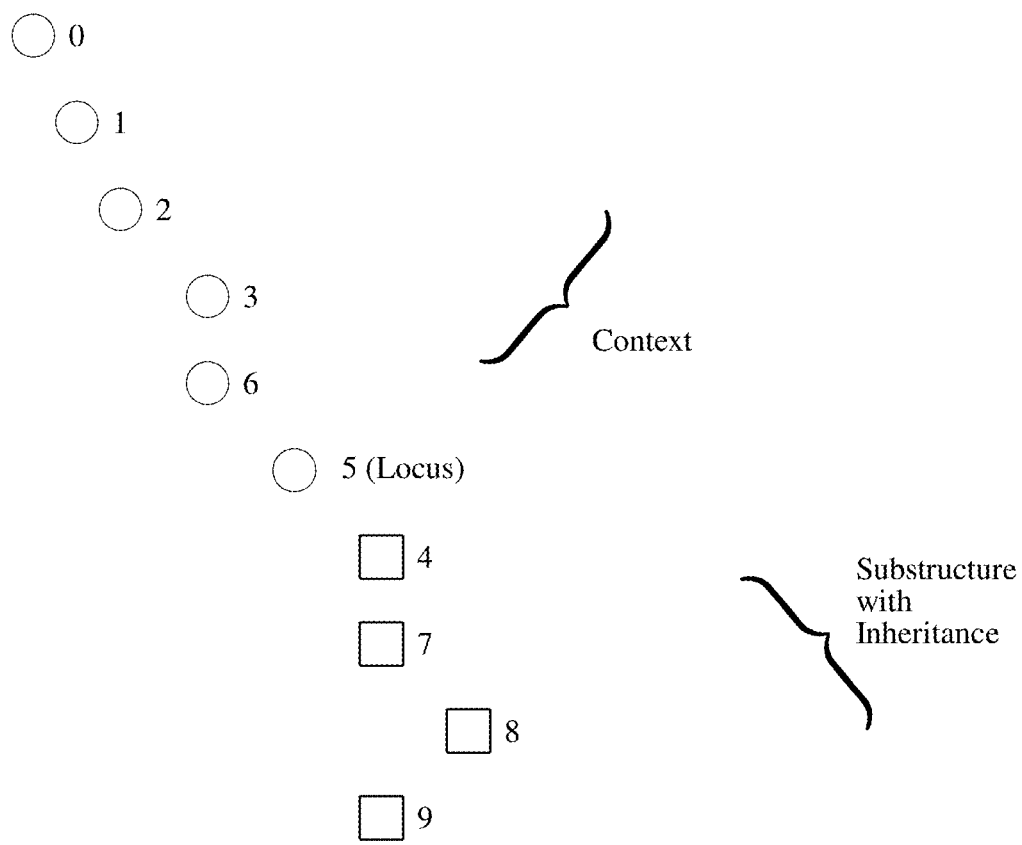

FIG. 34 is a diagram displaying the subDAG of the example DAG from FIG. 33, presented as a tree exploring nodes 4 and 8, according to some embodiments.

Figure 35:
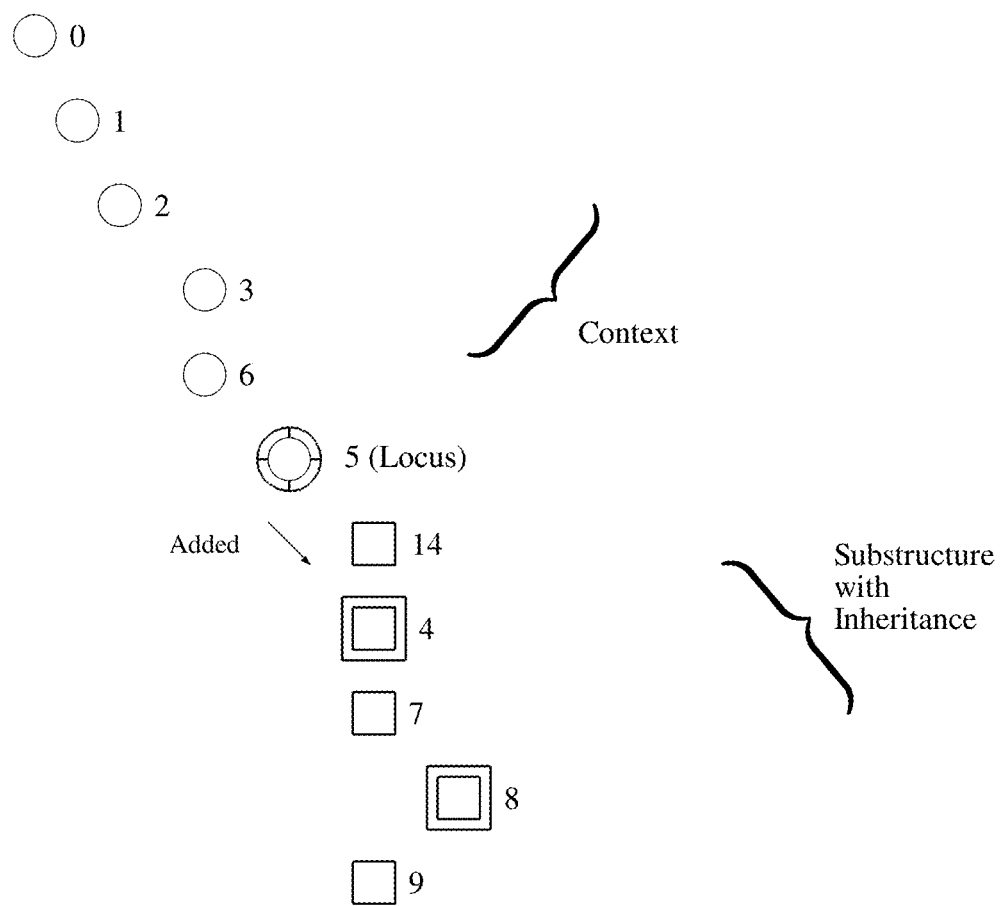

FIG. 35 is a diagram displaying the exploration from FIG. 34 with navigation centered on one node (5) during the process of solving that problem node and refining two inherited solution nodes (4 and 8) with a new solution node (14), while presented as a tree, according to some embodiments.

Figure 36:
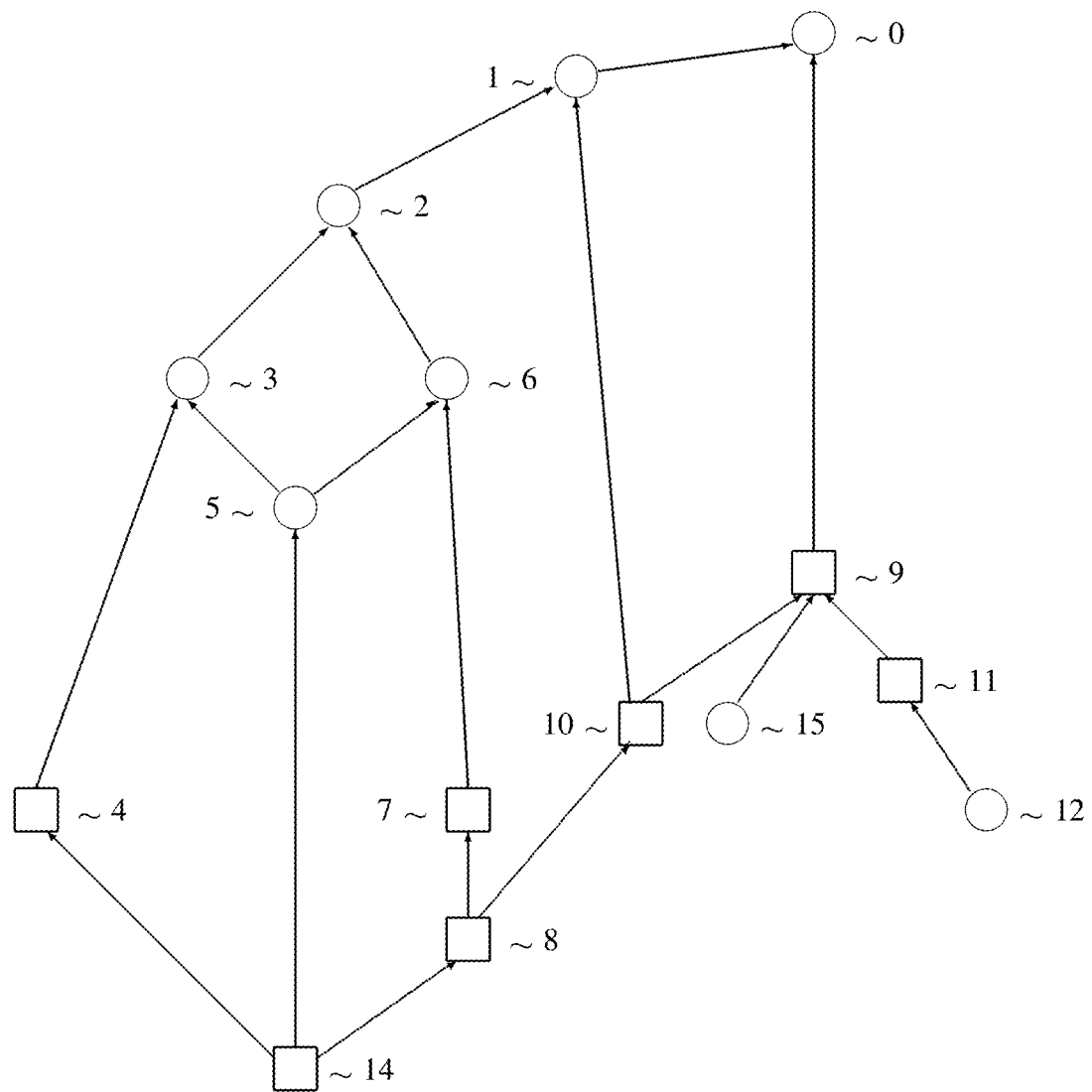

FIG. 36 is a diagram displaying the example DAG after solving problem node 5 and refining solution nodes 4 and 8 with new solution node 14 as shown in FIG. 35, according to some embodiments.

Figure 37:
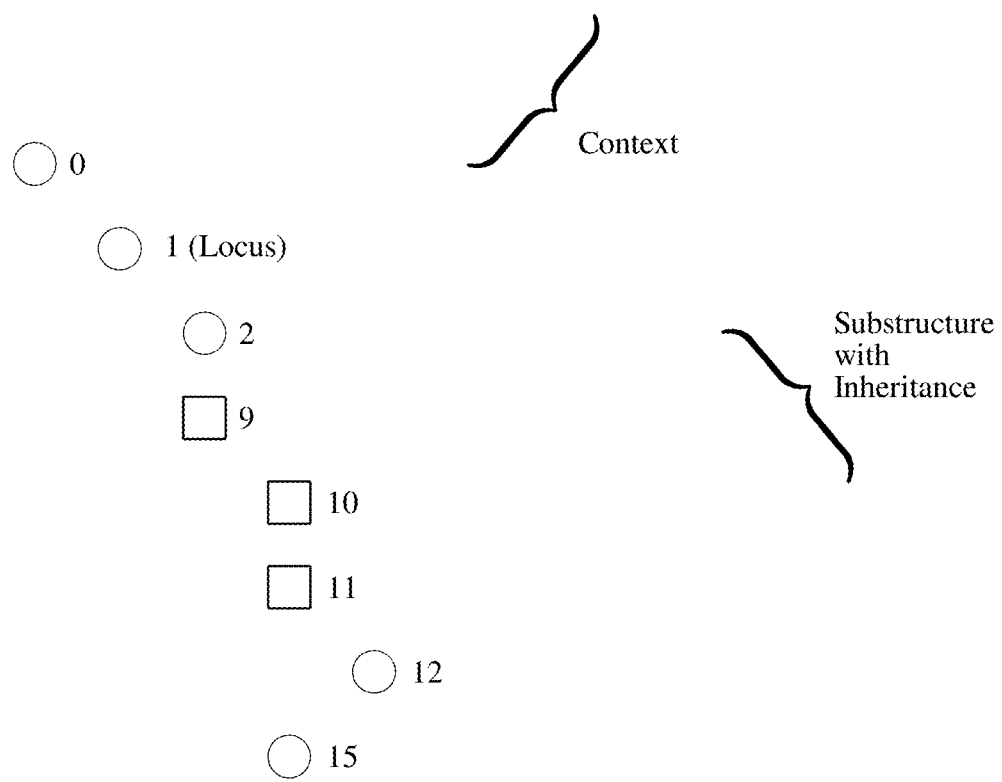

FIG. 37 is a diagram displaying the subDAG of the example DAG from FIG. 26, presented as a tree exploring nodes 12 and 15, according to some embodiments.

Figure 38:
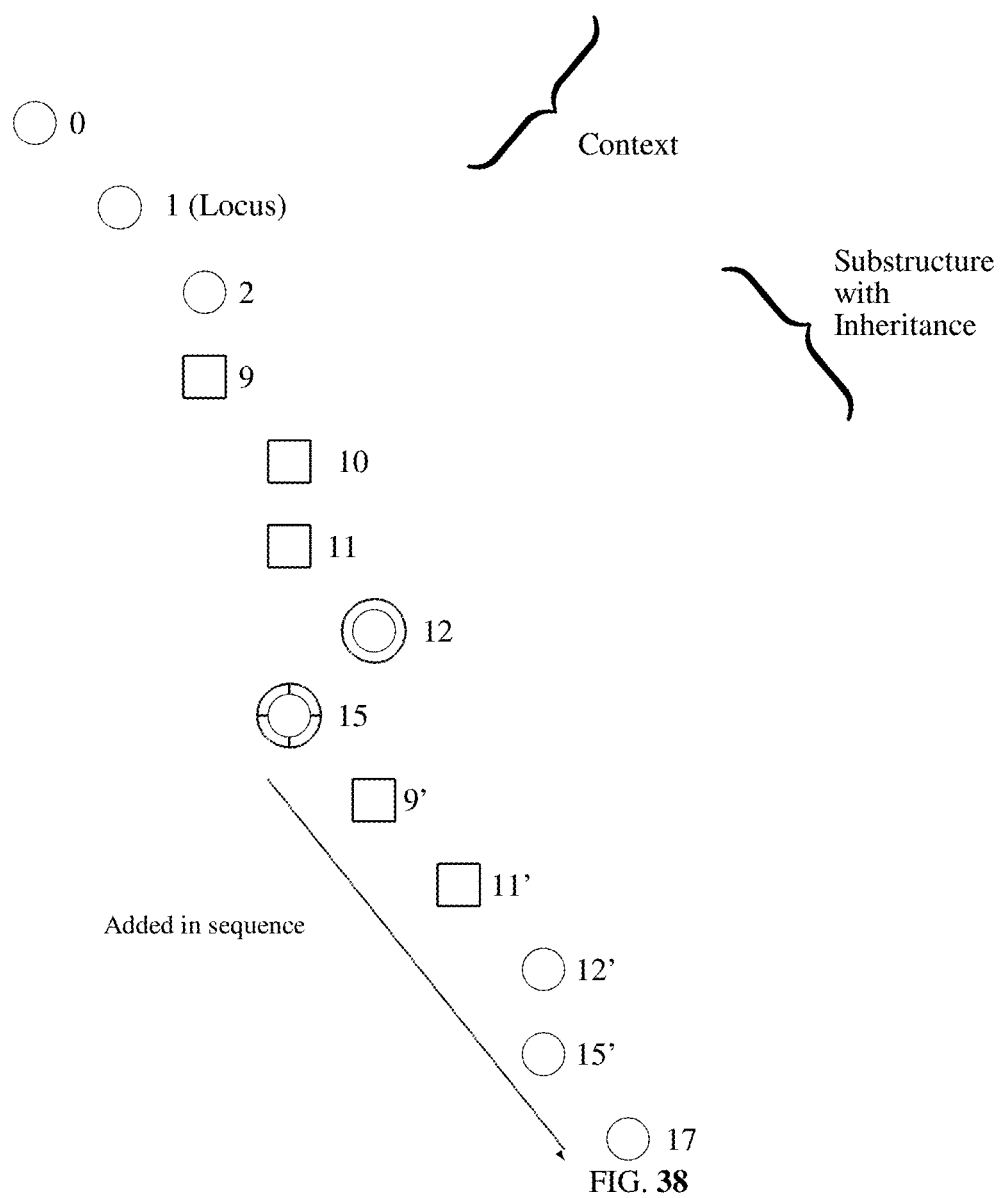

FIG. 38 is a diagram displaying the exploration from FIG. 37 with navigation centered on one node (1) during the iterated process of refining two inherited solution nodes (12 and 15) with a new solution node (17), while presented as a tree, according to some embodiments.

Figure 39:
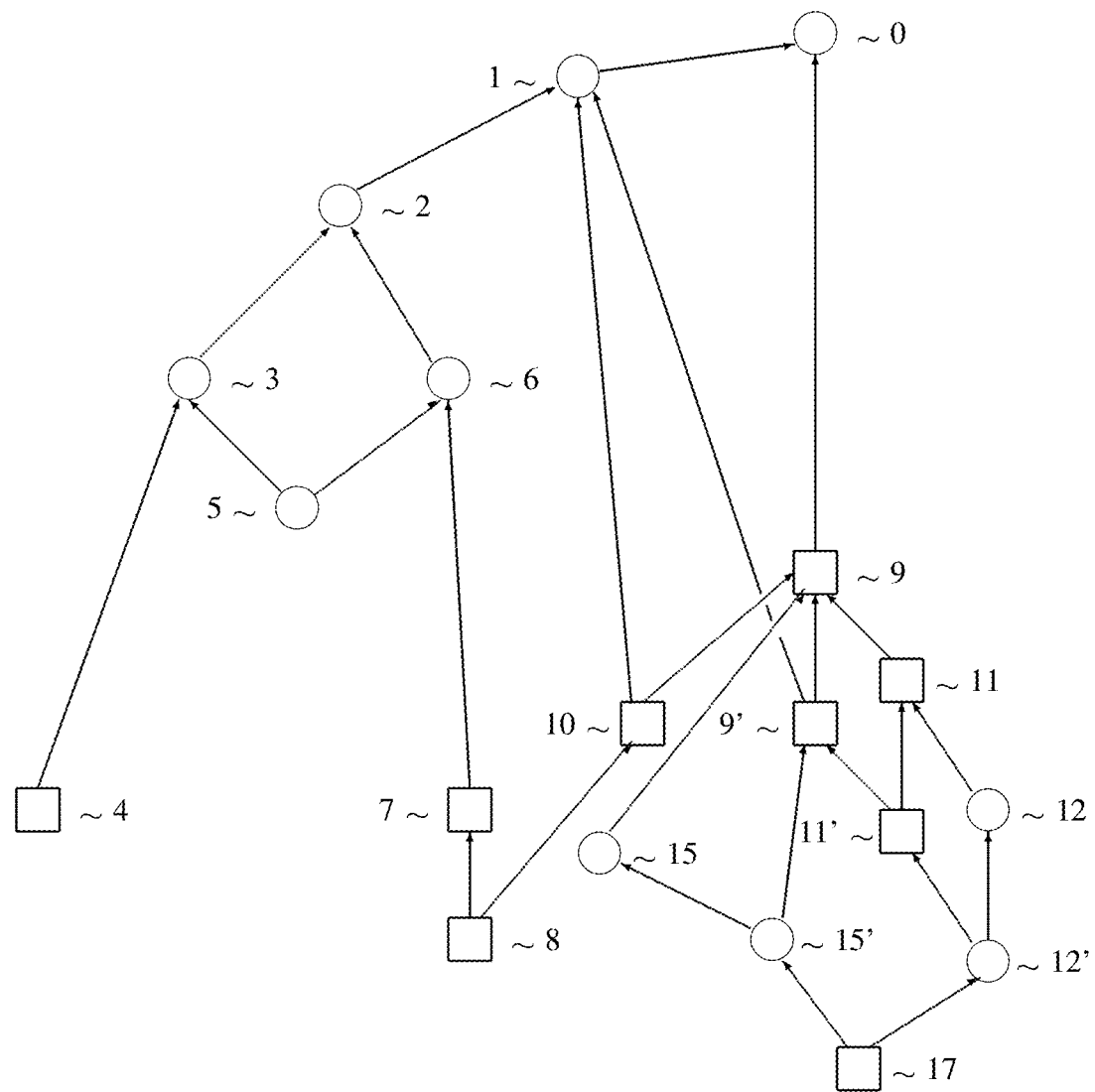

FIG. 39 is a diagram displaying the example DAG after refining problem nodes 12 and 15 with new solution node 17 as shown in FIG. 38, according to some embodiments.

Figure 40:
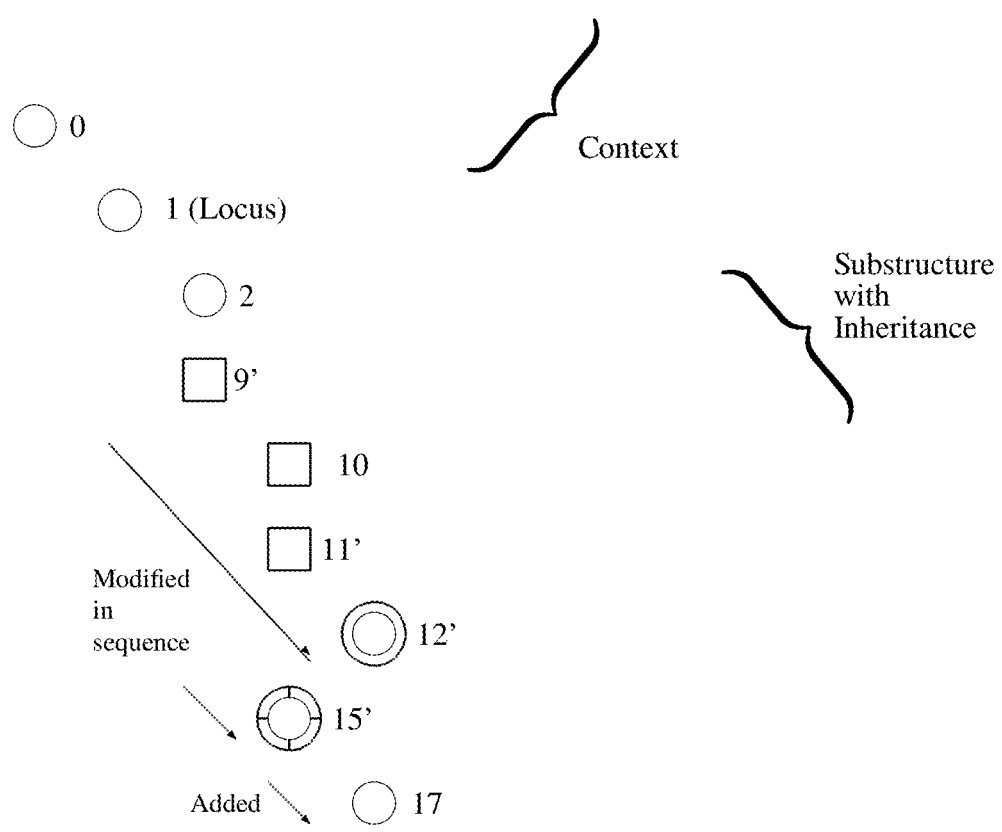

FIG. 40 is a diagram displaying the exploration from FIG. 37 with navigation centered on one node (1) during the in-place, iterated process of refining two inherited solution nodes (12 and 15) with a new solution node (17), while presented as a tree, according to some embodiments.

Figure 41:
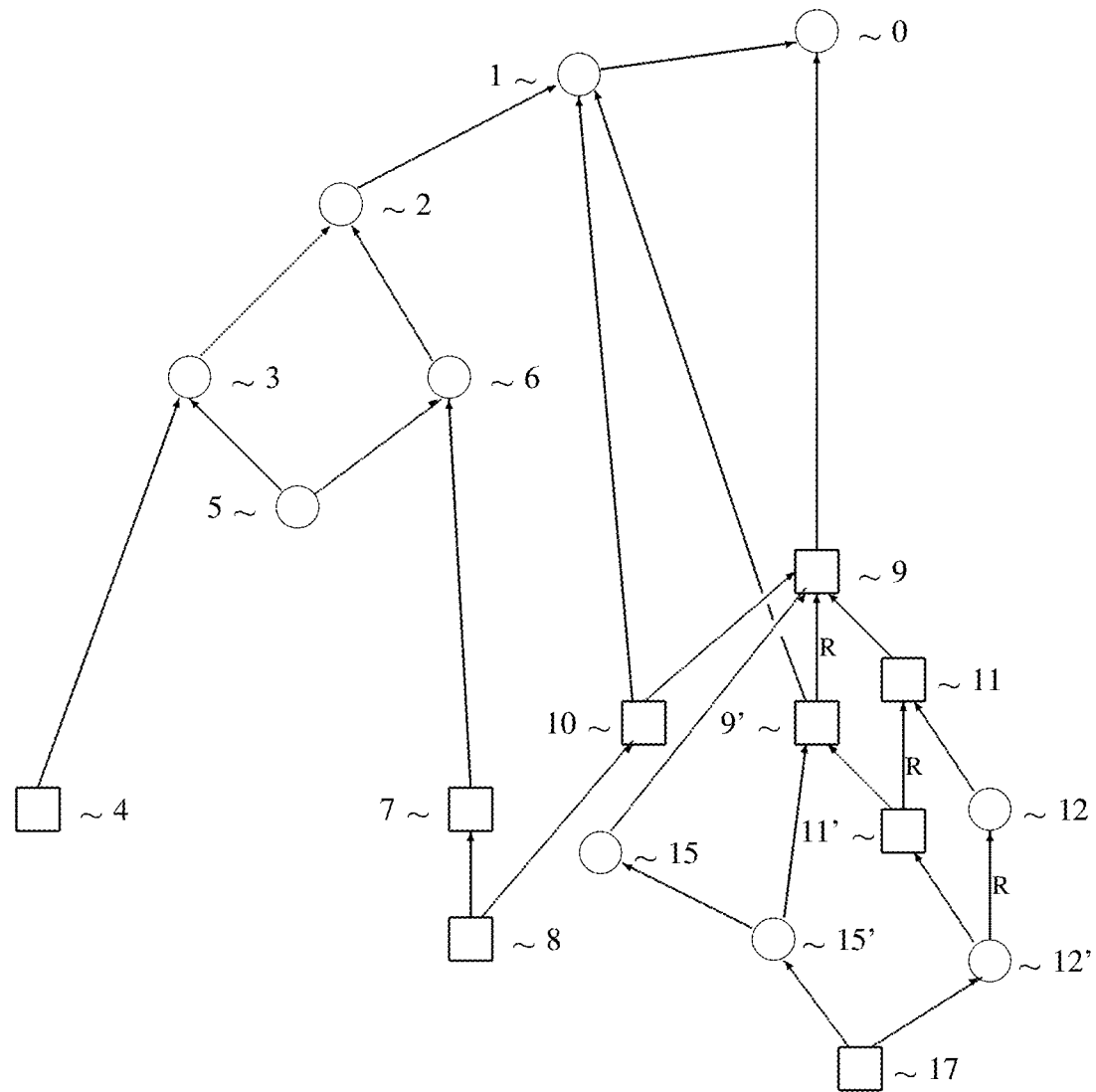

FIG. 41 is a diagram displaying the exploration from FIG. 37 with navigation centered on one node (1) after the in-place, iterated process of refining two inherited solution nodes (12 and 15) with a new solution node (17), according to some embodiments.

Figure 42:
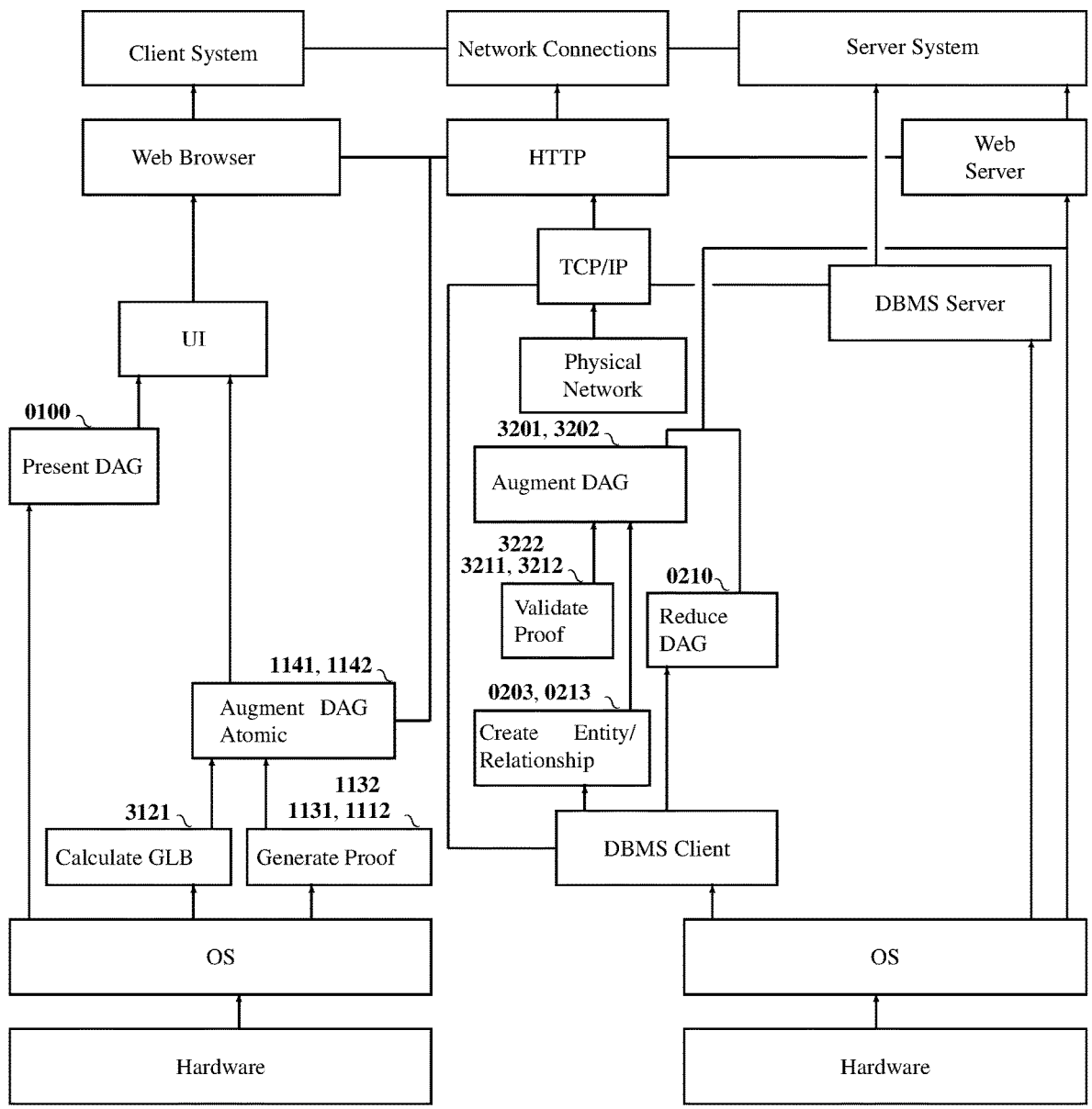

FIG. 42 is a block structure diagram of an embodiment for specialization without inheritance.

Figure 43:
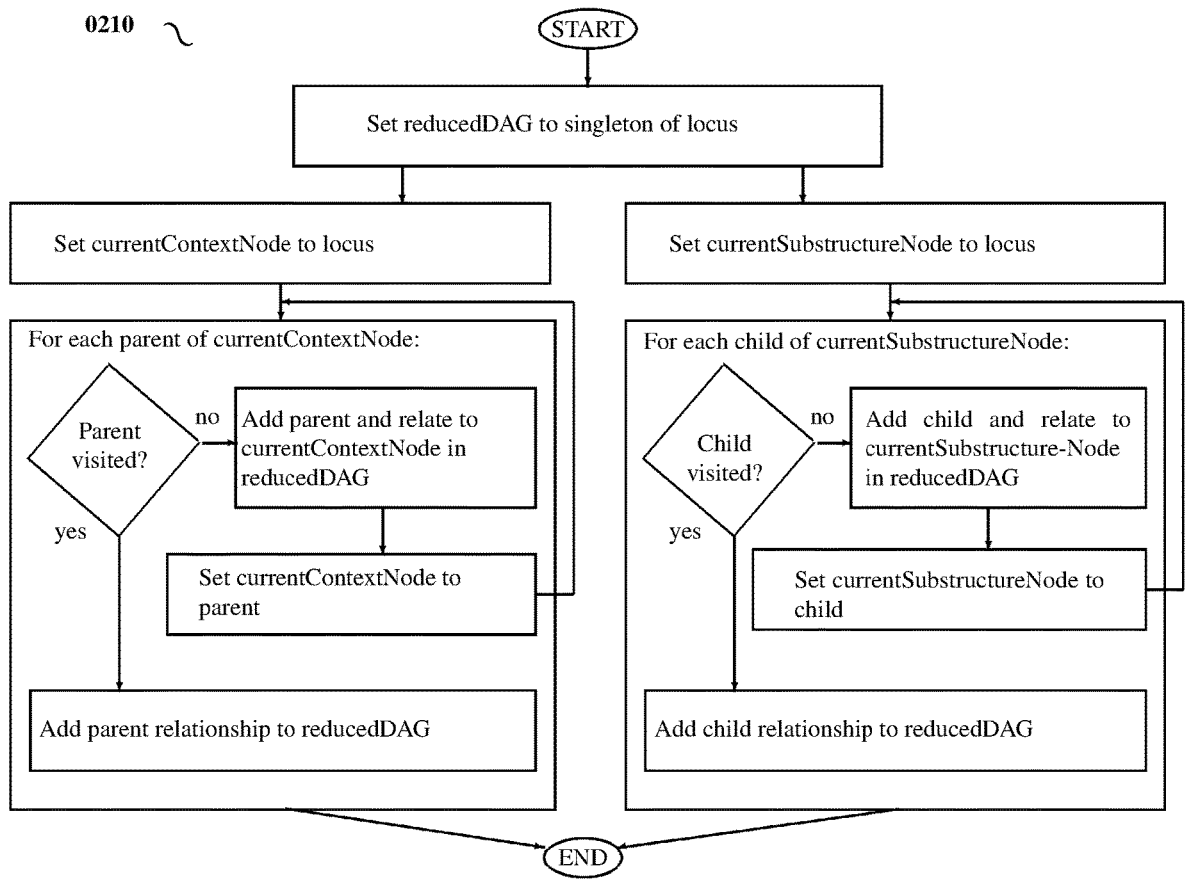

FIG. 43 is a process flow diagram of an embodiment of the DAG reduction process, according to some embodiments.

Figure 44:
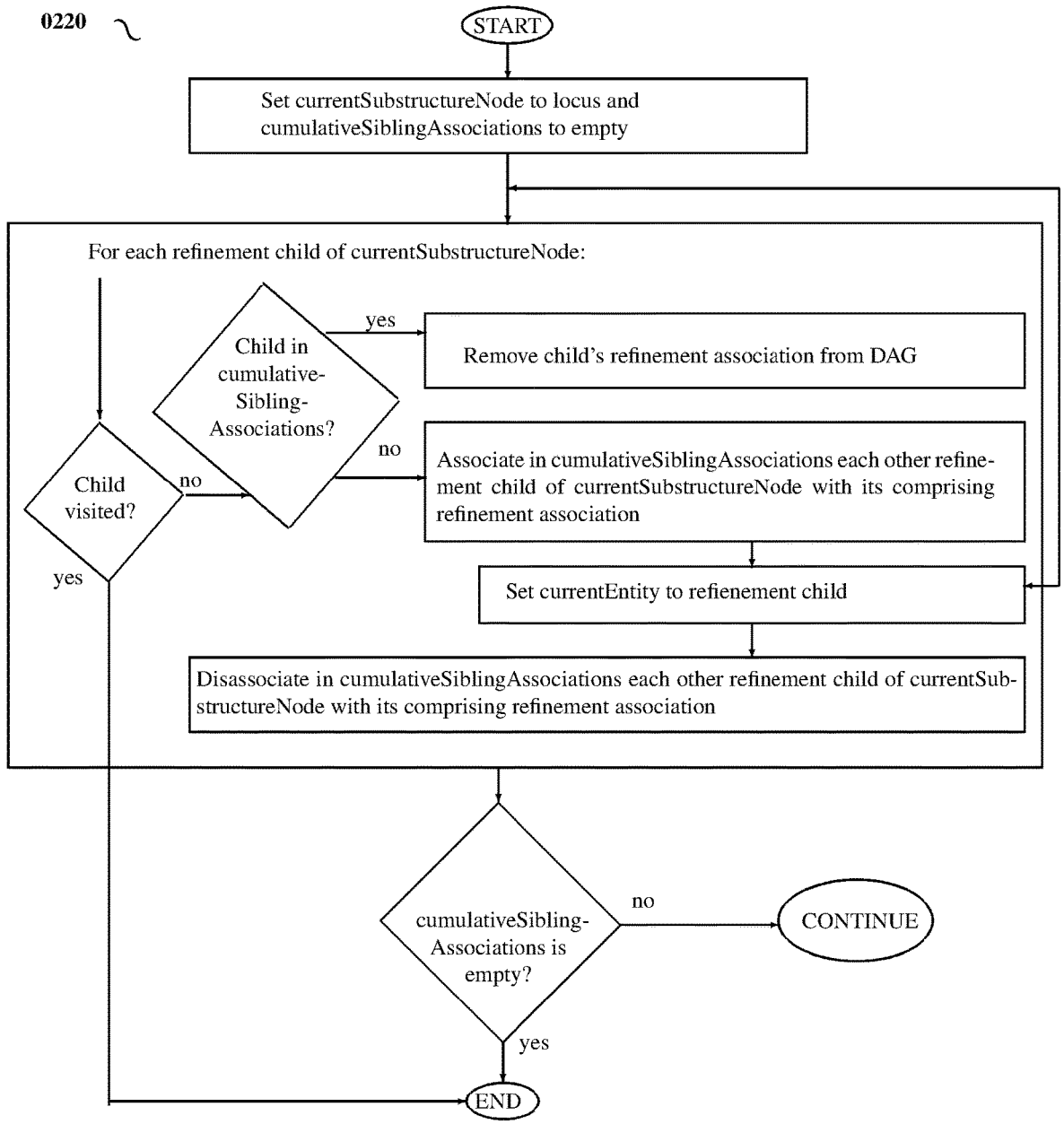

FIG. 44 is a process flow diagram of an embodiment of the redundant refinement elimination process, according to some embodiments.

Figure 45:
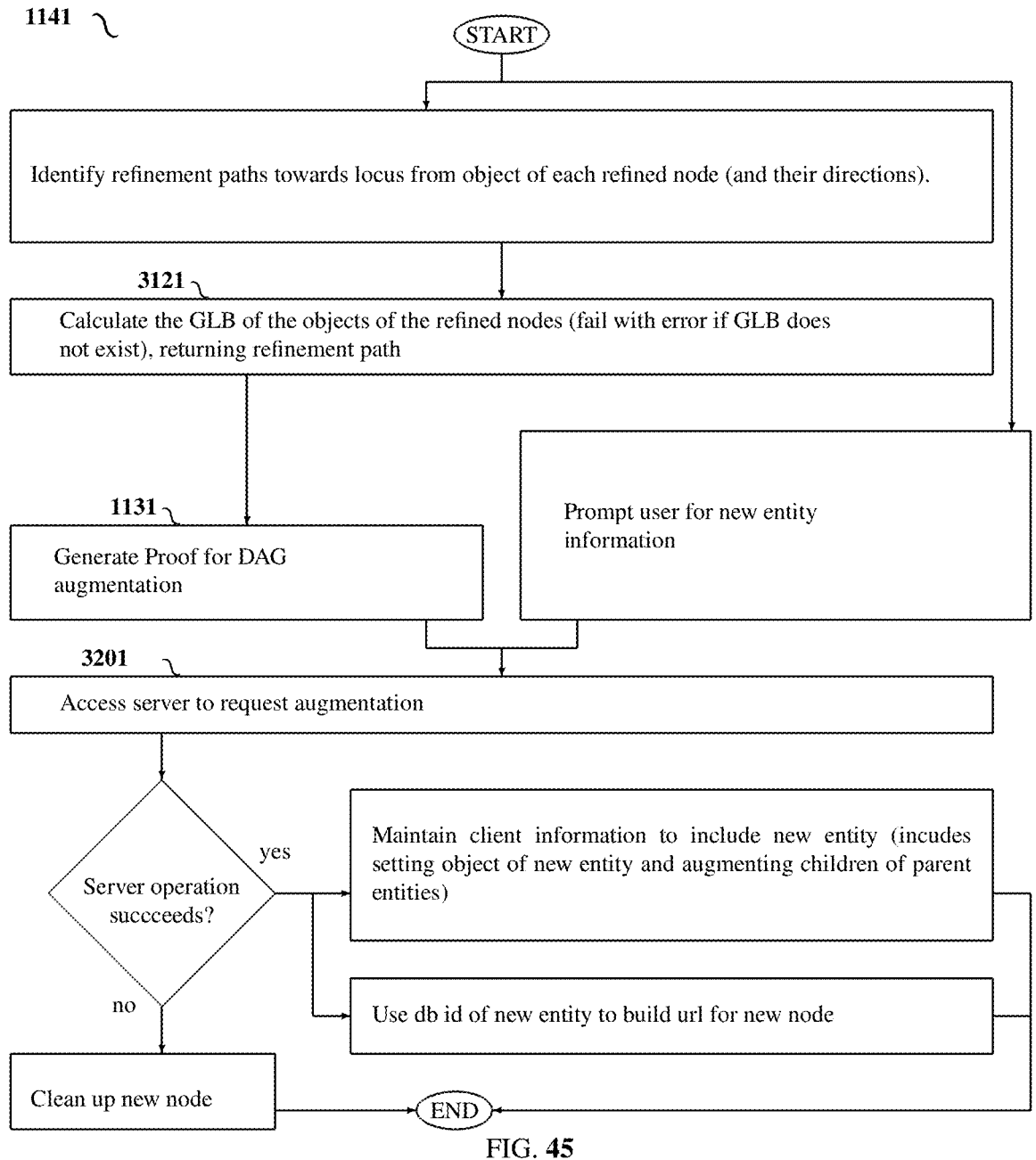

FIG. 45 is a process flow diagram of client action to perform a single specializing augmentation of a DAG without inheritance, according to some embodiments.

Figure 46:
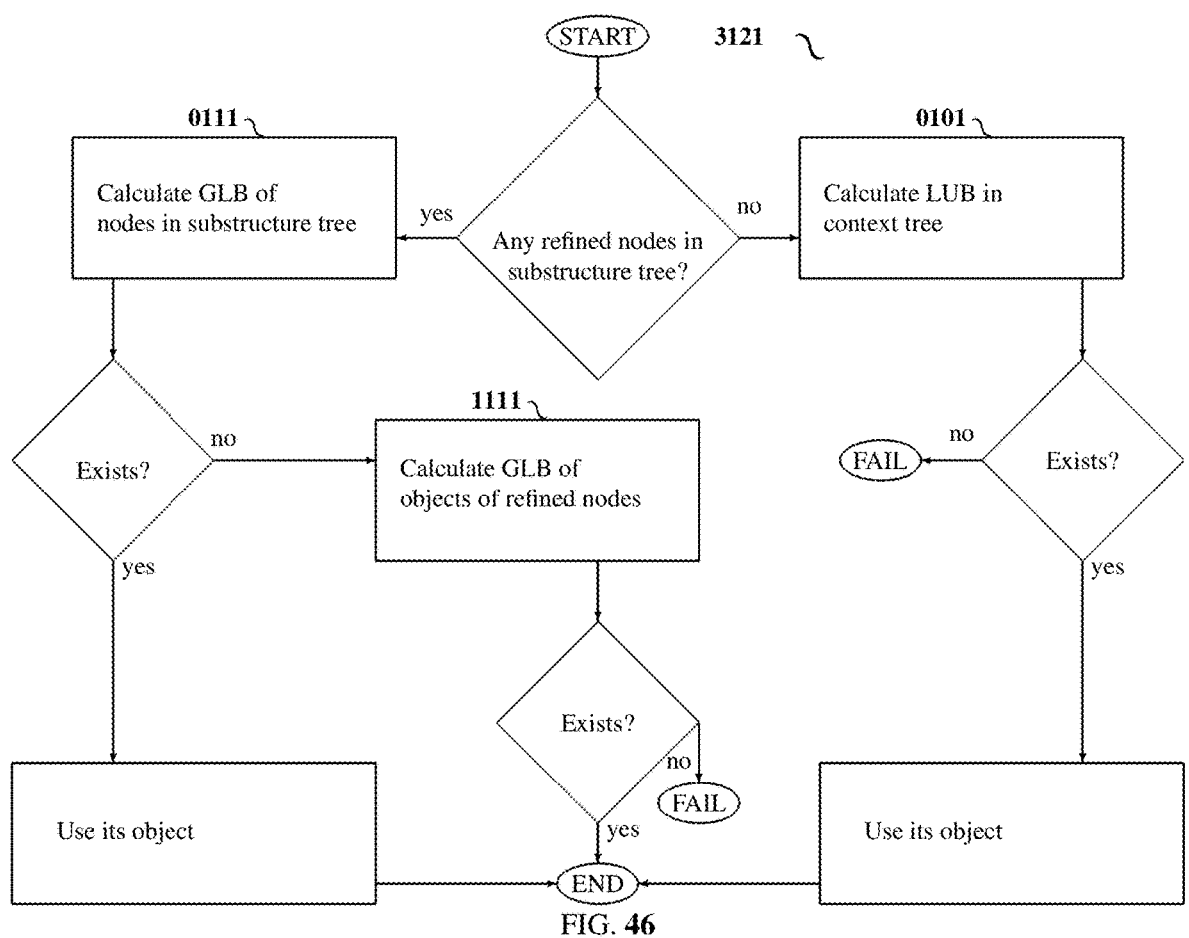

FIG. 46 is a process flow diagram of the calculation of the greatest lower bound of objects of refined nodes with respect to the substructure and context trees without inheritance, according to some embodiments.

Figure 47:
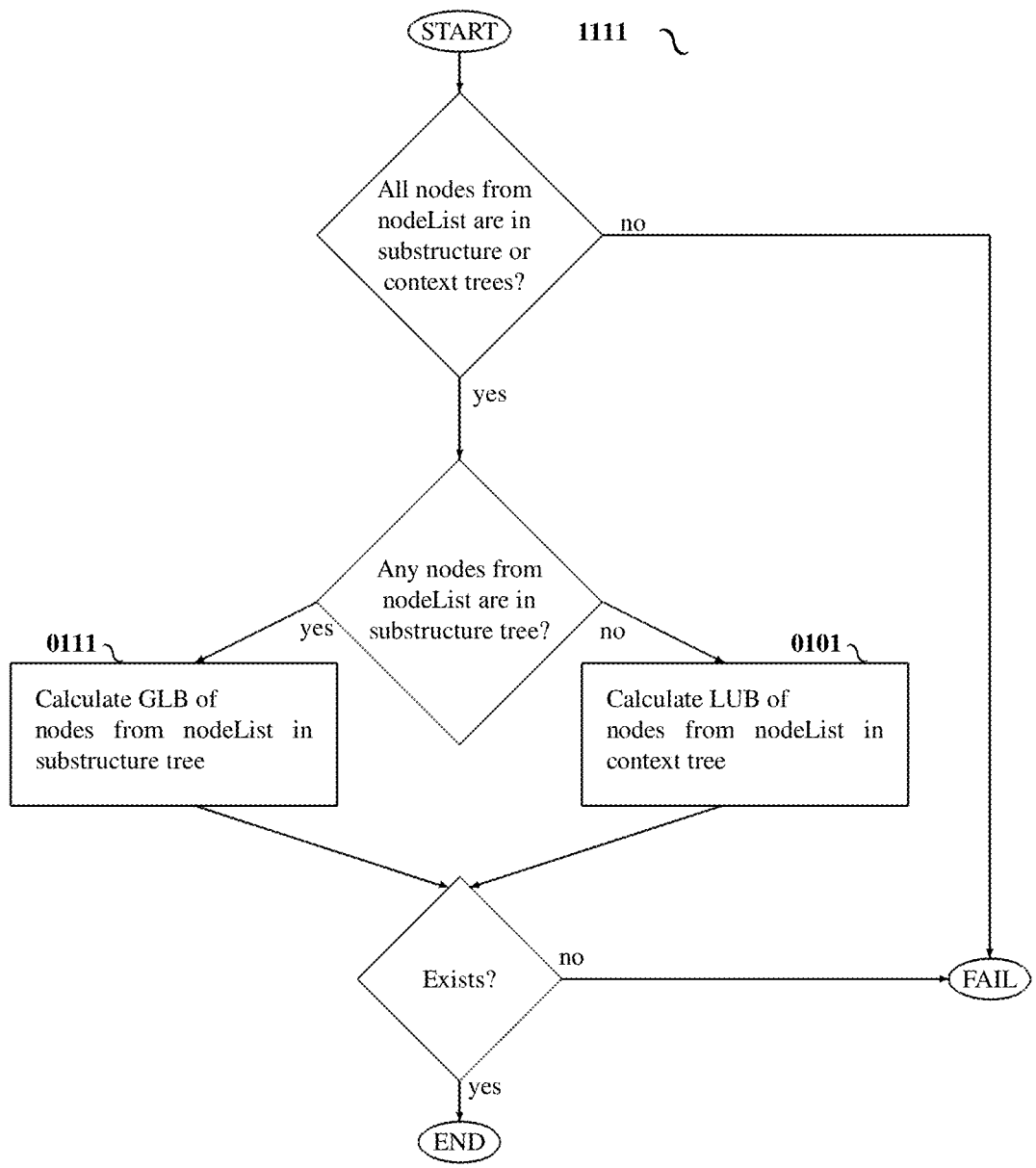

FIG. 47 is a process flow diagram of the calculation of the greatest lower bound of nodes with respect to both context and substructure trees, according to some embodiments.

Figure 48:
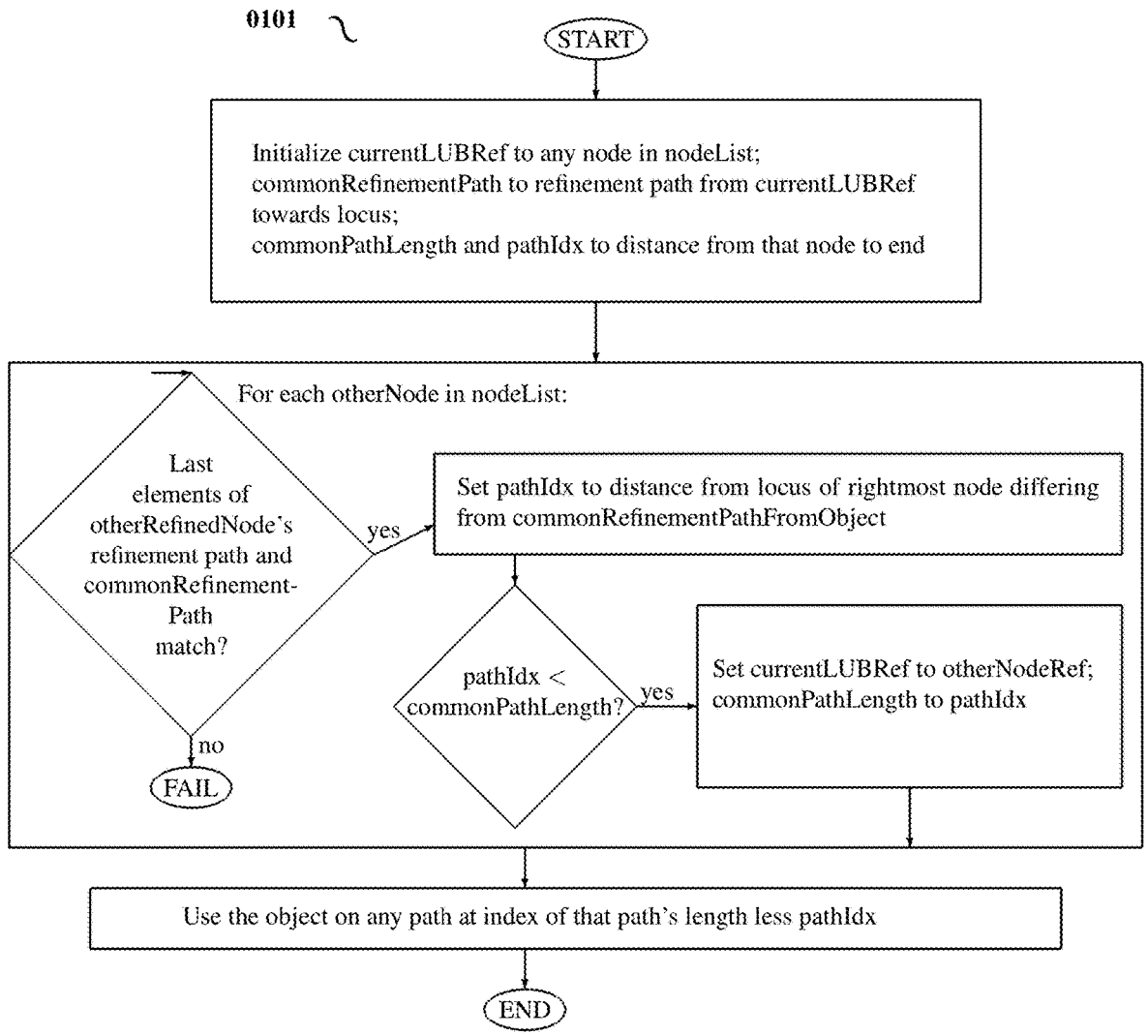

FIG. 48 is a process flow diagram of the calculation of the least upper bound of nodes with respect to a tree (context or substructure), according to some embodiments.

Figure 49:
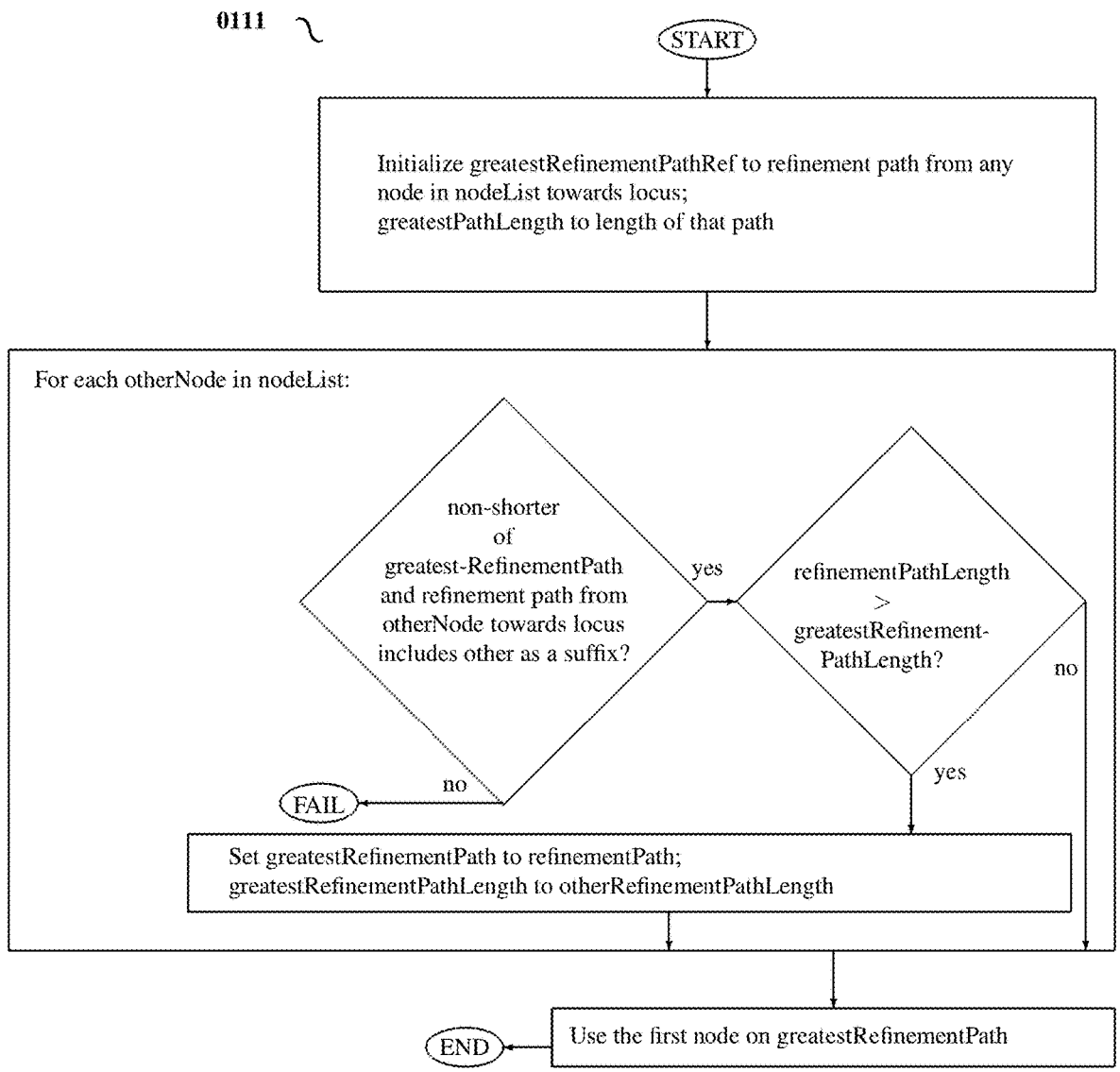

FIG. 49 is a process flow diagram of the calculation of the greatest lower bound of nodes with respect to a tree (context or substructure), according to some embodiments.

Figure 50:
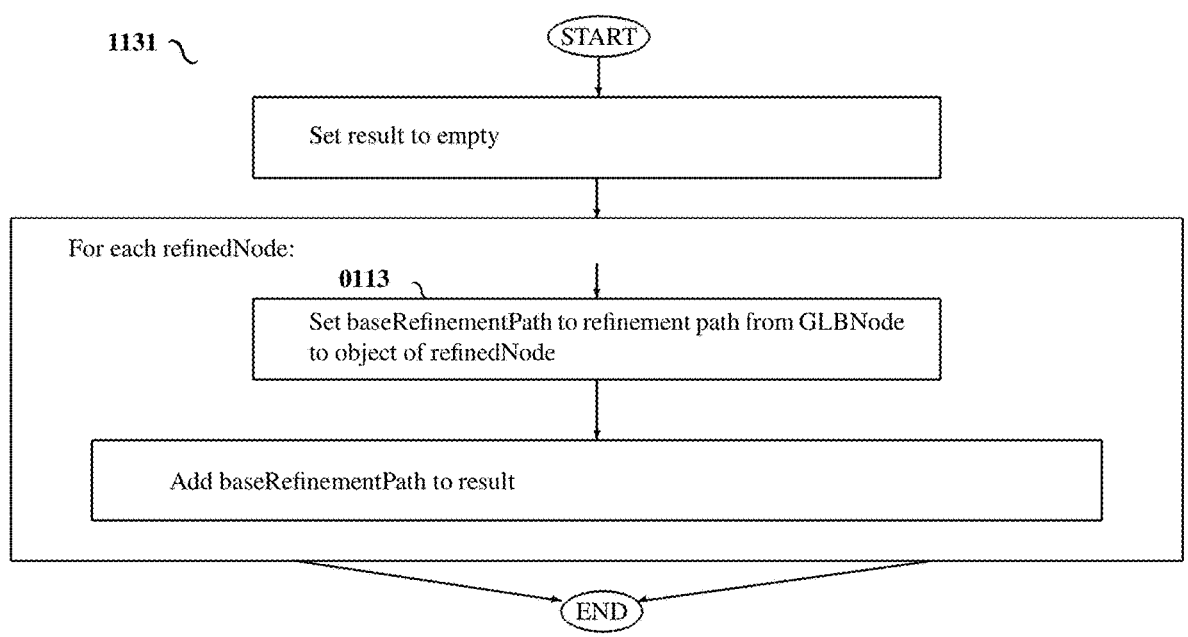

FIG. 50 is a process flow diagram of client action to generate a proof that a specializing augmentation of a DAG reduced to substructure and context trees without inheritance and with indirect objects satisfies constraints, according to some embodiments.

Figure 51:
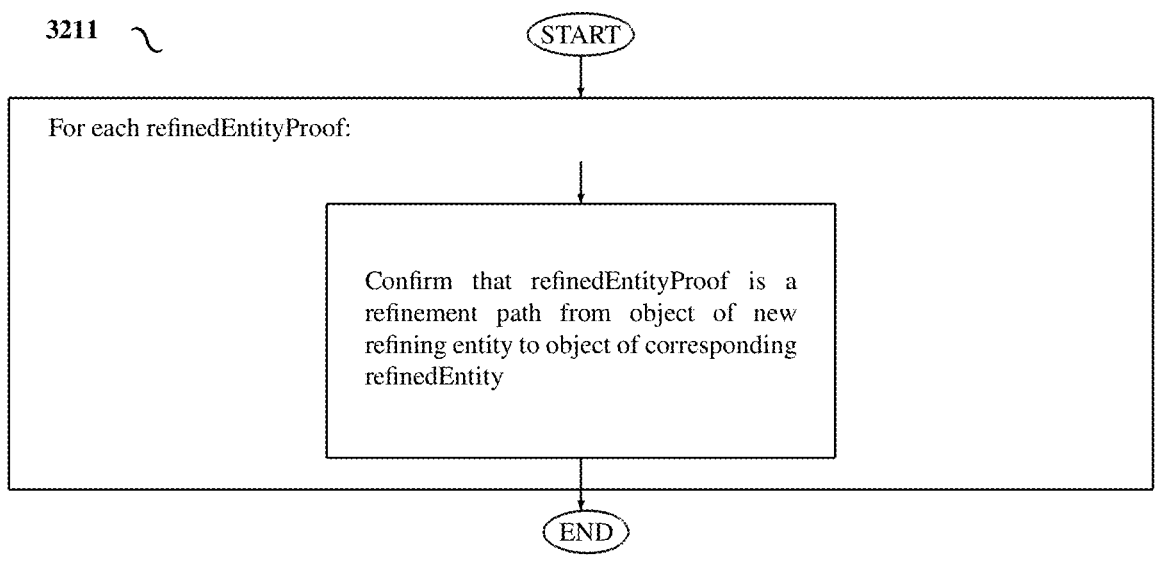

FIG. 51 is a process flow diagram of server action to validate a proof that a specializing augmentation of a DAG with indirect objects satisfies constraints, according to some embodiments.

Figure 52:
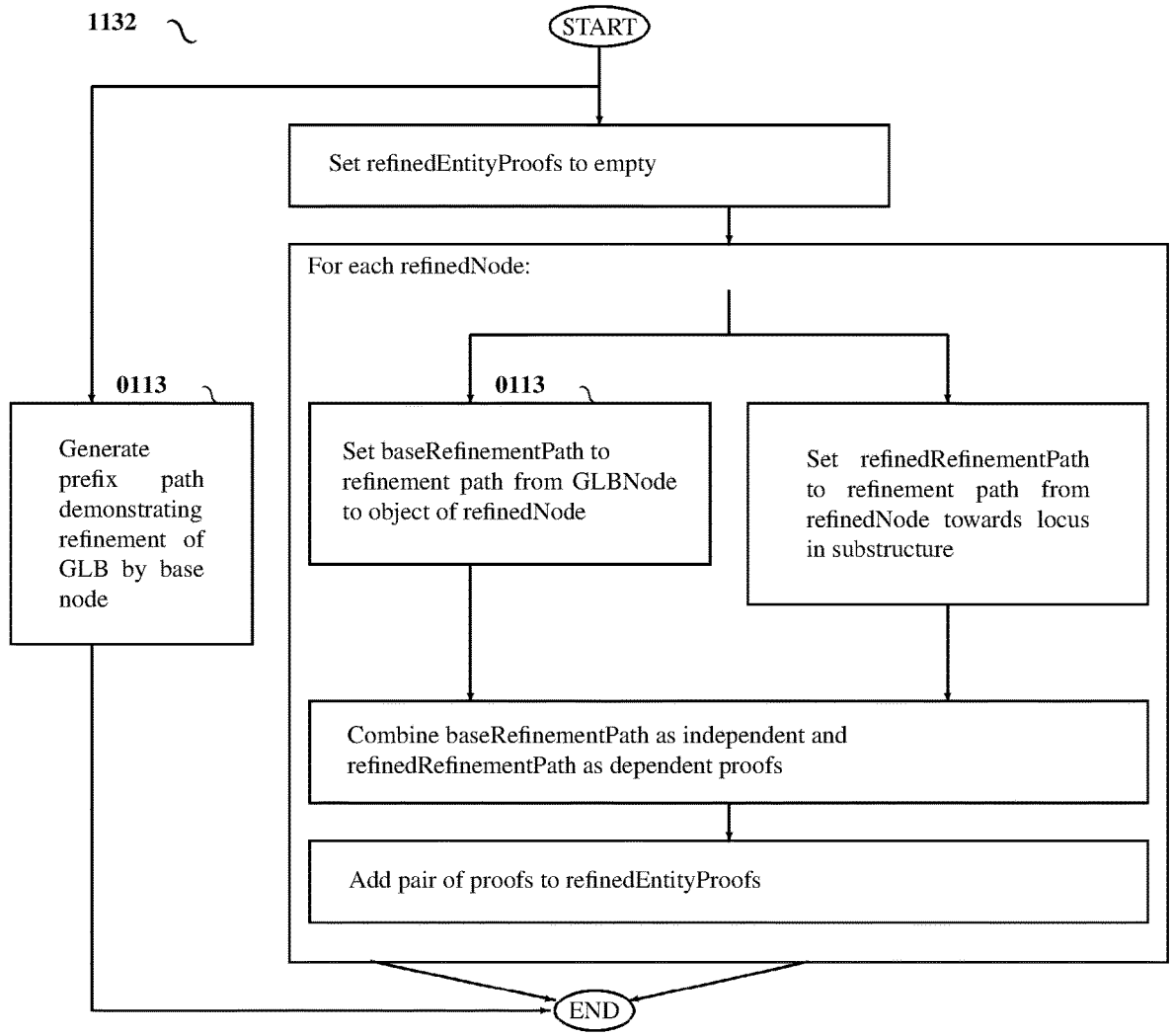

FIG. 52 is a process flow diagram of client action to generate a proof that a specializing augmentation of a DAG reduced to substructure and context trees without inheritance and with only direct objects satisfies constraints, according to some embodiments.

Figure 53:
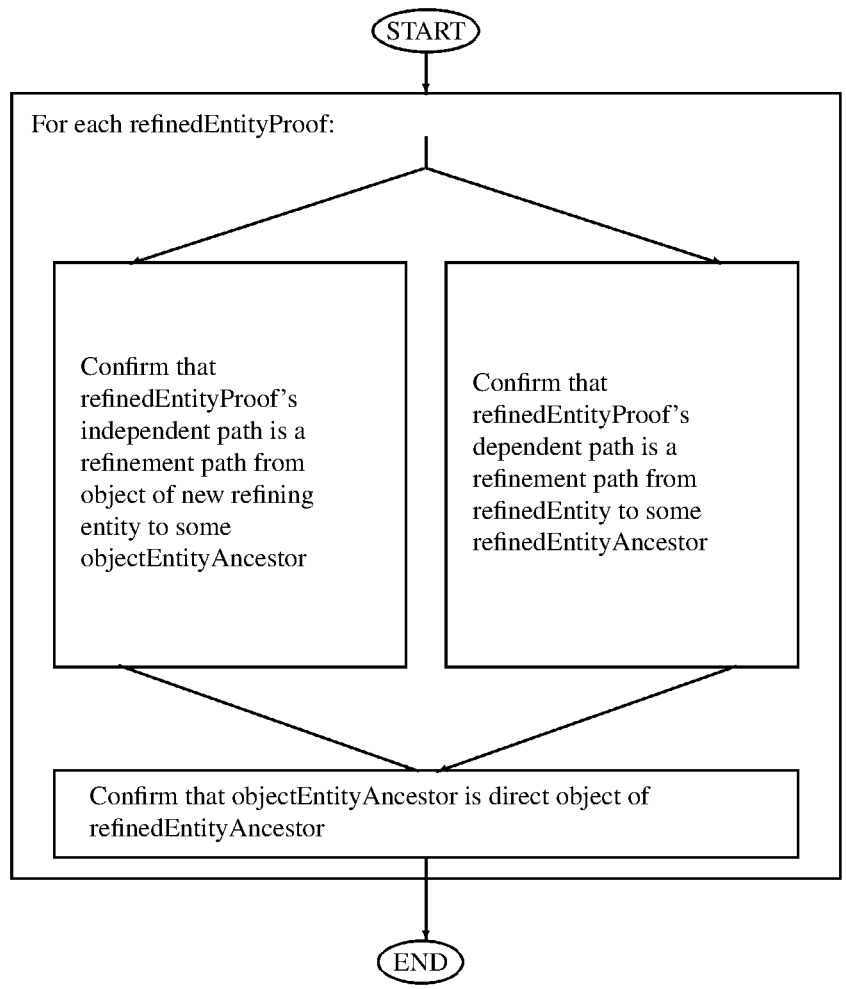

FIG. 53 is a process flow diagram of server action to validate a proof that a specializing augmentation of a DAG with only direct objects satisfies constraints, according to some embodiments.

Figure 54:
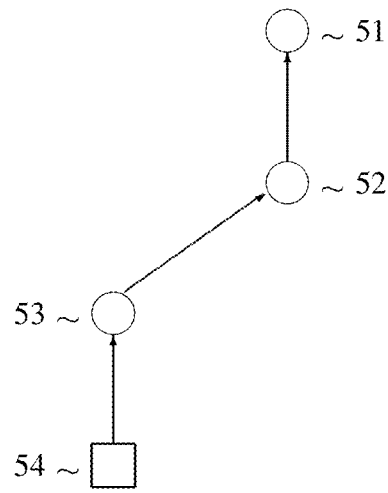

FIG. 54 is a diagram displaying an example DAG with navigation centered on node 51, according to some embodiments.

Figure 55:
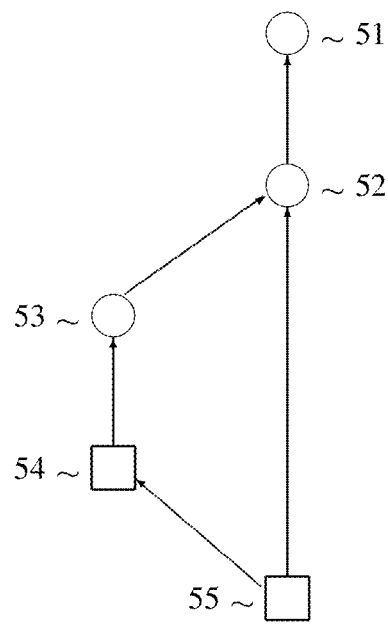

FIG. 55 is a diagram displaying the example DAG from FIG. 54 after solving problem node 52 and refining solution node 54 with new solution node 55, according to some embodiments.

Figure 56:
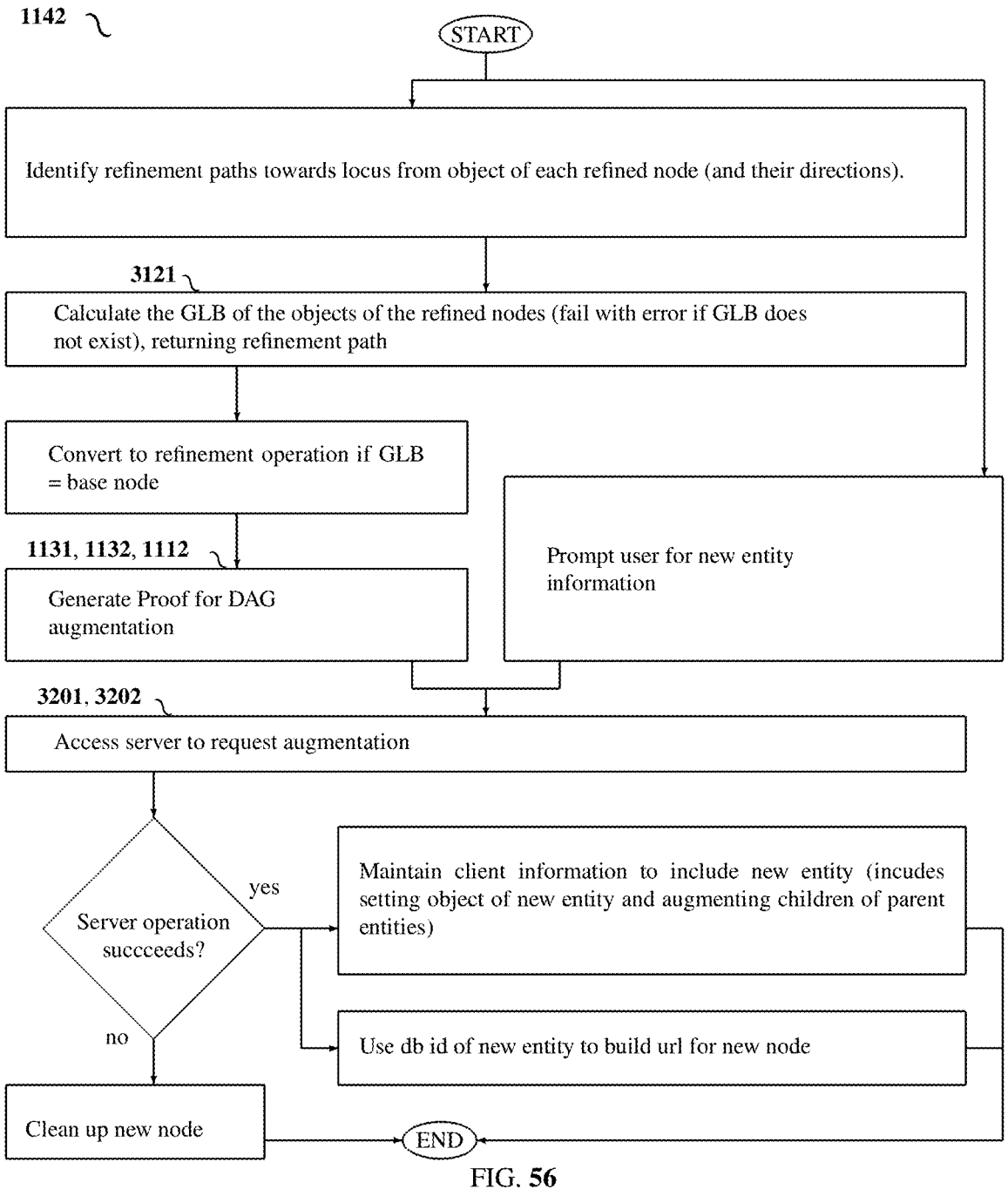

FIG. 56 is a process flow diagram of client action to perform a single cross-kind and specializing augmentation of a DAG without inheritance, according to some embodiments.

Figure 57:
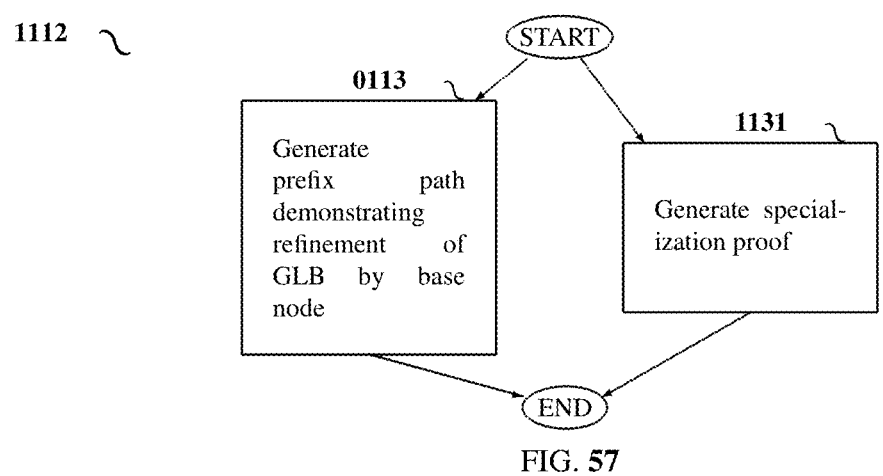

FIG. 57 is a process flow diagram of client action to generate a proof that a cross-kind and specializing augmentation of a DAG reduced to substructure and context trees without inheritance and with only direct objects satisfies constraints, according to some embodiments.

Figure 58:
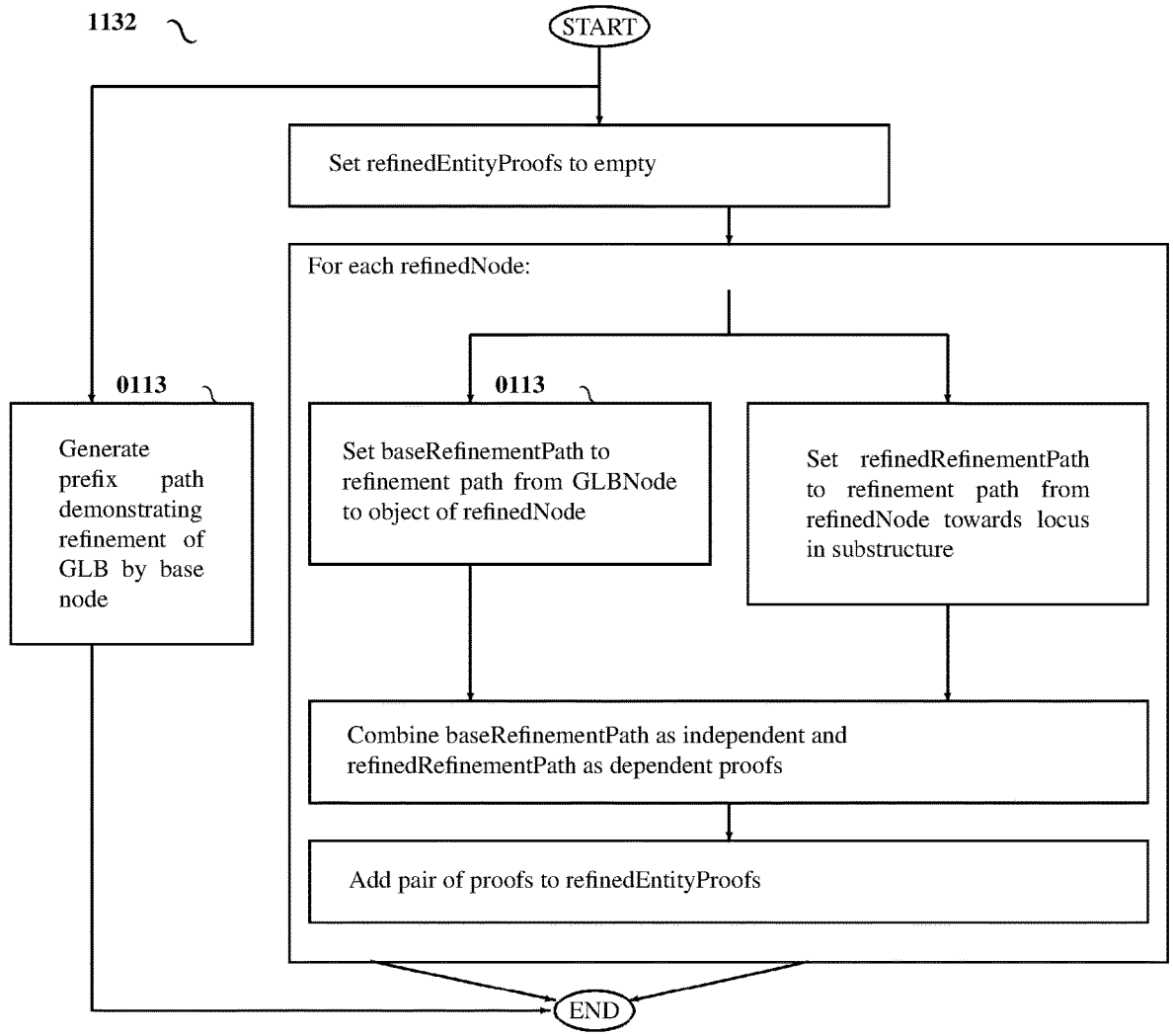

FIG. 58 is a process flow diagram of client action to generate a proof that a cross-kind and specializing augmentation of a DAG reduced to substructure and context trees without inheritance and with indirect objects satisfies constraints, according to some embodiments.

Figure 59:
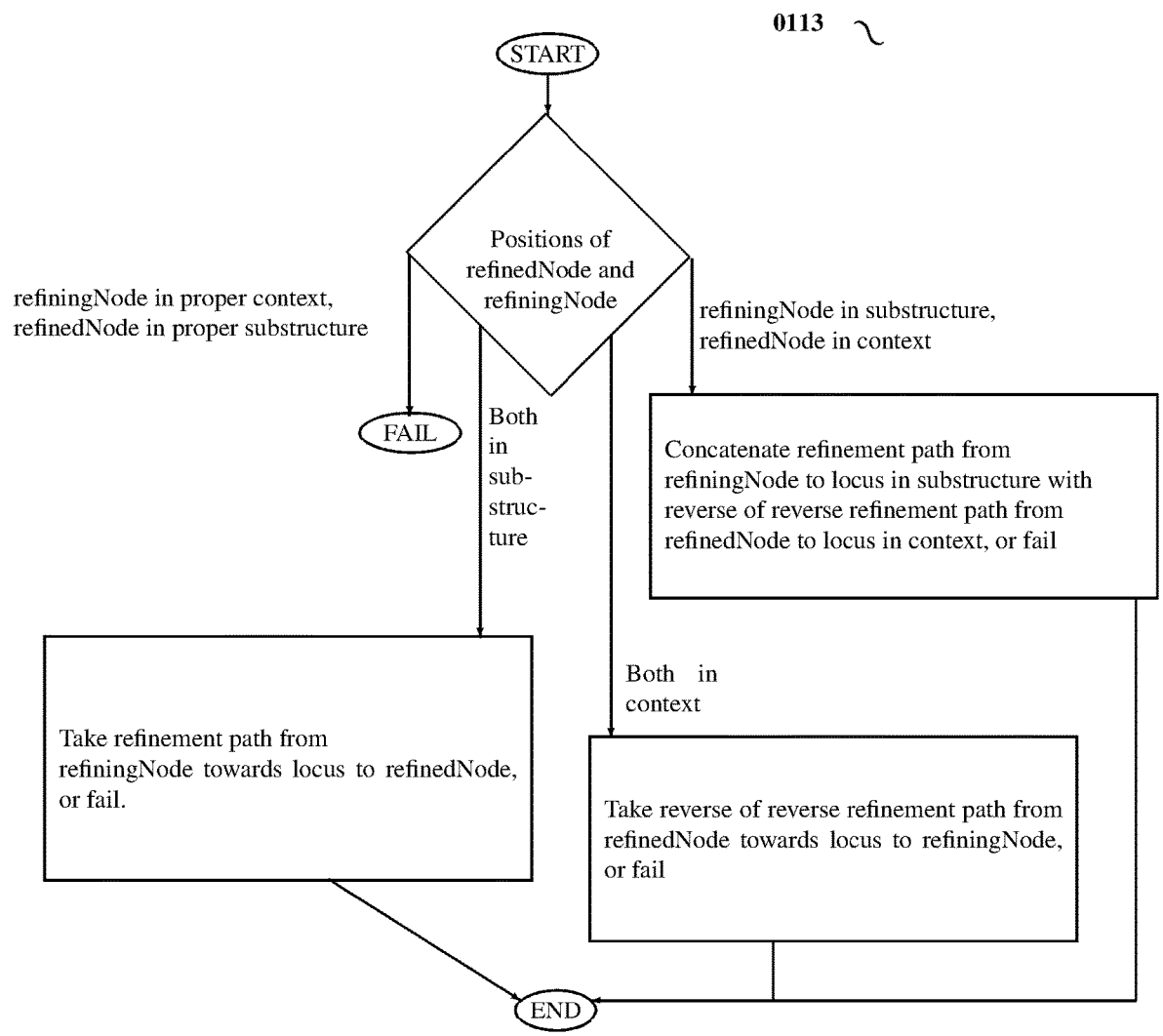

FIG. 59 is a process flow diagram of client action to generate a portion of a proof that an augmentation of a DAG reduced to substructure and context trees satisfies constraints, according to some embodiments.

Figure 60:
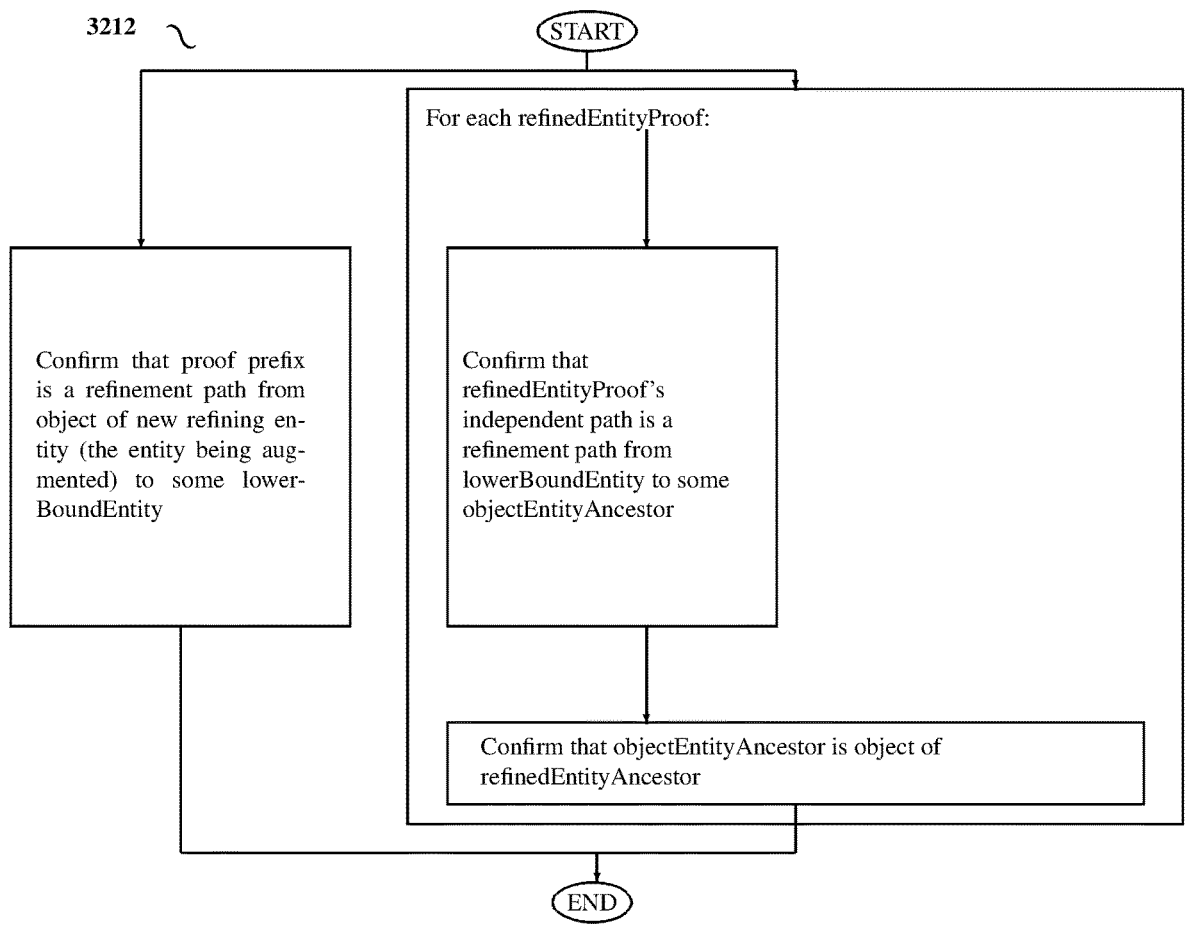

FIG. 60 is a process flow diagram of server action to validate a proof that a cross-kind and specializing augmentation of a DAG with indirect objects satisfies constraints, according to some embodiments.

Figure 61:
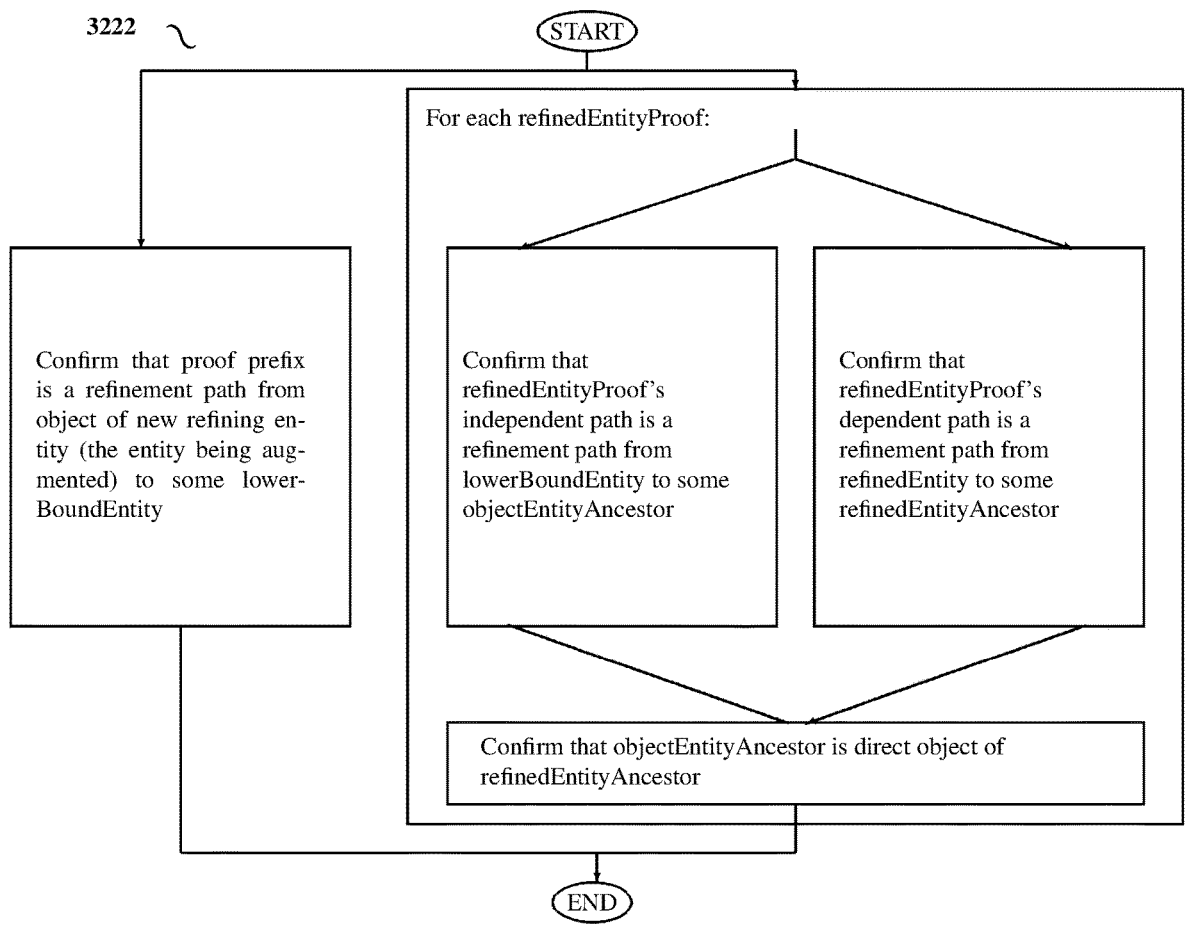

FIG. 61 is a process flow diagram of server action to validate a proof that a cross-kind and specializing augmentation of a DAG with only direct objects satisfies constraints, according to some embodiments.

Figure 62:
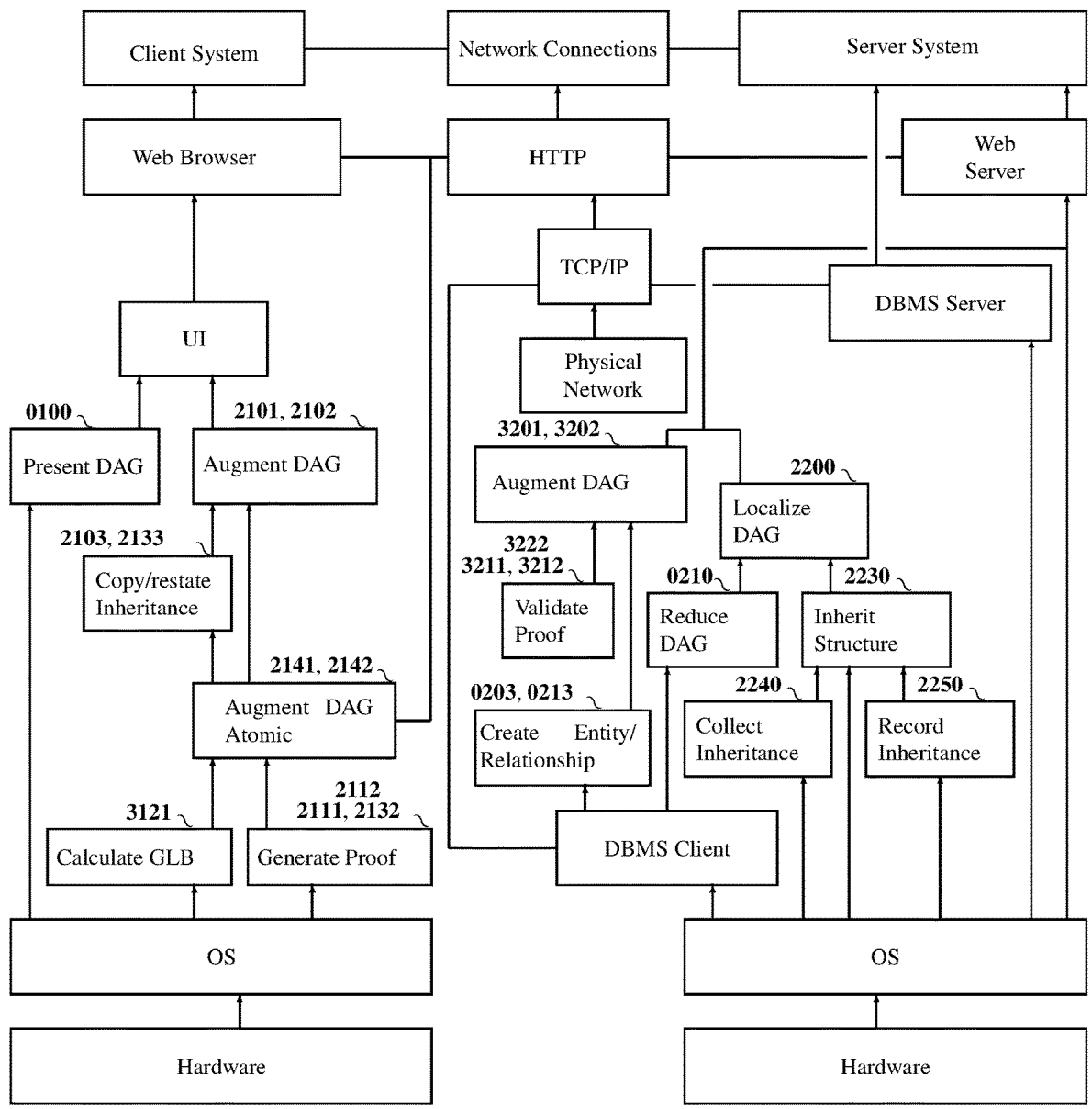

FIG. 62 is a block structure diagram of an embodiment for specialization.

Figure 63:
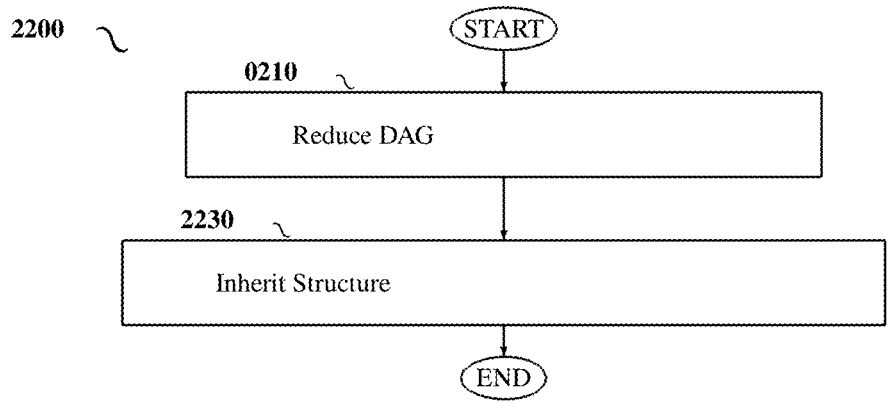

FIG. 63 is a process flow diagram of an embodiment of the DAG localization process, according to some embodiments.

Figure 64:
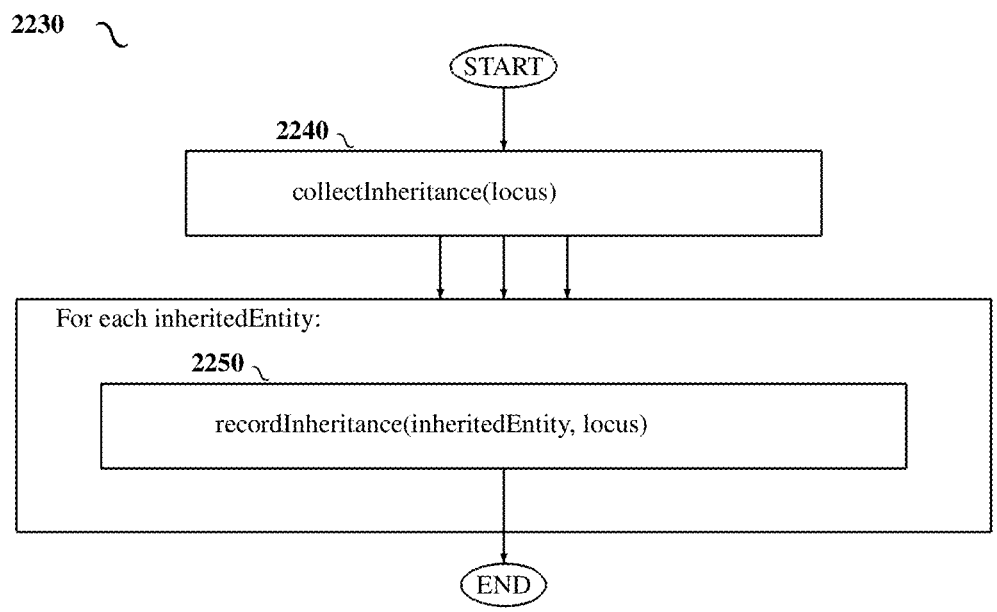

FIG. 64 is a process flow diagram of an embodiment of the inheritance process, according to some embodiments.

Figure 65:
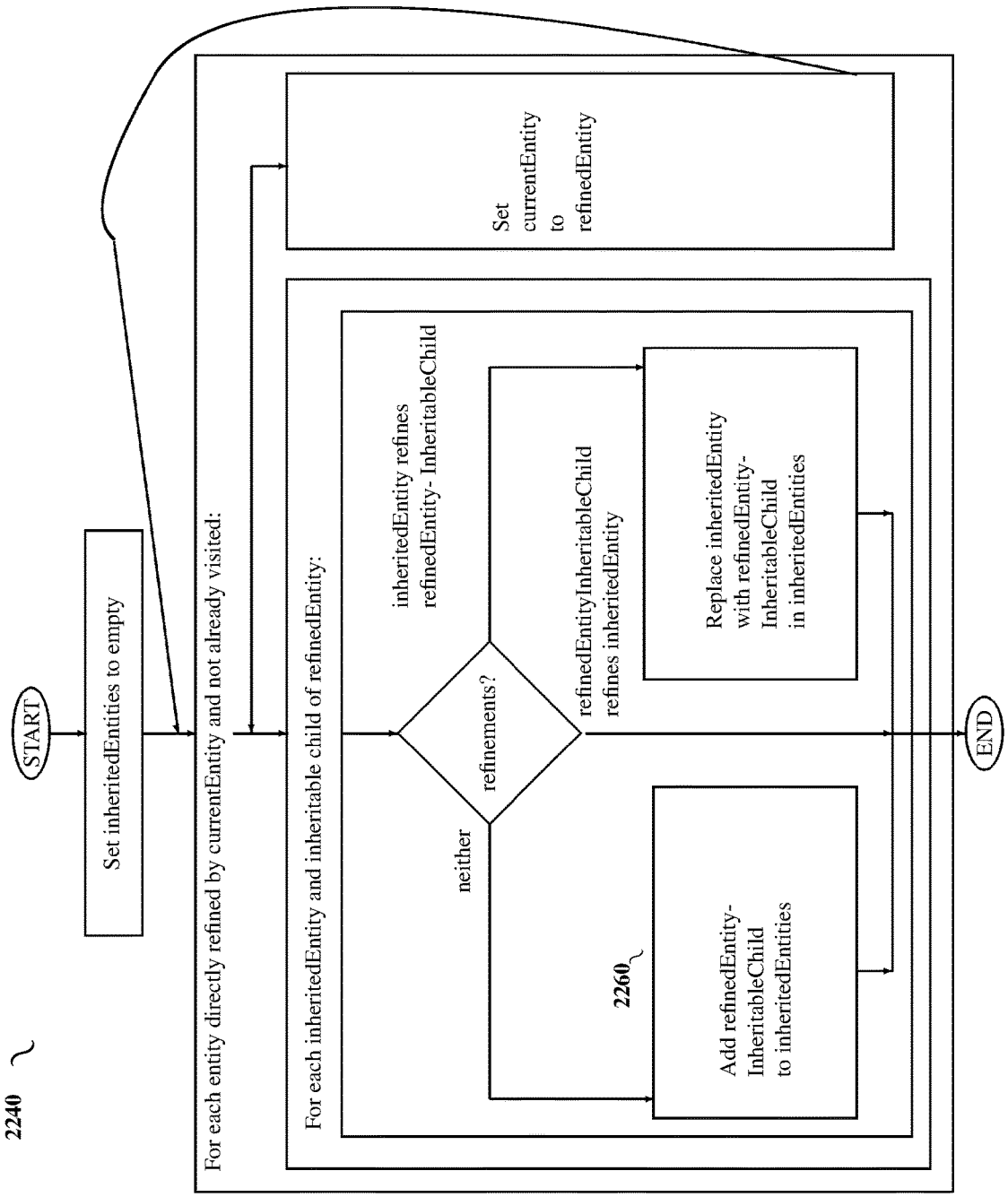

FIG. 65 is a process flow diagram of an indeterminate embodiment of the component of the inheritance process that collects structure to be inherited, according to some embodiments.

Figure 66:
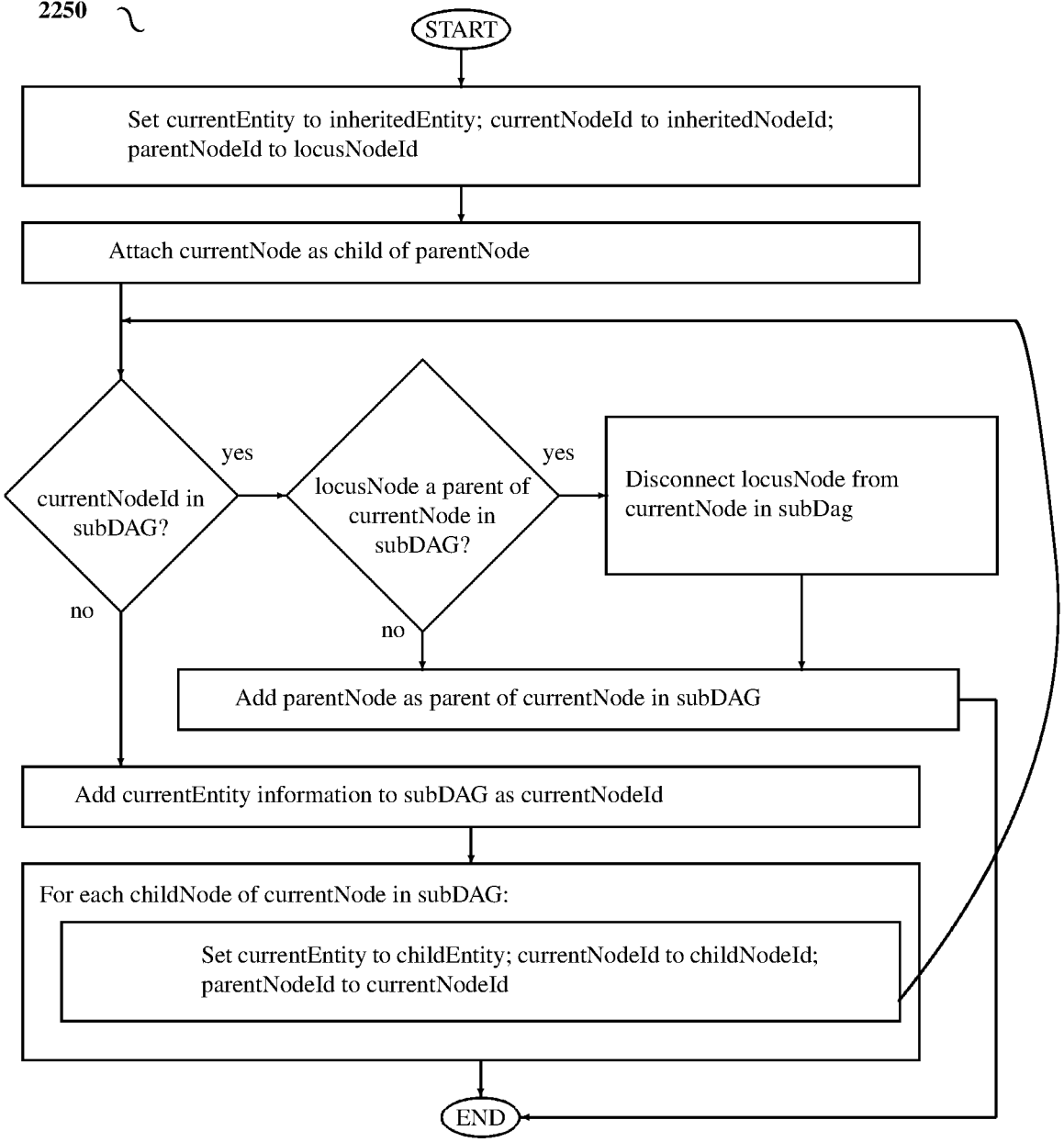

FIG. 66 is a process flow diagram of the component of an embodiment of the inheritance process that connects inherited structure to the DAG, according to some embodiments.

Figure 67:
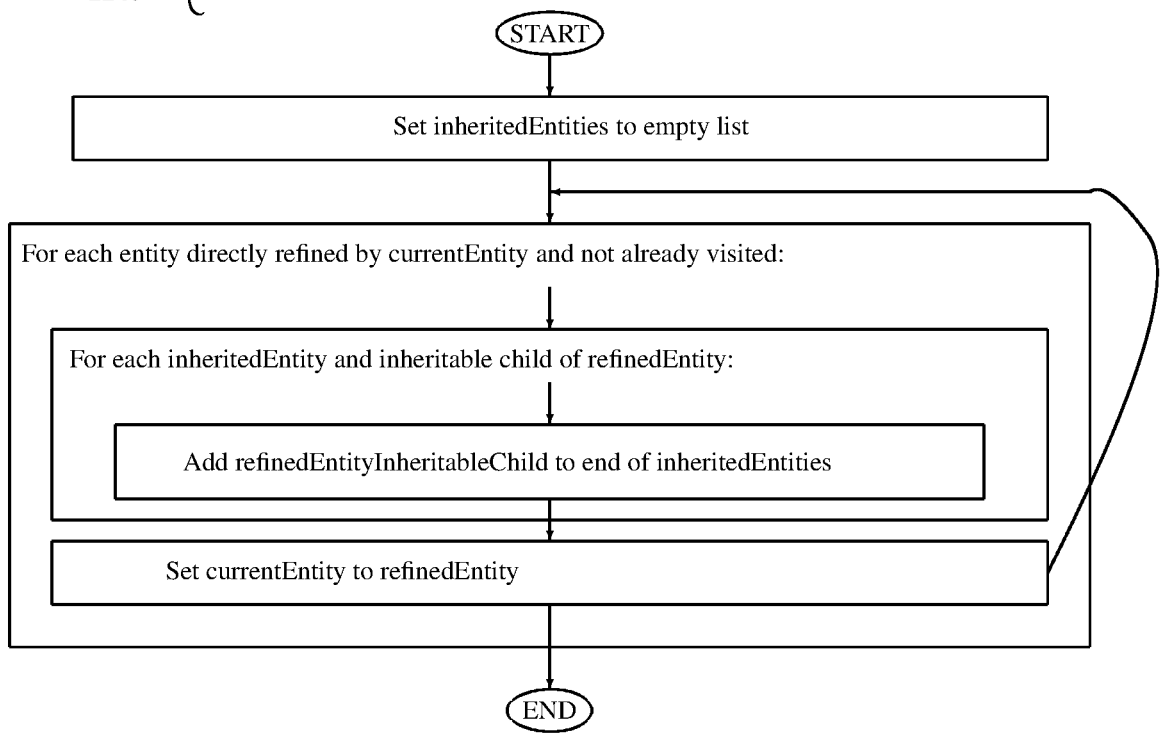

FIG. 67 is a process flow diagram of the component of a shallowest-first embodiment of the component of the inheritance process that collects structure to be inherited via preorder traversal, according to some embodiments.

Figure 68:
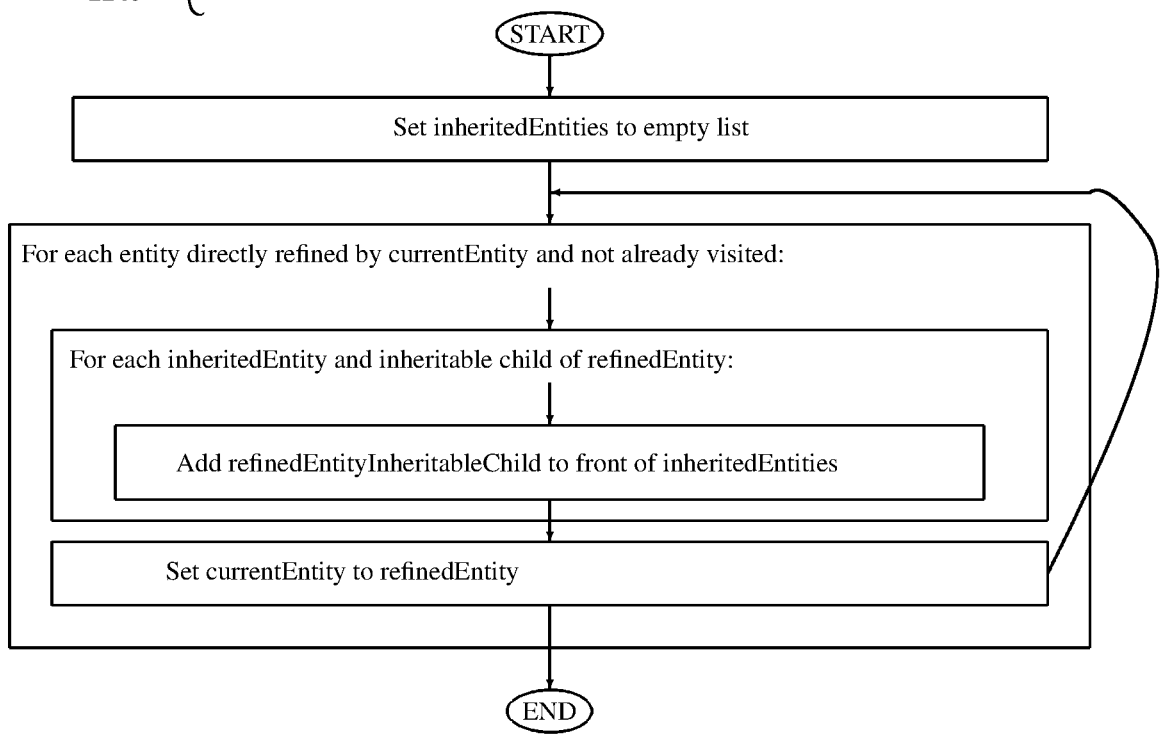

FIG. 68 is a process flow diagram of the component of a deepest-first embodiment of the component of the inheritance process that collects structure to be inherited via preorder traversal, according to some embodiments.

Figure 69:
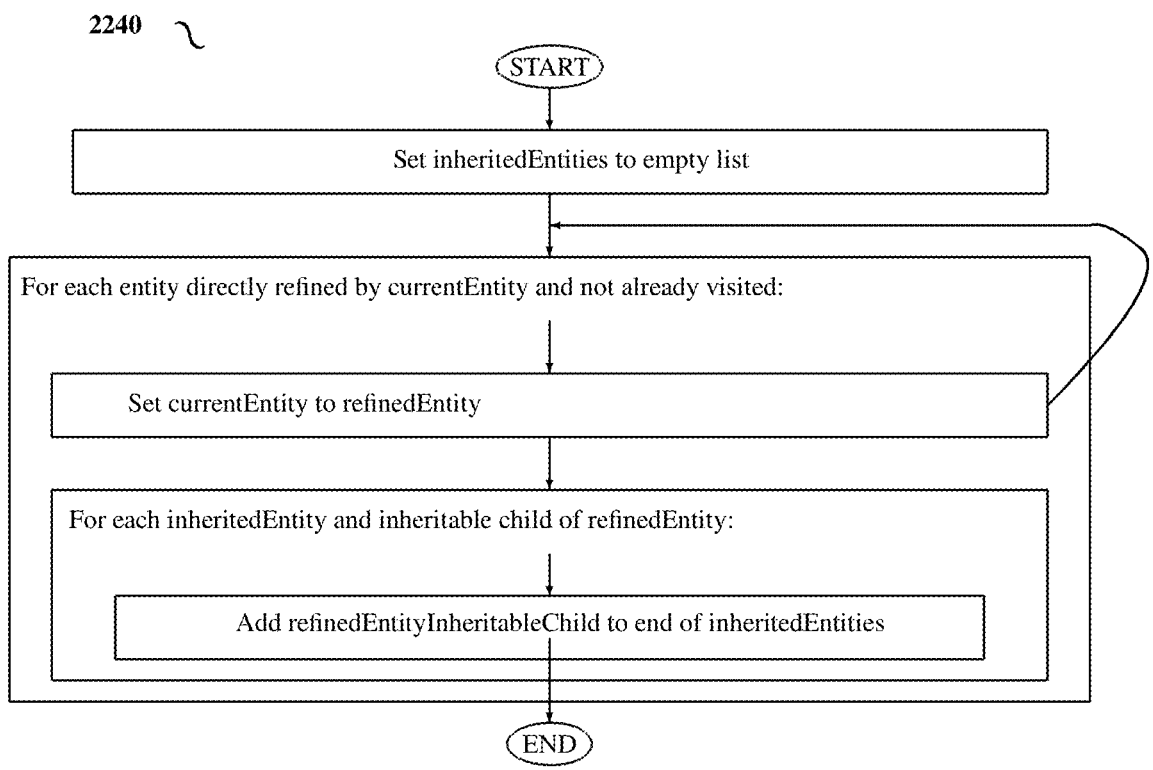

FIG. 69 is a process flow diagram of the component of an alternative deepest-first embodiment of the component of the inheritance process that collects structure to be inherited via postorder traversal, according to some embodiments.

Figure 70:
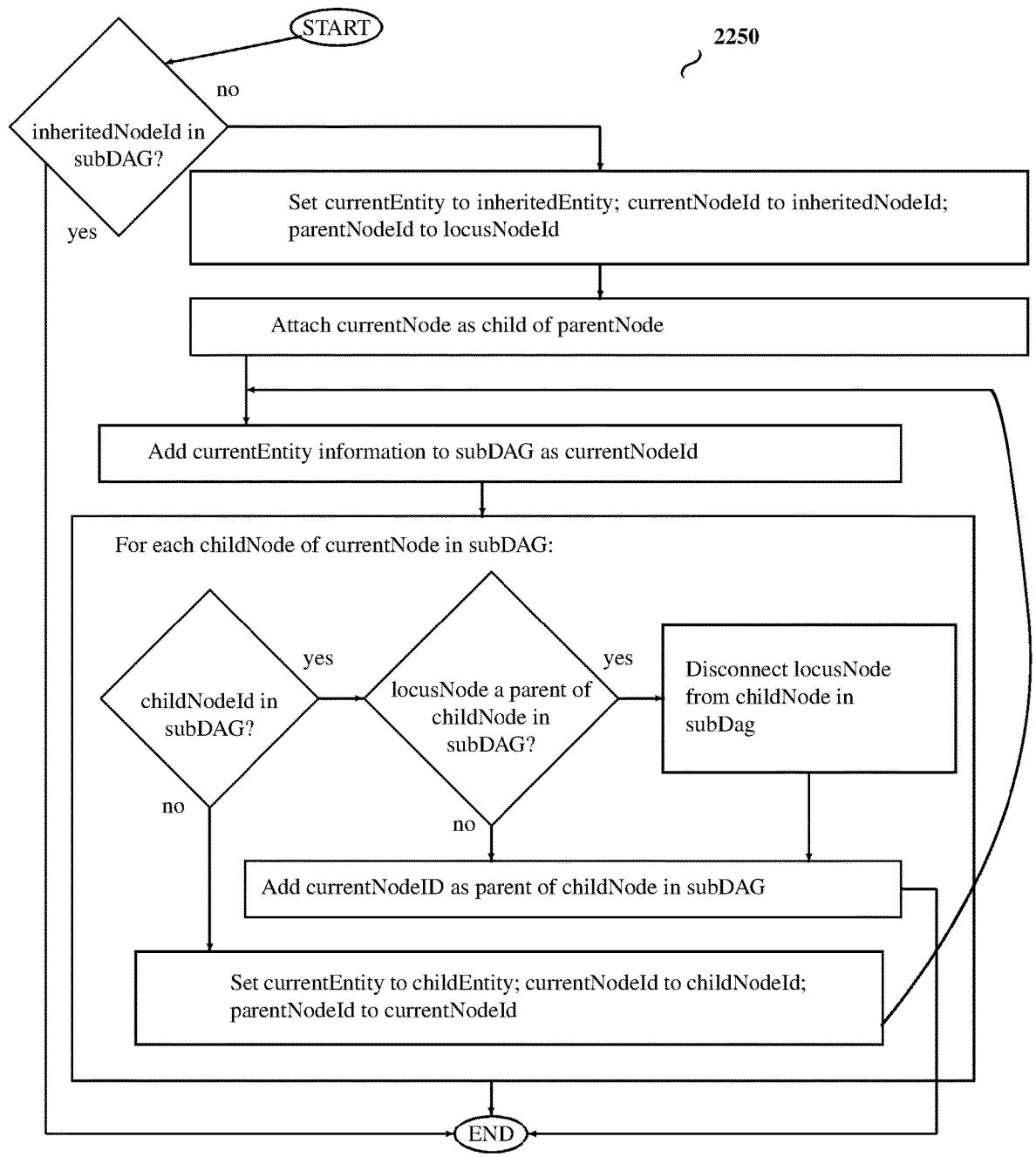

FIG. 70 is a process flow diagram of the component of a deepest-first embodiment of the inheritance process that connects inherited structure to the DAG, according to some embodiments.

Figure 71:
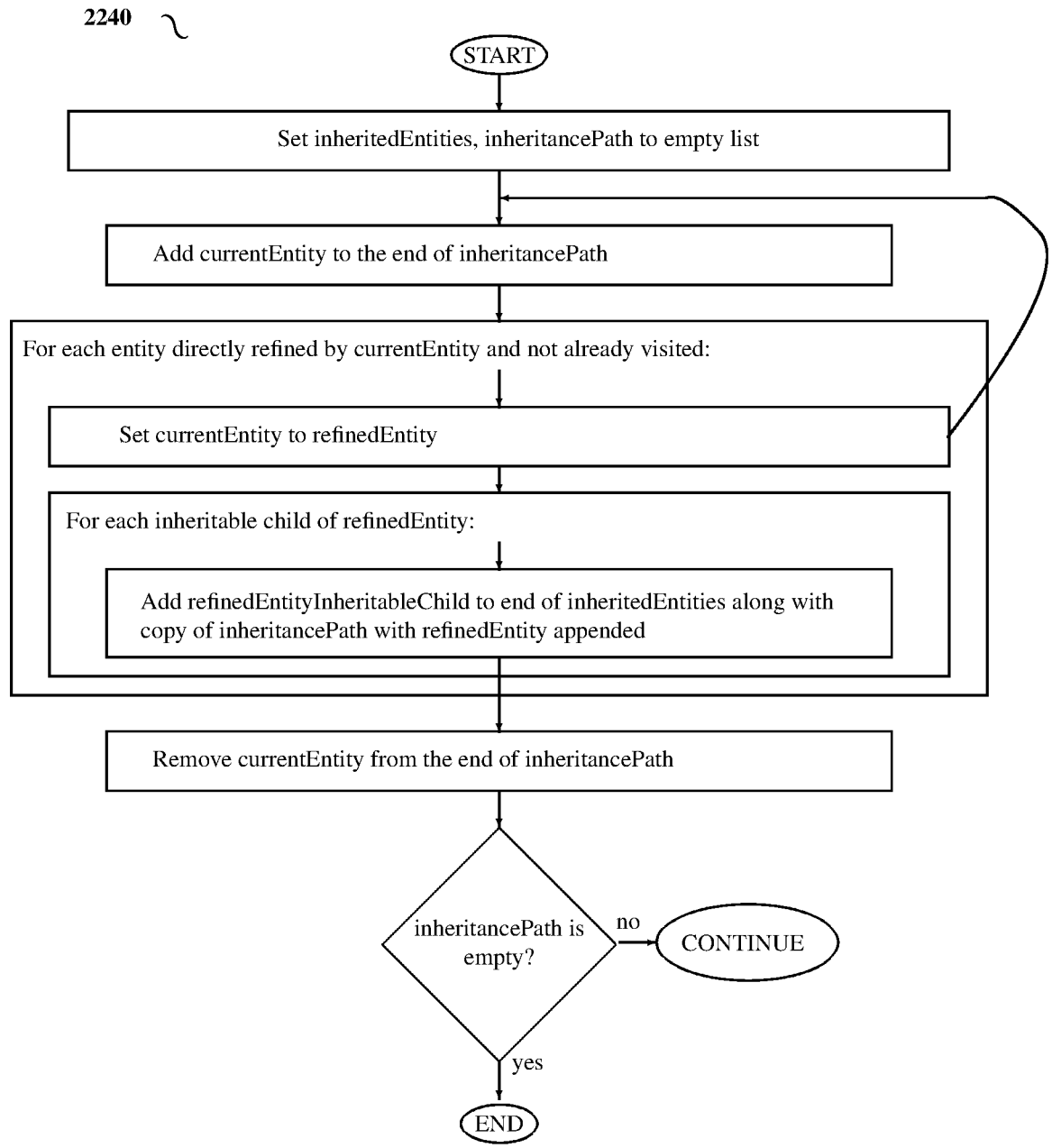

FIG. 71 is a process flow diagram of the component of a deepest-first embodiment of the component of the inheritance process that collects structure to be inherited and the path by which it is inherited, according to some embodiments.

Figure 72:
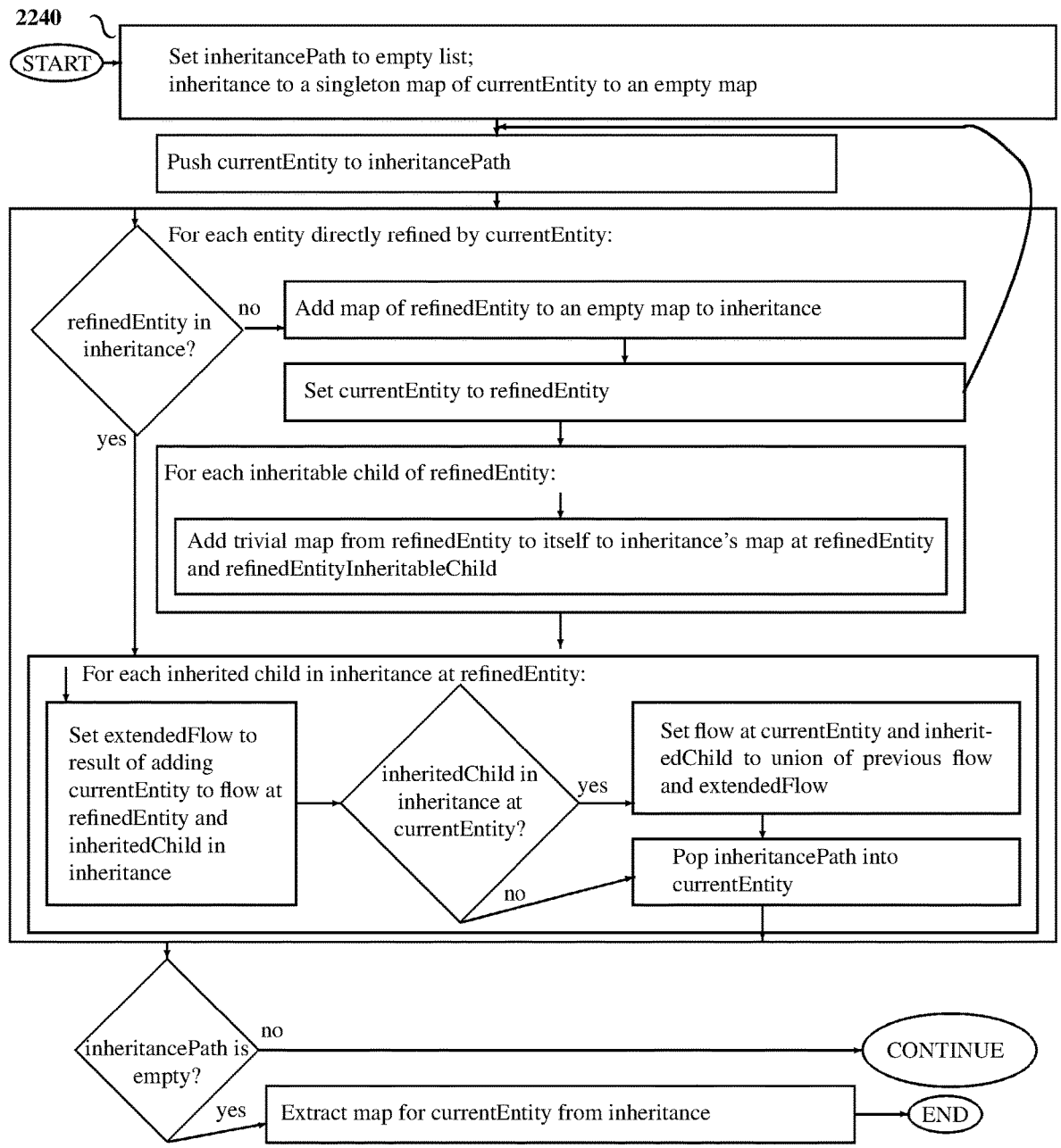

FIG. 72 is a process flow diagram of the component of a deepest-first embodiment of the component of the inheritance process that collects structure to be inherited and the flow (DAG) by which it is inherited, according to some embodiments.

Figure 73:
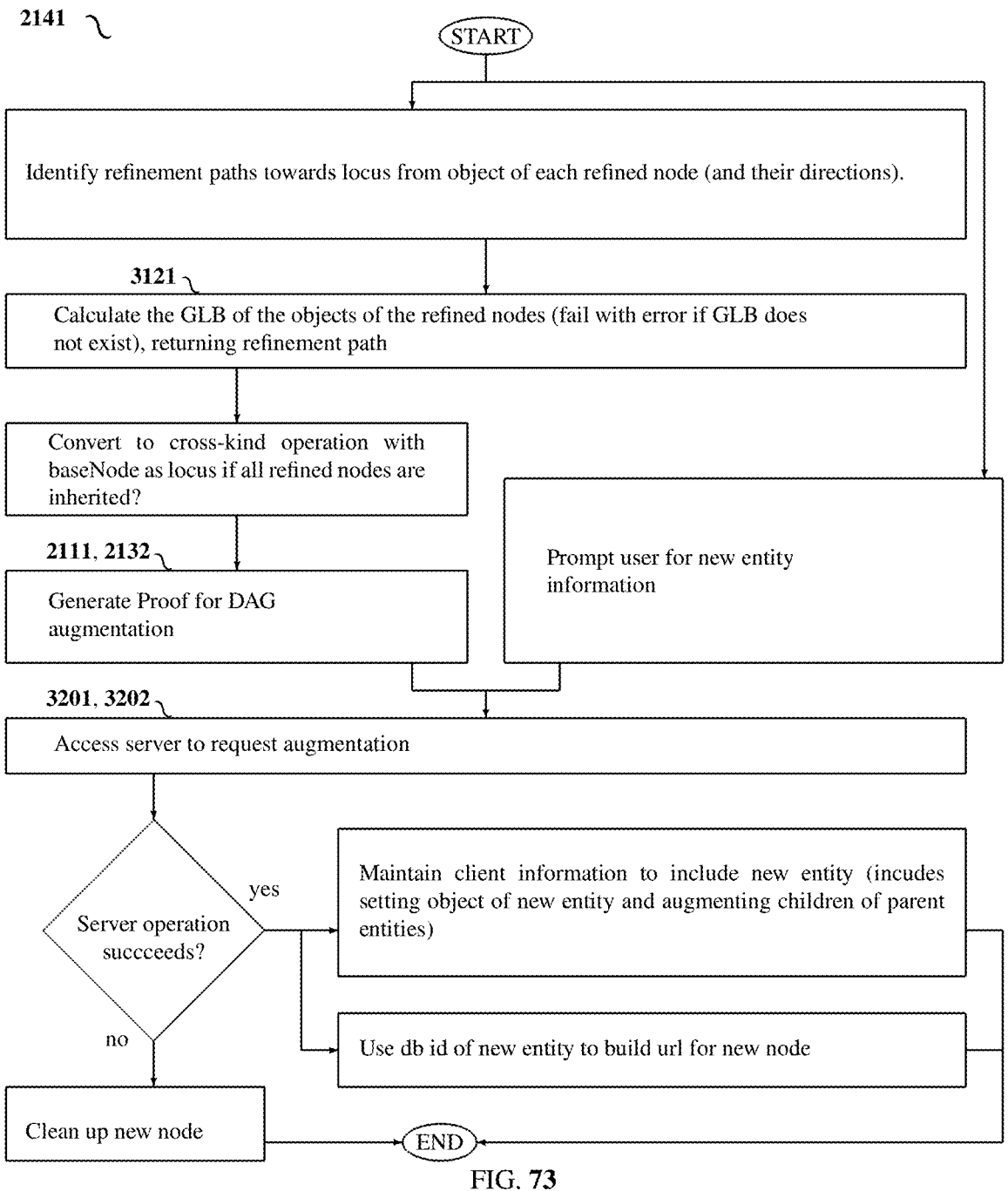

FIG. 73 is a process flow diagram of client action to perform a single specializing augmentation of a DAG, according to some embodiments.

Figure 74:
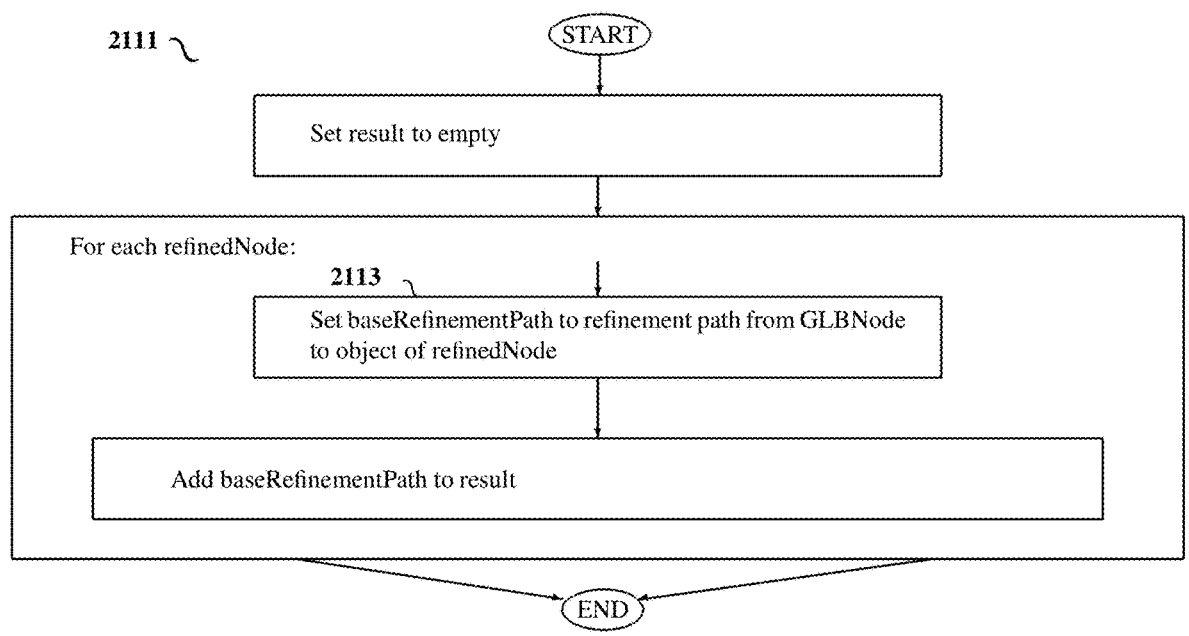

FIG. 74 is a process flow diagram of client action to generate a proof that a specializing augmentation of a DAG reduced to substructure and context trees with inheritance and with indirect objects satisfies constraints, according to some embodiments.

Figure 75:
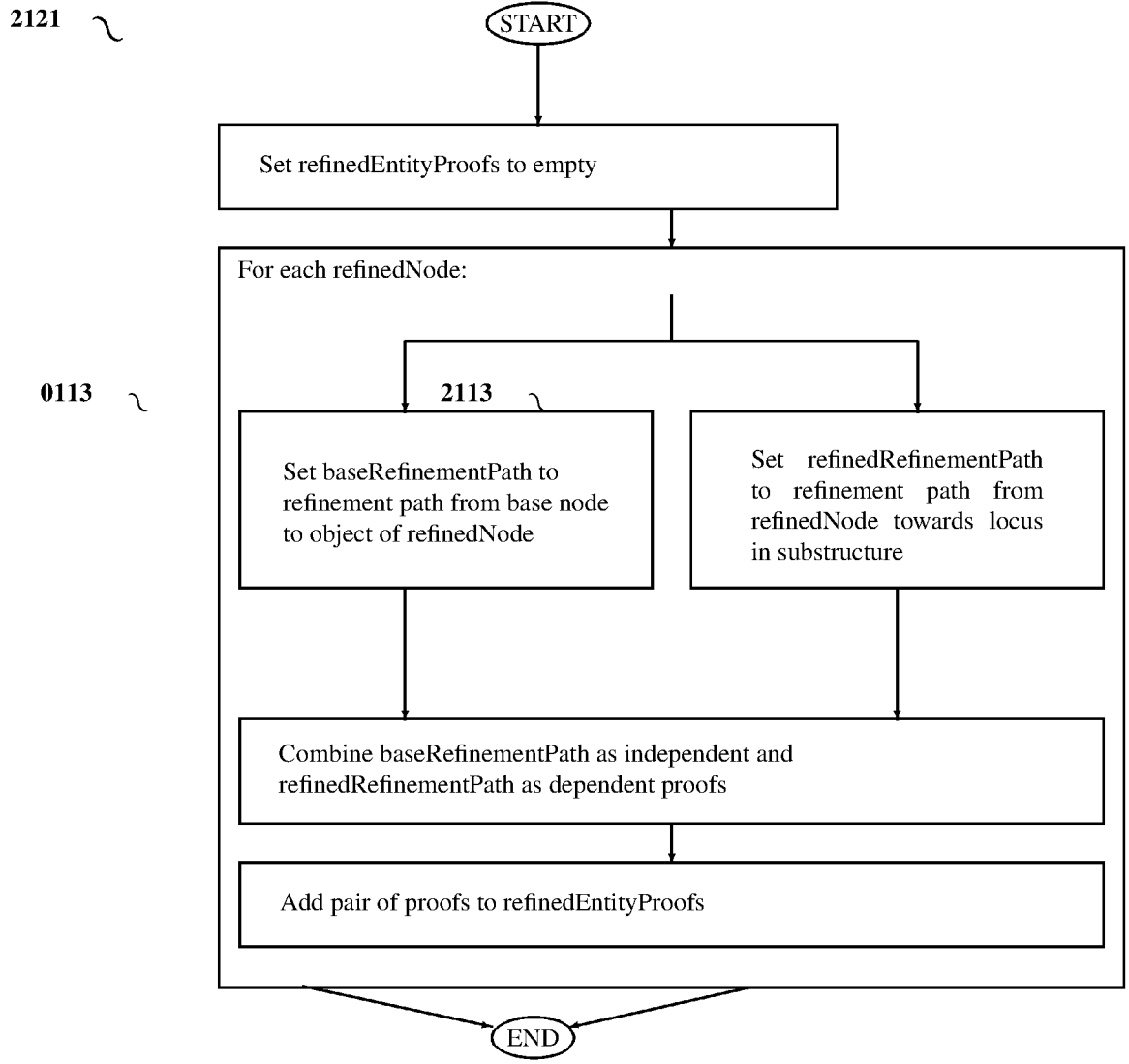

FIG. 75 is a process flow diagram of client action to generate a proof that a specializing augmentation of a DAG reduced to substructure and context trees with inheritance and with only direct objects satisfies constraints, according to some embodiments.

Figure 76:
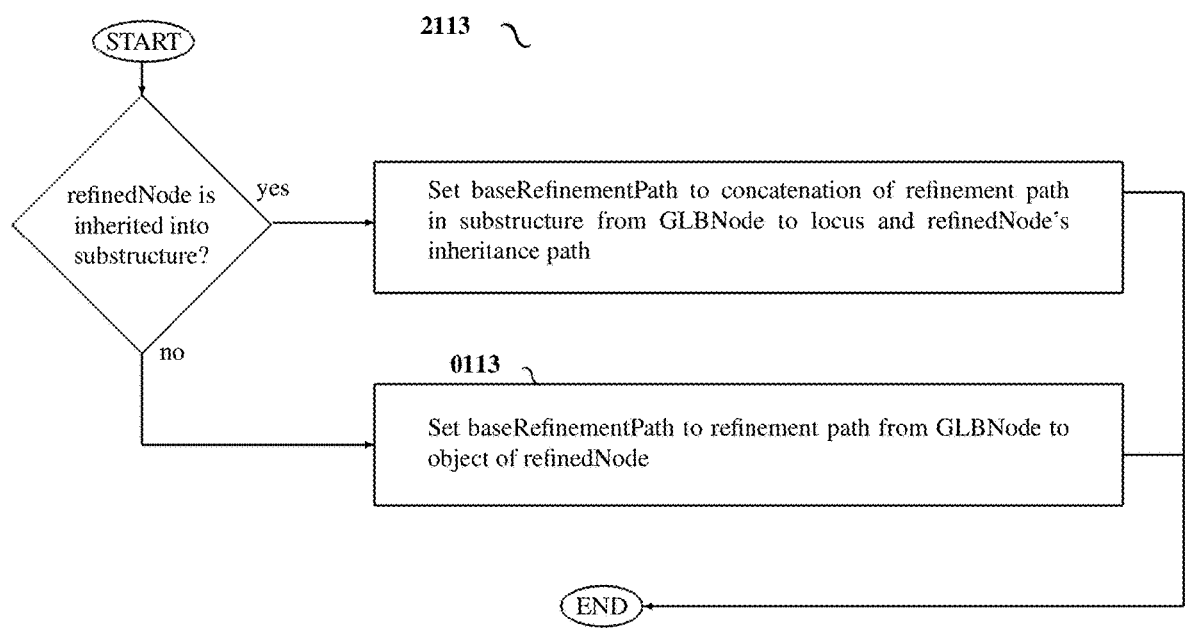

FIG. 76 is a process flow diagram of client action to generate an independent node path of a proof that a specializing augmentation of a DAG reduced to substructure and context trees with inheritance satisfies constraints, according to some embodiments.

Figure 77:
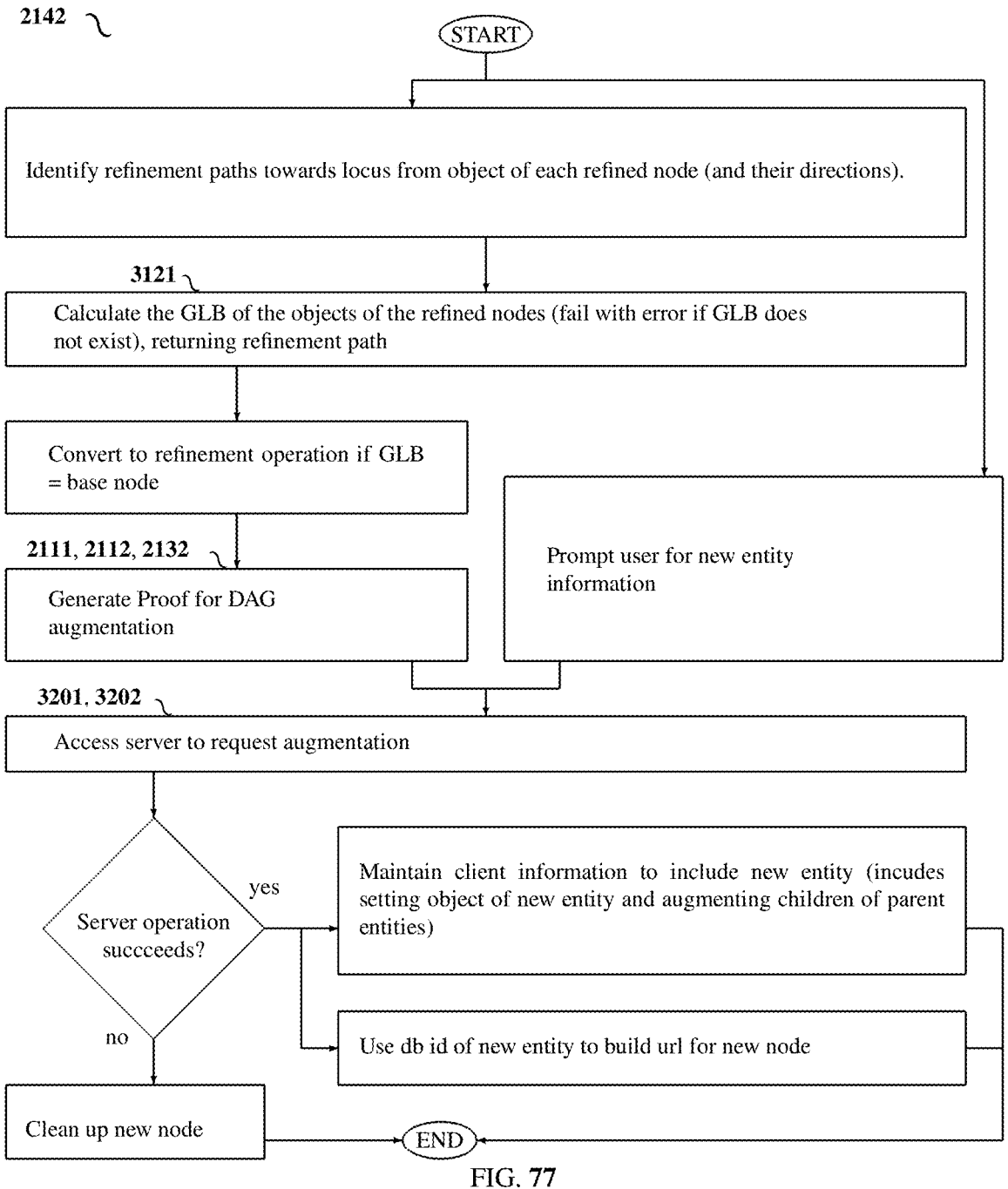

FIG. 77 is a process flow diagram of client action to perform a single cross-kind and specializing augmentation of a DAG, according to some embodiments.

Figure 78:
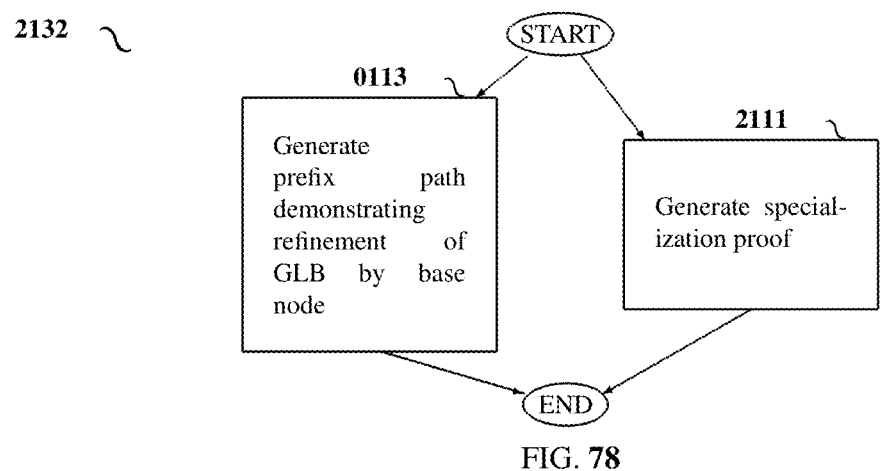

FIG. 78 is a process flow diagram of client action to generate a proof that a cross-kind and specializing augmentation of a DAG reduced to substructure and context trees with inheritance and with indirect objects satisfies constraints, according to some embodiments.

Figure 79:
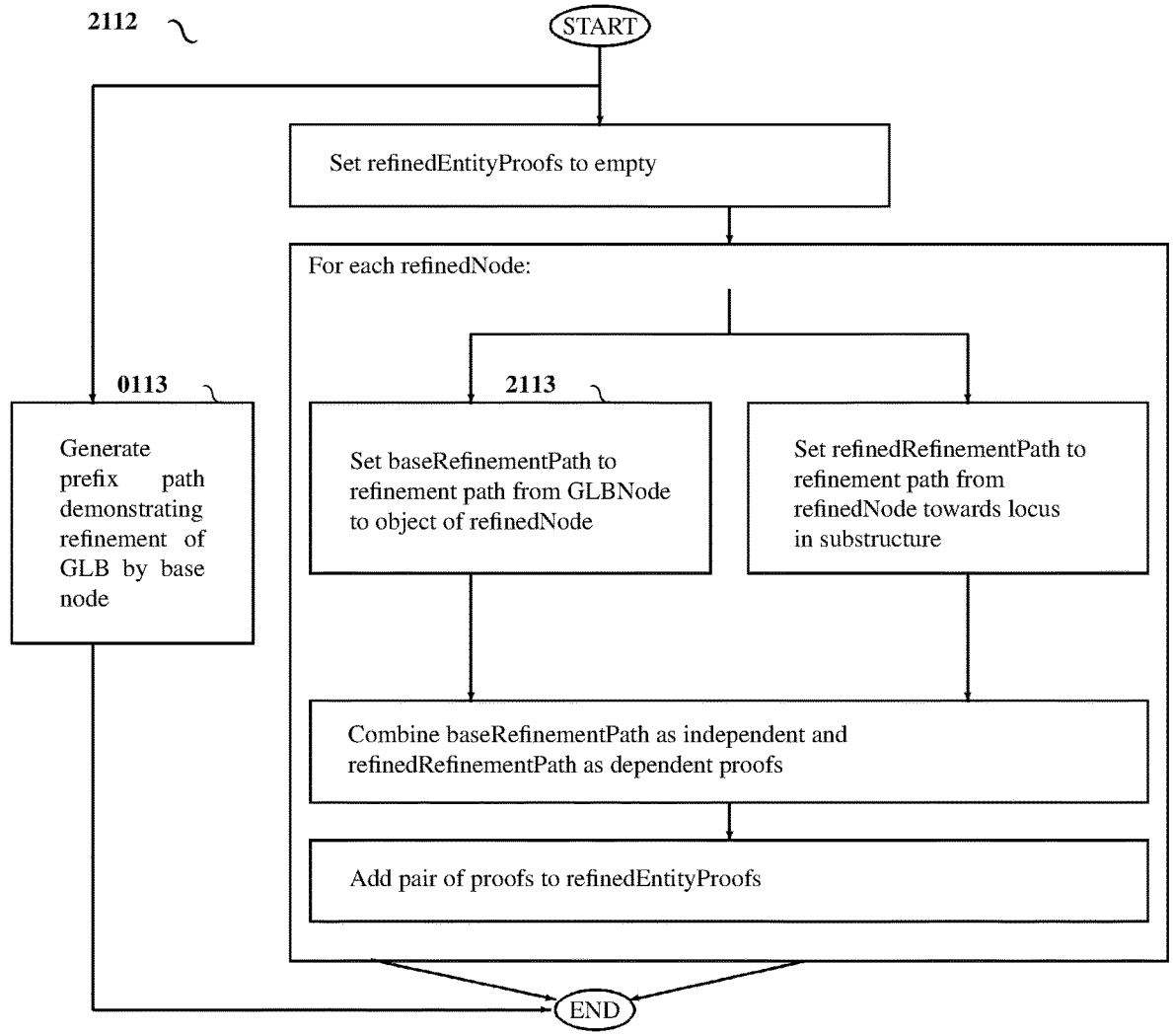

FIG. 79 is a process flow diagram of client action to generate a proof that a cross-kind and specializing augmentation of a DAG reduced to substructure and context trees with inheritance and with only direct objects satisfies constraints, according to some embodiments.

Figure 80:
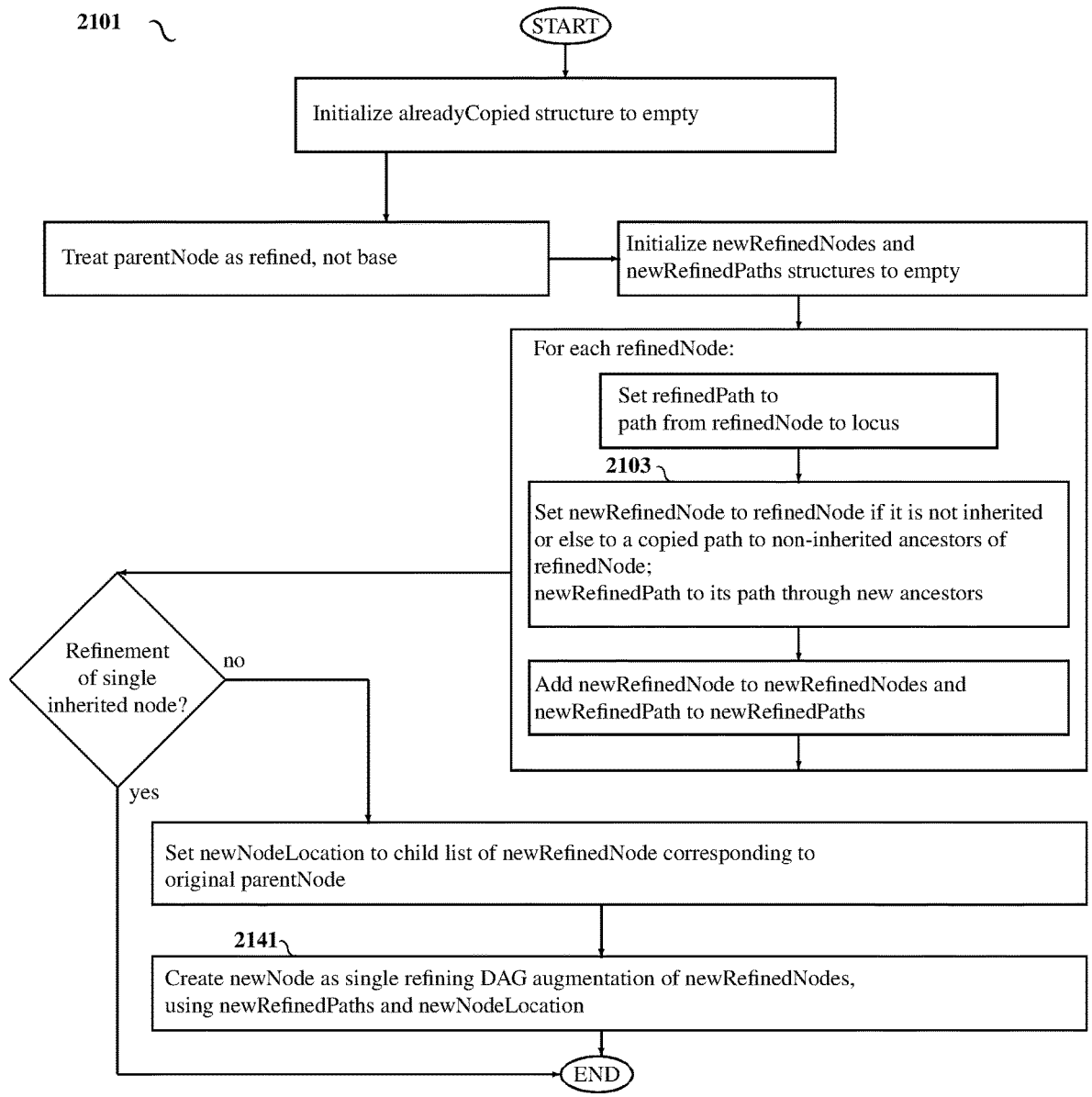

FIG. 80 is a process flow diagram of client action to perform specializing augmentation of a DAG, according to some embodiments.

Figure 81:
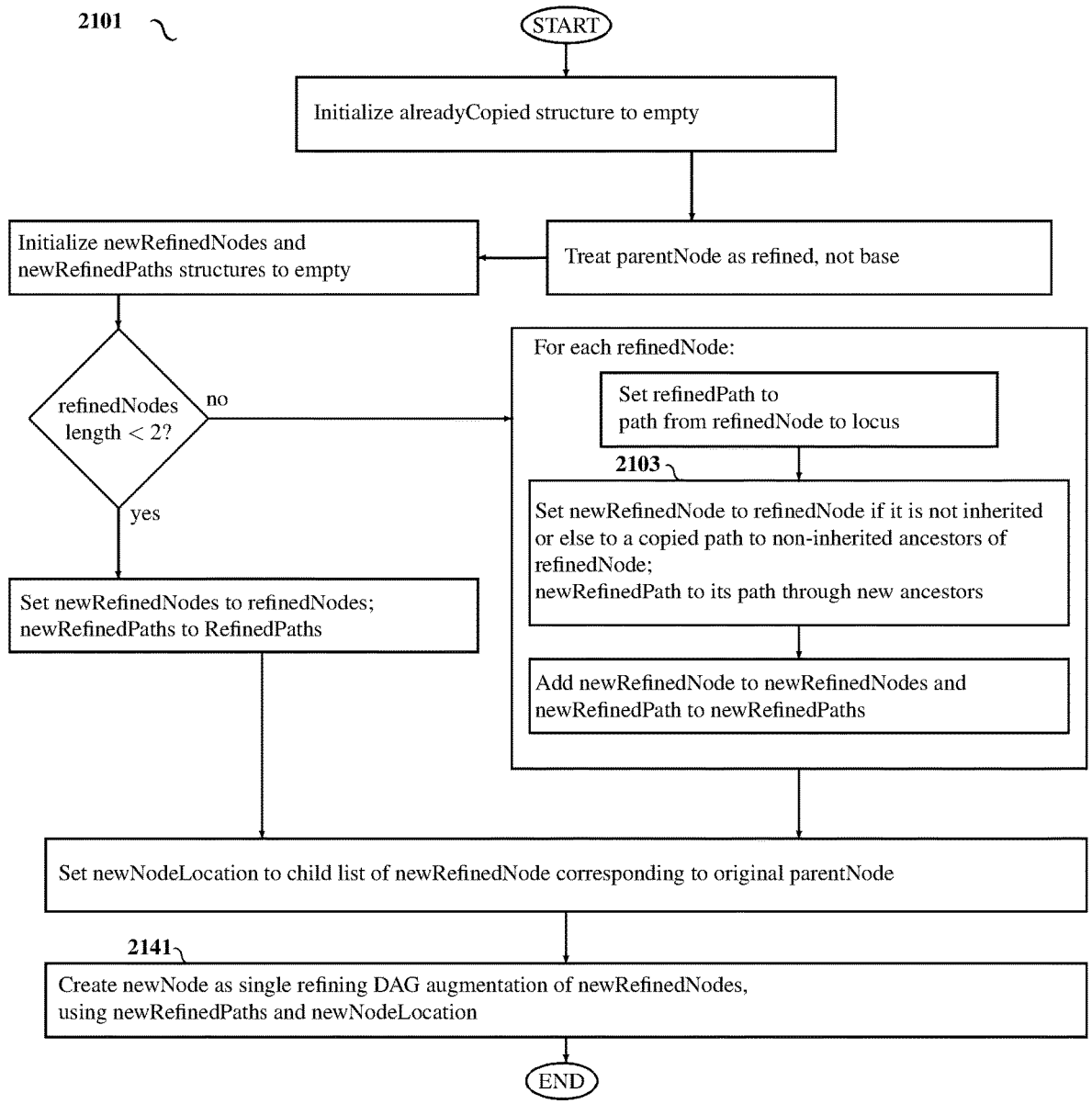

FIG. 81 is a process flow diagram of an alternative version of client action to perform specializing augmentation of a DAG that treats refinement of a single inherited node as part of the process of copying refined ancestors, according to some embodiments.

Figure 82:
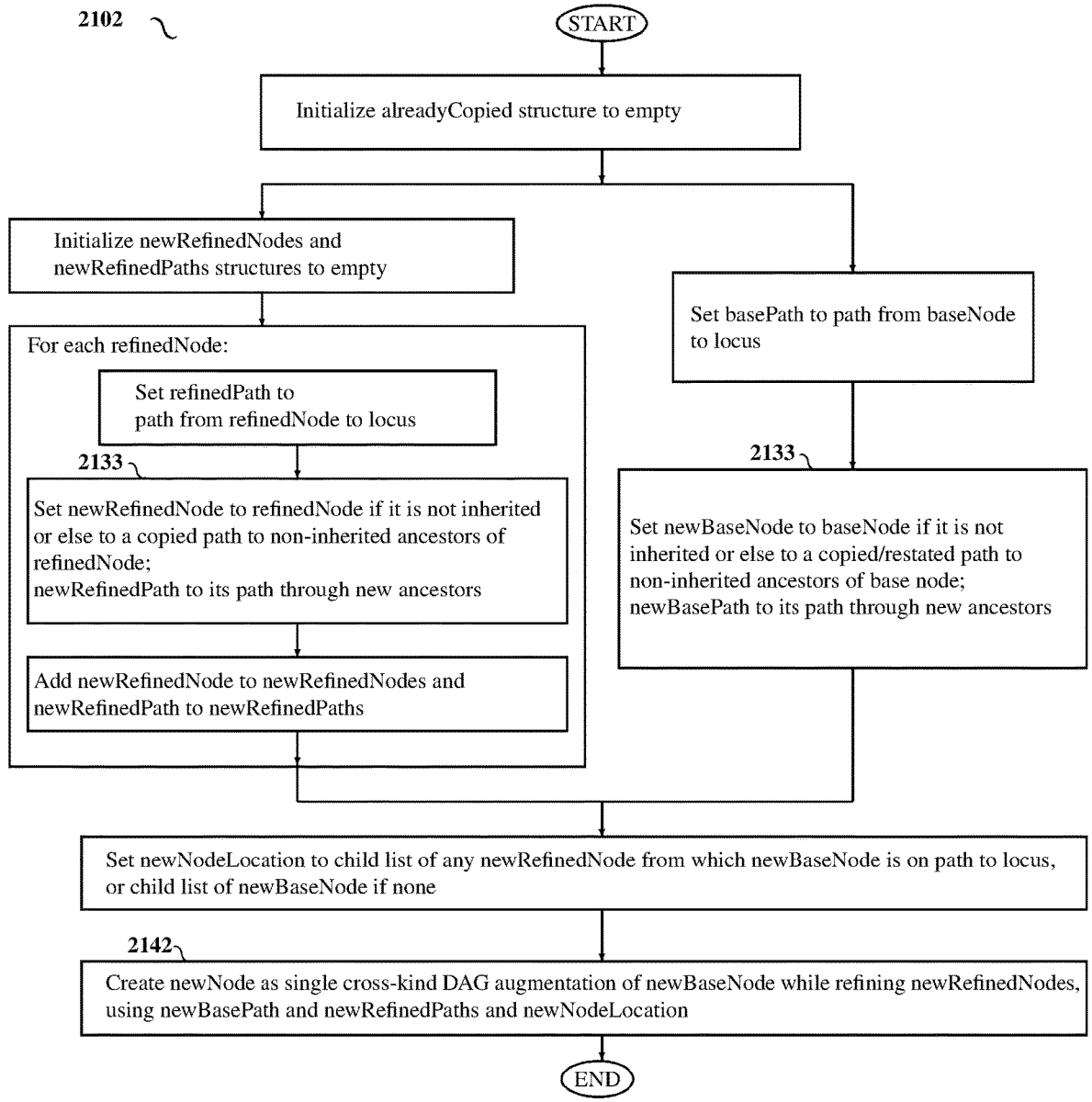

FIG. 82 is a process flow diagram of client action to perform cross-kind and specializing augmentation of a DAG, according to some embodiments.

Figure 83:
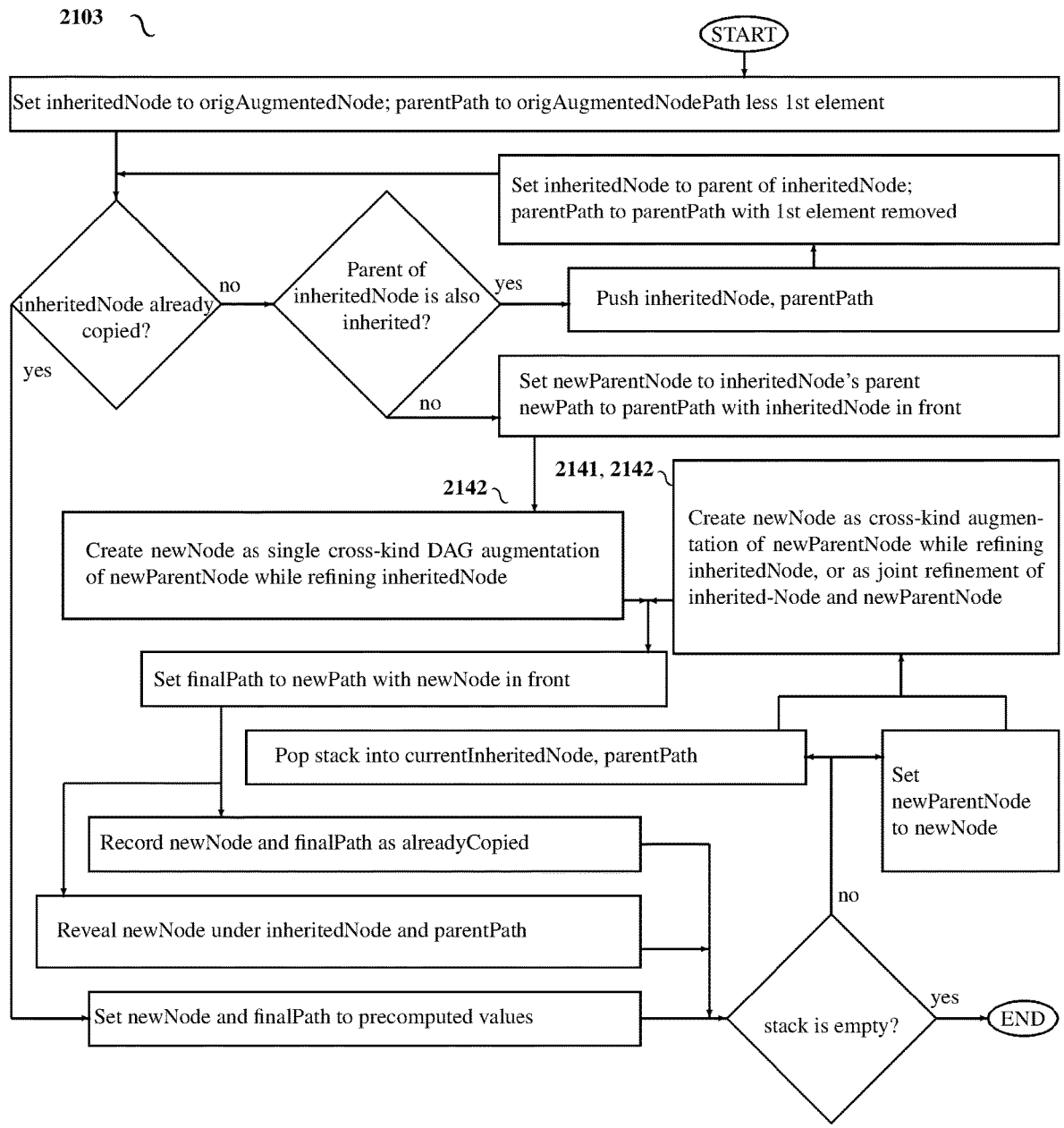

FIG. 83 is a process flow diagram of client action to copy the inherited ancestors of a node, specialized to the locus node, according to some embodiments.

Figure 84:
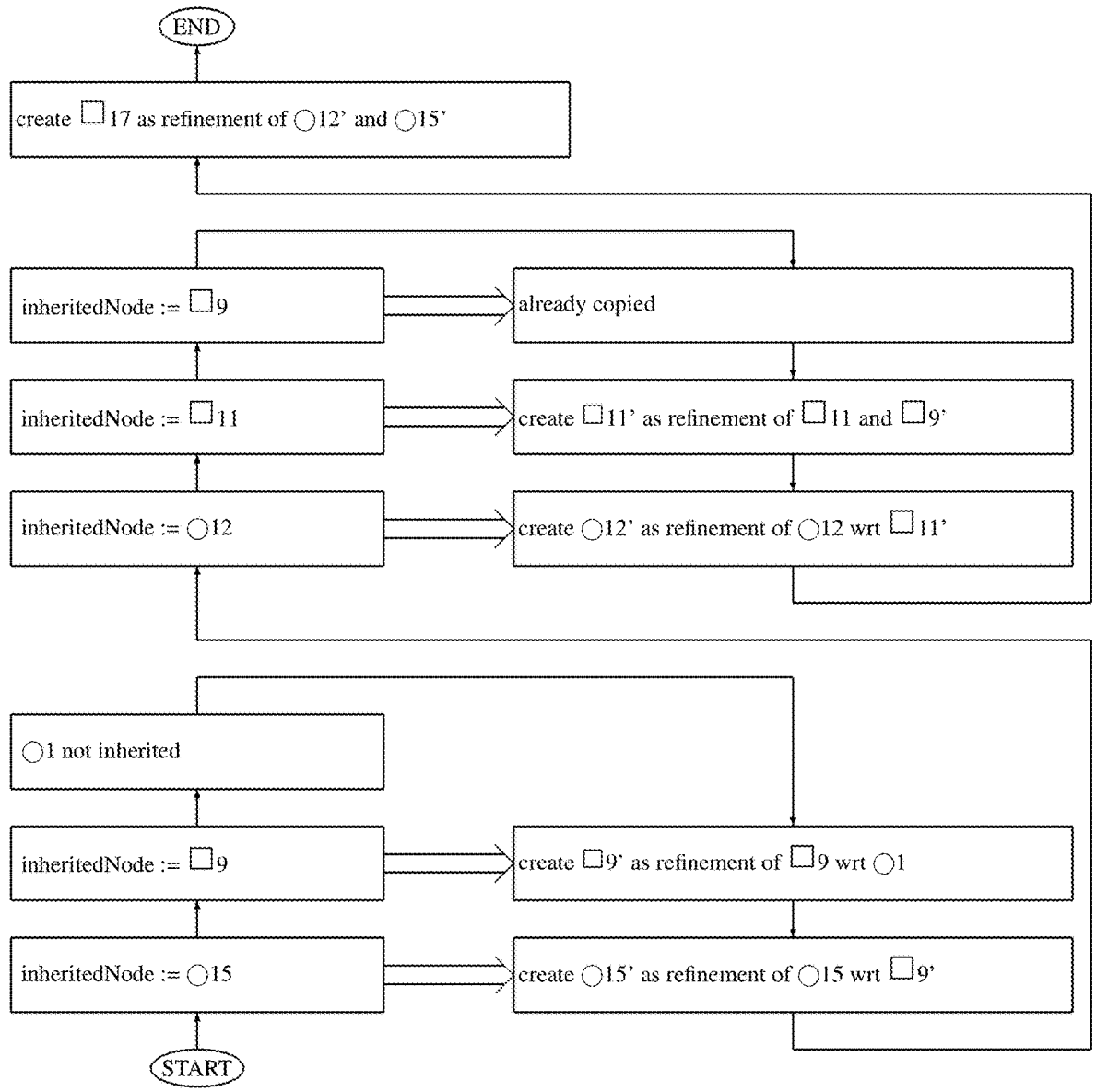

FIG. 84 is a trace diagram of an embodiment of the augmentation process for the case of FIG. 38, according to some embodiments.

Figure 85:
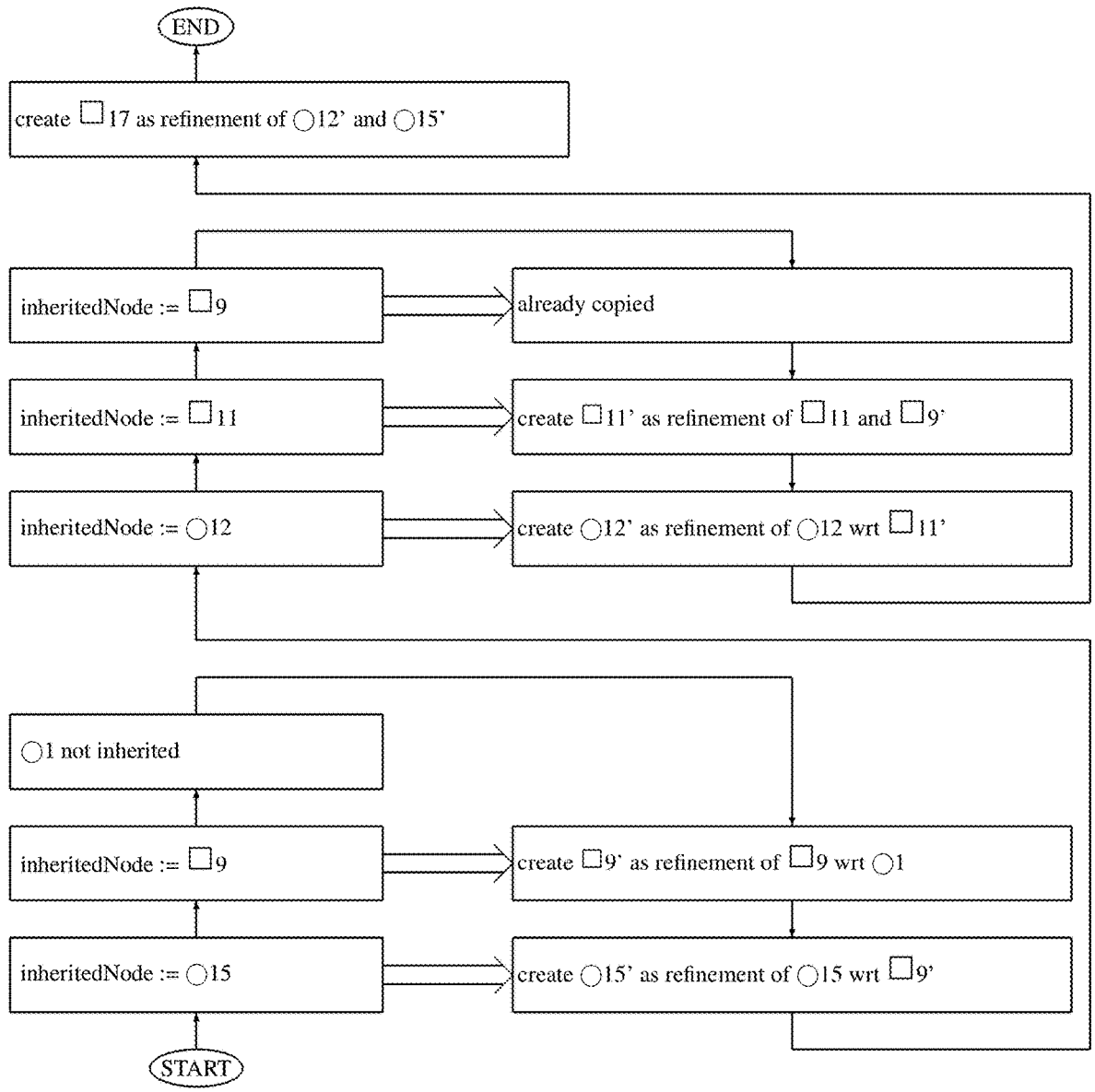

FIG. 85 is a trace diagram of an embodiment of the augmentation process modified to handleAugment Inheritance Process Trace for Noncontiguous Example.

Figure 86:
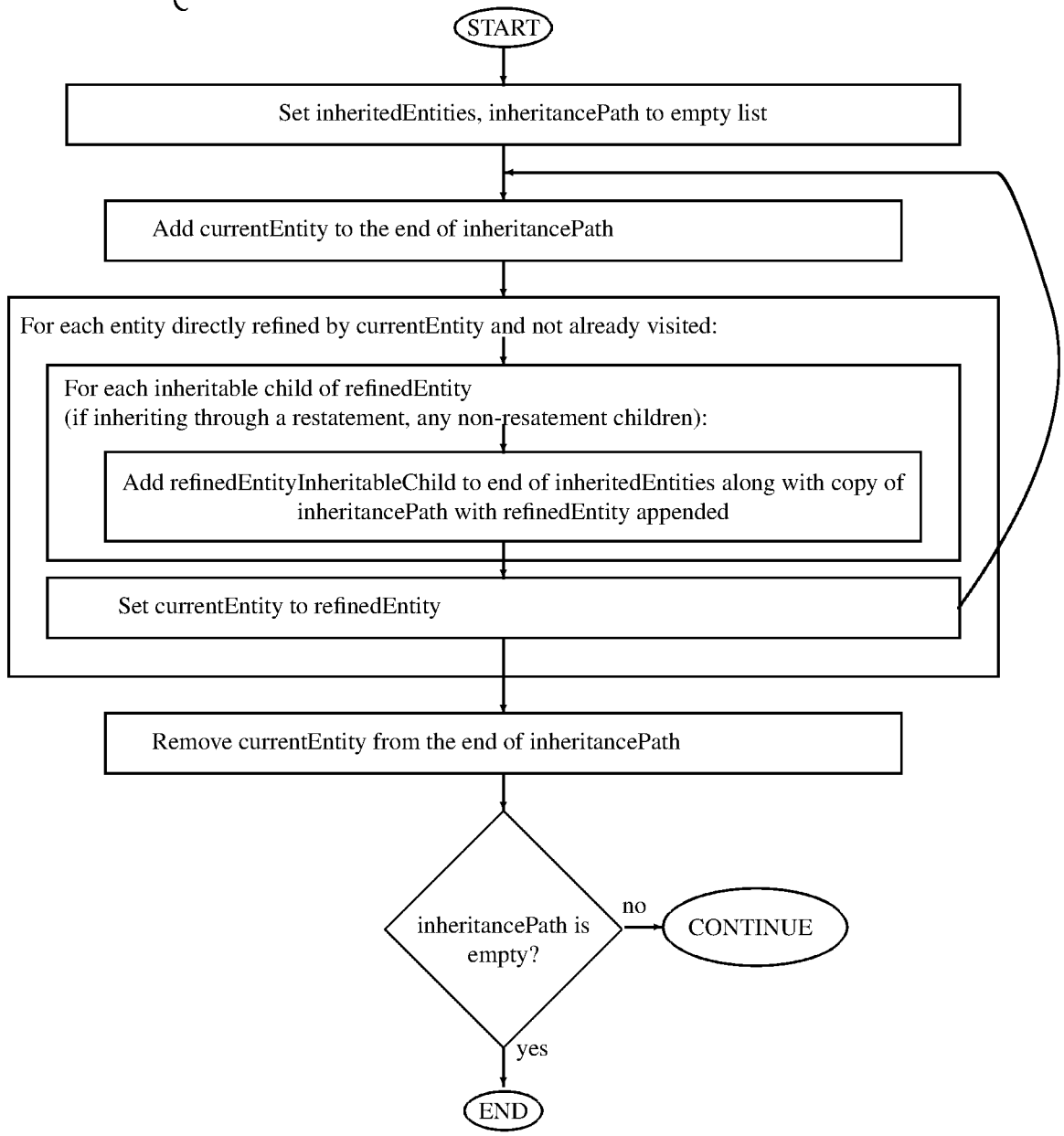

FIG. 86 is a process flow diagram of the component of a shallowest-first embodiment of the component of the inheritance process that collects structure to be inherited and the path by which it is inherited, via restatements, according to some embodiments.

Figure 87:
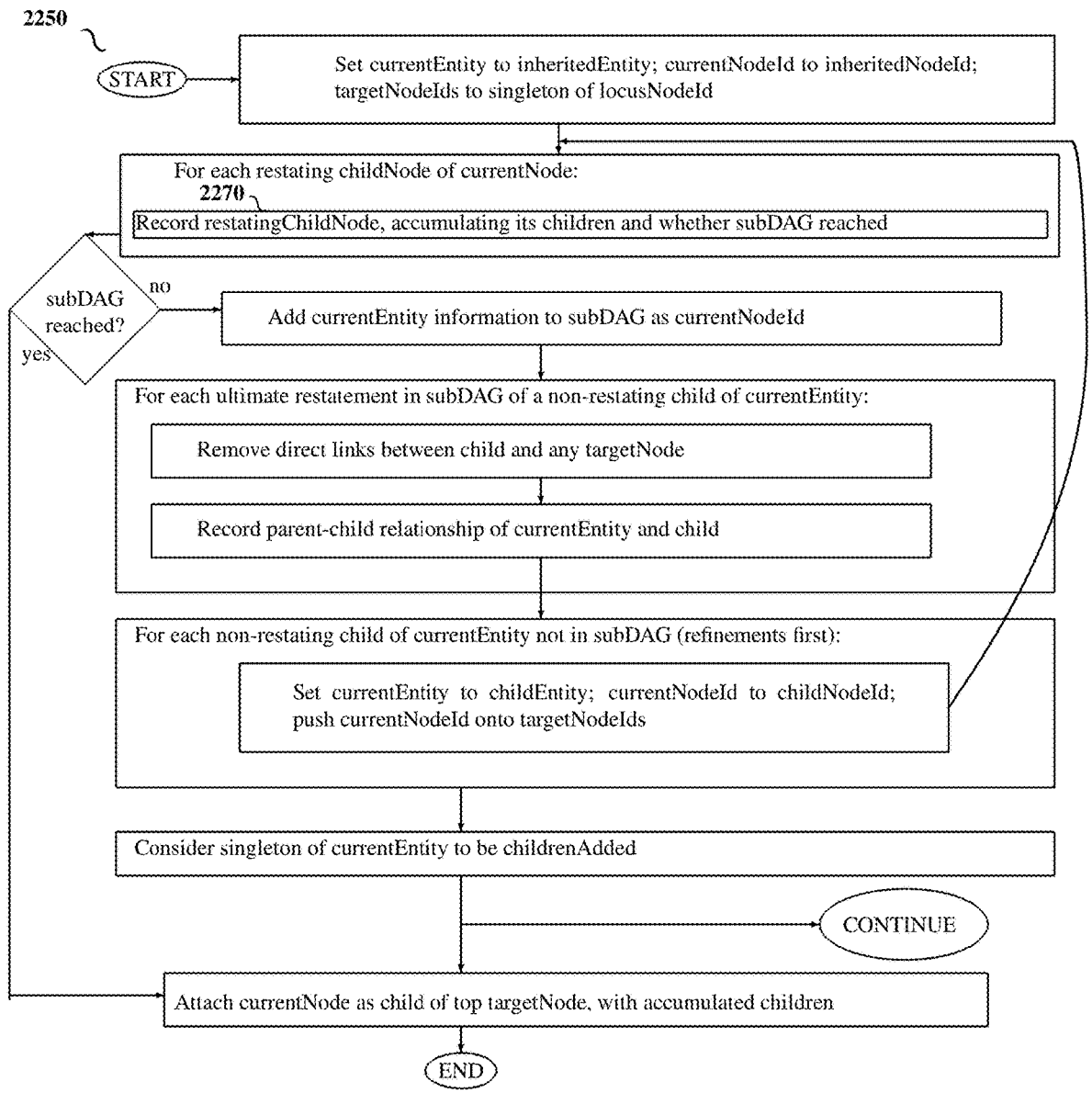

FIG. 87 is a process flow diagram of the component of an embodiment of the inheritance process that connects inherited structure to the DAG while skipping unrelated restatements, according to some embodiments.

Figure 88:
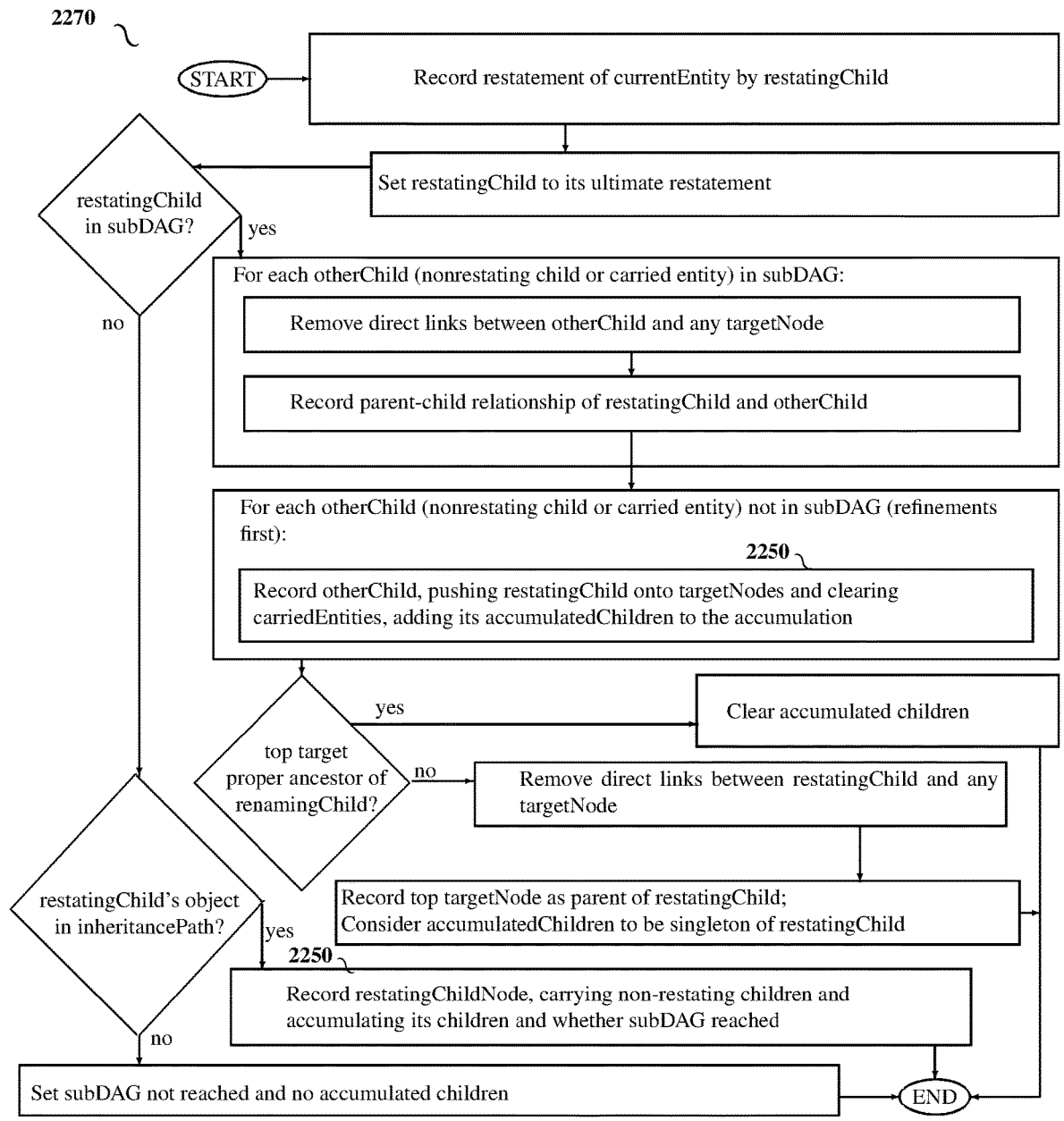

FIG. 88 is a process flow diagram of the component of an embodiment of the inheritance process that connects an inherited restatement to the DAG while skipping unrelated restatements, according to some embodiments.

Figure 89:
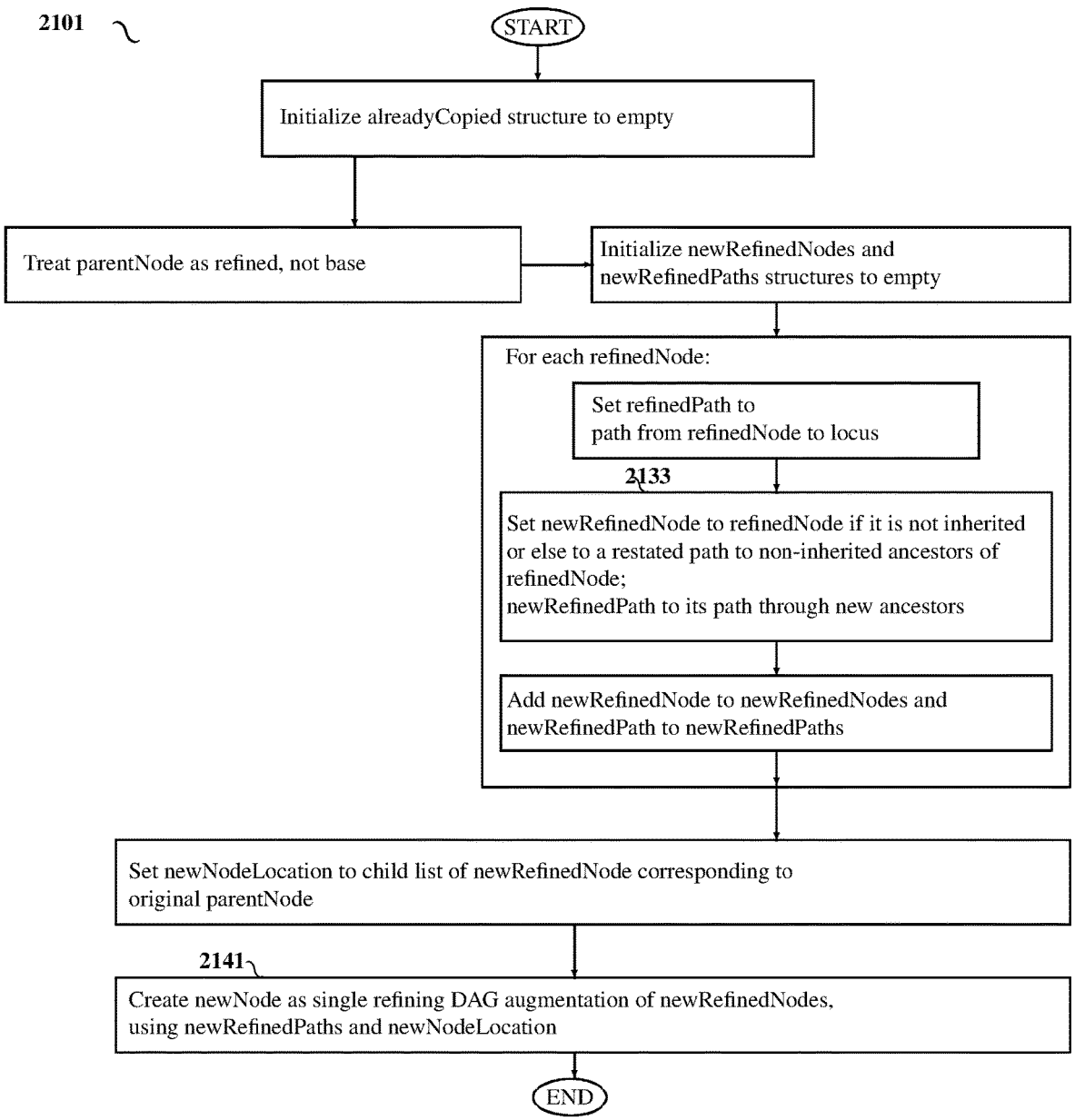

FIG. 89 is a process flow diagram of client action to perform specializing augmentation that refines even a single inherited node after restating it, according to some embodiments.

Figure 90:
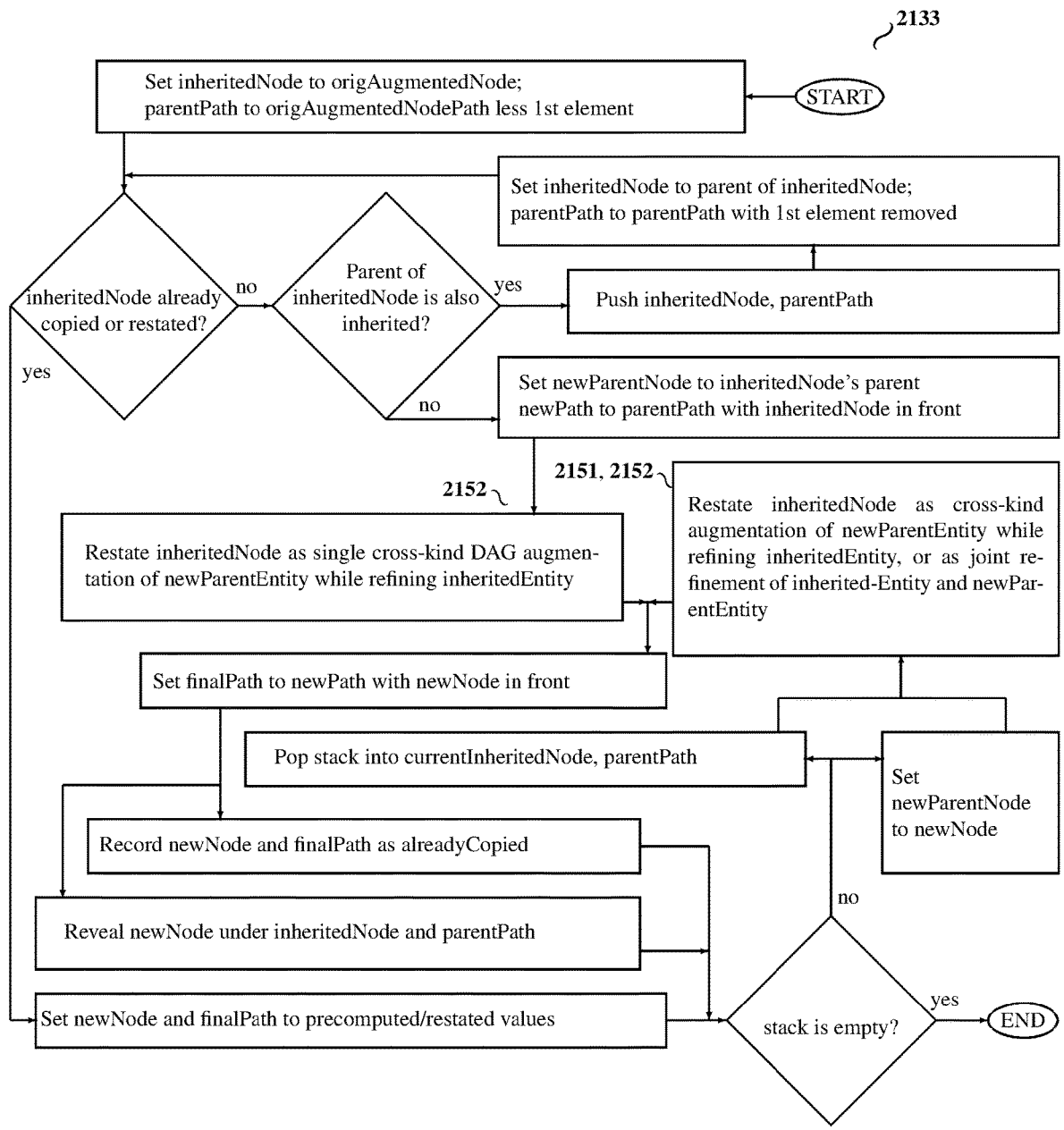

FIG. 90 is a process flow diagram of client action to restate the inherited ancestors of a node in place, specialized to the locus node, according to some embodiments.

Figure 91:
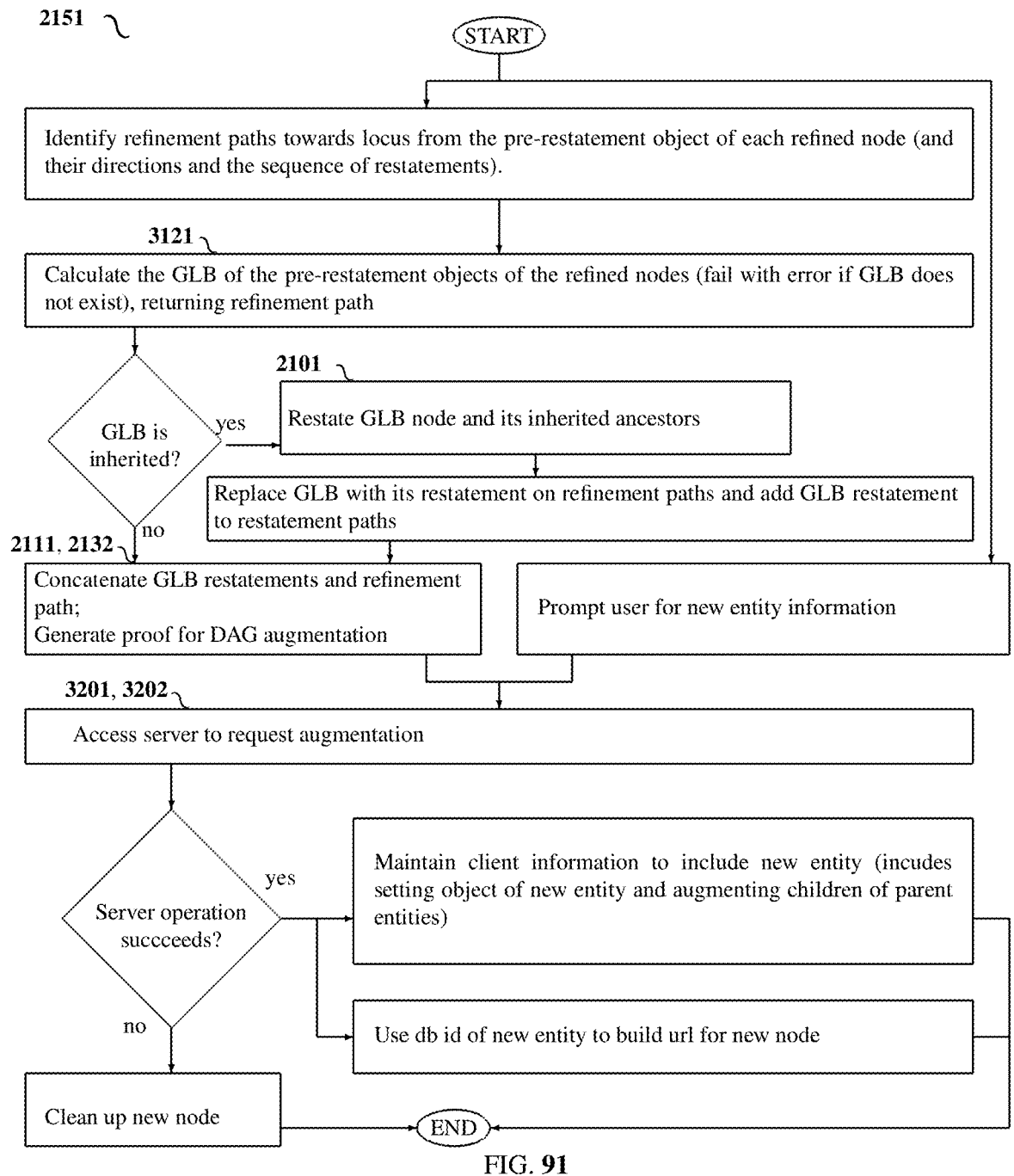

FIG. 91 is a process flow diagram of client action to perform a single specializing restating augmentation of a DAG, according to some embodiments.

Figure 92:
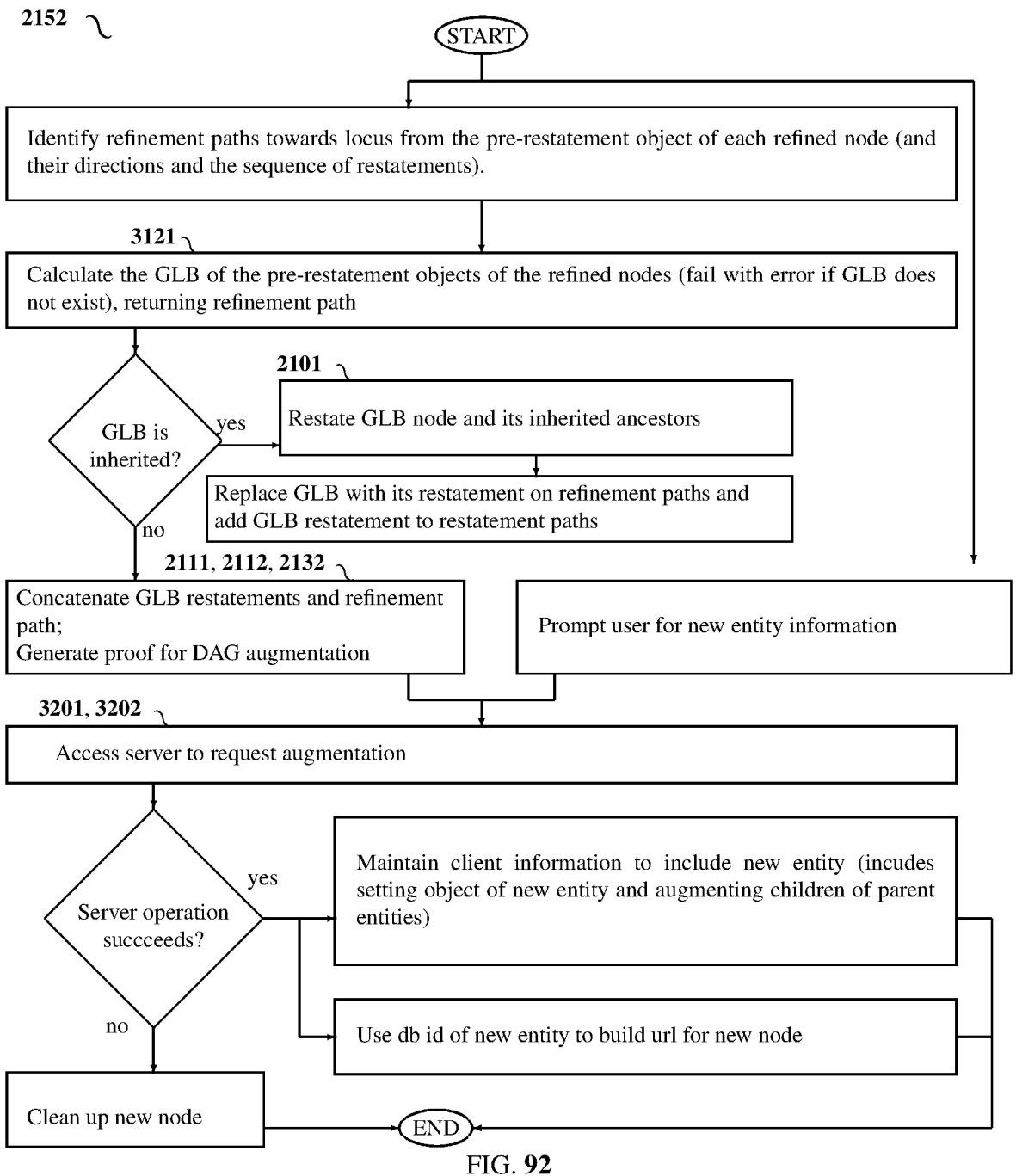

FIG. 92 is a process flow diagram of client action to perform a single cross-kind and specializing restating augmentation of a DAG, according to some embodiments.

Figure 93:
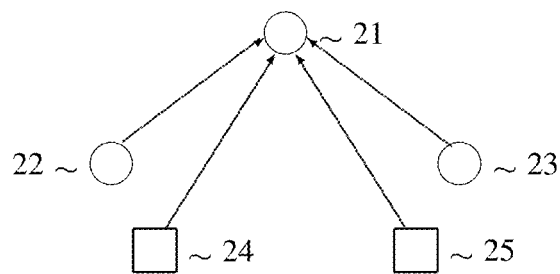

FIG. 93 is a diagram displaying a second example DAG according to some embodiments.

Figure 94:
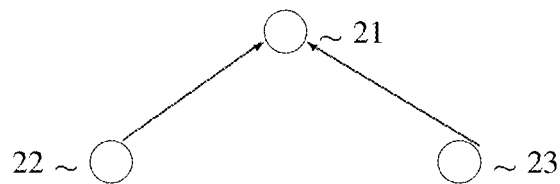

FIG. 94 is a diagram displaying a subDAG of the example DAG from FIG. 93 with navigation centered on two nodes (22 and 23), according to some embodiments.

Figure 95:
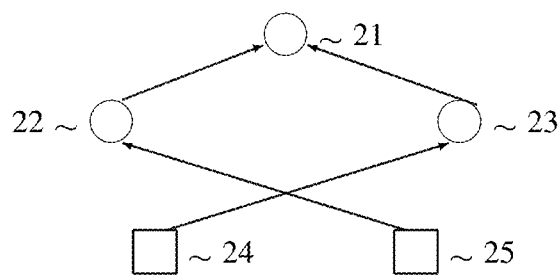

FIG. 95 is a diagram displaying the subDAG of the example DAG centered on two nodes (22 and 23) from FIG. 94 with some structure (including nodes 24 and 25) inherited, according to some embodiments.

Figure 96:
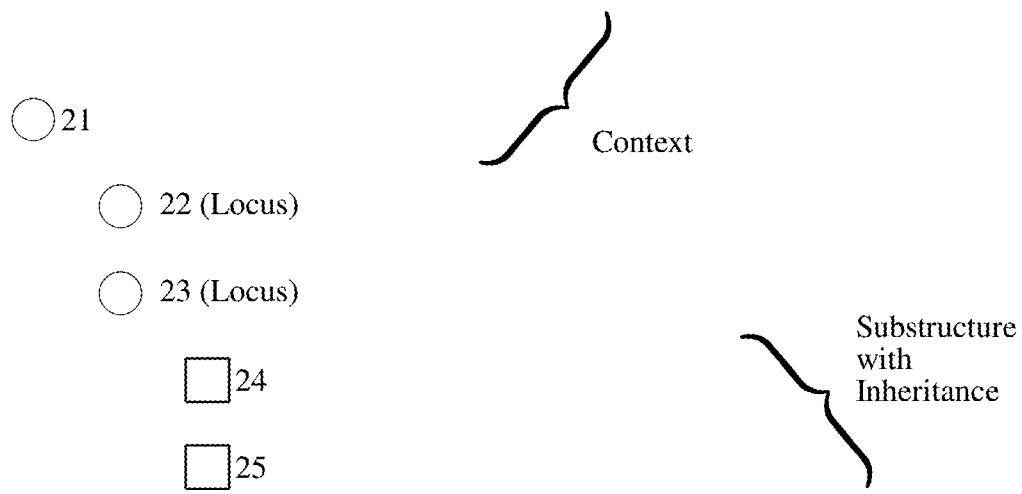

FIG. 96 is a diagram displaying the subDAG of the example DAG from FIG. 95, presented as a tree exploring nodes 24 and 25, according to some embodiments.

Figure 97:
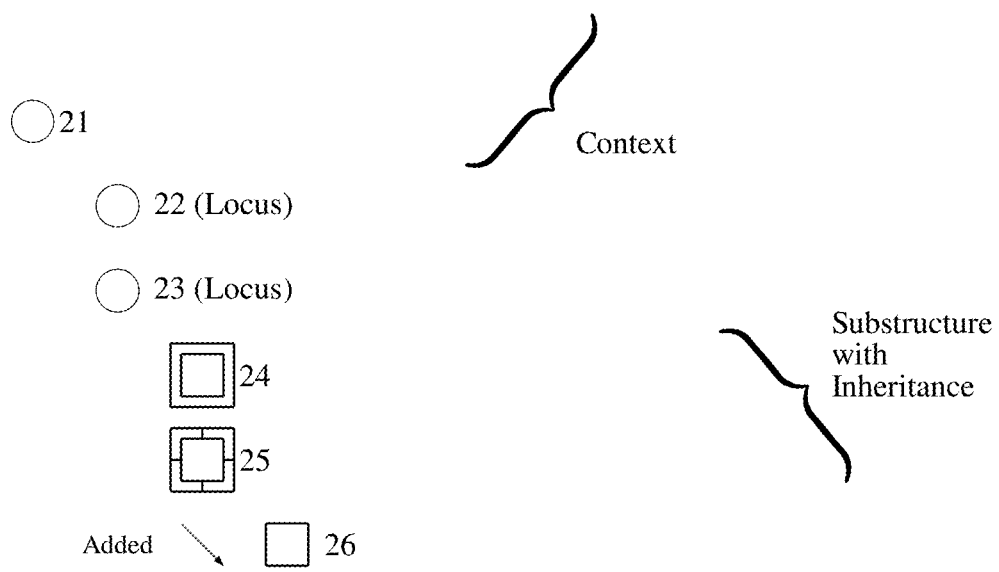

FIG. 97 is a diagram displaying the exploration from FIG. 96 with navigation centered on two nodes (22 and 23) during the process of solving those problem nodes and refining two inherited solution nodes (24 and 25) with a new solution node (26), while presented as a tree, according to some embodiments.

Figure 98:
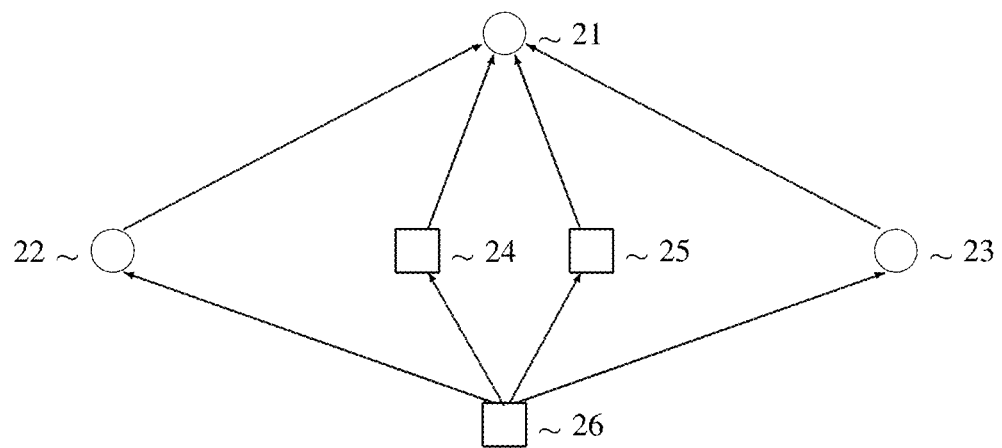

FIG. 98 is a diagram displaying the example DAG from FIG. 93 after solving problem nodes 22 and 23 and refining solution nodes 24 and 25 with new solution node 26 as shown in FIG. 97, according to some embodiments.

Figure 99:
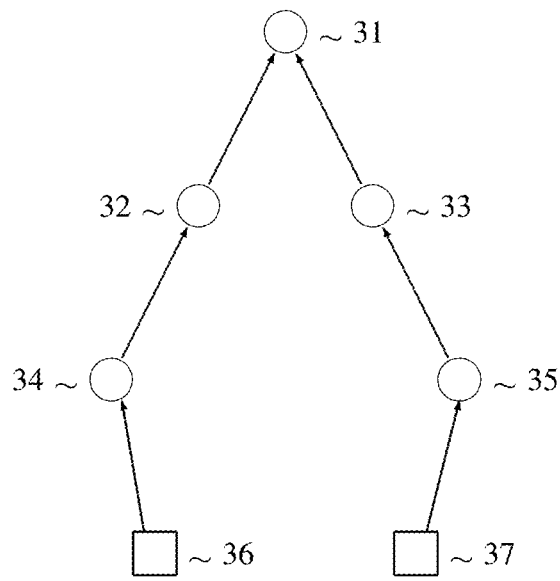

FIG. 99 is a diagram displaying a third example DAG with navigation centered on node 31, according to some embodiments.

Figure 100:
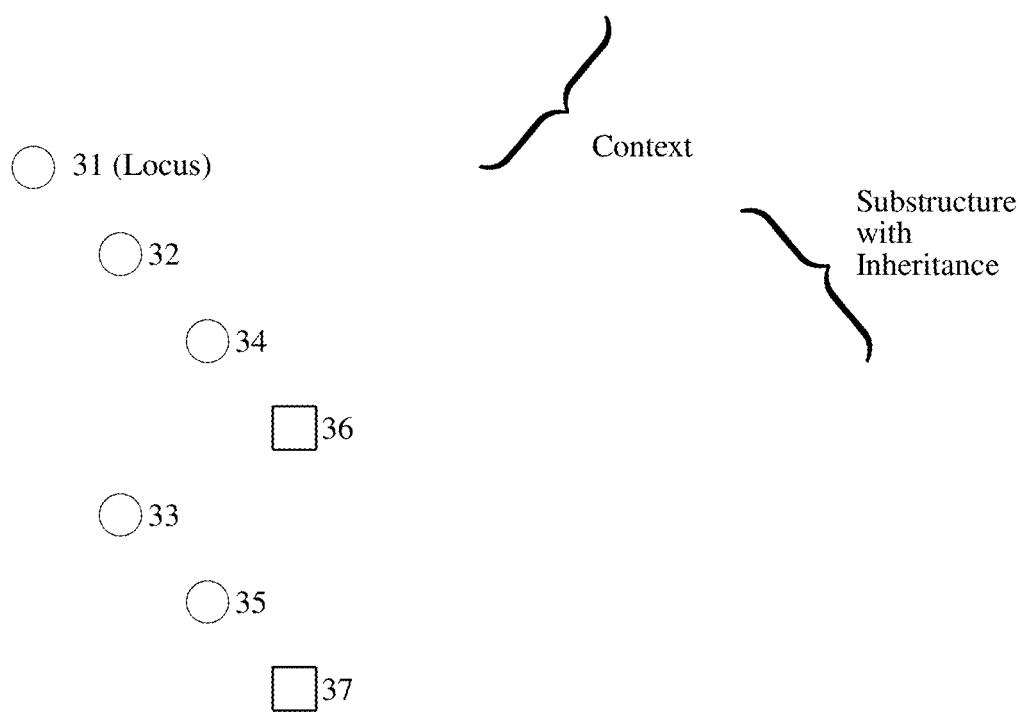

FIG. 100 is a diagram displaying the example DAG from FIG. 99, presented as a substructure tree exploring nodes 36 and 37, according to some embodiments.

Figure 101:
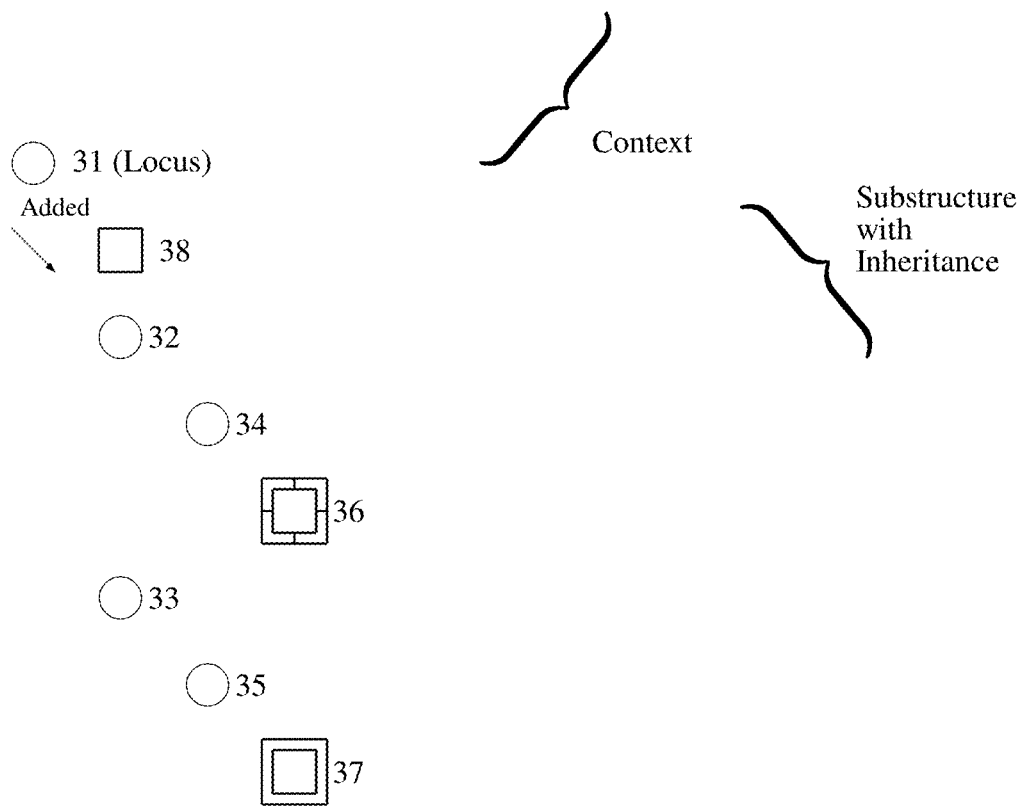

FIG. 101 is a diagram displaying the exploration from FIG. 100 with navigation centered on node 31 during the process of generalizing two dependent nodes (36 and 37) with a new dependent node (38), while presented as a tree, according to some embodiments.

Figure 102:
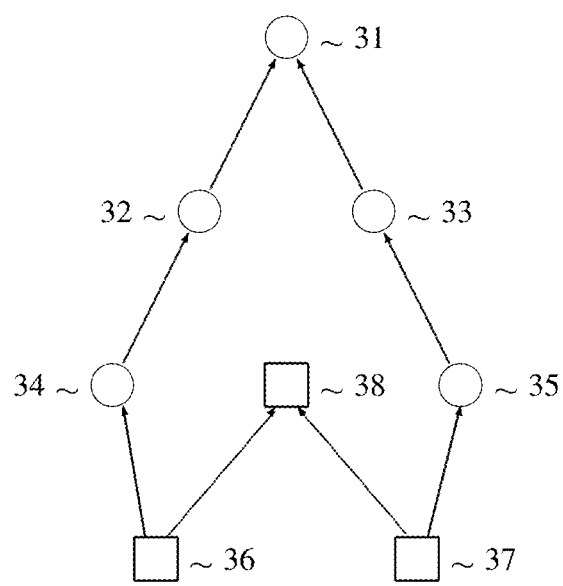

FIG. 102 is a diagram displaying the example DAG from FIG. 99 after augmenting independent node 31 and generalizing dependent nodes 36 and 37 with new dependent node 38 as shown in FIG. 101, according to some embodiments.

Figure 103:
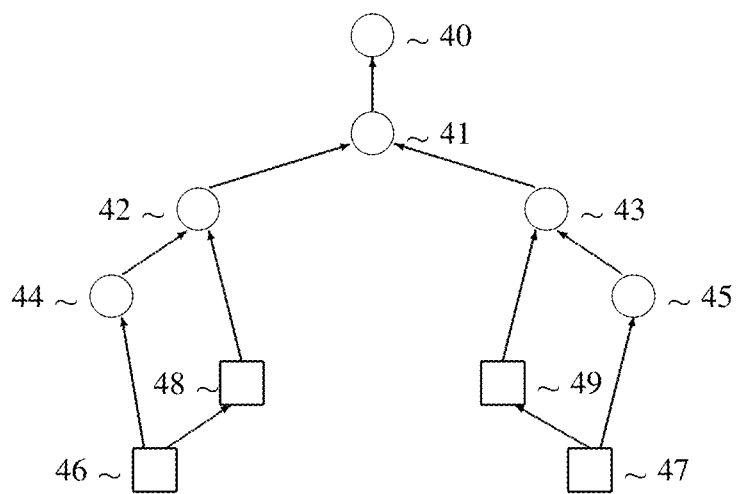

FIG. 103 is a diagram displaying a fourth example DAG with navigation centered on nodes 46 and 47, according to some embodiments.

Figure 104:
Figure 104:
Figure 104:
Figure 104:
Figure 104:
Figure 104:
Figure 104:
Figure 104:
Figure 104:
Figure 104:

FIG. 104 is a diagram displaying the example DAG from FIG. 103, presented as a pair of overlapping context trees exploring node 41, according to some embodiments.

Figure 105:
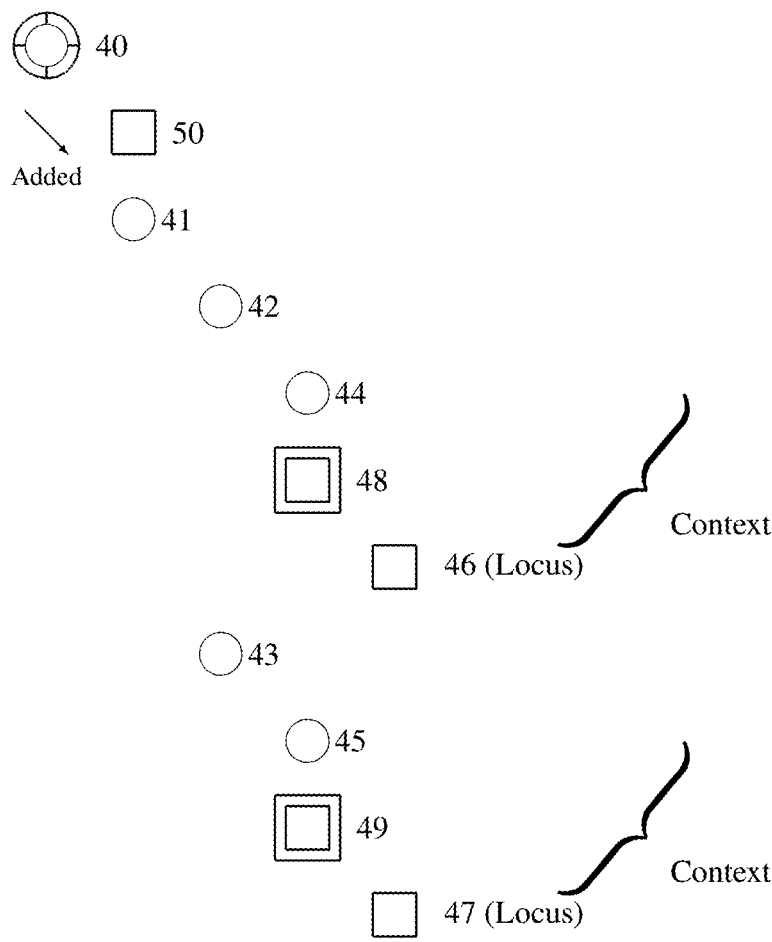

FIG. 105 is a diagram displaying the exploration from FIG. 104 with navigation centered on nodes 46 and 47 during the process of augmenting node 41 while generalizing two dependent nodes (48 and 49) with a new dependent node (50), while presented as a tree, according to some embodiments.

Figure 106:
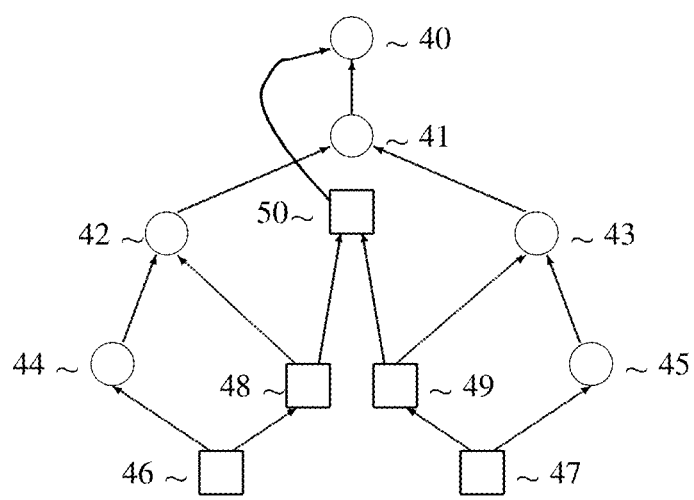

FIG. 106 is a diagram displaying the example DAG from FIG. 103 after augmenting independent node 41 and generalizing dependent nodes 48 and 49 with new dependent node 50 as shown in FIG. 105, according to some embodiments.

Figure 107:
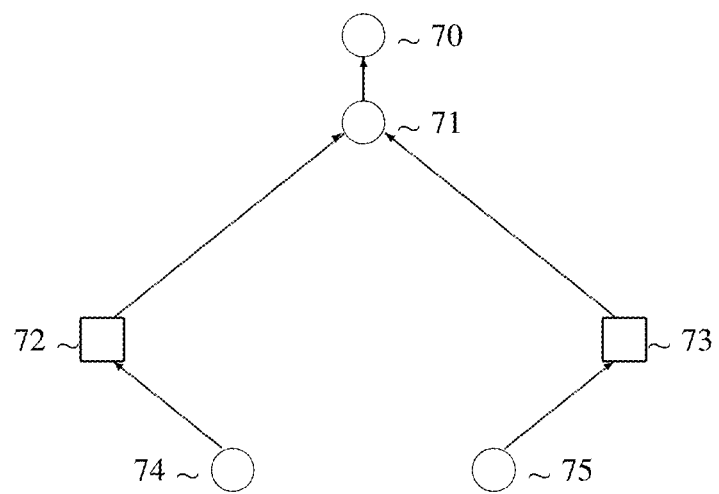

FIG. 107 is a diagram displaying a fifth example DAG with navigation centered on nodes 74 and 75, according to some embodiments.

Figure 108:
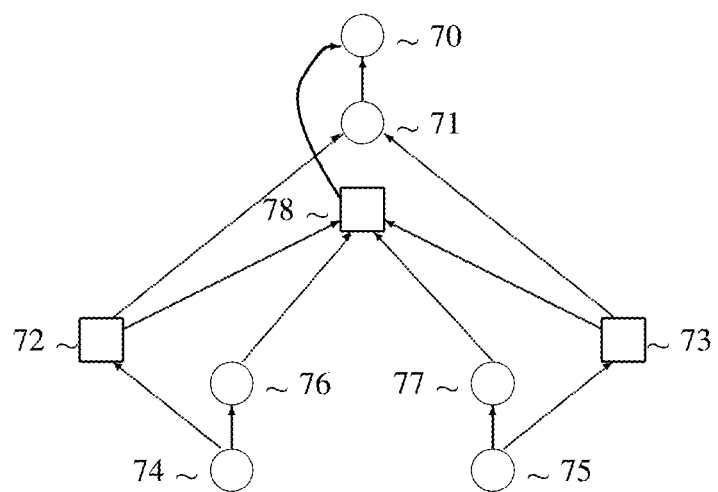

FIG. 108 is a diagram displaying the example DAG from FIG. 107 after solving problem nodes 70 with new solution node 78 that generalizes the existing solution nodes and is componentized by generalizations of the existing solution components, according to some embodiments.

Figure 109:
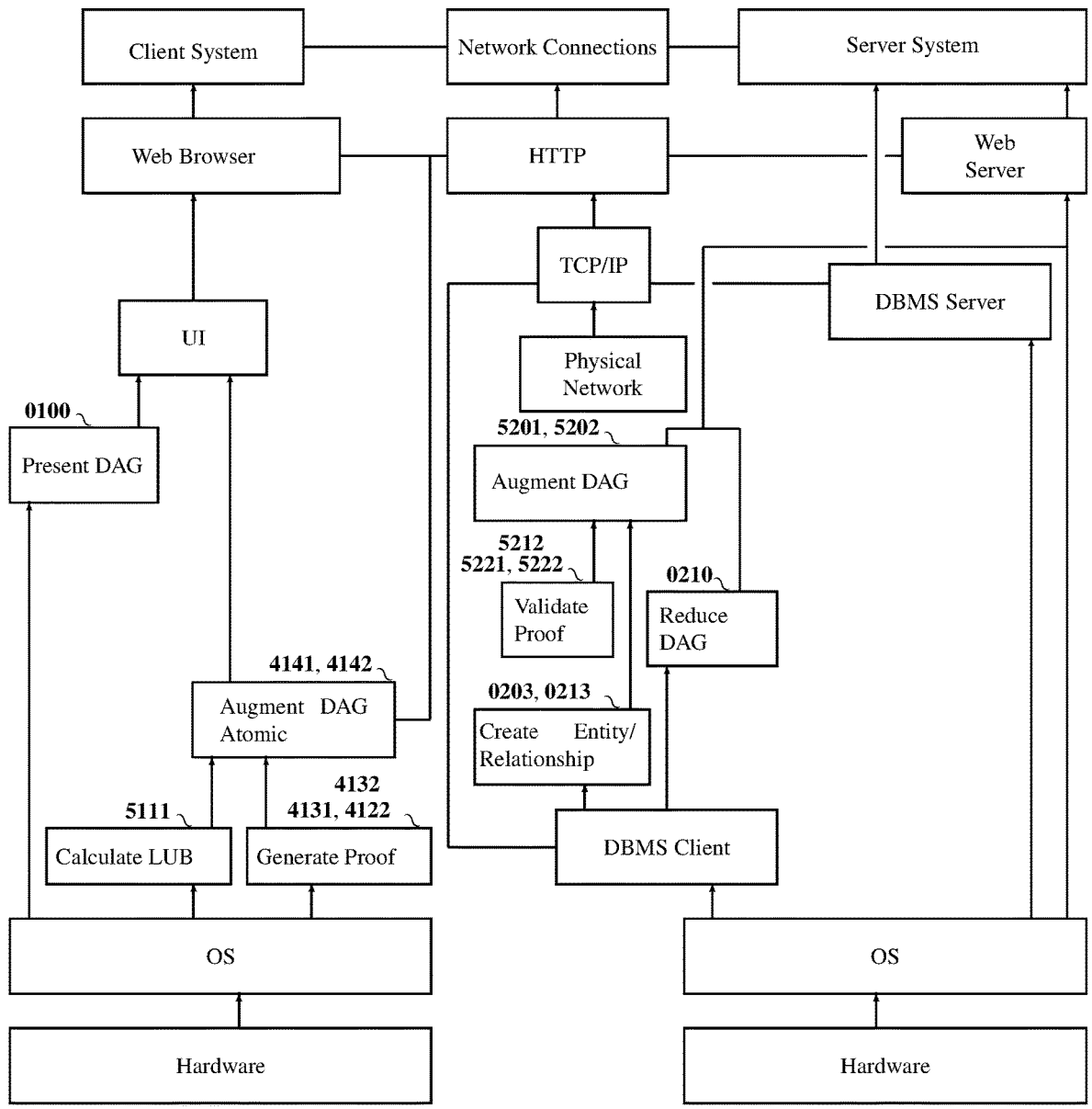

FIG. 109 is a block structure diagram of an embodiment for generalization without inheritance.

Figure 110:
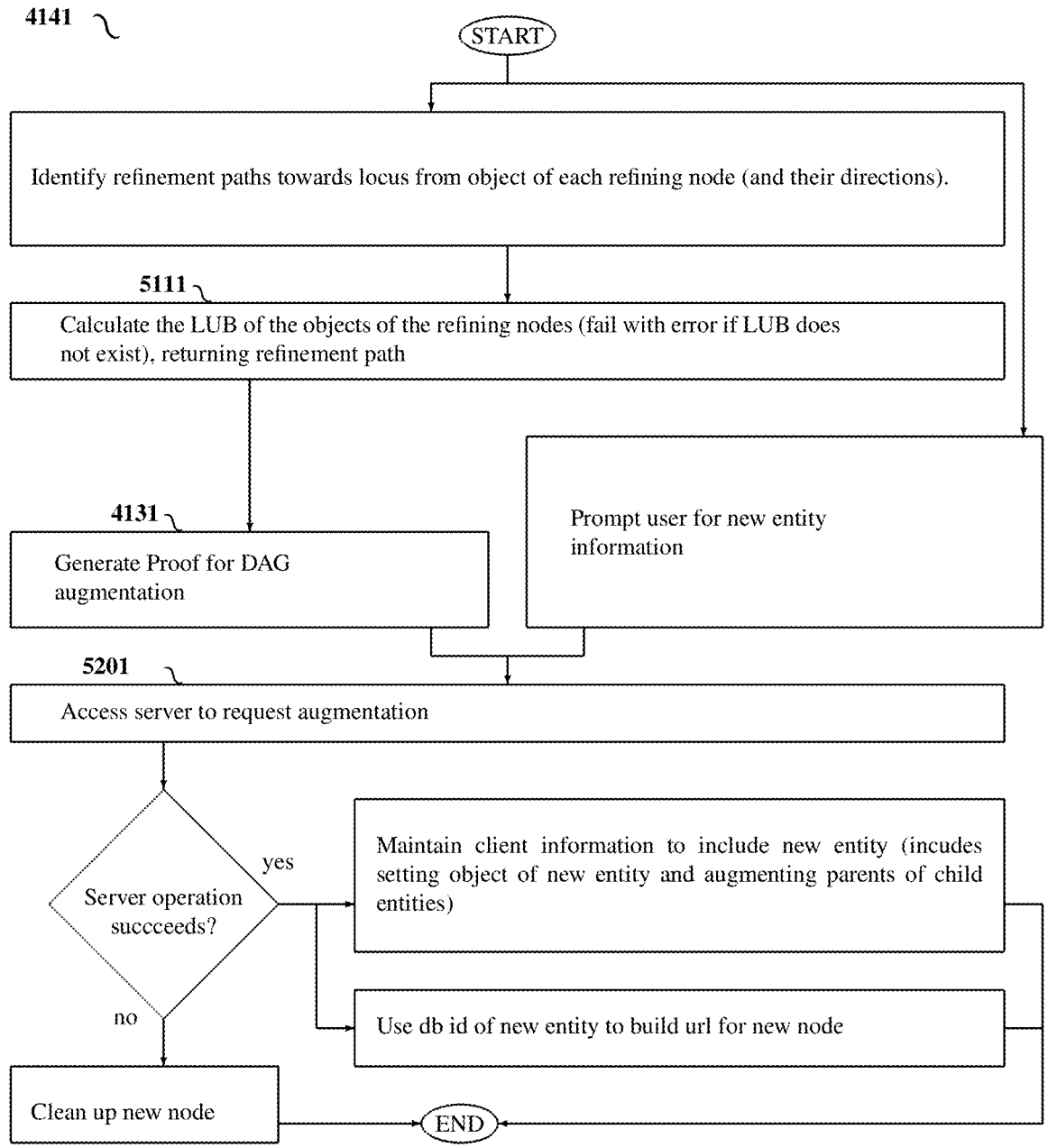

FIG. 110 is a process flow diagram of client action to perform a single generalizing augmentation of a DAG, according to some embodiments.

Figure 111:
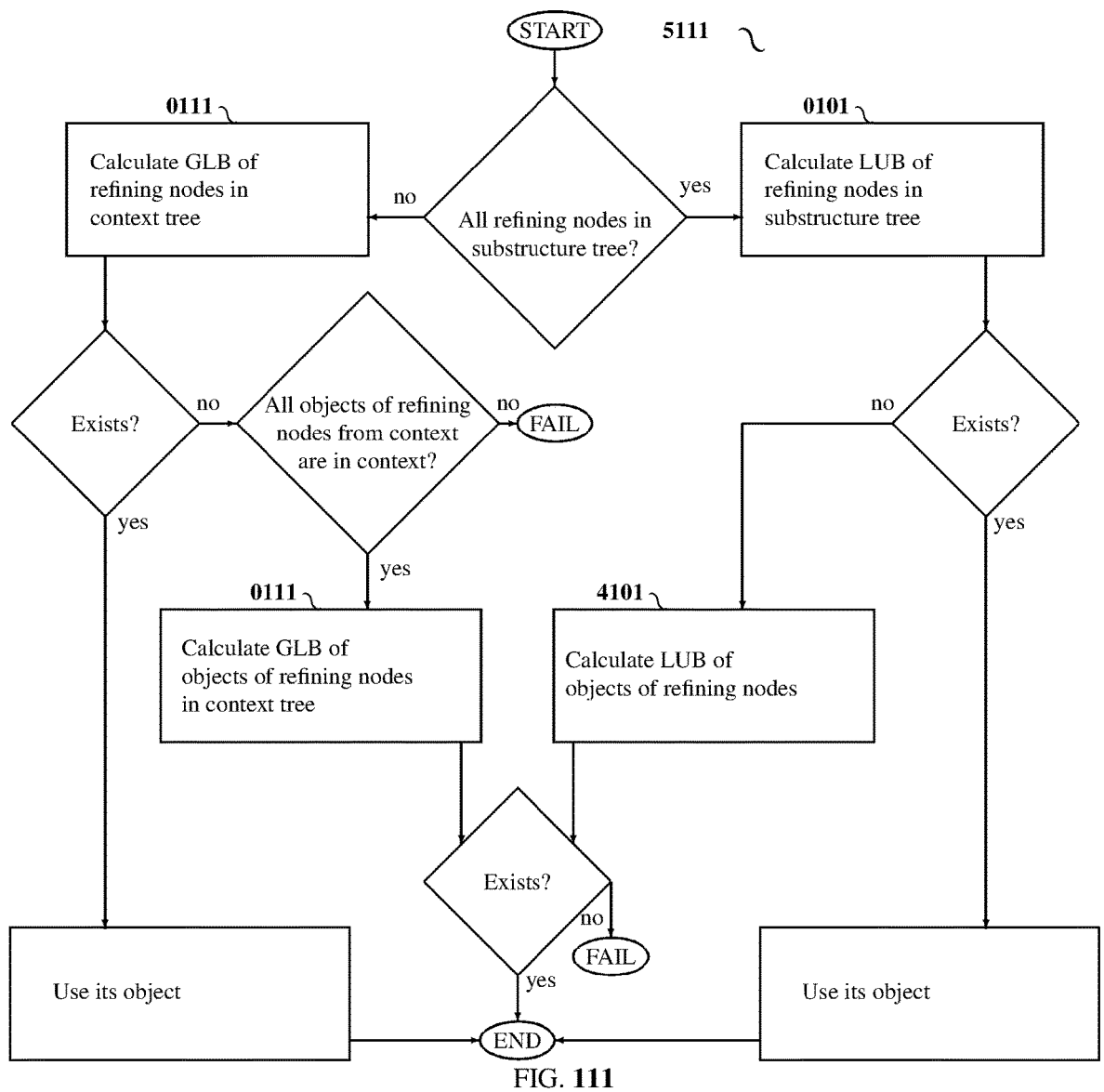

FIG. 111 is a process flow diagram of the calculation of the least upper bound of objects of refining nodes with respect to the substructure and context trees without inheritance, according to some embodiments.

Figure 112:
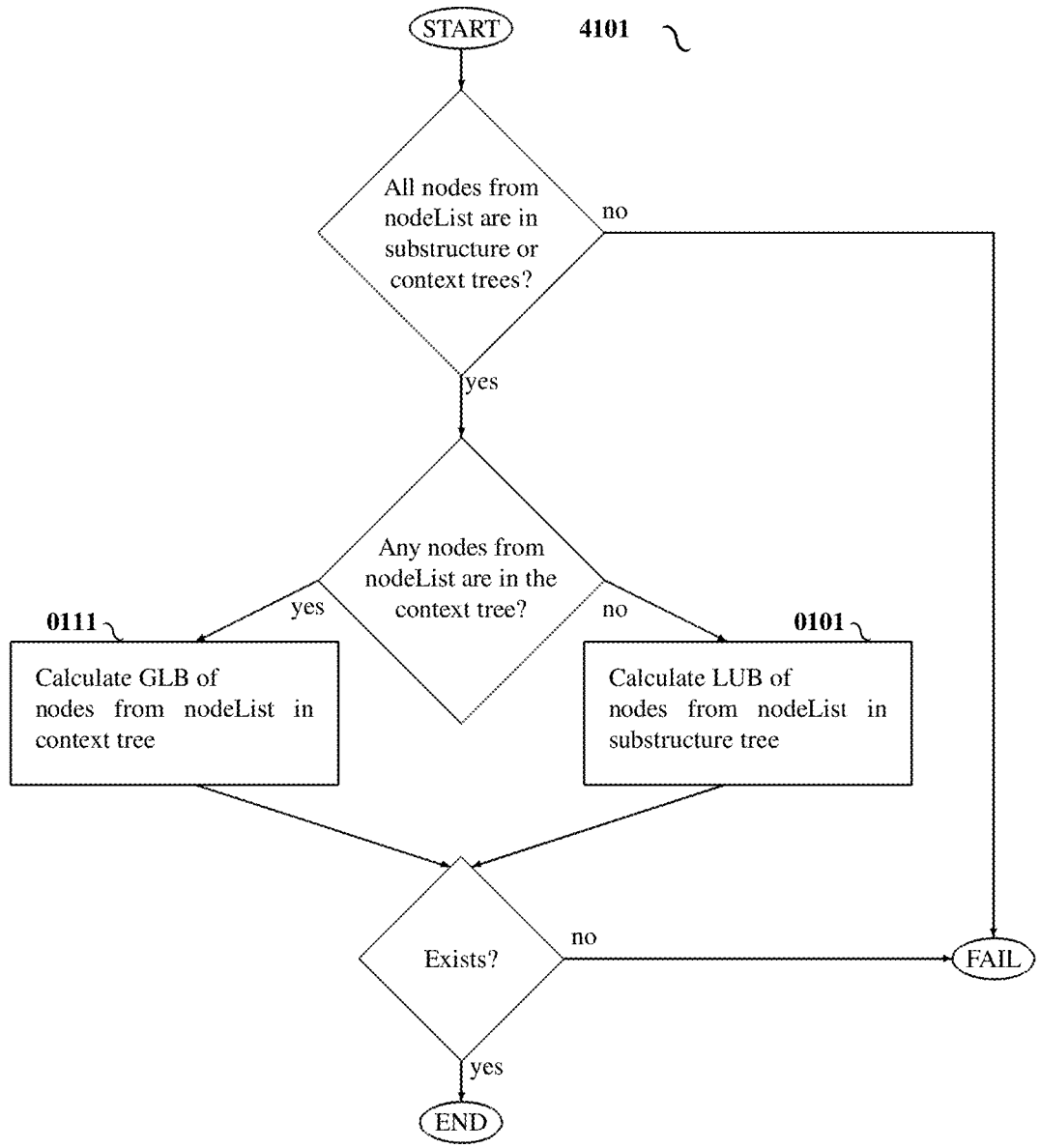

FIG. 112 is a process flow diagram of the calculation of the least upper bound of nodes with respect to both context and substructure trees, according to some embodiments.

Figure 113:
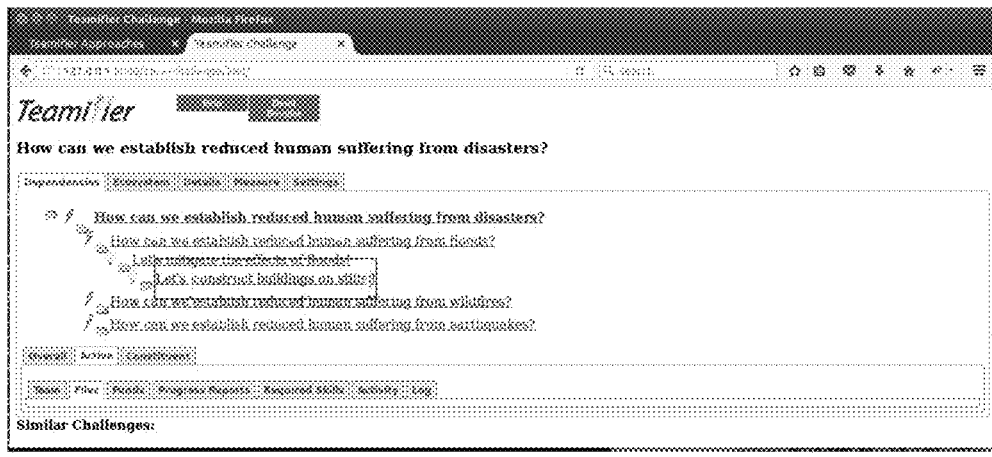

FIG. 113 is a project screen selecting a solution to open for generalization, according to some embodiments.

Figure 114:
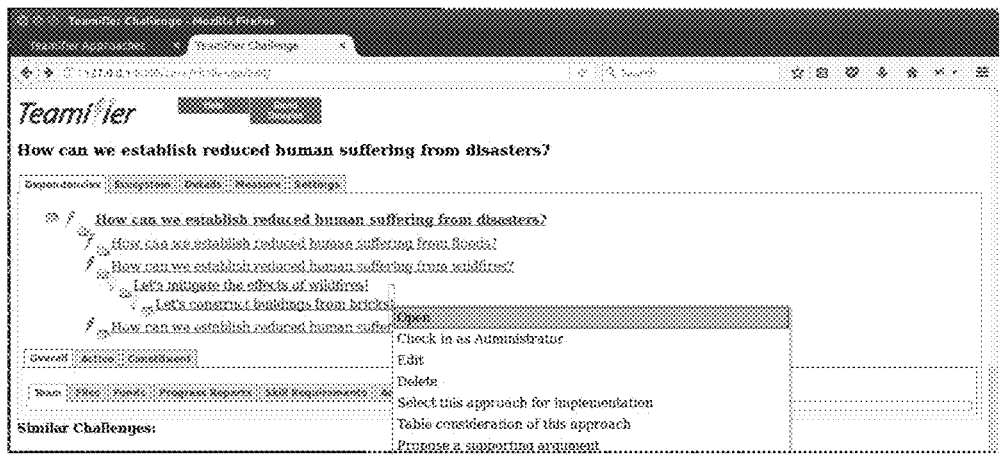

FIG. 114 is a project screen selecting a second solution to open for generalization, according to some embodiments.

Figure 115:
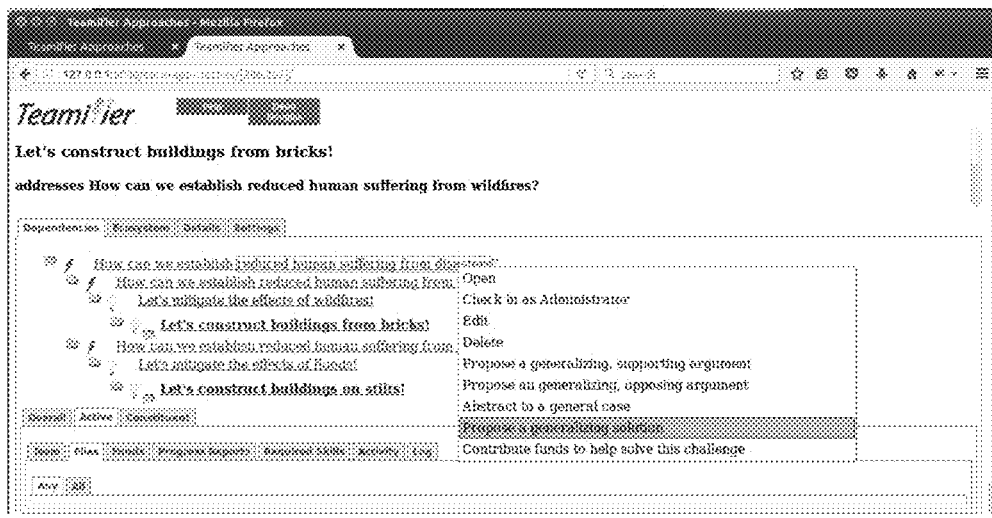

FIG. 115 is a project screen selecting generalizing solution operation, according to some embodiments.

Figure 116:
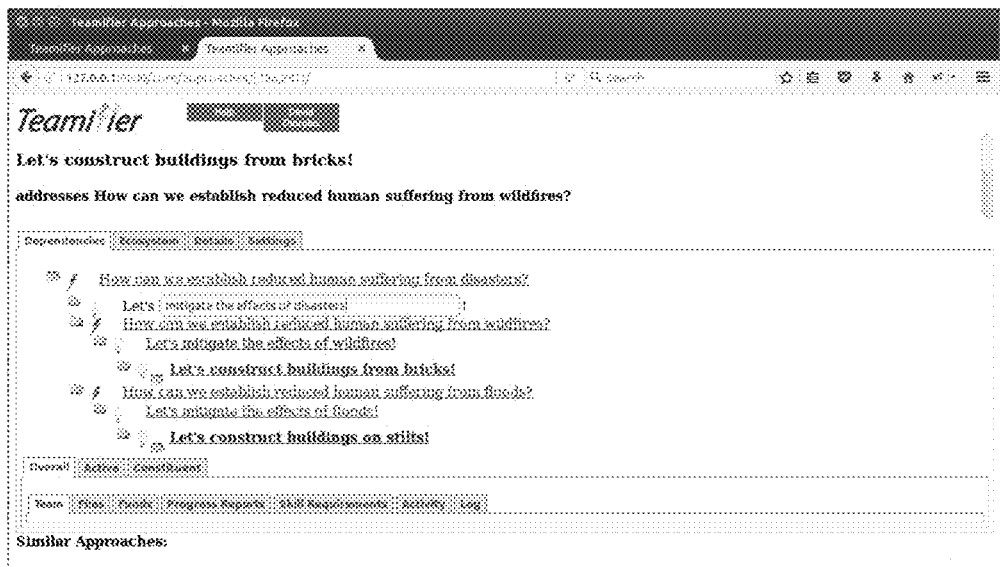

FIG. 116 is a project screen solving a problem while abstracting solutions, according to some embodiments.

Figure 117:
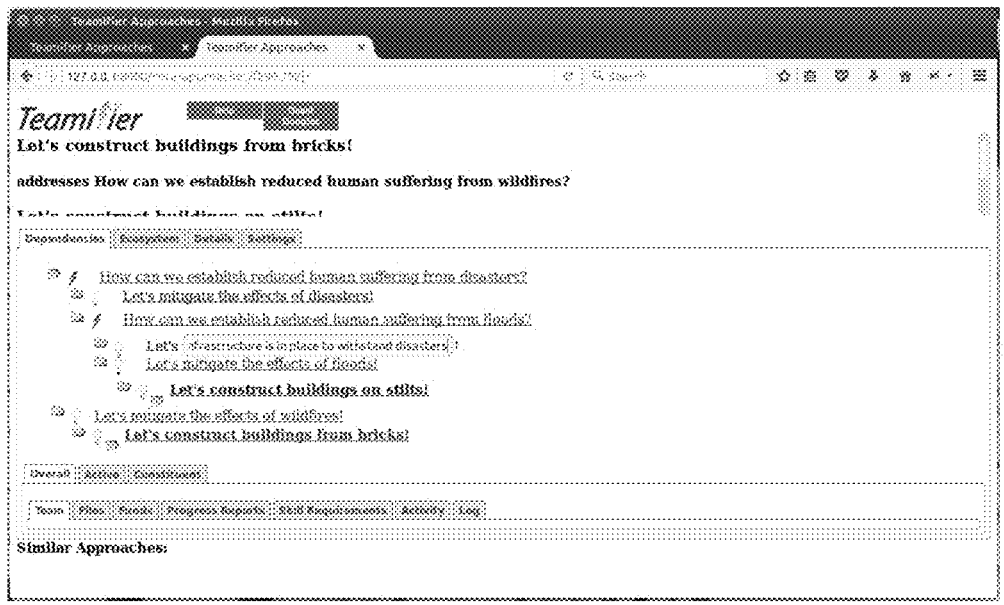

FIG. 117 is a project screen refining that solution while abstracting others, according to some embodiments.

Figure 118:
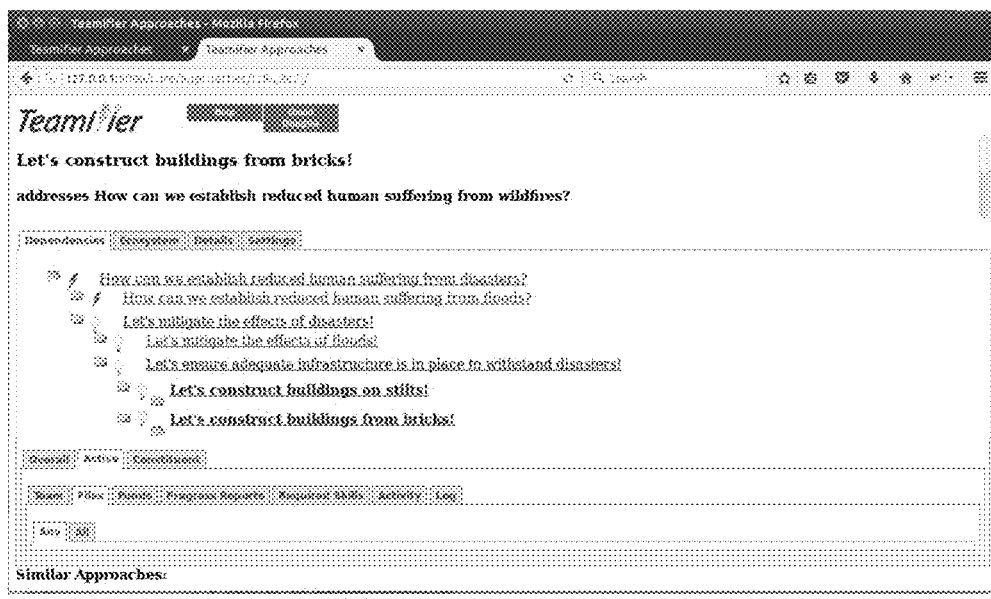

FIG. 118 is a project screen after iterated abstracting solution, according to some embodiments.

Figure 119:
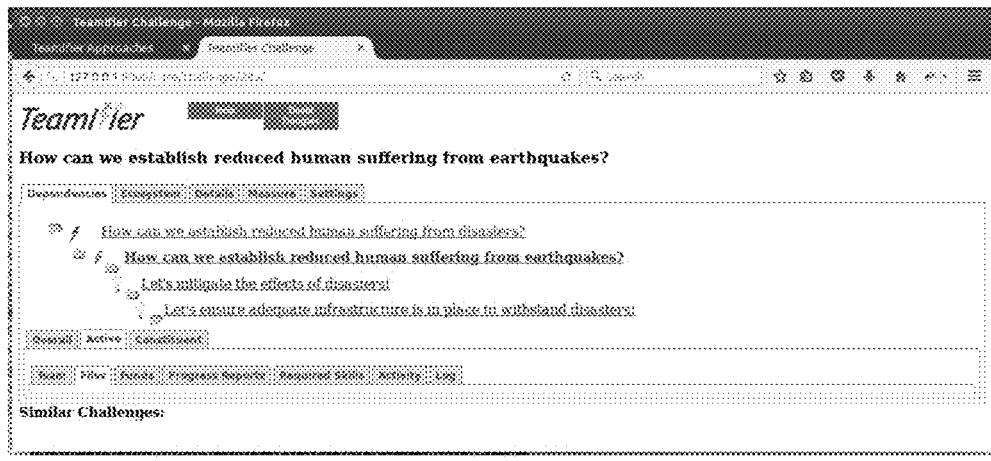

FIG. 119 is a project screen from alternate specialized problem after iterated abstracting solution, according to some embodiments.

Figure 120:
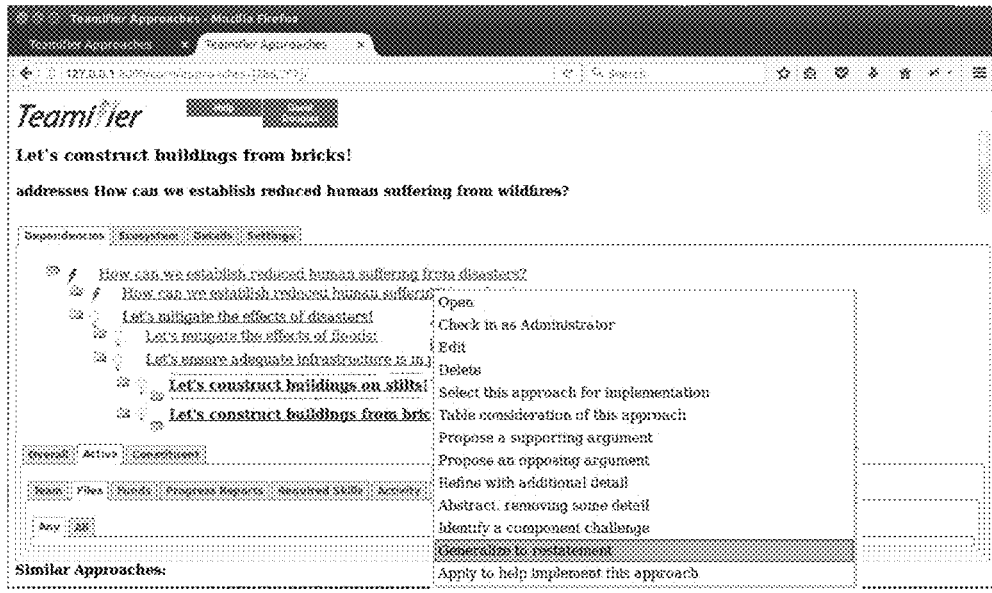

FIG. 120 is a project screen selecting generalization to restatement operation, according to some embodiments.

Figure 121:
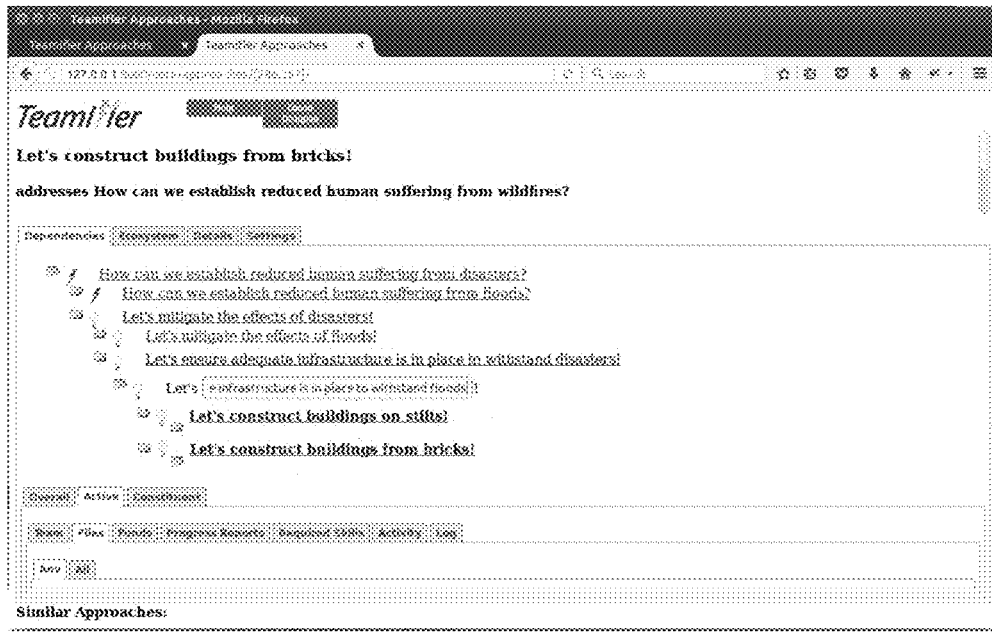

FIG. 121 is a project screen entering specialization of new generalized solution, according to some embodiments.

Figure 122:
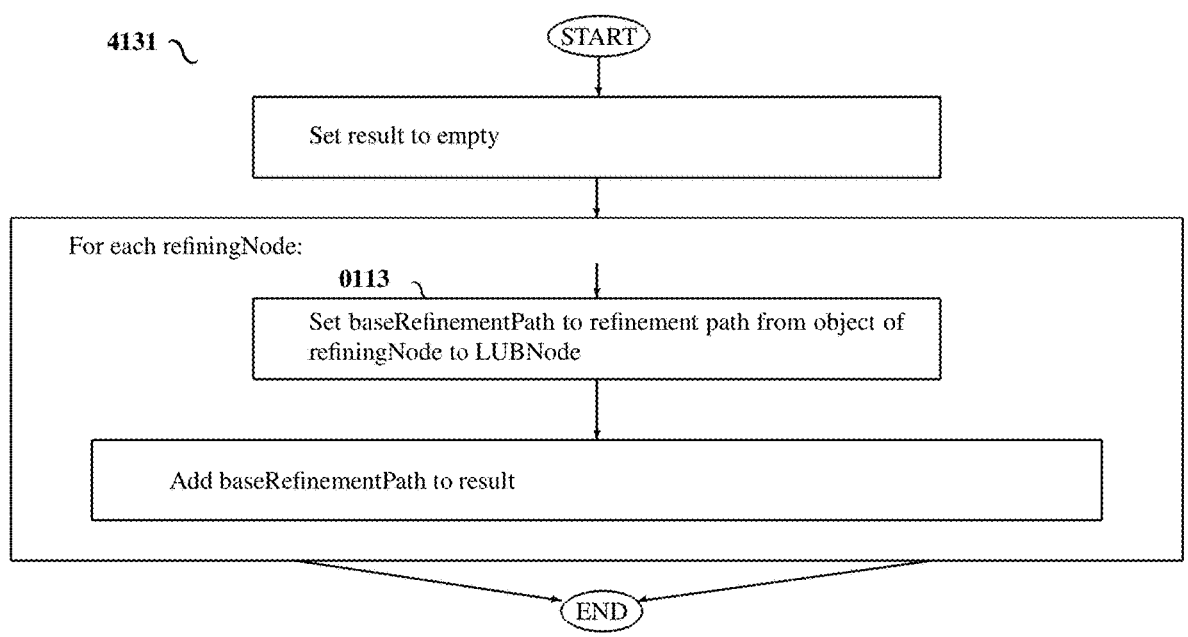

FIG. 122 is a process flow diagram of client action to generate a proof that a generalizing augmentation of a DAG reduced to substructure and context trees without inheritance and with indirect objects satisfies constraints, according to some embodiments.

Figure 123:
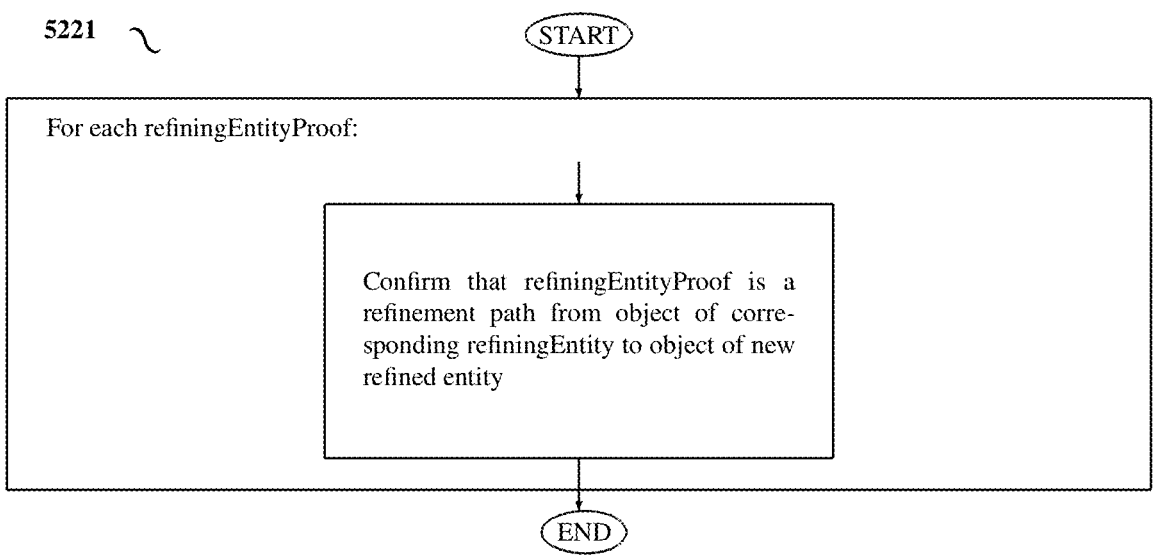

FIG. 123 is a process flow diagram of server action to validate a proof that a generalizing augmentation of a DAG with indirect objects satisfies constraints, according to some embodiments.

Figure 124:
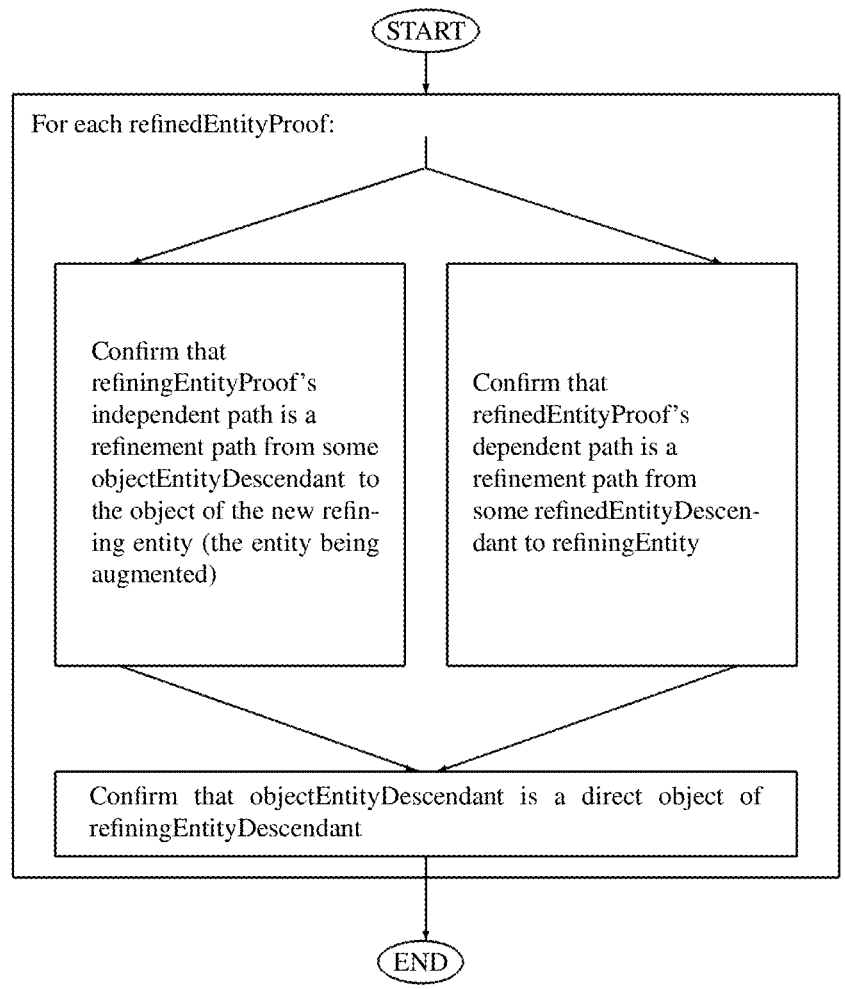

FIG. 124 is a process flow diagram of server action to validate a proof that a generalizing augmentation of a DAG with only direct objects satisfies constraints, according to some embodiments.

Figure 125:
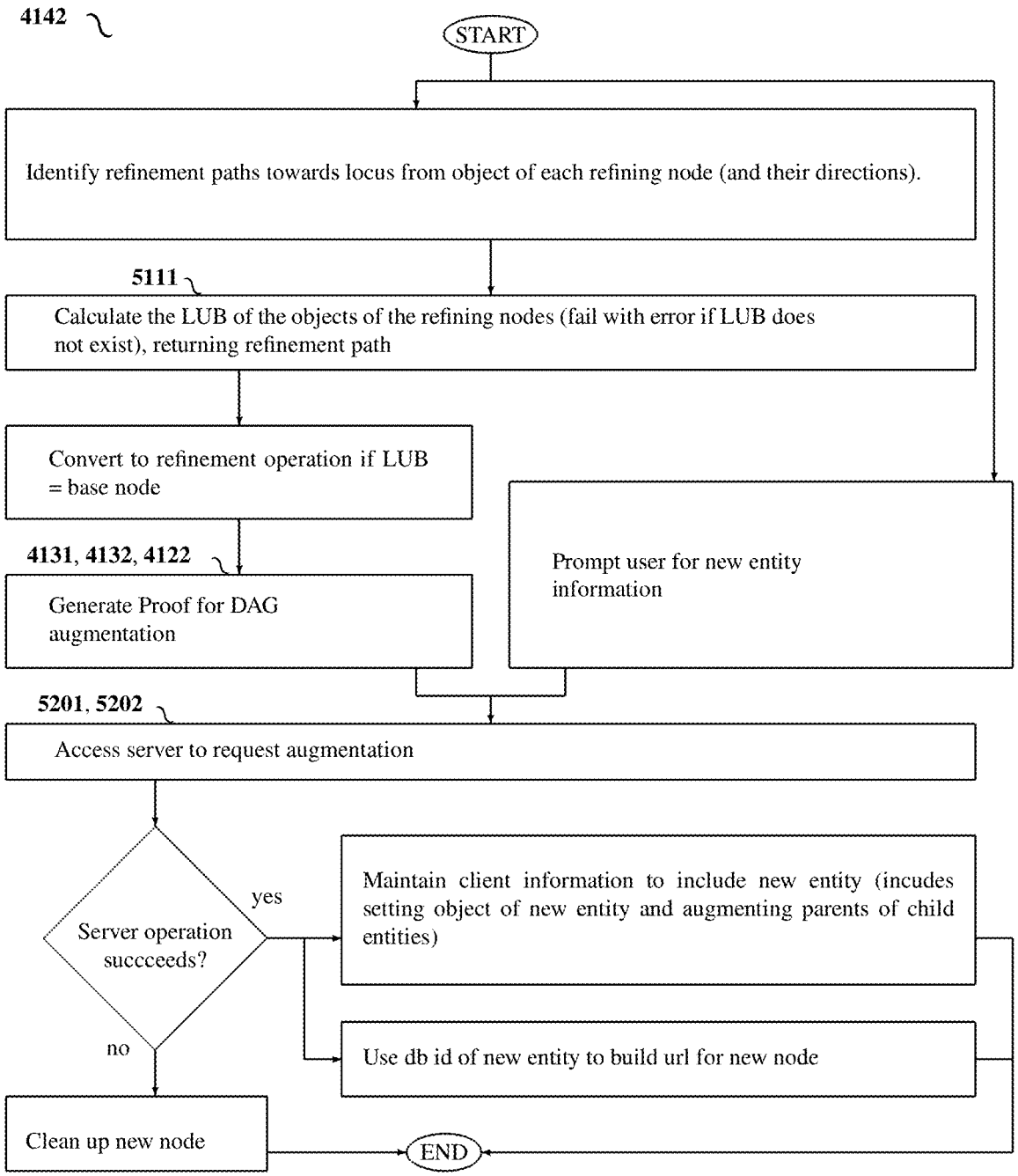

FIG. 125 is a process flow diagram of client action to perform a single cross-kind and generalizing augmentation of a DAG, according to some embodiments.

Figure 126:
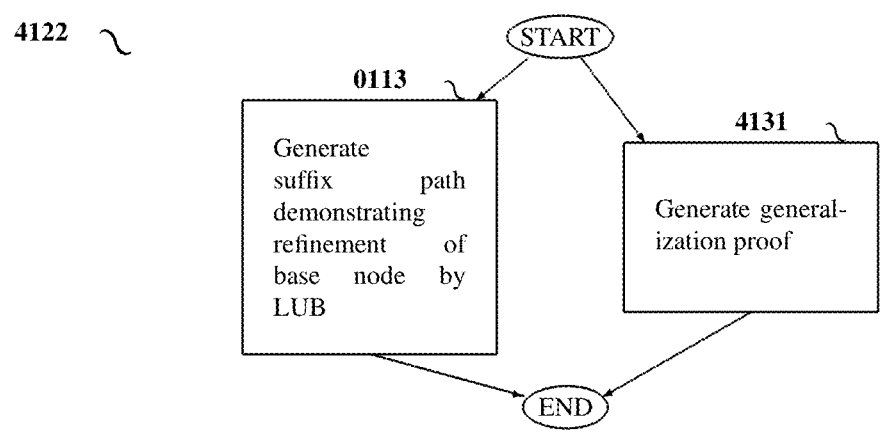

FIG. 126 is a process flow diagram of client action to generate a proof that a cross-kind and generalizing augmentation of a DAG reduced to substructure and context trees without inheritance and with indirect objects satisfies constraints, according to some embodiments.

Figure 127:
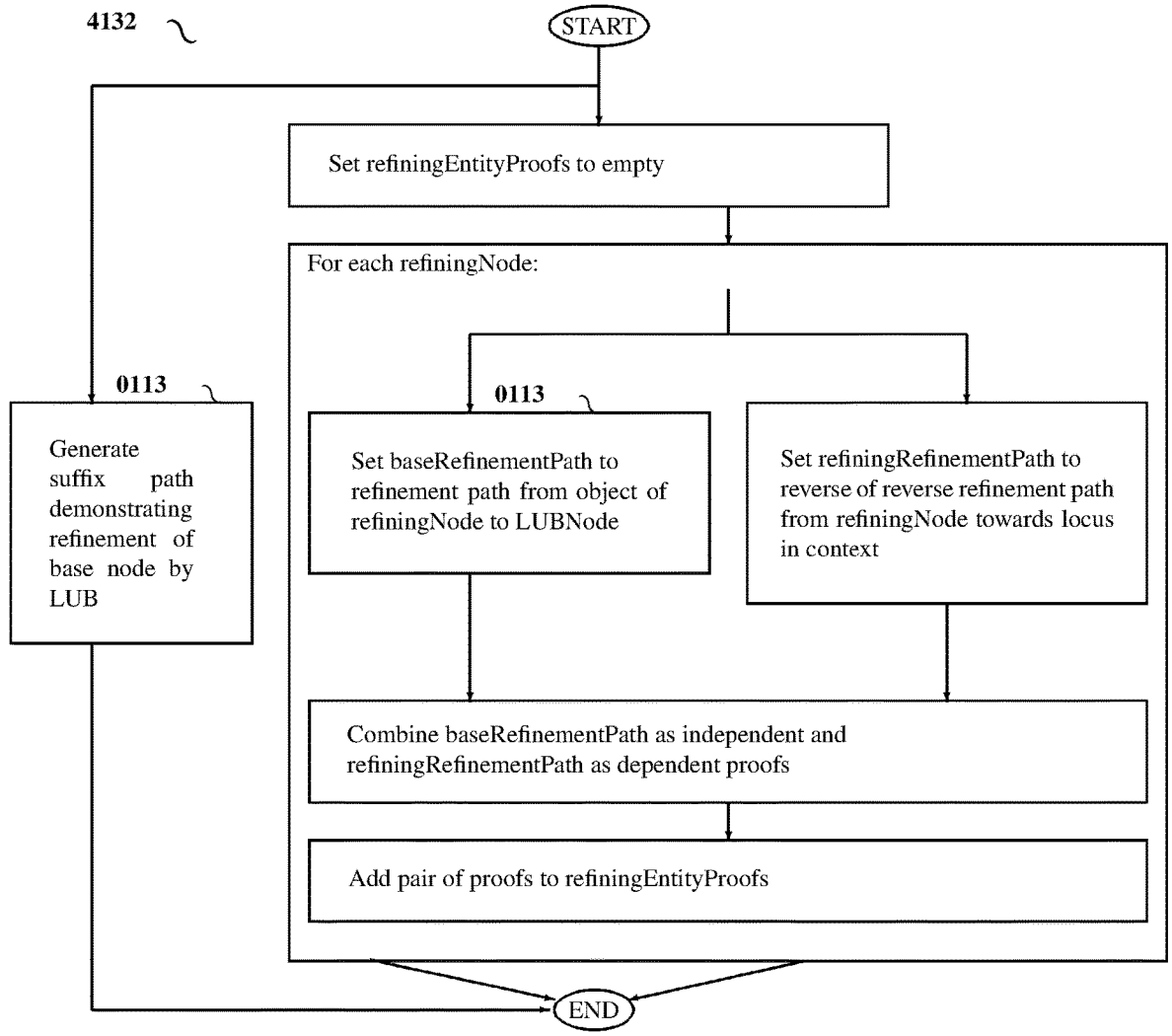

FIG. 127 is a process flow diagram of client action to generate a proof that a cross-kind and generalizing augmentation of a DAG reduced to substructure and context trees without inheritance and with only direct objects satisfies constraints, according to some embodiments.

Figure 128:
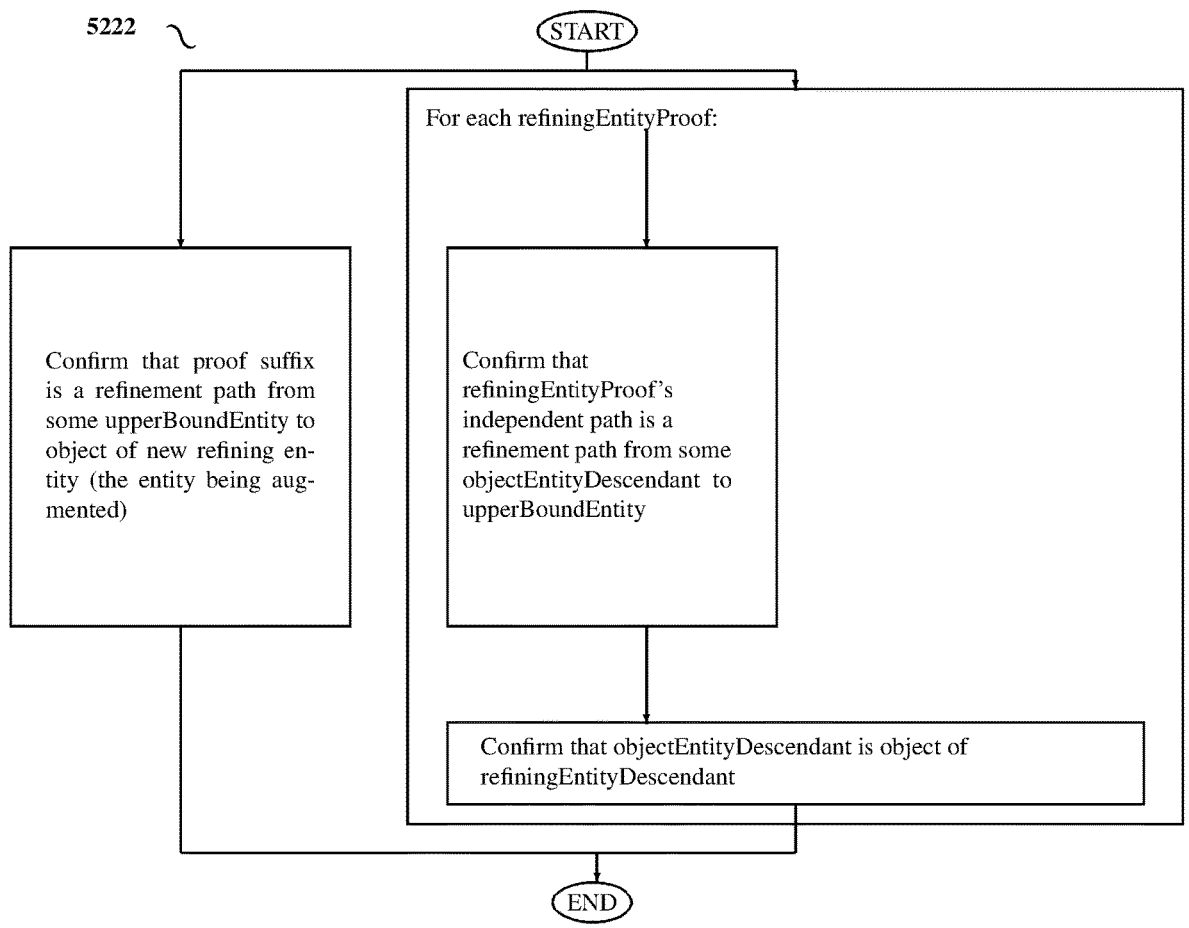

FIG. 128 is a process flow diagram of server action to validate a proof that a cross-kind and generalizing augmentation of a DAG with indirect objects satisfies constraints, according to some embodiments.

Figure 129:
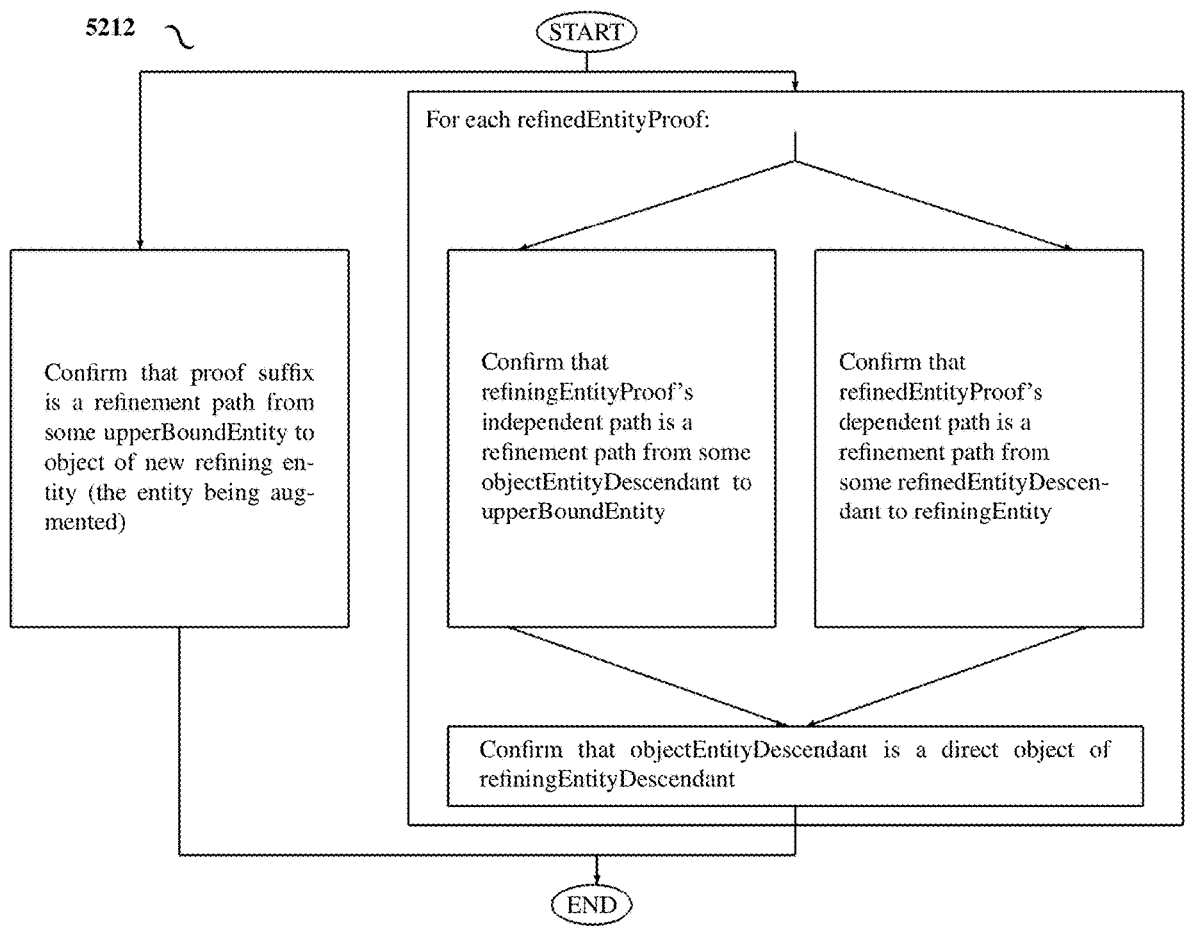

FIG. 129 is a process flow diagram of server action to validate a proof that a cross-kind and generalizing augmentation of a DAG with only direct objects satisfies constraints.

Figure 130:
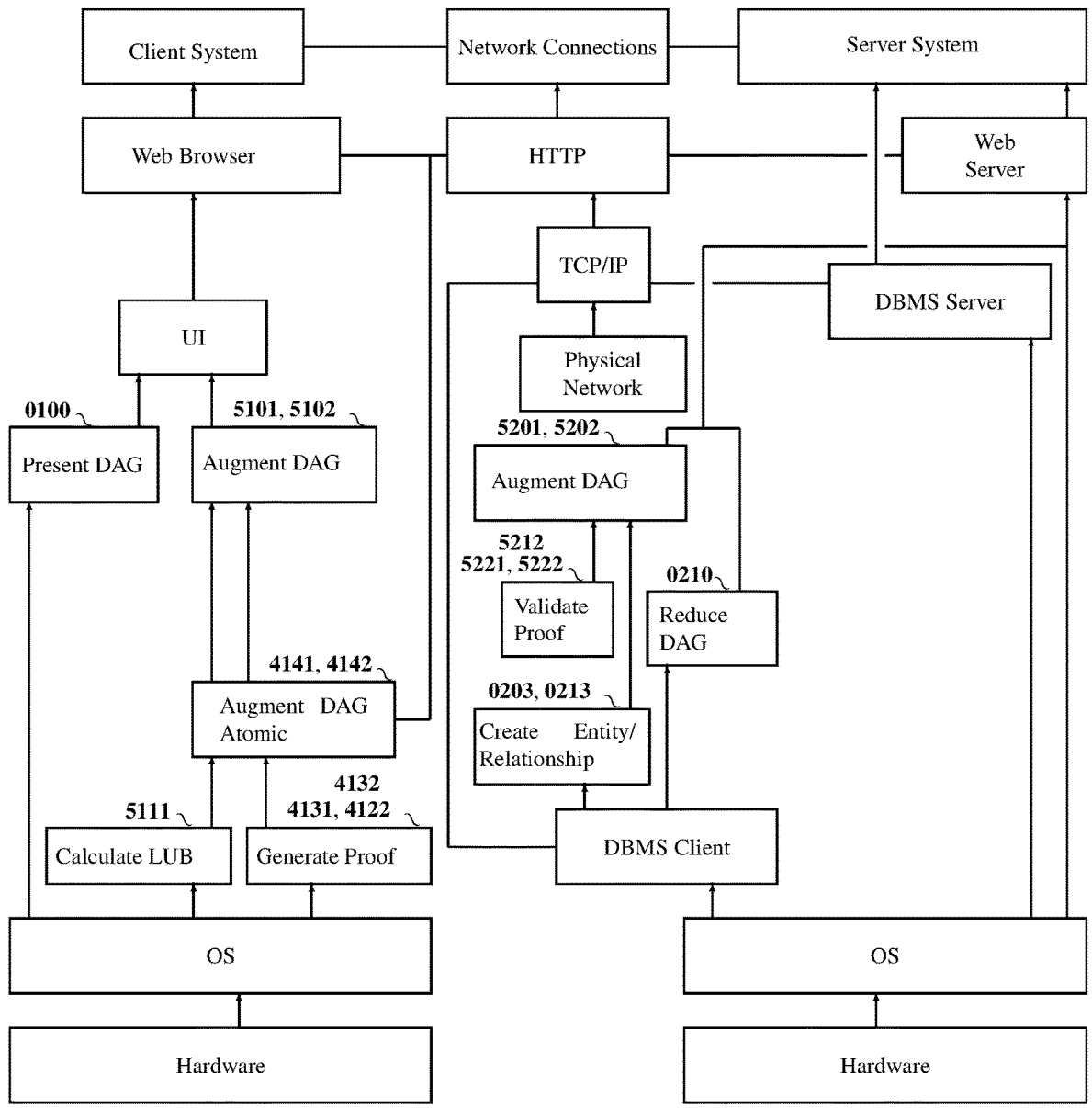

FIG. 130 is a block structure diagram of an embodiment for iterated generalization.

Figure 131:
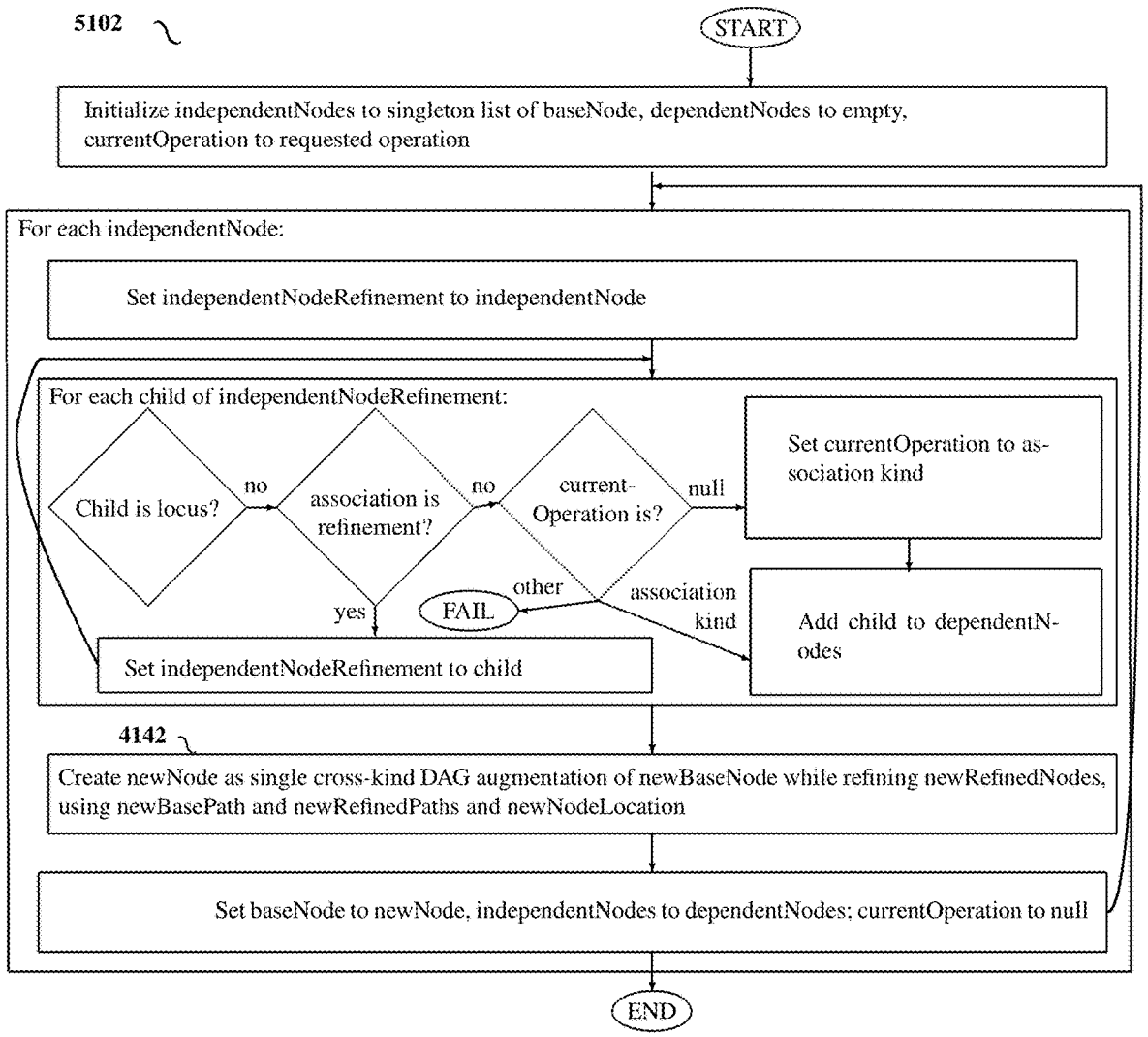

FIG. 131 is a process flow diagram of client action to perform cross-kind and generalizing augmentation of a DAG, according to some embodiments.

Figure 132:
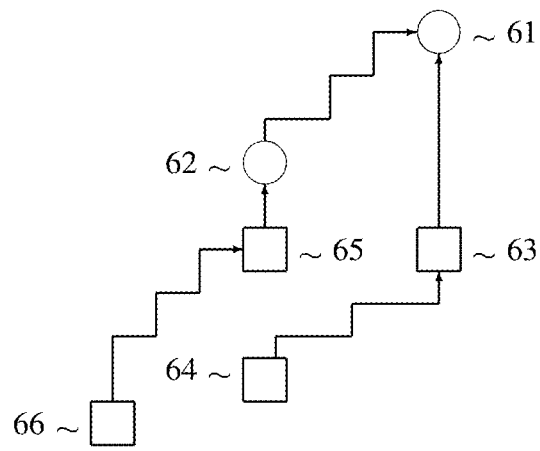

FIG. 132 is a diagram displaying an example DAG with navigation centered on node 61 or 64 and 66, according to some embodiments.

Figure 133:
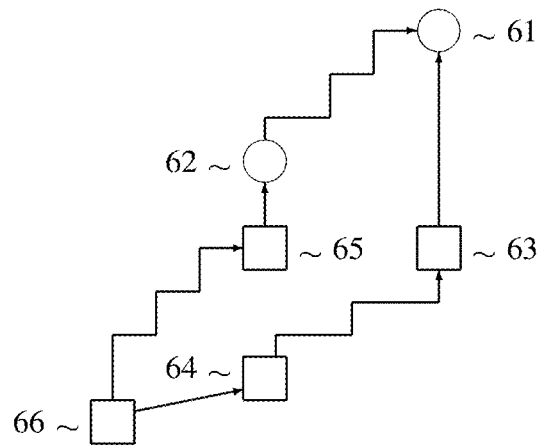

FIG. 133 is a diagram displaying the example DAG from FIG. 132 after creating a refinement association from existing node 66 to existing node 64, according to some embodiments.

Figure 134:
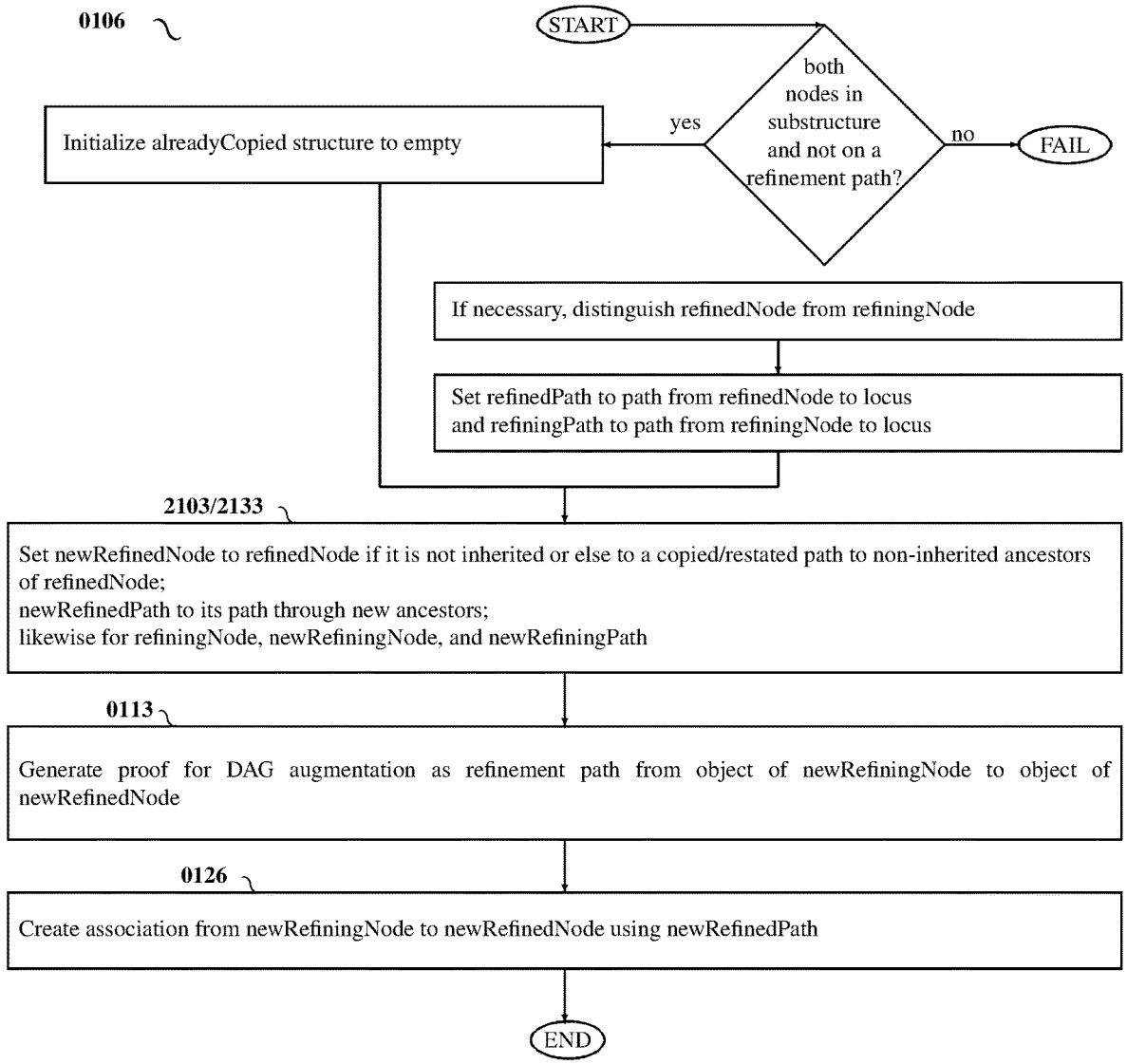

FIG. 134 is a process flow diagram of client action to perform augmentation of a DAG with a refinement association between nodes in the substructure, according to some embodiments.

Figure 135:
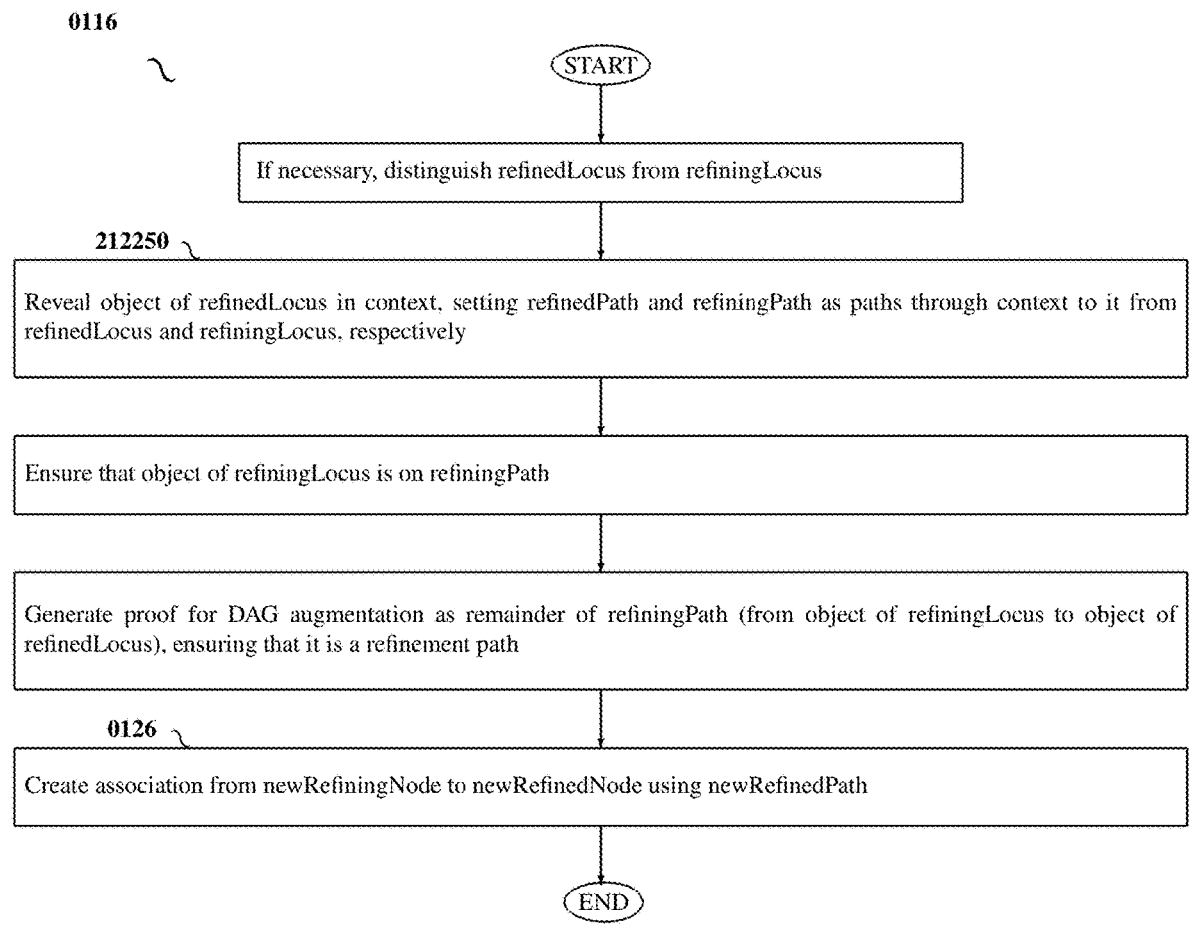

FIG. 135 is a process flow diagram of client action to perform augmentation of a DAG with a refinement association between locus nodes, according to some embodiments.

Figure 136:
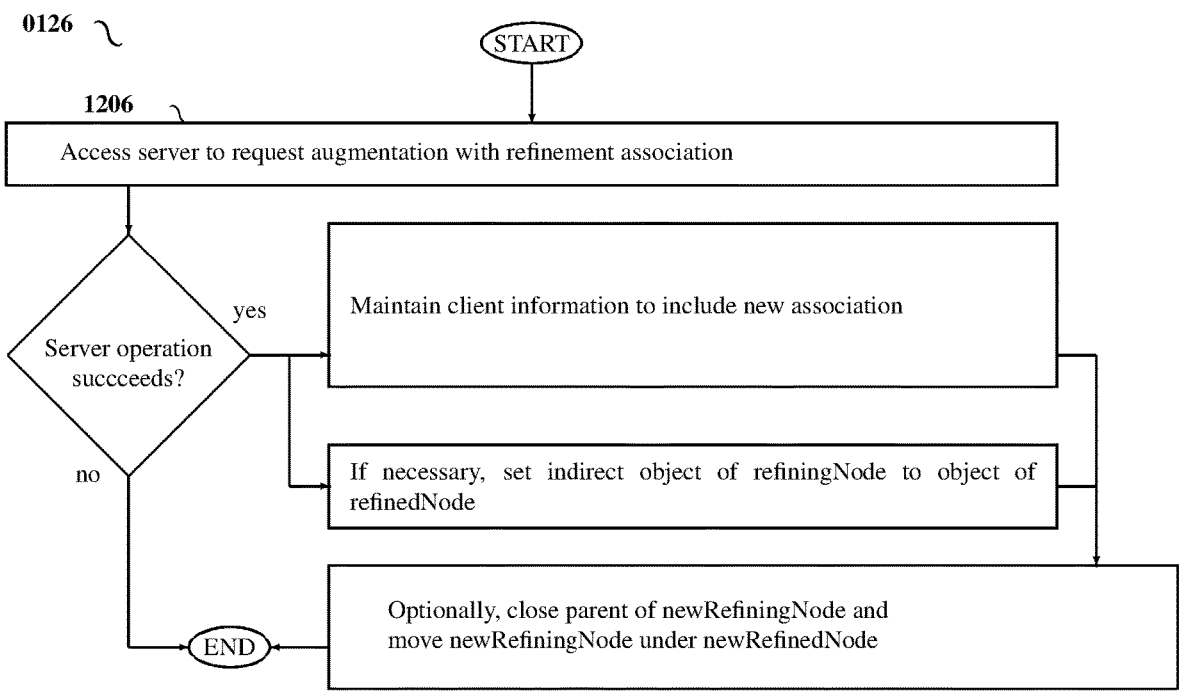

FIG. 136 is a process flow diagram of client action to perform a single augmentation of a DAG by adding a refinement association between existing entities, according to some embodiments.

Figure 137:
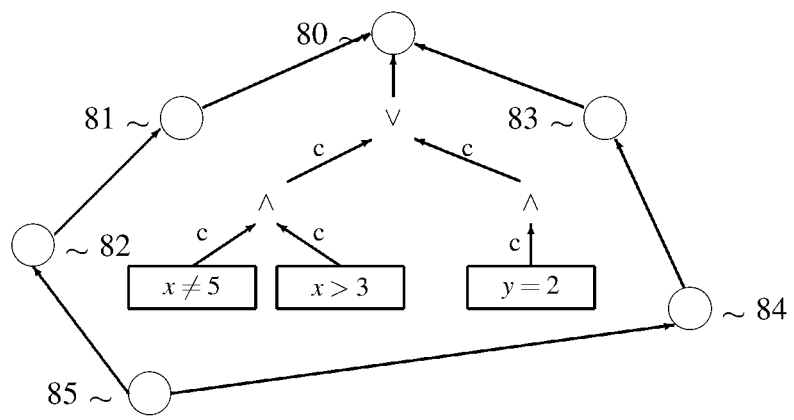

FIG. 137 is an initial global example DAG for describing the representation of conditions in data measure problems, according to some embodiments.

Figure 138:
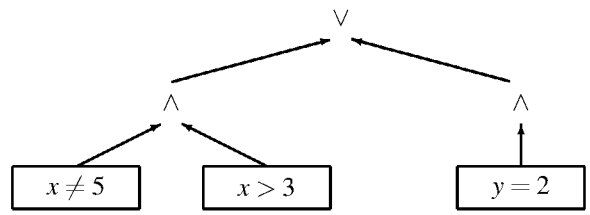

FIG. 138 is a local condition DAG for the example of FIG. 137 in navigation at node 80, according to some embodiments.

Figure 139:
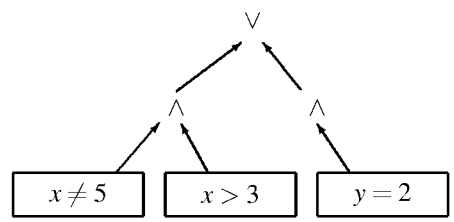

FIG. 139 is a local condition DAG for the example of FIG. 137 in navigation at node 81, before application of Specialize Terms, according to some embodiments.

Figure 140:
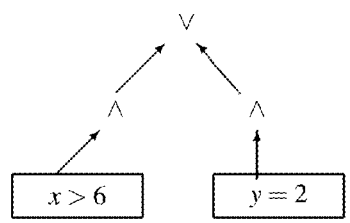

FIG. 140 is a local condition DAG for the example of FIG. 137 in navigation at node 81, after application of Specialize Terms (and later operations), according to some embodiments.

Figure 141:
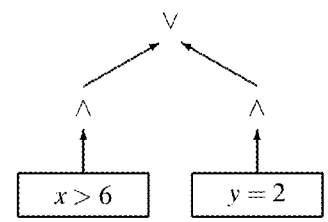

FIG. 141 is a local condition DAG for the example of FIG. 137 in navigation at node 82, before application of Remove Disjunct, according to some embodiments.

Figure 142:
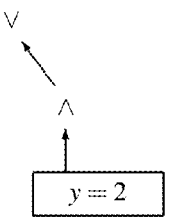

FIG. 142 is a local condition DAG for the example of FIG. 137 in navigation at node 82, after application of Remove Disjunct (and later operations), according to some embodiments.

Figure 143:
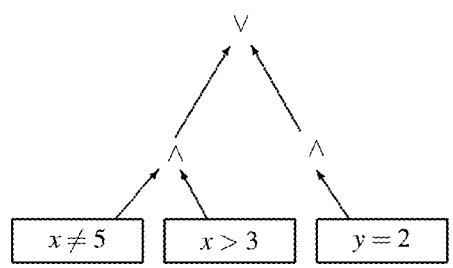

FIG. 143 is a local condition DAG for the example of FIG. 137 in navigation at node 83, before application of Add Conjunct, according to some embodiments.

Figure 144:
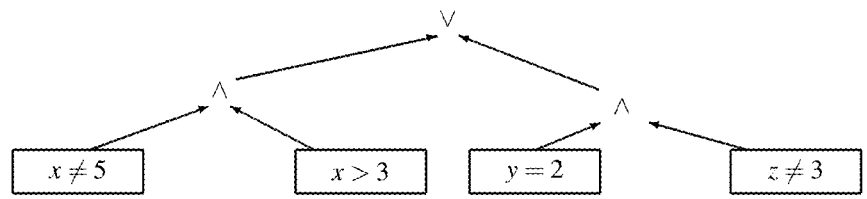

FIG. 144 is a local condition DAG for the example of FIG. 137 in navigation at node 83, after application of Add Conjunct (and later operations), according to some embodiments.

Figure 145:
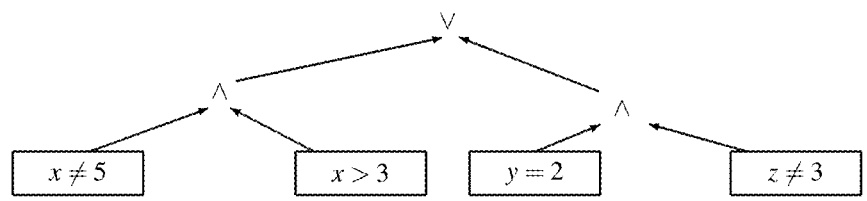

FIG. 145 is a local condition DAG for the example of FIG. 137 in navigation at node 84, before application of Merge Disjuncts, according to some embodiments.

Figure 146:
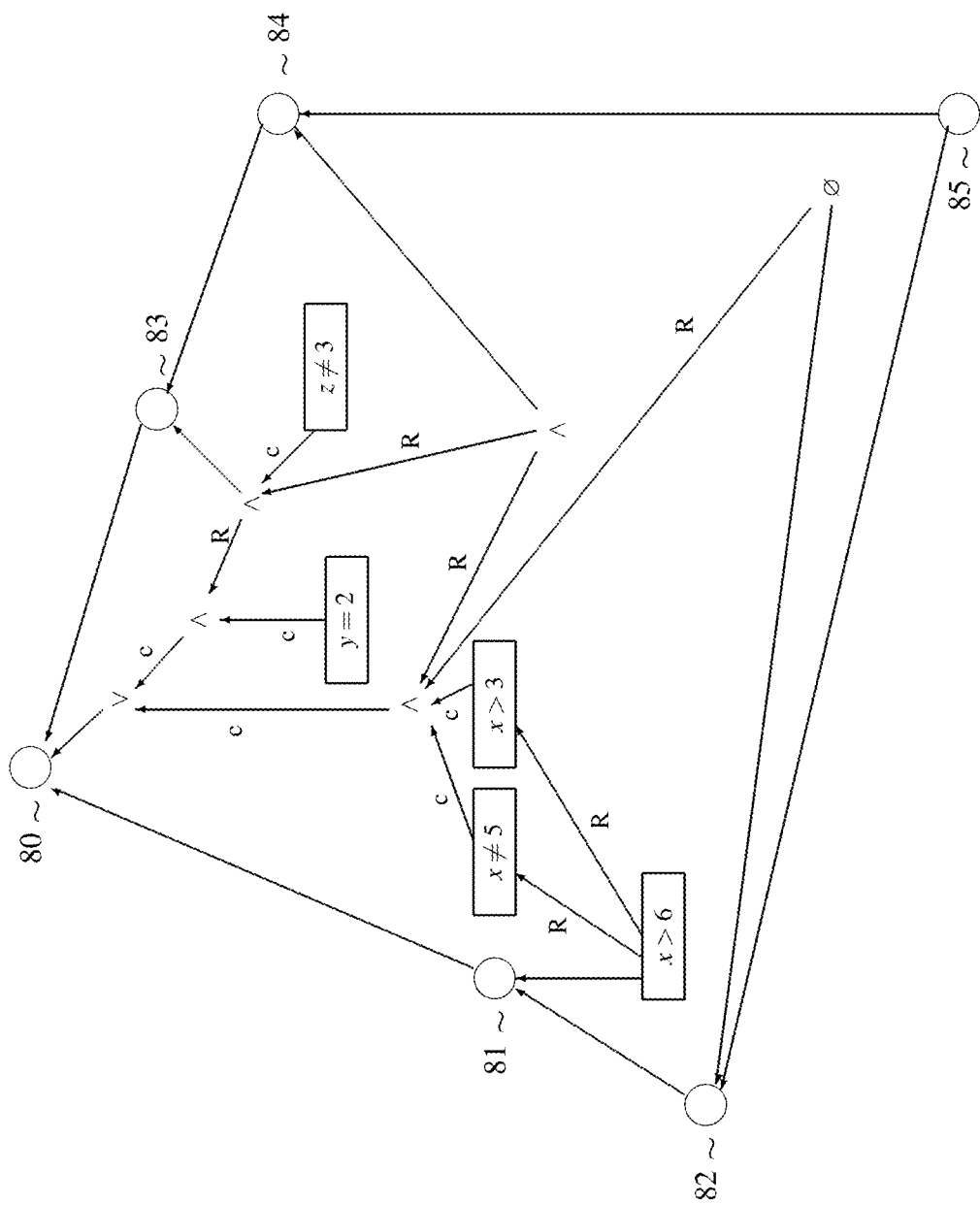

FIG. 146 is the final global DAG for the example of FIG. 137, according to some embodiments.

Figure 147:
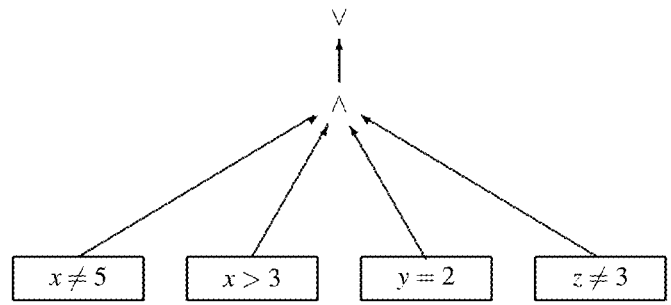

FIG. 147 is a local condition DAG for the example of FIG. 137 in navigation at node 84, after application of Merge Disjuncts (and later operations), according to some embodiments.

Figure 148:
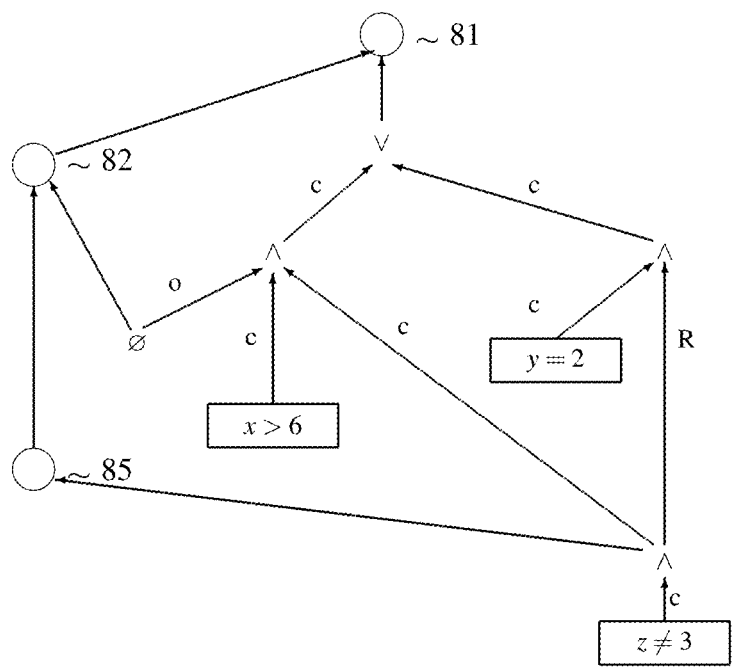

FIG. 148 is a final local DAG for the example of FIG. 137 in navigation at node 81, according to some embodiments.

Figure 149:
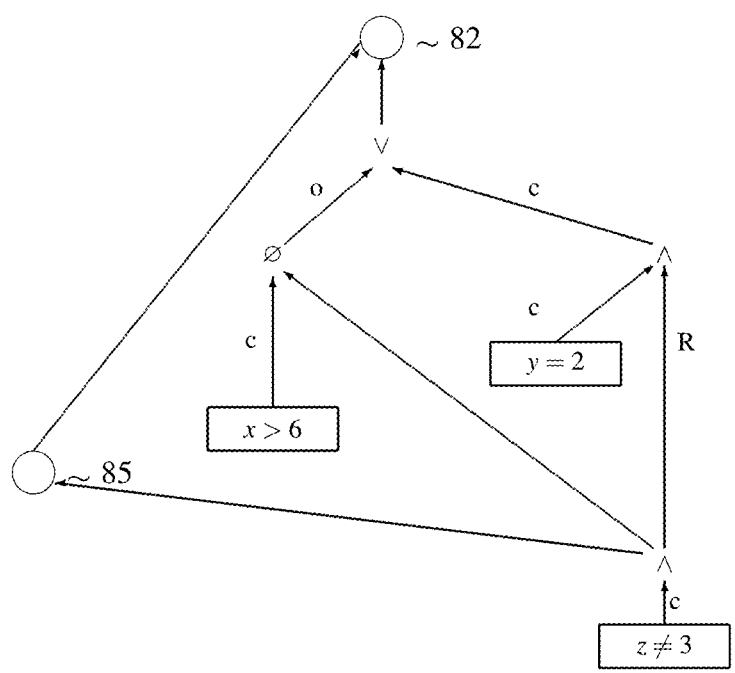

FIG. 149 is a final local DAG for the example of FIG. 137 in navigation at node 82, according to some embodiments.

Figure 150:
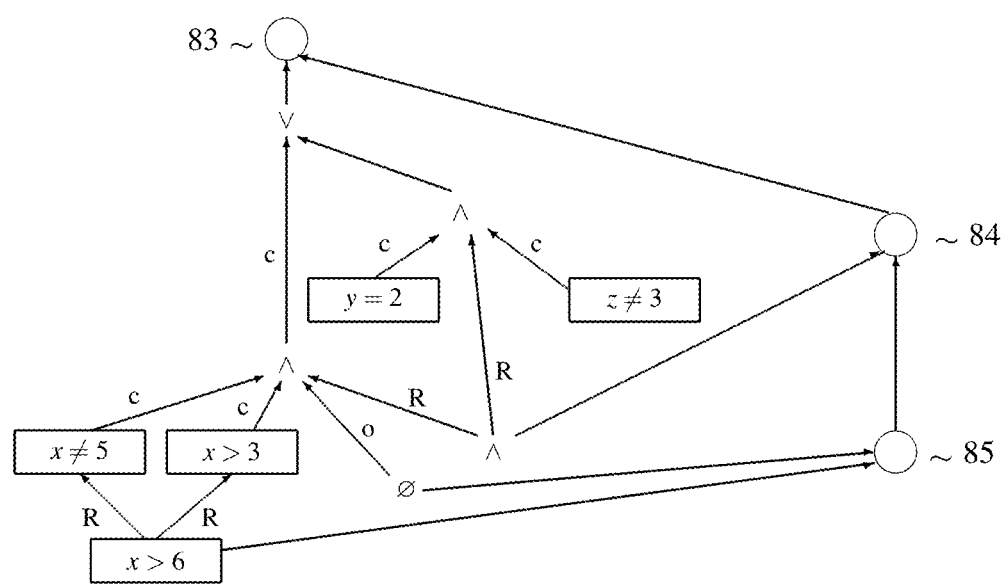

FIG. 150 is a final local DAG for the example of FIG. 137 in navigation at node 83, according to some embodiments.

Figure 151:
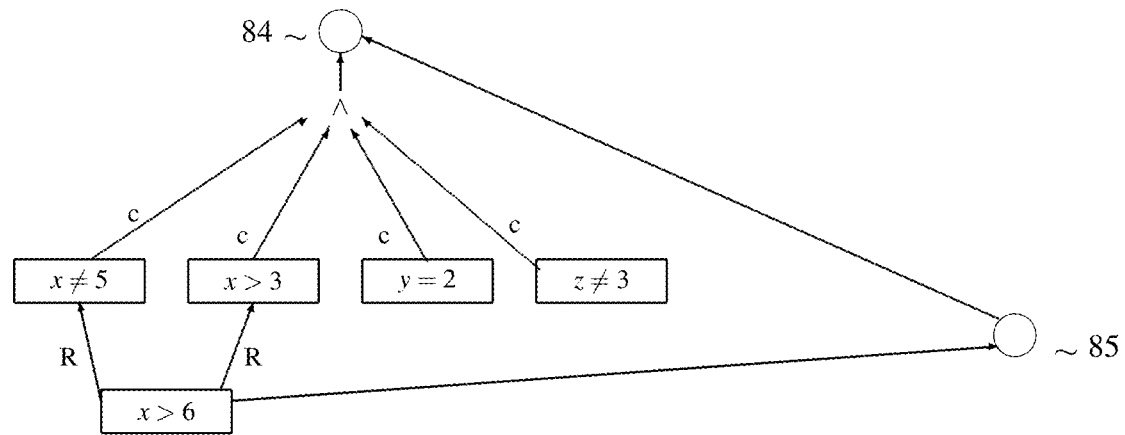

FIG. 151 is a final local DAG for the example of FIG. 137 in navigation at node 84, according to some embodiments.

Figure 152:
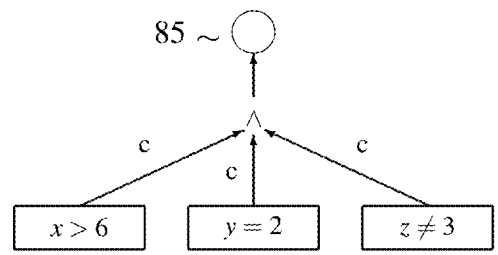

FIG. 152 is a final local DAG for the example of FIG. 137 in navigation at node 85, according to some embodiments.

Figure 153:
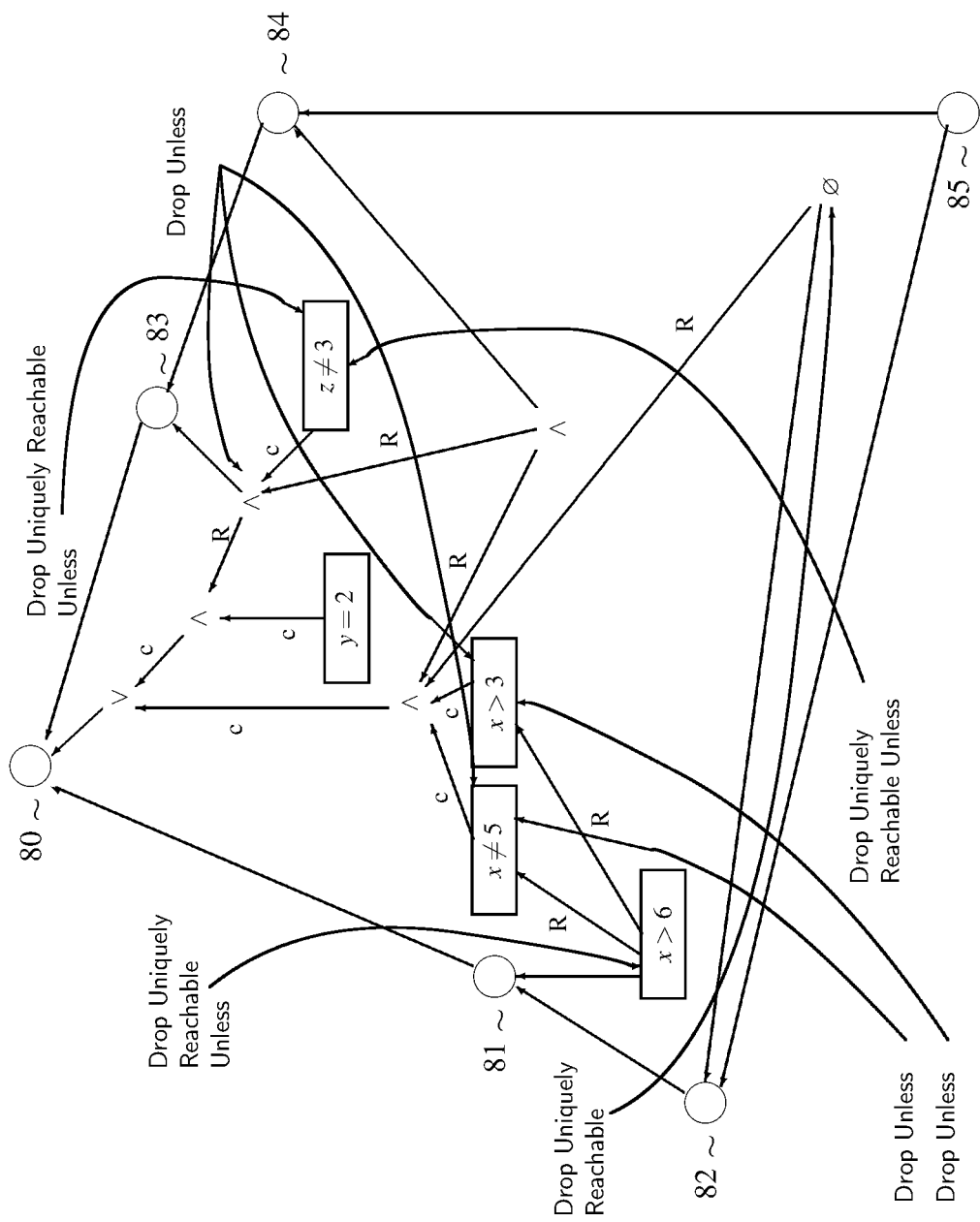

FIG. 153 is the final global DAG for the example of FIG. 137, with arcs labeled with directives for reducing the data item set, according to some embodiments.

Figure 154:
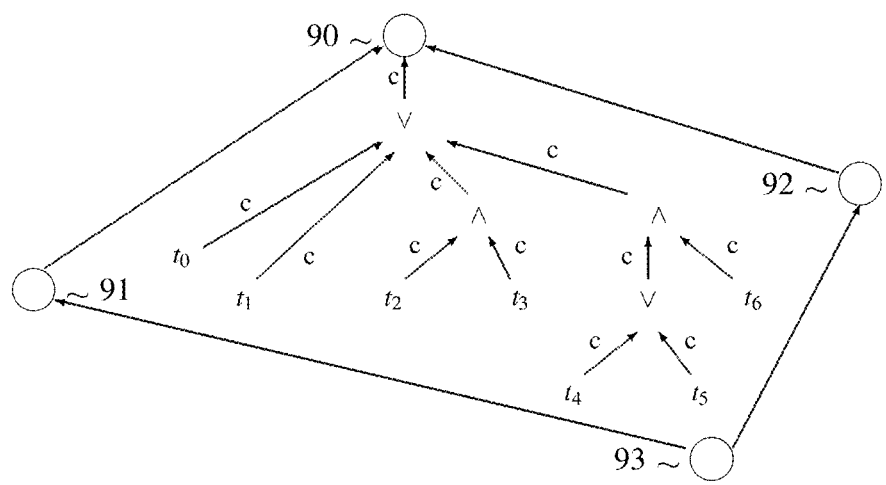

FIG. 154 is a second initial global example DAG for describing the representation of conditions in data measure problems, according to some embodiments.

Figure 155:
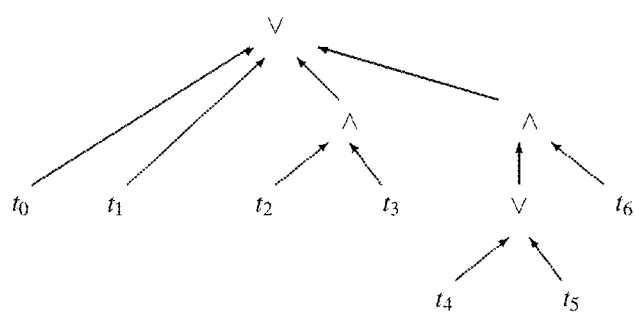

FIG. 155 is a local condition DAG for the example of FIG. 154 in navigation at node 90, according to some embodiments.

Figure 156:
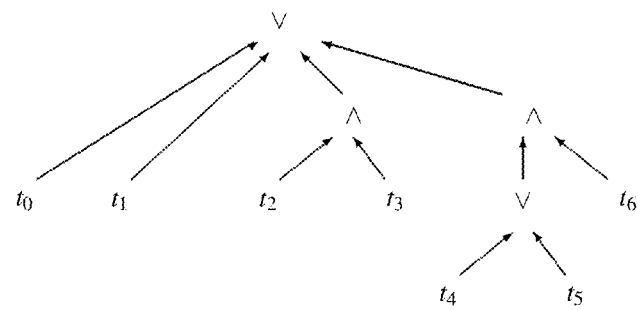

FIG. 156 is a local condition DAG for the example of FIG. 154 in navigation at node 91, before application of Conjoin Disjuncts, according to some embodiments.

Figure 157:
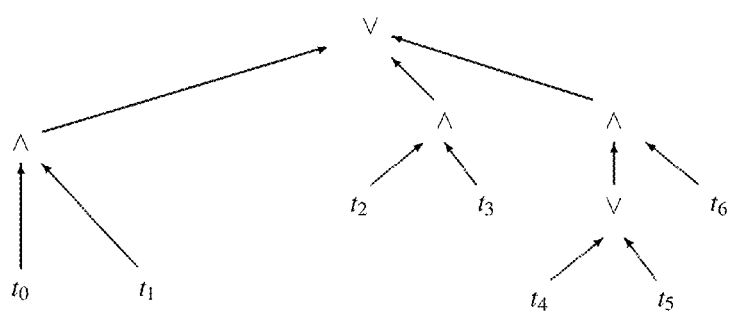

FIG. 157 is a local condition DAG for the example of FIG. 154 in navigation at node 91, after application of Conjoin Disjuncts (and later operations), according to some embodiments.

Figure 158:
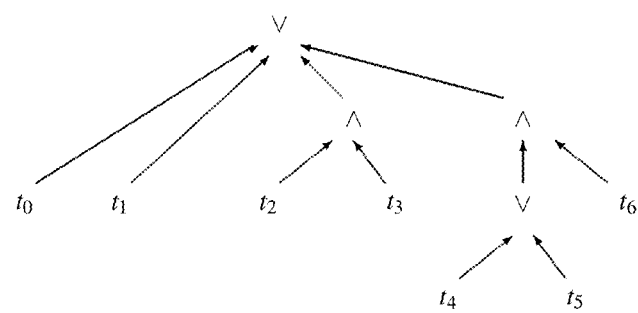

FIG. 158 is a local condition DAG for the example of FIG. 154 in navigation at node 92, before application of Embed Conjunction, according to some embodiments.

Figure 159:
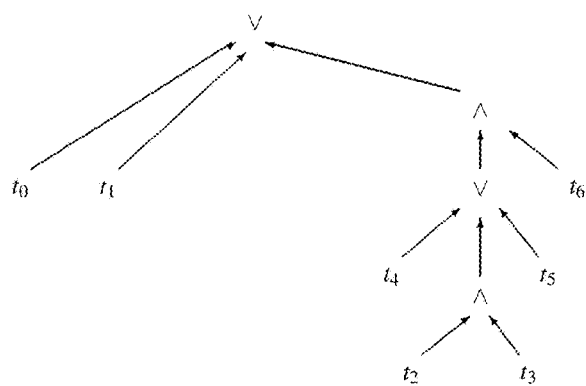

FIG. 159 is a local condition DAG for the example of FIG. 154 in navigation at node 92, after application of Embed Conjunction (and later operations), according to some embodiments.

Figure 160:
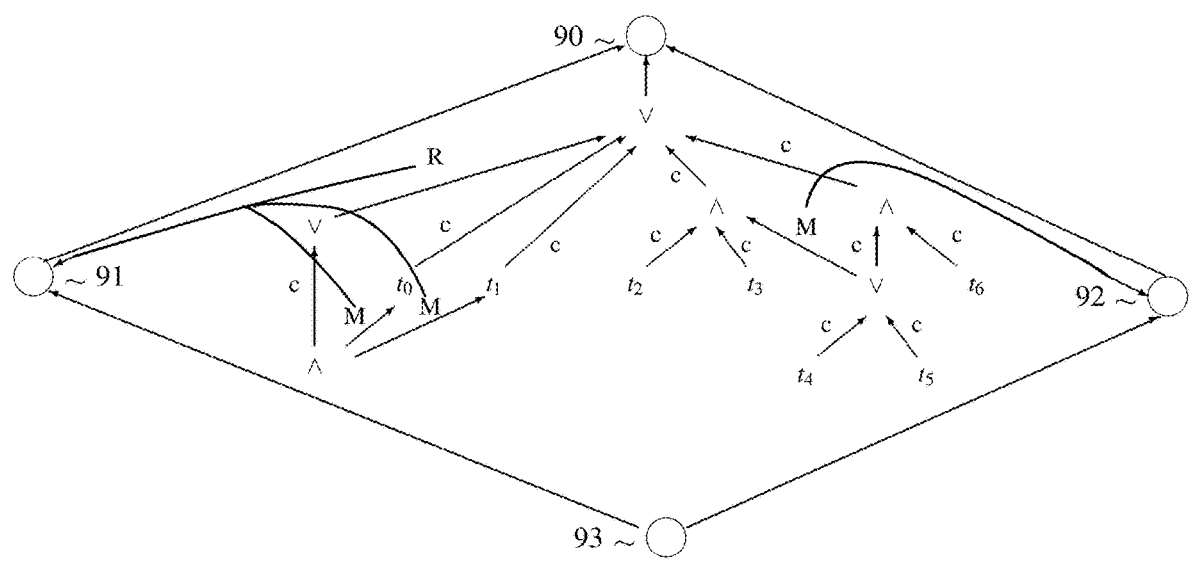

FIG. 160 is the final global DAG for the example of FIG. 154, according to some embodiments.

Figure 161:
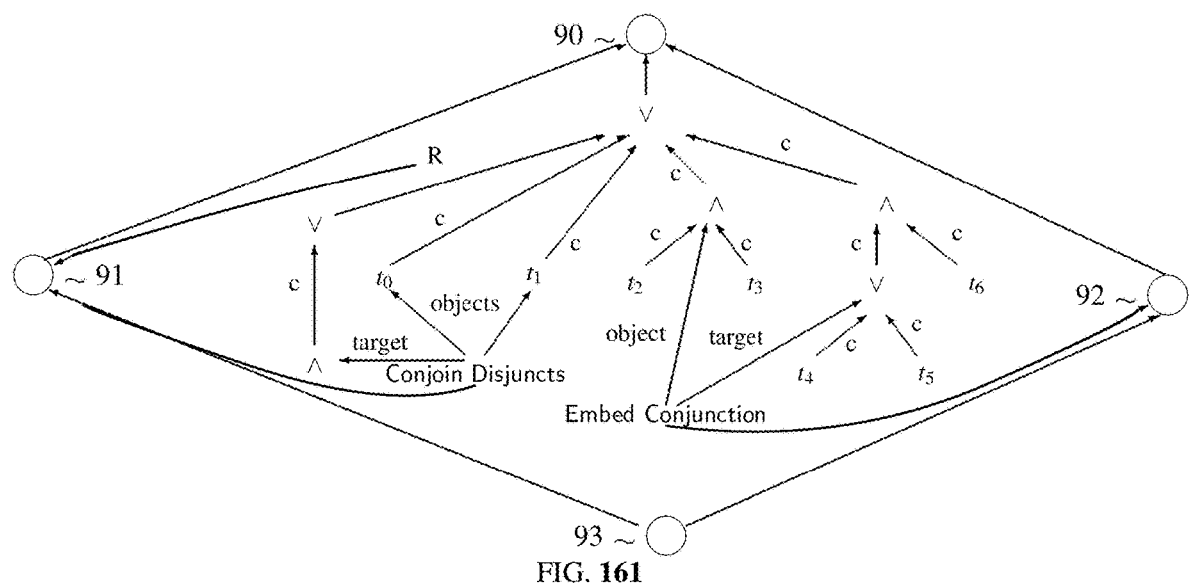

FIG. 161 is an alternate version of the final global DAG for the example of FIG. 154, using movement operator nodes, according to some embodiments.

Figure 162:
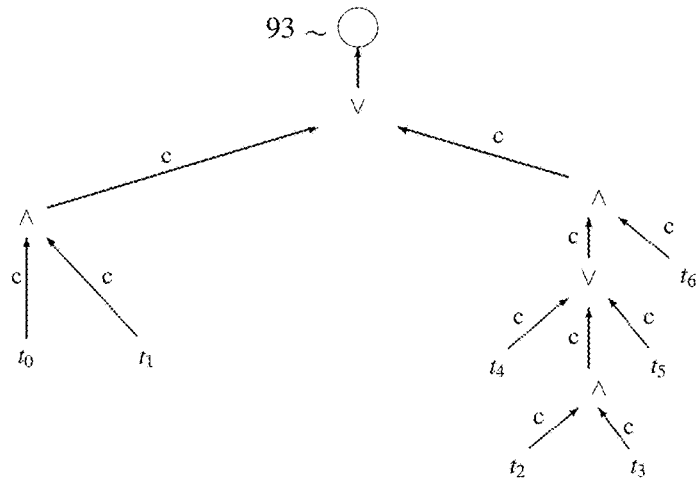

FIG. 162 is a final local DAG for the example of FIG. 154 in navigation at node 93, according to some embodiments.

Figure 163:

FIG. 163 is a project screen for the social innovation example with initial problem and solution, according to some embodiments.

Figure 164:
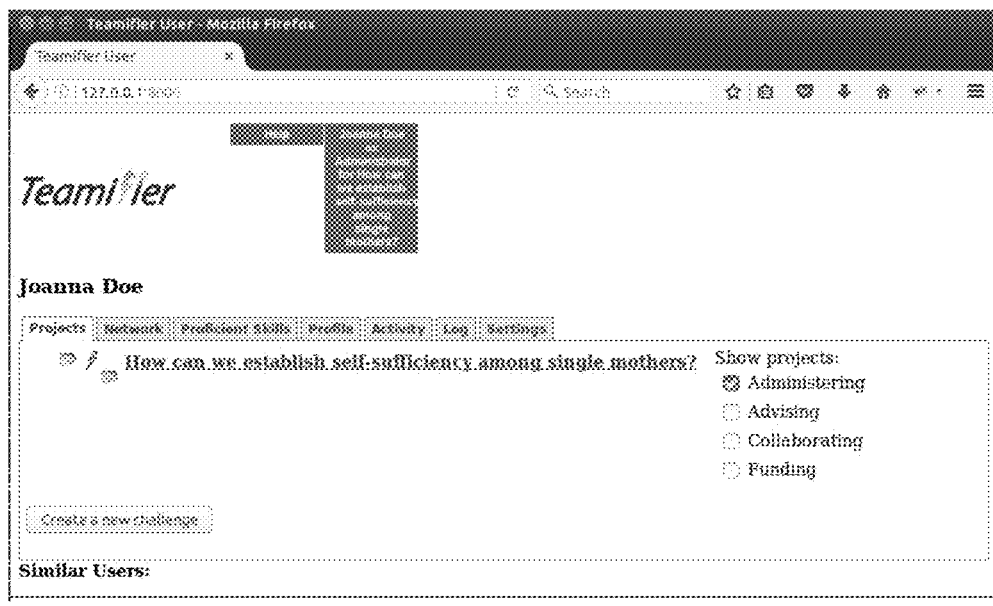

FIG. 164 is a user screen with a specializing problem not yet related to the first, according to some embodiments.

Figure 165:
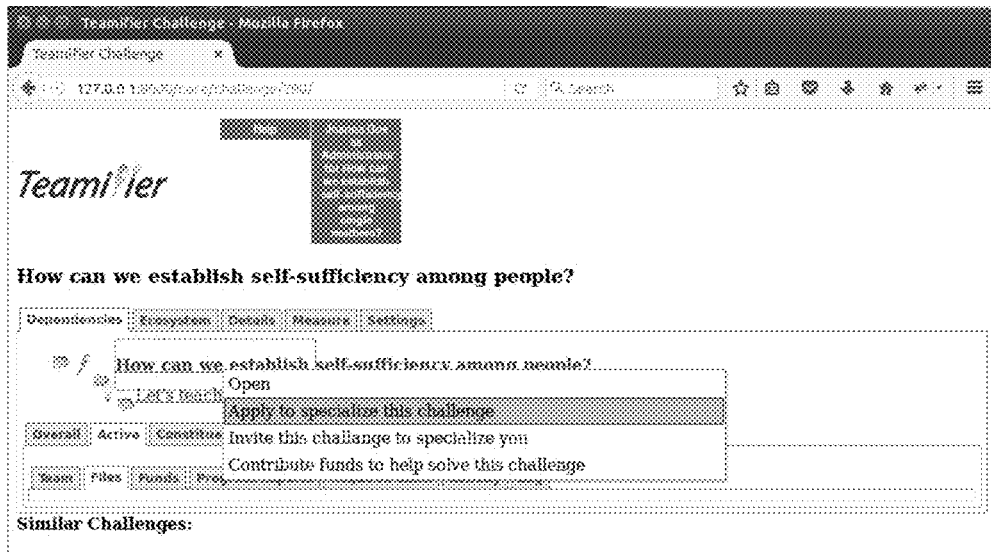

FIG. 165 is a project screen selecting the operation of applying to specialize a problem, according to some embodiments.

Figure 166:
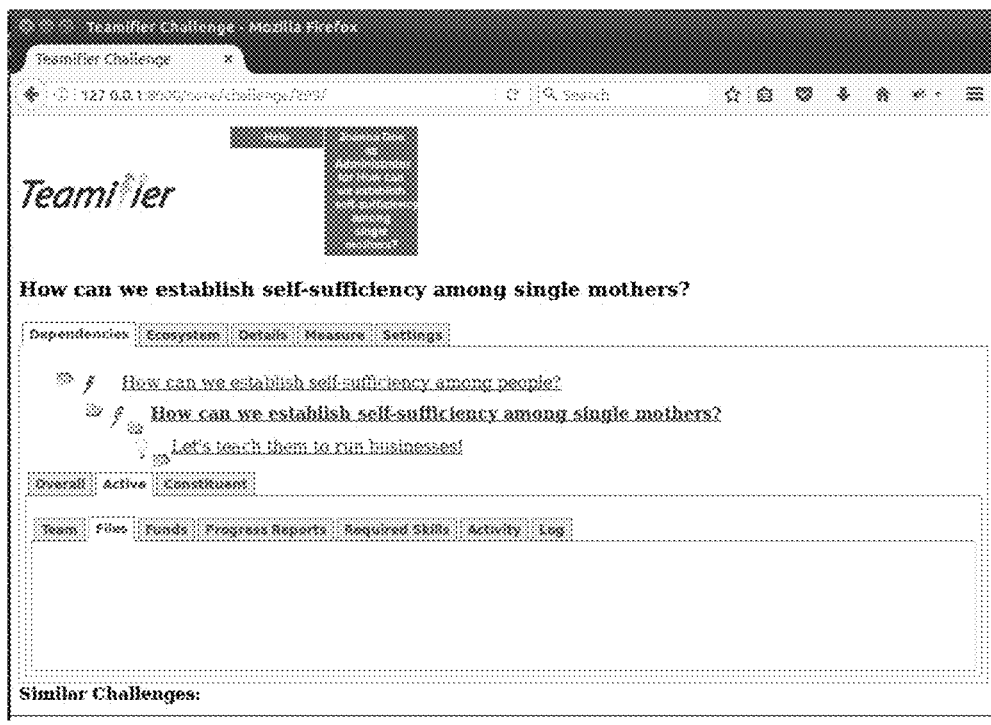

FIG. 166 is a project screen showing the now-related external generalizing problem and inherited solution, according to some embodiments.

Figure 167:
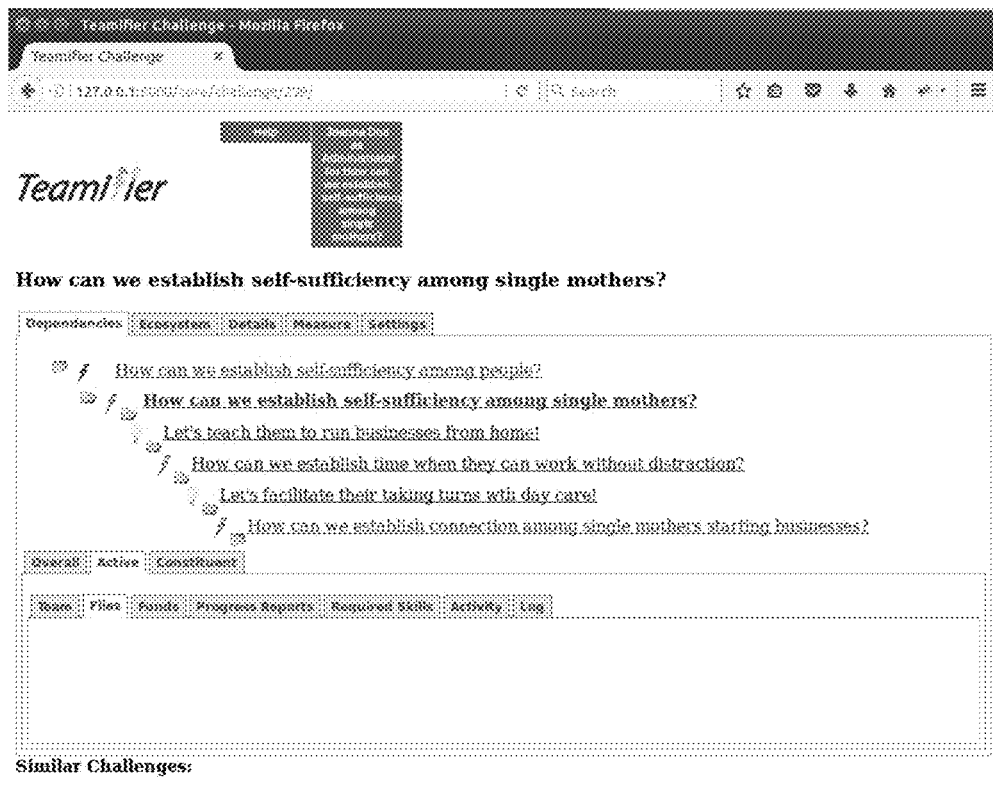

FIG. 167 is a project screen after the inherited solution has been restated and additional augmentation applied, according to some embodiments.

Figure 168:
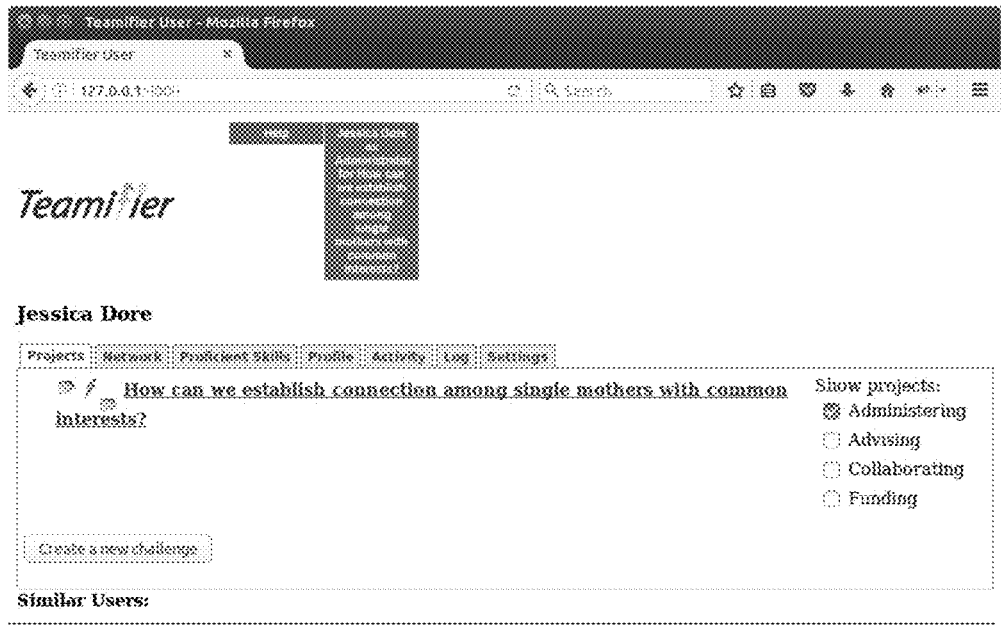

FIG. 168 is a user screen with a generalizing problem not yet related, according to some embodiments.

Figure 169:
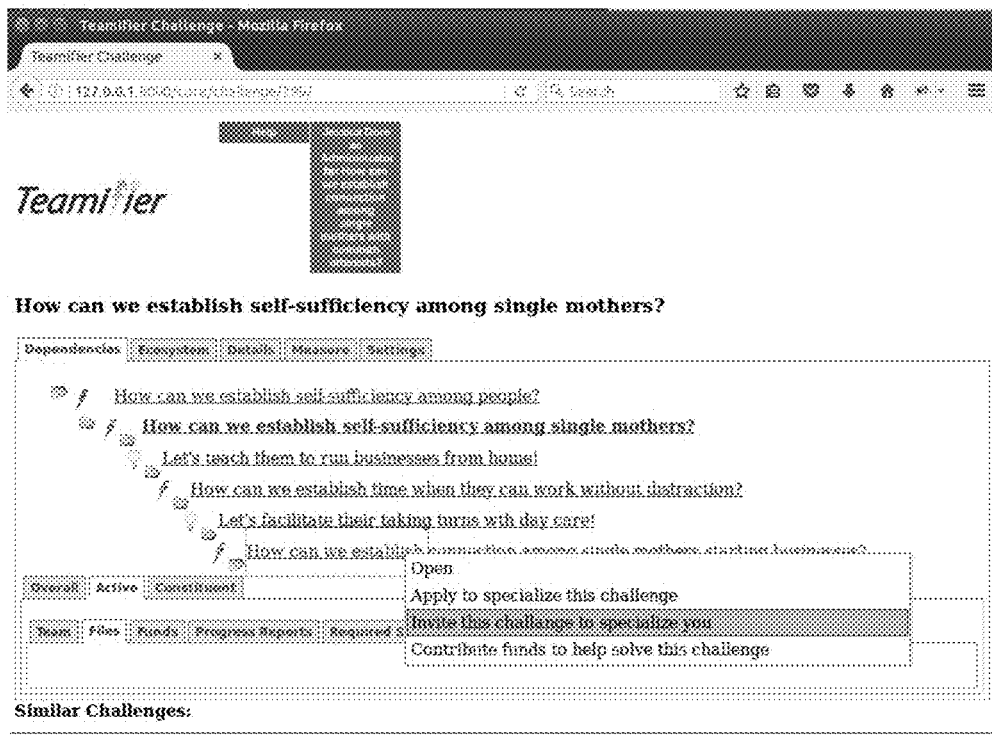

FIG. 169 is a project screen selecting the operation of inviting another problem to specialize, according to some embodiments.

Figure 170:
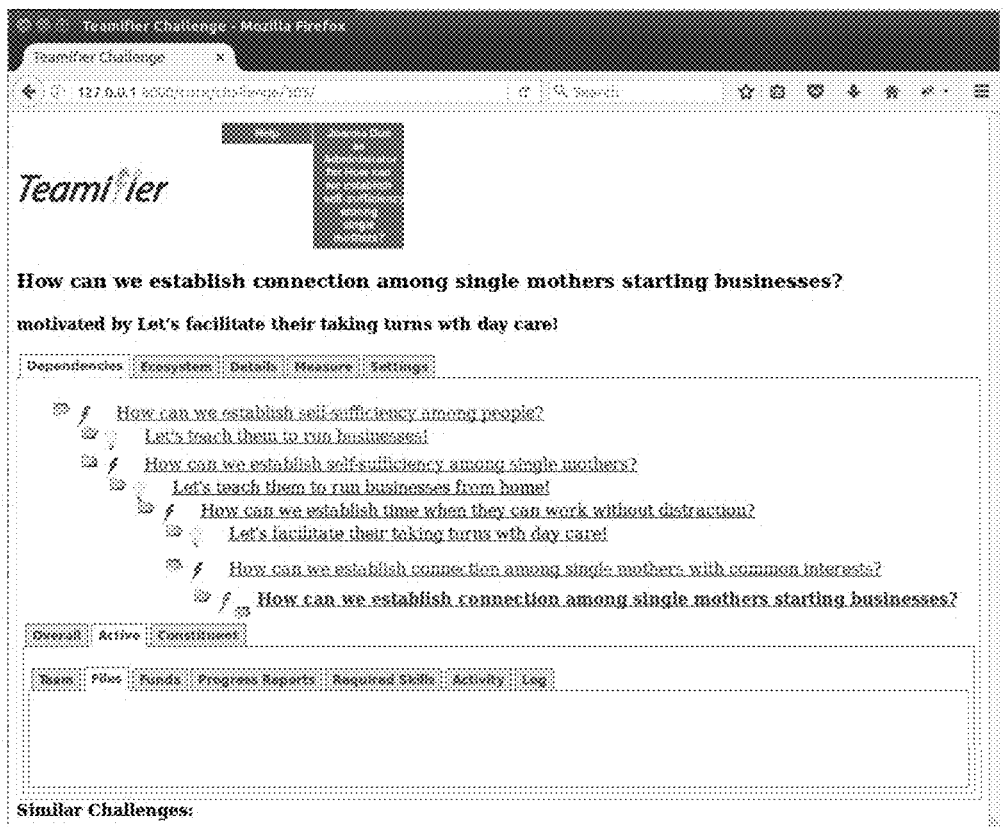

FIG. 170 is the specializing project screen dependencies tab after the social innovation example, according to some embodiments.

Figure 171:
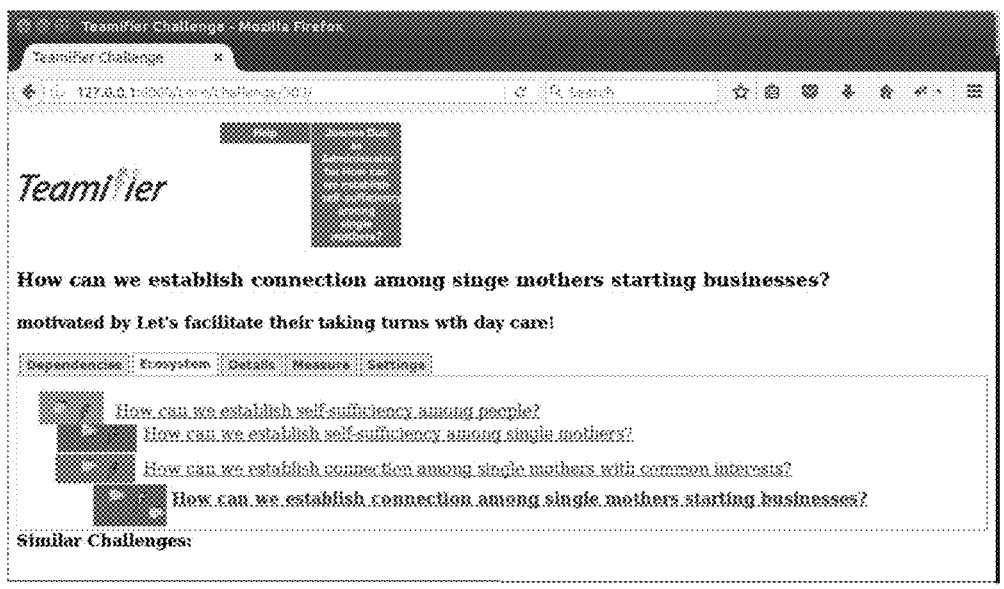

FIG. 171 is the specializing project screen ecosystem tab after the social innovation example, according to some embodiments.

Figure 172:
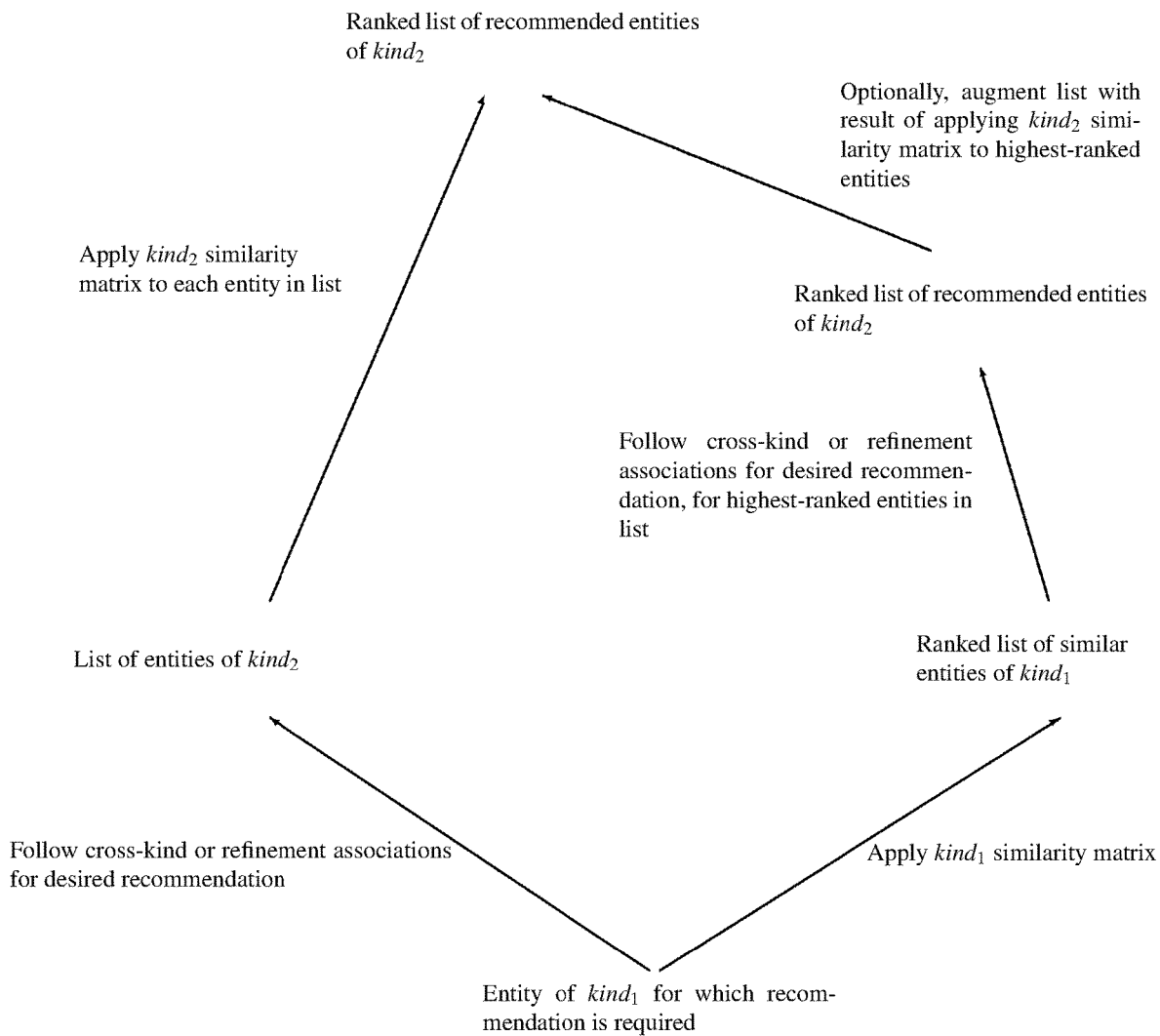

FIG. 172 presents the high-level structure of the recommendation process, according to some embodiments.

Figure 173:
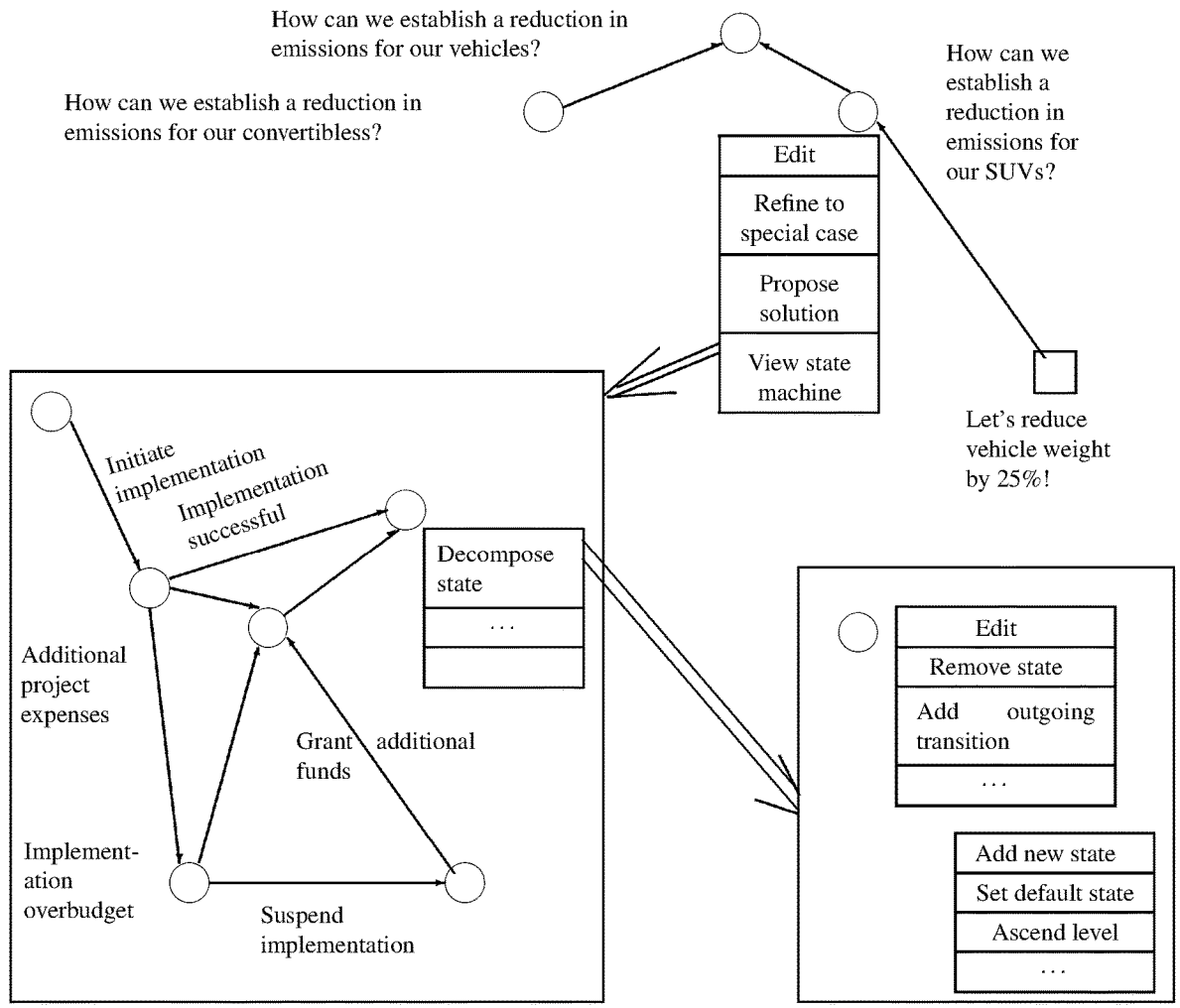

FIG. 173 presents a sample user interface for associating state machines with problems, according to some embodiments.

Figure 174:
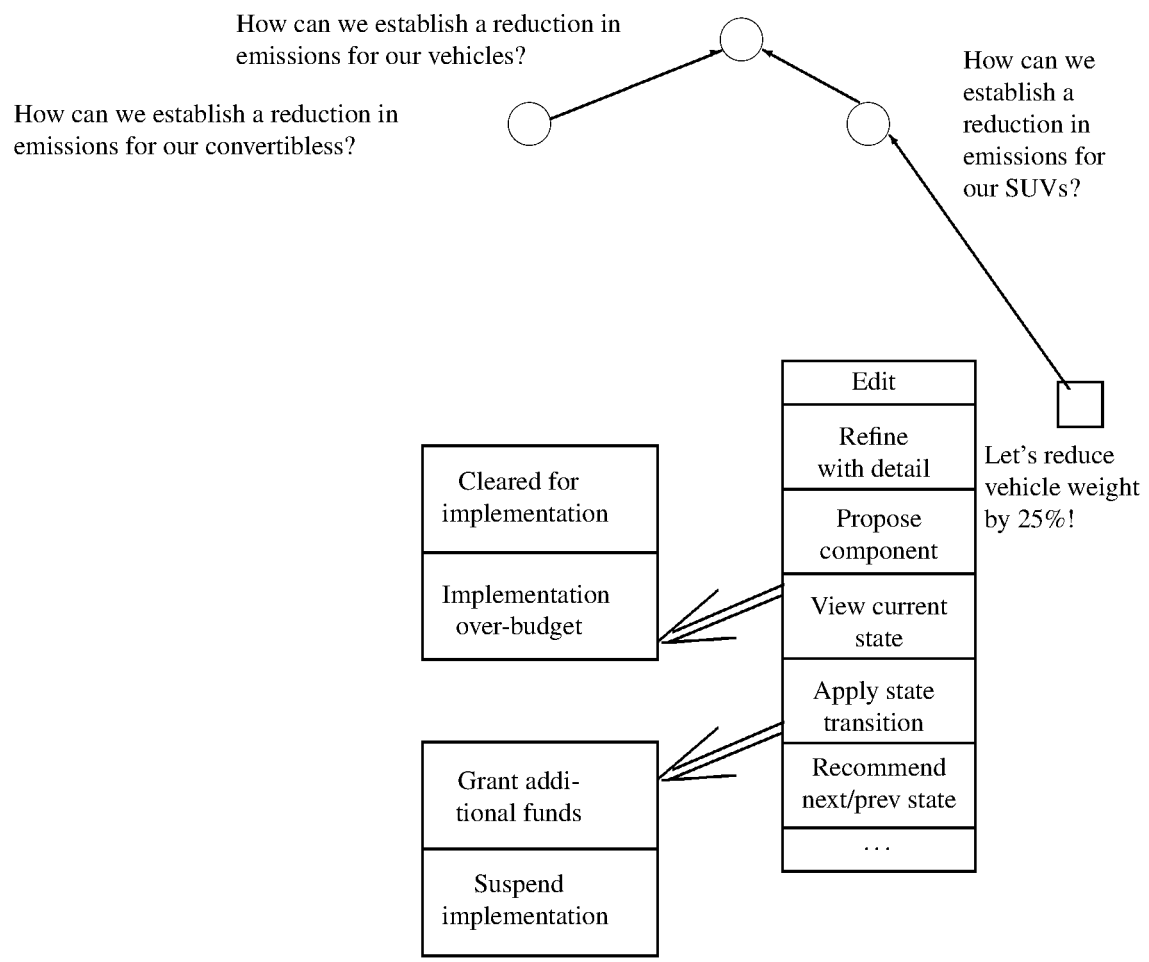

FIG. 174 presents a sample user interface for interacting with solutions based on their state, according to some embodiments.

Drawing elements in FIG. 1 through FIG. 174 may be assigned a four-digit code as follows:

The first digit indicates the direction of refinement augmentation and whether the embodiment deals with inheritance.
  1: Primarily supporting specialization on non-inherited nodes and explicit augmentation
  2: Primarily supporting specialization on inherited nodes and implicit augmentation
  3: Primarily supporting specialization without regard to inheritance
  4: Primarily supporting generalization on non-inherited nodes and explicit augmentation
  5: Primarily supporting generalization on inherited nodes and implicit augmentation
  6: Primarily supporting generalization without regard to inheritance
  0: Applies without regard to inheritance or direction of refinement augmentation The second digit refers to whether the element is primarily related to the client or the server in the presented embodiment.
  1: Primarily for client
  2: Primarily for server
  0: Either The third digit is sequential.

The final digit refers to relevant operation.
  0: Initialization
  1: Refinement Augmentation
  2: Refinement/Cross-kind Augmentation
  3: Any Augmentation
  4: Deletion/Unlinking
  5: Moving/Copying
  6: Linking via Refinement The numbering system is intended to aid intuition and refers to a particular embodiment presented here. It is not intended to limit the applicability of any routine.

FIG. 175 is a diagram displaying the representation of substructure information for a single entity in an embodiment.

Figure 176:
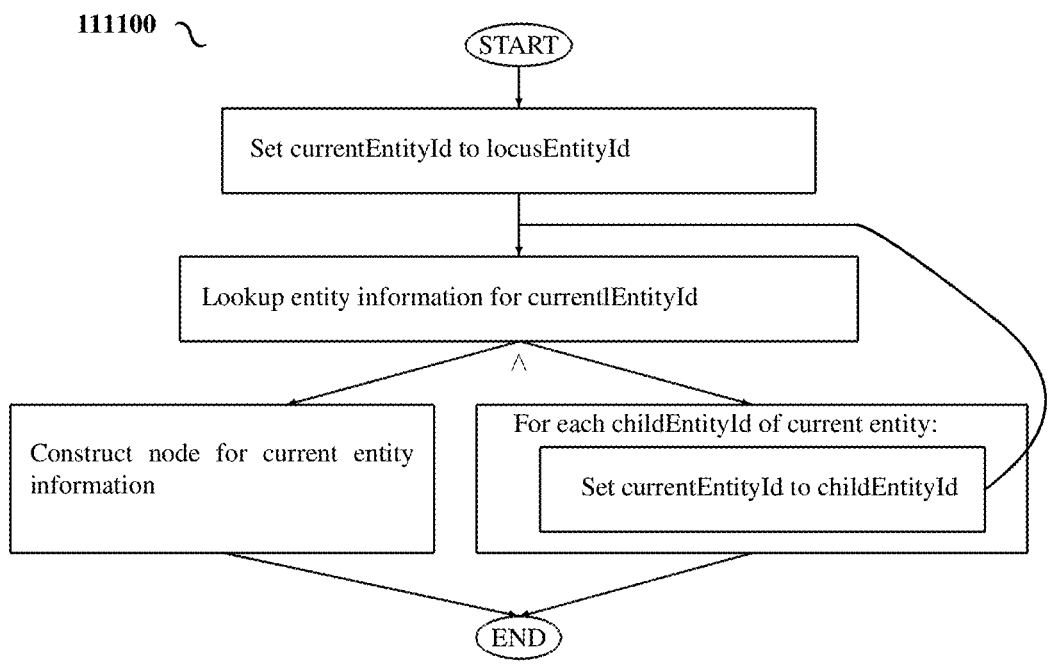

FIG. 176 is a process flow diagram of an embodiment of the substructure construction process as described with respect to the Static Lifetime Strategy, according to some embodiments.

Figure 177:
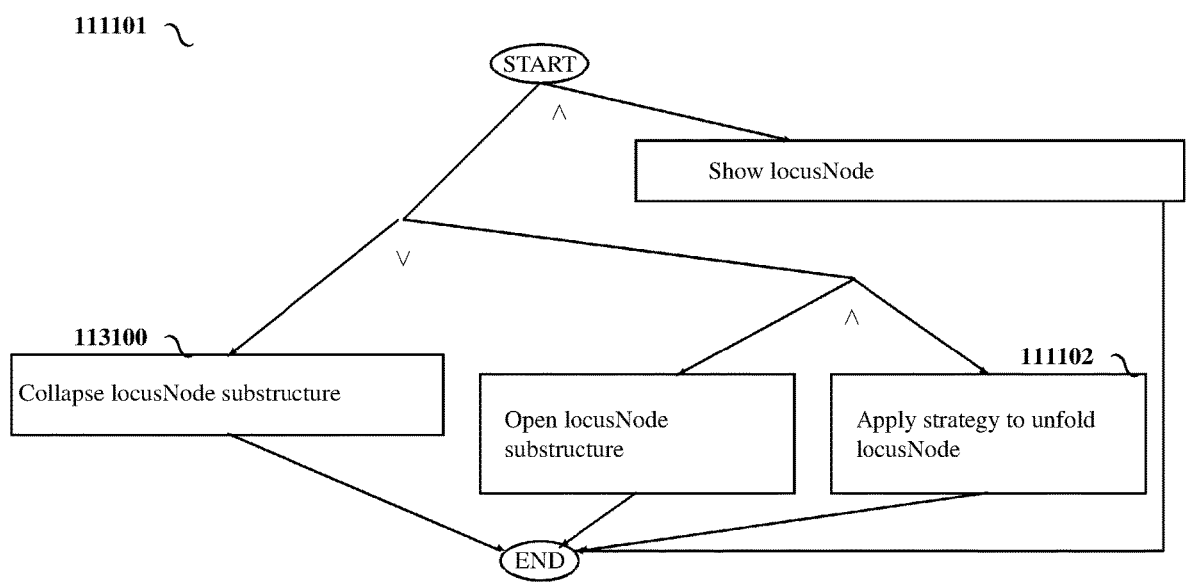

FIG. 177 is a process flow diagram of an embodiment of the substructure initialization process as described with respect to the Static Lifetime Strategy, according to some embodiments.

Figure 178:
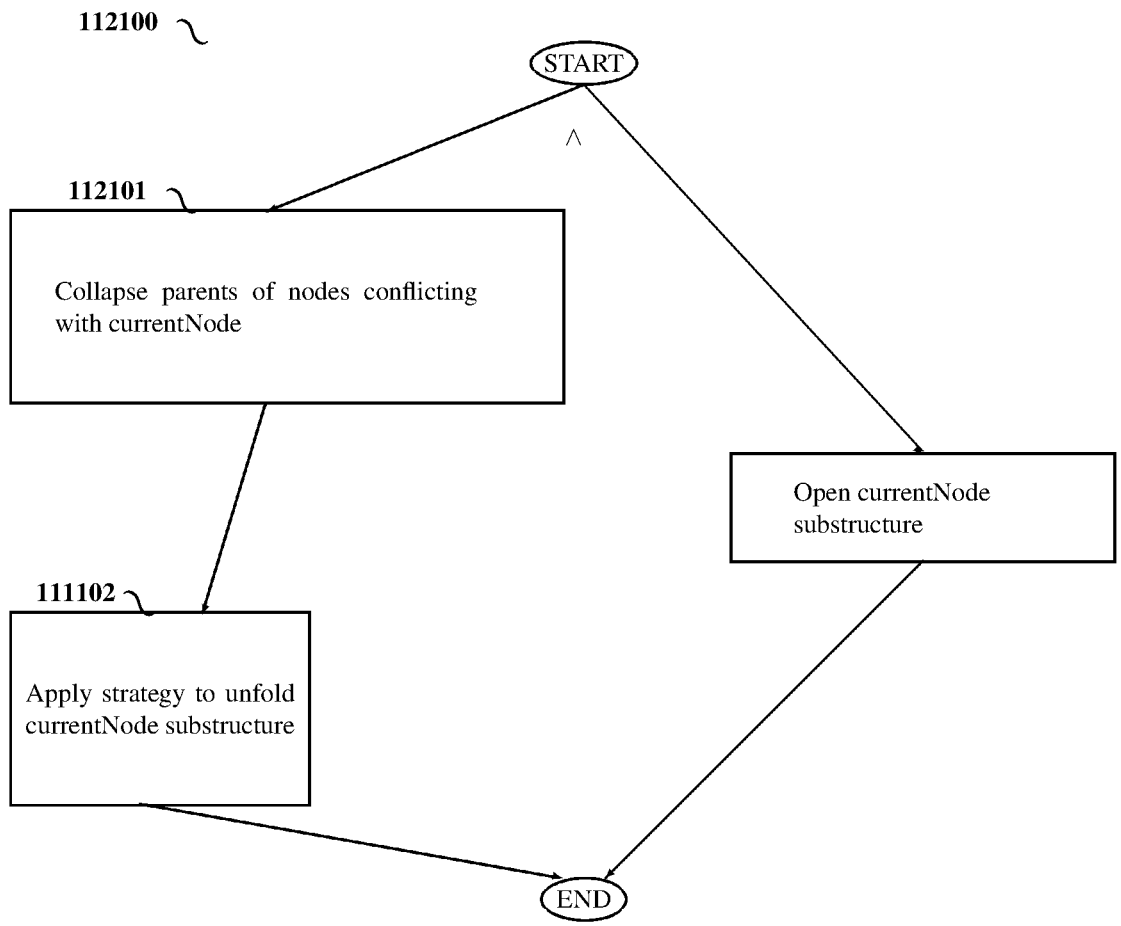

FIG. 178 is a process flow diagram of an embodiment of the substructure expansion process, as described with respect to the Static Lifetime Strategy, according to some embodiments.

Figure 179:
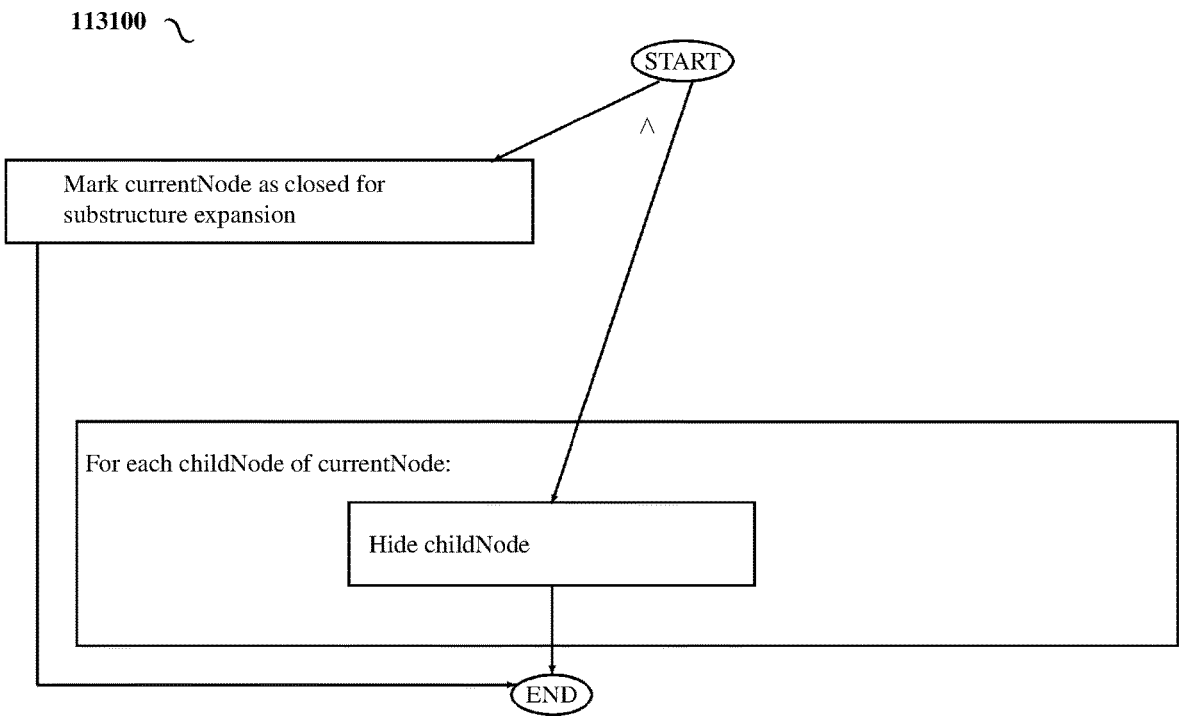

FIG. 179 is a process flow diagram of an embodiment of the substructure collapse process, according to some embodiments.

Figure 180:
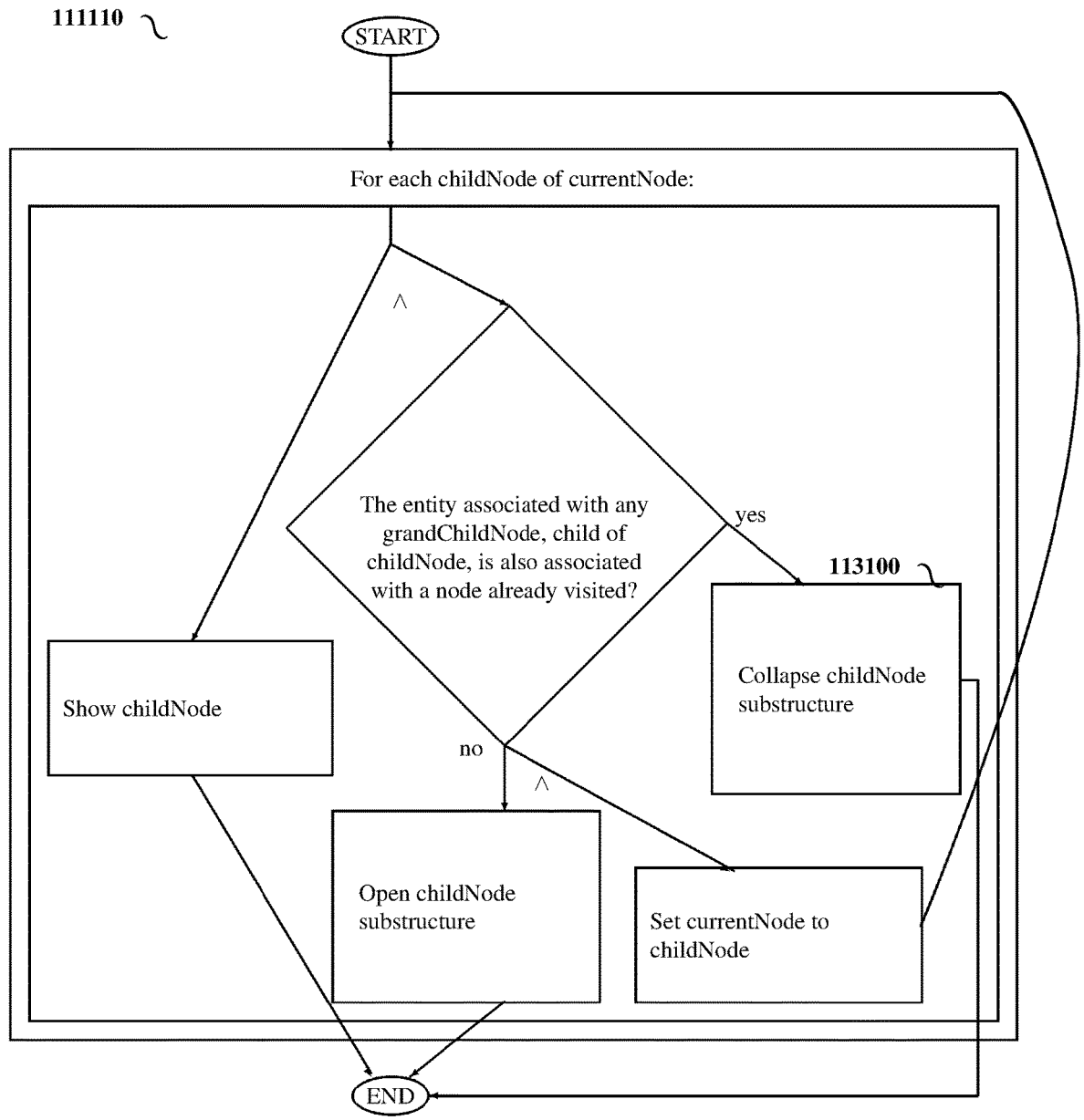

FIG. 180 is a process flow diagram of an embodiment of the maximal substructure expansion process under the assumption that child nodes will not conflict, as described with respect to the Static Lifetime Strategy, Initialization Strategy #1, and Explicit Node Expansion Strategy #1, according to some embodiments.

Figure 181:
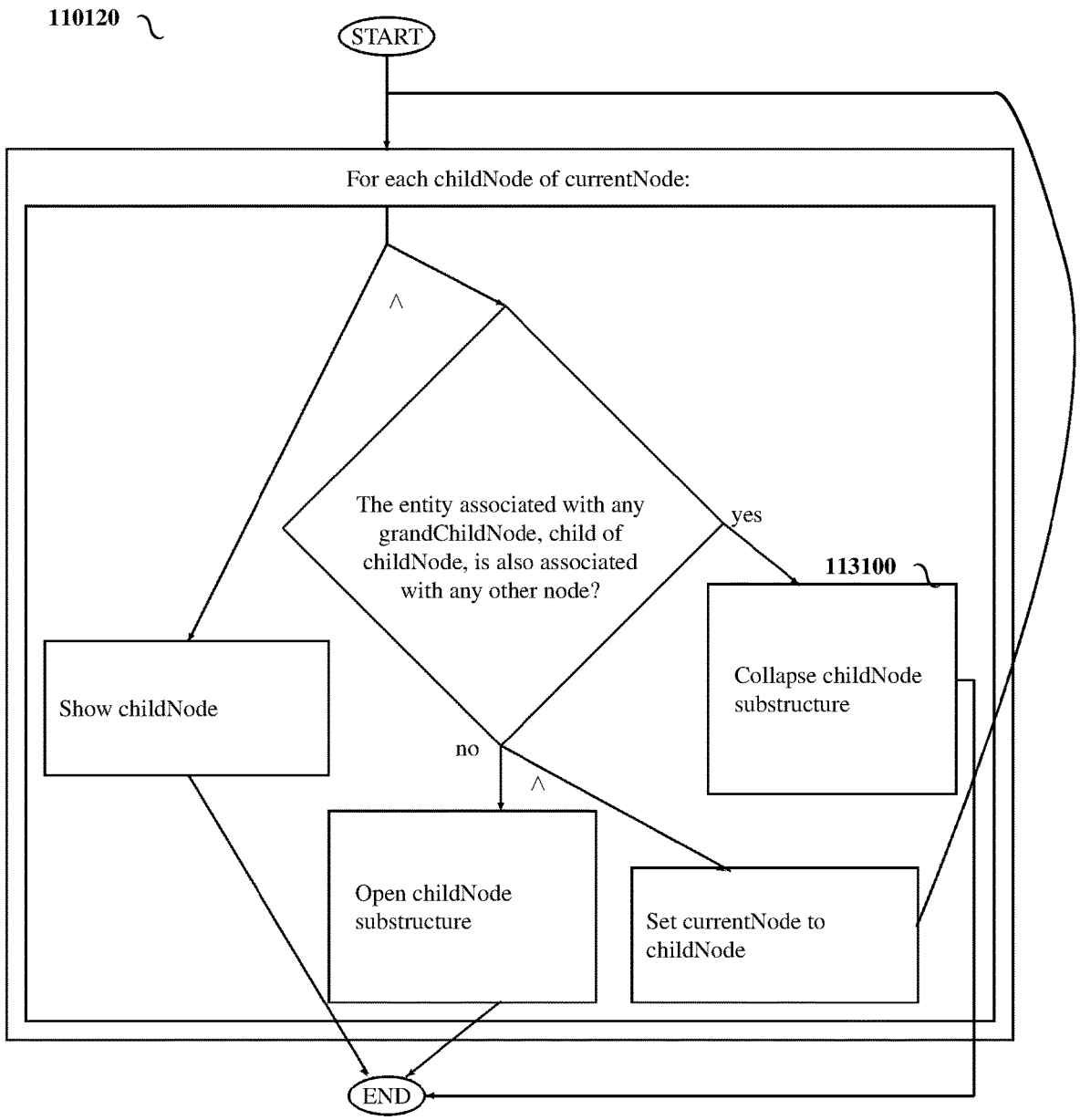

FIG. 181 is a process flow diagram of an embodiment of the substructure expansion process that expands until any common descendants are reached, as described with respect to the Static Lifetime Strategy, Initialization Strategy #2, and Explicit Node Expansion Strategy #2, according to some embodiments.

Figure 182:
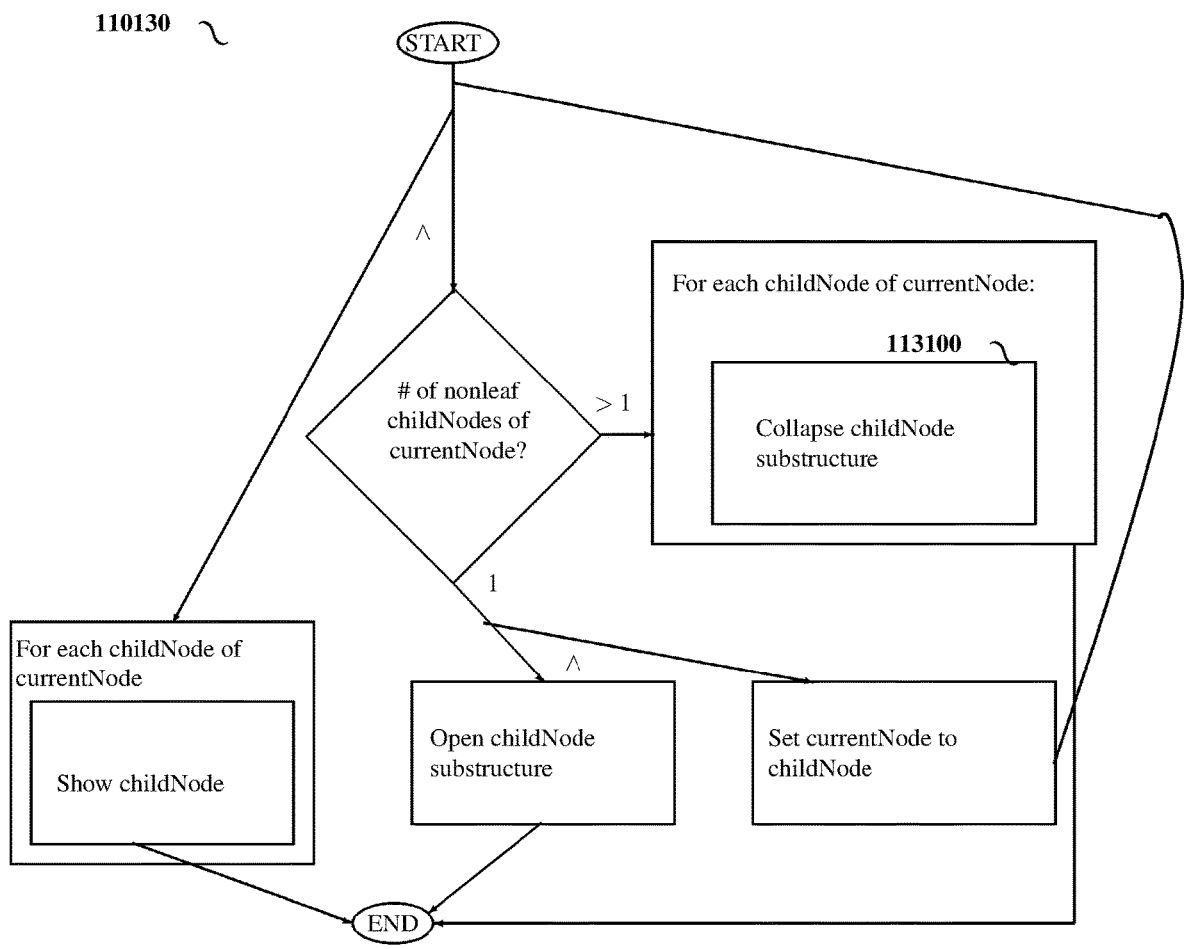

FIG. 182 is a process flow diagram of an embodiment of the substructure expansion process for initialization that opens single nonleaf children under the assumption that child nodes will not conflict, as described with respect to the Static Lifetime Strategy, Initialization Strategy #3, and Explicit Node Expansion Strategy #3, according to some embodiments.

Figure 183:
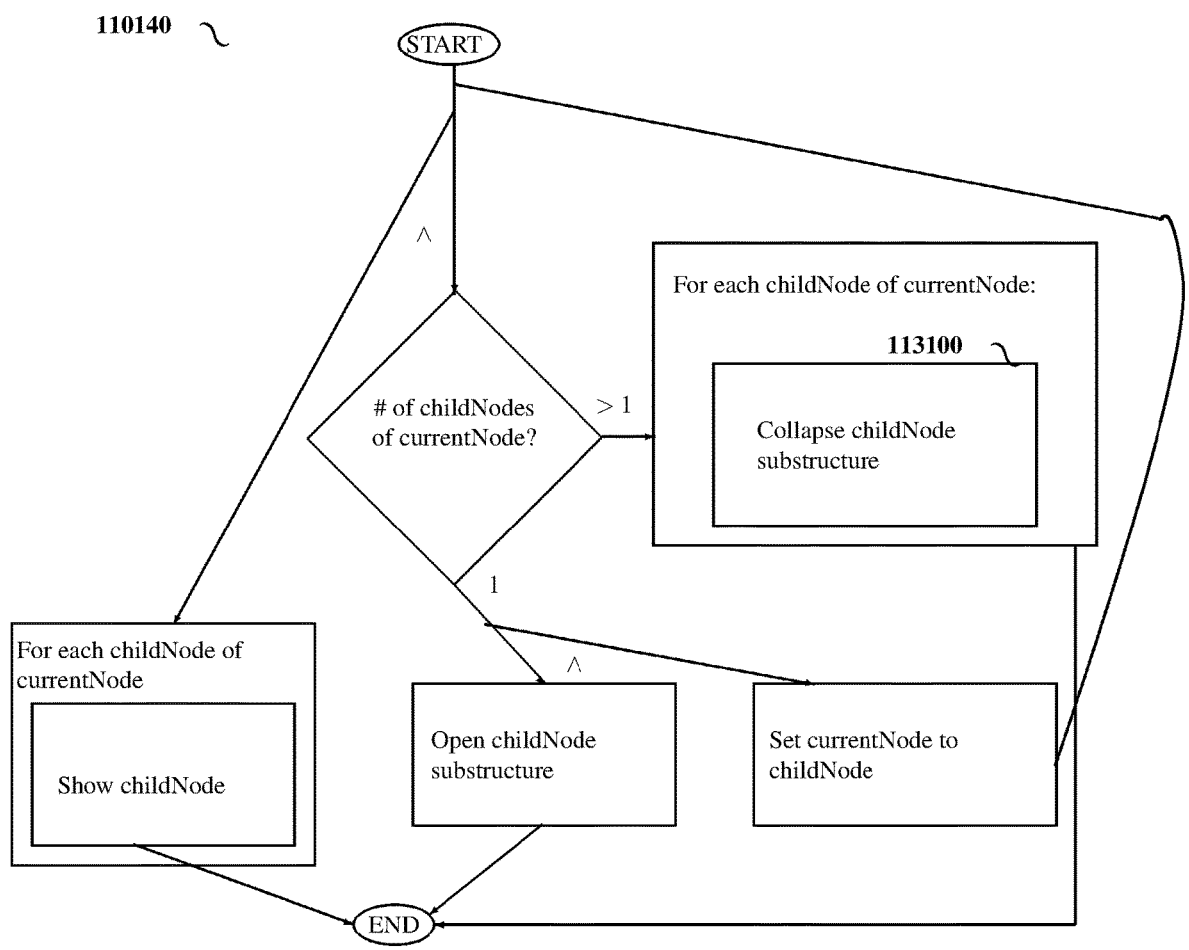

FIG. 183 is a process flow diagram of an embodiment of the substructure expansion process for initialization that opens single children under the assumption that child nodes will not conflict, as described with respect to the Static Lifetime Strategy, Initialization Strategy #4, and Explicit Node Expansion Strategy #4, according to some embodiments.

Figure 184:
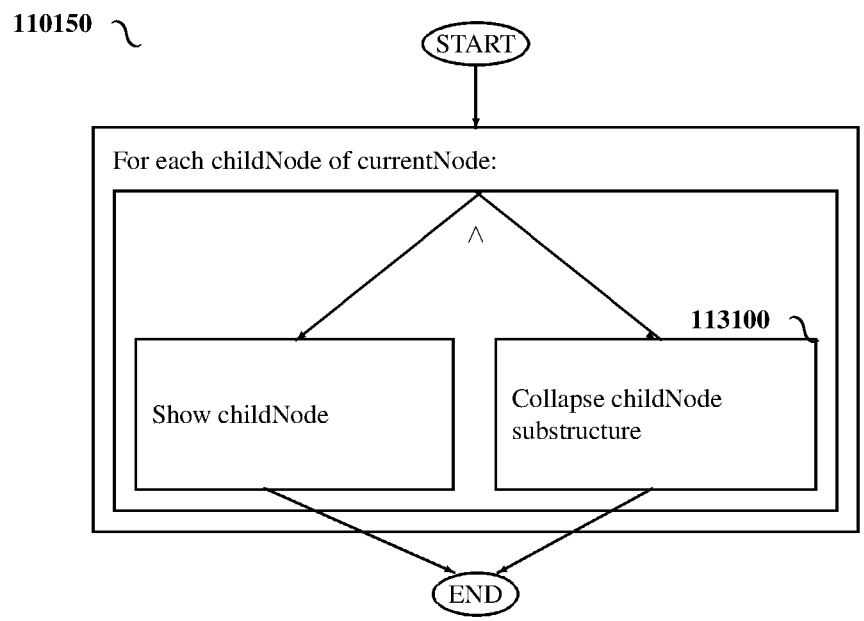

FIG. 184 is a process flow diagram of an embodiment of the unary substructure expansion process for initialization under the assumption that child nodes will not conflict, as described with respect to the Static Lifetime Strategy, Initialization Strategy #5, and Explicit Node Expansion Strategy #5, according to some embodiments.

Figure 185:
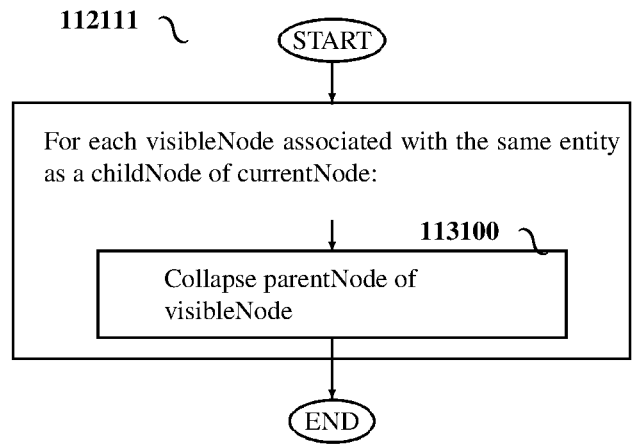

FIG. 185 is a process flow diagram of an embodiment of the portion of the maximal substructure expansion process that hides conflicting visible nodes as described with respect to the Static Lifetime Strategy and Explicit Node Expansion Strategy #1 and Explicit Node Expansion Strategy #2, according to some embodiments.

Figure 186:
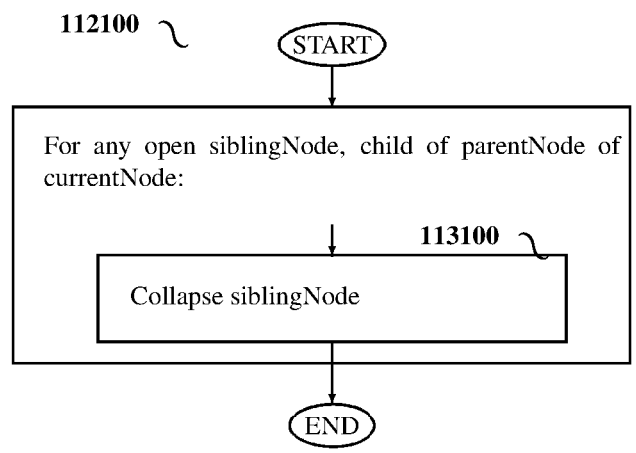

FIG. 186 is a process flow diagram of an embodiment of a portion of certain substructure expansion processes (that open single children or single nonleaf children) that hides conflicting visible nodes as described with respect to the Static Lifetime Strategy, Initialization Strategy #4, and Explicit Node Expansion Strategy #4, according to some embodiments.

FIG. 187 is a diagram displaying the representation of context information for a single entity in an embodiment.

Figure 188:
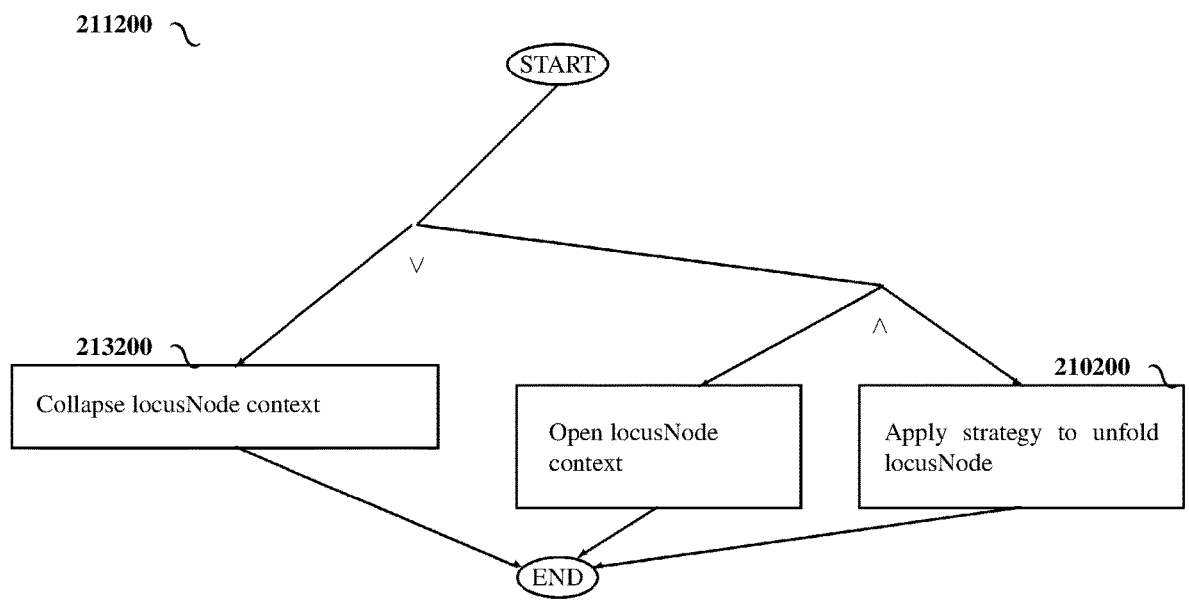

FIG. 188 is a process flow diagram of an embodiment of the context initialization process for a single entity as described with respect to the Dynamic Lifetime Strategy, according to some embodiments.

Figure 189:
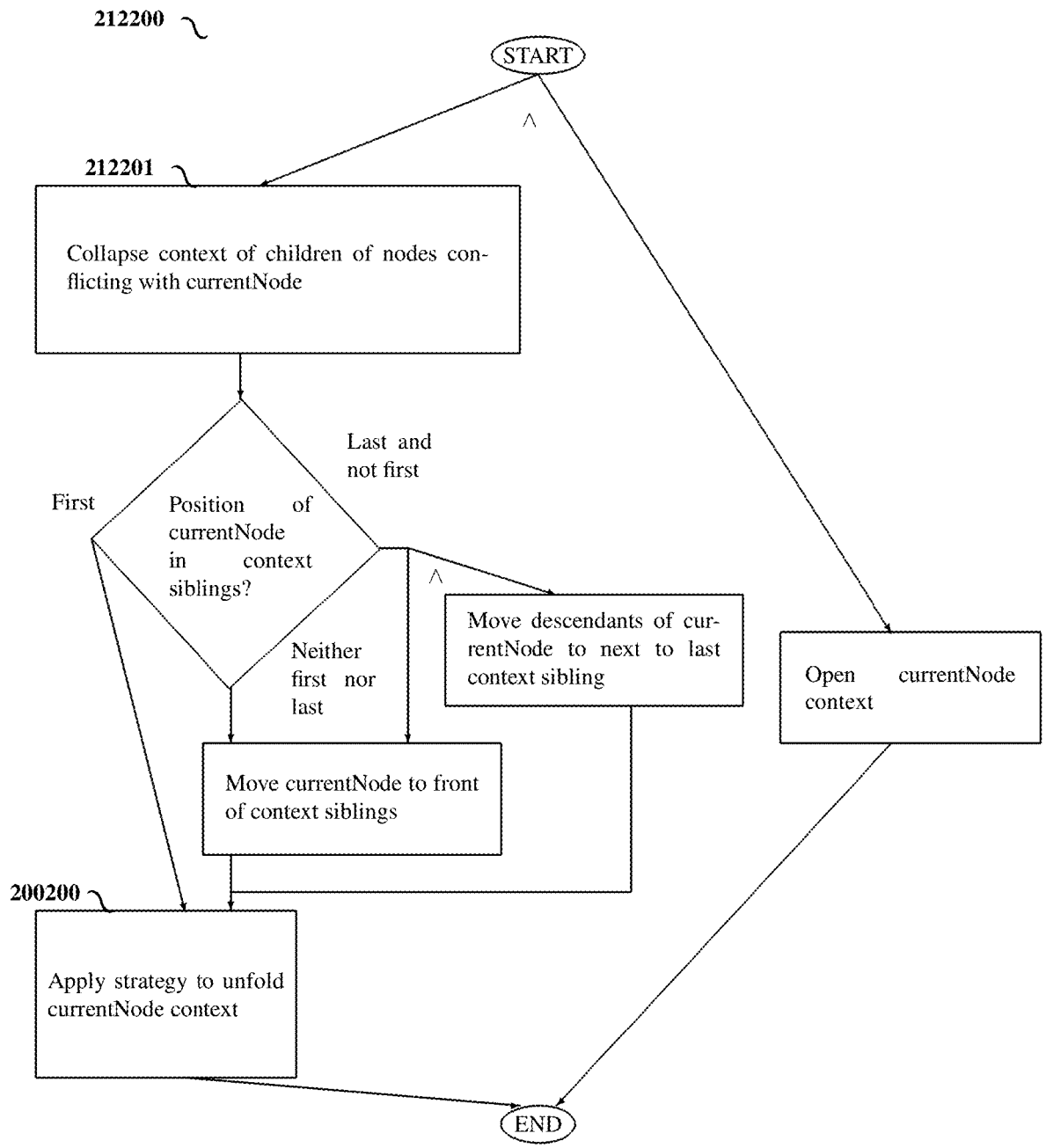

FIG. 189 is a process flow diagram of an embodiment of the context expansion process, as described with respect to the Dynamic Lifetime Strategy and Parent Node Reordering Strategy #2, according to some embodiments.

Figure 190:
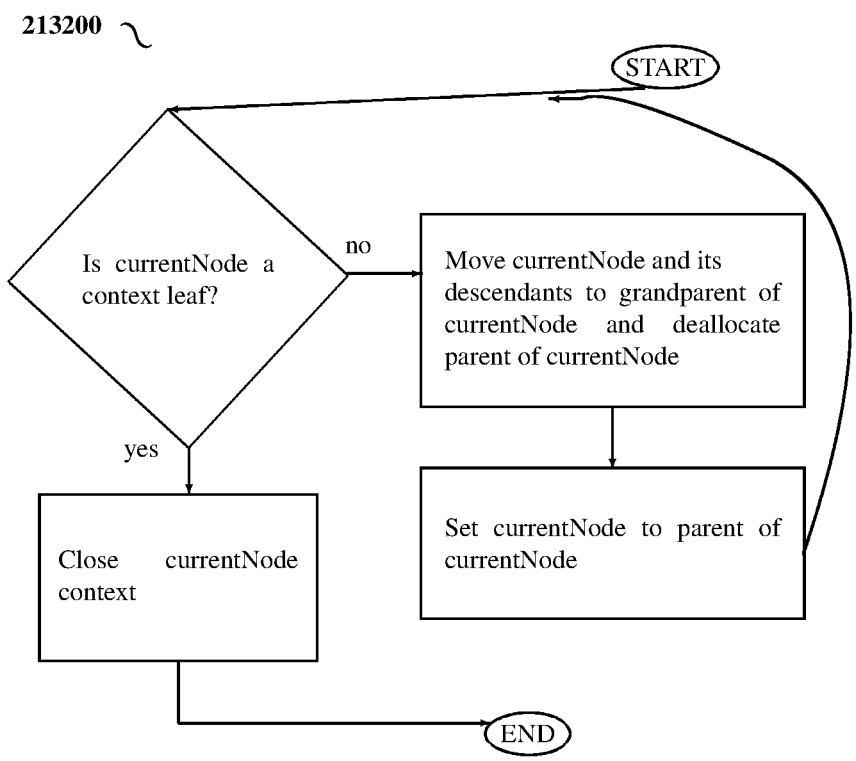

FIG. 190 is a process flow diagram of an embodiment of the context collapse process for a single entity as described with respect to the Dynamic Lifetime Strategy, according to some embodiments.

Figure 191:
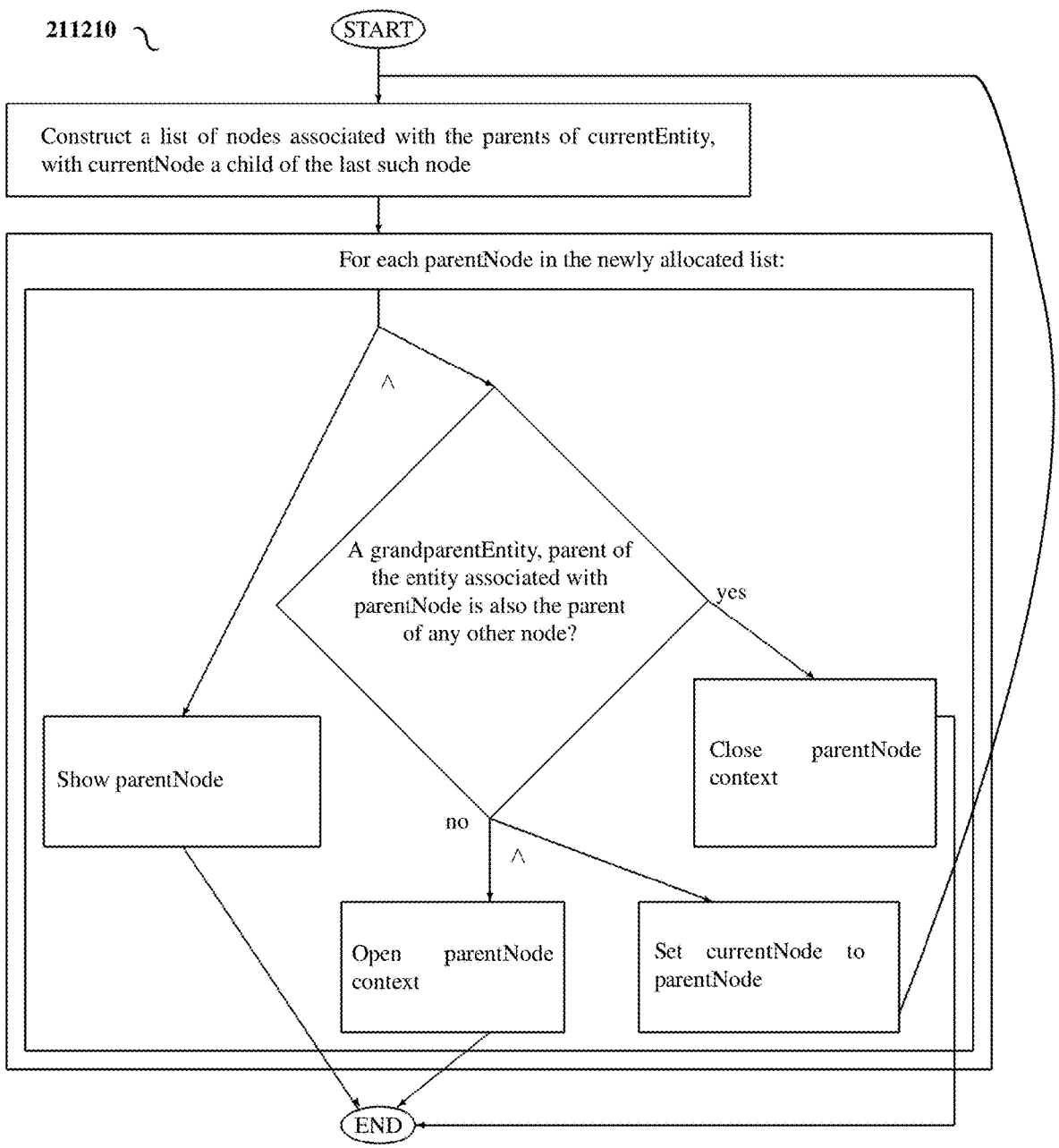

FIG. 191 is a process flow diagram of an embodiment of the maximal context expansion process under the assumption that child nodes will not conflict, as described with respect to the Dynamic Lifetime Strategy, Initialization Strategy #1, and Explicit Node Expansion Strategy #1, according to some embodiments.

Figure 192:
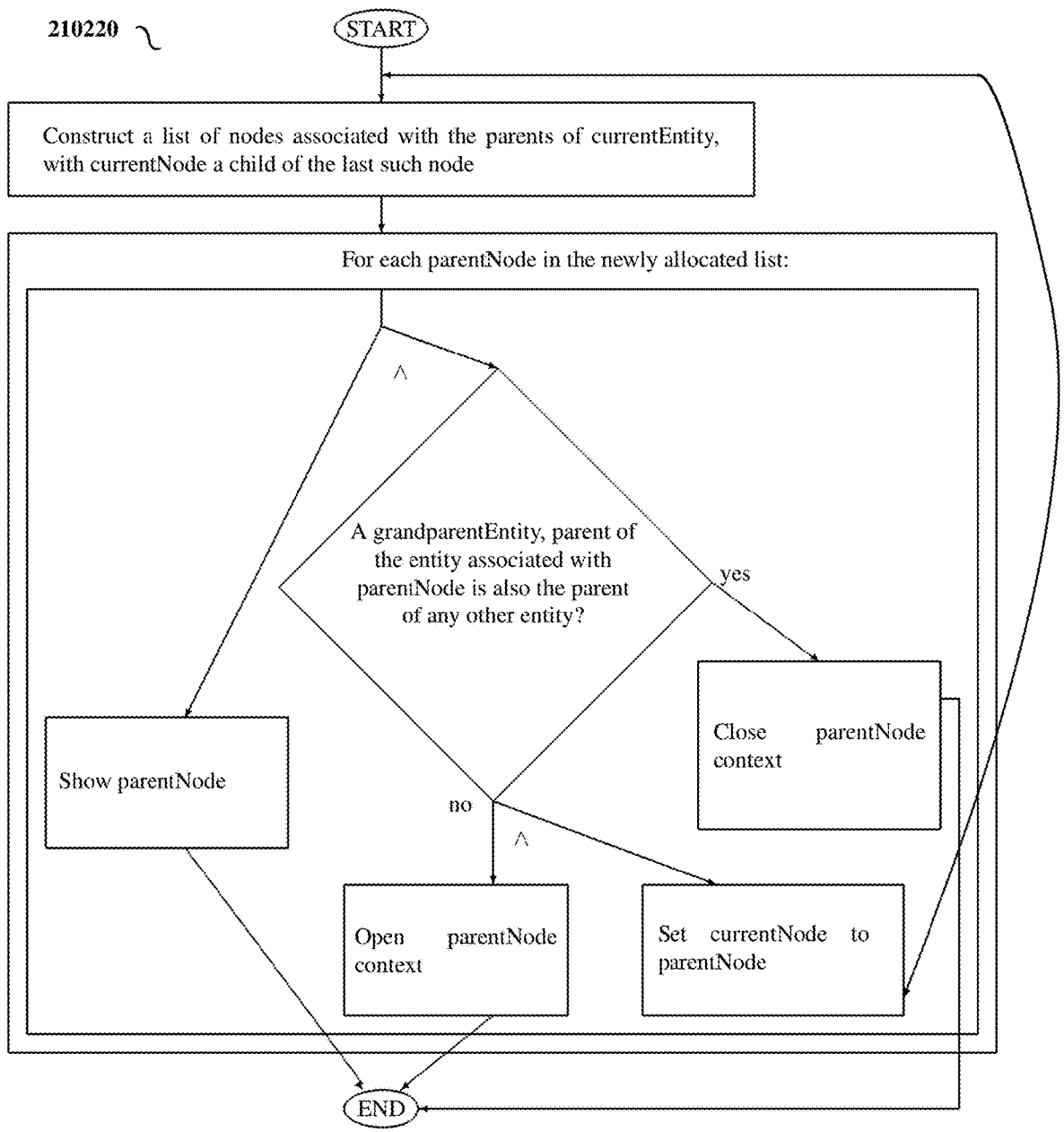

FIG. 192 is a process flow diagram of an embodiment of the substructure expansion process that expands up until any common ancestor is reached, as described with respect to the Dynamic Lifetime Strategy, Initialization Strategy #2, and Explicit Node Expansion Strategy #2, according to some embodiments.

Figure 193:
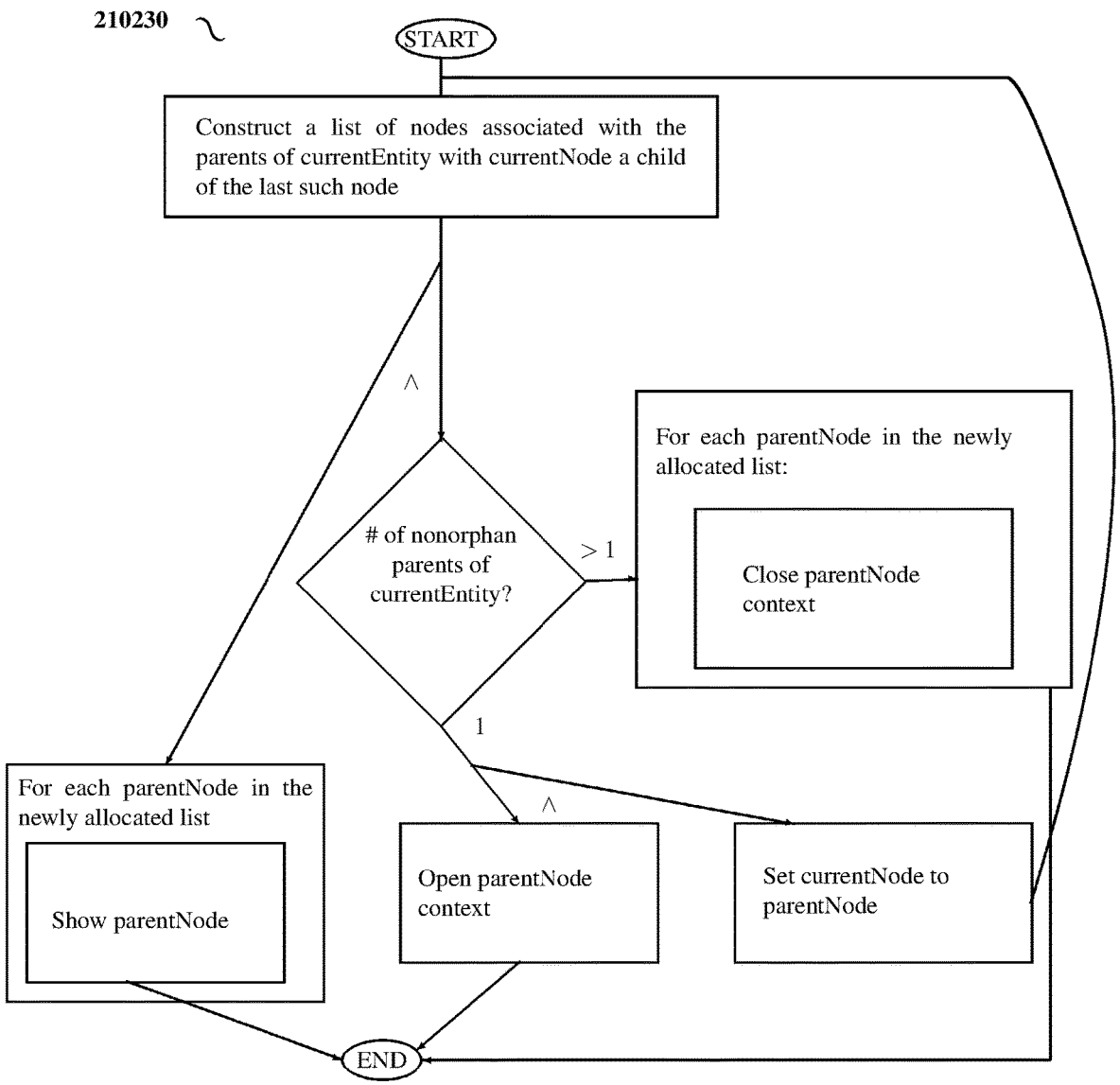

FIG. 193 is a process flow diagram of an embodiment of the context expansion process for a single locus entity that opens single nonleaf children under the assumption that child nodes will not conflict, as described with respect to the Dynamic Lifetime Strategy, Initialization Strategy #3, and Explicit Node Expansion Strategy #3, according to some embodiments.

Figure 194:
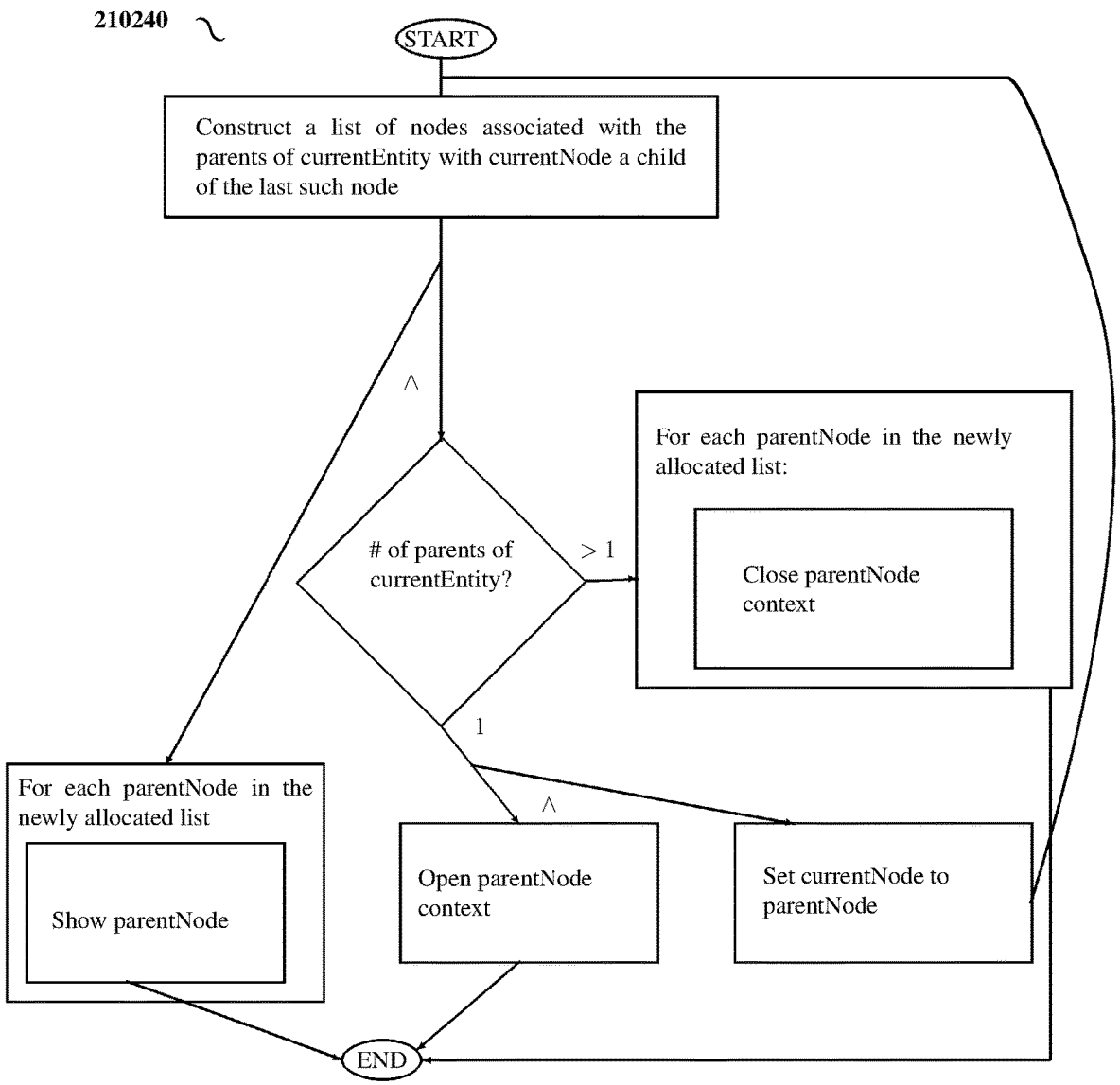

FIG. 194 is a process flow diagram of an embodiment of the context expansion process that opens single children under the assumption that child nodes will not conflict, as described with respect to the Dynamic Lifetime Strategy, Initialization Strategy #4, and Explicit Node Expansion Strategy #4, according to some embodiments.

Figure 195:
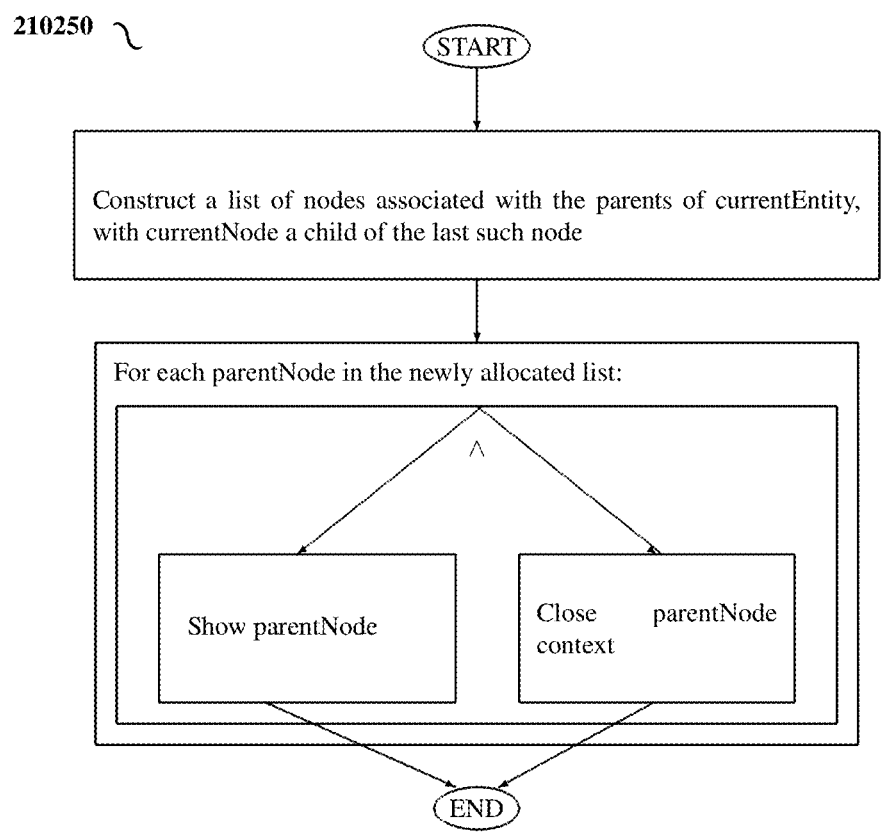

FIG. 195 is a process flow diagram of an embodiment of the unary context expansion process under the assumption that parent nodes will not conflict, as described with respect to the Dynamic Lifetime Strategy, Initialization Strategy #5, and Explicit Node Expansion Strategy #5, according to some embodiments.

Figure 196:
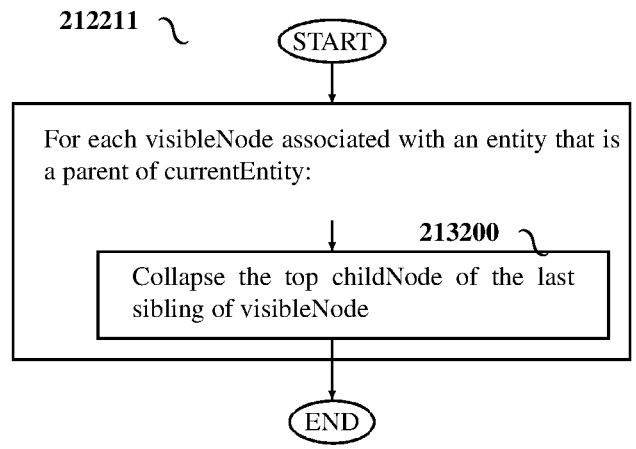

FIG. 196 is a process flow diagram of an embodiment of the portion of the maximal context expansion process that hides conflicting visible nodes as described with respect to the Dynamic Lifetime Strategy and Explicit Node Expansion Strategy #1 and Explicit Node Expansion Strategy #2, according to some embodiments.

Figure 197:
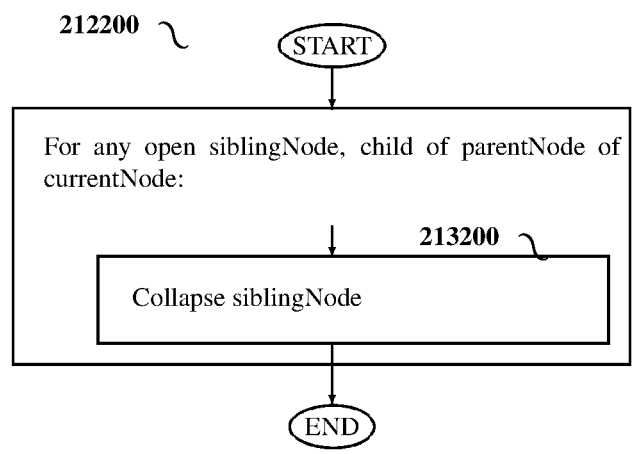

FIG. 197 is a process flow diagram of an embodiment of a portion of certain context expansion processes (that open single parents or single nonorphan parents) that hides conflicting visible nodes as described with respect to the Dynamic Lifetime Strategy, Initialization Strategy #4, and Explicit Node Expansion Strategy #4, according to some embodiments.

Figure 198:
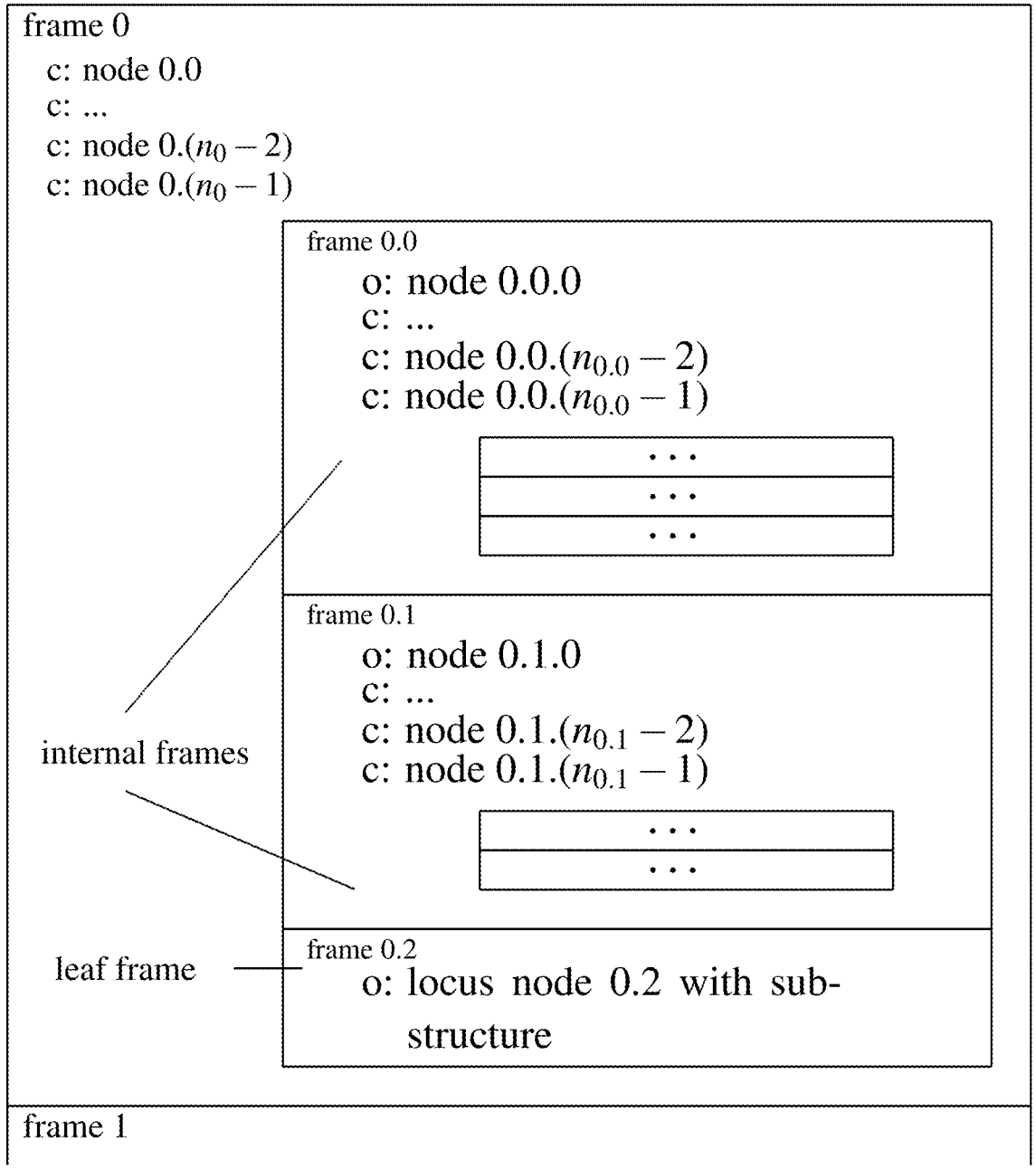

FIG. 198 is a diagram displaying the representation of context information that can be shared across multiple entities in an embodiment.

Figure 199:
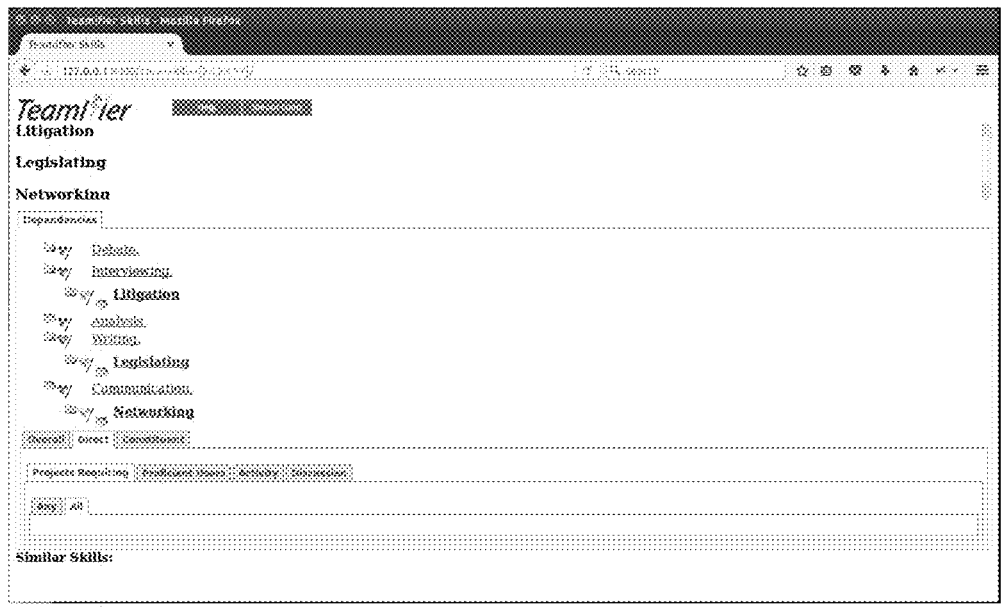

FIG. 199 is a screen with multiple locus skills, demonstrating exploration of their shared context, according to some embodiments.

Figure 200:
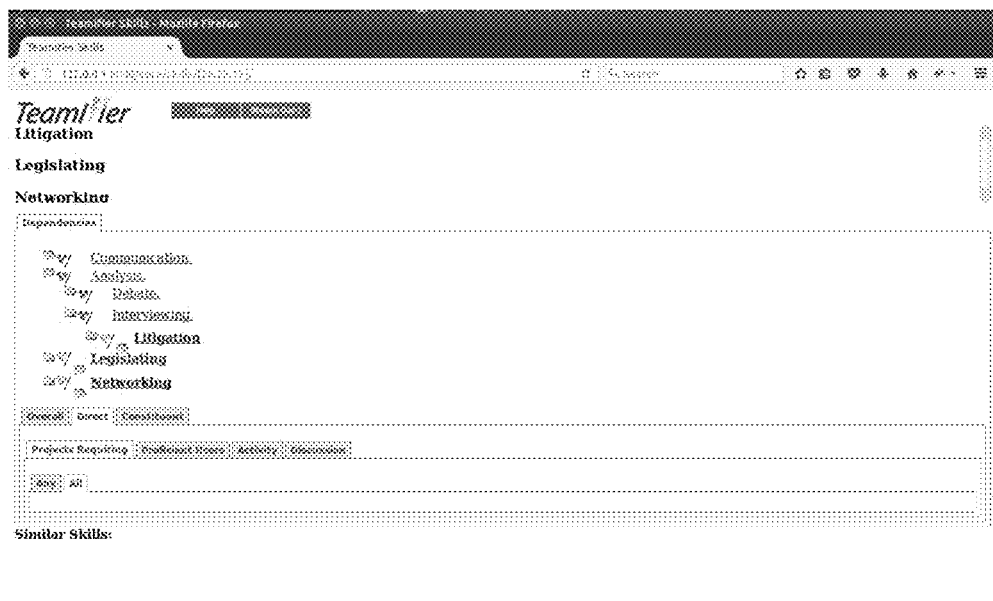
Figure 201:
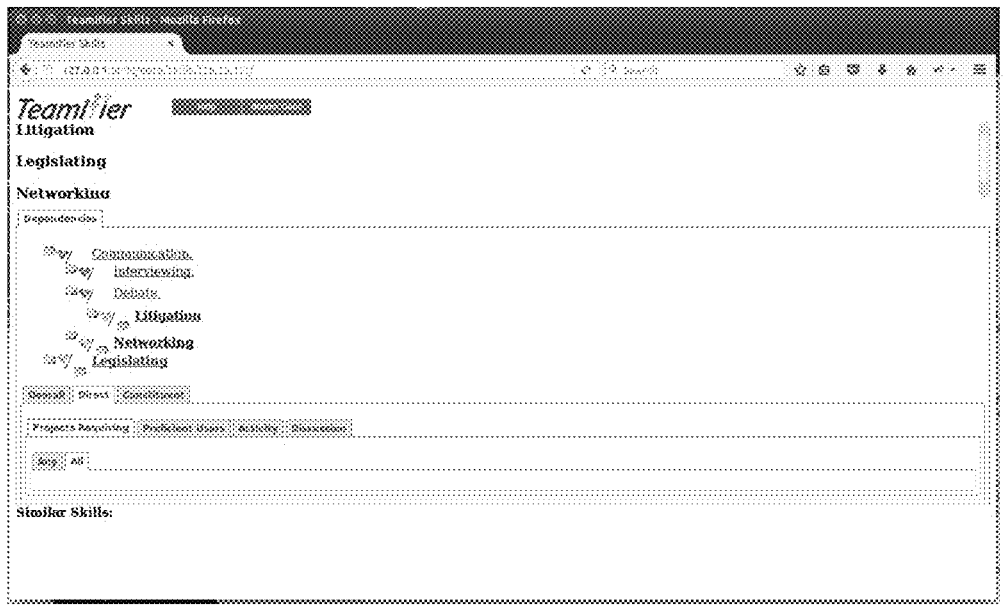
Figure 202:
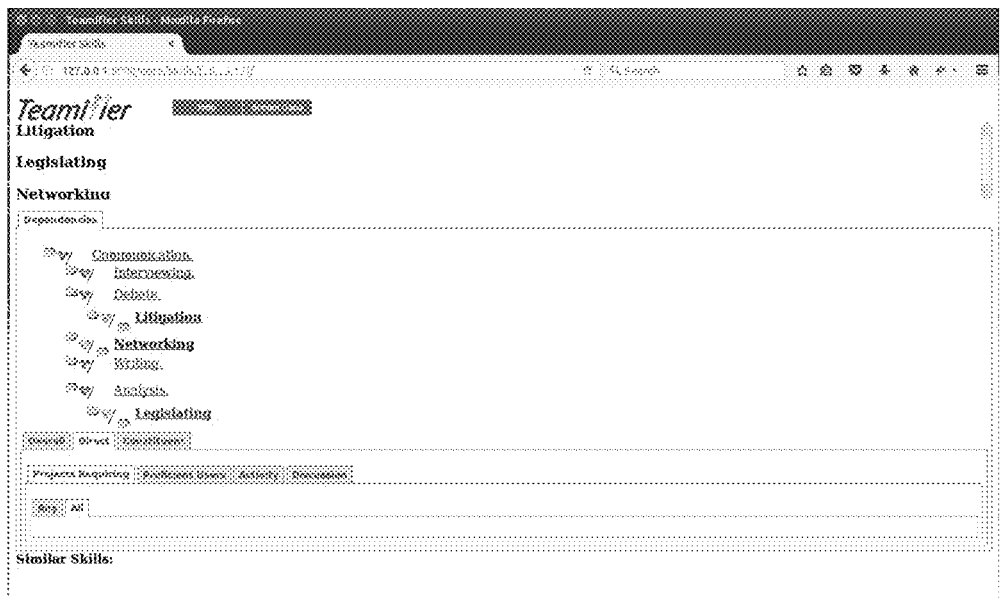

FIG. 200, FIG. 201, and FIG. 202 are screens with multiple locus skills, demonstrating opening of context folders with shared context, according to some embodiments.

Figure 203:
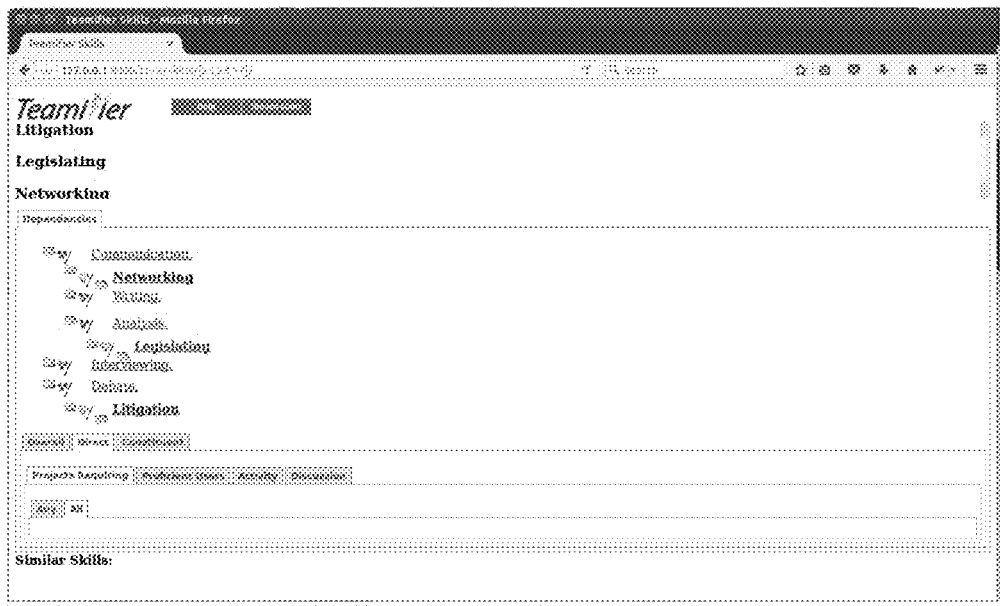

FIG. 203 is a screen with multiple locus skills, demonstrating the closing of a context folder with shared context, according to some embodiments.

Figure 204:
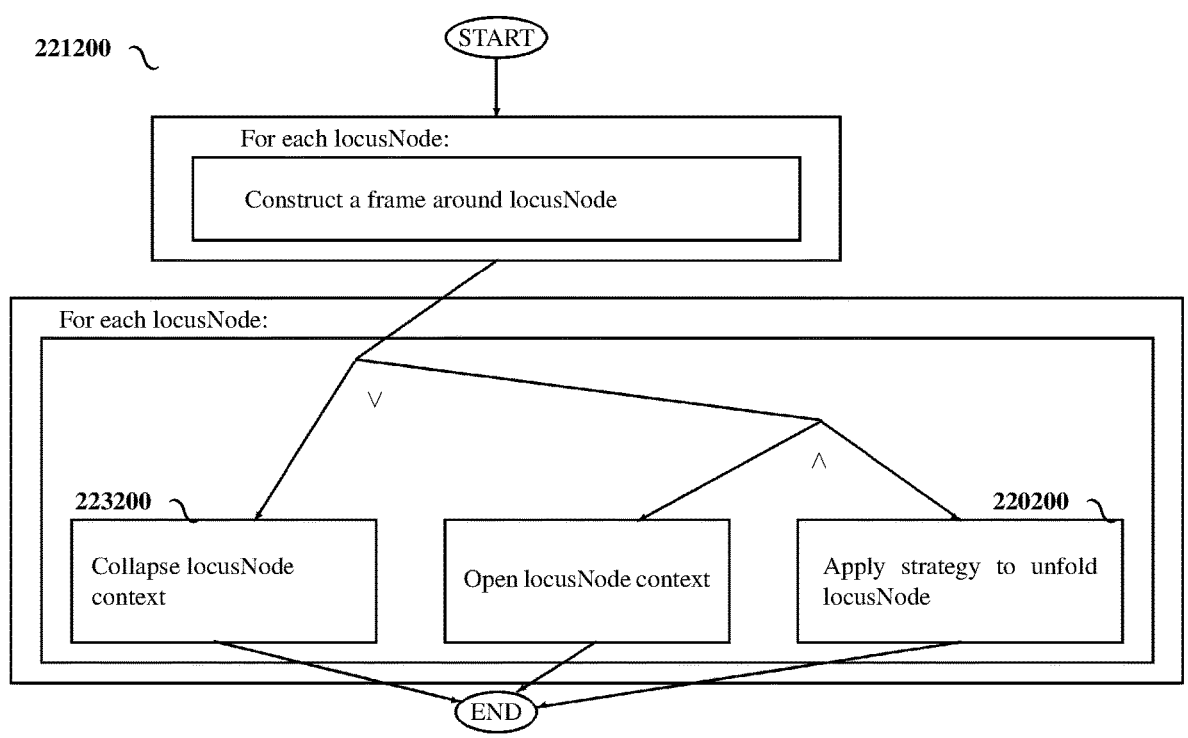

FIG. 204 is a process flow diagram of an embodiment of the context initialization process for multiple entities as described with respect to the Dynamic Lifetime Strategy, according to some embodiments.

Figure 205:
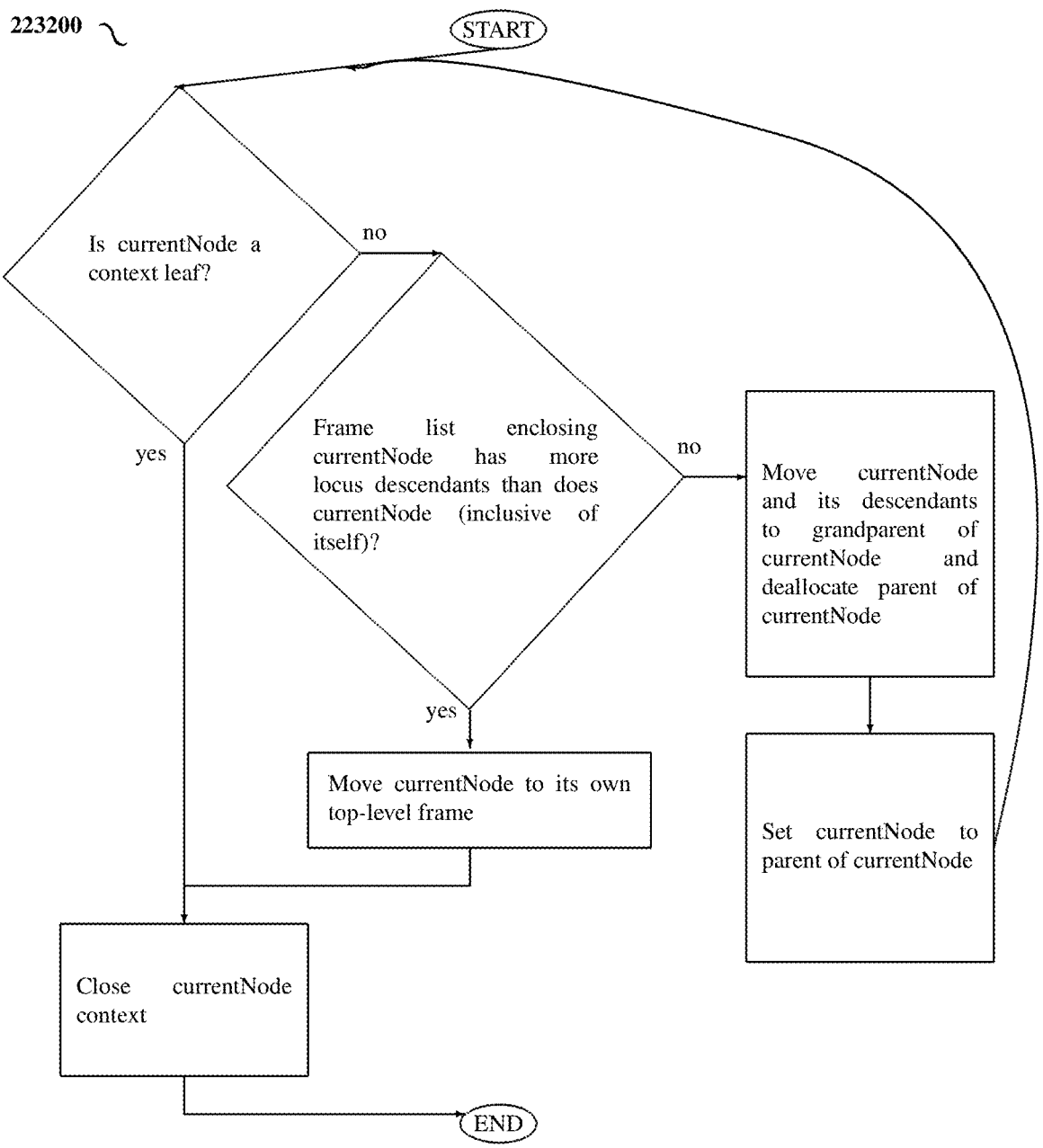

FIG. 205 is a process flow diagram of an embodiment of the context collapse process for multiple entities as described with respect to the Dynamic Lifetime Strategy, according to some embodiments.

Figure 206:
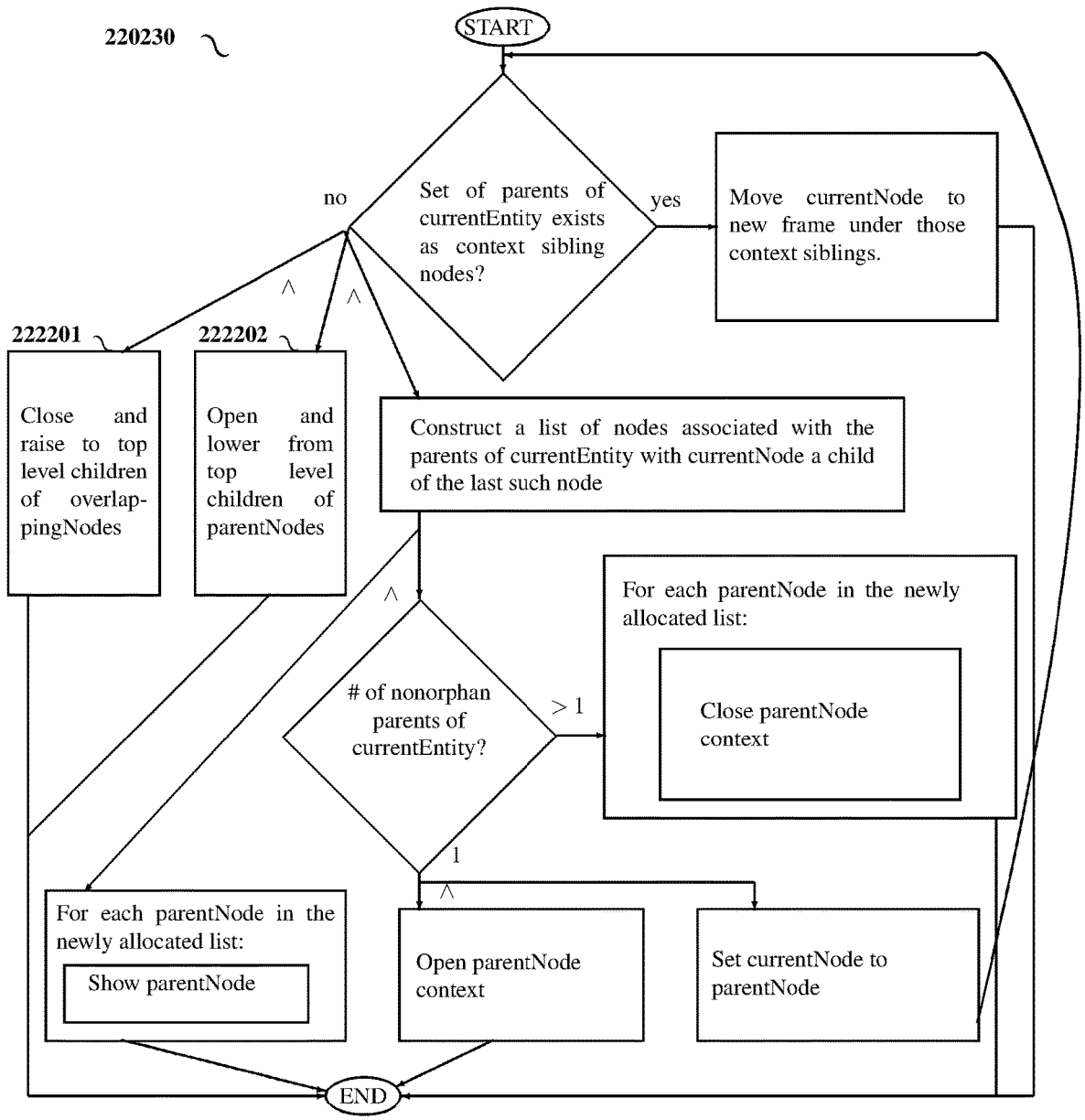

FIG. 206 is a process flow diagram of an embodiment of the context expansion process for multiple locus entities that opens single nonleaf children under the assumption that child nodes will not conflict, as described with respect to the Dynamic Lifetime Strategy, Initialization Strategy #3, and Explicit Node Expansion Strategy #3, according to some embodiments.

Figure 207:
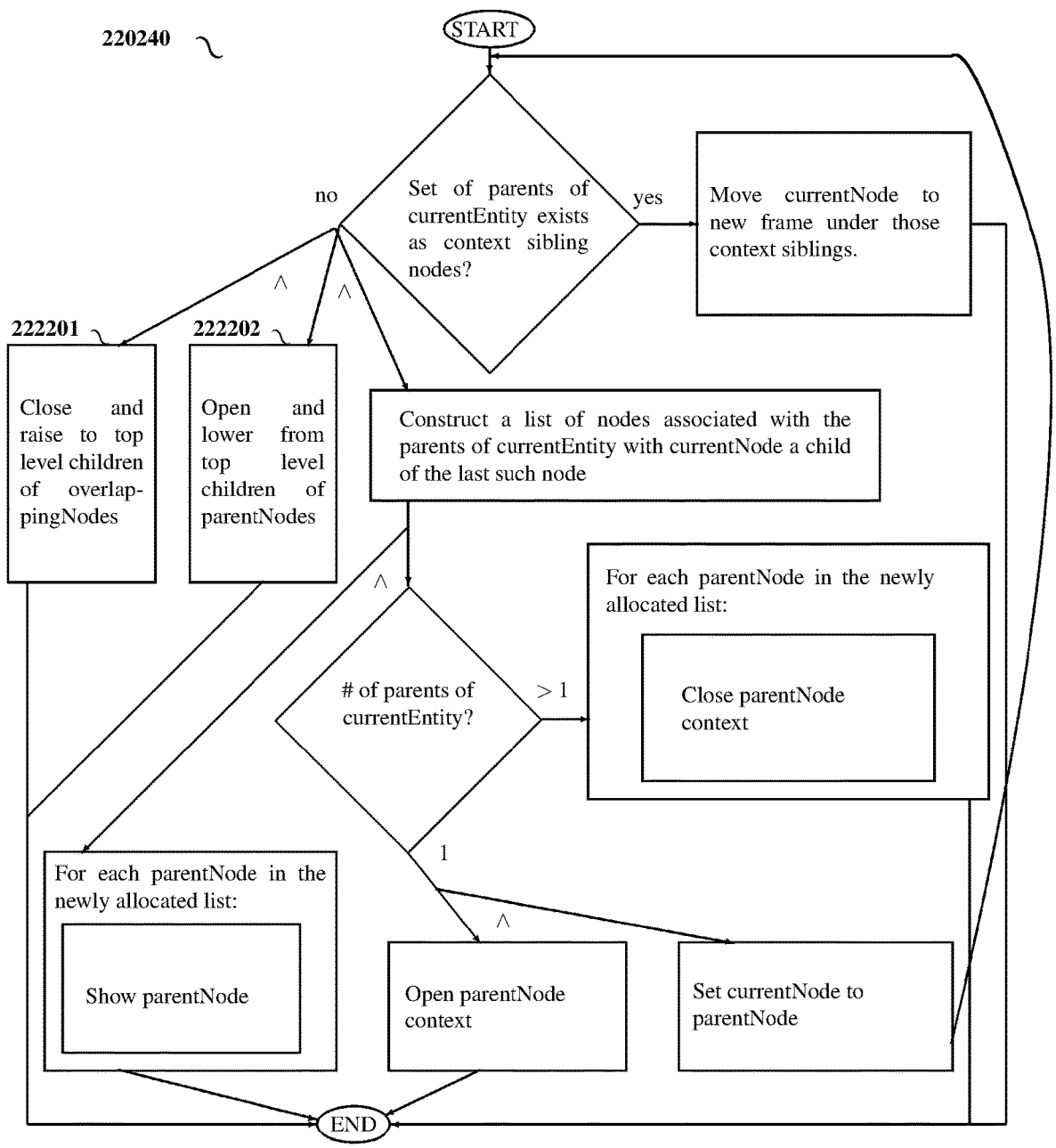

FIG. 207 is a process flow diagram of an embodiment of the context expansion process for multiple locus entities that opens single children under the assumption that child nodes will not conflict, as described with respect to the Dynamic Lifetime Strategy, Initialization Strategy #4, and Explicit Node Expansion Strategy #4, according to some embodiments.

Figure 208:
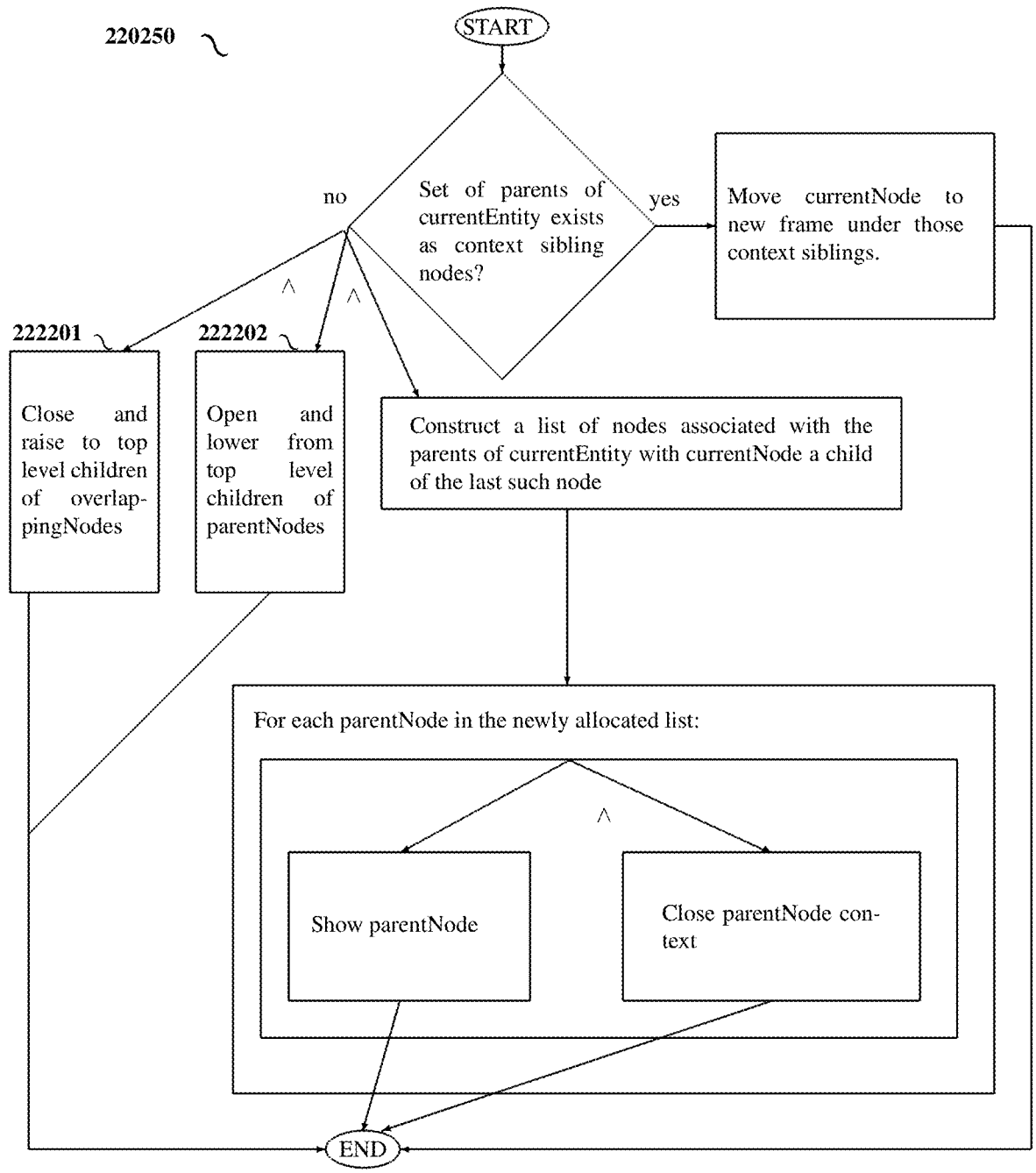

FIG. 208 is a process flow diagram of an embodiment of the unary context expansion process under the assumption that parent nodes will not conflict, as described with respect to the Dynamic Lifetime Strategy, Initialization Strategy #5, and Explicit Node Expansion Strategy #5, according to some embodiments.

Figure 209:
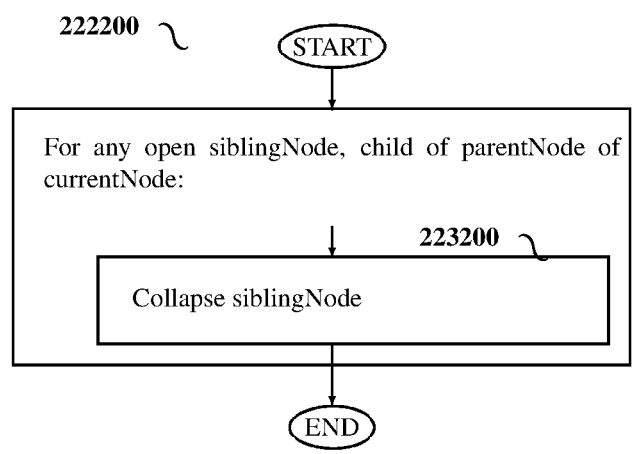

FIG. 209 is a process flow diagram of an embodiment of a portion of certain context expansion processes (that open single parents or single nonorphan parents) that hides conflicting visible nodes as described with respect to the Dynamic Lifetime Strategy, Initialization Strategy #4, and Explicit Node Expansion Strategy #4, according to some embodiments.

Figure 210:
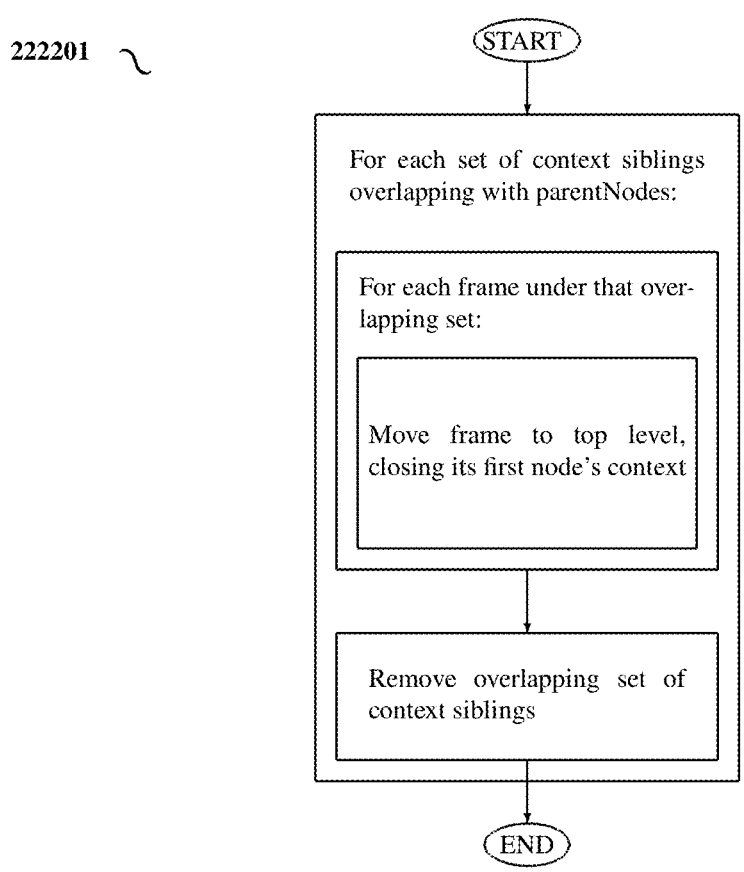

FIG. 210 is a process flow diagram of an embodiment of a portion of the context expansion processes for multiple locus entities that hides conflicting visible nodes by raising their DAG descendants to top level as described with respect to the Dynamic Lifetime Strategy, according to some embodiments.

Figure 211:
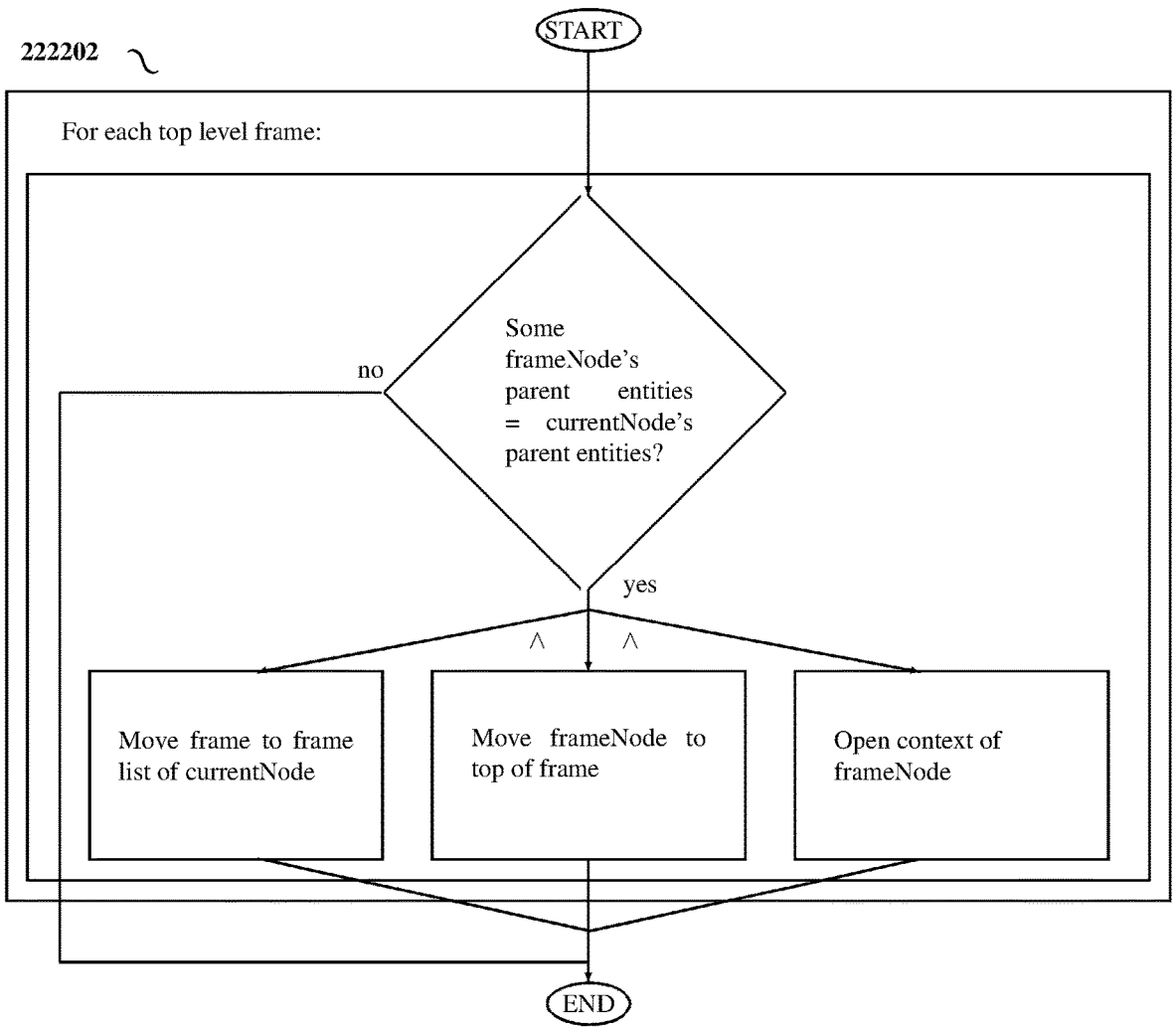

FIG. 211 is a process flow diagram of an embodiment of a portion of the context expansion processes for multiple locus entities that captures top-level nodes whose parent set is revealed during expansion as described with respect to the Dynamic Lifetime Strategy, according to some embodiments.

Figure 212:
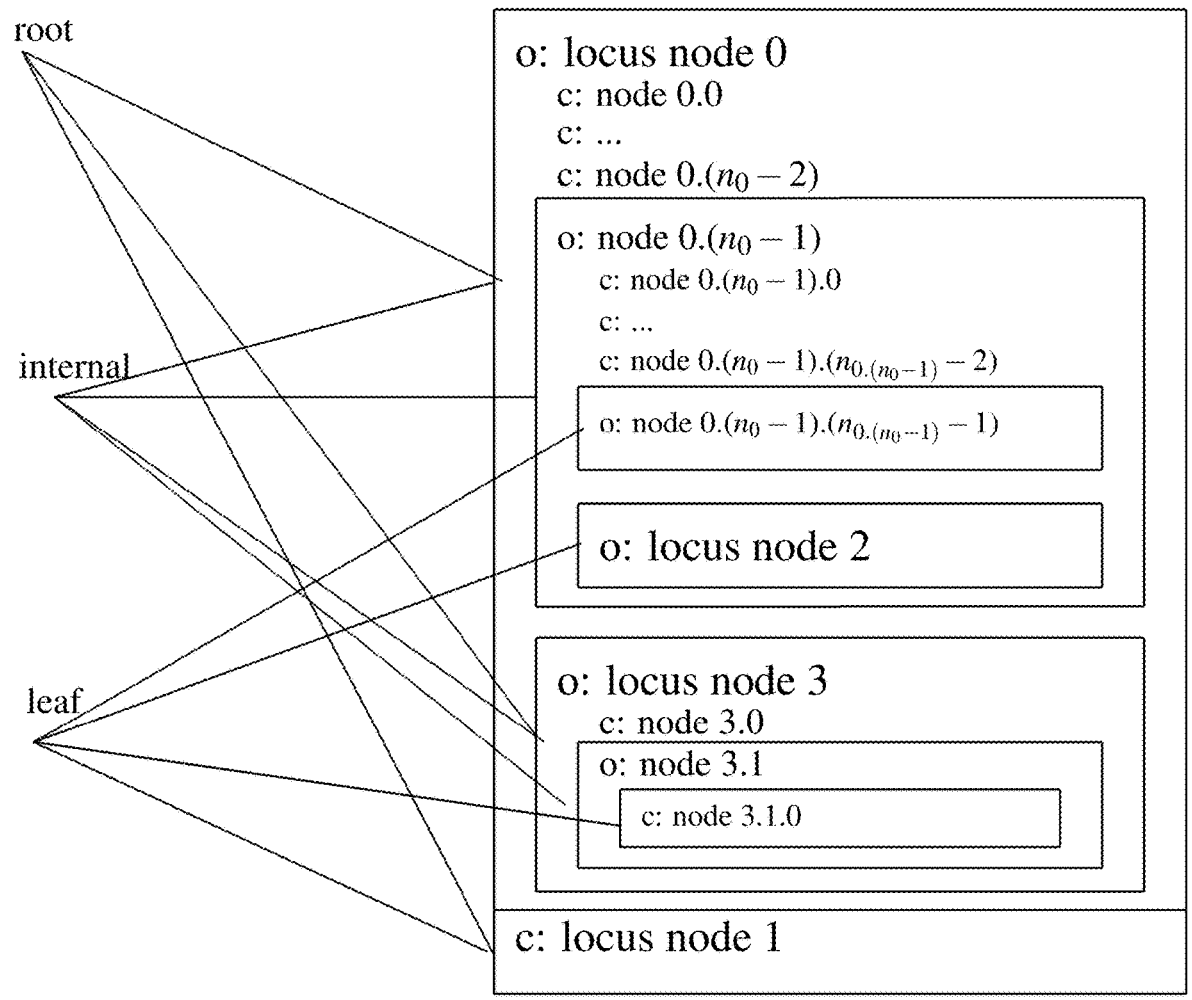

FIG. 212 is a diagram displaying the representation of substructure information that can be shared across multiple entities in an embodiment.

Figure 213:
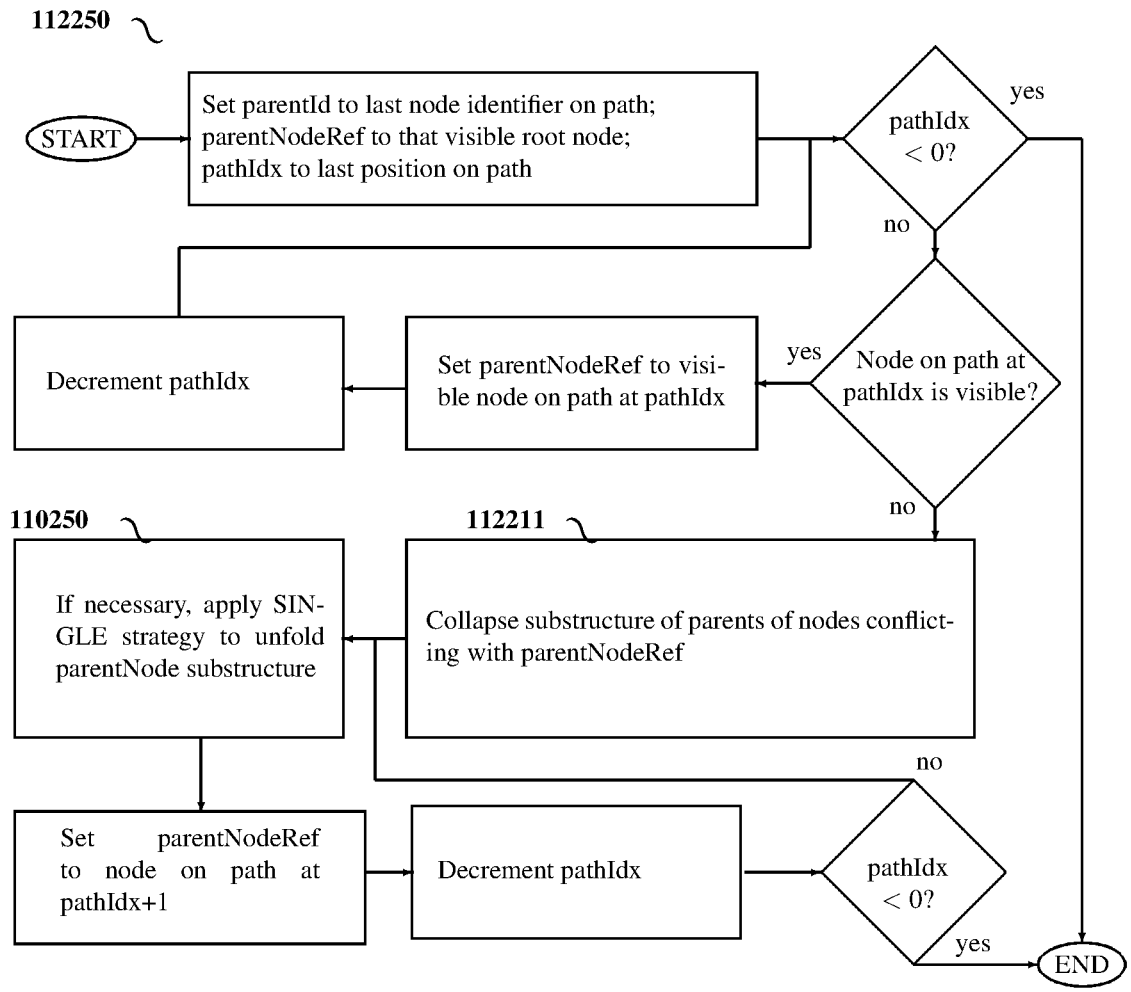

FIG. 213 is a process flow diagram of an embodiment of a routine that accepts a path of entity identifiers from a point in the substructure to the root and ensures that nodes along that path are unfolded, according to some embodiments.

Figure 214:
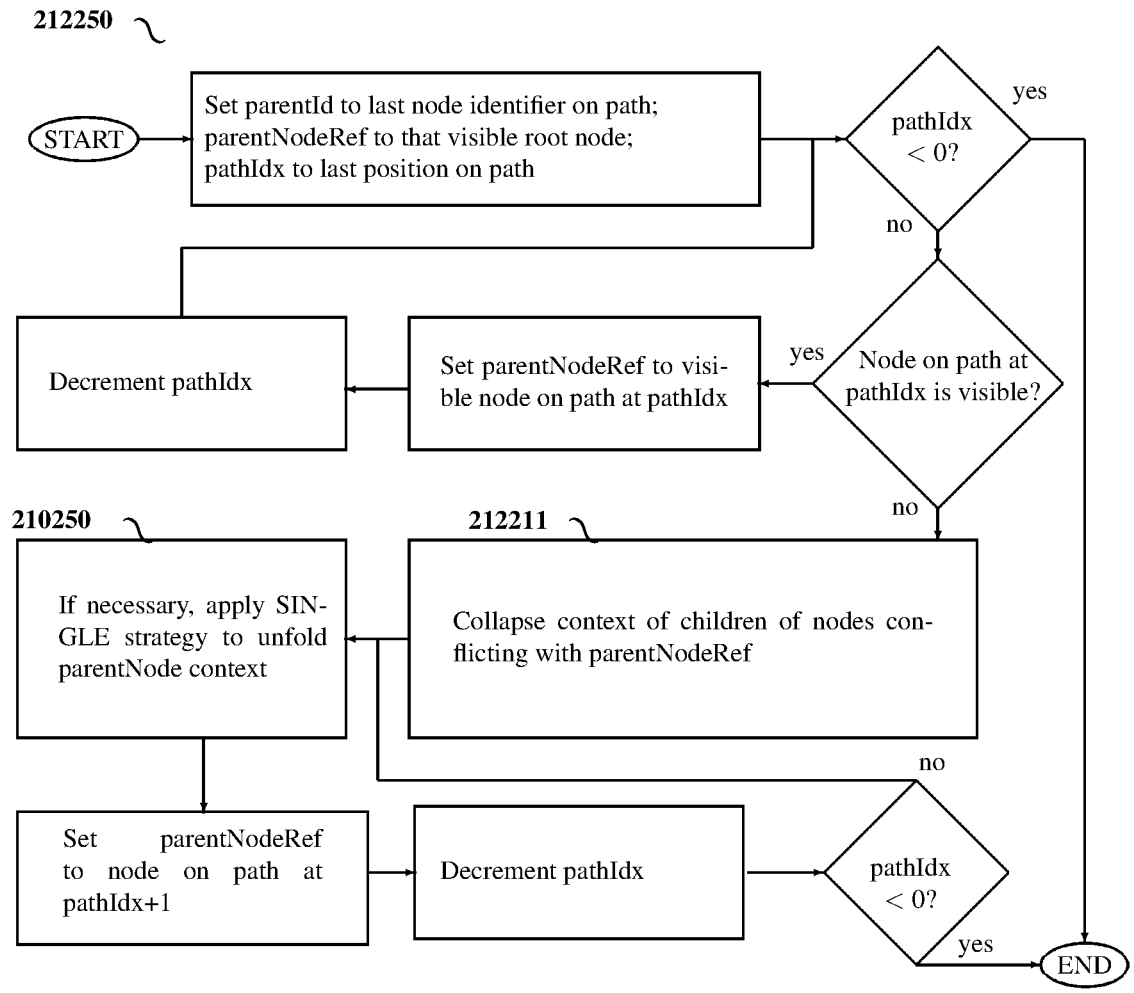

FIG. 214 is a process flow diagram of an embodiment of a routine that accepts a path of entity identifiers from a point in the context to the root and ensures that nodes along that path are unfolded, according to some embodiments.

Figure 215:

FIG. 215 is a project screen with active auxiliary information related to both context and substructure, according to some embodiments.

Figure 216:
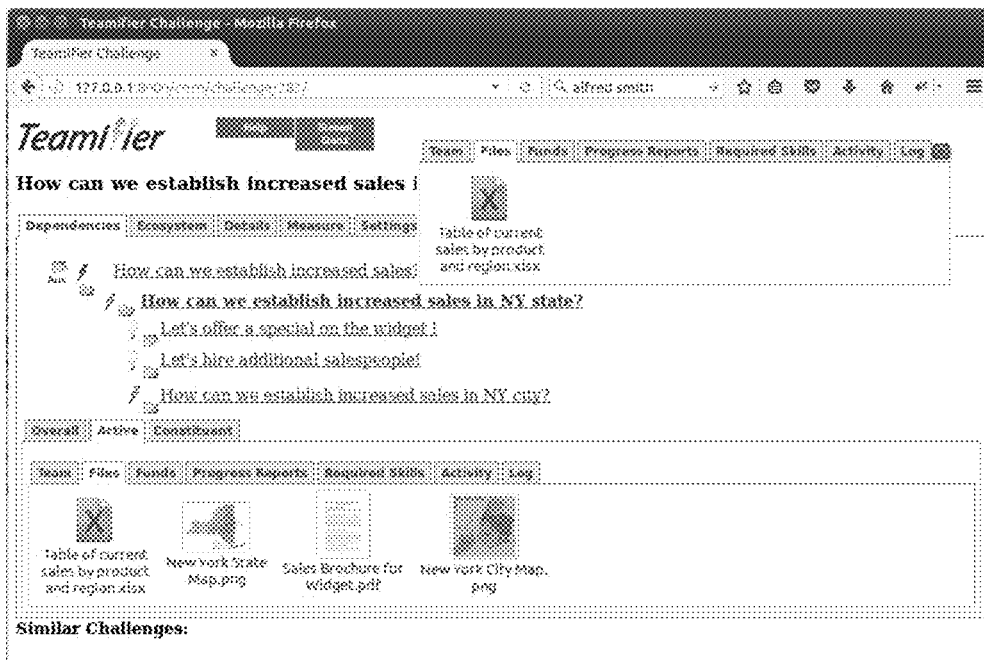

FIG. 216 is a project screen with auxiliary information related to context node, according to some embodiments.

Figure 217:

FIG. 217 is a project screen with auxiliary information related to locus node, according to some embodiments.

Figure 218:

FIG. 218 is a project screen with auxiliary information related to first substructure node, according to some embodiments.

Figure 219:

FIG. 219 is a project screen with auxiliary information related to the second substructure node, according to some embodiments.

Figure 220:

FIG. 220 is a project screen with auxiliary information related to the third substructure node, according to some embodiments.

Figure 221:

FIG. 221 is a project screen with active auxiliary information related to context, according to some embodiments.

Figure 222:
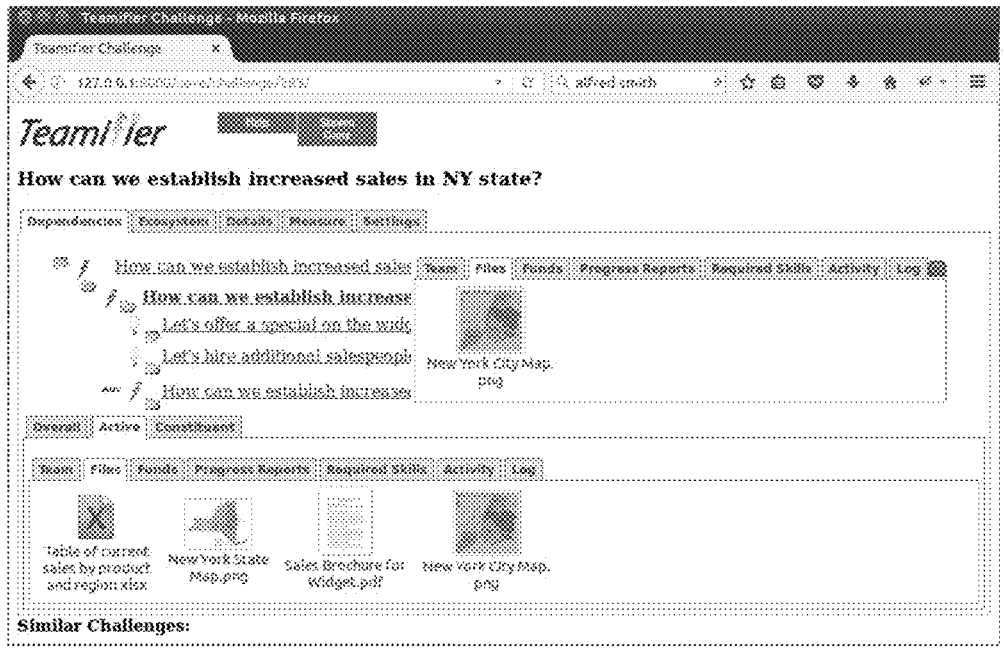

FIG. 222 is a project screen with active auxiliary information related to substructure, according to some embodiments.

Figure 223:
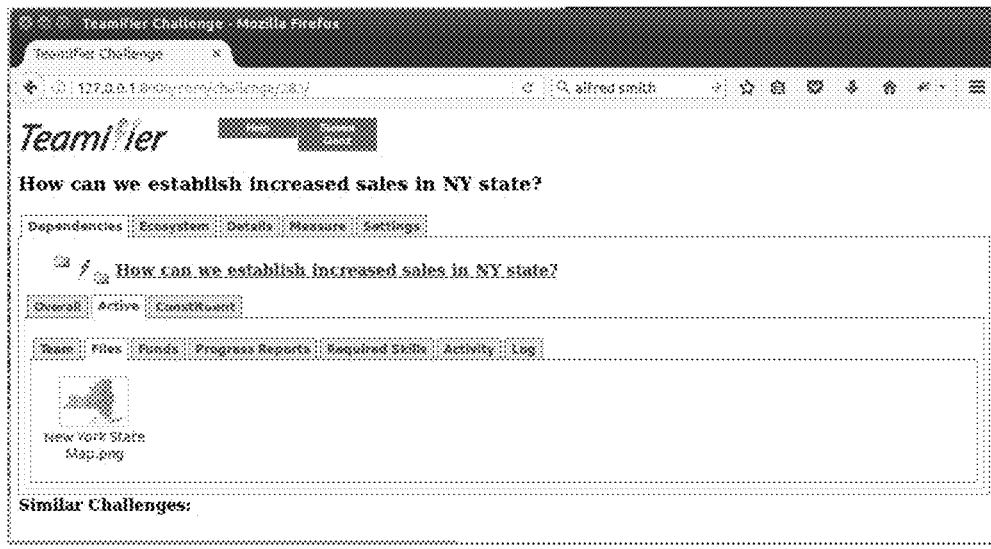

FIG. 223 is a project screen with active auxiliary information related to locus node, according to some embodiments.

Figure 224:
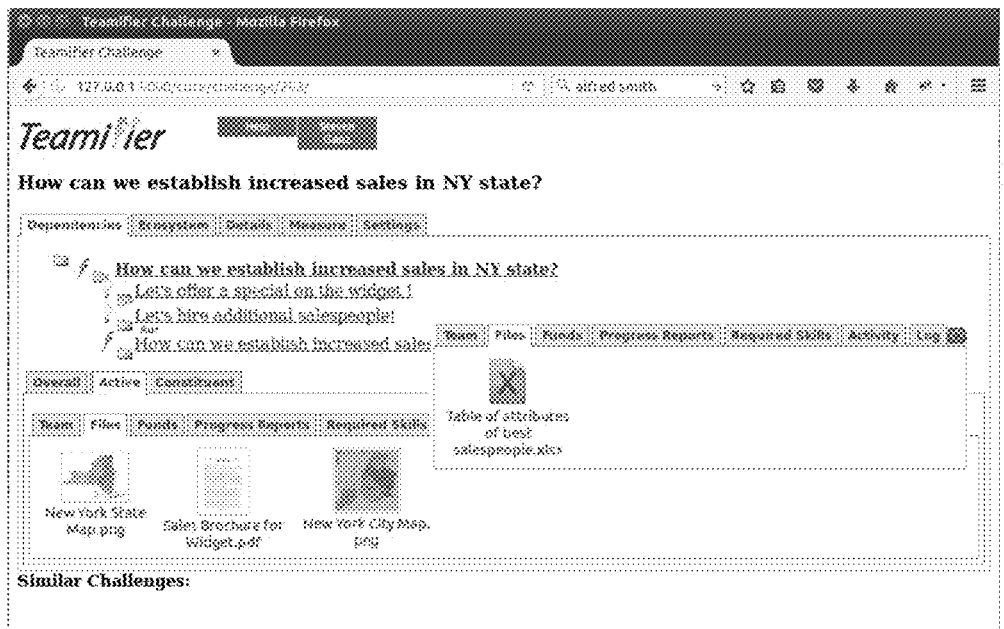

FIG. 224 is a project screen with constituent auxiliary information related to the second substructure node, according to some embodiments.

Figure 225:
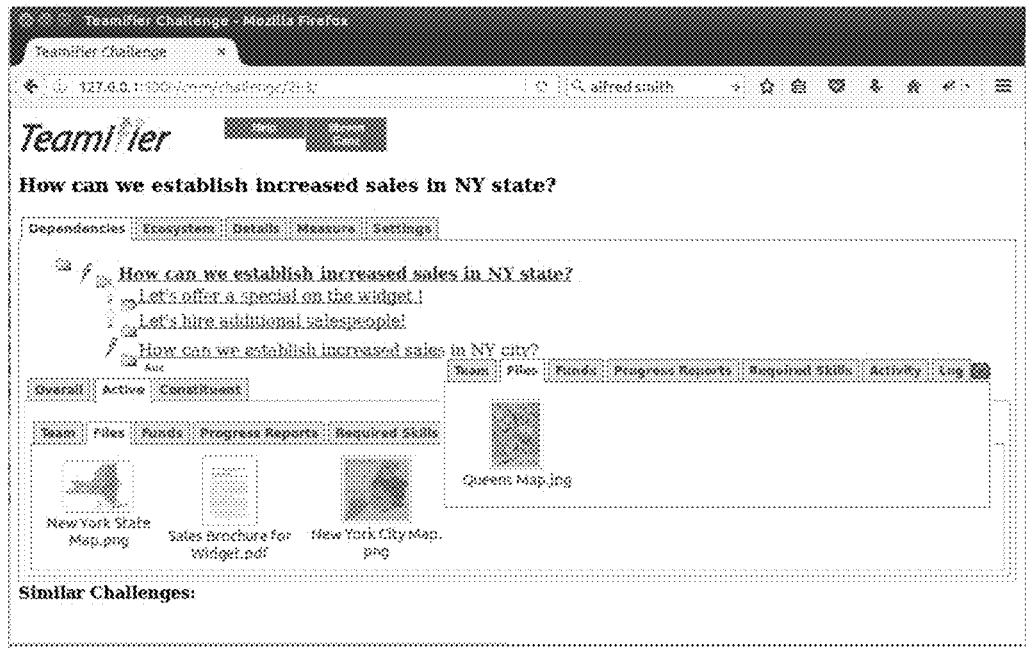

FIG. 225 is a project screen with constituent auxiliary information related to the third substructure node, according to some embodiments.

Figure 226:
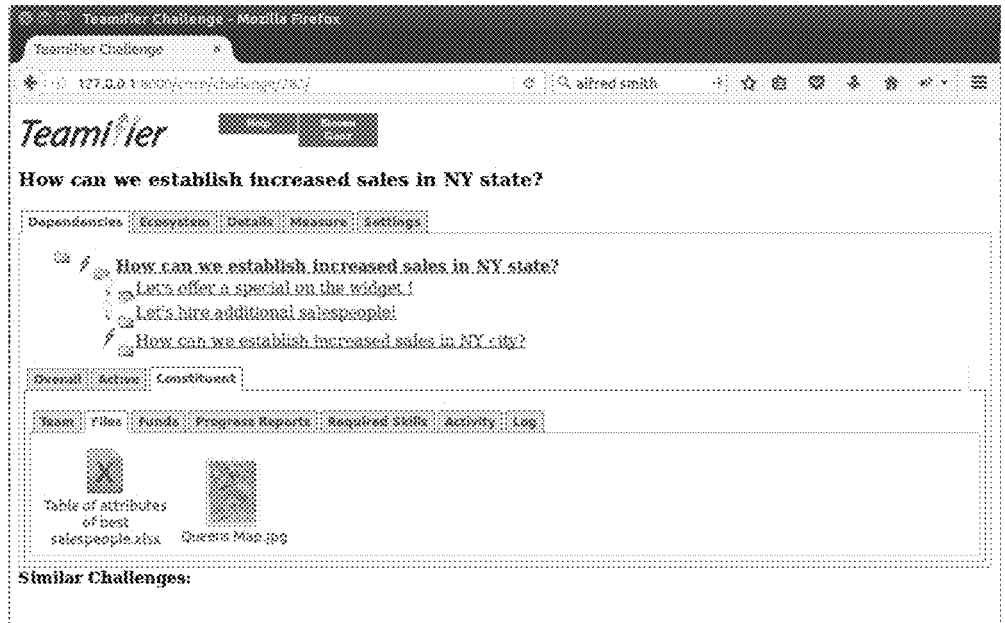

FIG. 226 is a project screen with constituent auxiliary information related to substructure, according to some embodiments.

Figure 227:
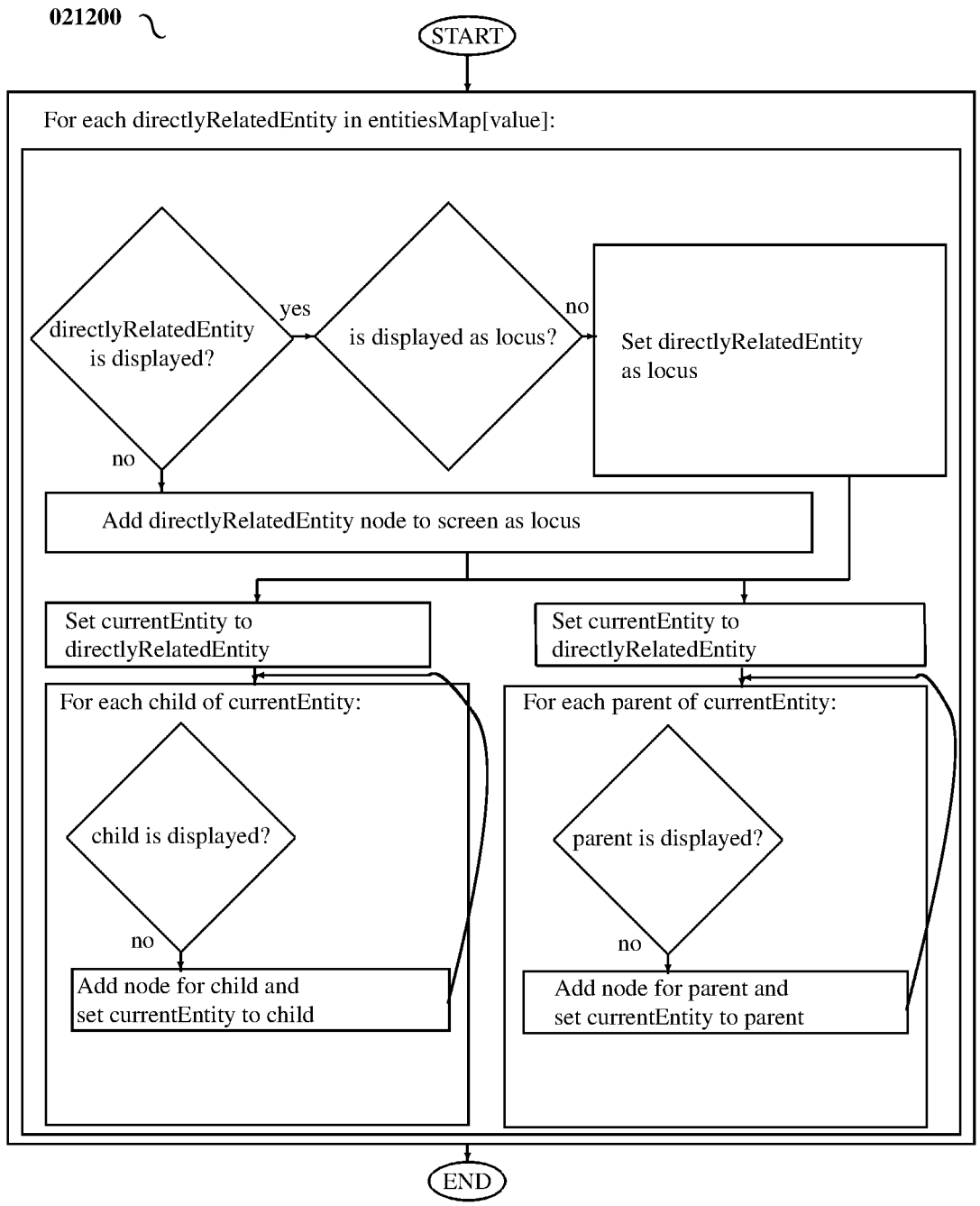

FIG. 227 is a process flow diagram of an embodiment of the client process to select a facet value by which entities are to be included as locus nodes, according to some embodiments.

Figure 228:
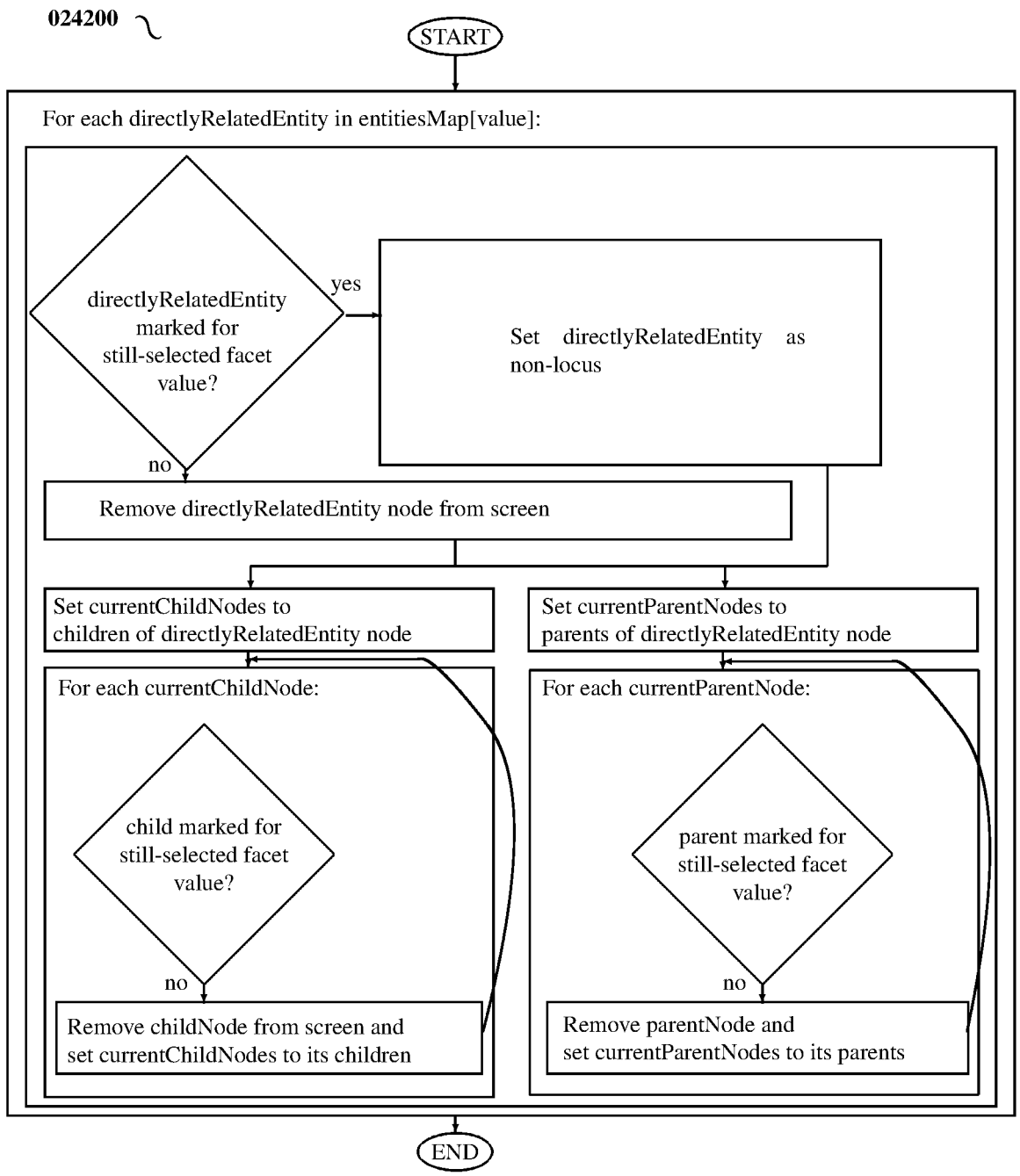

FIG. 228 is a process flow diagram of an embodiment of the client process to deselect a facet value by which entities are to be included as locus nodes, according to some embodiments.

Each drawing element in FIG. 175 through FIG. 228 is assigned a six-digit code as follows:
The first digit refers to relative position.
  1: Substructure
  2: Context
The second digit refers to the nodes that are active with respect to a state of navigation.
  1: Single Locus Node
  2: Multiple Locus Nodes
  3: Uniform Nodes
  0: Relevant to more than one focus The third digit refers to the operation with which the element is most closely associated.
  1: create
  2: expand
  3: collapse
  4: remove
  0: Relevant to multiple operations
The fourth digit refers to whether the nodes are statically or dynamically allocated (as described with respect to the Lifetime Strategies).
  1: Static
  2: Dynamic
The fifth digit refers to a strategy for how much content should be revealed, or 0 for any or N/A, in the order listed with respect to the Initialization Strategies or the Explicit Node Expansion Strategies:
The final digit is sequential.

The numbering system is intended to aid intuition and refers to a particular embodiment presented here. It is not intended to limit the applicability of any routine.

Figure 229:
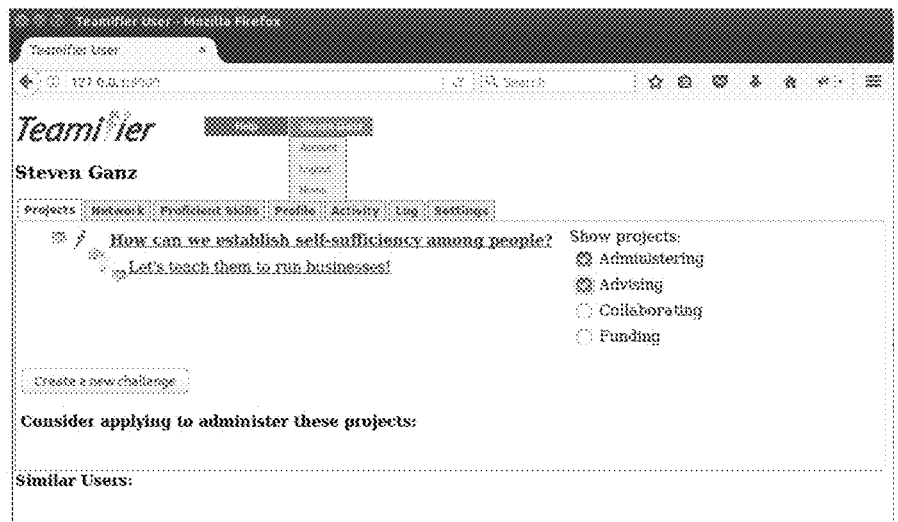

FIG. 229 is a user screen not checked into any project role, according to some embodiments.

Figure 230:
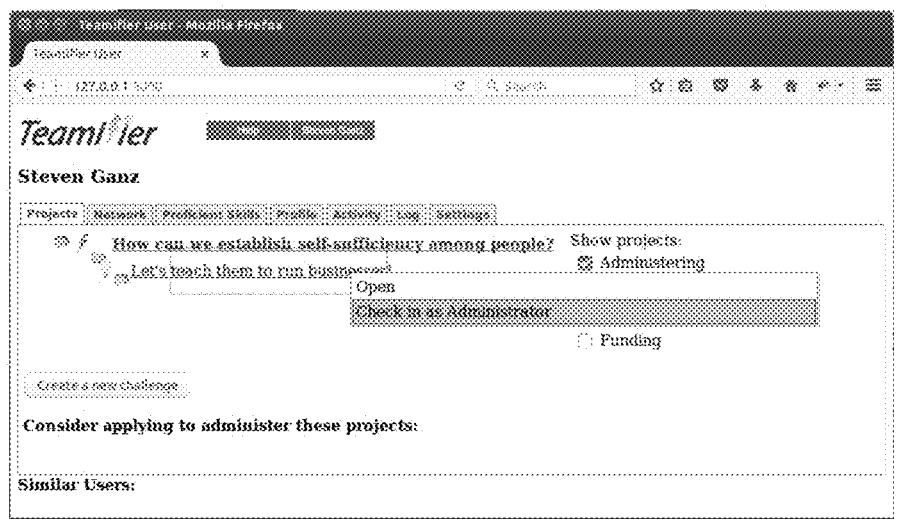

FIG. 230 is a user screen selecting the operation of checking in to a new project role, according to some embodiments.

Figure 231:
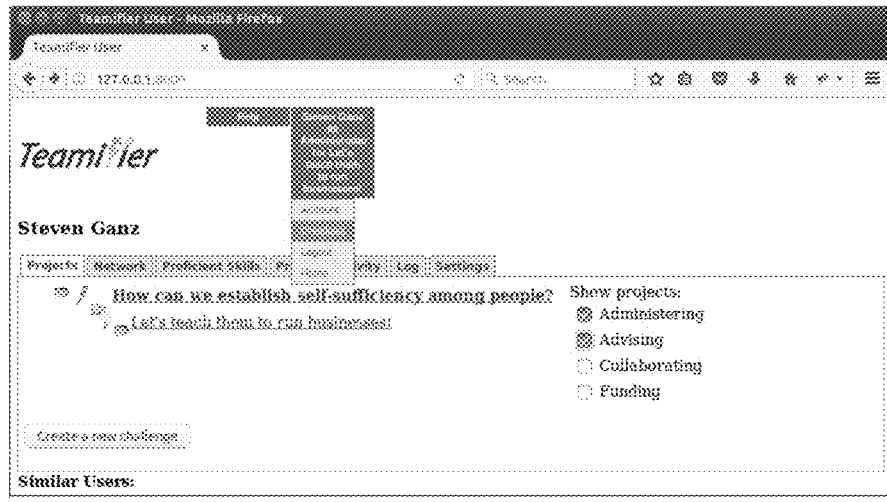

FIG. 231 is a user screen selecting the operation of checking out from the current project role, according to some embodiments.

Figure 232:
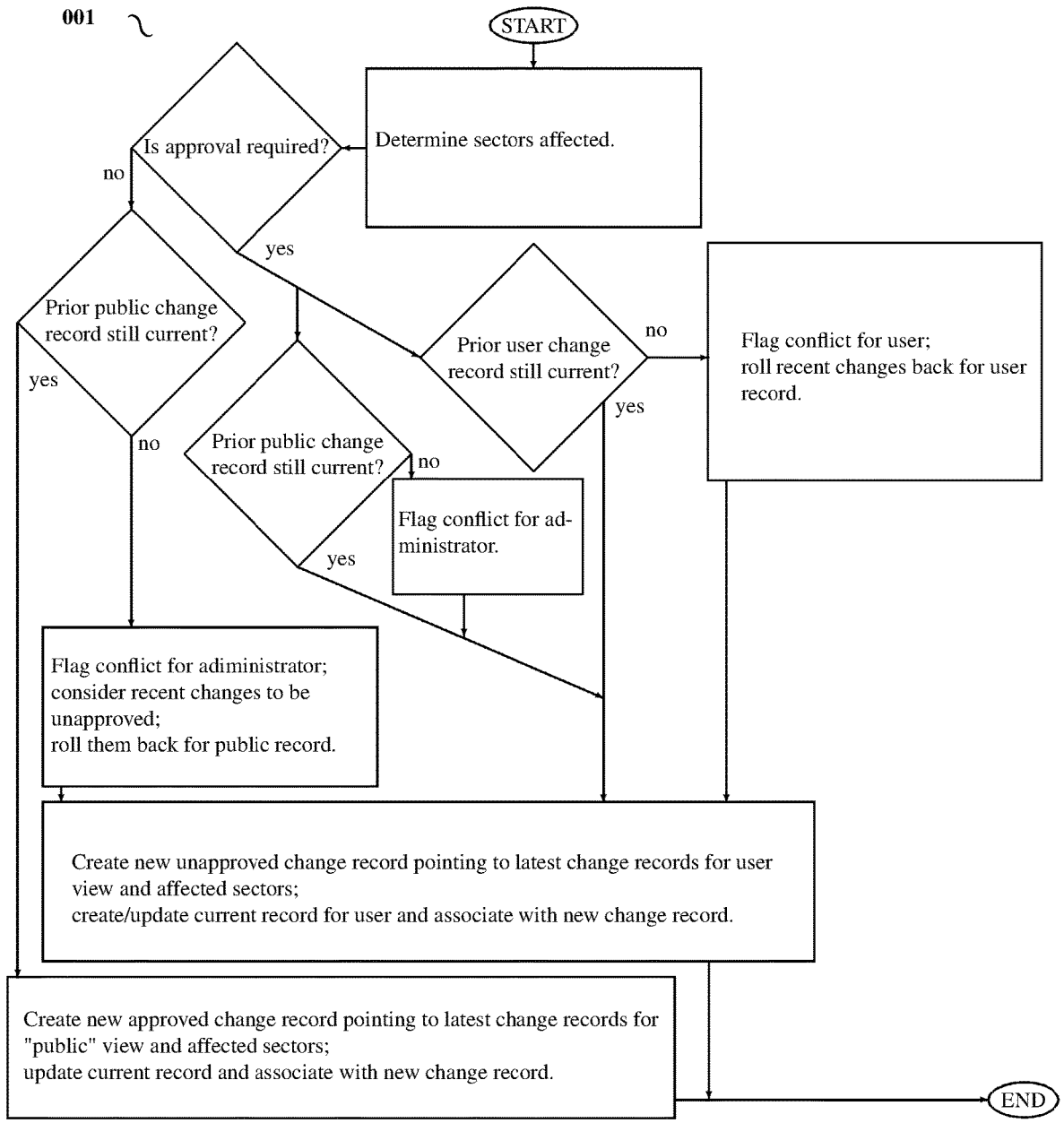

FIG. 232 is a process flow diagram of an embodiment of the process to handle a change request, according to some embodiments.

Figure 233:
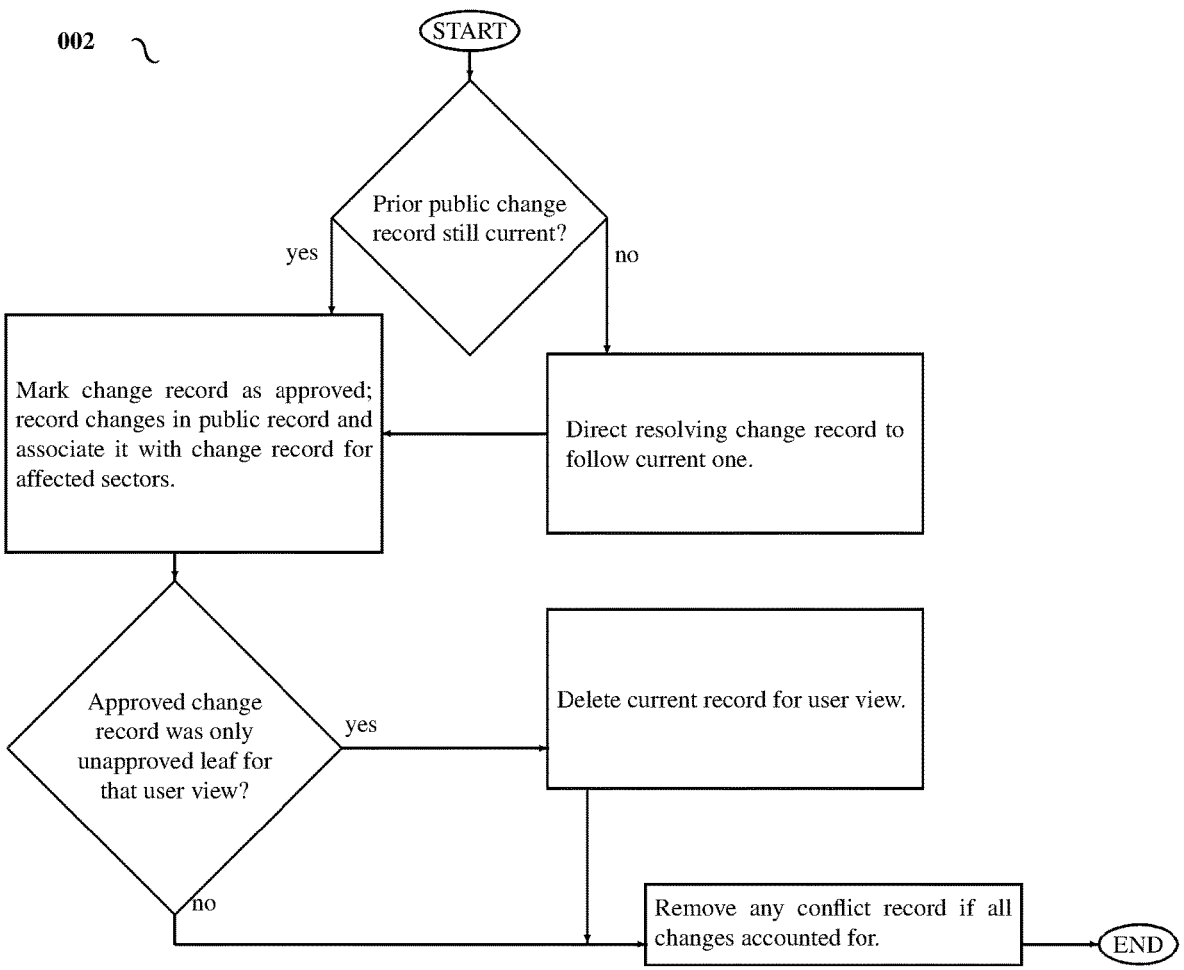

FIG. 233 is a process flow diagram of an embodiment of the process to approve a change, according to some embodiments.

Figure 234:
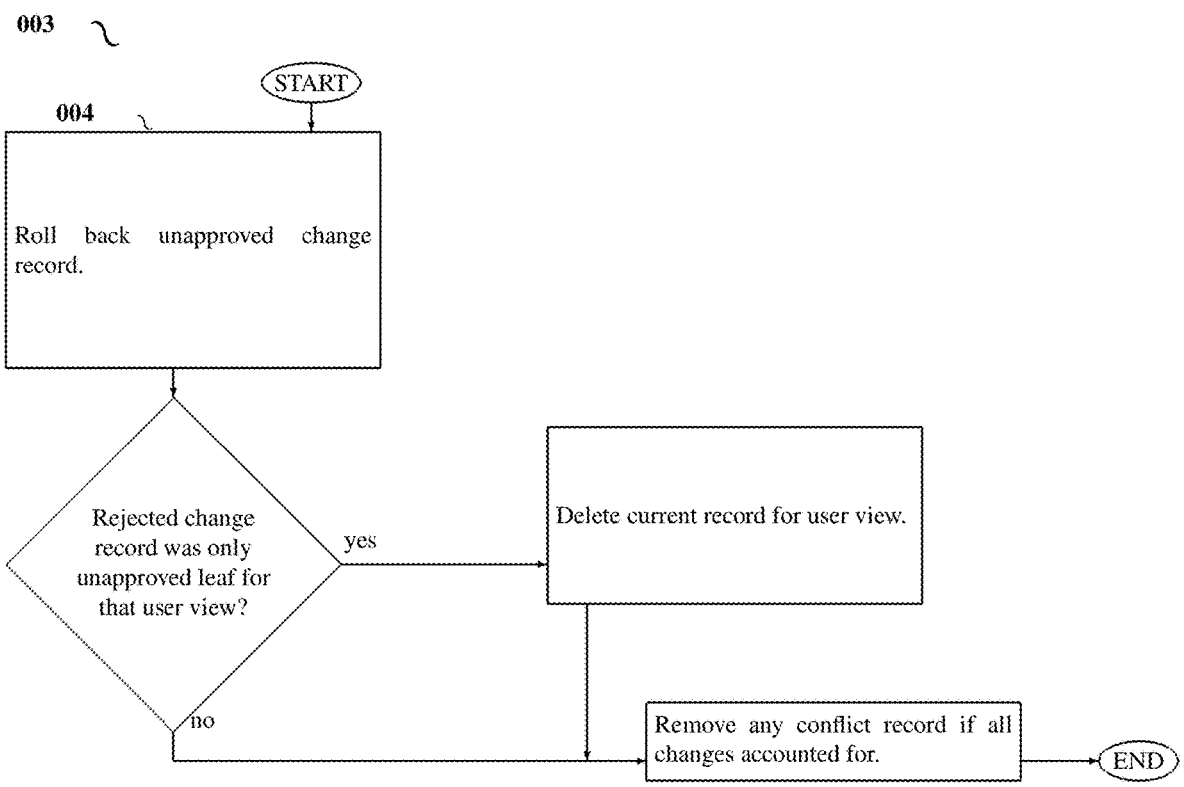

FIG. 234 is a process flow diagram of an embodiment of the process to reject a change, according to some embodiments.

Figure 235:
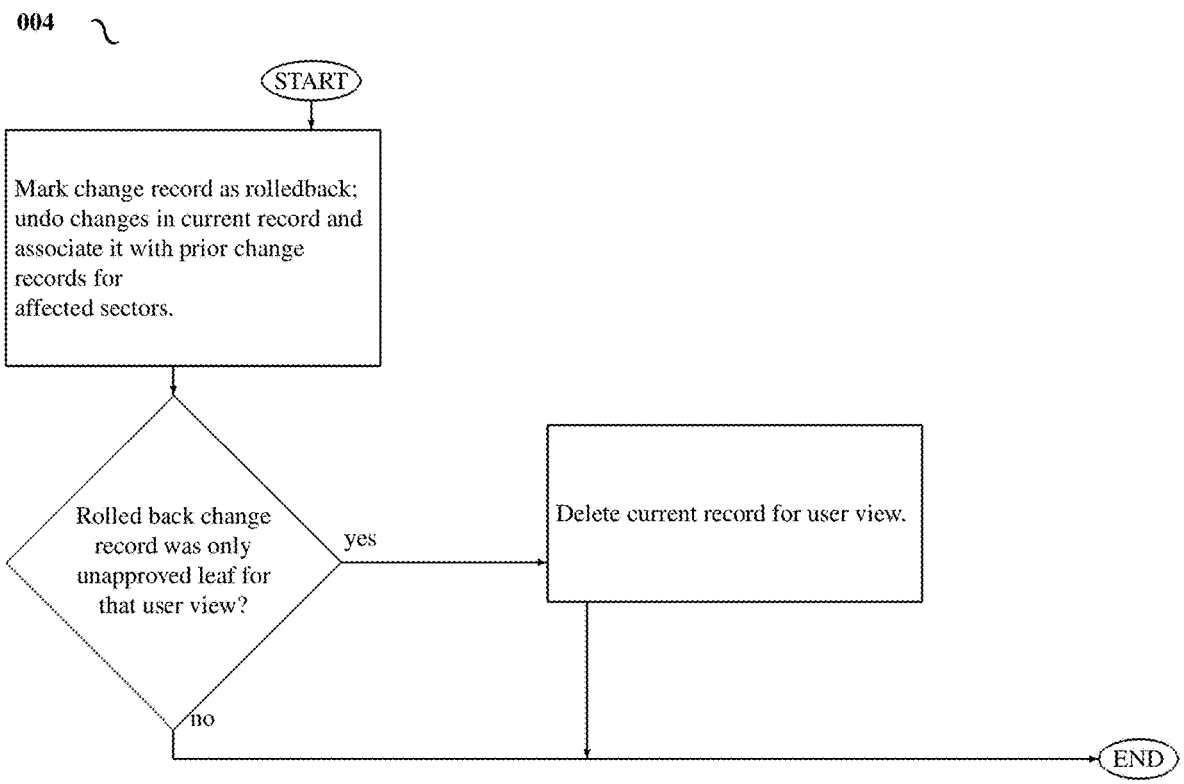

FIG. 235 is a process flow diagram of an embodiment of the process to rollback a change, according to some embodiments.

Figure 236:
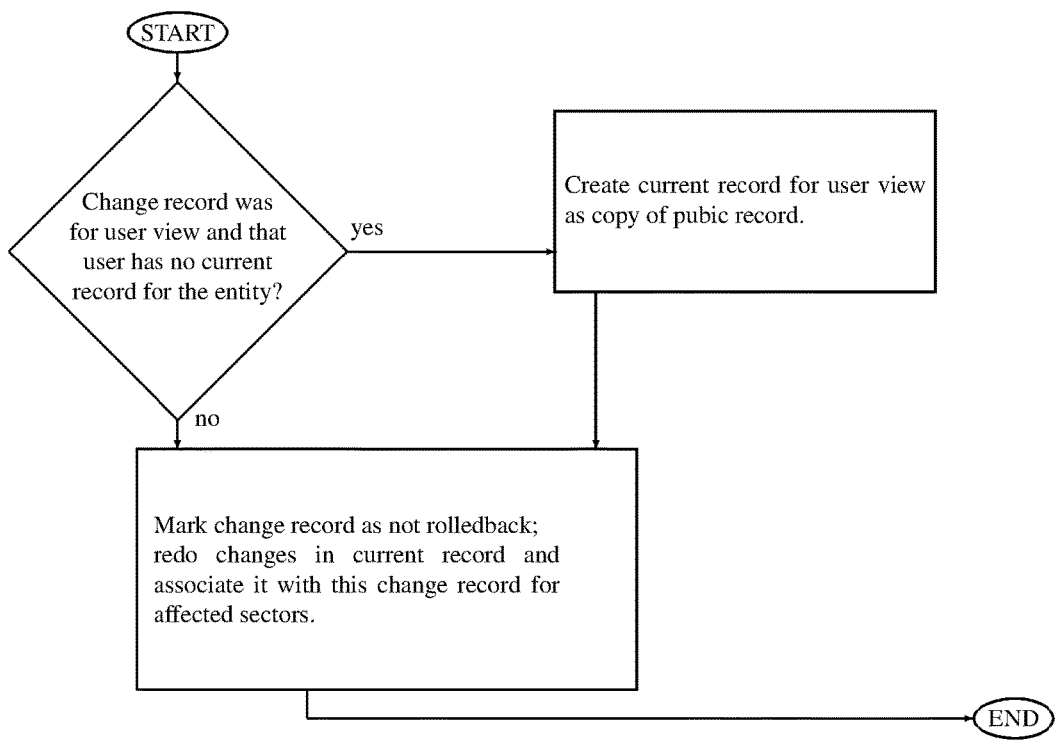

FIG. 236 is a process flow diagram of an embodiment of the process to undo a rollback, according to some embodiments.

DETAILED DESCRIPTION

There has been recognition of the value of a separation of the "problem space" from the "solution space" with respect to a project. Elements of the problem space may be referred to as "problems" or "challenges", and elements of the solution space as "solutions" or "approaches". Various systems facilitate collaboration and/or innovation by allowing for the proposal of challenges and potential solutions that address those challenges.

We interpret problems and solutions broadly, to apply to any domain including broad societal problems and solutions that could alleviate them, technical or engineering problems and solutions that satisfy them, and problems identified by marketing efforts as customer pain points and solutions as new products that could relieve them.

One can seek analogies for problem and solutions spaces in programming languages theory. For example, problems might correspond to types and solutions correspond to expressions, with the assignment of a type to an expression corresponding to a solution addressing a problem. This analogy is unsatisfying, because while a solution necessarily solves any special case of a problem it addresses, an expression belonging to a type does not necessarily belong to any subtype of that type. It's not that type theory isn't relevant, but rather that the relationship is contravariant. In particular, when one problem refines another, we mean that the latter problem can be seen as a function type with a more specific domain. For example, the problem of reducing poverty in an urban setting refines the problem of reducing poverty more generally because the urban setting is more specific than a more general setting, and one can make use of features of that setting in crafting a solution.

Object-oriented languages provide an analogy for such situations, because classes are in a refinement hierarchy where one method parameter (generally called "this" or "self") relates to the position in the hierarchy and thus becomes more specific at lower levels. Just as a method at a superclass can be called by any subclass, a solution to a refined problem applies to any refining problems, but the converse (a method at a subclass being called from a superclass) is not generally safe. Notice that we consistently use "refining" to refer to the more specialized entity and "refined" to refer to the more general one that it refines, which may differ from some common usage.

In programming languages theory there is a notion of refinement of expressions, whereby one expression refines another if it terminates whenever the refined expression does and with the same result. There is also a notion of refinement of expressions by a homomorphic mapping from the state diagram of the refining expression to that of the refined expression.

In terms of projects, refinement of a problem can correspond to identification of a special case of a problem and refinement of a solution can correspond to elaboration of the solution with additional detail. In addition to the relation of a solution addressing a problem, we consider the relation of a solution motivating a problem, whereby implementing a solution to a motivated problem would contribute towards implementing the motivating solution. We consider inheritance of solutions through the refinement relation on problems as well as inheritance of problems through the refinement relation on solutions. Inheritance of a solution through the refinement relation on problems recognizes that a solution to a problem is also relevant to any refinements of that problem, although a refining solution may be more appropriate. Inheritance of a problem through the refinement relation on solutions recognizes that a problem whose solution is necessary for implementing a motivating solution is also relevant to implementing any refinement of that solution and must be addressed, although perhaps in the form of a refining problem. In general, both the refinement relation on problems and that on solutions are many-to-many relations, i.e., not only can the same problem or solution be refined in multiple ways, but a given problem or solution can refine multiple other problems or solutions, respectively. The relations of a solution addressing and motivating a problem may also be many-to-many relations.

It is often the case but not appreciated that a solution is refined with respect to a problem, i.e., the additional detail provided is related to the fact that the refining solution addresses a refining problem. Or from another perspective, a solution to a problem may leverage off of a less specific solution to a more general problem. Likewise, it is often the case but not appreciated that a problem is refined with respect to a solution, i.e., the special case identified is related to the fact that the refining problem is motivated by a refining solution that more tightly defines what needs to be accomplished. Or alternatively, a problem motivated by a solution may add qualifications to a more general problem motivated by a less specific solution.

Beyond solutions addressing problems and problems motivated by solutions, embodiments maintain information about other elements of project information, which may include, without limitation, skills, arguments, individuals, and funds. For example, one can maintain skills required by a solution, with more specific solutions requiring more specific skills, and similarly arguments supporting or opposing problems (their relevance), solutions (their correctness), or other arguments (their validity). Required skills may be inherited through the refinement relation on solutions. Moreover, a skill may be refined with respect to a solution. Various elements of project information support natural refinement relations and inheritance of project information along those refinement relations in various directions. For example, requiring projects and proficient individuals may be inherited upward through the subskill refinement relation.

Augmentation of a hierarchy in a top-down manner may be supported by providing problems or solutions that refine those already present, solutions that address problems already present, and problems that are motivated by solutions already present. A hierarchy may conversely be augmented in a bottom-up manner. It would be useful to have an intuitive means of augmenting a DAG representing a project that implicitly captures facts such as that a solution of a problem may be defined with respect to a solution of a refined problem and that a problem motivation may be defined with respect to a refined problem motivation, what we will call relative DAG augmentation. Such a facility could also maintain a refinement correspondence between associations, so that later modifications to the project structure can be treated appropriately.

Information may often be presented with respect to an acyclic parent relation among entities. The converse of the parent relation is the child relation. Entities, here, may be physical or conceptual. By acyclic, we mean that no chain of one or more applications of the relation from any entity will yield that same entity. Such relation may, for example, represent that one entity or concept dominates, subsumes, or gave rise to another. As a few more specific examples: sets can be seen as parents of sets with strictly fewer elements; interfaces or classes in traditional object-oriented languages, or instances in delegation-based object-oriented languages are related by a hereditary structure; individuals (or portions of their genome) are related to their biological parents; in an outline structure of a document, any declared section of the document can be seen as a parent of each of its subdivisions; versions of a document are children of the prior versions from which they were developed. A tree is a hierarchical structure in which an entity has at most one parent. More generally, a directed acyclic graph (DAG) is a hierarchical structure in which an entity may have any number of parents. With respect to traditional object-oriented languages, classes in a Java program form a tree structure, while interfaces in a Java program and classes in C++ and Python programs all support multiple inheritance and thus form DAG structures. A non-empty tree has a single root node, having no parents. A non-empty DAG has one or more root nodes, having no parents. A node with no children is referred to as a leaf; a node with no parents is referred to as an orphan. A multiplicity of non-empty trees or DAGs is referred to as a forest or DAG-forest, respectively. The siblings of a DAG or tree node are the other children of its parents. The anti-siblings of a DAG node are the other parents of its children. To avoid confusion, we refer to siblings in the context tree, which are anti-siblings in the underlying DAG and the substrate tree, as context siblings. For the remainder of this description, we will use node only with respect to trees and consider the underlying DAG to be a conceptual relationship among entities.

A hierarchical structure may be large, so that it is difficult for an observer to orient themselves to its most relevant contents. Trees may be visualized with child nodes indented below their parents. There are standard and generally accepted ways of focusing on portions of trees, by collapsing and expanding various nodes. Those nodes may be represented with icons such as open, closed, or perhaps empty folders, that represent the current state of focus of that portion of the tree. An open folder might represent that the node has been expanded so that its children are visible; a closed folder that the node has been collapsed so that its children are hidden; an empty or upside-down folder that the node represents an entity without children. We speak of opening or closing the context or substructure of a node as marking that node appropriately to express the appropriate focus with respect to that hierarchy. Some embodiments may choose to support only open and closed icons, allowing nodes representing entities without descendants to be in an open or closed state.

DAGs may be visualized as their underlying graph, such that all edges point in the same general direction. This is used, for example, in open-source tools that support visualization of the evolution of various versions of a file system, including branching and merging of versions. But a DAG can be complex and distracting to represent visually. A tree is conceptually simpler than a DAG, and it may be the case that only one or a few subtrees within a DAG are relevant at any point in time. It would be useful to have a way of focusing in a DAG as if it were a tree, by designating one or more locus nodes to which users may navigate and with respect to which they may collapse and expand nodes, such that any entity is only represented by a single node in the visualization at any point in time. Another advantage of the tree representation is that it enables the use of common idioms such as copying, cutting, and pasting portions of DAGs.

We present various definitions relevant to describing some embodiments supporting navigation to locus nodes. The full subtree rooted at a node within a tree is composed of all of the nodes reachable from that node via the child relation; its context is the path from the node to the root. Similarly, the full subDAG rooted at a node within a DAG is composed of all of the nodes reachable from that node via the child relation; its context is the inverted tree rooted at that node and containing nodes reachable by any number of applications of the parent relation. We generally consider context to include the locus node and refer to proper context if we wish to exclude the locus node. The substructure of a full subtree or full subDAG are all of the nodes contained therein. We generally consider substructure to include the locus node and refer to proper substructure if we wish to exclude the locus node. Both the substructure and the context form logical trees; their components are also referred to as logical. This distinguishes them from the substrate trees in which they are represented, whose components are also referred to as substrate. Context grows upwards while substructure grows downwards. Substrate trees always grow downwards. These definitions are for expository purposes only. The only trees that must exist explicitly in embodiments in some form are the ones visualized by a user who is enabled to explore them. Such trees may be created by indenting nodes appropriately, forgoing all of these intermediate representations.

Systems supporting navigation of a tree and having a notion of locus node within the tree often provide access to the context of the subtree rooted at that node as a sequence of nodes in a parent relation, up to the root of the tree. For example, an operating system shell may display in its prompt the sequence of parent directories leading back to some designated root or home directory. It would be useful to have a way of visualizing and focusing on the context of a subDAG within a DAG, again such that any entity is only represented by a single node in the visualization at any point in time. One approach is to display separately the substructure tree and the context tree, both growing downward, and allowing both to be manipulated as simple trees, but this is not satisfying as it does not provide the user with a sense of the place of the locus entity as existing between the substructure and the context.

HTML is well-suited for representing trees as nested lists, and browsers have standard ways of visualizing such tree structures. Other representation languages including JSON are similarly well-suited for representing trees. It is clearly possible to represent a subtree and its context within the full tree as a single tree with the same root as the full tree, by excluding any nodes not in the subtree or the path to the root. It would be useful to have a way of visualizing portions of the substructure and context of a subDAG within a DAG as a single tree that could be presented within a substrate such as HTML.

Moreover, given a multiplicity of subDAGs (each rooted at different locus node), it would be useful to see them presented so that various connections to common ancestors and descendants are manifest.

Version control systems may be sequential in that they treat a revision history as a sequence of "commits". Each of those commits can include multiple changes to the same or various files. The changes within a file are identified by recognizing differences between an old and new version of the file. Those changes are committed together and while it is always possible to tease them apart later into separate commits, that is not the intended use. Rather, commits are intended to be undone one at a time, in the reverse order that they were established. Commits are recorded as "diff" results that notate which lines of a file are to be replaced with which other lines. It is thus easy to apply the diffs to the original file to bring it in line with the modified file, or vice versa. It is more difficult to apply "diff"s to a modified version of either file and this process may result in conflicts that must be resolved by a user.

Standard "diff" files are somewhat arbitrary in that there may be more than one way of recording a change to a file. In an extreme example, where the initial file contains 1000 identical lines and the revised one 999 of these lines, any one could have been assumed to have been deleted. The difference may matter if the diff file is later applied to a modified version of the original file.

Furthermore, chains of commits in standard version control form branches that may split and merge in a DAG. Thus, it is possible for a user to establish parallel branches with different changes, and undo those changes separately. But each branch contains only one set of changes, and if the branches are eventually merged, we again have a linear sequence of commits to deal with.

It is possible in standard version control to update a commit in the middle of a sequence and to then play back the subsequent commits, possibly triggering conflicts during this process. Such conflicts can be difficult to manage and resolve, but requiring that modifications be undone in the reverse order to that in which they were applied is overly restrictive when the changes are independent.

It would be useful to have a hierarchical system of version control that naturally arranges changes not in a linear sequence but in a DAG.

On conflicting changes to a database record, standard practice often involves rejecting all but one of the proposed changes. It would be useful to have a hierarchical system of version control that maintains and organizes conflicting changes for orderly conflict resolution.

A Method Using Inheritance to Support the Augmentation of Project Hierarchies

Project Management Entities and Relationships Including Separation of Problem and Solution Spaces Embodiments construct DAGs (possibly trees) based on various given intuitively acyclic relations. For many kinds of entities, there are natural refinement relations, such as the following:

directlyRefinesProblem To a problem, from one of its refining problems, i.e., a special case of the first problem.
directlyRefinesSolution To a solution, from one of its refining solutions, i.e., another solution consistent with that solution, but adding more detail.
directlyRefinesSupportingArgument To a supporting argument, from one of its refining supporting arguments, i.e., another supporting argument consistent with the first, but adding more detail or taking a stronger position.
directlyRefinesOpposingArgument To an opposing argument, from one of its refining opposing arguments, i.e., another opposing argument consistent with the first, but adding more detail or taking a stronger position.
directlyRefinesSkill To a skill, from one of its refining skills, i.e., a specialization of the first skill (i.e., a subspecialty, or subskill), such as from coronary surgery to surgery.
directlyRefinesUser To a user, from one of its refining users, e.g., a mentee or a subordinate in an organizational chart of the first user.

There are also often natural cross-kind relations among entities, such as the following:

directlyAddresses From a solution to a problem it addresses. It is natural (but not necessary) to require that every solution addresses at least one problem.
directlyMotivatedBy From a problem to a solution that motivates it (a solution to the problem would contribute towards implementing the given solution).
directlySupports To a problem, solution, or supporting or opposing argument, from an argument that supports it.
directlyOpposes To a problem, solution, or supporting or opposing argument, from an argument that opposes it.
directlyRequiredBy From a skill to a solution that requires it.
directlyProficientInSkill From a user proficient in a skill to that skill. Associations under this relation may be annotated with a proficiency level.

Any of these relations may be available as the basis for creation of a DAG structure. Various embodiments may make use of more or fewer relations, including these or any other naturally acyclic relations. These relations may be many-to-many, or any of them may be restricted to be many-to-one. If all are so restricted, the generality of a DAG is unnecessary as a tree would suffice for that relation, although the union of several such relations could still be many-to-many. In some cases (particularly the latter two) embodiments may well wish to build DAGs based either on the stated relation or its inverse.

In a cross-kind relation such as directlyAddresses, directlyMotivatedBy, directlySupports, directlyOpposes, or directlyRequiredBy, we refer to the first argument as the dependent entity and the second as the independent entity, with the intention that it be possible to inherit a dependent entity through a refinement chain of independent entities. We refer to an independent entity associated under such a relation with a dependent entity as an object of that dependent entity.

We use "refinement relation" to refer to any relation that can support inheritance (generally inheritance of dependent entities and, perhaps, their descendants), from a refined independent entity to any of its refining entities. We will see below under "In-place, Iterating DAG Augmentation" as "inherit other refining nodes through a restatement" that a refinement relation that is a restatement may also support inheritance of refining entities under that or another refinement relation. We use "cross-kind" relation to refer to any non-refinement relation, regardless of whether the kinds of entities related are actually the same or not. Embodiments may support only one refinement relation between entities of the same kind, or multiple such refinement relations. Embodiments such that only relation exists between entities of a pair of kinds (not necessarily distinct) may assume that all such associations between entities of those kinds are due to that relation.

We can then generate various derived relations. We begin with some standard technical definitions of derived relations:

We use the infix operator; to indicate composition of two relations, i.e., such that a pair of elements are related if there exists a third element such that the first is related to the third by the first relation and the third is related to the second by the second relation. The composition of relations has number no more than one-to-one if both relations are one-to-one. The composition of relations has number no more than one-to-many if the relations being composed are one-to-many or one-to-one. The composition of relations has number no more than many-to-one if the relations being composed are many-to-one or one-to-one. The composition of relations may be many-to-many only if at least one relation being composed is each of one-to-many and many-to-one, or if at least one relation being composed is many-to-many.

We use the postfix operator Kleene star (_*) to indicate the composition of zero or more applications of the supplied relation (from one kind to the same kind). The result of a Kleene star operation has the same number as its argument.

We use the postfix inverse operator ($\_^{-1}$) to indicate the relation with all arrows reversed from the argument relation (for a cross-kind relation, the input and output kinds are reversed).

It is useful to extend these directly defined relations in natural ways. Clearly, for the refinement relations:
refinesProblem:=directlyRefinesProblem*
refinesSolution:=directlyRefinesSolution*
refinesSupportingArgument:=directlyRefinesSupportingArgument*
refinesOpposingArgument:=directlyRefinesOpposingArgument*
refinesSkill:=directlyRefinesSkill*
refinesUser:=directlyRefinesUser*
refinedByProblem:=refinesProblem$^{-1}$
refinedBySolution:=refinesSolution$^{-1}$
refined BySupportingArgument:=refinesSupportingArgument$^{-1}$ refined ByOpposingArgument:=refinesOpposingArgument$^{-1}$
refinedBySkill:=refinesSkill$^{-1}$
refinedByUser:=refinesUser$^{-1}$ In some cases, we may require that every dependent entity be related to one or more independent entities. For example, we might require that every solution address one or more problems, or that every argument support or oppose one or more objects. We would not likely require that every problem be motivated by one or more solutions or that every skill be required by one or more projects. In some cases, we may require that every dependent entity be related to exactly one independent entity. Depending on the kind of entities and the relationship being represented, we may wish to enforce various other constraints on the relationships.

For the cross-kind relations, we begin with the obvious:
directlyAddresses⊆addresses
directlyMotivatedBy⊆motivated By
directlySupports⊆supports
directlyOpposes⊆opposes
directlyRequiredBy⊆requiredBy
and then notice the following basis for inheritance:
addresses; refinedByProblem⊆addresses A solution is assumed to address all refinements of any problem that it addresses. A problem is assumed to be addressed by any solution that addresses any problem it refines.
motivated By; refinedBySolution⊆motivated By A problem is assumed to be motivated by all refinements of any solution that motivates it. A solution is assumed to motivate any problem that is motivated by any solution it refines.
supports; refinedByObject⊆supports An argument is assumed to support all refinements of any objects that it supports. An object is assumed to be supported by any argument that supports any object it refines.
opposes; refinedByObject⊆opposes An argument is assumed to oppose all refinements of any objects that it opposes. An object is assumed to be opposed by any argument that opposes any object it refines.
requiredBy; refinedBySolution⊆requiredBy A skill is assumed to be required by all refinements of any solution that requires it. A solution is assumed to require any skill that is required by any solution it refines.

When one entity refines another, dependent entities associated with the entity being refined are also associated with the refining entity. Thus, when a user has navigated to a particular entity, it makes sense to show them entities directly dependent on entities which they refine. We call these inherited entities. For example, the problem "How can we establish a reduction in poverty?" can be created as a root problem and refined to "How can we establish a reduction in rural poverty?" and to "How can we establish a reduction in poverty among able-bodied individuals?". FIG. 1 through FIG. 6 show an embodiment supporting these actions. FIG. 1 is an initial Teamifier user page with a button (when the active user views their own page) for creating a new "challenge" (the system uses "challenge" for "problem" and "approach" for "solution"). Clicking the button provides (as in FIG. 2) an input field for the user to enter the essence of their problem, e.g., what they'd like to see established. In FIG. 3 the field is filled. Upon leaving the entry field, a transaction is sent to the server and if a response indicating success is received, a link to a challenge page is created as in FIG. 4. Clicking on the link created for the root problem takes a user to that problem's page, from which they could create the refining problems. FIG. 5 shows the selection of a specialization operation and FIG. 6 entry of the first specializing problem. "Let's teach needy people a skill!" might be added as a solution addressing the problem, "How can we establish a reduction in poverty?", so that solution necessarily applies as well to these refining problems, although as we will see, refining solutions may be helpful. FIG. 7 through FIG. 9 demonstrate how a user might propose the solution (after both specializing problems have been created). FIG. 7 shows the selection of the solving operation and FIG. 8 the entry of this solution. FIG. 9 shows the page after the solution has been created. FIG. 10 shows the selection of the componentizing operation for the new solution, FIG. 11 the entry of "How can we establish what the people already know?" as a component problem. Now, clicking on the link for one of the refining solutions, the user would see as in FIG. 12 the solution and its component as inherited descendants (indicated here with gray icons) as well as the general problem as context (also indicated here with gray icons). Likewise, a solution, "Let's transport supplies to where they are needed!" can be refined to "Let's transport supplies by submarine!" and to "Let's transport materials by spaceship!". "How can we establish protection of the supplies during transit?" might be a problem motivated by the solution, "Let's transport supplies to where they are needed!", so solving that problem would necessarily contribute to a solution to those refining solutions, although as we will see, refining problems may be helpful. FIG. 13 shows the result of clicking on the second solution specialization, with the general problem's component problem as an inherited child node.

We further notice the following basis for inheriting refining objects.
refinesSolution; addresses⊆addresses Any problem addressed by a solution is also addressed by the solution's refinements. A solution addresses any problem addressed by a solution it refines.
refines Problem; motivated By⊆motivated By Any solution that motivates a problem also motivates the problem's refinements. A problem is motivated by any solution that motivates a problem it refines.
refinesSupportingArgument; supports⊆supports Any object supported by an argument is also supported by the argument's refinements. An argument supports any object supported by an argument it refines.
refinesOpposingArgument; opposes⊆opposes Any object opposed by an argument is also opposed by the argument's refinements. An argument opposes any object opposed by an argument it refines.
refinesSkill$^{-1}$; requiredBy⊆requiredBy Any solution that requires a skill also requires the skill's generalizations.
A skill is required by any solution that requires a skill that refines it.

Notice that the refinement relation acts in the opposite direction in the inclusion for skill requirements by a solution; superskills rather than subskills of a skill are necessarily required by refinements of solutions requiring that skill.

When a user has navigated to a particular entity, we show them entities not only directly dependent on entities which they refine, and entities that refine the dependent entities, but entities that are dependent through any series of direct dependencies and refinements.

Embodiments support a user, or multiple users collaboratively, in developing and extending DAGs based on entities and relations.

A solution of a problem may be defined with respect to one or more solutions of refining problems. Likewise, a problem motivated by a solution may be defined with respect to one or more problems motivated by refining solutions. For the example of "Let's teach needy people a skill!" addressing the problem, "How can we establish a reduction in poverty?", "Let's teach needy people to farm!" both refines "Let's teach needy people a skill!" and directly addresses the refining problems "How can we establish a reduction in rural poverty?" and "How can we establish a reduction in poverty among able-bodied individuals?". Going further, "How can we establish what crops the people can already grow?" is a component of "Let's teach needy people to farm!" and specializes "How can we establish what the people already know?". For the example of "How can we establish protection of the supplies during transit?" being a problem motivated by the solution "Let's transport supplies to where they are needed!", "How can we establish protection of the supplies during transit through diverse pressure conditions?" both refines "How can we establish protection of the supplies during transit?" and is directly motivated by refining solutions "Let's transport supplies by submarine!" and "Let's transport materials by spaceship!". Such augmentation operations may be specified explicitly or implicitly by the user. For the first example, FIG. 14 through FIG. 21 show a demonstration of user actions to create these project entities and their results. FIG. 14 shows the user initiating an operation to mutually specialize "How can we establish a reduction in rural poverty?" and "How can we establish a reduction in poverty among able-bodied individuals?". The user selects the former, marking it with a green boundary, and initiates the specialization operation from the latter. We assume that the user creates the specializing problem and navigates to it, then expands the context. "How can we establish what the people already know?" is displayed as an inherited descendant of the new problem. We will present various formulations of the creation of a cross-kind association alongside one or more refinement associations. FIG. 15 shows the initiation of a specialization operation from that inherited descendant, implicitly also requesting specialization of its inherited parent, "Let's teach needy people a skill". FIG. 16 shows an in-place restatement by the user of "Let's teach needy people a skill!" to "Let's teach needy people to farm!" as a solution of that problem. The system then progresses to an in-place restatement in FIG. 17 by the user of "How can we establish what the people already know?" to "How can we establish what crops the people can already grow?". If the user then navigates to the new solution and expands the context appropriately, we see in FIG. 20 that the new problem is a child of both the problem it refines, "How can we establish what the people already know?" and the solution of which it is a component, "Let's teach needy people to farm!". We also see that the latter solution is a child of both the solution it refines, "Let's teach needy people a skill!" and the problem it solves, "How can we establish a reduction in rural poverty among able-bodied individuals?". If the user navigates to the original general problem, "How can we establish a reduction in poverty?" and appropriately expands the substructure, we see in FIG. 21 that the solution "Let's teach needy people a skill!" still exists as does its child, "How can we establish what the people already know?", and that each of these has as a child its new restatement.

FIG. 22 shows how data flows through an embodiment. The DOM Tree exists only on the client, while the Full DAG exists only on the server. The localized DAG is created by the server for use by the client. It includes a subset of the information from the Full DAG from the perspective of one or more entities to which the client has navigated. All three data stores are maintained based on user operations generated through the Client UI.

FIG. 23 shows possible sequencing of interactions between a client and a server system under an embodiment. There could be any number of client systems interacting with the server, and either the client or the server could potentially be distributed over many computing and storage devices. We elide any serialization and unmarshalling of values for transport, as this requirement is familiar to those skilled in the art of software development. The client might begin by presenting a search query to the server. The server might respond with zero or more search results, from which the client might select one or more locus entities. Alternatively, the client might navigate through a representation of the full DAG to select one or more locus entities. This selection is communicated to the server, which localizes the DAG to those entities via Localize DAG 2200. The resulting DAG is sent to the client, where it is set to be explored by the user with Present DAG 0100. At any point now, the server may notify the client of updates to the local DAG entities generated by other sessions, implementable through web sockets. The user may select one or more entities, repeating this processing on the server side. Alternatively, the user may perform a manipulative operation on the DAG. If the user augments the DAG, in addition to the client (via Client Specializing DAG Augmentation 2101 and Client Cross-kind and Specializing DAG Augmentation 2102) implementing this operation on its own copies of the DAG (including the user's visualization) the parent entity ids and new entity information are sent to the server, which performs corresponding operations on the server's DAG (via Specializing DAG Augmentation 3201 and Specializing Cross-kind DAG Augmentation 3202). Augmenting the DAG may involve augmenting an inherited node, in which case Copy Inheritance for Specialization 2103 may be required. We have assumed here top-down augmentation, but of course bottom-up could be handled similarly. If the user deletes a portion of the DAG Delete DAG Portion 0104, the server should be notified of that portion, perhaps by enumerating the entity ids to be deleted. The client and server may delete those entities Delete Entity 0204 and any connecting relationships Delete Relationship 0214 (inherited entities are not subject to deletion). If parents and children of the deleted nodes remain in the DAG, they may be connected by new relationships Create Relationship 0213. If the user unlinks children from their parents Unlink Entity 0114, the server is notified of the entity ids and their parent entity ids. The client and server may delete those relationships on their own copies of the DAG Delete Relationship 0214 (inherited entities are not subject to being unlinked from their parents). If the user moves a portion of the DAG to new parents and children, replacing an existing relationship, Move DAG Portion 0105 the server is notified of the portion of the DAG so moved, its old parent and child entity ids and its new parent and child entity ids. The client and server may delete the relationships linking this portion of the DAG to its old parents Delete Relationship 0214 and create relationships linking it to its new parents Create Relationship 0213. Again, if parents and children of the deleted nodes remain in place in the DAG, they may be connected by new relationships. These operations are defined broadly; an embodiment may provide special cases of any of them. Any number of other operations may be expressible by the user through the client; each is performed on both client and server copies of the DAG. In each case, operations may be communicated to the server at any level of abstraction; e.g., analysis of the high-level operations may take place only on the client, or on both the client and the server. The latter duplicates effort but may reduce transport costs and provide a more secure interface. For example, some embodiments might have each server operation create only a single entity or relationship, which are the underlying operations.

The terms client and server are to be interpreted broadly. The client and the server may in some cases be the same machine. Moreover, the global DAG may be divided among any number of server systems. As an extreme case, each user may host the content of projects they administer on their own machine.

Explicit DAG Augmentation by Specialization

Some embodiments provide the user with a global view of the full DAG, or any restriction thereof. From this DAG, they can select nodes from which they wish to extend the DAG.

The user might select several entities of the same kind to jointly refine. Consider the DAG in FIG. 24, with circles representing entities of independent kind and squares representing entities of dependent entity kind (we assume here and below for concreteness but without loss of generality that circles and squares represent problems and solutions, respectively, that links between the same shape represent refinement, and that links between circles and squares represent either a solution addressing a problem or a problem motivated by a solution, depending on the direction). Here, we see a "diamond" refinement pattern among problems. If the user jointly refines nodes 4 and 10, the DAG in FIG. 29 is a possible result.

The user might instead explicitly select both an independent entity to extend with a cross-kind association and any number of dependent entities to refine. For example, the user might select a problem and a set of solutions from which to derive a refining solution that addresses the problem, or the user might select a solution and a set of problems from which to derive a refining problem that is motivated by the solution. If the user acting on the DAG in FIG. 24 again refines solution nodes 4 and 10, but this time while solving node 5, the DAG in FIG. 36 is a possible result.

In this model, there is no need to recognize any difference between kinds of nodes or between relations, other than to maintain this information for and present it to the user.

Various issues discussed in sections below with regard to implicit augmentation can also apply in the explicit scenario. Moreover, we will see that with a tree-based view of the DAG, such as for example under "A Method for Exploration of Hierarchical Structures and Representation of Context Thereof", these explicit operations can be performed entirely within the substructure, the context, or both, in a way that enables enforcement of appropriate constraints.

FIG. 42 shows the hierarchical structure of an embodiment without regard to inheritance. The embodiment consists of a client system, a server system, and network connections between them. The client system runs a browser that presents an interface through which users can explore or augment a DAG. The client's augmentation process makes use of a general routine for augmenting a node, generating a proof and triggering communication with the server. Underlying these is an operating system, which controls access to system hardware. The server system runs a database management system (DBMS) server and a web server. The web server orchestrates between routines that build localized versions of the DAG with respect to a particular locus node or nodes for use by the client and that modify the server's representation of the DAG. The former makes use of routines to reduce the server's full version of the DAG.

The routines that modify the server's representation of the DAG and that reduce the server's full version of the DAG access the database through the database management system (DBMS) client. Various routines make use of the operating system, which controls access to system hardware. The web browser (client) communicates with the web server via Hypertext Transfer Protocol (HTTP), which is transferred using Transmission Control Protocol (TCP) and Internet Protocol (IP).

The user can be assumed to be particularly concerned with the entity represented by the node to which they navigated. It is useful to reduce the size of the DAG for various reasons. These include: to present only the most relevant information, to reduce the cost of transferring information to a separate machine on which the exploration and augmentation are likely to take place, and to reduce the size of the graph on which subsequent processing may take place. Also, in performing this operation, the DAG is naturally segmented into the locus node, its context and its substructure, thus at any point in exploration can be presented as a pair of trees. We will see that this representation is also useful for the augmentation operation. It is possible, however, for embodiments to avoid reducing the DAG. Such embodiments still allow for navigating through a DAG and may have equivalent notions of context and substructure based on following arcs to and from the locus.

Given a DAG Dag, for any entity E we define the DAG $Dag_E^1$ to differ from Dag only in that $Dag_E^1$ excludes any nodes neither reachable from E in Dag, nor from which E is reachable in Dag.

FIG. 25 shows the DAG Dag from FIG. 24 after reduction with navigation centered at node 1, i.e., $Dag_1^1$, while FIG. 32 shows Dag after reduction with navigation centered at node 5, i.e., $Dag_5^1$.

Obtain $Dag_E^1$ from Dag by including the locus node, and scanning and including its ancestors and descendants. With many-to-many relations, it is necessary to maintain a data structure of visited nodes to avoid including any common descendants multiple times, as is familiar to those skilled in the art of computer algorithms. FIG. 43 presents this routine.

Rather than necessarily processing the entire DAG, which could be quite large, especially if auxiliary information is being collected at the same time, embodiments may place limits based on depth, cumulative storage required, or any other mechanism. When the user indicates a need to proceed deeper into the hierarchy (requesting either more substructure or more context from any node at which construction of the localized DAG has been suspended), additional nodes could be fetched by the server. In the localized DAG structure passed to the client, signal values could be inserted in place of the list of children of each logical tree (refining and related dependent entities in the substructure and refined and related independent entities in the context) having been deferred or, alternatively, dangling references can be left in the localized DAG for entities whose information has not yet been retrieved from the server.

This can be implemented by having the server, when a limit has been reached, store a continuation with each node at which scanning of the DAG is paused and associating that continuation with a URL through which the client can resume scanning that portion of the DAG. Many embodiments, however, rather than maintaining such continuations by user, may prefer to resume scanning of the DAG by having the client provide values for the free variables of the continuation, likely including the entity at which scanning was paused. With this approach, in order to prevent the server from having to fetch all descendants, including those already residing in the client's localized DAG, the client would need to pass that information with its request for additional information.

Rather than fixing a depth limit across the application, embodiments may allow it to be set in the parameters sent by the client requesting initial access to entity information.

If a refinement relation is many-to-many, some embodiments may wish to prevent situations in which a direct refinement association is created where an indirect one already existed, by checking for indirect refinement between the various proposed parents of a refining entity. Other embodiments may leave these in place, on the basis that preventing them requires checking for preexisting refinement upon creating new refinement associations, a potentially expensive operation (especially if a depth-limit is placed on the DAG during localization as described earlier in this section as "embodiments may place limits based on depth").

Alternatively, it is possible to allow these redundant associations to be formed, but identify and remove them later, in a separate pass or, for example, during Reduce DAG 0210. We want to identify and eliminate refinement paths of length one where a longer refinement path exists between the same entities. It suffices to keep, cumulatively, an association list or hash table as we descend through refinement substructure, mapping each sibling of the refining node being investigated to its comprising refinement association. If an entity in the dictionary is encountered, we can safely remove the corresponding association as redundant. Of course, a similar procedure could be applied when scanning the context. A standalone version is presented in FIG. 44.

Multiple Simultaneous Refinement

We begin with the implementation of examples such as those of FIG. 24 and FIG. 29 presented above under "Explicit DAG Augmentation by Specialization". The user again navigates to a particular node, selects nodes from the resulting substructure or context (although some embodiments may restrict this selection to the proper substructure), and, if possible, is given the opportunity to define a new node (and entity) with the selected nodes (entities) as refinement parents. Again, the precise constraints on the node selection may depend on choices made by the embodiment, but the selected nodes are assumed to be of the same kind, and the same kind as the intended child. We assume below for concreteness that the operation is initiated from one of these intended parents (the parentNode), but the selection can be initiated in any manner.

There are often good reasons to associate with each dependent entity a distinguished independent entity, such as the problem addressed by a solution or the solution addressed by a supporting or opposing argument. Doing so implies that the derived relations such as addresses, supports, or opposes are many-to-one, such that, for example, a problem have many proposed solutions, but each solution addresses only one problem.

If a refinement relation (take for example, directlyRefinesSolution) is many-to-many (thus supporting multiple inheritance), then a cross-kind relation for which that is the dependent kind (take for example, addresses) may be many-to-many, even if the given relation from which it is generated (directlyAddresses) is many-to-one, since the refined solutions may directly address different problems, all of which must be addressed by the refining solution.

So an additional concern arises where the given (directly specified) cross-kind relation is many-to-one and we wish to assign to each dependent entity a distinguished independent entity related to it by the derived cross-kind relation (as in, for example, addresses, motivated By, supports, and opposes, described above under "Project Management Entities and Relationships Including Separation of Problem and Solution Spaces"). In particular, for dependent entities that are not otherwise assigned such an independent entity through a direct cross-kind association and that refine dependent entities with such an assignment, there are various options of independent entity.

But there is also good reason to limit those options with a correspondence constraint (see "Leveraging inheritance and tree view for single cross-kind augmentation with multiple simultaneous refinement" below as "to avoid inconsistencies with inheritance" and advantages in calculating GLB below in this section). In assigning an independent entity to a new dependent entity under a cross-kind relation where the dependent entity refines one or more existing dependent entities, embodiments may require that for each refined dependent entity, some refinement ancestor of the independent entity is directly related by the same cross-kind relation to (has as a direct object) a refinement ancestor of that dependent entity, indicating a correspondence between the new cross-kind association and some preexisting, refined one (for example, a refined solution addressing a refined problem). Some embodiments may loosen this constraint to require only that for each refined dependent entity, some ancestor (not necessarily refinement) of the independent entity is directly related by the same cross-kind relation to (has as a direct object) an ancestor (not necessarily refinement) of that dependent entity. To take into account this modification, the routines described below for validating proofs that the constraints hold would in some cases check that arbitrary paths are provided rather than requiring refinement paths. Other embodiments may go further and require only that each refined dependent entity share an ancestor with the independent entity.

The user, in having navigated to a node of interest (perhaps an ancestor of the dependent entity nodes being refined) and having explored through, for example, the substructure to those nodes, may have left the current substructure or even context trees as an efficiently traversable guide to their intent. Embodiments can benefit from this record in formulating policies for assigning independent nodes to new dependent nodes. The alternative to doing so is to search the substructure as a subDAG for common descendants or the context as a subDAG for common ancestors. But in addition to being inefficient this is unsatisfying since such common ancestors may not exist at all or there may be several to choose from. Using trees at least provides sure access to common ancestors in the substructure tree and common descendants in the context tree, although not vice versa, and not necessarily all via the necessary refinement ancestors and descendants. Common ancestors of distinct locus nodes may be made explicit in the context through the techniques presented under "Presentation of Common Context of Multiple Inverted Trees", and common descendants of distinct locus nodes in the substructure through the techniques presented under "Presentation of Common Substructure of Multiple Trees". Ancestors may thus be located either in the substructure or in the context for purposes of satisfying the correspondence constraints of the previous paragraph.

We would like for dependent entities to apply as generally as possible, e.g., we wish to associate each with an independent entity that is as general as possible. Thus, embodiments may be tempted to associate with the refining dependent entity a single most refining independent entity that is refined by the independent entity assigned to each refined dependent entity, i.e., with a least upper bound (LUB) of the objects of the refined dependent entities with respect to the user's navigation. Indeed, solutions, for example, do relate, to some extent, to any refinement ancestor of a problem that they address.

Consider, for example, the DAG in FIG. 24. After the user navigates to node 1, the DAG is reduced to that of FIG. 25. FIG. 27 shows the user exploring to nodes 4 and 10. If the user then refines nodes 4 and 10 with a new node 13, as in FIG. 28, the resulting global DAG will for this embodiment be as in FIG. 29. If distinguished independent entities are being assigned (see above in this section as "assign to each dependent entity a distinguished independent entity related to it by the derived cross-kind relation") as in the previous paragraph, node 1 is assigned to the new node 13, as the least upper bound of nodes 3 and 1. If instead, nodes 4 and 8 were refined, 2 would be assigned to the new node as the least upper bound of nodes 3 and 6.

Embodiments assigning the LUB of refined nodes to the new refining node may have difficulty leveraging the knowledge of the user's focus on the locus node in deciding what independent entity to assign to new dependent entities. Where the objects of refined nodes appear in the context, if they wish to favor the locus node, doing so effectively assigns to the new refining node the GLB of the locus node and the LUB of the objects of the refined nodes.

The natural alternative of a greatest lower bound (GLB) may provide a better match to the refining dependent entity, and thus may be preferred by some embodiments. Calculation of LUB will thus be deferred to discussion of generalization. For example, we might desire that every solution be associated with a distinguished problem that refines any problem that it solves, or that every argument support or oppose a distinguished object that refines any object that it addresses. Unfortunately, as indicated above in this section as "search the substructure as a subDAG for common descendants", the substructure tree provides quite limited access to greatest lower bounds. Incorporating inheritance may provide a more general solution.

Using the GLB to set the indirect objects of dependent entities also leads to a more natural decision corresponding to that presented above in this section, i.e., whether or not to broaden the GLB inputs to include the locus node (assuming that it refines all of the objects, in the context, of nodes being refined). If the locus node is a dependent node, it is also possible to broaden the GLB inputs to include the object of the locus node. Doing either would recognize the significance of the user's having navigated to the locus as a signal of relevance.

The greatest lower bound mentioned above for assignment of independent entities to dependent entities can be achieved (for example, in the case of directlyRefinesSolution) by selecting the most specific problem from among the problems related to the solution by addresses, if a unique one exists (i.e., one problem related to the solution by addresses, that strictly refines any other such problem) or by creating one, if the refinement relation on the kind yielded by the cross-kind relation (directlyRefinesProblem) is many-to-many (by automatically deriving a common descendant problem and letting the refining solution directly address that). Naive embodiments may check for refinement in either direction among the various independent entities associated with the dependent entities to be refined, which may be considered inefficient. Other embodiments may cut this cost somewhat by allowing the user to select or create the problem and having the system verify that it does in fact refine the other addressed problems, at the cost of forcing the user to deal with this complexity. Techniques presented here may reduce that cost.

We proceed to describe calculation of the independent node to relate to the new refining dependent node as the GLB with respect to the substructure and context trees. In the case that no dependent nodes being refined were selected from the substructure (all were from the proper context), embodiments that enforce the correspondence constraint presented earlier in this section can safely assign the object of their LUB (in the inverted context tree, obtained using Calculate LUB wrt a Tree 0101), if that LUB exists, to the new refining node, otherwise fail. Preferred embodiments, though, may skip this step and simply use the locus node, as described above in this section as "broaden the GLB inputs . . . ". Or in the case that any dependent nodes being refined were selected from the substructure, if they have a GLB in the substructure tree, embodiments that enforce the correspondence constraint can safely assign the object of the GLB to the new refining node. In the case that the dependent nodes being refined have the same object, embodiments may assign that object to the new refining node (this step may improve efficiency but can be omitted as it is covered by what follows). Otherwise (or for embodiments that prefer to go directly to this approach), they may rely on the presence of the objects of the dependent nodes being refined in the substructure or context trees and check for a GLB among them, using Calculate GLB wrt Substructure and Context Trees 1111. Calculate GLB of Objects of Refined Nodes wrt Substructure and Context Trees Explicit 3121 is in FIG. 46. Embodiments might instead check whether all refined nodes are in the context and reverse the branches; doing so is correct but slightly less efficient in the case that only the locus and nodes from the proper context are refined.

Calculate GLB wrt Substructure and Context Trees 1111 assumes that its inputs arrive in a node list and first confirms that all members are in either the substructure or the context, failing otherwise. Where any nodes are in the substructure, the client calculates the GLB of those with respect to the substructure tree, using Calculate GLB wrt a Tree 0111, and ignores those in the proper context. Where all nodes are in the context tree (and we haven't reverted to using the locus), it takes their LUB with respect to the inverted context tree using Calculate LUB wrt a Tree 0101. Some embodiments might, in place of failing immediately where indicated above, attempt to find the GLB in the DAGs by other means, such as a more exhaustive search.

We now present the underlying routines that calculate LUB or GLB with respect to a single tree (substructure or context). In each case, we consider only refinement paths! The LUB can be achieved by considering the refinement paths towards the locus node from each node (left to right), and taking the entity represented by the leftmost node of the common suffix of these paths. This algorithm is presented in FIG. 48. The GLB can be achieved by considering the refinement paths towards the locus node from each node (left to right), and checking that all these paths are suffixes of a single, longest such path—the greatest lower bound is the leftmost node of that longest path. This algorithm is presented in FIG. 49.

The independent node that would be assigned to new node 13 under GLB in the example of FIG. 24 and FIG. 29 presented above under "Explicit DAG Augmentation by Specialization" is 3.

While clients using this algorithm may obtain reasonable assignments of independent entities to dependent entities, the server may not wish to trust that all clients are playing by these rules (some may use unsupported code), and so may desire verification, for example that the object of each entity being specialized is itself specialized by the provided object of the new node (for now the purported GLB of all such objects), i.e., that the object of the new node is at least a lower bound of the objects of the refined nodes. Such checks for chains of refinement associations can, however, be considered inefficient. The server may thus require assistance in the form of, for each dependent entity to be specialized, a chain of entities related by refinement (we assume for concreteness from most specific to least) from the object of the new node to the object of that dependent entity being specialized, before establishing each association from the new refining entity to the existing refined one. Of course, the order of the sequence is by convention. Such a chain can be provided using the tree-based exposition of project structure. For each node being refined, the client can build the path based on one of several cases. For both the GLB and the object of the node being refined in the substructure, the client traces the path upward through the substructure tree from the GLB, following refinements until a node is reached with the object of the entity at the node being refined. For the GLB in the substructure and the object of the node being refined in the context, we can take the path mentioned all the way to the locus and then concatenate the reverse of the path starting at the object node and ascending through the inverted context tree to the locus. Embodiments that do not implicitly include the locus node in GLB calculations (as described above in this section as "broaden the GLB inputs . . . ") may add a case for the GLB (and the object node) in the context and in that case use the reverse of the path obtained by starting with the object node and ascending though the inverted context tree until reaching the GLB. An embodiment of the proof generation process without this additional case is presented in FIG. 50, using Generate Proof Path 0113 from FIG. 59. In our example, if the user refines nodes 4 and 10, the proof for this embodiment will consist, for 4, of an empty path from the GLB, 3, to itself, object of 4; and for 10, of the path [2, 1] from the GLB, 3, to 1, object of 10. Note that by convention we treat the initial nodes (3 and 1, respectively) as implicit and do not include them in the paths. The client may be unable to build a correct validation depending on the current state of the substructure and context trees.

Putting these pieces together, the client can use Atomic Explicit Specializing DAG Augmentation 1141 to generate a single new node as a refinement of existing nodes. FIG. 45 describes the sequence for situations where each dependent entity is assigned an object independent entity as GLB with respect to the substructure and context of the objects of the nodes being refined. First, for each node being refined, identify sequences of nodes related by refinement from its object through the substructure or context, towards the locus node (embodiments implicitly including the locus node in the GLB can restrict themselves to the substructure). This can be done using the current substructure or context trees, or any paths saved from prior substructure or context trees. It is also possible to generate a path using the local substructure or context DAG, but more than one such path may be possible. Then, calculate the GLB of the objects of the refined nodes as in FIG. 46. In the case that the GLB does not exist, fail and provide an error message. Use the GLB and its refinement path in generating the proof for the server as in FIG. 50. Meanwhile, prompt the user for information to be stored with the new entity. Then access the server to request the augmentation operation, sending the proof. If it fails, clean up the partially-created node. Otherwise, update the client information to include the new entity (creating a record for the new entity including the user-entered data and its object, and updating records for entities of the nodes being refined to include the new entity as an additional child). The server returns the database identifier of the new entity, which can be used by the client, for example to build a URL for the new node.

The proof validation process where every dependent entity is assigned an object (Validate Proof for Specializing DAG Augmentation with Indirect Objects 3211) is as in FIG. 51. The server may confirm that for each entity being refined, the given path is in fact a chain of refinements, beginning with the provided object of the new refining entity (generally the GLB of objects of the refined entities), and ending with an object of the entity being refined. It follows the path provided through the global DAG, verifying that each step is a refinement.

Even if only direct objects are stored with dependent entities, the client may sometimes be able to access an indirect object if it is in the substructure above each refined node, or with a bit more effort if it is in the context. While it may generally not be necessary to calculate the GLB of the objects of the refined nodes, the initial step of deriving paths from those objects, relevant for generating proofs, can then still be accomplished by following the path from each refined node to the locus in search of a direct object. Proofs, in this more general case, may need to identify both the chain of independent entities, as before, but also the chain of dependent entities leading to the one whose parent is the independent entity (the direct object). The proof generation process for this situation, Generate Proof for Explicit Specializing DAG Augmentation with Direct Objects Only 1151, is as in FIG. 52. The proof validation process for this situation, Validate Proof for Specializing DAG Augmentation with Direct Objects Only 3221, is as in FIG. 53. The server may confirm for each entity being refined, that the given independent path is in fact a chain of refinements, beginning with the provided object of the new refining entity (generally the GLB of objects of the refined entities), and ending with a purported direct object of the entity being refined, that the given dependent path is in fact a chain of refinements, beginning with the new refining entity and ending with the refined entity, and finally that the purported direct object of the refined entity is genuine.

Where a distinguished independent entity is assigned to each dependent entity, it is reasonable to store a reference to that assigned entity with the dependent entity (or a filler in cases where we choose to infer the assigned independent entity for refinements as described below under "Explicit DAG Augmentation by Specialization/Single cross-kind augmentation with multiple simultaneous refinement"), so that cross-kind associations need not be represented directly. Otherwise, it may be desirable to directly represent such associations as a pair of entities. In either case, embodiments may choose to record not only the reference to the independent entity, but evidence of the correspondence with a refined association, in the same form as the proofs described above (and below). The advantage would be to enable dissolving the cross-kind association between the refining entities if the refinement association of dependent entities is dissolved.

Single Cross-Kind Augmentation with Multiple Simultaneous Refinement

We now turn to implementation of examples such as those of FIG. 24 and FIG. 36 presented above under "Explicit DAG Augmentation by Specialization". The user navigates to a particular node, selects nodes from the resulting substructure or context, and initiates a cross-kind operation from a distinct parent node (the base node). If possible, the user is given the opportunity to define a new node (and entity) with the selected nodes (entities) as refinement parents, and the entity at the base node as a parent (independent entity) under the relevant relation. The precise constraints on the node selection may depend on choices made by the embodiment as indicated below. Generally, we assume that the selected nodes are of the same kind, and the same kind as the intended child, or at least that the kinds are consistent. Embodiments, especially those that implicitly include the locus node in GLB calculations (as described above under "Explicit DAG Augmentation by Specialization/Multiple simultaneous refinement" as "broaden the GLB inputs . . ."), may require the base node to be in the substructure and the selected refinement parents to be in the proper substructure.

Now, for embodiments that assign an independent entity to each dependent entity, rather than making this choice for ourselves we have the benefit of a directive from the user. But many embodiments may still want to impose the correspondence constraint above under "Explicit DAG Augmentation by Specialization/Multiple simultaneous refinement".

We now wish to demonstrate a path from the object of the new node (not necessarily the GLB) to the object of each refined node. Several questions arise regarding the connection between the GLB of the refined node objects of the nodes being refined and the independent node being augmented (the base node). If the base node refines the GLB of the refined node objects, we are guaranteed a path from the base node to the object of each refined node, satisfying the correspondence constraint, and conversely without such evidence we are in danger of violating that constraint. And if the base node is refined by but not equal to the GLB of the refined node objects, we cannot set the new object to point to the base without creating a situation where the refinements actually run in the opposite direction of that required. An example can help to make this point more clear. FIG. 54 represents a DAG with navigation at problem node 51. If a user were to solve its child problem node 52 with a new solution node 55 that specializes solution node 54, where 52 is parent of 53, the trivial GLB of objects of refined nodes 54, the situation would be as in FIG. 55. Flattening the trapezoid into a rectangle, it's easy to see that the two refinements run in opposite directions. For some purposes, however, this contravariant relationship may be desired in place of the covariant one. Embodiments enforcing the covariant constraint may choose, in the case that the base node cannot be seen to refine the GLB of the refined node objects, either to ignore the specified base node and treat this situation as a simple refinement or to consider this to be a user error. Other embodiments may allow the operation regardless. To enforce the constraint, the GLB calculation can be performed as before, but the result compared against the base node.

A routine to identify a path between two nodes in substructure or context is in FIG. 59. Note that we refer here to a sought path between a refiningNode and a refinedNode; these names here have no relation to any other usage, in particular the nodes being specialized or generalized by the user. If the refiningNode is in the proper context and the refinedNode in the proper substructure, fail immediately. If both the refiningNode and refinedNode are in the substructure, follow a refinement path from the refiningNode towards the locus, until reaching the refinedNode. If the refinedNode is found, return the path, otherwise fail. If both the refiningNode and refinedNode are in the context, follow a reverse refinement path from the refinedNode towards the locus, until reaching the refiningNode. If the refiningNode is found, return the reverse of the path, otherwise fail. Finally, if the refinedNode is in the context and the refiningNode in the substructure, concatenate the refinement path from the refiningNode to the locus with the reverse of the reverse refinement path from the refinedPath to the locus, failing if either doesn't reach the locus. Note here that an embodiment could avoid checking for the first case and require only that the refinedNode be in the substructure for the second case and only that the refiningNode be in the context for the third case, letting the failures happen in that processing. We present Generate Proof Path 0113 as a single routine although some embodiments may make assumptions that can reduce the number of cases in some situations.

If the base node is the same as the GLB of the objects of the nodes being refined, it is redundant and embodiments may choose to consider such augmentations as simple refinements.

Where every dependent entity is associated with an independent entity and the correspondence constraint is enforced, we can use the proof mechanism described above under "Explicit DAG Augmentation by Specialization/Multiple simultaneous refinement". An optimization is now available since there is now a distinction between the base node and the GLB (this is also the case with the implicit GLB with the locus entity). Because all refinement paths share a common prefix from the base node to the GLB of the refined node objects, that prefix can be separated so that it need only be generated and validated once. Then, to obtain a path from the base node to the object of the refined node we would concatenate the prefix with the independent path. Generation of proofs of this form by Generate Proof for Explicit Cross-kind and Specializing DAG Augmentation with Indirect Objects 1112, using Generate Proof Path 0113, is shown in FIG. 57. Their validation by Validate Proof for Cross-kind and Specializing DAG Augmentation with Indirect Objects 3212 is shown in FIG. 60.

If instead directlyAddresses (in the example presented above under "Explicit DAG Augmentation by Specialization/Multiple simultaneous refinement" as "If a refinement relation (take for example, directlyRefinesSolution) is many-to-many . . . ") is many-to-many or embodiments are not interested in extending it to a many-to-one addresses, and thus do not assign an object to dependent entities as described above under "Explicit DAG Augmentation by Specialization/Multiple simultaneous refinement" as "assign to each dependent entity a distinguished independent entity related to it by the derived cross-kind relation", they might still want to distinguish a subset of the problems related via addresses that is sufficient to reach the others via application of refinesProblem. Even without distinguishing any independent entities, embodiments can allow such "respectful" associations to be specified, e.g., allow an association to be formed under the cross-kind relation between a dependent entity (B) and an independent entity (A) such that (B) refines another dependent entity associated with an independent entity that is refined by (A). In particular, they can allow an association via directlyAddresses to leverage off of another such association, such that the solution and problem of the first refine those of the second, respectively. Likewise, they can allow an association via directlyMotivatedBy to leverage off of another such association, such that the problem and solution of the first refine those of the second, respectively. Moreover, they can require that any cross-kind relation only allow the dependent entity to refine another entity if some refinement ancestor of the dependent entity is related to a refinement ancestor of the independent entity. The approach described using proofs may support such requirements in a limited form that considers objects of dependent nodes to be the independent entity of the first cross-kind association encountered after refinement associations on the path towards the locus.

In this case another modification to the proof structure described above under "Explicit DAG Augmentation by Specialization/Multiple simultaneous refinement" is useful, in addition to that described above in this section as "an optimization is now available". The proofs now take the form of a prefix path from the base node to the GLB and, for each dependent entity being refined, of two refinement paths: one from the dependent entity and one from the GLB, each terminating with entities that are in turn associated by the same cross-kind relation. Calculation of the independent path again uses FIG. 59. For refined nodes in the substructure, the dependent path is just the refinement chain towards the locus node. The proof generation process is as in FIG. 58. For the example of FIG. 24 and FIG. 36 presented above under "Explicit DAG Augmentation by Specialization", the proof for some embodiments will be two pairs of paths, one for each node being refined (if indirect objects are available, only the independent (problem) paths need be provided). In each case here, following the solution refinement hierarchy from the refined solution node towards the locus node and stopping at the object problem yields the refined problem/solution pair corresponding to the new refining problem/solution pair being created by the current operation. For node 4, the dependent path for this embodiment will be empty because it is directly associated with independent node 3 (with no refined solutions in between) and the independent path for this embodiment will be [3] because only that one step is required to reach the object of 4 from the object 5 of new node 16. For node 10, the dependent path for this embodiment will again be empty since it is directly associated with independent node 1 and the independent path for this embodiment will be [6, 2, 1], since following these nodes from the object 5 of new node 16 leads to the object, 1, of 10. Note that by convention we treat the initial nodes as implicit and do not include them in the paths.

The steps for handling a single cross-kind and specializing DAG augmentation are similar to those of Atomic Explicit Specializing DAG Augmentation 1141 in FIG. 45. They differ in the use of the routines above that are intended to support cross-kind and specializing augmentation, including Generate Proof for Explicit Cross-kind and Specializing DAG Augmentation with Indirect Objects 1112, Generate Proof for Explicit Cross-kind and Specializing DAG Augmentation with Direct Objects Only 1132, and Specializing Cross-kind DAG Augmentation 3202, as well as in adding a step to convert to the corresponding refinement operation (e.g., of the kind of the nodes being specialized) if the GLB (calculated with FIG. 46) is the same as the base node. Because of that potential conversion, we include Generate Proof for Explicit Specializing DAG Augmentation with Indirect Objects 1131 and Specializing DAG Augmentation 3201 in potential steps. The routine is presented in FIG. 56.

The proof validation process with only direct objects is as in FIG. 61. The server may confirm that for each entity being refined, the independent path, beginning with the provided object of the new refining entity leads to an object of the entity to which the dependent path, beginning with the entity being refined, leads.

We emphasize that while embodiments of any sort may require validation as specified above, others may perform validation by other means, or omit it entirely.

Note that as described above in this section as "if the GLB (calculated with FIG. 46) is the same as the base node", some embodiments may only use a formal refinement operation when the assigned independent entity is in fact the GLB. Thus, a refinement of dependent entities may be associated with an independent entity that is based on (the GLB of) the associations of the dependent entities being refined. We can choose either to store this independent entity with the dependent entity, or to compute it as necessary. If it is stored explicitly, this information is immediately available, but must under various embodiments be maintained as independent entity nodes and refinement associations are added or removed.

Leveraging Inheritance for Specialization

Embodiments can achieve many benefits from leveraging inheritance of structure rooted at a dependent node through a refinement chain of independent nodes. Such structure can be presented to the user where it is likely to be relevant. Not only can users view such inherited structure, they can augment it, and in doing so specialize it to their current state of navigation.

FIG. 62 is a version of FIG. 42 for an embodiment that supports inheritance. The client's augmentation process includes high-level routines (Client Specializing DAG Augmentation 2101 and Client Cross-kind and Specializing DAG Augmentation 2102) that orchestrate copying of inherited nodes as well as a routine that copies an inherited path through a node's ancestors. The server's initialization process introduces a high-level routine Localize DAG 2200 that makes use of Reduce DAG 0210 and new routine Inherit Structure 2230, which in turn uses the new routines Collect Inheritance 2240 and Record Inheritance 2250 to collect nodes to be inherited from the user's context and to incorporate those into the localized DAG, respectively.

Leveraging Inheritance for DAG Exploration

Some embodiments allow inherited dependent entities to appear in the substructure of a locus node. Inherited structures may in fact be subDAGs, and those inherited structures may connect via any associations with native (non-inherited) nodes in the substructure. After such inheritance, the resulting DAG may continue to be explored as a tree.

FIG. 63 presents the routine Localize DAG 2200. It first reduces the DAG using Reduce DAG 0210 to include only certain nodes and their substructure and context and then inherits structure from the context using Inherit Structure 2230.

A particular embodiment uses a further modification to the DAGs. $\text{Dag}_E^2$ differs from $\text{Dag}_E^1$ only in including as children of E entities inherited by E, e.g., entities dependent upon an entity refined by E.

FIG. 26 shows the DAG Dag from FIG. 25 with structure including nodes 9, 11, 12, and 15 inherited, i.e., $\text{Dag}_1^2$. FIG. 33 shows Dag from FIG. 32 with structure including nodes 4, 7, 8, 9, 10, 11, 12, and 15 inherited, i.e., $\text{Dag}_5^2$. The link from 10 to 1 has been spliced out of FIG. 26, as suggested below at the end of this section.

We next consider obtaining $\text{Dag}_E^2$ from $\text{Dag}_E^1$. For the locus node, call Collect Inheritance 2240 and then Record Inheritance 2250 for each inheritedEntity, setting parentId to the entityId. FIG. 64 presents the general structure of this routine. For example, if the locus node is a problem, we might collect and record solutions of problems refined by the locus problem. Note that although Inherit Structure 2230 is presented as working over all cross-kinds relations, embodiments may create a separate version for each relation over which inheritance is to take place.

Intuitively, Collect Inheritance 2240 should only collect for inheritance the most general (refined) inherited entities, as more specific ones would be subsumed in the process of recording inheritable descendants of those entities. Our initial implementations of Collect Inheritance 2240 and Record Inheritance 2250 are based on this intuitive approach.

Collect Inheritance 2240 scans the refinement ancestors of an entity. This involves avoiding double-counting any common ancestors. While scanning, we collect inheritable entities as defined above under "Project Management Entities and Relationships Including Separation of Problem and Solution Spaces" and maintain minimal roots from which they can be reached. This involves checking whether each encountered inheritable entity refines one that has already been collected, or vice versa. Note that as described, when an inherited entity is encompassed by another inherited entity (i.e., appears on the left side of a relation with the other inherited entity on the right side), this algorithm includes both (via the encompassing entity returned by Collect Inheritance 2240). Some embodiments may choose to include only the encompassed entity in this case (by Collect Inheritance 2240 returning this encompassed entity), as the encompassing inherited entities may often seem irrelevant. That can be accomplished by keeping leaves rather than roots of the inherited entities. The advantage of the original methodology is that it leaves a possibility of creating new alternative derivations from the refining entities. FIG. 65 presents this routine. Note that with certain constraints, we can replace encompassed/encompassing entities above with refining/refined entities.

Record Inheritance 2250 involves incorporating the collected inherited entities and their descendants into $Dag_E^2$, but this process must terminate for any descendants that were already in $Dag_E^1$. Record Inheritance 2250 begins by adding the inherited node as a child of the receiving entity. It has cases depending on whether inheritedEntity was already in $Dag_E^2$ or is being encountered for the first time. If being encountered for the first time, we add it to $Dag_E^2$ under its parent, and recur on its children. Otherwise, we add this parent to the $Dag_E^2$ entry. As stated, this process may leave immediate descendants of the locus node in place even if they are reachable from inherited nodes. Preferred embodiments may splice out such nodes, so that they are reachable only by the longer path via the inherited nodes. FIG. 66 presents this routine.

In the case of skill requirements being inherited through solution refinement, Record Inheritance 2250 becomes trivial. This is because, as described above under "Project Management Entities and Relationships Including Separation of Problem and Solution Spaces" as "the refinement relation acts in the opposite direction in the inclusion for skill requirements by a solution", superskills rather than subskills of a skill are necessarily required by refinements of solutions requiring that skill. The tracing downward through subskills that would be performed by Record Inheritance 2250 is thus not necessary. So, the skill to be inherited by a solution can simply be attached to the solution as an orphan inherited node. There is little insight to be gained by presenting a subskill hierarchy in the same DAG as a project hierarchy.

Checks for whether or not nodes refine each other can be inefficient, so it is fortunate that the intuitive algorithm can be modified in several ways to avoid these checks. In each of these enhanced algorithms, we do not require Collect Inheritance 2240 to filter the most general inherited entities, but rather have it return all entities that are directly inheritable. We do have it fix an ordering of such entities, so that Record Inheritance 2250 can process them either most-general first or most-specific first.

In FIG. 67 we show a version of Collect Inheritance 2240 that ensures that the sequence in which inheritables are listed is consistent with the position of the node from which they were inherited on a refinement path from the locus node, e.g., more specific preceding more general. In a programming language with recursion, this could be implemented as a preorder tree traversal. We may thus be expecting Record Inheritance 2250 to include inheritable descendants of these more shallowly located entities and then to include inheritable descendants of the more deeply located entities. It is possible that some of the former descendants may be included among the latter. Such already-formed nodes should be treated just as any encountered nodes that were not inherited at all but part of the original substructure. Thus, Record Inheritance 2250 may work unchanged.

But we can do even better. By recording the inheritables in a deepest-first order (by reversing the output of the shallowest-first version of Collect Inheritance 2240 or by inserting the inherited entities at the beginning of the list rather than the end (in FIG. 68)), embodiments may be able to avoid the Record Inheritance 2250 process altogether in the case that the inheritable entity is already known, if they have already recorded a more incremental way of reaching it. In fact, various embodiments must check for that case so as to avoid calling Record Inheritance 2250 on a more shallow entity that has been added to the subDAG in the process of recording a deeper one, generating excess links. Record Inheritance 2250 can then also be modified (as in FIG. 70) to wait until just before recurring on each child to check the presence of nodes in the subDAG. In a language with recursion, this could also be implemented (in FIG. 69) as a postorder tree traversal, inserting elements at the end of the list as in FIG. 67.

For embodiments that are also scanning the context of the locus node to generate a subDAG, another possible optimization may take advantage of this fact to collect inheritables at the same time.

For embodiments that include restating refinements, we prefer the shallowest-first versions because the restatement may be added to the subDAG while giving an opportunity to avoid adding the restated entity. If the deeper entity were recorded first and it were restated by another inherited entity, the former would need to be removed from the subDAG.

Even when inheritables are recorded in preorder (without filtering for refinements), if the cross-kind relation being inherited is many-to-many, it may be possible for the same inheritable entity to be reachable by multiple refinement paths. In that case, the above described check may still work to prevent duplicate recording, but more efficiently, embodiments may return the inheritables as a set (so that we prevent duplicates by checking membership prior to the insertion in Collect Inheritance 2240).

For some embodiments, it is not technically necessary to check whether the first inheritable entity being recorded is already in the subDAG (it will not be). It should be clear to those skilled in the art of software development how to adjust the process to avoid this first check.

FIG. 27 and FIG. 37 show such trees for FIG. 26, the former exploring nodes 4 and 10, the latter exploring to nodes 12 and 15. FIG. 34 shows such trees for FIG. 33 after exploring to nodes 4 and 8.

As described under "Explicit DAG Augmentation by Specialization" as "When the user indicates a need to proceed deeper into the hierarchy . . . , additional nodes could be fetched by the server", some embodiments may wish to provide deferred access to portions of the DAG. Such embodiments would likely merge the routines mentioned above into two routines, one for context and one for substructure, through a technique such as deforestation, as is familiar to those skilled in the art of software engineering. In this case, not all inherited nodes would be immediately available to the user. When a user attempts to explore further into the context from a refined ancestor of the locus for which collection of inheritance (and refined ancestors and related independent nodes) that has been deferred, the additional inherited nodes (both directly inherited and their descendants) can be recorded in the client's localized DAG much as the procedure described for the server in Record Inheritance 2250. The user might also be provided with a "More" link as described below under "Aggregations of Auxiliary Information" as "embodiments may include a "More" link in the results" to indicate that additional inherited nodes are available and, if activated, to trigger loading of additional nodes and their inheritance into the local DAG.

Leveraging Inheritance and Tree View for DAG Augmentation

A user can augment DAGs representing project information. DAG (as opposed to tree) structure can be due to: many-to-many refinement relations (multiple inheritance); a cross-kind relation where dependent entity also refines one or more existing dependent entities; or a cross-kind relation that is many-to-many. Each of these have their own challenges and opportunities.

If the user has navigated to a node in the context of the nodes to be augmented, the user may explicitly select those nodes in a manner not dissimilar to the explicit DAG augmentation described above. In other cases, it may be possible to leverage inheritance in the augmentation process.

Consider again the DAG in FIG. 24. After the user navigates to node 5, the DAG is localized to that of FIG. 33. FIG. 34 shows the user exploring to nodes 4 and 8. Nodes 4 and 7 are now inherited by node 5, with node 8 refining 7. If the user then refines nodes 4 and 8 with a new node 14, as in FIG. 35, the resulting global DAG for this embodiment will be as in FIG. 36. The new node 14 for this embodiment will not only refine nodes 4 and 8 but also implicitly be associated with the locus node 5 through the cross-kind relation (such as solving the problem). Because 5 is the GLB of 3 (object of 4) and 6 (object of 8), embodiments may choose to consider this as a refinement. But if the user had navigated to a refinement descendant of node 5 and performed the same operation, it would clearly be recorded as a direct cross-kind association. Notice that merely by expressing an interest in the node 5, the user is given immediate access via inheritance to the nodes that can be extended so as to relate to that node, and not restricted by fact that node 5 is the GLB of 3 and 6 only in the global DAG and not with respect to any substructure tree.

Leveraging Inheritance and Tree View for Multiple Simultaneous Refinement

For some embodiments, multiple simultaneous refinement is indicated when the user selects nodes for refinement, not all of which are inherited cross-kind associations of the same kind, but rather the inherited cross-kind associations differ in kind or at least one node to be refined is part of the substructure. (We say "cross-kind association" here rather than simply "node" because multiple cross-kind relations may share the same dependent kind'.) We will see that if all of the nodes selected for refinement are inherited cross-kind associations of the same kind, we prefer to treat the operation as a similar cross-kind augmentation.

For now, we may assume that inherited nodes that do not refine a directly inherited node may not be selected for refinement, but that may change for embodiments that implement iterated augmentation.

Consider again the localized DAG with inherited nodes in FIG. 26. If nodes 4 and 10 are refined and distinguished independent entities are being assigned as described above under "Explicit DAG Augmentation by Specialization/Multiple simultaneous refinement" as "The natural alternative of a greatest lower bound (GLB)", node 3 is now assigned to the new node, as the greatest lower bound of nodes 3, and 1. Likewise, if nodes 8 (via 7) and 10 are refined and distinguished independent entities are being assigned, node 6 is assigned to the new node, as the greatest lower bound of nodes 6, and 1. If nodes 4 and 8 are refined, embodiments can fail, can search the substructure for a unique greatest lower bound, if a unique one exists (here node 5), create one if none exist, or allow one to be selected if multiple exist. Failure is not a bad option, since as described below, the user can accomplish this action by navigating to the node that they prefer to serve as the lower bound.

Likewise, embodiments that implicitly include the locus node in GLB calculations (as described above under "Explicit DAG Augmentation by Specialization/Multiple simultaneous refinement" as "broaden the GLB inputs . . . ") can, in the presence of inheritance, exclude objects of any inherited nodes from that calculation, as the independent entities assigned to them will be refinement ancestors of the locus node, and thus refined by the independent nodes assigned to entities represented by the non-inherited nodes. Preferred embodiments may relate the locus node to the refining dependent node if all refined entities are inherited (and they refine the directly inherited entities), but others may choose to include inherited nodes in the computation in that case, selecting a node in the context using the LUB algorithm above (since the context hierarchy is inverted).

Again, the server may wish to verify refinement operations requested by the client where an indirect object is set for any new dependent entity by requiring, for each dependent entity to be refined, a chain of entities related by refinement (we assume for concreteness from most specific to least) from the greatest lower bound to the object of that dependent entity. We saw previously that such a chain can be generated by the client using the tree-based exposition of project structure. If the object of a refined node was in the context DAG, however, it had to be revealed in the context tree in order to generate the necessary refinement chain. If the refined node is inherited, it can generate the necessary refinement chain using a combination of the inheritance mechanism and the tree-based exposition of project structure as, for noninherited nodes, the path from the greatest lower bound up through the substructure tree as long as it traces refinement associations, until it reaches the object of the node being refined, or for inherited nodes taking this path towards the locus node and then, if the path reaches the locus, concatenating it with the path through the global DAG by which that node being refined was inherited. The modified proof generation process is as in FIG. 74, using Generate Single Independent Path of Proof for Specializing DAG Augmentation 2113 from FIG. 76. In our example involving FIG. 24 and FIG. 33 through FIG. 36, presented above under "Leveraging Inheritance and Tree View for DAG Augmentation", if the user refines nodes 4 and 8, the proof for this embodiment will consist, for 4, of the inheritance path [3]; and for 8, of the inheritance path [6] (the initial node 5 is here assumed by convention to be implicit). If the user had navigated to node 1 and refined nodes 4 and 11, the proof would consist, for 4, of the empty path (from the GLB, 3 to itself, the object of 4); and for 11, of the path [2, 1, 0], obtained as the path from the GLB 3 through the substructure to 1 followed by the inheritance path [0] (the initial node 3 is again assumed by convention to be implicit).

How can such inheritance path be procured by a client? It can be derived by the server during Collect Inheritance 2240 and passed to the client along with the localized DAG, so that it can be tracked and ultimately proffered back to the server. We present a version of Collect Inheritance 2240 that collects inheritance paths in FIG. 71. It differs from FIG. 68 in maintaining an inheritance path, which is extended upon encroaching further into the context and retracted upon retreating.

As an optimization, embodiments might choose not to work with a direct mapping from directly inheritable entities to paths but rather with a composition of mappings, first from directly inheritable entities to the independent entities from which they are inherited, and second from those independent entities to paths from the locus.

The proof validation process is as in FIG. 51. The server may confirm that for each entity being refined, the given path is in fact a chain of refinements, beginning with the provided object of the new refining entity (generally the GLB of objects of the refined entities), and ending with an object of the entity being refined.

Call a 'flow' a DAG with designated source and sink nodes. Any representation of a DAG or of a general graph available to those skilled in the art of software development would be acceptable for this purpose, although specialized representations are possible, including that suggested under "A Method for Exploration of Hierarchical Structures and Representation of Context Thereof". Although only one inheritance path is required to validate the augmentation, an enhancement would be to replace the inheritance path sent to the client with an inheritance flow, so that in the case where a node might have been inherited by any one of several inheritance paths, the client could maintain and the server receive proofs involving not just an arbitrary such path but the flow of such paths. The advantage would be that if various but not all such paths are disrupted by node deletion, the refinement operation may have optimal chance of succeeding.

This approach requires Collect Inheritance 2240 to return a flow with each collected entity, not just a path. Store with each independent node a map from inherited entities to flows by which they can be reached. Recur on each refined entity to obtain such a map (if not already visited), and then add the current node to the front of each flow in each map (e.g., create a flow with a new start node that points to the start node of the old flow). If an entity is reached more than once, each additional time don't recur further but on unwinding add a different new front node. After processing all refined entities, merge their respective maps (e.g., create a new map whose domain is the union of the domains of the maps for each refined entity, and for any entity that appears more than once, merge its flows). To merge flows with the same start and end nodes using a standard graph representation, simply take the union of the entity set and the union of the edges. The approach is presented in FIG. 72, still using inheritancePath to model a stack. The optimization described above in this section as "embodiments might choose . . . to work . . . with a composition of mappings" applies here as well. In Generate Single Independent Path of Proof for Specializing DAG Augmentation 2113 from FIG. 76, the paths of independent nodes included in proofs could then either take the form of a sequence of nodes (the path to the locus node) along with a possibly empty flow representing the inheritance path, or these two elements may be combined into a single flow. Validate Proof for Specializing DAG Augmentation with Indirect Objects 3211 from FIG. 51 is then easily modified to try alternate paths instead of immediately failing if the first path through the given flow does not succeed.

Including inheritance, the steps for handling a single specializing DAG augmentation are in FIG. 73. It differs from Atomic Explicit Specializing DAG Augmentation 1141, described above under "Explicit DAG Augmentation by Specialization/Multiple simultaneous refinement", in using the inheritance-aware versions of routines in figures FIG. 74 and FIG. 78 as described above. Embodiments implicitly including the locus node in the GLB may avoid processing inherited refined nodes entirely, since their objects may be in the context. Where the locus node refines each object of a refined node and all refined nodes are inherited, some embodiments may, along the lines of implicitly including the locus node in GLB operations, convert the refinement operation to a cross-kind operation with the locus node as the base node. We will see that iterated copying or restatement of refined nodes may provide a more robust solution.

For embodiments and entity kinds where only direct objects are available, the proof generation process (Generate Proof for Specializing DAG Augmentation with Direct Objects Only 2121), modified from FIG. 52 to use Generate Single Independent Path of Proof for Specializing DAG Augmentation 2113 of FIG. 76 to deal with inheritance, is in FIG. 75.

Leveraging Inheritance and Tree View for Single Cross-Kind Augmentation with Multiple Simultaneous Refinement Many embodiments leverage inheritance to reduce both the cognitive load on the user and the system processing required to augment a DAG. If the user navigates to the most refining independent node, making it the locus, for some embodiments they will see as inherited nodes only the various dependent nodes that they might choose to select for refinement, such that the locus node represents the distinguished independent entity for the newly created refining dependent entity.

More generally, for some embodiments, cross-kind augmentation is indicated when the user selects a node for such augmentation, or when they select nodes for refinement, all of which are inherited cross-kind associations of the same kind. For cross-kind relations where the dependent entity also refines one or more existing dependent entities, there are several concerns.

The first is making it intuitive and natural to create such associations. We have seen that it can be appropriate to define a dependent entity with respect to one or more existing dependent entities, for example a solution with respect to one or more solutions of refined problems or a problem with respect to one or more problems motivated by refined solutions, and that in these cases it is possible to have the user manually select both the entity to extend and those to refine. Many embodiments rely, however, on the insight that such associations can be intuitively formulated by refining an inherited dependent entity. This technique can extend to refinement not just of an immediately inherited node but of any inherited descendants of that node.

Simply refining any explicit selection of dependent nodes inherited by the locus node, where the dependence relation is direct, could be interpreted, because the user has navigated to a particular locus node, as creating a new dependent node that not only refines the entities represented by the selected inherited dependent nodes, but also forms a direct cross-kind association with the locus entity (as the independent node).

This and the following section provide methodology for creating such refinements, which we also refer to as restatements. The section "In-place, Iterating DAG Augmentation" introduces various implementations and uses of restatements, any number of which can be applied without introducing in-place, iterating DAG augmentation.

For refinement of inherited dependent entities, both the dependent and independent paths trace refinement relations up through the substructure tree as long as they follow refinement associations. If the independent path leads to the locus node, the inheritance path (or DAG) of the dependent node is concatenated onto the independent path. FIG. 78 differs from FIG. 57 in using the inheritance-aware procedure Generate Single Independent Path of Proof for Specializing DAG Augmentation 2113 from FIG. 76 in Generate Proof for Cross-kind and Specializing DAG Augmentation with Indirect Objects 2132. For the example involving FIG. 24 and FIG. 33 through FIG. 36, presented under "Leveraging Inheritance and Tree View for DAG Augmentation", the proof for some embodiments will be two pairs of paths, one for each node being refined. In each case here, the client follows the solution refinement hierarchy from the refined solution node towards the locus node, and follows the problem refinement hierarchy from the problem being solved (the locus node) through the path by which the solution was inherited. The independent paths for this embodiment will be unchanged from those described above under "Leveraging inheritance and tree view for multiple simultaneous refinement" with respect to that example. For node 4, the dependent path for this embodiment will be empty, since it has a direct object. For node 8, the dependent path for this embodiment will be [7], a singleton of its refinement parent, which does have a direct object. Note that by convention we again treat the initial nodes as implicit and do not include them in the paths.

Even if we do not require that each dependent entity be associated with a single refining independent entity, there is another reason embodiments might choose to constrain the dependent nodes that can be refined along with augmenting an independent node. That is to avoid inconsistencies with inheritance. The operation of creating a dependent entity related to an existing independent entity and also refining existing dependent entities can in general lead to a situation where the union of various relations after inheritance may in fact be cyclic. For a simple example, consider beginning with a solution addressing a problem and introduce a problem that refines the problem being solved while being motivated by the solution. More generally, we wish to avoid situations where the refined entity is reachable by following object-of associations (from a cross-kind relation) from the refining entity. For the case of problems being objects of solutions which are in turn objects of problems, those situations could only occur with an even number of applications of cross-kind relations. These are not necessarily direct object associations, but may involve refinements as well. The constraint above is sufficient to prevent such cycles, and embodiments may determine whether or not it also precludes project structures that they consider useful. These cycles, however, may not be considered problematic. The only irregularity would be that the same entity might appear in both the context and substructure. Embodiments might arrange to collapse hierarchies as necessary to prevent more than one node associated with the same entity from being visible at the same time.

Again, putting these pieces together, the client can generate a single new node as a cross-kind augmentation of a base node while refining other existing nodes. The routine, shown in FIG. 77, differs from that presented in FIG. 56 and described above under "Explicit DAG Augmentation by Specialization/Single cross-kind augmentation with multiple simultaneous refinement" only in using the inheritance-aware versions of routines in FIG. 74 and FIG. 78 as described above in this and the previous section. Again, embodiments implicitly including the locus node in the GLB can avoid processing inherited refined nodes entirely, since their objects will be in the context.

From what has been presented so far, a user can perform augmentation operations on inherited or noninherited nodes in the substructure of a locus node (inclusive of the locus), except that if the user specifies an augmentation of an inherited node that is not and does not refine a directly inherited node, embodiments may need to issue an error message. Such situations can be handled through the iteration of augmentations presented in the next section.

Iterating DAG Augmentation

Where the dependence relation is indirect (a composition of various dependent cross-kind associations and refinement associations), it is possible to iterate the process demonstrated in the example involving FIG. 24 and FIG. 33 through FIG. 36, presented under "Leveraging Inheritance and Tree View for DAG Augmentation", copying the inherited structure such that each new node maintains links to the previously created node, and ultimately to the locus node. Any inherited structure that is common to multiple inherited nodes should only be copied once. It is actually not necessary to recreate the entire structure; for example, some embodiments may be content to recreate only the cross-kind associations, eliding the refinement associations by considering the cross-kind associations to relate the most refining entities.

Given the DAG in FIG. 24, the user could perform a sequence of operations, first navigating to node 1 and refining node 9 to node 9' with respect to node 1, then navigating to the new node 9' and refining node 15 to 15' and 11 to 11', each with respect to node 9', navigating to 11' and refining 12 to 12' with respect to 11', and finally navigating back to 9' and refining 12' and 15' to 17' with respect to 11'. The DAG in FIG. 39 is a possible result. We show here how to automate sequences such as this. Recall that FIG. 25, FIG. 26, and FIG. 37 present various stages of processing to present the DAG localized at node 1 as a tree through which the user can explore nodes 12 and 15.

Note that with this iteration, the user may select for augmentation inherited nodes, even those that are not and do not refine a directly inherited node. This was a problem before because such nodes could not be implicitly connected to the locus. Because preceding inherited nodes on the path to the locus will be copied in turn, the connection to the locus is generated one augmentation at a time.

FIG. 38 shows the process of refining problem nodes 12 and 15 with a new problem node (17) that addresses it with respect to node 1. FIG. 39, again, shows the full resulting DAG after this process.

In general, we will want the new entity to descend from both the inherited node being augmented and also ultimately from the node that received that inheritance. As displayed in FIG. 38, embodiments may create a structure corresponding to and refining the inherited structure on any path from the locus down to the nodes being augmented. This may involve replicating (but allowing the user to rename and otherwise adjust) any inherited nodes on the path from the locus to the base node being augmented by the cross-kind relation as well as any inherited nodes on the path from the locus to the nodes being refined, but taking care to replicate any common nodes only once. After replicating the inherited structure, there may be an additional step of creating the final node to augment that refining structure.

Some embodiments (including the one we describe below) prompt the user to define the augmenting nodes in a top-down manner, starting with a child of the node receiving the inheritance. Other embodiments prompt the user to define the augmenting nodes in a bottom-up manner, starting with the child of the inherited node being augmented.

When augmenting a node using a refinement relation, some embodiments may present the value of the refined node as a default initial value for the refining node, while other embodiments may not provide any such default initial value in these cases.

Some embodiments (including the one we describe below) allow the user to refine each inherited ancestor of the inherited node. Other embodiments prefer to not refine every such inherited ancestor of the inherited node being augmented, but rather, in any chain of refinements among those ancestors, only refine the final refining ancestor and consider that to directly participate in the next association with a node of different kind (for example either a solution addressing a problem or a problem motivated by a solution).

Embodiments might, as described below in this section as "the inherited structure being augmented", allow operations to be performed directly on inherited nodes, but before such operations are performed, request of the user new information, for the ancestors of each inherited argument, in order to copy and modify them to recognize their position under the locus node. Alternatively, embodiments might only support restatement of inherited nodes and not other operations, so that the user has no choice but to explicitly restate each argument before proceeding.

Note that although an arbitrarily complex DAG structure may be inherited by the locus entity and integrated with its descendants, as the user explores the substructure from the locus node to arrive at an inherited node to augment, for various embodiments there will be a distinguished path back to the locus node, retracing those steps, as the substructure nodes form a tree rooted at the locus node.

Note also that we can (but need not) assume that the first inherited node is of a different type than its parent, because, for example, a problem is inherited through a chain of refinements of solutions and a solution is inherited through a chain of refinements of problems.

Now we can present a high-level process flow that incorporates this iteration for an explicit refinement operation. We begin by initializing a data structure to hold the results of copying inherited nodes. It may be used to avoid copying any node more than once. The implementation treats the parent node (from which the refinement is initiated) as just another refined node (distinguished here only by its use in locating the final augmentation) rather than a base node for a cross-kind augmentation. Data structures are also initialized for collecting the new nodes and paths through new nodes (if not already in place), which we next generate by calling Copy Inheritance for Specialization 2103 on each refined node and store in said structures. Prior to calling Copy Inheritance for Specialization 2103 on each refined node, we generate the path from that node to the locus (if not already in place) for use in that routine. After replicating the inherited structure being augmented, we can proceed by prompting the user for information regarding the explicitly augmenting node and create it using Atomic Specializing DAG Augmentation 2141. Embodiments may differ on whether an explicit refinement of a single node is handled via the copying process for that node, or with the explicit augmentation after the implicit copying has completed. The former option, outlined in FIG. 80, qualifies the final augmentation to ensure that it is not a refinement of a single inherited node. The latter option, consistent with the approach of only copying the last refining inherited node as described above in this section as "only refine the final refining ancestor" and outlined in FIG. 81, instead qualifies the copying of inherited refined nodes to avoid the case of a single node. Still other embodiments may perform the refinement twice, and indeed this may be the preferred approach for iterating in-place, as described below under "In-place, Iterating DAG Augmentation".

The process for a cross-kind (and refining) augmentation is outlined in FIG. 82. It differs from FIG. 80 and FIG. 81 in omitting the step of treating the parentNode as refined, in not having to deal with the issue of single refinement, in copying inherited ancestors of the base node as well as inherited ancestors of refined nodes, and, of course, in the form of the final augmentation (using Atomic Cross-kind and Specializing DAG Augmentation 2142).

FIG. 84 presents a trace of the routine for the example of FIG. 38.

The process of augmenting inherited nodes may involve copying the inheritance ancestry structure of each of those nodes. The routine Copy Inheritance for Specialization 2103 is responsible for iteratively regenerating the inherited ancestors of a single inherited node being augmented (either a base node or a node being refined). The result is a pointer to the new node (which in turn points to its parents) and, for embodiments in which the server requires validation on augmentations, a path from the node being augmented towards the locus that can be used for generating those proofs. This routine is displayed in FIG. 83. We assume a stack in this description. The content of each stack entry may be assumed to include an inherited node and the operation by which it was derived. Under embodiments in which the operation can be inferred from the kind of node, holding only the inherited node may suffice. Along with or incorporated within the inherited node is a way of reaching the parents of that node. The stack may be implemented explicitly as such, the system stack may be used (pushing by passing parameters to procedures, popping by returning), by building up a continuation that processes the value being pushed around any previously built-up continuation, or by any other computational process known by those skilled in the art to implement a stack. The routine is composed of two loops performed in sequence: the first descending through ancestors while building up the stack and the latter feeding off of the stack while copying inherited nodes. For the first loop, scan upward through the ancestors of the node being augmented, pushing each inherited node encountered, until either a node already copied or a non-inherited ancestor is reached. In the former case, begin the second loop with the stored values. In the latter case, use the noninherited ancestor as the newParentNode and prepend parentPath with inheritedNode for newPath in beginning the second loop. For various embodiments, this first such copied node (copy of the last inherited node) will always take the form of a cross-kind augmentation of newParentNode (the parent of inheritedNode) as in Atomic Cross-kind and Specializing DAG Augmentation 2142, since the node was inherited as a cross-kind association. Otherwise, embodiments may push inheritedNode and parentPath for later use and proceed through the ancestor hierarchy by setting inheritedNode to its parent and replacing parentPath with a version without the first element to continue iterating through the first loop. After, copying the last inherited node as newNode, embodiments may build finalPath (for use in proof generation) by prepending newNode to newPath. At this point, they may record newNode and finalPath in the data structure of already copied nodes and ensure that newNode is situated under inheritedNode and parentPath, so that GLB calculations may proceed without error. Finally, embodiments can formally begin the second loop by checking whether the stack is empty, which is where they would pick up if using precomputed values. If so, they may be done; otherwise, they may both pop the stack to obtain the next-shallowest inherited ancestor node and parentPath and set newParentNode to the copy of the next-deepest ancestor. At this point, embodiments may copy inheritedNode. If inheritedNode is a cross-kind augmentation of its parent, embodiments may proceed as above with Atomic Cross-kind and Specializing DAG Augmentation 2142. But if inheritedNode is a refinement of its parent, they may instead use Atomic Specializing DAG Augmentation 2141 with inheritedNode and newParentNode as the refinedNodes and proceed as after the corresponding node creation step.

We note that to the extent that all nodes are in fact copied, we can simplify the matter of refining inherited nodes described above with respect to a many-to-many refinement relation. Since we are copying each of the dependent nodes to be refined, for various embodiments the ultimate multiple refinement will refine these "copies", each of which is associated not with the independent node associated with the inherited dependent node, but with the locus node. It should thus be possible in this case to require that for any multiple refinement of dependent entities, that they be associated with the same independent entity. An intermediate step would be to require that one such dependent entity to be refined, say the last, be associated with an independent entity that refines the independent entities associated with the other dependent entities to be refined.

Embodiments needing to automate augmentation of the DAG by extending the logical substructure tree may on occasion find that the desired DAG node may not be visible because a different section of the DAG may have been expanded. This can be handled by rearranging the display to reveal the desired node. Procedures to do that for the nodes in the substructure is in FIG. 213. It accepts a path and operates by first scanning through the already-visible portion of the path and upon not finding a required node, first closes any conflicting siblings and then begins unfolding the path, one node at a time.

The description of Copy Inheritance for Specialization 2103 above in this section is limited in that it assumes that the path from the node being augmented (or otherwise acted upon) to the locus node will be entirely made up of inherited nodes (excepting the locus node). It is possible that the logical substructure tree may pass between inherited and non-inherited nodes. Such a situation could come about if a diamond is inherited and one path through it is copied but the user then explores through the other path. There will, however, always be a path in the local DAG from any inherited node to each locus node through which it was inherited, so some embodiments may deem that sufficient. For others, Copy Inheritance for Specialization 2103 could be modified as follows to work in such a scenario. Rather than just turning back upon any noninherited node or node that has already been copied, they might turn around only for a locus node or node that has already been copied. As embodiments return back down the path from the locus node, as they reach a first non-inherited node after an inherited node, rather than creating a node and associating it with the copied parent entity, they may instead create an association between that entity and the one they are tracking on the path, passing their own node down to the next node on the path to be linked with in case it is inherited. Any subsequent noninherited nodes would simply replace the parent node with their own node as they return to the child, in case the child is inherited. FIG. 85 modifies FIG. 84 under the pretense that nodes 11+ and 12+ are not inherited. As an optimization, embodiments might determine as they ascend the path which nodes require a node to be returned and even which need to be copied, limiting the work required on the return trip.

In-Place, Iterating DAG Augmentation

This iteration can be made more intuitive in the case where the cross-kind relation is many-to-one. Rather than creating a parallel structure corresponding to the inherited one, we can modify the inherited structure in-place. This may seem odd at first because a structure that appears lower than another in the hierarchy many not actually be below it in the global DAG (if only the latter were inherited). It can, however, once this is accepted, provide a concise and intuitive representation.

Given the DAG in FIG. 24, the user could perform the sequence of operations described above with respect to the example involving FIG. 24 and FIG. 39 under "Iterating DAG Augmentation" in-place. The DAG in FIG. 41 is a possible result. It differs from FIG. 39 only in that certain refinement arcs are marked with a letter "R" for "restatement", described below. Recall again that FIG. 25, FIG. 26, and FIG. 37 present various stages of processing to present the DAG localized at node 1 as a tree through which the user can explore nodes 12 and 15.

FIG. 40 shows the process of refining problem nodes 12 and 15 with a new problem node (17) that addresses it with respect to node 1, using iterated, in-place restatement of inherited nodes. FIG. 39, again, shows the full resulting DAG after this process.

Similar variations to those described for standard iterating copying are also relevant for iterating copying in-place.

This brings up the question of how to present the initial, localized DAG to the user in a way that avoids showing information that has been restated by the user as described above. Some embodiments might do this implicitly based on the DAG structure, such that at least those structures built with in-place restatements may be considered to be restatements in localization. They might require, for example, that if a solution directly solves some problem node and also refines other solution nodes, that the refining solution be considered a restatement so that it is made visible in place of the refined nodes. This is similar to a requirement that the refining and refined entities have different objects. Other embodiments, including the one outlined further below, might create restatements explicitly, for example only when an inherited node is modified, so that the marked refinements could be treated differently upon localization. Such restatements would connect the modified inherited node with the original, and any restating copies of inherited node ancestors with the originals. Creation of restatements can be constrained such that any entity restates at most one other (more general) entity.

In either case, restatements can also form a basis for controlling access. Some embodiments may wish to prevent unrelated restatements, e.g., restatements that address a node not in the substructure or context, from being viewed. With implicit restatements, embodiments might, for example, avoid inheriting solutions that directly solve a problem unless that problem is on the solution's inheritance path. Or an embodiment might, as described below under "Mutually Exclusive Refinements" as "specializations of a problem by distinct geographic areas could safely be considered mutually exclusive", support the definition of mutually exclusive refinements and avoid inheriting descendants of a solution that address alternate refining problems. We will see below a method of controlling access during localization with explicit restatements. The goals are both to avoid showing users solutions that are not relevant to them and to ensure that solutions are only visible to those who ought to see them (potentially funders of the organization who share a wider goal, but not sibling organizations under the same funder).

This way of using restatements is not only about controlling access but also relevance. Consider an organizational hierarchy that is dependent upon a project hierarchy. Because the user is primarily concerned with the project, they may likely not have interest in seeing subordinates of individuals assigned to the project if those subordinates are assigned as such with respect to work on an unrelated project (in this case, the relation of assignment of users to solutions may well be many-to-many).

Since for various embodiments an inherited restatement will appear in place of the restated entity, it may be convenient for embodiments to place other (non-restatement) descendants of the restated entity below its restatement. Again, this may seem odd because of the local DAG diverging from the global one, and some embodiments may choose to avoid taking this step, particularly in the case of non-restatement refinements. To be consistent with this approach, in FIG. 86 we modify Collect Inheritance 2240 to inherit other refining nodes through a restatement.

The suggested method of in-place iteration triggers a restatement of the inherited nodes along the path from the node at which an operation is initiated to the locus node. In the case of a "diamond" configuration, where, for example, the node at which an operation is initiated has two parents, both sharing a common grandparent, the operation may be initiated with respect to a single path through the diamond, causing one parent to be restated but not the other. If a later operation is initiated from the same node, or a descendant, that is accessed through the other parent, some embodiments may restate all inherited nodes on the path the locus, while others may do so only any inherited prefix of that path. The former method may require noticing, upon working up towards the locus, whether a node is constituent with its parent being inherited, continuing all the way to the locus, and when working back down, restating only inherited nodes but resetting parents of those constituent nodes whose parents were restated.

We allow for restatements as a particular kind of refinement association between entities of the same kind. The localization process on the server may aggregate any restatements it encounters, as these may be needed by the client in formulating appropriate server requests.

Primarily, we may wish to hide inherited entities that are restated by a node in the substructure. To make this easier, some embodiments use a variation of Record Inheritance 2250 that adds inherited nodes to the DAG bottom-up (i.e., inherited nodes closest to the substructure are added first). For convenience, embodiments may use a shallowest-first version of Collect Inheritance 2240. In place of a single parent or target node that is to receive the inheritance, we maintain a stack of target nodes, and refer to the immediate recipient of the inheritance as the top target node. An auxiliary routine now returns both whether or not the subDAG was reached in the course of following inherited descendants, and the children placed under the top target node. Another routine, Record Restating Child 2270 records each restating child of the currentEntity. Much of the work, including a check of proper ancestry, is intended to prevent the existence of redundant refinement links and can be addressed as described above under "Explicit DAG Augmentation by Specialization" as "prevent situations in which a direct refinement association is created where an indirect one already existed". In of these routines, we branch based on whether or not child nodes are restatements. Importantly, we perform this determination in a way that ignores some restatements, when some sequence of object-of operations on the child yields the locus node or the child's object is on the inheritance path (instead, consider storing on each restatement the previously iterated augmentation upon which it is built and checking whether the sequence of these leads to the locus node—it corresponds to the object in the case of an in-place restatement of a cross-kind augmentation), treating them as non-restatements if in the subDAG or ignoring them altogether otherwise. Furthermore, in order to use restatements for controlling access as suggested above in this section as "restatements can also form a basis for controlling access", we make the inheritance path available to Record Inheritance 2250. With this revision, that routine may skip over unrelated restatements. Here, we consider a restatement of an inherited node to be unrelated if it has no parent on the inheritance path. This is shown in FIG. 87.

On the client side, some embodiments replace the alternative high-level process flows presented in FIG. 80 and FIG. 81 with FIG. 89, which, if appropriate, restates and then refines a single inherited node, although other embodiments may use variants of these other routines. FIG. 90, which we use in this case, differs from FIG. 83 primarily in that it uses atomic routines that perform restatement. It also maintains a record of prior restatements. FIG. 91 displays a process flow that augments the DAG while restating visualized nodes in-place for an explicit refinement operation. We next present differences from FIG. 73. In identifying refinement paths from the object of each refined node towards the locus, we separate a chain of restatements of the object from refinements of the original, restated entity. Then, in calculating the GLB, we work with the refinement paths. If the GLB is itself inherited, recur on Restate Inheritance for Specialization 2133 to restate it and its ancestors. Then, replace GLB with its restatement on refinement paths from refined entities and add the GLB restatement to each corresponding restatement path. In generating the proof for DAG augmentation, concatenate each restatement path from the restating node to the restated node with the corresponding refinement path from the restated node towards the locus. Otherwise, continue as with Atomic Specializing DAG Augmentation 2141.

FIG. 92 presents the same routine with cross-kind as well as specializing DAG augmentation.

Multiple Cross-kind Augmentation

Many-to-many cross-kind relations are not strictly necessary, in that if the refinement relation on the independent entity kind is many-to-many, it is possible to refine any number of independent entities collectively and associate the new dependent entity only with that refining independent entity.

In some cases, embodiments may wish to support many-to-many cross-kind relations. Consider the DAG in FIG. 93 for an example of how it could work. Here we have a problem node with four children, two problems that solve it and two problems that refine it. FIG. 94 shows the same DAG with navigation centered on the two child problems, prior to inheritance. After both child problems inherit both solutions, we have the DAG in FIG. 95. From the exploration in FIG. 96 we perform a refinement of the two solutions, as shown in FIG. 97. As shown in FIG. 98, in addition to the refinements, there is an implicit cross-kind association with each child problem. Clearly, by assumption here there is no single problem assigned to each solution.

Embodiments that directly support many-to-many cross-kind relations may consider how to constrain the creation of a dependent entity associated with multiple independent entities and refining multiple other dependent entities. One way is to require for each independent entity being augmented, and for each dependent entity being refined, an ancestor cross-kind association such that the independent entity is refined by the independent entity being augmented and that the dependent entity is refined by the dependent entity being refined. It is also possible, however, to partition the dependent entities among the independent ones (or equivalently, partition the independent entities among the dependent ones) so that the ancestor cross-kind association need only exist for each dependent and independent entity within the same partition.

The techniques above for making relative DAG augmentation intuitive and efficient can be adapted to creating dependent entities related to multiple independent entities by the same cross-kind relation, as well as refining multiple dependent entities, by having multiple locus nodes. Multiple locus nodes are useful for other purposes, including for generalization (described under "DAG Generalization").

This can be accomplished using a slight generalization of our DAGs. Given a DAG Dag, for any entities E| we define the DAG $Dag_E|^1$ to differ from Dag only in that $Dag_E|^1$ does not include any nodes neither reachable from some E in E| in Dag, nor any nodes from which some E in E| is not reachable in Dag.

A particular embodiment uses a further modification to the DAGs. $Dag_E|^2$ differs from $Dag_E|^1$ only in including as children of each E in E| entities inherited by E, e.g., entities dependent upon an entity refined by E.

This embodiment presents DAGs $Dag_E|^2$ with common context. Now, if the user selects one or more nodes inherited by some E in E| (each of which refining a node directly inherited by E) from which to derive a refining entity, a cross-kind association is implicitly formed between each E in the context of an inherited node being refined and the new refining entity.

$Dag_E|^1$ is obtained from Dag similarly to $Dag_E^1$ as described above under "Explicit DAG Augmentation by Specialization" as "Obtain $Dag_E^1$ from Dag by . . . ", but beginning with multiple entities from which to search, including all structures encountered in a common reduced DAG and keeping a common collection of visited nodes across E|.

$Dag_E|^2$ is obtained from $Dag_E|^1$ similarly to $Dag_E^2$ as described above under "Leveraging Inheritance for DAG Exploration" as "obtaining $Dag_E^2$ from $Dag_E^1$", but calling Collect Inheritance 2240 for each locus node. Because the various locus nodes may share common context, it is beneficial to maintain a collection of nodes to be inherited for each context node across any E in E|, using the precomputed inheritance subsequent times an entity is encountered. Record Inheritance 2250 is called for each entity inherited by any locus node.

Where we had resorted to using "the locus node" in satisfying bounds across both substructure and context, in embodiments where multiple locus nodes are supported, it may be necessary to seek an underlying bound of a tree (their shared substructure for a GLB or their shared context for an LUB).

Many embodiments may ensure that locus nodes not be ancestors or descendants of each other, at least not in the localized DAG, as this would complicate the notions of substructure and context.

In the case of a many-to-many relation and where no indirect objects are stored, with all loci being of the same kind, a user can jointly refine multiple nodes that were inherited by separate loci, easily creating a "diamond" structure for each in addition to the final refinement.

Another potential benefit of all loci being of the same kind is that for generalization (as described below), a user can create a cross-kind association with the dependent entity refined by each of the loci.

Where there are multiple locus nodes, embodiments may omit auxiliary information (described under "Auxiliary Information and Aggregations") or may provide either or both of information relevant to "any" locus entity or "all" locus entities. Where the auxiliary information is discrete, this may just involve a union or intersection, respectively, over the auxiliary information of the various locus entities. Where the auxiliary information is hierarchical, as described below under "Secondary DAGs", in the case where related entities are included in the auxiliary information via various locus entities, embodiments may after taking the union of the entities related to the various locus entities, remove those that are ancestors of entities auxiliary to another locus entity. Or for "all", instead of intersection, consider nodes auxiliary to a locus node only if, for each other locus node, they are related via refinement to a node auxiliary to that locus node, and then include only the most general such auxiliary nodes. Thus, if one locus user is proficient in Java programming and product management, another in Python programming and product management, and a third in programming and agile product management, skills all selected users are proficient in would consist of product management and programming, while skills any user is proficient in would consist of Java programming, Python programming, and agile product management.

Embodiments may often desire to have all loci be of the same kind, but there are exceptions. To aid in matching users to project roles, the pool of users and pool of projects could all be made loci. Then, including the cross-kind relations directlyProficientInSkill and directlyRequiredBy, along with the direct refinement relations (at least directlyRefinesSkill), it is easy to visualize how particular users connect to particular project roles via skills.

To deal with a need to match individuals to projects only if they meet all skill requirements, not just one, embodiments might treat both directlyProficientInSkill and directlyRequiredBy as many-to-one rather than many-to-many and implicitly create a skill that refines each of those either required by the solution or in which the user is proficient. This would be helpful for embodiments where skill requirements are tied to resource requirements (as described below under "Resources" as "skill requirements may be associated . . . with . . . human resource requirements"), but may not (as described below under "Recommendations" as "For embodiments where skill requirements are tied to resource requirements . . . ") be relevant for embodiments where the skill requirements are tied to the project as a whole.

Then for each multi-skill so created, the DAG could also include as parents of that skill each smaller combination of the same collection of skills, up to the singleton skills which would also be included in the DAG. To avoid the clutter and inefficiency of so many DAG entries, it would be preferable to include refinesSkill associations in place of directlyRefinesSkill associations only as needed to connect existing DAG skill entities without redundancy. An index can be built from individual skill entities to the multi-entities from the DAG in which they participate. Then, for each multi-entity, it is possible to look up the other multi-entities associated with each of its conjuncts, eliminating itself and any multi-skills that contain single skills not components of itself, and ordering the remaining ones by the subset relation over their sets of individual skills. Adjacent skill sets should be connected in the DAG.

It may be possible to view a DAG with multiple loci in the case that it is a secondary DAG (as described below under "Secondary DAGs") for which multiple entities are related to the loci of the primary DAG, or if the user explicitly navigated to multiple nodes.

DAG Generalization

We have concentrated in the foregoing on top-down augmentation of project structure. But it is also useful to augment projects from the bottom up. A natural complement to specialization is generalization. A particularly useful case involves creating more general problems and solutions from more specific ones. For entities of a kind that need not act as a dependent entity to any other entity, embodiments need not restrict such upward refinement.

To justify maintaining the object assignment of the refining entities, some embodiments may enforce a correspondence constraint similar to that above under "Explicit DAG Augmentation by Specialization/Multiple simultaneous refinement" for specialization. In assigning an independent entity to a new dependent entity under a cross-kind relation where the dependent entity is refined by one or more existing dependent entities, embodiments may require that for each refining dependent entity, some refinement descendant of the independent entity is related by the same cross-kind relation to (has as a direct object) a refinement ancestor of that dependent entity, indicating a form of correspondence (somewhat looser than under the correspondence constraint above under "Explicit DAG Augmentation by Specialization/Multiple simultaneous refinement") between the new cross-kind association and some preexisting one. Thus, if a new refined (generalizing) dependent entity is created with an independent entity as its object, the object of each refining dependent entity must under various embodiments refine that independent entity.

For dependent entities of a kind that may be associated with zero or one independent entity (an example might be problems that may be components of zero or one solution), some embodiments might require that refining entities should all have an object, or none should. In the former case, the new, generalizing entity may be assigned the LUB of those objects. In the latter case, the new, generalizing entity may not be assigned any object. Other embodiments might allow any generalization of dependent entities of this kind to not have an object, and allow any number of the refining entities to have objects or not, but still require that if an object is assigned to the new refined entity, that it be the LUB of any objects of refining entities.

For dependent entities that must be associated with an independent entity, we can generalize several dependent nodes if we can calculate the LUB of their objects as the object of the new, generalizing, dependent node. This may be possible especially but not exclusively if the nodes being generalized are in the substructure as are their objects. Otherwise, a cross-kind operation may be initiated from the node of the independent entity with which the generalization is to be associated, referred to as the base node. The association of a dependent node with its object can be considered direct if there is a base node and it differs from the LUB, or otherwise it can be considered indirect. Embodiments, especially those that implicitly include the locus node in LUB calculations (as described below under "DAG Generalization/Multiple simultaneous refinement" as "implicitly broaden the LUB inputs to include the locus node"), may require the base node to be in the context.

Thus, a user might want to generalize a dependent entity while maintaining or generating cross-kind relationships with independent entities. The benefit is that after being generalized to apply to a more general problem, that generalized solution may be inherited by other specialized nodes and refined to them as discussed previously. For a base (independent) node in the context (that a user may intend to augment downward), instead of allowing a user to select dependent nodes that the new dependent node should refine, an embodiment might allow a user to select dependent nodes of the same or at least consistent kind (some embodiments may restrict these to the context) that would refine the new dependent node. The new node is then interposed between the node being augmented and the refining nodes. This implies that the new node may be positioned above the refining node if this refining node is in the context, or below the base node, if the base node is in the substructure. If the base node is in the proper context and the refining node is in the proper substructure, the new refined node would not be displayed by some embodiments, so embodiments may restrict refining nodes to the context.

The user might select several entities of the same kind to jointly generalize. Consider the DAG in FIG. 99. Here, there are two chains of problem refinements of length 3, joining at the most general, 31, and each terminating with a single solution (36 and 37). If the user navigates to 31 and explores to 36 and 37, as in FIG. 100, then initiates a joint generalization of 36 and 37, as in FIG. 101, the DAG in FIG. 102 is a possible result.

The user might instead explicitly select both an independent entity to extend with a cross-kind association and any number of dependent entities to generalize. For example, a user might want to generalize solutions with the intention of solving a particular, more general, problem. Consider the DAG in FIG. 103. It differs from FIG. 99 both in that each dependent node directly addressing an independent node (46 and 47) is already generalized by another dependent node (48 and 49, respectively) and in that the LUB 41 of the object nodes has a refinement parent 40. From the exploration in FIG. 104 we select for generalization the two dependent nodes (48 and 49) and initiate a cross-kind operation from root independent node 40 as shown in FIG. 105. As shown in FIG. 106, the new node 50 is now situated between the independent node 40 it addresses and the dependent nodes 48 and 49 that it generalizes.

In the above examples, the nodes to be generalized, selected explicitly by the user, were refined by the locus nodes, whose objects refine the base node. Where there is a more complex sequence of dependencies, a process analogous to that described for iterating specialization may be relevant to process the several generalization and cross-kind augmentation operations in sequence, again progressing top-down. As with that situation (described above under "Iterating DAG Augmentation" with regard to FIG. 213), it may be necessary to reveal nodes, this time in the context. An analogous routine for accomplishing that is presented in FIG. 214.

It is possible when performing cross-kind augmentation of a base node in the context, for embodiments to implicitly treat the path from the locus (or loci) up to but not including the base node as a sequence (or sequences) to be copied and generalized (via iteration) with the uppermost copied node being generalized by the new augmenting node. As an example, consider FIG. 107. It has the structure of a problem with one refining problem that in turn has two child solutions, each of which having a single component problem. We assume that we've navigated to the two component problems, 74 and 75 as locus nodes. If we initiate a solution from the root problem 70, this can be interpreted by embodiments such that that solution is refined by a copied portion of the context. In particular, we start with the loci, copying the two component problems (as before, allowing the user to modify information) to generalizations, have those in turn componentize a new solution that generalizes the two existing solutions and solves the root problem. The resulting DAG is in FIG. 108.

Many aspects of generalization are analogous to specialization, but with the substructure and context reversed (although we concentrate here on top-down cross-kind augmentation in both cases).

FIG. 109 shows a hierarchical breakdown similar to that of FIG. 42.

Multiple Simultaneous Refinement

For embodiments that associate an independent entity with each dependent entity of a particular kind, where several dependent entities are being generalized it is reasonable to assign the least upper bound of the objects of the nodes being generalized to the new entity. For example, we might desire that every solution be associated with a distinguished problem that refines any problem that it solves, or that every argument support or oppose a distinguished object that refines any object that it addresses. Unfortunately, as indicated above under "Explicit DAG Augmentation by Specialization/Multiple simultaneous refinement" as "or the context as a subDAG for common ancestors", the context tree provides quite limited access to least upper bounds. Incorporating inheritance (in the upward direction) may provide a possible solution in some particular cases.

In calculating the LUB, analogously to the case of GLB described above under "Explicit DAG Augmentation by Specialization/Multiple simultaneous refinement" as "broaden the GLB inputs ... ", one has to consider whether or not to implicitly broaden the LUB inputs to include the locus node (assuming that it is refined by all of the objects, in the substructure, of nodes being refined). Doing so would again recognize the significance of the user's having navigated to the locus as a signal of relevance.

We proceed to describe calculation of the independent node to relate to the new refined dependent node as the LUB with respect to the substructure and context trees. If any dependent, refining nodes were not selected from the substructure (they were selected from the proper context), embodiments that enforce the correspondence constraint under "DAG Generalization" can safely assign the object of their GLB (in the inverted context tree, obtained using Calculate GLB wrt a Tree 0111), if that GLB exists, to the new refined node. Or in the case that all the refining dependent nodes (being generalized) were selected from the substructure, embodiments that enforce the correspondence constraint under "DAG Generalization" can safely assign the object of their LUB (obtained using Calculate LUB wrt a Tree 0101), if that LUB exists, to the new refined node. Some embodiments, though, may skip this step and simply use the locus node, as described above in this section as "broaden the LUB inputs ... ". In the case that the dependent nodes being refined have the same object, we can assign that object to the new refined node (again, this step may improve efficiency but can be omitted as it is covered by what follows). Otherwise (or for embodiments that prefer to go directly to this approach), we may rely on the presence of the objects of the refining dependent nodes in the substructure or context trees and check for an LUB among them, using Calculate LUB wrt Substructure and Context Trees 4101. Calculate LUB of Objects of Refining Nodes wrt Substructure and Context Trees Explicit 5111 is presented in FIG. 111.

Calculate LUB wrt Substructure and Context Trees 4101 assumes that its inputs arrive in a node list and first confirms that all members are in either the substructure or the context, failing otherwise. Where any nodes are in the context, the client calculates the GLB of those with respect to the inverted context tree, using Calculate GLB wrt a Tree 0111, and ignores those in the proper substructure. Where all nodes are in the substructure tree (and we haven't reverted to using the locus), it takes their LUB with respect to the substructure tree using Calculate LUB wrt a Tree 0101. Some embodiments might, in place of failing immediately where indicated above, attempt to find the LUB in the DAGs by other means, such as a more exhaustive search.

In the example involving FIG. 99 through FIG. 102, presented above under "DAG Generalization", 31 is assigned to 38 as the LUB of 34 and 35, the objects of the nodes being refined. Note that in FIG. 101, the new solution node 38 is created under problem node 31, as suggested above under "DAG Generalization" as "or below the base node, if the base node is in the substructure".

The server may now require validation that the object of each entity being generalized is itself generalized by the provided object of the new node (for now the LUB of all such objects), i.e., that the object of the new node is at least an upper bound of the objects of the refining nodes. The server may require for each dependent entity to be generalized, a chain of entities related by refinement (we assume for concreteness from most specific to least) from the object of that dependent entity being generalized to the least upper bound. Such a chain can be provided using the tree-based exposition of project structure. For each node being refined, the client can build the path based on one of several cases. For both the LUB and the refining object in the context, the client reverses the result of tracing the path towards the root of the context tree from the LUB, following refinements until a node is reached with the object of the entity at the refining node. For the LUB in the context and the object of the refining node in the substructure, it can concatenate the path from the object node of the refining entity up to the locus with the reverse path from the LUB to the locus. Embodiments that do not implicitly include the locus node in LUB calculations (by analogy to those described under "Explicit DAG Augmentation by Specialization/Multiple simultaneous refinement") may add a case for the GLB (and the object node) in the substructure and in that case use the path obtained by starting with the object node and ascending though the substructure until reaching the LUB. An embodiment of the proof generation process is presented in FIG. 122, using Generate Proof Path 0113 from FIG. 59. In our example, if the user generalizes nodes 36 and 37, the proof for this embodiment will consist, for 36, of the path [32, 31]

from its object, 34, to the LUB, 31; and similarly for 37, of [33, 31] from its object, 35, to the LUB, 31.

On generalizing a node in the context, preferred embodiments will first move the node to the top of its parents node list (see below under "Presentation of Common Context of Multiple Inverted Trees"). If the node from which the operation is initiated is then the uppermost node of the DAG, embodiments will place the entire DAG below (in the substrate) the new node, established within a new frame. Otherwise, the new node can be placed at the top of the node list of the enclosing frame.

Putting these pieces together, the client can use Atomic Explicit Generalizing DAG Augmentation 4141 to generate a single new node that is refined by existing nodes. FIG. 110 describes the sequence for situations where each dependent entity is assigned an object independent entity as LUB with respect to the substructure and context of the objects of the refining nodes. First, for each refining node, identify sequences of nodes related by refinement from its object through the substructure or context, towards the locus. Comments apply similar to those presented above under "Explicit DAG Augmentation by Specialization/Multiple simultaneous refinement" as "Putting these pieces together . . . ". Then, calculate the LUB of the objects of the refining nodes as in FIG. 111. In the case that the LUB does not exist, fail and provide an error message. Use the LUB and its refinement path in generating the proof for the server as in FIG. 122. Meanwhile, prompt the user for information to be stored with the new entity. Then access the server to request the augmentation operation, sending the proof. If it fails, clean up the partially-created node. Otherwise, update the client information to include the new entity (creating a record for the new entity including the user-entered data and its object, and updating records for entities of the nodes being refined to include the new entity as an additional child). The server returns the database identifier of the new entity, which can be used by the client, for example to build a URL for the new node.

The proof validation process where every dependent entity is assigned an object is as in FIG. 123. The server may confirm that for each refining entity, the given path is in fact a chain of refinements, beginning with the object of the refining entity and ending with the provided object of the new refined entity (generally the LUB of objects of the refining entities). It follows the path provided through the global DAG, verifying that each step is a refinement.

With direct objects only, the proof validation process, Validate Proof for Generalizing DAG Augmentation with Direct Objects Only 5231, is as in FIG. 53. The server may confirm for each refining entity, that the given independent path is in fact a chain of refinements, beginning with a purported direct object of the refining entity, and ending with the provided object of the new refined entity (generally the LUB of objects of the refining entities), that the given dependent path is in fact a chain of refinements, beginning with the refining entity and ending with new refined entity, and finally that the purported direct object of the refining entity is genuine.

Generalization of Inherited Nodes

Embodiments enforcing the correspondence constraint under "DAG Generalization" can safely allow nodes inherited into the substructure to be generalized only if they are first copied as described above under "Iterating DAG Augmentation" and "In-place, Iterating DAG Augmentation". This operation, however, then does not generalize the inherited node itself, but only a specialization of it. An inherited node can be generalized directly only when creating a cross-kind association with the node from which that node was inherited or one of its ancestors in the context. Consider the example DAG from FIG. 24 where we assign an independent node to each dependent node. If we were to navigate to node 2 and initiate a cross-kind augmentation from that node while directly generalizing inherited node 10, then 10 and the new refined dependent node would have objects of 1 and 2, respectively, but refinement runs in opposite directions, with 2 refining 1 but 10 refining the new node. We could perform the operation from nodes 1 or 0 in the context, but we could just as well have navigated to either of those nodes first and then initiated the operation with 10 not being an inherited node. If node 10 is first copied to a refinement 10', 10' would have as object 2. When generalizing 10' while augmenting 2, we would then be in the situation described under "DAG Generalization/Single cross-kind augmentation with multiple simultaneous refinement" and could proceed accordingly.

If, however, an embodiment supports upward inheritance of certain kinds of entities into the context, such nodes could be generalized using the same techniques presented previously for specializing inherited nodes in the substructure.

Single Cross-Kind Augmentation with Multiple Simultaneous Refinement

To enable further reuse of solutions, users may generalize them, so that they address a more general problem. The general solution can then be inherited by other specialized problems (and then specialized to those problems). More abstractly, to enable further reuse of dependent entities, users may initiate a cross-kind augmentation from a selected independent node (the base node). The general dependent entity can then be inherited by (and specialized to) other specialized independent entities.

Analogously to the case of GLB described above under "Explicit DAG Augmentation by Specialization/Single cross-kind augmentation with multiple simultaneous refinement" as "guaranteed a path from the base node to the object of each refined node", refinement of the base node by the LUB guarantees a path from the object of each refining node to the base node and thus satisfaction of the correspondence constraint under "DAG Generalization". Embodiments enforcing that constraint have similar options if such a path cannot be determined. To enforce the constraint, the LUB calculation can be performed as before, but the result compared against the base node.

If the base node is the same as the LUB of the objects of the refining nodes, it is redundant and embodiments may choose to consider such augmentations as simple refinements.

In cases where a cross-kind augmentation of an independent node is requested along with generalization of a dependent node of which it is already the object, it is still possible to insert a new node between them, but when the independent node is made the direct object of the new dependent node, the independent node should be made merely an indirect object of the existing dependent node.

Where every dependent entity is associated with an independent entity and the correspondence constraint under "DAG Generalization" is enforced, we can use the proof mechanism described above under "DAG Generalization/ Multiple simultaneous refinement", with one modification. There is now a distinction between the base node and the LUB, so that for the independent paths various embodiments effectively concatenate each path from the object of a refining node to the LUB with the path from the LUB to the base node. Again, we pass the suffix path to the server as part of the proof so that it need only be checked once. The routine, using Generate Proof Path 0113 to obtain the refinement path from the LUB to the base (or failing if unsuccessful), is shown in FIG. 126.

Concerns such as those stated above under "Explicit DAG Augmentation by Specialization/Single cross-kind augmentation with multiple simultaneous refinement", including directlyAddresses being many-to-many, apply here as well.

Again, another modification to the proof structure presented in FIG. 122 is useful, in addition to that just described. The proofs now take the form of a suffix path from the LUB to the base node and, for each refining dependent entity, of two refinement paths: one to the refining dependent entity and one to the LUB, each beginning with entities that are in turn associated by the same cross-kind relation. The proof generation process is as in FIG. 127. For the example involving FIG. 103 through FIG. 106, presented above under "DAG Generalization", the proof for some embodiments will be two pairs of paths, one for each node being refined (if indirect objects are available, only the independent (problem) paths need be provided). In each case here, following the solution refinement hierarchy from the refining solution node towards the locus node and stopping at the object problem yields the existing problem/solution pair corresponding to the new problem/solution pair being created by the current operation. For node 48, the dependent path will be empty for this embodiment because it is directly associated with independent node 42 (with no refined solutions in between) and the independent path will be [41, 40] for this embodiment because following these steps from the object 42 of 48 leads to the object 40 of new node 50. Again, by convention we treat the initial nodes as implicit and do not include them in the paths.

The proof validation process with only direct objects is as in FIG. 129. The server may confirm that for each refining entity, the independent path, leading to the provided object of the new refined entity starts from an object of the entity from which the dependent path, leading to the refining entity, begins.

With indirect objects, proof generation in FIG. 126 and server validation in FIG. 128 need only operate on the indirect paths.

The steps for handling a single cross-kind and generalizing DAG augmentation are similar to those of Atomic Explicit Generalizing DAG Augmentation 4141 in FIG. 110. They differ, analogously to the discussion above under "Explicit DAG Augmentation by Specialization/Single cross-kind augmentation with multiple simultaneous refinement", in the use of the routines above that are intended to support cross-kind and generalizing augmentation, including Generate Proof for Explicit Cross-kind and Generalizing DAG Augmentation with Indirect Objects 4122, Generate Proof for Explicit Cross-kind and Generalizing DAG Augmentation with Direct Objects Only 4132, and Generalizing Cross-kind DAG Augmentation 5202, as well as in adding a step to convert to the corresponding refinement operation (e.g., of the kind of the nodes being generalized) if the LUB (calculated with FIG. 111 and FIG. 112) is the same as the base node. The routine is presented in FIG. 125.

Generalization, Restatements, and Iteration

In the following discussion, we use problems and solutions, with a cross-kind relation of "solves" (and in the reverse direction, "componentize"), for the independent and dependent kinds, respectively, only for concreteness of presentation.

If restatements are to be used for controlling access as described above under "In-place, Iterating DAG Augmentation" as "restatements can also form a basis for controlling access", so that solutions can be shared selectively among different organizations, we need to create restatements not just when specializing a general solution but also when generalizing a specific one. In the case of specialization, the solutions are restated for the more specific problem and then any further refinement or componentization is private to the more specific problem. When generalizing, the same two steps may apply, but we need to give the administrator of (or other user with responsibility over) the more general problem leeway to generalize it on the specific problem's side of the restatement so that excessive information is not inherited by other specific problems. One way to accomplish this is to perform the two steps separately. In the first, the administrator of the more general problem would be able to "solve and generalize": present the most general solution to their problem directly as a generalization of the specific solution, considered as a restatement (although the difference may be more than substituting general terms for specific ones), perhaps by navigating to a specific solution and initiating this operation from the general problem. In the second, an administrator would be able to initiate "generalize to restatement" from the specific problem: create a logical restatement of that most general solution to the domain of the specific problem, but because the restating refinement was technically already created, this operation serves to intersperse the new solution in place of the specific one as a restating of the most general solution, while creating a non-restating refinement of this new restating solution by the specific solution.

The administrator of the more general problem might want to jointly generalize several separate solutions, perhaps constructed by different organizations in response to distinct specializations of the general problem. In this case, the administrator could navigate to those solutions collectively. The first "solve and generalize" step above would be performed once, yielding a most general solution and a technical restatement association with each specific solution that may add considerable generality. Then, the second "generalize to restatement" step could be performed once for each specific solution.

Now, consider a situation where the administrator of the more general problem wants to generalize not just a high-level solution to the problem, but solutions to component problems that were suggested separately for each specific problem. This may involve navigating to the several component solutions and initiating from the general problem as in the example involving FIG. 107 and FIG. 108, presented above under "DAG Generalization" without respect to restatements. Embodiments may iterate through the various nodes on the paths from the general problem node down to the locus nodes, first creating a most general high-level solution (and several restatement associations), then a most general component problem (and several more restatements), and finally (for this example) a most general component solution (and several more restatements). Where there are multiple locus nodes, embodiments are not merely iterating through a single path from the base node, but tracing the tree from the base node to each locus node. While some embodiments may start with the base node and work towards the locus nodes, other embodiments may start with each locus node and work towards the base node, avoiding subpaths already traversed. With the representation described below under "Presentation of Common Context of Multiple Inverted Trees", one approach involves iterating through each context frame encountered for each parent node list among context descendants of the base node. Then the second step may be performed, initiated from each specialized component solution and generating another iteration through the path between it and the general problem.

Embodiments may trace the various paths from the context node from which the operation was initiated towards the locus nodes breadth-first, in that entities in corresponding positions are generalized together, The correspondence need not be exact but only approximate—as with iteration for specialization (see above under "Iterating DAG Augmentation" as "not refine every such inherited ancestor of the inherited node being augmented"), we can copy either the entire path or specific nodes, for example corresponding to sections of paths connected by refinement associations.

FIG. 113 through FIG. 119 present an example of generalization functionality. We have a project here relating to disaster preparedness. FIG. 113 shows a project screen with a particular solution, "Let's construct buildings on stilts!", being selected. FIG. 114 shows requests that this solution, along with another, "Let's construct buildings from bricks !", be opened together, as described under "Presentation of Common Context of Multiple Inverted Trees". The result is in FIG. 115, where the common ancestor, "How can we establish reduced human suffering from disasters?" is visible and the operation "Propose a generalizing solution" selected. The embodiment proceeds in FIG. 116 to allow the user to edit the name of the new solution, "Let's mitigate the effects of disasters!", which solves "How can we establish reduced human suffering from disasters?" and generalizes both "Let's mitigate the effects of wildfires!" and "Let's mitigate the effects of floods!", which are the next non-refining children on the path from the common ancestor to the locus nodes. The new node happens to be placed as a parent of "Let's mitigate the effects of wildfires!", above its existing parent. The embodiment continues generalizing nodes along the paths to the loci in FIG. 117. Since the following nodes (the loci) refine their parents along this path, the new node, "Let's ensure adequate infrastructure is in place to withstand disasters!" refines the node just created, while generalizing the loci themselves, as is evident from the result in FIG. 118. For embodiments that use restatements in generalization as described below, upon navigating to "How can we establish reduced human suffering from wildfires?", we cannot see the suggestion regarding stilts, which would not be appropriate or helpful. Upon navigating to "How can we establish reduced human suffering from earthquakes?", as in FIG. 119 we can see the generalized solutions, which might next be refined, for example to "Let's ensure that buildings are bolted to slab!".

The administrator of the specialized project (we use the "floods" project here) might also wish to take advantage of the additional generalization, and can do so by selecting "Generalize to restatement" on "Let's construct buildings on stilts", as in FIG. 120, and typing the generalization, as in FIG. 121. Other embodiments may formulate this differently, for example by initiating the operation from the node of the new, generalized entity.

For specialization, we allowed the user to select nodes to be refined in addition to any node being augmented by a cross-kind relation. It was clear whether each such node was inherited or not, and the inherited ones clearly needed to be specialized, along with their path to the locus node. Here, embodiments may or may not allow the user to select nodes to be abstracted in addition to any nodes on the paths from the node being augmented by a cross-kind relation to locus nodes. If additional nodes are permitted to be selected for abstraction, the abstraction may be assumed to relate to the nodes themselves or to abstracted copies of paths from the locus nodes, or the user may be permitted to specify which treatment is desirable.

FIG. 130 shows a hierarchical breakdown for iterating generalization similar to that of FIG. 62 for specialization.

A process for iterating abstraction with a cross-kind augmentation is as follows. We copy one node for each contiguous path of the same entity kind, as suggested above under "Generalization, Restatements, and Iteration" as "for example corresponding to sections of paths connected by refinement associations". A list is maintained of the locus nodes not yet reached. First scan descendants of the base node until any of the following are reached: an occurrence of the same cross-kind relation being applied—the embodiment collects the dependent nodes reached in this way; a different cross-kind relation than that being applied—the embodiment fails; a locus node—drop this node from the list of locus nodes not yet reached. Create a new cross-kind association with a new dependent node that is set as being refined (using a restating refinement if supported by the embodiment) by each collected dependent node. If there are any dependent nodes, now consider them to be independent nodes and for each repeat the above process, except that the cross-kind relation is initially left indeterminate and is set when first encountered in scanning descendants. This process is described in FIG. 131. Note that although restating abstractions may be generated by this process, some embodiments may not perform the updates in-place.

If there were multiple sets of related component solutions, the above process could be performed once for each, but generalization of the high-level solution would only be performed during the first pass; later the restatement would be identified.

In embodiments without explicit restatements, the basic methodology described above of navigating to the specific and then initiating a cross-kind augmentation from the general, iterating though the paths, can still be applied.

Combining Specialization and Generalization

While some embodiments may treat specialization and generalization as entirely independent of each other, others may accept refined and refining nodes together: the client, either by a distinct selection operation or merely checking each direction; the server, either by accepting a direction with each dependent node, or merely checking each direction (e.g., in validation if the first step fails, try the other direction).

Combining specialization and generalization allows for interposing a node between two existing nodes in a refinement relation. This is useful for the "generalize to restatement" operation described above under "Generalization, Restatements, and Iteration".

Combining specialization and generalization is also useful for extending the notion of iteration over inherited nodes described above to cases where a constituent (non-inherited) base node is modified or augmented and one or more inherited nodes occur on the path through the substructure to the locus node. Embodiments may then wish to copy or restate those inherited nodes prior to operating on the base node. The entity at the new node created for an inherited node immediately above a constituent node on such a path would need to be placed below the inherited entity and above the entity at the following constituent node. In these cases, however, the base node would always also be reachable from the same locus node by a path including only constituent nodes, so not all embodiments will deem this step to be necessary.

In this case, the object of the new node may not be the LUB of the objects of the refining nodes, but only be refined by their LUB and may not be the GLB of the objects of the refined nodes, but only refine their GLB. Indeed, the base node under our constraints will refine the object of each refined node and be refined by the object of each refining node.

DAG Refinement of Existing Entities

Embodiments may support establishment of a refinement relationship on existing entities. One motivation here is to allow the process of cross-kind augmentation with simultaneous refinement to be broken apart, so that the cross-kind augmentation happens first and one or more refinement associations added later. Another is to support social innovation, whereby refinement associations are created between existing projects.

For a kind of entity that does not participate as a dependent kind in a cross-kind relation, embodiments can establish a direct refinement association between entities at arbitrary nodes. To minimize the creation of redundant associations as discussed above under "Explicit DAG Augmentation by Specialization" as "prevent situations in which a direct refinement association is created where an indirect one already existed", embodiments may allow such direct refinement associations between entities at nodes either both in the substructure or both in the context and not connected by a path to the locus.

If independent entities are optionally assigned to dependent entities and the refining dependent entity has no such object (even indirectly), after the refinement association is created the object of the refined dependent entity (if any) may become the indirect object of the refining dependent entity without any validation requirement.

If independent entities are assigned to dependent entities and the correspondence constraints under "Explicit DAG Augmentation by Specialization/Multiple simultaneous refinement" or "DAG Generalization" are enforced, if the refining dependent entity has an object (even indirectly) we require that the refined dependent entity also have an object and that a refinement relationship exist between the objects of the nodes being connected, generally in the same direction. As a special case, if the refining dependent entity and the refined dependent entity have the same object, the refining dependent entity directly, the refining dependent entity's object is made indirect. The server may require proof of such a relationship; if indirect objects are available, this can take the form of a sequence of nodes connecting their objects through direct refinement associations, otherwise refinement chains from the dependent nodes to ancestors to which their objects are directly connected may also be required. Validation of the proof on the server side is not much different than for other cases.

In the case of adding a refinement association with respect to a cross-kind association (e.g., where both dependent entities have objects under the same cross-kind relationship), this can easily be specified using hierarchies by making the independent entity of the refined association (the object of the refined dependent node), or one of its ancestors, the locus, and selecting both the refined and the refining dependent entities in the substructure (they can often be distinguished explicitly or by the positions of their objects, as, for example, the object of the refined dependent node being on the path from the object of the refining dependent node to the locus). A proof can be generated as the path from the object of the refining dependent node towards the locus, until reaching the object of the refined dependent node. This formulation is most appropriate or convenient for creating refinement associations where the refining dependent entity has an object, either between entities within an organization's projects or if two organizations are involved, where initiated from the organization of the refined project, since one of its projects must for various embodiments be the locus. An advantage of this formulation is that it is possible to create a refinement association between inherited nodes by performing an iterated copy (in-place or otherwise), as described above under "Iterating DAG Augmentation" and "In-place, Iterating DAG Augmentation".

If independent entities are not assigned to dependent entities, then embodiments can, as before with regard to augmentation, infer the object of a dependent refined node in the substructure to be the first independent node immediately following a refinement chain of dependent nodes on a path to the locus. Embodiments can also require that the refining node be selected from a position immediately under its object (connected via a cross-kind association corresponding to the initial part of a specialization operation as discussed above). The refinement path can be obtained as the path from this object of the refining node through the substructure towards the locus until reaching the object of the refined node.

An example of adding specialization to a cross-kind association is shown before the operation with navigation at node 61 in FIG. 132. Each set of jagged lines represents an arbitrary refinement path. The user has explored through the substructure to refining dependent node 66, passing through its object, 62, and to refined dependent node 64. The DAG after the operation is as in FIG. 133.

This process Client DAG Augmentation with Refinement between Existing Nodes (in Substructure) 0106 for creation of a refinement association between existing entities in the substructure via this formulation is displayed in FIG. 134 and FIG. 136. Begin by checking that both nodes being refined are in the substructure (although this may not be strictly necessary in all cases). If necessary, distinguished the refined node from the refining one. As previously with iteration, use Copy Inheritance for Specialization 2103 or Restate Inheritance for Specialization 2133 to obtain new constituent nodes in place of inherited ones. Next, generate the proof as the refinement path from the object of the refining node (as copied) to the object of the refined node (as copied), using Generate Proof Path 0113 from FIG. 59. Then proceed with creating the association, with Atomic DAG Augmentation with Refinement between Existing Nodes 0126. The operation is requested from the server, and if successful the new association may be recorded in the parent and child links of the local DAG. The object of the refining node may also need to be adjusted, as described above in this section as "may become the indirect object of the refining dependent entity" (this would need to occur on the server as well). Finally, embodiments may make the result of this operation evident by moving the subtree under the refining node under the refined node.

Alternatively, another formulation can be used for adding a refinement association with respect to a cross-kind augmentation. The user can navigate to the refined and refining dependent entities as dual loci, and explore through their respective contexts to find a common ancestor (as under "Presentation of Common Context of Multiple Inverted Trees"), the object of the refined dependent entity and a refinement ancestor of the object, under the same cross-kind relationship, of the refining dependent entity. To aid in proof generation, the path from the refining dependent entity should go through its object. This formulation is most appropriate or convenient for creating refinement associations where the refining dependent entity has no object (so can't be located by exploration) or if two organizations are involved, where initiated from the organization of the refining project, given an incremental way to navigate to the two nodes from alternate projects that are being associated.

We next revise the example to demonstrate this alternative formulation for the same initial DAG from FIG. 132 (this time with navigation at refined dependent node 64 and refining dependent node 66). The user has explored through the object (62) of 66 to the common ancestor (61), also the object of 64. The resulting DAG after the operation is still as in FIG. 133.

This process Client DAG Augmentation with Refinement between Existing Nodes (as Loci) 0116 for creation of a refinement association between existing entities as loci via this formulation is displayed in FIG. 135 and FIG. 136. Again, if necessary, distinguish the refined node from the refining one, this time as loci. Attempt to reveal the object of the refinedLocus in the context as a common ancestor of refinedLocus and refiningLocus, if not already so revealed, and then confirm that the object of refiningLocus is on its path to the object of refinedLocus. Generate the proof as the refinement path from the object of the refining node (as copied) to the object of the refined node (as copied), using Generate Proof Path 0113. Then proceed with creating the association, with Atomic DAG Augmentation with Refinement between Existing Nodes 0126 (as described above under "DAG Refinement of Existing Entities" as "Then proceed with creating the association").

By this approach, the simultaneous cross-kind augmentation and specialization or generalization presented above can often be directed as a two-part process: first creating the cross-kind augmentation and then adding the relevant refinements. At that point, embodiments may or may not choose to preclude augmentation operations from including specialization, either at the level of the client or server or both.

Preventing Cycles

With either creating links between entities at arbitrary nodes, or moving a subtree from one node to another (moving, as described under "Cutting and pasting", requiring detachment of one link and creation of another), there is a potential for creation of a cycle. Embodiments will likely not want users to be in the position of scrolling endlessly through the same entities while exploring substructure or context, and may take various steps to prevent it.

In the case where a link is created from a child in the substructure to a parent on the path from the child to a locus or in the context, or similarly to a parent in the context from a child on the path from the locus to the parent or in the substructure, there is no danger of creating a cycle. Also, if both nodes have objects, the constraint check may preclude creation of a cycle. These guarantees, however, may not be sufficient for many purposes.

One approach for preventing cycles when linking entities at arbitrary nodes is to perform, upon a request to create a link from one node to another, a search of the ancestors of the node that is to be the parent or the descendants of the node that is to be the child, looking to find the other node. If it is encountered, establishing the link would create a cycle, so the linking operation should not proceed without rectifying the problem.

If the entities to be linked are at locus nodes, their substructure and context has already been passed to the client, at least in part (see under "Explicit DAG Augmentation by Specialization" as "embodiments may place limits"), so that a search may be initiated. If the DAG is not very large, it is quite reasonable to perform this search, triggering deferred accesses where necessary, but otherwise it can be inefficient. If the entities are not at locus nodes, the server would need to perform the search for cycles.

It is possible for embodiments to not perform any check and thus allow cycles to be created. In that case, cycles may be detected after the fact. It may be undesirable to create a cycle in the local (non-deferred) DAG, so embodiments may want to prevent these. That involves both checking for actual cycles in the initial DAG and upon unfolding deferred nodes, and also checking for potential cycles prior to allowing any linking operation. Embodiments may arrange for these checks to be performed on the client or on the server.

One option for dealing with the checks in the initial DAG and upon unfolding deferred nodes is to have clients check for cycles during the unfolding process. The client can detect cycles by checking, when unfolding the context with respect to a locus, for elements of the substructure (including the locus) or of the path in the context from the locus to the node being unfolded, or vice versa. This may only be necessary the first time a node is unfolded during a session. If the user requests a connection between locus nodes, the client could check for potential cycles as just described but without expanding any deferred nodes. If the client identifies any cycle, it should inform the server of the problem, passing it the offending path. The server can then validate that the path is indeed a cycle in the global DAG. Some embodiments might have the server break the cycle, while others might disallow the operation. The server might select a link to break, perhaps the one created by the least trusted user. It might also notify the administrators of the various projects, so that they can provide their consensus of where the problem lies.

It is also possible for the server to perform similar initialization checks prior to sending the localized DAG to the client, or prior to sending the result of expanding a deferred node.

If multiple clients request the same locus nodes at the same initial depth with no intervening linking, it is not necessary for the same check for cycles to be done multiple times. In these cases, the server could keep a "safe depth" for every entity to indicate whether cycles are possible within that depth. The structure could be augmented each time a new entity is requested (or created) and the depth incremented after the node has been proven safe at that greater depth. If a requested node/depth is guaranteed safe, no cycle check is needed. If nodes within depth range are linked, the server may reset the safe depth for all locus records within the old safe depth of both nodes.

Additional Project Structure

Additional Problem Structure: Data Measures

It is discussed under "General Data Sets" how data sets are specified with the source of the database, conditions that must hold for data items to be selected, and expressions of the attribute values extracted from those data items, and how they may be associated with projects and aggregated based on user exploration of a localized DAG. Alternatively, data sets can be aligned much more closely with a particular problem, such that the problem consists entirely of increasing or decreasing a particular attribute value. We refer to the specification of such a data set as a data measure. With data measures, as above, each node is associated with a query that may return particular attribute values of particular data items. The item set of a refining data measure, however, will for various embodiments be a subset of that of a refined data measure. Thus, if one data measure refines another, it will for these embodiments include attribute values associated with fewer selected items. For example, particular data measure problems might relate to raising the income of particular demographic groups such as elderly, minorities, or refining both, income of elderly members of a minority group. A refining data measure might also extract additional attribute values. The data problem may need to specify whether the problem involves increasing or decreasing that attribute. Upward and downward-pointing arrows, respectively, can be incorporated into icons for these data measure problems.

As an example of the allowable structure of conditions, they might be conjunctions or disjunctions over constraints on individual attribute values, or any nesting of these. Terms may reference the database, table, and attribute. The structure of conditions may vary among embodiments. A simple grammar is as follows:

Condition|=ε|Term|∧(ConditionList)|∨(ConditionList)|ø
ConditionList|=<Condition,>$^+$ Condition
Term|=Attrib|=Expr|Attrib≠Expr|Attrib>Expr|Attrib<Expr|ø
Expr|=Attrib|Const
Attrib|=(DatabaseName, TableName, AttribName)

Lists of both disjuncts and conjuncts are unordered, but a standard ordering may be imposed. The null symbol allowable as a Condition or a Term will be explained shortly.

Some such embodiments may imbue additional constraints to reduce the number of representations of any imposed ordering. A grammar that requires conjunctions and disjunctions to have at least two elements and requires their alternation is as follows:

Condition|=ε|Term|(Conjunction)|(Disjunction)
Conjunction|=<DisjunctionOrLeaf∧>$^+$ DisjunctionOrLeaf|ø
ConjunctionOrLeaf|=(Conjunction)|Term
Disjunction|=<ConjunctionOrLeaf∨>$^+$ ConjunctionOrLeaf
DisjunctionOrLeaf|=(Disjunction)|Term The definition of Term is unchanged from that above.

Embodiments that wish to maintain such a convention but allow users to perform operations that violate it can apply rules as follows to restore the convention:

∧(Condition)⇒Condition
∨(Condition)⇒Condition
∧( . . . , ∧(ConjunctionArgs), . . . )⇒∧( . . . , ConjunctionArgs, . . . )
∨( . . . , ∨(DisjunctionArgs), . . . )⇒∨( . . . , DisjunctionArgs, . . . )
∧( . . . , ε, . . . )⇒∧( . . . , . . . )
∨( . . . , ε, . . . )⇒∨( . . . , . . . )
∧( . . . , Term$_1$, . . . , Term$_2$, . . . )⇒∧( . . . , Term$_2$, . . . , . . . )
∧( . . . , Term$_2$, . . . , Term$_1$, . . . )⇒∧( . . . , Term$_2$, . . . , . . . )
∨( . . . , Term$_1$, . . . , Term$_2$, . . . )⇒∨( . . . , Term$_1$, . . . )
∨( . . . , Term$_2$, . . . Term$_1$, . . . )⇒∨( . . . , Term$_1$, . . . , . . . )

where in the last two rules, Term$_2$ refines Term$_1$. These rules remove singleton collections, nonalternating nested collections, embedded empty conditions, and redundant terms. Additional rules might sort the ConditionLists using the standard ordering as described above. For convenience, we switch here to the prefix notation used for plans. Embodiments that modify this or the above grammar to more naturally consider negations as general conditions would need to, within an odd number of negation forms, treat conjunctions as disjunctions and vice versa for purposes of rules by which refining conditions may be generated.

Going further in this direction, conditions might be maintained in disjunctive normal form (DNF), conjunctive normal form (CNF), or any other convention. It is possible to allow conditions to be entered and maintained in the form of the simple grammar above, but checking whether one condition refines another may require converting them to a normal form. A DNF grammar is as follows:

Condition|=(<Conjunction ∨>*Conjunction)
Conjunction|=(<Term ∨>*Term)|ø

A data measure problem may only be specialized by another data measure problem with the same polarity (or with at least those possibly extended, and possibly more data measures). Refining data measure problems will for various embodiments have conditions required to hold over selected items at least as restrictive as those of the refined data measure problems.

There is some similarity between conditions and the situation with plans described under "Additional Solution Structure: Plans", and many of the same design options are relevant. Unlike conditions, plans do not have a polarity nor any notion of negation.

Data measures may be a special kind of problem that refines more general problems, or any problem may have the potential to add a data measure.

When refining multiple solutions, embodiments may well check for consistency of their conditions. When augmenting the DAG with a new problem node that specializes or generalizes existing problem nodes, an embodiment should ideally provide the GLB or LUB respectively of the conditions of augmented problem nodes, allowing the user to edit them to be more or less strict, respectively. These can be calculated by forming a term for the GLB as X∧X' or the LUB as X∨X' and applying simplification rules to restore the appropriate form. Alternatively, a direct calculation could be derived depending on the condition form enforced by the embodiment. Embodiments, for example, could specialize conditions as follows to maintain alternation, as defined by the grammar above in this section as "A grammar that . . . requires their alternation". If more than one condition is a conjunction or term (singleton conjunction), form a conjunction of the union of their terms, dropping any that generalize terms from another conjunction. Then, include each disjunction as an additional conjunct, dropping any that are equal to or strictly more general than others, having additional or more general disjuncts or lacking certain conjuncts or having others more specific. To maintain DNF as defined by the grammar above in this section as "A DNF grammar is as follows", with or without first taking the prior step, embodiments can treat each condition as a disjunction of conjunctions, and form tuples of their conjuncts (treating terms as singleton conjunctions). Sort in order of increasing length and remove any that include all conjuncts of (or generalizations of conjuncts of) an earlier tuple. The condition may be formed as a disjunction of conjunctions, each tuple providing a set of conjuncts. The process for generalizing conditions is similar, reversing conjunctions and disjunctions, as well as generalizations and specializations.

One possibility is to store the full condition with each data measure problem. This avoids some of the complexity of dynamically forming conditions. An obvious disadvantage is the amount of space required. There is also an issue, however, of maintaining the required refinement relation across conditions (derived from the refinement hierarchy of data measure problems) as those conditions are modified. The relation on conditions can be maintained naively by simply insisting that it not be violated. If a condition were edited to be more specific (perhaps using the operations below), the result would need to be checked against its refinement children to ensure that it is still more general than each of them. If it were edited to be more general, the result would need to be checked against its refinement parents to ensure that it is still more specific than each of them. Thus, if a condition (or portion of a condition) is fixed over a series of refinements to the data measure problem and later needs to be changed in each position, it may be necessary for the user to modify each of these separately, from the most specific to the most general, if specializing, or from the most general to the most specific, if generalizing. It is perhaps more practical to automate the process. Embodiments taking this approach might, upon specialization of a condition, propagate that specialization through refinement descendants of the data measure problem, until reaching leaves or data measure problems whose condition is already at least as specific. Similarly, upon generalization of a condition, they might propagate that generalization through refinement ancestors of the data measure problem, until reaching leaves or data measure problems whose condition is at least as general. In applying a change made to one term X to another, modified term X', embodiments may replace the descendant term X' in the case of specialization, with the GLB of X and X' or in the case of generalization, with their LUB as described above in this section as "These can be calculated by . . . ". This would also allow a refinement association to be created between existing data measure problems, where the condition of the refining problem does not refine the condition of the refined problem, by propagating in either direction. Either of these approaches would likely require changes to the conditions to be permitted only for locus nodes, so that the substructure and context DAGs are available, or else require that the operation be performed only on the server, with the client notified of any violations of the refinement relation, or of all necessary changes to conditions.

An alternative is to treat condition components as entities, related to each other and to data measure problems, and subject to inheritance. Entities may thus include conjunctions and each kind of term (disjunctions may be implicit if disjunctive normal form is maintained). Various kinds of relations might be supported on condition components: component relations, indicating the grammatical structure as suggested above; a refinement relation, corresponding to specialization/generalization of the condition components; a movement relation, indicating that a subtree is repositioned under a target node in the refined condition, and an operand relation, a generalization of the component relation indicating that particular condition components can be manipulated in some way to yield some not clearly identified condition component. The condition at a particular data measure problem could be constructed by following its component descendants. All condition refinement associations should be considered to be restatements (as described under in-place iteration), in that inherited refined conditions need not be displayed if the refining condition is displayed and in that the refining condition need not be displayed if it is for an unrelated problem. Some embodiments may integrate condition information with the local DAG of which the problem is the locus. In this case, it may be natural to display restating condition components, movement associations, and operator applications that relate to an ancestor or descendant of the locus problem node. Some embodiments may separate the local problem DAG from the local condition DAG, with the latter containing only the components of the condition for the locus of the local problem DAG. Such embodiments may still maintain an integrated local DAG or modified version thereof for purposes of enabling dynamic exploration of data as described below in this section as "may arrange to label the refinement associations between problems . . . ".

As an implicit GLB is performed upon the conditions of problems that are collectively refined, specializing operations may be signaled by markers placed in the structure of conditions. Operations for specialization might be as follows:

Merge Disjuncts (conjunctions) This operation, relating to Merge Orderings for plans, can take the form of a user refining inherited conjunctions (initiating the operation from a base node and selecting others) in the same disjunction. In DNF, disjuncts are always conjunctions, but this can be the case in a more general setting as well. In the localized DAG, the conjuncts of the selected conjunctions are moved to the base node conjunction, removing duplicates, and the selected conjunctions removed. In the global DAG, a new conjunction restates each of those inherited ones, so that it can inherit their descendants.

Remove Disjunct This operation has no correlate for plans. This can take the form of a user deleting an inherited disjunct. In DNF, such disjuncts may always be conjunctions but in a more general setting they can be any condition expression. In the global DAG, that disjunct is restated by a null term, which need not be displayed to any user, with respect to the locus problem.

Add Conjunct (term) This operation relates to Add Unordered Leaf for plans. In DNF, this can take the form of a user augmenting an inherited conjunction with a new term. Embodiments simply place the new term as a construction under its parent in the localized DAG, but arrange that in the global DAG, the term be placed as a construction under a new conjunction that restates the original with respect to the locus problem. This new conjunction may operate over the new term in addition to inheriting the operands of its parent. In a more general setting, related operations can be used to generate an initial term in an empty condition (which need not create a conjunction) or to replace a term with a conjunction of itself and a new term.

Specialize Terms This operation relates to restatement of motivated problems for plans. One term refines another if it is consistent with that second term and contains at least as much information. Refinement of terms might be defined as follows:
a>m refines a>n if m>=n
a<m refines a<n if m<=n
a=m refines a>n if m>n
a=m refines a<n if m<n
a>m refines a≠n if m>=n
a<m refines a≠n if m<=n
This operation can take the form of a user refining inherited terms, the operation being initiated from any one of them while selecting any others from the same conjunction. The user would edit the inherited base node term, replacing it and the selected term in the local DAG with a refining term, but creating a restating refinement of each of those terms in the global DAG. Refinement with each of the parent terms may be verified by the server and possibly the client as well. If the client performs the verification, it can indicate to the server which term-refinement rules were applied.

Conjoin Disjuncts This operation, related to Impose Order for plans, inserts a conjunction within a disjunction. It may not apply to DNF (without first reformulating), except in a trivial case that can be handled under Add Conjunct. A user might initiate this operation after selecting the disjuncts to conjoin. In the local DAG, these may be moved to be children of a new conjunction that is created as a child of the disjunction. In the global DAG, the conjunction may be created as a construction under a new disjunction that restates the original with respect to the locus problem (as with Add Conjunct), and then "movement" arcs created from the new conjunction up to the operand disjuncts, to indicate that they are considered to move back down to the conjunction. This may be more straightforward for embodiments that store the locus problem with respect to which the operation is performed on the movement arc, as suggested parenthetically for restatement refinements above under "In-place, Iterating DAG Augmentation" as "storing on each restatement the previously iterated augmentation upon which it is built".

Embed Conjunction This operation, related to Embed Order for plans, pushes a conjunction disjunct into a disjunction descendant of a sibling disjunct. It does not apply to DNF (without first reformulating) but does apply in more general settings. The user initiates the operation, specifying the object conjunction and target disjunction, both available in the substructure as descendants of the conjunction's parent disjunction. In the local DAG, the object is moved to become a child of the target. In the global DAG, some embodiments may create a movement arc between them, pointing to the locus problem.

Extract Disjunction A disjunction conjunct of a conjunction that has a conjunction proper ancestor may be moved to be a child of that conjunction ancestor. If there is no such ancestor, it may be created as the root of the condition.

The latter two operations introduce "movement" arcs. Record Inheritance 2250 may be modified from that in FIG. 87 so that movement arcs may be treated similar to restatements except that where embodiments replace the restated node with the restatement, the object node of a movement arc is detached from its context and placed under the target node.

Corresponding generalization operations would be:

Split Disjunct (conjunction) The user might require that not all conjuncts must be true together, but rather that various combinations of them must hold together. This can be formulated as allowing the user to partition the set of conjuncts in the condition to be generalized.

Add Disjunct (conjunction) This could be initiated from the disjunct. The user might specify each conjunct.

Remove Conjunct This could be initiated from the conjunct to be removed. In DNF, the conjunct would always be a term.

Generalize Conjuncts (terms) This could be initiated from any term, while selecting any other terms from the same conjunction.

Disjoin A conjunction node immediately under a disjunction can be removed. This differs from Remove Conjunct in that the conjuncts are not removed, but made into disjuncts of the conjunction's parent disjunction.

Extract Conjunction A conjunction disjunct of a disjunction with a disjunction proper ancestor may be moved to be a child of that disjunction ancestor.

Embed Disjunction This operation pushes a disjunction conjunct into a conjunction descendant of a sibling conjunct. It does not apply to DNF (without first reformulating) but does apply in more general settings. The user initiates the operation, specifying the object disjunction and target conjunction, both available in the substructure as descendants of the disjunction's parent conjunction.

The path from the target to the parent conjunction can be passed to the server to help it validate the operation. In the local DAG, the object is moved to become a child of the target. In the global DAG, some embodiments may create a movement arc between them, pointing to the locus problem.

Embodiments may need to adjust the operations depending on the form of representation of conditions. All operations, however, must serve to make the condition more specific. They must, therefore, preserve any falsity of the refined conditions when specializing (or truth of the refining conditions when generalizing).

Operations may overlap in their scope to some extent or be restricted to avoid such overlap. For example, embodiments supporting Merge Disjuncts may assume that at least one of the disjuncts being conjoined are terms since, if all were conjunctions, applying Conjoin Disjuncts and simplifying would yield the same result as under that operator, and if any were disjunctions or negations, one could simplify prior to applying the operator. Likewise, embodiments supporting Conjoin Disjuncts on conjunctions and simplifying the result need not support Merge Disjuncts. If alternation of conjunctions and disjunctions is enforced, Conjoin Disjuncts and Merge Disjuncts can be considered a single operation.

Any condition may be specified for a new data measure problem (with no ancestor with a data measure). Problems that specialize or generalize a data measure problem may define condition components or operations that similarly modify its condition. Such components or operations may be added or removed by an authorized user. Navigating to a particular data measure problem involves additively combining the various inherited components and operations from various unrelated parents to obtain a condition with which to formulate a single query for that data measure problem. Where the various operations being combined are commutative, this can be done in a straightforward manner. Conjunctions, for example, may be merged or deleted before or after being embedded in a disjunction. Where a problem has a refinement descendant with multiple refinement parents, various embodiments must either prevent users from specializing the ancestor problem's condition in a way that conflicts with the conditions of other parents of the descendant or accept that the child may be made to have an inconsistent condition. Embodiments may thus disallow modifications to a problem's condition where a refinement child exists, or a refinement descendant has multiple refinement parents, or only where the modification would conflict with other parents' conditions, or not at all.

Where an entity has multiple data measure parents, its relevant database item set should intuitively be formed by first taking an intersection of the set of items of the refined data measures, and then applying any additional conditions specific to the particular data measure. It is from that set of items that attribute values are extracted. When generalizing a data measure, the relevant set of items should be formed by first taking a union of the set of items of the refining data measures, and then applying the conditions for the particular data measure. In each case, the conditions applied are those introduced at that node or its ancestors (in the logical tree) as modified by specializing or generalizing conditions. This effect may be simulated by inheriting condition components through either path. The resulting query can be optimized by the embodiment, directly or by the data source.

An initial example DAG for representing conditions as entities associated with data measures and each other is presented in FIG. 137. It has six data measure problem nodes (80 through 85), represented as circles, predefined, with 80's condition consisting of a disjunction of two conjunctions, the first with two terms and the second with a single term. We treat the outer disjunction as implicit (as might be natural with DNF), and represent conjunctions with their standard symbol and terms with rectangles containing their content. Lower case letters represent attribute names. Arcs from the term nodes to the conjunction nodes are labeled with "c" for "construction". Node 80 is associated with the condition $((x \neq 5) \wedge (x > 3)) \vee (y = 2)$. FIG. 139 shows data measure problem 81, refining problem 80, inheriting both conjunctions. If the two terms $x \neq 5$ and $x > 3$ of the first conjunction are refined to $x > 6$ by applying Specialize Terms using the first and fifth term refinement rules above, the localized result is as in FIG. 140. Node 81 is associated with the condition $(x > 6) \vee (y = 2)$. FIG. 141 shows data measure problem 82, refining problem 81, inheriting the modified conjunctions. If the first (now trivial) conjunction $x > 6$ is dropped by applying Remove Disjunct, the localized result is as in FIG. 142, with the first conjunction replaced with a null symbol. Neither the null symbol nor the term under it would be visible to a user. The condition associated with node 82 is simply $y = 2$. If instead, we were to refine the condition for node 83 refining node 80, as in FIG. 143, similar to FIG. 139, but applied rule Add Conjunct to the second conjunction to create a new term $z \neq 3$, the localized result is as in FIG. 144. Node 83 is associated with the condition $((x \neq 5) \wedge (x > 3)) \vee ((y = 2) \wedge (z \neq 3))$. FIG. 145 shows data measure problem 84, refining problem 83, inheriting both conjunctions. If the two conjunctions are merged by applying rule Merge Disjuncts, the result is as in FIG. 147. Node 84 is associated with condition $(x \neq 5) \wedge (x > 3) \wedge (y = 2) \wedge (z \neq 3)$. Finally, data measure problem node 85 refines 82 and 84. It is assigned the condition $(x > 6) \wedge (y = 2) \wedge (z \neq 3)$, a lower bound, but not greatest lower bound of the conditions of its respective parents. We will see that the greatest lower bound, $((x \neq 5) \wedge (x > 3)) \vee ((y = 2) \wedge (z \neq 3))$, may also be attainable.

The result, globally or from node 80 after all of these operations is as in FIG. 146. Arcs between condition nodes are labeled with "R" if they are considered a restatement of a previous condition for a refining data measure (using one of the rules above). Note that in removing the first conjunction from node 82, a null conjunction node is created as a restatement of the first conjunction node with respect to node 82. Note also that in creating the additional term $z \neq 3$ in the second conjunction from node 83, there is an intermediate conjunction node that restates the parent conjunction with respect to node 83 and under which the new term is constructed. Now, navigating to any of nodes 81, 82, 83, 84, or 85, using Record Inheritance 2250, similar to that of FIG. 87, gives a localized DAG substructure as in FIG. 148, FIG. 149, FIG. 150, FIG. 151, or FIG. 152, respectively. Importantly, the condition components combined through this process match the ones that resulted from the local application of the condition refinement rules. For example, node 80 is still associated with the condition $((x \neq 5) \wedge (x > 3)) \vee (y = 2)$, which can be constructed from descendants of 80 labeled only with "c". The deleted conjunction not available at node 82 is inherited by 85 via 84, so that the condition at node 85 remains $(x \neq 5) \wedge (x > 3) \wedge (y = 2) \wedge (z \neq 3)$ Another initial example DAG is presented in FIG. 154. Here, terms are represented simply as subscripted variables and disjunctions are specified explicitly. Node 90 is associated with the condition $(t_0 \vee t_1 \vee (t_2 \wedge t_3) \vee ((t_4 \vee t_5) \wedge t_6))$. FIG. 156 shows data measure problem 91, refining problem 90, inheriting the full condition expression. If the two top-level disjunct terms $t_0$ and $t_1$ are "conjoined" to $(t_0 \wedge t_1)$ by applying Conjoin Disjuncts, the localized result is as in FIG. 157. If instead, we were to specialize the condition for node 92 refining node 90, as in FIG. 158, similar to FIG. 156, but applied rule Embed Conjunction with the first conjunction child of the top-level disjunction as source and the disjunction child of its second conjunction child as target, the localized result is as in FIG. 159. Node 92 is associated with the condition $(t_0 \vee t_1 \vee ((t_4 \vee (t_2 \wedge t_3) \vee t_5) \wedge t_6))$. Finally, data measure problem node 93 refines 91 and 92. It is also associated with the condition $((t_0 \wedge t_1) \vee ((t_4 \vee (t_2 \wedge t_3) \vee t_5) \wedge t_6))$, the GLB of the conditions of its two parents.

The result, globally or from node 90 after all of these operations is as in FIG. 160. Arcs between condition nodes are labeled with "R" if they are considered a restatement of a previous condition for a refining data measure or with "M" if they indicate a movement of the condition expression subtree rooted at the head of the arrow to the node at the tail of the arrow (using one of the rules above). Note that in creating the additional conjunction $(t_0 \wedge t_1)$ from node 91, there is an intermediate null term node (invisible to the user) that is restated with respect to node 91 by the new conjunction node. Now, navigating to node 93, using Record Inheritance 2250, similar to that of FIG. 87, gives a localized DAG as in FIG. 162.

While some embodiments may store the additional condition structure resulting from operator applications in the form of the grammars presented above in this section or a similar one, along with standard restatement and movement arcs and null nodes as outlined above, other embodiments may choose to store applications of operators, such as those presented above in this section as "Operations for specialization", more directly as condition components with arcs to their operands. In this case, condition operator application nodes also point to the problem for which they are applied and the semantics of each operator would be implemented within Record Inheritance 2250. The null node ø can be viewed as a representation of a deletion operator to a single operand. FIG. 161 is an alternate version of FIG. 160 with operator nodes. An intermediate form would treat movement itself as an operation and include three such nodes. Operations could be cascaded by pointing to such operator application nodes as operands. Chains of such operator applications can be executed by Record Inheritance 2250 to construct an expression in the chosen grammar. Multiple inheritance of solutions (i.e., relation refinesSolution being many-to-many) would then require that an ordering be imposed on the refined solutions, or preferably, that the operator applications for a refining solution not depend on the order of execution of the operator applications for the refined solutions. In the first example above, we have rule Remove Conjunct and rule Merge Disjuncts involving the same node. Somewhat counterintuitively, when, in integrating these operations as inherited by node 85, this embodiment merges a deleted conjunction, the new combined conjunction includes conjuncts of the deleted parent. It is by no means certain that a successful resolution of the conditions of the refined nodes is possible (other than with a condition that is always false).

It is possible for embodiments to obtain for nodes that specialize multiple parents, such as 85 in the example specializing nodes 82 and 84, a greatest lower bound of the conditions of the refined nodes. By marking inherited condition components and operations with the problem node they related to, embodiments can delete nodes at the condition of a specializing node only if they were deleted by all parents. Similarly, embodiments can ignore a specialization of a term if it is only by those parents that deleted the node.

A consequence of inheriting condition components is that only partial information could be available, as described above under "Leveraging Inheritance for DAG Exploration" as "not all inherited nodes would be immediately available to the user", which may not be acceptable for this purpose. Any problem with a data measure may need to have its context searched for condition definitions during the inheritance process, which in practice should not be excessive as long as root conditions are identifiable as such.

If multiple attribute extraction expressions are present, they might be displayed separately or combined/aggregated in some fashion. If one or more of the expressions is typed as a location, the remaining expressions can be presented in map form, as described below under "General Data Sets" as "Geographic data can be presented on a map". If one of the expressions is typed as a timestamp, the remaining expressions can be presented via an animation. More generally, if one or more of the expressions is a continuous quantity, the others can be presented as plots on a graph with values of those expressions as axes. Quantitative values may be subject to standard aggregations such as count, sum, average, minimum, and maximum, among others. These expressions can be used to express derived attribute values. For example, a problem might involve minimizing the income gap between two demographic groups. This can be specified and calculated as the difference between the average income of each group. The results of evaluating attribute extraction expressions are often best presented as time-based information, with various periodicities.

For embodiments that do not want to count the same items multiple times, only datasets defined at or inherited by the frontier, i.e., the set of leaves of the substructure or context trees, are relevant for aggregation, and this aggregation should be performed separately for the substructure and context trees. Even then, care may be taken to avoid double-counting the same items via multiple leaf nodes. If both the context and substructure include data measure problems, embodiments might calculate and present attribute values related to items indicated by substructure frontier, items indicated by the context frontier, the difference between those indicated by the context frontier and those indicated by the substructure frontier, or any combination of these.

The question remains of how to combine the attribute values extracted for data measure parents, especially when they relate to different attributes. This can be done in various ways including summing or multiplying if polarities match, subtracting or dividing if they don't. Some form of weighted average may often be appropriate. Weighting coefficients may be determined automatically to normalize the effects of the various attributes on the average (perhaps by maintaining representative attribute values), set explicitly by the user, or some combination.

Whether storing a full condition with each problem or storing and inheriting condition components, we obtain a condition for each data measure problem and this is sufficient for providing the data associated with any locus node. It is possible to build out the presentation incrementally. Rather than having the client apply Record Inheritance 2250 incrementally, for example in going from FIG. 148 to FIG. 149 to FIG. 152 or from FIG. 150 to FIG. 151 to FIG. 152 in the first example above, and then interpret the results, embodiments may arrange to label the refinement associations between problems with the differences in their conditions (expressed as necessary reductions to the selected items). This labeling can be performed by the server when a refinement association is created. If each data item is labeled with the set of disjuncts that it satisfies, then if a term in a particular disjunct is specialized by a refining problem, upon expanding the substructure so as to reveal that problem, to obtain its data item set, embodiments need only consider dropping from the parent data item set entities that only satisfy that disjunct (although embodiments may recalculate for any entities that satisfy that disjunct). Similarly, upon contracting the substructure so as to hide that problem, embodiments need only consider that disjunct in deciding which additional entities to include. Data items selected for each internal node or attribute extraction results may also be maintained for internal nodes so that they can be restored quickly on contracting the substructure. Similar notions apply to exploration of the context. FIG. 153 presents a labeled global DAG for the first condition example. The application of Specialize Terms at node 81 leads to a directive to drop all items uniquely reachable from the first disjunct unless the new term is not satisfied. The application of Remove Disjunct at node 82 leads to a directive to drop all items uniquely reachable from the first disjunct without qualification. The application of Add Conjunct at node 83 leads to a directive to drop all items uniquely reachable from the second disjunct unless the new term is not satisfied. The application of Merge Disjuncts at node 84 forces embodiments to treat disjuncts as conjuncts, leading to the directive to drop all items not satisfying both disjuncts. Such labeling may be maintained as conditions of the parent are refined with respect to the child and, indeed, for other arcs to more general problems when a new one is added (by generalization or by linking existing entities). When multiple parent data measure problems are refined (as with the construction of node 85 in the example), each refinement association may be labeled with sufficient reductions of selected items to ideally yield, from each data measure problem, their greatest lower bound. In the case of additive operators, this may simply involve filling in those operations that are "missing" for any given parent. The reduction on the right corresponding to the application of Add Conjunct for $z \ne 3$ is thus copied to the left, just prior to reaching node 85. Remove Disjunct is treated differently. Since it only appears on the left and not the right and the disjunct in question was subject to merging on the right, to achieve the GLB condition the conjuncts of the deleted disjunct may be added back, and since the specialization only relates to the deleted disjunct, it need not be included. This leads to dropping without qualification those items not satisfying both $x \ne 5$ and $x > 3$.

These incremental operations could be performed either on the client or on the server, and either in response to user exploration commands or in advance of them.

As with plans, to create a refinement association between existing problems, embodiments may verify logical refinement between their conditions (in the same direction) and perhaps drop any redundant conditions of the refining problem. Others may intend that this linking make the conditions of the refined node available to the refining node (as long as they are mutually consistent). The former is more appropriate to storing full conditions with each problem, the latter to storing condition components. But where the refined problem has a data measure and the refining problem defines a new data measure, the situation is more similar to that of storing full conditions and should be handled as such.

Additional Solution Structure: Plans

Some embodiments may impose ordering on some of the problems motivated by a solution. They can be considered to be fully unordered, fully ordered, or any nesting of ordered and unordered collections. A simple grammar is as follows:

Plan|=ε|MotivatedProblem|‡(PlanList)|∥(PlanList)
PlanList|=<Plan,>⁺ Plan

Some such embodiments may imbue additional constraints to reduce the number of representations of any imposed ordering. Motivated problems might be considered to be unordered, or ordered, or any alternating nesting of ordered and unordered collections of two or more elements. A grammar is as follows:

Plan|=ε|OrderedPlan|UnorderedPlan
OrderedPlan|=‡(OrderedPlanArgs)
OrderedPlanArgs|=<UnorderedPlanOrLeaf,>⁺ UnorderedPlanOrLeaf
OrderedPlanOrLeaf|=OrderedPlan|MotivatedProblem
UnorderedPlan|=∥(UnorderedPlanArgs)
UnorderedPlanArgs|=<OrderedPlanOrLeaf,>⁺ OrderedPlanOrLeaf
UnorderedPlanOrLeaf|=UnorderedPlan|MotivatedProblem For succinctness, the above grammar is ambiguous. A standard ordering may also be imposed on UnorderedPlanArgss.

Some such embodiments may allow users to take actions that leave an OrderedPlanArgs or an UnorderedPlanArgs with fewer than two plans, violate the alternation constraint, etc. They might impose simplifying rules to restore these constraints:

‡(Plan)⇒Plan
∥(Plan)⇒Plan
‡( . . . , ‡(OrderedPlanArgs), . . . )⇒‡( . . . , OrderedPlanArgs, . . . )
∥( . . . , ∥UnorderedPlanArgs), . . . )⇒∥( . . . , UnorderedPlanArgs, . . . )
‡( . . . , ε, . . . )⇒‡( . . . , . . . )
∥( . . . , ε, . . . )⇒∥( . . . , . . . )
∥( . . . , MotivatedProblem₁, . . . , MotivatedProblem₂, . . . )⇒∥( . . . , MotivatedProblem₂, . . . , . . . )
∥( . . . , MotivatedProblem₂, . . . , MotivatedProblem₁, . . . )⇒∥( . . . , MotivatedProblem₂, . . . , . . . )

where in the last two rules, MotivatedProblem₂ refines MotivatedProblem₁. These rules remove singleton collections, nonalternating nested collections, embedded empty plans, and redundant motivated problems. Additional rules might sort the UnorderedPlanArgs using the standard ordering as described above.

It should be noted that associating a time estimate with each solution selected for implementation to solve a MotivatedProblem makes this structure capable of representing a Gantt chart and may be displayed as such.

If a solution has no explicit plan, it is assumed to have an UnorderedPlan of its motivated problems.

If a solution has a plan, for various embodiments a refining solution will have a plan at least as specific, e.g., with at least the motivated problems of the refined solution and at least the same ordering constraints, and perhaps more.

There is some similarity between plans and the situation with conditions described under "Additional Problem Structure: Data Measures", and many of the same design options are relevant. Unlike plans, conditions do not have any ordering. The extensive examples in that section should provide intuition regarding plans.

Plans may be a special kind of solution that refines more general solutions, or any solution may have the potential to add a plan.

When refining multiple problems, embodiments may likely check for consistency of their plans. Plans are inconsistent if one plan requires a particular motivated problem to precede another and another plan requires that motivated problem to follow the other. When augmenting the DAG with a new solution node that specializes or generalizes existing solution nodes, an embodiment should ideally provide the GLB or LUB respectively of the plans of the augmented solution nodes, allowing the user to edit them to be more or less strict, respectively. The GLB of multiple plans will for some embodiments have the union of their motivated problems (but dropping more refined motivated problems in place of motivated problems that refine them) and the union of the ordering constraints over those problems. This can be accomplished by collecting all elements of unordered plans along with the ordered plans themselves in a single unordered plan. The representation can then be improved by factoring out common prefixes or suffixes. Thus, given a plan ∥(‡(A,K,X),‡(B,K,Y)), one can obtain ‡(∥(A,B),K,∥(X,Y)), which can be simplified further if A and B, or X and Y, are in a refinement relation. Given a plan ∥(‡(A,K,W,X), ‡(B,C,K,Y)), one can obtain ‡(∥(A, ‡(B, C)), K, ∥(‡((W,X),Y)). In dropping refined motivated problems in place of motivated problems that refine them, there is not much harm in performing the refinement checks locally and incrementally enhancing them as deferred problem nodes are expanded. The LUB of multiple plans will for some embodiments have the intersection of their motivated problems (but dropping refining motivated problems in place of motivated problems that they refine) and the intersection of the ordering constraints over those problems. The above treats unordered plans implicitly as conjunctions, but some embodiments may gain greater precision by supporting explicitly both conjunctions and disjunctions, much as with conditions as described above under "Additional Problem Structure: Data Measures" as "forming a term for the GLB as X∧X' or the LUB as X∨X' . . . ", but with conjunctions specializing disjunctions and ordered plans specializing conjunctions.

One possibility is to store the full plan with each solution, similar to the situation with conditions above as described above under "Additional Problem Structure: Data Measures" as "store the full condition with each data measure problem".

An alternative is to treat plan components as entities, related to each other and to solutions, and subject to inheritance. Entities may thus include ordered and unordered collections and motivated problems. Various kinds of relations might be supported on plan components: component relations, indicating the grammatical structure as suggested above; a refinement relation, corresponding to specialization/generalization of the plan components; a movement relation, indicating that a subtree is repositioned under a target node in the refined plan, and an operand relation, a generalization of the component relation indicating that particular plan components can be manipulated in some way to yield some not clearly identified plan component. The plan at a particular solution could be constructed by following its component descendants. All plan refinement associations should be considered to be restatements (as described under in-place iteration), in that inherited refined plans should not be displayed if the refining plan is displayed and in that the refining plan need not be displayed if it is for an unrelated solution. Some embodiments may integrate plan information with the local DAG of which the solution is the locus. In this case, it may be natural to display restating plan components, movement associations, and operator applications that relate to an ancestor or descendant of the locus solution node. Some embodiments may separate the local solution DAG from the local plan DAG, with the latter containing only the components of the plan for the locus of the local solution DAG.

As an implicit GLB is performed upon the plans of approaches that are collectively refined, specializing operations may be signaled by markers placed in the structure of plans. Embodiments may provide users with particular operations for manipulating plans that impose additional structure and thus serve to refine the solution:

Merge Orderings This can take the form of a user refining inherited ordered plans (initiating the operation from a base node and selecting others) in the same unordered plan Unlike in the corresponding operation Merge Disjuncts for conditions, the user may provide additional information regarding the relative ordering of elements from alternative ordered plans. Embodiments might, for example, allow a user to drag into positions between the elements of the base node ordered plan, each element of the remaining ordered plans. In the local DAG, the elements of the selected ordered plans are moved to their appropriate positions in the base node ordered plan, avoiding duplicates, and the selected ordered plans removed. In the global DAG, a new ordered plan restates each of those inherited ones, so that it can inherit their descendants. A special form of restatement is required in this case to provide the additional ordering information, for example the position in the larger, refining ordered plan of each element of the refined ordered plan.

Add Unordered Leaf If the plan structure is empty, replace it with the given problem. If the plan structure is a MotivatedProblem or an OrderedPlan, replace it with a new UnorderedPlan containing both elements. If the plan structure is an UnorderedPlan, simply place the new term as a construction under its parent in the localized DAG, but arrange that in the global DAG, the term be placed as a construction under a new ordered plan that restates the original with respect to the locus problem. This new ordered plan may operate over the new term in addition to inheriting the operands of its parent.

Specialize Motivated Problem This operation need not be made explicit as it is already available. The user need merely restate the motivated problem as inherited by the refining solution.

Impose Order This operation imposes an ordering on elements of an UnorderedPlan. A user might initiate this operation after selecting the children of an unordered plan to order. This can be formulated as allowing the user to view the existing unordered list and a new, empty, ordered list, and drag/drop, copying selected elements from the first list into the second. The elements might be inserted into the second list in the order copied, or the user might drag them into particular positions within the new list. Alternatively, the user might view only the new list with all elements already copied in, and be permitted to swap or otherwise reorder elements, and to delete elements. In any case, some embodiments may, in the local DAG, replace certain elements with a single OrderedPlan of those elements, which may require simplification. In the global DAG, the OrderedPlan may be created as a construction under a new UnorderedPlan that restates the original with respect to the locus problem (as with AddUnorderedLeaf), and then "movement" arcs created from the new OrderedPlan up to elements of the UnorderedPlan, to indicate that they are considered to move back down to the OrderedPlan. This may be more straightforward for embodiments that store the locus solution with respect to which the operation is performed on the movement arc, as suggested parenthetically for restatement refinements above under "In-place, Iterating DAG Augmentation" as "storing on each restatement the previously iterated augmentation upon which it is built".

Embed Order This operation takes some existing ordering and pushes it deeper into the structure. This can be formulated as follows. The user might select as object an OrderedPlan and then select as target an UnorderedPlan, both available in the substructure as descendants of the ordered plan's parent unordered plan (assuming alternation of ordered and unordered plans, otherwise the nearest unordered plan ancestor), and with the target not contained within the selected object. In the local DAG, the object is moved to become a child of the target. In the global DAG, some embodiments may create a movement arc between them, pointing to the locus solution. If the constraints on the target selection are loosened to no longer require that the target be descended from the UnorderedPlan positioned as the object's parent, the operation may no longer serve as a solution refinement.

The latter two operations introduce "movement" arcs, as described above under "Additional Problem Structure: Data Measures" as "movement arcs may be treated similar to restatements . . . ".

Corresponding generalization operations would be:

Split Ordering The user might require that not elements of an ordered plan must be ordered with respect to each other, but rather that various combinations of them must be ordered. This can be formulated as allowing a user to partition the set of elements of the ordered plan to be generalized.

Remove Plan This could be initiated from the plan to be removed.

Generalize Motivated Problem Restating generalization of problems is already supported (see "Generalization, Restatements, and Iteration").

Forget Order An ordered plan node immediately under an unordered plan can be removed. This differs from Remove Plan in that the ordered elements are not removed, but made into elements of the ordered plan's parent unordered plan.

Extract Order An ordered plan within an unordered plan that has an unordered plan proper ancestor may be moved to be a child of that unordered plan ancestor.

Embodiments may need to adjust the operations depending on the form of representation of plans. All operations, however, must serve to make the plan more specific. They must, therefore, preserve any failure of motivated problems to meet ordering constraints.

Operations may overlap in their scope to some extent or be restricted to avoid such overlap. For example, embodiments supporting Merge Orderings may assume that at least one of the unordered plans being ordered are terms since, if all were ordered plans, applying Impose Order and simplifying would yield the same result as under that operator, and if any were unordered plans, one could simplify prior to applying the operator. Likewise, embodiments supporting Impose Order on ordered plans and simplifying the result need not support Merge Orderings. If alternation of ordered and unordered plans is enforced, Impose Order and Merge Orderings can be considered a single operation.

Any plan may be specified for a solution with no ancestor having a plan. Solutions that specialize or generalize a solution with a plan may define condition components or operations that similarly modify its plan. Navigating to a particular solution involves additively combining the various inherited components and operations to obtain a plan for that solution. Where the various operations being combined are commutative, this can be done in a straightforward manner. Ordered plans, for example, may be merged before or after being embedded in an unordered plan. Where a solution has a refinement descendant with multiple refinement parents, various embodiments must either prevent users from specializing the ancestor solution's plan in a way that conflicts with the plans of other parents of the descendant or accept that the child may be made to have an inconsistent plan. Embodiments may thus disallow modifications to a solution's plan where a refinement child exists, or a refinement descendant has multiple refinement parents, or only where the modification would conflict with other parents' plans, or not at all.

It may be preferred that there be only one way of constructing any grammar object. This is not an issue for operations at the user-interface level, so those operations may be more expressive, and translated down to the particular operations for manipulating plans presented above in this section. For example, it may be possible through the user interface to add a leaf directly to a position in an OrderedPlanArgs.

While some embodiments may store the additional plan structure resulting from operator applications in the form of the grammars presented above in this section or a similar one, along with standard restatement and movement arcs and null nodes as outlined above, other embodiments may choose to store applications of operators, such as those presented above in this section as "particular operations for manipulating plans", more directly as plan components with arcs to their operands. In this case, plan operator application nodes also point to the solution for which they are applied and the semantics of each operator would be implemented within Record Inheritance 2250. The null node ø can be viewed as a representation of a deletion operator to a single operand. Operations could be cascaded by pointing to such operator application nodes as operands. Chains of such inherited operator applications can be executed by Record Inheritance 2250 to construct an expression in the chosen grammar. Multiple inheritance of solutions (i.e., relation refinesSolution being many-to-many) would then require that an ordering be imposed on the refined solutions, or preferably, that the operator applications for a refining solution not depend on the order of execution of the operator applications for the refined solutions. Some embodiments may find that standardizing the ordering of UnorderedPlanArgs is helpful in accomplishing this. It is by no means certain that a successful resolution of the plans of the refined nodes is possible. To take a simple case, where alternate branches impose different orderings on a two-element unordered plan, they cannot be merged.

A consequence of inheriting plan components is that only partial information could be available, as described above under "Leveraging Inheritance for DAG Exploration" as "not all inherited nodes would be immediately available to the user", which is likely not acceptable for this purpose. Any solution with a plan may need to have its context searched for plan definitions during the inheritance process, which in practice should not be excessive as long as root plans are identifiable as such.

Embodiments supporting solution refinement may require that the all refining solutions' structure be consistent with that of the refined solutions. If a refining solution already imposes structure that duplicates that being added for the refined solution, the refining structure can be deleted as superfluous, or it can remain to become effective if the structure is ever removed from the refined solution. If a refining solution already imposes structure that is inconsistent with that being added for the refined solution, the operation may be prohibited or the refining solution may be disassociated from the refined solution (and any intermediate descendants) and considered to refine any parents of those refined solutions.

Other Topics
Supporting Social Innovation
Invitations and Applications to Connect Project augmentations performed on a project create "strong" associations between the new entity and the old one. The suggestion is assumed to be made available to the administrator of the augmented project, although the contributor may or may not be given an administrative role over the new project in this process.

Some embodiments may also support "weak" associations between existing projects. These can use the mechanisms described above under "DAG Refinement of Existing Entities" as "adding a refinement association with respect to a cross-kind augmentation". A checked-in project administrator may have options (e.g., via their context menu) to invite a more specific project (based on the project content) to refine it or to apply to refine a more general project (again based on the project content). Crucially, such weak refinements are capable of supporting inheritance of solutions or other project content.

These variations in strength of association may relate not only to projects but other kinds of entities as well. Embodiments may, for example, support strong "refinement" associations between users within an organization, representing for example reporting relationships or mentoring, and weak associations between users between organizations, representing for example mentoring only.

The system can recommend (as under "Recommendations") entities for consideration for weak associations.

In some contexts, a project administrator or other user may benefit from a "birds-eye" view of the connections between organizations. Areas of organizational activity can be highlighted by focusing on the weak links between organizations and condensing sequences of strong links Such regions can additionally or alternatively be labeled with the organization and/or coded by color or other visual attribute and/or have a border mark an organizational boundary between entities associated with different organizations. Entities inherited from another organization could then appear as "islands" within the region of the inheriting organization.

This functionality may leverage functionality already described to support sharing between organizations. Here, though, a second form of relation is introduced, and embodiments need to be aware of which they are traversing. The server, in creating an "ecosystem" DAG, can, for example, skip over all strong links from the locus nodes except those leading to nodes with a weak link to other projects. Then, likewise, it can continue condensing to any subsequent weak links. Such "skipping" should take place when considering parent or child entities in Reduce DAG 0210 and Record Inheritance 2250. These ecosystem-oriented DAGs can be passed to the client along with the standard DAGs.

In some contexts, only entities related via strong associations may be visible. In others, entities related via any association may be visible. Embodiments may include entities connected by weak links and/or entities inherited through weak links in the standard DAG as well as the ecosystem DAG, or only in the ecosystem DAG. If the former, the user may be able to control visibility of entities connected by weak links in the standard DAG via options similar to those described under "DAG Filtering".

FIG. 163 through FIG. 171 present an example of this functionality. FIG. 163 shows a project screen for a problem "How can we establish self-sufficiency among people?", with a single solution listed, "Let's teach them to run businesses!". FIG. 164 shows a user screen for another problem, "How can we establish self-sufficiency among single mothers?", created by a different user, Joanna Doe, who has checked in as administrator (a relevant example of check-ins involving FIG. 229 through FIG. 231 is presented below under "Project Check-ins"). FIG. 165 shows Joanna navigating to the first project screen and applying to specialize that challenge with her own. After her application is accepted (via the online system or link in an email), the view from the dependencies tab of her project screen will for this embodiment be as in FIG. 166, with the new generalizing problem in the context and its solution inherited into the substructure. Joanna jumps on this idea, and builds out the structure as in FIG. 167, culminating with "How can we establish connection among single mothers starting businesses?". Now, another individual, Jessica, has begun considering a broader problem, "How can we establish connection among single mothers with common interests?". FIG. 168 shows her user screen, with her checked in as administrator. In FIG. 169, we have Jessica's project inviting Joanna's to specialize it. After the invitation is accepted, FIG. 170 shows the dependencies tab for the specializing problem, with the context reaching out to one and eventually the other external generalizing problem. The view from the ecosystem tab is in FIG. 171. Notice that only the entities bordering on other organizations appear. Other embodiments might indicate where intermediate entities have been elided. Here, the regions corresponding to the same organization are coded with the same color.

Recommendations

The system can recommend projects to users, users to projects, projects to each other (problems to problems and solutions to solutions), or (in the case of user associations representing mentorship) users to each other. A recommendation to a project would be shown to an administrator of that project when they are checked-in to the project.

Consider first, as an example, recommending projects to people (for a particular role). This can be done by finding similar projects, then considering who they have in that role. It can also be done by seeing who else this project has in that role (if anybody) and then finding similar people. Embodiments might make use of both sources of recommendations, as well as those obtained by applying the similarity matrices for both the project and the individual. The situation is similar for recommending an entity of any $kind_2$ to an entity of $kind_1$ (where they may be the same kind). If they are in fact the same kind, then embodiments may consider directional refinement relationships (the direction depending on the direction for which we want to recommend) in place of the cross-kind relationship. This process is presented in FIG. 172. Some embodiments, though, might simply recommend similar entities if both kinds are the same.

Rather than selecting from the three methods just mentioned for building a ranked list of projects, some embodiments may apply all three and apply an initially arbitrary weighting based on which method was used (presumably penalizing the application of both similarity matrices), prior to merging the results.

Rather than restricting to just one role, it is possible to consider other roles as well, each likewise with a lower (but otherwise arbitrary) weighting.

Especially in the case of search results, but for recommendations as well, once the results list is obtained, there may be benefit in filtering out lower-ranked projects related by refinement.

Otherwise, the suggested procedure is relatively standard, with a few enhancements. In either method above, finding similar entities involves building a vector and applying a similarity matrix. A similarity matrix is a mapping from a pair of entities of the same kind that returns an estimate of how similar they are. Consider users similar if they have similar biographies or contribute to similar projects. Consider projects similar if they have similar names or descriptions or are contributed to by similar users. It may be useful to represent similarity matrices using a vector of data structures such as balanced trees that support retrieving an ordered list of similar entities from any given entity.

The similarity matrices may be constructed from feature vectors that can be generated for each entity. Let each similarity matrix cell value be a measure of the similarity between positive occurrences in feature vectors that both filtered and are adjusted by "surprise" value (so we want to recommend the most surprisingly similar projects), calculated as a dotted product divided by the product of the square roots of the number of non-zero entries in each. This calculation over feature vectors corresponds to the cosine of the angle between the two vectors and is a standard distance measure. Surprise value can be measured as a TF.IDF score. The only modification to standard practice there is treating it as a linear adjustment in addition to as a threshold.

For a problem or solution, the features can be words, required skills (problems do not have required skills, but as described below we can consider related solutions), contributors, and behaviors. For a user, the features can be words, skill proficiencies, projects contributed to, and behaviors. The surprise element corresponds to how rarely the feature values occur.

The value in the feature vector of a word feature for a project is a measure of how often (at what rate) it appears in the name and description and in the names and descriptions of ancestor and descendant projects, all relative to its rate of appearance in general usage or across the server database, with weighting factors for, for example, name versus description and each of several levels of ancestor and descendants that again, are initially arbitrary, but read from a file. Later, a higher-level process can fine-tune the weighting factors by testing the recommender with modified values. The value of a contributor feature for a project is the role (if any) of the contributor on the project or on ancestor or descendant projects, adjusted by the scarcity of that contributor having such a role, or any role, on any projects, and again with weighting factors for each of several levels of ancestors and descendants. The value of a skill feature is calculated similarly to a contributor feature (without any notion of role).

The values of user features would be calculated similarly.

This approach incorporates collaborative filtering as well as content-based recommendations.

We can improve recommendation quality by, for example for projects, saying that the contributor feature is the role (if any) of the contributor or similar contributors on the project, along with degree of similarity. Note that the definitions are then circular, but we can use dynamic programming to calculate entity features incrementally.

Features can also include system behaviors, calculated by how common and recent they are for that entity.

As system behaviors take place, the feature vectors and similarity matrices should be recalculated incrementally.

Similarity matrices are generally symmetric, but some embodiments could generalize them to distinguish based on the direction of recommendation.

In the particular case of recommending people and solutions to each other, embodiments may restrict recommendations to users and solutions such that the users have sufficient skills to qualify for the requirements of the solution. Although some correspondence is certainly appropriate, this filtering may not be appropriate, since, generally speaking, the skill requirements of a solution can be met by a combination of users. For embodiments where skill requirements are tied to resource requirements (as described below under "Resources" as "skill requirements may be associated . . . with . . . human resource requirements"), recommendations could be modified to recommend individuals to resource requirements, the feature vector of which would share much with the vector of the underlying solution but might also reflect, for example, the presence of words in a resource requirement description.

In including skills of dependent projects in the feature vectors of users and projects, we enable the tuning of weighting factors in recommendation algorithm to prefer recommendations of individuals to higher-level projects who are proficient not just in the skills required by that project, but in the refining skills required by multiple dependent lower-level projects.

Secondary DAGs

Embodiments may distinguish between a primary localized DAG, providing information about ancestors and descendants of the node or nodes to which the user has navigated, and secondary DAGs, providing perhaps more limited information about the ancestors and descendants of entities related to any entity represented in the primary DAG. Such embodiments might store lists of references to directly related entities with each entity in the primary localized DAG. These references could be used by the client to access the secondary DAGs (also provided by the server), entities of which would be related by a refinement relation.

The server could use a multiple-entity extension of Reduce DAG 0210 as discussed above under "Multiple Cross-kind Augmentation" as "$Dag_E|^1$" to build a secondary DAG of entities related by various selected relations to entities related by the appropriate cross-kind relation to the locus entities of the primary DAG, to which the user has navigated.

A basic approach is to have the secondary DAG include nodes reachable by refinement from its locus nodes, which are set to those associated by the cross-kind relation with the locus nodes of the primary DAG.

Embodiments may wish to display the secondary DAGs based on what portion of the primary DAG is open, as a form of aggregation, as described under "A Method for Exploration of Hierarchical Structures and Representation of Context Thereof". Active, overall, and constituent aggregations could be maintained.

One way of achieving this is to have the secondary DAG include nodes reachable by refinement from its locus nodes, which are set to those associated by the cross-kind relation with not just the locus nodes of the primary DAG, but all nodes currently visible in the primary DAG. As the primary DAG is expanded, locus nodes are added to the secondary DAG and as it is contracted they are removed.

This could be implemented by the server sending the full secondary DAG (assuming full expansion of the primary DAG) to the client, which would be responsible for incrementally localizing it to the state of expansion of the primary DAG. Thus, the client would modify both the secondary local DAGs and its associated visual presentation More scalably, the client could request additional sub-DAGs as necessary. To avoid resending common portions of the DAG multiple times, the server could track which nodes and edges were already transmitted.

Another way of displaying the secondary DAGs based on what portion of the primary DAG is open is to have the secondary DAG show refinement connections between entities related to those represented in the primary DAG. Locus nodes of the secondary DAG are fixed as entities related by the appropriate cross-kind relation to the locus nodes of the primary DAG. As the primary DAG is explored, entities accessible in the secondary DAG grow and shrink such that they include the entities related to those open in the primary DAG. This can be implemented by placing a binary indicator on each element of the secondary DAG expressing whether or not it is currently accessible, and only considering accessible nodes in determining the children of a node in a logical tree.

As primary DAG folders are opened, embodiments might augment the accessible portion of the active secondary DAG with entities related to those just revealed, but not already accessible in the secondary DAG. But as primary DAG folders are closed, an embodiment would not know whether the entities related to those being hidden are also referred to by other entities still visible, so it might need to recompute the accessible portions of the secondary DAG.

To handle this efficiently, embodiments might maintain, for each secondary entity, primary entities to which it is related by the appropriate relation. As primary DAG folders are closed, retract from the accessible portion of the secondary DAG information about related entities no longer accessible via direct associations from remaining open primary DAG nodes.

For example, consider that various solutions require skills, formalized above under "Project Management Entities and Relationships Including Separation of Problem and Solution Spaces" as directlyRequiredBy. Such skills might themselves be related by a subskill relation (formalized as refinesSkill), with more general solutions requiring more general skills. Rather than (or in addition to) showing those skills as part of primary project DAG, embodiments may present a secondary DAG highlighting those skills required by solutions that are open in the primary DAG, either by restricting the secondary DAG to those entities or by treating those entities as locus nodes.

As another example, if the primary DAG is representing the organizational hierarchy, one could view the skill proficiencies within various regions of the hierarchy and explore the subskill relationships among them. Or conversely, if the primary DAG is representing the skill hierarchy, for the skills within various regions of the hierarchy one could view either projects requiring those skills or users proficient in those skills and explore relationships among them.

Resources

Embodiments may associate types of resource requirements with solutions. Resources may be human, bureaucratic, or of other customizable kinds such as equipment, computer software, or chemical or biological solutions. Embodiments may support the assignment (allocation) of resources to a solution in order to address its requirements.

A user may then be assigned to a solution as a human resource. For such embodiments, the assigned user would take on the role a collaborator. Cash can be considered a resource, as provided by donors or investors (described below under "Contributions and Disbursements" as "Some embodiments may support contribution of funds") and transferred within a project (as described under "Budgeting Support").

For embodiments only supporting human resources (as opposed to other resources), the kind of resource may be implicit and only the number of positions relevant. For many embodiments, skill requirements may serve as a resource type for human resources. In this case, skill requirements may be associated, not with an entire solution as described above, but with each of its human resource requirements. For a computer program, resource requirements may take the form of a type, UML diagram, or other program specification. Types of molecular resources may take the form of a condensed formula (chemical formula), including non-stoichiometric formula and notations for repeating units in polymer and charge on ions; various forms of structural formula (molecular graphs), including Lewis structures, skeletal formula, and stereochemical formula; molecular orbital diagrams (valency interaction formula), etc. Or building on these, they might include solutions containing various components in particular concentration ranges.

Resource requirements could be specified as a bag, e.g., as a set of resource types, each tagged with the quantity required. For human resource requirements, the quantity might be in units of full-time equivalents (FTEs).

A refinement of a solution may have resource requirements that extend or specialize those of the refined solution. In the case of a human resource requirement, a refining solution may require a human resource with additional skills (not required for the refined solution), subskills of those skills required for the refined solution, and/or skills at greater proficiency than required for the refined solution. UML diagrams could be specialized, for example, with additional subclasses or methods. Less explicit molecular specifications could be specialized by consistent, more explicit specifications.

Resources allocated to a solution may be allocated in turn to lower-level solutions, e.g., solutions of component problems, or their lower-level solutions (perhaps only those that have been selected for implementation, as described below under "Associating a State Machine/Bayesian Network With Each Node in a Refinement Hierarchy" as "selected for implementation") addressing the problems motivated by that solution. If plans are supported as under "Additional Solution Structure: Plans", then the initial assignment of resources may be constrained such that the same resource can be assigned to solutions of problems that must be addressed in sequence, but not to those that may be addressed in parallel. Once a solution is completed (as described below under "Associating a State Machine/Bayesian Network With Each Node in a Refinement Hierarchy" as "completed"), however, its resources are released for assignment to other solutions.

Embodiments may, however, support declaration of some resource types as consumable, such that those resources would not be released after completion of solution implementation. While software programs are generally not considered consumable, chemical or biological solutions may well be. Consumable resources can be used to represent resource transformations that may occur in the process of implementing solutions. Experience gained by project collaborators during solution implementation could even be represented as an increase in the skills of those human resources.

The process of allocating resources from higher-level to lower-level solutions can be automated somewhat by embodiments that support associating a resource requirement of a higher-level solution with a consistent and potentially more general resource requirement of a solution to a component problem of that higher-level solution, to indicate that the resource should be made available for implementing that solution.

Resource requirement types and available resource types can be presented as auxiliary project information, as described under "Auxiliary Information and Aggregations". The collective resource requirements of a solution with a plan can be calculated by an embodiment from the structure of that plan. Embodiments might distinguish the ideal requirements, which would allow all parallel operations to occur simultaneously, with the minimal requirements, which would in some cases force an ordering even among parallel components due to resource bottlenecks. In either case, the resource requirements of component problems in a sequence might be calculated as the GLB of the requirements of the solutions to those problems, e.g., resource types specifying the least requirements capable of satisfying the selected (for implementation) solutions of each sequent plan. The minimal resource requirements of component problems in parallel might likewise be calculated as the GLB of the requirements of the selected solutions to those problems, while the ideal requirements might be calculated as the sum of the requirements of the selected solutions to those problems, e.g., resource types specifying all of the selected solutions of each disjunct plan. The first calculation could separate connected components in the DAG of required resource types and their refinement relation, make each a required resource with type equal to the GLB of the required resource types in the full resource type hierarchy, but this might be too exacting. Instead, some embodiments would separate chains of related (by refinement) resource types and make each a required resource with type the lowermost element of that chain. The second calculation (ideal requirements for components in parallel) could be calculated by taking a bag union of the disjunct resource requirements, summing the quantities for identical resource types. If a solution has no plan, parallel treatment of the component problems is assumed.

In setting the resource requirements of a solution, embodiments might require at least sufficient resources to satisfy the solution's plan.

Embodiments may also associate resource types (for some embodiments a single resource type) with a problem to indicate, for example, the expectation that a solution to the problem will generate those resources. In this case, the completion of any solution to that problem can be assumed to generate a resource with the associated type. If the problem exists as a step in a sequence (including multiple nested sequences), then the generated resource can be made available for assignment to solutions of subsequent problems. Thus, the resource types of component problems of solutions to a larger problem can be viewed as specifications of intermediate results in generating the resource whose type is associated with that larger problem. Embodiments may support associating a resource generation expectation of a component problem of a solution to a higher-level problem with a consistent and potentially more general resource generation expectation of that higher-level problem, to indicate, for example, that the resource will be made available for satisfying the higher-level problem's resource generation expectation.

Similarly, embodiments may support associating a generated resource type of a component problem of a solution with a consistent and potentially more general resource requirement type of a solution to a subsequent component problem. In this case, the generated resources would need to be taken into account in limiting the total resources required, as calculated above in this section as "The collective resource requirements of a solution with a plan can be calculated . . . ". In particular, the requirements could be signed, with (arbitrarily) negative requirements corresponding to resource generation expectations exceeding resource requirements. Calculation of resource requirements of sequences would be potentially reduced to multiple binary calculations, with any resource generation expectations serving to eliminate any requirements that they might satisfy, or else are recorded as negative requirements that can be carried forward to reduce subsequent resource requirements. Calculation of minimal requirements of parallel plans would be as before, except that the resource requirements would be signed with no cancellation allowed. In calculation of ideal requirements of parallel plans, an ordering should be imposed that delays disjunct plans with requirements that might be satisfied by resource generation expectations of other disjunct plans.

Some embodiments may declare that each of some or all resource requirements of a solution and resources expected to be generated for a problem present one additional problem for their installation and another for their dismantling (although dismantling may be trivial or omitted), with these problems determined at least in part by the type of resource involved. Installation of a human resource may involve hiring and/or training. Installation of a software resource may involve programming and/or configuration. Molecular resources may be produced by particular chemical reactions. Until resources are assigned and installed, solutions of the motivated problems are not implementable. Until resources are dismantled, solutions of the motivated problems are not completed. Other embodiments may require such installation and dismantling problems to be specified explicitly as any other component problems of the higher-level solution.

Adding Assumptions

In a twist on generalization, it is often the case that one notices that a solution is not quite as general as presented, in other words that there are unmentioned assumptions of the problem that it claims to solve. Embodiments may allow a user to identify assumptions of a solution, which can be treated as refinements of the problem that it addresses, such that after the operation, the solution is made to solve the refined problem.

Mutually Exclusive Refinements

In some cases, two or more specializations are independent and thus potentially overlapping in scope. In others, they are orthogonal and thus discrete. For example, specializations of a problem by distinct geographic areas could safely be considered mutually exclusive. By supporting the user in specifying such relationships, it is possible to restrict the inheritance of, taking problems and solutions for example, a solution to the parent problem that refines one of the mutually exclusive siblings solutions by any other such sibling, as is suggested more generally above under "In-place, Iterating DAG Augmentation" as "restatements can also form a basis for controlling access". It is also possible to support mutually exclusive refinements of solutions, skills, etc. Some embodiments may provide a mechanism for marking an entity such that all lower-level refinements of the same kind are mutually exclusive.

Strict Refinement Embodiments

Some embodiments may differ from the presentation above in requiring that substructures of various types of refining nodes be obtainable only by inheritance or refinement from substructures of the refined nodes and prohibit such substructures from being introduced directly into the refining nodes. In particular, having any problems motivated by refining solutions refine problems motivated by refined solutions leads to a notion of solution refinement closer to that of theoretical computer science, as opposed to the approach presented above, which is more similar to the way classes are extended in modern programming languages. It is also possible to have any solutions addressing refining problems refine solutions addressing refined problems.

Associating a State Machine/Bayesian Network with Each Node in a Refinement Hierarchy One might consider a state machine representation of solution status, with states for the various possible status values, corresponding to either the level of development of solution implementation or the level of authorization for proceeding with such implementation. For example, classic status values for software project iterations include requirements analysis, design, coding, and system testing. Status values for authorization could include various stages of approvals or evaluations of feasibility. These could be represented in separate state machines or a single state machine. A general list of statuses would be "open", "not being considered", "selected for implementation", and within the latter, "not yet started", "resources being developed", "being implemented", "resources being dismantled", and "completed".

Given a state of implementation/approvals that a solution has experienced, one can consider the probability of various additional processes that might be applied next to lead to a new status. Machine learning approaches can be used to impose a graph structure on statistical data concerning how solutions progress from one status to another. Such statistical data can take into account various characteristics of the problem or solution. One such approach is that of Rebane, G. & Pearl, J., "The Recovery of Causal Poly-trees from Statistical Data", in Proceedings, 3rd Workshop on Uncertainty in AI, (Seattle, Wash.) pages 222-228, 1987. Such approaches are among ways of "training" the network to offer appropriate transitions among states.

A network that has been trained for solutions with particular characteristics may be used as a starting point for solutions with more specific subcharacteristics, e.g., solutions that receive values for particular attributes that specialize those for which the network was trained. Such networks can then evolve separately.

Similar techniques can be applied to problems, if they are to pass among various statuses.

Our refinement hierarchies of problems and solutions can be used as a framework for organizing various state machines defining how each solution in the hierarchy is to pass from one status to another. State machines associated with problems can apply to all solutions that address those problems. As one descends a refinement hierarchy of problems, training data may be segregated between various child problems at each level, and thus a different state machine derived. Learning can thus be propagated downward through the refinement hierarchy.

Training data may take the form of asking users what next status is appropriate for a given solution. Alternatively, it might take the form of asking users what previous status would have been appropriate for a given solution (for example, that a prototype should have been reviewed by potential users).

Regardless of the time direction for which appropriate transition data is collected, embodiments may choose to also ask why the suggested state transition is or would have been appropriate. The answer could be the basis of a signal that could trigger a transition in a revised state machine (for example, because the implementation effort was projected to require more than 40 man-hours).

Information can potentially also be propagated upward through the hierarchy. For example, if a transition is found to be appropriate for solutions of a given problem, embodiments might ask sibling problems (under any parent) about whether the transition is appropriate there as well (this might require also establishing certain states in the sibling problems). If the transition continues to be appropriate for solutions of sibling problems, we can suggest it for solutions to that parent problem. This strategy can be used for propagating any learning upward through a refinement hierarchy, not just related to problem hierarchies or state machines.

Alternatively, state machines of refining problems can override those of the refined problem by any other means, such as explicit editing by a project administrator.

Moreover, the hierarchy of solutions can be associated with a hierarchical state machine, with hierarchically nested states whereby a solution in a nested state is also in the surrounding states.

Such hierarchical state machines may be applied such that more deeply nested states that apply to a solution get first chance to define how various input signals (such as successes or failures in authorization, implementation, testing, budget, etc.) are handled.

Alternatively, and preferably, hierarchical state machines may be applied such that new signals relate to deeper levels of hierarchy, and that those new signals determine transitions between substates of the state at the higher level.

Since the problem and solution hierarchies are closely related (e.g., by the correspondence constraints under "Explicit DAG Augmentation by Specialization/Multiple simultaneous refinement" and "DAG Generalization"), refined solutions would naturally be subject to the state machine modifications imposed by refined problems. For consistency and continuity, some embodiments may thus restrict state machine modifications for refining problems to impose additional lower layers of detail on states that exist for the refined problem.

Because state machines and additional layers of state machines can be added while solutions exist, a state machine at any level should have a designated default start state. Any new or existing solutions are placed in the default start state at the top level machine, or at a lower level machine when they enter the appropriate state at the higher level. No end state is needed, but any number of end states can be created by being defined with no outgoing arcs.

Any particular solution can be transitioned between states via the user interface, or particular transitions can be associated with rules that are applied automatically. Managerial approvals or disapprovals would be appropriate for the former treatment, while solutions being over-budget or past deadline would be examples of candidates for the latter.

FIG. 173 shows a possible user interface for associating state machines with problems. The context menu for a problem, in addition to options for editing or augmenting the entity, contains an option for "View state machine". Selecting this option might bring up a diagram of the current state machine for the problem. Here, we have various states, including one identified as "Implementation over-budget" which is attained via a transition "Grant additional funds". Two outgoing transitions are labeled "Grant additional funds" and "Suspend project implementation". From any given state, a context menu includes an option for "Decompose state" which, when selected, displays a lower-level state machine (creating one if it did not already exist). Context menu options for individual nodes support editing the state label, removing the state and adding an outgoing state transition. A state-independent context menu supports adding a new state, setting the default state, or bringing up a window with the next higher level state machine.

FIG. 174 shows a possible user interface for associating state machines with problems. The context menu for a solution, in addition to options for editing or augmenting the entity, contains an option for "View current state". Here, a two-level state is displayed, the upper level being "Cleared for implementation" and the lower-level state being "Implementation over-budget". Another option, "Apply state transition" provides another context menu with transitions available for this node from various levels of the state machine as options. An additional option from the solution-level context menu "Recommend next/previous state" allows for obtaining input regarding how a solution should or should have been handled and why. Although this is presented here as a user option, embodiments may prefer to randomize this process to avoid bias through self-selection.

A Method for Exploration of Hierarchical Structures and Representation of Context Thereof The general approach is as follows. Present a portion of a DAG as a tree. Then repeatedly allow the user to take either of the following actions:

Expand the Subtree at any Node on the Closed Frontier of the DAG
- Doing so should both automatically close any previously open subtrees that "conflict" with the subtree being opened, e.g., any child of the node being opened that is already visible at another node of the DAG should be hidden; and open some descendants of the node being expanded.

Collapse the Subtree at any Node Strictly within the Closed Frontier of the DAG
- Doing so should hide any strict descendants of the node being collapsed, and the node being collapsed should be closed. Various embodiments may accomplish this using some combination of strategies, as described below.

Related sets of strategies deal with how much of the DAG should be initially visible, and how much revealed when a node is expanded.

Because embodiments may choose to constrain the tree such that only one node associated with any given entity may be visible, we call two nodes that are associated with the same entity directly conflicting. To hide a node, embodiments may collapse its parent. All but the final two strategies listed may not be appropriate where the number of descendants of a node is not finite.

First, we present various Initialization Strategies. All of them prevent multiple directly conflicting nodes from being displayed.

Initialization Strategy #1: Open as much of the DAG as possible until opening another node would reveal a child node that conflicts with a visible node; do not open these nodes. The children of a node can be expanded in any order. At most one conflicting node is visible.

Initialization Strategy #2: Open as much of the DAG as possible until an entity can be reached by more than one parent node; in this case do not open any such parent node. No conflicting nodes are visible.

Initialization Strategy #3: Continue to open nodes as long as there is only one nonleaf child.

Initialization Strategy #4: Continue to open nodes as long as there is only one child.

Initialization Strategy #5: Open only the locus node(s).

Initialization Strategy #6: Do not initially open any nodes.

Next, we present various Explicit Node Expansion Strategies. Here, embodiments may open the requested node; how much additional is to be opened, however, may vary. To maintain the constraint prohibiting display of multiple directly conflicting nodes, embodiments may hide some nodes, although the amount of hiding needed may depend on the restrictiveness of the expansion (unfolding) strategy. Only the final strategy listed may be appropriate where the number of descendants of a node is not finite.

Explicit Node Expansion Strategy #1: Hide any nodes that directly conflict with children of the node being expanded, then open as much of the DAG as possible until opening another node would reveal a child node that conflicts with a visible node; do not open these nodes. The children of a node can be expanded in any order. At most one conflicting node is made visible.

Explicit Node Expansion Strategy #2: Hide any nodes that directly conflict with children of the node being expanded, then open as much of the DAG as possible until an entity would be revealed that can be reached by more than one path; do not open these nodes. The children of a node can be expanded in any order. No conflicting nodes are made visible, other than children of the one for which expansion was requested.

Explicit Node Expansion Strategy #3: Close any siblings and continue to open nodes as long as there is only one nonleaf child.

Explicit Node Expansion Strategy #4: Close any siblings and continue to open nodes as long as there is only one child.

Explicit Node Expansion Strategy #5: Only open nodes as explicitly directed. Variations exist based on how much of the tree to hide prior to opening the node: hide any visible nodes associated with the same entity as each revealed node or close any siblings.

Various embodiments use related strategies for both initialization and expansion, but some embodiments use different strategies in these cases, or in any sub-cases as they see fit.

Reopening Strategies deal with how to react when a subtree that has been closed is reopened.

Reopening Strategy #1: Some embodiments may reopen that subtree to its initial position.

Reopening Strategy #2: Others may reopen it to the same position that it was in prior to being closed.

Embodiments may exhibit subtle differences in how they deal with logical leaf nodes. Some embodiments may choose to allow leaf nodes to be opened and closed in spite of the fact that there are no children to display. These embodiments may use a single binary variable on nodes to represent whether they are open or closed. They may, as an optimization, use a separate binary variable to represent directly whether a or not a node has children. Other embodiments may track whether nodes with children are open or closed, and for leaves not maintain this information. Again, whether a node is a logical leaf or not can be maintained explicitly or determined by counting its logical children. We assume that expansion, collapse and the various strategies for unfolding only take place on nodes with logical children, although these checks are omitted from the figures.

A pair of strategies reflects the lifetime of tree nodes.

Static Lifetime Strategy: Some embodiments may initially construct the entire substructure (or context) from the DAG as a single (possibly inverted) tree in which certain entities may be represented multiple times, and then adjust which nodes are to be displayed in accordance with a selection of the above strategies (such that any entity is displayed at only one node at any time). Depending on the situation in which the exploration takes place, an embodiment may explicitly hide and show nodes exclusively, or leverage underlying technology such as a browser to set these attributes in some circumstances.

Dynamic Lifetime Strategy: Other embodiments may reconstruct nodes from the DAG each time they are to be displayed, and delete them when they are to be hidden.

Presentation of DAG Substructure as a Tree

Here the tree grows downward and its purpose is to allow the user to explore descendants of a node, i.e., its substructure.

The approach for the representation of a DAG as a tree is shown in FIG. 175 for a particular DAG under navigation. The tree structure (of possible snapshots into the DAG) corresponds exactly to the DAG structure, with children of an open node (marked with "o:") indented and below that node.

Embodiments implementing the Static Lifetime Strategy may or may not make use of a convention that if a node is hidden, all of its descendants can be inferred to be hidden as well without explicitly maintaining that fact for each descendant.

We now describe each operation for the Static Lifetime Strategy. FIG. 176 and FIG. 177 describe the two parts of the set-up process. FIG. 176 shows that Static Substructure Construction 111100 iteratively constructs the substructure, starting with the locus node and discovering descendants. No order is specified between construction of the various nodes, but if pointers are maintained in either direction, it may be convenient to construct the referenced node prior to setting the pointer on the node that references it. If pointers are maintained in both directions, the order may be arbitrary as one of the pointers may need to be set after both nodes have been allocated. FIG. 177 shows that Static Substructure Initialization 111101 both makes the locus node visible and applies an Initialization Strategy. For Initialization Strategy #6, expansion simply collapses the locusNode but for other Initialization Strategies, it marks the locusNode as open and applies the process described in FIG. 180, FIG. 181, FIG. 182, FIG. 183, or FIG. 184, respectively, for the various remaining Initialization Strategies. It should be clear to those skilled in the art of software development that these processes could be merged, as long as each node is constructed prior to its initialization.

As mentioned above in this section as "a convention that if a node is hidden, all of its descendants can be inferred to be hidden", it may not be necessary to descend through descendants to hide nodes if a node's property of being hidden is inheritable. We make this assumption in FIG. 179.

In some embodiments, an assumption about how to maintain the open/closed status of hidden nodes (those below a closed node) may be made. Embodiments may either initialize these to be closed and hidden and also, upon collapsing a node, ensure that all its descendants that had been shown are left in a closed and hidden state (so that upon opening a node we can assume that its children are closed) or else collapse the non-leaf nodes where expansion stops. The figures assume the latter. They describe this step of collapsing nodes where expansion stops separately for each expansion strategy. Clearly, this could be abstracted, but that would require collecting those nodes where expansion stops so that they can be handled, well, collectively.

The Explicit Node Expansion Strategies use the template of FIG. 178. CurrentNode is initially the node being expanded. The process both marks this node as open for expansion and, in sequence, hides any nodes for which the expansion strategy would create a conflict (defined broadly) by collapsing their parents and then applies that Explicit Node Expansion Strategy to the node. For hiding nodes, Explicit Node Expansion Strategy #1 and Explicit Node Expansion Strategy #2 use Hide Directly Conflicting Static Substructure 112111 from FIG. 185; Explicit Node Expansion Strategy #3 and Explicit Node Expansion Strategy #4 use Collapse Siblings in Static Substructure 112100 from FIG. 186; and Explicit Node Expansion Strategy #5 may use either of these. For expansion, these strategies use Maximal Unfold Static Substructure 111110, Unfold Static Substructure Until Common Descendants 110120, Unfold Static Substructure Until Multiple Nonleaf Children 110130, Unfold Static Substructure Until Multiple Children 110140, and Unary Unfold Static Substructure 110150, from FIG. 180, FIG. 181, FIG. 182, FIG. 183, and FIG. 184, respectively.

The preceding describes Reopening Strategy #1. For Reopening Strategy #2, we mark nodes as they are opened, and then upon expansion if a node has not been so marked (and possibly if all its children are closed) act as above, otherwise show any open or empty descendants and the first layer of closed descendants. One can take this strategy further by storing the tree structure at the end of a session and only initializing if no such stored structure is found.

FIG. 179 describes process Static Substructure Collapse 113100. Here, currentNode is initially the node being collapsed. In various embodiments, the node must be marked for expansion and any visible descendant nodes hidden. In various embodiments, nodes beneath a closed node will not be visible, so need not be hidden. But as long as a node's property of being hidden is inheritable (the Static Lifetime Strategy), only the immediate children of the node being collapsed need be hidden.

We now describe the auxiliary operations related to each strategy. FIG. 180 shows the process Maximal Unfold Static Substructure 111110. It descends through the substructure hierarchy, marking nodes as open and showing each node, stopping (and marking nodes as closed) only to prevent showing any common descendants that have are already been made visible through another path. FIG. 181 shows the process Unfold Static Substructure Until Common Descendants 110120. It is similar to Maximal Unfold Static Substructure 111110 but stops (and marks nodes as closed) to prevent showing any common descendants, whether or not they have are already been made visible through another path. FIG. 182 shows the process Unfold Static Substructure Until Multiple Nonleaf Children 110130. It also descends through the substructure hierarchy, marking nodes as open and showing each node, but stops (and marks nodes as closed) at any node with multiple non-leaf children. FIG. 183 shows the process Unfold Static Substructure Until Multiple Children 110140. It is similar to Unfold Static Substructure Until Multiple Nonleaf Children 110130 but stops (and marks nodes as closed) to prevent descending whenever there are multiple children, whether or not any are leaves. Finally, FIG. 184 shows the process Unary Unfold Static Substructure 110150. It takes exactly one step of unfolding.

These operations can be implemented for the Dynamic Lifetime Strategy by only initially creating the locus node, and creating nodes where they are made visible or destroying them where they are hidden in the description above. Further description should not be necessary since the other sections require dynamic substructure and context.

Presentation of DAG Context as an Inverted Tree

Here the tree grows upward and its purpose is to allow the user to explore ancestors of a node, i.e., its context.

A DAG may have subtrees that extend upwards as well as downwards. The following two Locus Strategies relate to the notions of substructure vs. context.

Designated Locus Strategy: Some embodiments with a notion of a locus node may consider ancestors of that node to be potential context and descendants of that node to be potential substructure. In degenerate cases, the entire DAG might be considered either substructure or context. With this strategy, only the designated locus node could be focused separately for substructure or context (assuming both are available). Substructure nodes could expand or collapse further substructure and context nodes could expand or collapse further context.

Universal Locus Strategy: Other embodiments might consider substructure and context to be relative terms. This could be achieved by allowing any node to be focused separately for structure or context. If a node within the closed substructure frontier is collapsed for substructure, all of its proper descendants are hidden; if a node on the closed substructure frontier is expanded for substructure, some of its proper descendants are exposed. If a node within the closed context frontier is collapsed for context, all of its proper ancestors are hidden; if a node on the closed context frontier is expanded for context, some of its proper ancestors are exposed.

Two Parent Node Reordering Strategies are as follows:

Parent Node Reordering Strategy #1: Some embodiments may allow multiple parent nodes to be expanded at the same time (as long as no common ancestor is exposed at more than one node). The order of the nodes is kept fixed.

Parent Node Reordering Strategy #2: Other embodiments may restrict expansion such that the top node of a list of parent nodes is expanded at least as far as any other node. If only one context sibling is expanded at a time (per Explicit Node Expansion Strategy #3, Explicit Node Expansion Strategy #4, or Explicit Node Expansion Strategy #5), as any node is to be expanded, it may be moved to the top. If multiple context siblings may be expanded at the same time (per Explicit Node Expansion Strategy #1 or Explicit Node Expansion Strategy #2), for various embodiments the expansion process must be carried out sufficiently to determine which context sibling requires the most expansion and that context sibling may be moved to the top. This may be for purposes of visualizing the relationships with a common ancestor, as described below under "Presentation of Common Context of Multiple Inverted Trees".

The approach for the representation of a DAG as a tree, assuming the Designated Locus Strategy and Parent Node Reordering Strategy #2 is shown for a particular DAG under navigation in FIG. 187. The root of the DAG (node 0) is at the bottom of this figure, while the root of the tree is at the top. The nodes listed above and to the left of any open node are collectively the parents of that node. Here, the nodes 0.0 through ($n_0-1$) are parents of node 0, and two of these (node 0.0 and node $0.(n_0-2)$) are open with their parents displayed.

Various embodiments that allow (per Parent Node Reordering Strategy #1) the top context sibling to be less expanded than any other context sibling may manage indentation explicitly or manage invisible list nodes (since the uppermost node is not necessarily the leftmost); this can be avoided by reordering the context siblings (per Parent Node Reordering Strategy #2). For one skilled in the art of software development, managing indentation or invisible list nodes involves only tedium, so we concentrate on Parent Node Reordering Strategy #2.

Various embodiments implementing Parent Node Reordering Strategy #2 may be constrained to also implement the Dynamic Lifetime Strategy because no static ordering may suffice. Embodiments for which there is a convention that if a node is hidden then all of its descendants can be inferred to be hidden as well may also be constrained to also implement the Dynamic Lifetime Strategy, because this convention is not compatible with an inverted tree where it should be possible to hide descendants without hiding the ancestors.

For embodiments implementing the Dynamic Lifetime Strategy, there is no distinction between construction and initialization. FIG. 188 is similar to FIG. 177 except that it omits showing the locus node, as this is assumed to have been done during initialization of the substructure. Construction of the locus node, associated with the locus entity, is also omitted as it is assumed to have been done during initialization of dynamic substructure (not shown).

FIG. 189 shows the process of explicit expansion for situations where at most one context sibling can be expanded at a time. It is similar to FIG. 178 but includes logic to handle two situations. It moves the node being expanded to the top of the list of context siblings if it is not already there. Also, if the node being expanded is at the bottom of the list of context siblings and there is at least one other element of the list, its descendants are transferred to the new last context sibling. For situations where multiple context siblings can be expanded at a time, it would have to first determine whether expanding this node would make it the most expanded context sibling, and if so proceed with the above logic to move it to the top of the list.

FIG. 190 shows the process Dynamic Context Collapse (Single Entity) 213200. It repeatedly checks whether there is any more context above currentNode, and if so deallocates currentNode's parent after moving currentNode with its descendants to currentNode's grandparent. When there is no more context above currentNode, it is marked as closed for context expansion.

In the figures for the various strategies for unfolding context (FIG. 191, FIG. 192, FIG. 193, FIG. 194, and FIG. 195) currentNode initially refers to locusNode (for initialization) or for explicit expansion, to the node being expanded. currentEntity refers to the entity associated with currentNode. Each of these dynamically allocate a list of nodes, one for each parent of currentEntity. To have these appear aligned but set back from currentNode, embodiments may place currentNode as a child of the last node in the list. Any time a strategy needs to recur to expand on a newly created node, this allocation step may be repeated for that node. The other main difference with the strategies for presenting single-entity DAG substructure is that it is sufficient to mark nodes as closed for context expansion without any need to hide their context descendants, since nodes have not been created for those descendants.

FIG. 196 is similar to FIG. 185 but must search for conflicts in terms of entities and the DAG, and must take into account that to hide a node that is one of several parents in the DAG, various embodiments must collapse the node representing their DAG-child that is positioned as a substrate-child of the node representing the last parent in the sequence. FIG. 197 is closely aligned with FIG. 186.

Presentation of Common Context of Multiple Inverted Trees

As described above under "Multiple Cross-kind Augmentation" as "by having multiple locus nodes", it may be possible for a user to navigate to multiple locus nodes. Here a tree grows upward from each locus node as a user explores its ancestors, i.e., the node's context. Our aim is to identify, during context exploration, any paths from two or more locus nodes that lead to a common ancestor.

We have had a methodology that as context is unfolded, we hide any context associated with an entity also associated with any context being revealed. Now that we have multiple locus nodes, if the same entity becomes accessible via the context of more than one locus node, we proceed as follows. If that common ancestor entity would be revealed with the same set of context siblings in each case, we merge the paths to make this relationship apparent. If the common entity would be revealed with a set of context siblings, but was already showing with a proper subset of that set of context siblings, it would be incorrect to merge the paths, as the entities associated with some of the newly revealed context siblings are not actually parents of the entity associated with a node that would be presented as their collective child. Thus, we instead resolve the conflict by hiding the set of context siblings that was previously being shown.

On the other hand, if the common entity would be revealed with a set of context siblings, but was already showing with a proper superset of that set of context siblings, we have at least two Children Merging Strategies:

Children Merging Strategy #1: One option is to proceed exactly as in the proper subset case, with the implication that the set of parents shown is always the exact and complete set of parents of that entity.

Children Merging Strategy #2: Another option is to merge the children of the proper superset of parents as context siblings of the node being expanded, with the implication that the set of parents shown need only be a subset of the parents of that entity. This has the advantage that there is more "clumping" of related nodes, but the disadvantage that some of a node's parents are hidden.

Where embodiments are concerned with indicating common ancestors across locus nodes, it may not be necessary to support continued exposure of more than one path at a time through the context of any locus node. An embodiment might, however, expose paths from different locus nodes between which no common ancestor has yet been exposed and even expose "stubs" for any paths from a locus node other than those that lead to a common ancestor with other locus nodes, possibly ensuring that these are pruned to be shorter than the path to the common ancestor. We are thus no longer concerned with Initialization Strategy #1, Initialization Strategy #2, Explicit Node Expansion Strategy #1, nor Explicit Node Expansion Strategy #2.

Under "Presentation of DAG Context as an Inverted Tree", we carefully prevented the display of a common ancestor by distinct paths from the same locus node (under the Designated Locus Strategy), or at all (under the Universal Locus Strategy). This is effective in reducing excess complexity, and doing otherwise could defeat the benefits of the tree-based representation of the DAG. But in cases where we are interested in several entities and have chosen to expand their context, one may be quite interested in seeing any common ancestor that is reached by those paths.

In expanding a context node, where only one parent can be expanded at a time, some embodiments may manipulate the order of the node's context siblings, so that the node being expanded is first in the list. That enables the context to grow outward in a natural tree structure. Other embodiments may not rearrange their order, so that it is understood that the parents displayed relate to the node that is indented immediately beneath them, or that is in an open state.

We next show how shared context can be presented in a substrate tree, or more abstractly as a forest, i.e. list of trees, of node lists, each tree called a context frame. The forest can be presented in a substrate tree by alternating indenting the node lists and their child context frames. The approach is shown in FIG. 198 for a particular DAG under navigation and Parent Node Reordering Strategy #2. We can see in that diagram the nested sequence of lists of two varieties. The outermost subDAG list is a simple list whose elements are context frames. Context frames contain a node list, in which each node provides information regarding a different entity. Context frames may be internal or leaves. Leaves have a single node with an empty subDAG list and refer to a locus node. Internal frames have a nonempty node list and a nonempty subDAG list, with the intention that the listed nodes are collectively the parents of the uppermost open node in each subDAG. The subDAG list may be positioned as a child of the last parent to take advantage of software that can visualize tree structure, or the sub-frames may be considered a single explicitly indented sibling of the parents, or individual explicitly indented siblings of the parents, or the indentation can be globally managed explicitly by tracking the depth of nesting of frames. For topmost internal frames, all nonorphan parents are in the closed state. For other frames, only the first node is in the open state and subsequent nodes are closed, indicating that parents at the next level up have these first nodes as their collective children (while parents of the entities associated with closed nodes are not exposed). For convenience, we follow a convention for this diagram of numbering frames by appending a sequential number to the next outermost frame's number and numbering nodes by appending a sequential number to the enclosing frame's number but one should keep in mind that the process of exploring context proceeds in an outward direction. We refer to the number of parents listed for frame f as $n_f$. Frame 0 and frame 1 in FIG. 198 are two DAGs with no shared context. Frame 0 has parent nodes listed followed by three sub-frames representing subDAGs whose roots (nodes 0.0.0, 0.1.0, and 0.2.0) are open and whose associated entities all have the same set of parents (the entities associated with those parent nodes). The successor parents in each frame (not ending with "0.0") are closed. This entire subDAG list may be positioned as a child of the last parent (node 0. ($n_0$−1)). It can be seen that this structure repeats recursively in the case of frames 0.0 and 0.1. Each such recursion may reach one or more leaves. Frame 0.2 is a leaf, so it has exactly one node (a locus node) listed and no sub-frames. This node, however, may carry the substructure associated with the corresponding entity. In the above description, lists are an abstraction that some embodiments may choose not to explicitly represent; such embodiments may consider a reference to a list above as simply referring collectively to the elements of that list.

In FIG. 198, the closed context frontier for frame 0 consists of parent 0.0 through parent 0. ($n_0$−1) plus all of the successor parents of any embedded frames.

FIG. 199 through FIG. 202, present an example of how sharing of context could be experienced by a user of an embodiment. These screens display the process by which the user explores a DAG of skills. FIG. 199 shows an initial presentation of the DAG with three locus nodes, "Litigation", "Legislating", and "Networking". Each is in a separate top-level frame. If from this position the user were to open the context for "Debate", a superskill of "Litigation", we would see the result as in FIG. 200. "Debate" has two parents, "Communication" and "Analysis". Since "Communication" without "Analysis" was a parent of "Networking", "Networking" must for this embodiment be closed upon opening "Debate", maintaining the invariant that any single skill appear only once. Now, opening "Interviewing" closes "Debate" and we see in FIG. 201 that, like, "Networking", its sole parent is "Communication", and these exist in separate frames under "Communication". Opening "Legislating" and then "Writing", we see in FIG. 202 that it also falls under "Communication" as a third frame. Closing the folder for "Interviewing" might lead to the screen in FIG. 203, with the frame including "Litigation" detached and moved to the top level. The various frames are distinguished in that the uppermost folder in the parents for each frame is open while the remaining folders are empty or closed, but embodiments choose to distinguish them in other ways as well (for example, by drawing borders around them).

When collapsing context, we may now only want to remove context not shared with locus nodes outside of the node being collapsed (e.g., not shared with other frames). It is thus convenient to maintain with respect to each frame or node references to the locus entities associated with its descendant nodes. We do not show details of maintaining this information, as these should be clear to one skilled in the art of software development.

In the first stage of the initialization process in FIG. 204, the structure of FIG. 198 is set up with one top-level leaf frame per locus entity. The locus nodes are assumed to have been constructed during Dynamic Substructure Initialization for Multiple Entities. The remainder is similar to FIG. 188, but repeated for each locus node, and using versions of the auxiliary routines particular to the need to share across multiple entities.

Dynamic context expansion for multiple entities is as presented in FIG. 189, but the descendants referred to in "Move descendants of currentNode to next to last context sibling" may be in the form of a list of frames.

FIG. 205 presents the process Dynamic Context Collapse (Multiple Entities) 223200, which begins similarly to the single-entity version in FIG. 190, but an additional step is required. If the frame list enclosing currentNode has more locus descendants than does currentNode, than we can't simply remove the context as this would drop locus nodes. (Note that by descendants here we do not mean literal descendants in the substrate tree, but rather context ancestors, related to descendants in the underlying DAG. These correspond to currentNode along with the contents of the framelist under currentNode's last sibling in the substrate.) Instead, we move currentNode to its own top-level frame, so that those locus nodes are preserved, although they are not relevant to the context of currentNode. Otherwise (removing the next layer of context would not drop any locus nodes) we proceed as with FIG. 190.

The various strategies for unfolding dynamic context for multiple entities (Unfold Dynamic Context Until Multiple Nonleaf Children (Multiple Entities) 220230 in FIG. 206, Unfold Dynamic Context Until Multiple Children (Multiple Entities) 220240 in FIG. 207, and Unary Unfold Dynamic Context (Multiple Entities) 220250 in FIG. 208) contain a significant amount of common logic implementing the methodology for multiple locus nodes of Children Merging Strategy #1, which is described here. Embodiments may begin by looking up the parents of currentEntity and determining whether they exist as a set of siblings in the substrate tree (some embodiments may restrict this to nonempty sets of parentNodes, since leaving multiple empty sets may not create conflicts). If so, they may simply move currentNode to a new frame under that set of siblings. Otherwise, they may create that list of parent nodes, but also ensure that any existing overlapping set of context siblings is removed. The latter is described further in FIG. 210. This process of clearing the overlapping set of context siblings just described might logically belong with Collapse Siblings in Dynamic Context (Multiple Entities) 222200, but we place it here to be alongside other checks for nodes associated with parents of currentEntity and so that it may take place with each iteration. Another step indicated here and described further in FIG. 211 is recommended, although some embodiments may omit it. As the expansion proceeds, nodes currently at top level but with the same parent set as that being unfolded (again, possibly excluding empty sets) may be captured by the newly expanded nodes. It remains to construct the full list of nodes associated with the parents of currentEntity. This is done such that currentNode (being expanded) is a child of the last such node.

FIG. 210 shows the logic for hiding conflicting visible nodes by raising their DAG descendants to top level. Overlapping sets of context siblings can be identified by locating nodes already associated with any of these parent entities. Before removing the overlapping set, each frame under it (corresponding to one of their collective children in the DAG) is moved to the top level list of frames. Recall that in any frame not at top level, the first context sibling is open (indicating that it is associated with the child whose parents are being explored). Thus, this first context sibling is closed as its frame is moved to top level. After each frame under a given subset of the context siblings has been moved, those nodes should be removed.

FIG. 211 shows the logic for capturing nodes associated with DAG siblings of the entity whose node is being expanded. For each top-level frame, if any of that frame's nodes has parents that are the same as the entities being revealed, then move that frame from the top level to be a sibling of the node being expanded, move the matching node to the top of the frame, and open the context of that matching node.

At this point, the logic specific to each Explicit Node Expansion Strategy comes into play, and is similar to what was described in FIG. 193, FIG. 194, and FIG. 195. In fact, the first activity in each of those figures is the construction of the parent nodes, which we have just described. The processes described here for multiple locus entities differ only in that the recursions for Unfold Dynamic Context Until Multiple Nonleaf Children (Multiple Entities) 220230 and Unfold Dynamic Context Until Multiple Children (Multiple Entities) 220240 continue with the logic just described above as "Embodiments may begin . . . ".

Presentation of Common Substructure of Multiple Trees

Here a tree grows downward from each locus node as a user explores its descendants, i.e., the node's substructure. Our aim is to identify, during substructure exploration, any paths from two or more locus nodes that lead to a common descendant.

We have had a methodology that as substructure is unfolded, we hide any substructure associated with an entity also associated with any substructure being revealed. Now that we have multiple locus nodes, if the same entity becomes accessible via the substructure of more than one locus node, we proceed as follows. If that common descendant entity would be revealed with the same set of siblings in each case, we merge the paths to make this relationship apparent. If the common entity would be revealed with a set of siblings, but was already showing with a different but overlapping set of siblings, it would be incorrect to merge the paths, as the entities associated with some of the newly revealed siblings are not actually children of the entity associated with a node that would be presented as their collective parent. Thus, we instead resolve the conflict by hiding the set of siblings that was previously being shown.

On the other hand, if the common entity would be revealed with a set of context siblings, but was already showing with a proper superset of that set of context siblings, we have at least two options:

Parents Merging Strategy #1: One option is to proceed exactly as in the proper subset case, with the implication that the set of children shown is always the exact and complete set of children of that entity.

Parents Merging Strategy #2: Another option is to merge the parents of the proper superset of children as siblings of the node being expanded, with the implication that the set of children shown need only be a subset of the children of that entity. This has the advantage that there is more "clumping" of related nodes, but the disadvantage that some of a node's children are hidden.

Where embodiments are concerned with indicating common descendants across locus nodes, it may not be necessary to support continued exposure of more than one path at a time through the substructure of any single node. An embodiment might, however, expose paths from different locus nodes between which no common descendant has yet been exposed and even expose "stubs" for any paths from a locus node other than those that lead to a common descendant with other locus nodes, possibly ensuring that these are pruned to be shorter than the path to the common descendant. We are thus no longer concerned with Initialization Strategy #1, Initialization Strategy #2, Explicit Node Expansion Strategy #1, nor Explicit Node Expansion Strategy #2.

Under "Presentation of DAG Substructure as a Tree", we carefully prevented the display of a common descendant by distinct paths from the same locus node (under the Designated Locus Strategy), or at all (under the Universal Locus Strategy). This is effective in reducing excess complexity, and doing otherwise could defeat the benefits of the tree-based representation of the DAG. But in cases where we are interested in several entities and have chosen to expand their substructure, one may be quite interested in seeing any common descendant that is reached by those paths.

In expanding a substructure node, where only one child can be expanded at a time, some embodiments may manipulate the order of the node's siblings, so that the node being expanded is last in the list. Other embodiments may not rearrange their order, so that it is understood that the children displayed relate to the sibling above them, with respect to which they are indented.

We next show how shared substructure can be presented as a single substrate tree. The approach is shown in FIG. 212 for a particular DAG under navigation and Parent Node Reordering Strategy #2. We can see in that diagram the nested sequence of lists of two varieties. The outermost root subDAG list is a simple list whose elements are root substructure frames. Substructure frames have a main node followed by indented data (children in the substrate tree). Nodes may be open, closed, or empty (subject to comments above under "DETAILED DESCRIPTION" as "Some embodiments may choose to support only open and closed icons, . . . "). We call a frame open, closed, or empty depending on the state of its main node. The main nodes of elements of the outermost root subDAG list have no shared substructure indicated. If the main node is open, the indented data includes a node list of closed children nodes followed by a substructure frame for the final child (any open child is assumed by some embodiments to be moved to the last position). Regardless of the state of the main node, this data is followed by a root internal subDAG list. Of course, this data may be organized as a single list or a list of lists as the embodiment finds convenient. root substructure frames are substructure frames in which the main node is a locus. A substructure frame is considered to be an internal substructure frame or a leaf substructure frame depending on whether or not there are any children nodes presented in the substrate tree, respectively (note that the represented entity need not be a leaf in the underlying DAG). For various embodiments, the outermost root substructure frames may be leaves or internal, but other root substructure frames must be internal, as they lead to shared substructure. Define the full subDAG list as the list formed by the final child substructure frame followed by the elements of the root internal subDAG list. Note that an open substructure frame may have an empty full subDAG list if the main node has no children in the substrate tree and the root internal subDAG list is empty. Define the height of a frame as follows. The height of a frame with an empty full subDAG list is one. Otherwise, the height of an internal frame is one more than the height of the last frame in its full subDAG list. Define the terminal frame of an internal substructure frame to be the terminal frame of the last frame in its full subDAG list, if any, or else the internal substructure frame itself. The frames in the full subDAG list of an internal substructure frame will for some embodiments have increasing height. Define tail position as follows. Any top level root subDAG list is in tail position. If a frame is in tail position and has a non-empty full subDAG list, the last element of the full subDAG list is in tail position. The terminal frame of a frame in tail position is closed. The terminal frame of any other frame is open, and all such open frames may be aligned at the same depth in the substrate tree (root internal subDAGs are arranged so that this is the case). It follows from the above that for various embodiments an internal substructure frame in which the final child substructure frame is closed will have an empty root internal subDAG list. An internal frame in which the final child substructure frame is open may have an empty or nonempty root internal subDAG list.

The intention is that the nodes in the node list and the main node of the final child substructure frame are collectively the children of the main node of the enclosing substructure frame. (As always, children of the entities associated with closed nodes are not exposed). Moreover, the parents of a given descendant of the final root internal subDAG node include not only its immediate parent in the substrate tree, but also any open leaf nodes descended from any preceding elements of the full subDAG list and that are aligned with that immediate parent. The root internal subDAG list (or each of its elements) may be positioned as a child of the main node to take advantage of software that can visualize tree structure or the indentation can be globally managed explicitly by tracking the depth of nesting of frames. For convenience, we follow a convention for FIG. 212 of numbering locus nodes sequentially, and otherwise numbering child nodes (including final child nodes that serve as the main node of a new frame) by appending a sequential number to the number of the next outermost frame's main node. Locus nodes 0 and 1 are the main nodes of two top-level DAGs with no shared context, while node 3.1.0 is a common descendant of locus nodes 0, 2, and 3. The parents in the underlying DAG of the entity represented by node 3.1.0 include the entities represented by nodes $0.(n_0-1).(n_{0.(n_0-1)}-1)$, 2, and 3.1. In the above description, lists are an abstraction that some embodiments may choose not to explicitly represent; such embodiments may consider a reference to a list above as simply referring collectively to the elements of that list.

The intention is that root substructure frames that are ancestors of common descendants be placed so as to equalize the combined distance from the top level to the root substructure frame and from the root substructure frame to the common descendant node. This can be accomplished by storing a depth in the logical substructure tree with each substructure node. Upon expanding a substructure node we check each revealed child for whether it already exists in the substrate. If it exists with depth greater than that of the node being expanded, collapse nodes as necessary and then move the top-level frame including the expanded node downward by the difference in frames. If it exists with an equal or lesser depth than that of the node being expanded, then move the children from the existing node to the node being expanded, and reorder the frames to maintain the invariant of increasing height.

It remains to explain how context can be presented along with substructure as a single substrate tree. A simple approach is that when a node is expanded for substructure, we first collapse any context of that node, so that we can start counting height with the locus nodes. It should be clear, however, that one could include context in the height calculation, and only collapse context when necessary to disassociate common ancestors.

Multiple Node Selection

This presentation framework can support selection of nodes, even selection of a set of nodes, some of which conflict, in that they cannot all be displayed in the same tree. If the strategy for displaying nodes is restrictive, we shouldn't have to settle for only allowing the user to select nodes that can be visible together. Even if a node is no longer visible, we can store its node or entity identifier or a path from it to the root as a sequence of node or entity identifiers. Given the client's localized DAG structure, these should be sufficient for any purpose. If the client needs to redisplay a selected node that is no longer visible, it can do so using its path to the root, using Reveal A Node Accessible via a Path Through Substructure 112250 discussed above under "Iterating DAG Augmentation" and diagramed in FIG. 213 or Reveal A Node Accessible via a Path Through Context 212250 discussed above under "DAG Generalization" and diagramed in FIG. 214. Rather than clearing the existing tree and reopening by following the path, it is preferable to follow the path from the root, tracking against any nodes that are already displayed (we can assume that the root is always displayed), until reaching a node in the path that is not visible. Then, for each node on the path, close conflicting nodes (based on the strategy in effect) and open (unfold) the next node on the path, selecting it from the set of children. An embodiment can choose to use any particular strategy in unfolding nodes. If it unfolds only a single node at a time, it can assume that then subsequent nodes are not visible, and thus can unfold each after that point in quick succession.

An example of selecting a node and then performing an operation from another node after rearranging the substructure such that the selected node is no longer visible is provided in figures FIG. 113 and FIG. 114, discussed above under "Generalization, Restatements, and Iteration".

Auxiliary Information and Aggregations

Aggregations of Auxiliary Information

Various information can be associated with the entities related by the underlying DAG. It is desirable to have an intuitive way of viewing relevant auxiliary information while exploring the project hierarchy. Auxiliary information can be collected during the DAG reduction process and individual information regarding each entity stored in that entity's record in the localized DAG.

Examples of auxiliary information related to projects include transaction data (contributions of funds or effort to a project, as described below under "Contributions and Disbursements" as "Some embodiments may support contribution of funds . . . or effort . . . "), total contributions, total funds available, progress reports for projects, files uploaded, and streams of project activity. In the case of files, the files themselves may not be provided to the client with the local DAG, but only their metadata. The files could be downloaded or accessed remotely as supported by the embodiment and directed by the user. It may also include information about related entities, such as users in various roles on a project (discussed above under "Project Governance") or skills required. Other auxiliary data such as tree size and recency of construction or access may not be displayed directly but rather utilized in providing "heat maps" of the interest in a particular node as compared to its siblings. Embodiments may also support top-down specification (by project administrators of parent projects) of a stand-alone measure of the priority of a particular problem refinement or other project child. In the case of mutually exclusive project refinements, embodiments may support setting relative priorities among the various project refinements, perhaps using the techniques described below under "Setting Percentages among Sibling Projects".

Embodiments may allow auxiliary information associated with any one entity to be viewed from any node referring to that entity, likely only at user request.

An "active" aggregation contains auxiliary information associated with certain nodes under consideration by the user. Embodiments may consider the active aggregation to consist of open and empty nodes, or preferably of all visible nodes. To offer even more control, aggregations may consider only a user-selected subset of visible nodes to be in the active aggregation, and these could be shaded appropriately or otherwise distinguished. The active aggregation, though, should always consist of a contiguous region including the locus node. Such an embodiment might let a user select an unselected node in the proper substructure or context for inclusion and that might implicitly include all nodes along the path to the locus. Conversely, it might let a user deselect a selected node in the proper substructure or context, and this would implicitly deselect the logical tree rooted at that node. As nodes in the hierarchy are expanded (or visible nodes selected), auxiliary information associated with the newly revealed (selected) nodes might be added to the active aggregation, while auxiliary information associated with nodes hidden during explicit collapse, as well as nodes hidden on implicit collapse during expansion (or deselected), might be removed from the active aggregation. The active aggregation should be visible alongside the primary DAG.

For each context node with a closed context expansion, there could be an aggregation over all its ancestors, including itself, or, preferably, over all of its proper ancestors, and for each closed substructure node with a closed substructure expansion, an aggregation over all its descendants, including itself, or, preferably, over all of its proper descendants (we refer to the former as "overall" and the latter as "constituent"). Rather than (or in addition to) presenting this for each closed expansion, some embodiments might present it only for the locus node or nodes (in this case probably without regard to the state of DAG exploration, and probably including the locus nodes themselves). These aggregations are likely only presented at user request. Embodiments may want to maintain the closed expansion aggregates for all nodes on the closed frontier, or just calculate them when the aggregation is requested. They may be cached so that they needn't be recalculated frequently during user interaction. If some of the entities represented by a closed folder have been deferred rather than passed to the client, as described under "Explicit DAG Augmentation by Specialization" as "When the user indicates a need to proceed deeper into the hierarchy . . . , additional nodes could be fetched by the server", embodiments may include a "More" link in the results, to inform the user that there may be more auxiliary information and, if activated, to trigger loading of additional nodes and their auxiliary data into the local DAG.

Some embodiments might also want to support, alongside the active aggregation, full overall and/or constituent aggregations, that merge the information from all of the overall and constituent closed context expansions, respectively.

For example, a substructure node with a closed substructure expansion may aggregate transaction data related to its proper descendants. When it is opened, the transaction data of each child may be made accessible via its node, and the substructure expansion of each child node (assuming that they are closed) may be associated with a separate aggregation of the transactions of its proper descendants.

We present another example as experienced by a user interacting with an embodiment in FIG. 215 through FIG. 226 for auxiliary information consisting of files. These files may be uploaded or downloaded by a user dragging their icons into or out of the appropriate region. Relevant files are displayed depending upon user interaction with the primary DAG in the "Dependencies" tab. We assume here that all visible nodes are included in the active aggregation. FIG. 215 shows a project screen with five nodes visible. When a user hovers their cursor over the main icon of a visible node, the text "Aux" appears an if it is clicked on. Thus, we can see in FIG. 216 through FIG. 220 the files associated with each individual node and that the active aggregation includes all of these files. FIG. 221 has an active aggregation including files associated with the locus node as well as the visible context; FIG. 222 including files associated with the locus node as well as the visible substructure; and FIG. 223 including files associated with locus node only. The text "Aux" also appears when a user hovers their cursor over a closed folder icon. FIG. 224 and FIG. 225 show that each of the closed folders contains a project with a single file. Both of these can be seen from the constituent tab in FIG. 226.

Presenting Aggregate Auxiliary Information

For certain aggregations, in particular of scalar, quantitative values where the aggregation takes less space than the included values collectively, including measures of the subtree size, embodiments may choose to store the aggregates with every node, regardless of its state, and adjust these as necessary when the DAG is augmented.

For both active aggregations and "closed" aggregations, various embodiments must take care to avoid double-counting the auxiliary information of an ancestor or descendant that can be reached by more than one path. For a union aggregation, double counting is not possible and thus not a concern, but for other forms of aggregation it may well be.

When closing a folder, its aggregate may combine the individual values for the disappearing descendant nodes (which must for various embodiments be removed exactly once from the active aggregation) and the aggregates of their descendant expansions. If each piece of auxiliary information in an aggregation is tagged with the residing entity of its "tree" node of origin (or equivalently, tagged with a DAG node), it is possible to efficiently combine aggregations upon closing folders without double counting. Better yet, the auxiliary information can be represented as a mapping to each datum, from the entity from which it originates. To combine aggregations upon closing folders, an embodiment can begin with the individual data of the node being closed, maintaining a list of all entities represented. For each child node and each entity contributing data to that child and not yet encountered, the embodiment can merge that contributed data into the new aggregation.

To standardize this merging process, embodiments might separate key and value components of the information in an aggregate, reachable from some entity. The aggregate information might be maintained and presented sorted by the key.

Upon a folder being opened, under various embodiments each child node gets the previously closed folder's data that is associated with the node itself, and that data is added to the active aggregation. Under various embodiments, each child node's expansion folder, if closed, gets aggregations that are subsets of the old aggregation for the node's previously closed expansion. Embodiments can check for each entity from which the remaining data (not related to the entity of the node being opened) originates, and for each child node, whether the entity is a descendant of the child node, and if so include its data in that child's aggregation. Alternatively, an embodiment might attempt to rebuild the aggregate for each child from its constituents.

To handle opening nodes more efficiently, data in the aggregations of closed nodes might take the form of a mapping, not from the residing entity of its node of origin, but from a representation of a "flow", e.g., a DAG with distinguished source and sink, from the closed node to the node of origin. These flows are not restricted to refinement relations, but can include other relations as well.

The following representation for a DAG is suggested:
Flow|=flow(Source, Sink, FlowBody)
FlowBody|=link(     )|sequence(Flow, Flow, Flow, . . . )|union(Flow, Flow, Flow, . . . )

This grammar imposes that a flow has a distinguished source and sink, and a body that takes the form of a link, a sequence of two or more flows, or a union of two or more flows. We additionally require here that for sequences, the first flow has a source matching the sequence flow's source, the last flow has a sink matching the sequence flow's sink, and for each flow between the first and the last, the source matches the sink of the preceding flow and the sink matches the source of the subsequent flow; and that for a union, each flow in the union has source and sink matching that of the union flow and that none of the various flows encompass each other.

We say that a sequence flow encompasses any sequence between the same source and sink with the same number of segments, that substitutes for any component flows a flow that is encompassed by that segment flow. We say that a union flow encompasses any of the flows in its collection. The encompassing relation on flows is transitive and reflexive.

The intuition is that a flow is either empty (a link with source equal to sink), a simple arc between two nodes (a link, otherwise), a sequence of flows that when connected end-to-end lead from the source to the sink, or a union of flows, all of which lead via alternate paths from the source to the sink.

These flows can be generated by scanning the DAG from a source node and each time a particular node is encountered, adding the path by which it was encountered to the existing flow as a union with a sequence of the links connecting elements along the path, unless the path was already accessible via the flow, in which case the flow can be left unchanged.

An alternative method of augmenting a flow with a path is as follows. For an empty flow, simply accept the path as a sequence of nonempty links. For a nonempty link, create a union with the sequence of nonempty links. For another sequence, if it has the same list of intermediate entities, create a sequence, augmenting each flow in the sequence with the nonempty link Otherwise, create a union of the two sequences (it is also possible to extract any common prefix and follow that by a union of the rest of each sequence). For a union, if the path is not encompassed by any elements of the collection, add it and remove any elements that it encompasses. To augment a nonempty link with a nonempty link, simply return the link. To augment a union with a nonempty link, if it is not already in the union, add it.

Then, for various embodiments, when a closed node is opened, that node gets as individual data the previously closed data that is associated with the empty flow from the node to itself (an empty union). Each of its children can be assigned aggregate data associated with flows obtained by deconstructing the previously closed node's flow into a set of pairs, each consisting of a node (corresponding to a child) and a flow from that node to the sink. Each child is assigned data for those flows for which it matches the node resulting from the deconstruction, under one of the flows resulting from the deconstruction.

The deconstruction process is as follows. For a link, the result is a singleton set of a pair of the sink node and the empty flow. For a sequence, recur on the first flow in the sequence to obtain a set of pairs; in each pair leave the node unchanged and modify the flow as follows: if the original sequence was of length 2 and the pair's flow is empty, the flow in the pair is the second segment of the sequence. Otherwise, the flow is a sequence formed by substituting the pair's flow for the first segment. For a union, recur on each element of the union to obtain a set of pairs. For each entity represented as a node, form a pair of that entity and the union of each flow in a pair with that entity.

If information requests have been deferred by the sever, the aggregations for closed folders may not be complete, and can be enhanced by requesting additional data.

Embodiments may include or exclude inherited nodes in aggregating auxiliary information, or they may give users a choice in the matter, perhaps via a checkbox. In the latter case, some embodiments may maintain two versions of each aggregation (at least when inherited nodes with auxiliary information are present), so that they can easily shift between them, but other embodiments may recalculate aggregates upon the user changing their selection. If inherited nodes are excluded, their auxiliary information is not merged into any of the various aggregations.

Particular Auxiliary Information
Setting Percentages Among Sibling Projects

In what follows, there is at various times a need to set percentages for allocating quantitative information regarding a parent project among its children. This can be done from the parent project itself, be entering numbers that total to 100, or, preferably, by adjusting the position of lines that divide a field into regions representing each child project (in some cases, it may be appropriate to select only children of a particular kind (problem or solution)). It is even possible for this division process to be superimposed on a tree-based view of a node's siblings.

Contributions and Disbursements

Some embodiments may support contribution of funds (perhaps only to a problem) or effort (perhaps only to a solution) by users of the system. Such contributions could be triggered via options in the user's context menu when viewing such projects. Below we concentrate on funds, but embodiments may apply these concepts to effort as well, such as in displaying summary contributions of effort to a solution.

The system may track funds that are contributed to a project, regardless of whether or not those funds flow directly through to the project administrator. If not, various embodiments of the system will also want to track disbursements for the purpose of the project, but if so, this may or may not be desired.

It may be useful to support visualization of total funds contributed and total funds disbursed for projects in the context or substructure of a locus node. Embodiments might allow for this scalar data (described above under "Presenting Aggregate Auxiliary Information" as "in particular of scalar, quantitative values . . . "") to be displayed for individual open nodes and aggregated for "overall" and "constituent" aggregations. Embodiments might further, in some situations, restrict the DAG nodes displayed to those for which funds were contributed or for which funds were disbursed, or to those through which such nodes are reachable.

If funds are contributed to a project, a project administrator might find it desirable to use them for some lower-level project. This should always be supported.

A project administrator might also find it desirable to use them for some higher-level project. This could potentially be to make infrastructure or overhead expenditures that serve the entire organization and thus take place at a higher level. Through the project settings, an allowable percentage can be set for upward transfers of contributions. Various checks can, if desired, be put in place to prevent or discourage funds transferred in an upward direction from flowing downward to a sibling project. For example, a division can be maintained between those funds eligible for downward transfer or not, or even whether eligible for downward transfer to particular projects or not (associating each partitioning of the total available funds with the set of eligible projects). More strictly, the system can register expectations of upward transfers (percentage or absolute) among particular child projects.

Cost information such as rents can be applied and tracked as time-based auxiliary information at the level of the highest solution that relies on it. Alternatively, real estate can be viewed by embodiments as yet another entity type, with its own hierarchical breakdown (by building, floor, etc.) and with a many-to-many cross-kind relation between solutions and locations.

Salary information is time-based, auxiliary information tied to the organizational (user) hierarchy.

Both of these cases impose a need to allocate between the various solutions that an individual or location may be serving. This can default to an even split, but be adjustable to any desired division. In the case of salary information, the division can be based on time-tracking via check-ins (see below under "Project Check-ins" as "Check-ins . . . provide time-tracking information").

Budgeting Support

Progress reports, mentioned above (under "Aggregations of Auxiliary Information" as "progress reports for projects") provide qualitative information regarding attainment of broad objectives that can be used by individuals, whether at the heart of an organization or at its periphery, in judging its performance. Such measures also reflect on the individuals responsible for those projects.

Embodiments might also support setting of quantitative goals as measures of performance. Performance goals may be standardized (revenue, earnings, cost reductions, customer retention) or specific to a problem (perhaps improving standardized test scores of students within a school). To support the latter, embodiments might support the definition of performance measures with respect to a problem. In either case, time-based goals or forecasts may be established and tracked against actual results. Embodiments may support various periodicities (annual, quarterly, monthly, etc.) and allow an initial value of goals or forecasts to be specified, perhaps along with selection of a function for increase or decrease over time. Indicators established for a problem are inherited through the project hierarchy (not just refinements) so that lower-level projects can carve out responsibility for some degree of the results, based on a percentage that is defined at the level of the parent project. Of course, lower-level projects can also establish their own performance measures. Establishment of a performance measure enables entry of corresponding results at the level of that project or lower-level projects. It is natural to display the various bases (goal/forecast/actual) against each other for a particular project.

In the case of embodiments that support mutually exclusive refinements (see above under "Mutually Exclusive Refinements" as "specializations of a problem by distinct geographic areas could safely be considered mutually exclusive"), it is possible to view performance for a single measure against objectives as a multi-bar chart, with one bar per basis (goal/forecast/actual), normalized to be the same length or not, each coded by the contribution or expected contribution of each specializing problem (or solution). Where there is a hierarchy (as in a standard multi-level department and sub-department breakdown, or in a project hierarchy including both problems and solutions), it is possible to drill down into the results. Perhaps by clicking on the portion of a bar representing a particular refinement, that bar might expand (replacing or alongside the previous bar) with its own multi-bar, reflecting the next-lower down division of project structure.

Such sibling projects can be rated by the degree to which they meet or exceed expectations, highlighting projects at both ends of the scale. The order in which they are listed within each multi-bar in the bar chart can reflect that ordering.

For any user, such charts can be viewed for each project in which they are an administrator or collaborator. If the same performance measures are in place across all of them, they can be merged, such that, as above, one could drill down from the user level to each project.

General Data Sets

More generally, data sets may be associated with projects and aggregated based on user exploration of a localized DAG. Aggregated numeric data may be presented in bar charts or graphs, with one bar or line, respectively, for each selected attribute (here and below, we consider both directly stored and calculated data attributes). Geographic data can be presented on a map, with discrete data points marked or each region shaded based on the level of aggregated values tied to it.

Individual projects can be associated with queries to a data set in the form of SQL, a URL, or any other form. The data for a particular node is the result of resolving the query, e.g., of identifying relevant database items (records, including those created by a logical join operation) and extracting appropriate attribute values from those records. The specification of a data set will include, implicitly or explicitly, the source of the database, conditions that must hold for data items to be selected, and expressions of the attribute values extracted from those data items. A means of aggregating across the extracted data values of various selected data items may be included in the latter expressions or provided separately. As the user expands a node, additional data points related to entities at newly exposed nodes are added to the visual presentation of the aggregation, and as the user contracts a node, data points related to the entities at newly hidden nodes are removed, as described above.

To avoid having to open and close a database each time a node is accessed, embodiments may allow the user to associate the database with the least upper bound of entities from which queries to the database are to take place.

Project IP

A solution may be associated with a patent, a patent application, or with particular claims of a patent or patent application.

Patents and claims may be treated by embodiments as entities. This would provide an opportunity to tie the dependency structure of claims to the solution refinement hierarchy. For example, an embodiment could support a cross-kind relation from claims to solutions, as well as a refinement relation over claims. Refining solutions could then inherit the claims of the refined solution. Updating an inherited claim for a refining solution could create a diamond structure reflecting that the new claim both describes the refining solution and refines the inherited claim.

Associating Code with Solutions

If a project is associated with a code repository under a traditional version control system, then a descendant solution may be associated with a (base) branch from that repository and any refining solution may be associated with a derivative (perhaps indirectly so) branch. A solution that refines multiple other solutions associated with branches may be associated with a branch that includes a merge of those branches. There is no guarantee that the code in the derivative branch will refine the code in the base branch in any technical sense, and even if that is the intention, it may hold only if the base branch is continually rebased into the derivative branch.

A solution may be associated with a (base) class in an object-oriented language. Then, a refining solution may be associated with a class derived (perhaps indirectly) from that base class. Alternatively, a solution may be associated with a method of a (base) class. Then, a refining solution may be associated with the same method of a class derived (perhaps indirectly) from that base class. In either case, there is no guarantee that the code in the derivative class will refine the code in the base class in any technical sense. A solution that refines multiple other solutions associated with classes or their methods in a language supporting multiple inheritance may be associated with a class that is derived from each of those classes, or a method of such a class.

DAG Filtering

It may be possible for a user to select via faceted browsing the entities to include in a DAG as loci by their characteristics/relationships/user history. This DAG filtering can be presented to the user as a collection of checkboxes, one per possible attribute value or kind of relationship, through which users indicate which entities to include based on whether they are set to any of the specified values or are participating in any of the specified associations with a distinguished entity such as the active user or locus of the primary DAG. The user can then explore through other, related, entities and find relationships among the selected entities. Characteristics to filter by might include solution status (described above under "Associating a State Machine/Bayesian Network With Each Node in a Refinement Hierarchy" as "solution status, with states for the various possible status values"). To filter by relationships, the user could select one or more roles of theirs for which they would like to see projects, as in FIG. 4. Alternatively, to filter by user history they might select one or more actions (such as funding or volunteering for a project) as well as exactly one periodicity or a date range and view projects for which they performed those actions in that period. For contributions, it may also be possible to filter by the amount contributed.

For a project administrator checked-in to a project (as described below under "Project Check-ins"), it may similarly be possible to select users to include by selecting one or more roles, or time and contribution descriptors.

A project administrator should also be able to select projects for which money was contributed and those for which it was disbursed, for purposes of comparison, or projects for which effort was contributed.

It may be possible to further filter auxiliary information, for example by the periodicity (for example, annual, quarterly, monthly) or by the time period, for historic as opposed to current information.

This DAG filtering can be implemented as follows. The server might build a local DAG including all possible entities, but marking some of them (and some of their ancestors and descendants) as hidden, based on either default selections or a record of the user's previous selections. If the various options are stored as separate database fields (for example as fields of distinct subclasses in an object-relational mapping (ORM) system), each of these may be accessed in creating lists of locus entities. The server might construct and pass to the client a mapping from facet values to the entity ids directly related to each such value, along with the set of entity descriptors, including sufficient information to determine, for each facet value selection, whether a particular entity falls under that facet value selection. Importantly, with the hierarchical presentation of entities, a given entity is often interpreted as falling under a facet value selection that corresponds to a relation with a distinguished entity if there is a direct association between the distinguished entity and the given entity, or any proper ancestor of the given entity. Embodiments may take into account in constructing such descriptors during DAG localization that if an entity falls under a facet value, so do all of its descendants, and that if an entity does not fall under a facet value, neither do any of its ancestors. Such descriptors could include those constructed as described below under "Project Check-ins" as "whether the user has rights under each role for that project entity". Under various embodiments, the client should receive this map and the entity descriptors, and initialize the context and substructure (or the server for the Static Lifetime Strategy) to show elements based on the initially selected facet values and descriptor information, and then handle events selecting or deselecting each facet value, keeping a record of which facet values are to be shown. Some embodiments may allow locus nodes to be recognized as being related while others may not. When a facet value is selected, the client shows all locus nodes that are directly associated with that value (via the mapping) and that are not already showing (or highlights them as locus nodes if they are already showing and the embodiment allows for this), and shows their context and substructure up to points where a node already showing is reached. When a facet value is deselected, the client hides all locus nodes that are directly associated with that value (via the mapping) and for which the entity does not fall under another facet value still being shown (via the entity descriptors). Merely de-highlight nodes where only the former is satisfied. In either case, hide their context and substructure up to points where a node's entity falls under a facet value still being shown (via the entity descriptors). The former process, Select a Facet Value 021200 is in FIG. 227. The latter, Deselect a Facet Value 024200 is in FIG. 228.

A Method to Support Versioning and Conflict Resolution in Project Hierarchies

Support for Distinct Project Views

Project Check-ins

Asking individual users to check into any one of their roles within a project supports another form of context and provides the system with insight into their intentions, enabling embodiments to customize both options available to the user (perhaps through context menu options) and recommendations (as under "Recommendations") not only to the individual user, but to a particular role on a particular project.

Embodiments might grant any user context menu options for publicly available activities. Users with an association with a particular project but who are not checked into that role could also be shown a "check into this role" option. A user could check into a role at the project level at which they have their association or at any lower level. Embodiments might allow users to check out of a project role from some global location, likely similar to how they would log out of the system. Embodiments may or may not restore a user's checked-in status when they log out and back into the system. Some embodiments might present users with options to check into another project role even when they are already checked into another such role, others might require the user to check out of one role before entering another. In the former case, embodiments should implicitly check the user out of one role when they check into another. Some embodiments might allow the user to be checked into multiple roles at once, in which case they would see context menu options for all relevant roles but then a particular activity might be permissible under more than one role. Embodiments may not allow a user to check into projects that are refinement descendants of those to which they are directly involved if those refinement connections involve traversing "weak" links, as described above under "Invitations and Applications to Connect" as ""weak" associations between existing projects".

Check-ins are also useful from a cost-tracking perspective, as they provide time-tracking information. Knowledge of the time spent by an individual on various solutions (or projects more generally) can be used in allocating their time between the various projects with which they are involved.

FIG. 229 shows a user screen of the active user, with that user not checked into any project. Because the user is administering the locus project, he is able to see a context menu option to check into its child project as an administrator, as shown in FIG. 230. Selecting this option leads to the user being checked into that role, as shown in FIG. 231. Rather than just seeing the user's name in the pull-down menu at the top of the screen, we also see their current role and project. The options for that menu now include "Checkout". While checked in, on any screen to which he navigates, this user may see context menu options and recommendations related to their role on this project. After selecting "Checkout", the user would revert to the state of FIG. 229.

This behavior can be supported by maintaining on the server a current project and current role for each user, which are empty when the user is not checked into any project. The local DAG may be structured to include for each project entity, whether the user has rights under each role for that project entity (e.g., whether there is a direct participation association between the active user and that project or any of its proper ancestor projects). This allows the client to determine where in the hierarchy to show a check-in option. Embodiments may assume that if a check-in option is available for any node, it is available for all descendant project nodes. When creating new nodes, clients should maintain a policy such as this, perhaps also assuming that the active user is an administrator of any new node or that if a new node has no ancestors, the active user is an administrator, consistent with the policy of the server. Embodiments may or may not reload the client's page when a change is made in the current project. Some embodiments may not even require the server to know the checked-in status of any user. These embodiments would maintain locally the available menu options and request recommendations or time-tracking services based on the user's check-in activity.

Selective Knowledge Sharing

Moderation

Some embodiments arrange that contributions offered by the crowd are only visible to the contributor and project administrator until they are approved, and then may become visible publicly or become visible within the organization. When a change is submitted, it is marked as requiring approval. Such systems may support at least a "global" view of a DAG, reflecting approved changes or changes not requiring approval, a user view, for each user, of the DAG reflecting changes awaiting approval by a moderator, and an "administrator" view, making available in some form all updates requiring approval. A user can view content reflecting both accepted changes and those by that user, whether or not submitted for approval. It may be the case that all user changes are immediately submitted for approval. Through the log of changes DAG, changes related to any user view and awaiting approval are visible to a project administrator. A facility may also be provided for a project administrator to assume a user view, to view content reflecting both global changes and those submitted for approval by that user. Database records (both change records and current records) should thus be marked as having been approved or not, with at least unapproved records including the id of the user who made the change so as to control visibility. The intention here is that once a record is approved, it becomes "global", but this designation can have any number of meanings depending on the access model supported by the embodiment and the organization putting it to use; it may, however, potentially be visible to people beyond the user making the change and those approving it.

Some embodiments may allow for the actions of administrators of a project that is lower in the global DAG than another to require approval by an administrator of that higher-level project. A sequence of approvals may thus be required in some cases.

The administrator, in reviewing changes, should be able to select among "accept" and "reject", and if accepting should be able to select the access level (in a simple case, either publicly visible or private to the organization).

To aid in moderation, a user acting (checked-in, as above under "Project Check-ins") as administrator of a project needs to be able to easily identify those entities requiring action, such as new projects requiring approval.

Any user should be able to flag a public entity as requiring moderation. An embodiment might then, after one or more such reports and possibly depending on other factors including the reputation of the flagging user, the recency of the latest change, and the level of activity of the project, roll back the last change to that entity for further review.

Project Access Setting

For simplicity we assume here "public" and "private" access levels, but of course more fine-grained settings are possible. Settings can be specified by project role (below under "Project Governance" as "Individuals may associate with projects under various roles"), including for users unassociated with the project. Settings at the organization or user level can determine the default visibility of top-level projects. If a project is private, all lower-level projects may be assumed to be private. Thus, unless all parents of a project are public, embodiments may make it private. If all parents of a project are public, embodiments may default it to public, private, or require moderation, perhaps depending on the operation involved (e.g., refining solutions or problems, solving, componentizing, editing) or other factors.

Other Selective Knowledge Sharing

Embodiments might make use of project check-ins as described above under "Project Check-ins" so that users only have access related to a particular project role when they are acting in that role.

As described above under "In-place, Iterating DAG Augmentation" as "restatements can also form a basis for controlling access", the structure of projects may be used to control what inherited project (or other entity) information is included in the response to a user request.

Hierarchical Version Control

Recording Independent Changes in Alternate Branches

If independent portions of the system change, those changes should be recorded as separate branches in a DAG. The advantage would be that any single independent change could be undone without disturbing presumably unrelated changes. Such "disturbance" takes the form of conflicts, which must be resolved, putting a burden on the users involved. We do not have perfect knowledge of what changes are independent, so the success of this approach is likely to depend on to what extent we can gain this insight.

For most purposes, different project settings can be considered to be independent.

Text files are more difficult. It is possible to use "diff" file comparison as with standard version control to identify modified lines. "diff" even groups changed lines into "hunks" that are assumed to be related by their proximity, although this is a subjective process. So either every insertion, removal, or modification to a line could be treated as an independent change, or each "hunk" can be treated as independent, for any definition of "hunk".

Although "diff" generally works at the level of replacing entire lines, the same technology could be applied character by character, with "diff" files identifying which characters to replace. This would certainly provide more fine-grained identification of differences and thus more seemingly independent changes. But it is not hard to come up with examples where separate changes are intended to be performed as a unit and undoing one without the other could lead to unpredictable or detrimental results. All of the changes submitted at the same time (part of the same editing "session") might be considered a single change. An operation might also be provided to link two otherwise independent changes so that they are to be considered a single change.

If changes are to be collected as entered, rather than when submitted, by restricting the editing options available to the user and recording their actions, we can gain some insight into their intentions regarding the changes and also avoid ambiguity such as that mentioned above under "DETAILED DESCRIPTION" as "there may be more than one way of recording a change to a file". Where all changes are happening on a dedicated platform, this may be feasible. For example, an embodiment might disallow deletion other than of selected text, so that removal of a block could be considered an atomic operation. This saves a system from having to clump together those low-level operations that seem like they might have been part of a higher-level operation.

If a later change subsumes multiple previous changes, those branches would merge. The larger, later change would have to be rolled back before any of the earlier smaller ones could be rolled back. Deletion of the entity would be an all-encompassing change in that it would subsume all previous changes. So a DAG may take the form of an insertion node leading to various modification paths, all converging at a deletion node.

If an entity is moved from one parent to another, for example a solution is moved from one problem to another, in an embodiment in which such cross-kind relations are many-to-one, that can be considered a modification to the solution. So we might have a path including "solution S created under problem P1", followed by two branches: "solution S moved to problem P2" and "solution S text T1 replaced with text T2 at char range . . . ".

Because moving an entity is an atomic operation that is recorded by the system, we can treat it in this way.

Text being copied from one part of a text field to another would naturally be considered an insertion, but by considering it specifically as a copy, we could preserve that intention if it is reapplied after the original text is modified.

If text is moved from one part of a text field to another, this could also be considered an atomic operation and doing so would preserve the intention if the move is reapplied after the original text is modified. The additional advantage for treating moved text as such is that we can place the move on a single change branch, rather than treating it as separate and independent deletions and insertions.

Each such atomic operation can be considered as a "commit" under standard version control. Traditionally in version control, every change by default contributes to the next potential commit on the current branch. Work must be divided explicitly into sequential commits and parallel branches, and then explicitly merged.

For files that have been uploaded as auxiliary project data (above under "Aggregations of Auxiliary Information" as "Examples of auxiliary information related to projects include . . . files uploaded"), there is a potential for integration with traditional version control. Embodiments that support online editing of uploaded files can have the server register a commit after user submission or other recognition of user changes. In any case, a commit can be generated after each upload of a file, including replacing files that have already been uploaded. Each such commit would correspond to a single modification change (with each distinct file considered a separate sector). On a rollback, the server could direct the traditional version control system to undo destroy that commit and reset to the previous commit.

Embodiments that support undoing a rollback (see below under "History and Conflicts" as "marking the change record as rolled back so that its display can indicate this and so that it can be available for having the rollback undone"), would not destroy the commit but rather create a new branch for it and store that rollback branch on the change record. The master branch would be set back to the previous commit. Upon undoing the rollback, the master branch would be reset to point to the contents of the rollback branch and the rollback branch could be removed.

History and Conflicts

Divide possible changes among a fixed number of sectors. Sectors may be discrete, as with configuration option selections, or they may be represented as ranges or pairs or sets of ranges, for example of text changed, removed, added, copied, or moved (see above under "Recording Independent Changes in Alternate Branches" as "Text being copied from one part of a text field to another . . . " and "If text is moved from one part of a text field to another . . . ") in a field. Edits to distinct text regions are potentially compatible with each other, as are different children moved to a common parent (unless additional structure is required), or setting distinct configuration options. Edits to the same sector potentially conflict, as do any other changes with record deletions. Standard practice of sequencing all modifications then corresponds to treating each entity as a single sector.

Maintain change records for changes to any kind of user data on any kind of non-change record in the system. These changes are associated with a set of sectors and it is these change records that are arranged in a DAG. For various embodiments, the change record will generally contain an indicator of any contents being dropped from the old record and an indicator of the new contents being installed. Each change record affects a set of sectors. The affected sectors can, for example, be represented as a binary number with one bit per defined sector, although any number of representations are possible. It is possible to use full history records rather than change records.

To form the global log DAG, treat each change record as an entity and connect preceding records (as parents) with subsequent ones (as children) that affect any of the same sectors. This relationship is many-many, but after each change, sectors are effectively partitioned such that for each partition there is a unique prior or subsequent change record. As with other DAGs, the global log DAG can be localized to a particular change, in this case to view predecessor states in the context and successor states in the substructure.

Some embodiments may treat distinct entities separately, even if they are related. Others may go beyond the simple structure described above under "Recording Independent Changes in Alternate Branches" as "a DAG may take the form of an insertion node leading to various modification paths, all converging at a deletion node". They may consider DAG augmentations as changes to the augmenting records (specializations, generalizations, or cross-kind associations such as solutions), so that it is not possible to roll back the creation of an entity without rolling back the creation of derivative entities. The change log of some entity originally created as a root node then includes all of its augmentations (direct and indirect) as well as modifications to the entity and any of those augmentations. This brings up an issue of how to treat moving an entity among various parents. Doing so could leave a stub "move" node as a child of each source parent, and potentially a sequence of "move" nodes with the moved child under the final target.

It should be possible to filter the log by user who made the change, or by project. Some embodiments may present the log as a secondary DAG (as described above under "Secondary DAGs") to responsible users or projects, such that the log entries included vary with the range of responsible users. If logs are used to represent changes to other entities, such as users or skills, then these can also be presented as secondary DAGS to either a user DAG for selecting a range of responsible users or the appropriate entity DAG, for selecting a range of entities whose changes should be included.

The selection of primary entities may likely affect how log entries are displayed. A deletion node (perhaps marked with "x") may always be set as a leaf. A creation node (perhaps marked with "+") may always be set as a root for an entity with no parents, but otherwise may be set, in the logical tree, as a child of the creation node of any of its parents. A change node (perhaps marked with "~") may be set as a non-root node. If only viewing the dependent entity, the root of the log may be its creation node and a move from one independent node to another under the same cross-kind relation may be represented by an internal node (perhaps marked with ">→") associated with a sector dedicated to direct objects under that relation. Such nodes may be cascaded for multiple sequential moves. A move from one independent node to another under a different cross-kind relation would be considered to affect the sectors for parents under both relations involved. Moves to or from parents under refinement or other many-to-many relations may be treated as affecting a separate sector for each parent entity involved. If viewing the dependent entity under an independent entity, its creation node may be set as an internal node affecting the sector for parents under that cross-kind relation. The parent node could be the creation node for that parent entity if the child entity were created directly as an augmentation, or a move-from node (perhaps marked with "→") if the child entity were moved to that parent. A move away from that parent (change to its object), when viewing the dependent entity under its object, may be represented as a leaf move-to node (perhaps marked with ">-"). Embodiments may choose to use other markings or icons.

A rollback operation can be initiated from any node of the DAG, and will for various embodiments undo the entire subtree rooted at that node, beginning with the leaves (in any order) and working inward.

Similarly to links within the change hierarchy itself, a 'latest' change record (a leaf in the hierarchy) and the resulting current record are connected by a database association. This may be necessary for extending the change hierarchy as users modify entity data. Again, sectors are effectively partitioned such that for each partition there is a distinct latest change record. The initial change record creating an entity is assumed to affect all sectors.

When a user or multiple users suggest changes to sectors that overlap with those of a previous change, those changes are ordered; the prior change is considered the "change of record" only for the set difference between the set of sectors affected by the prior change less the set of sectors affected by the subsequent change, while the subsequent change is considered the "change of record" for all of the sectors that it affects.

As we have seen, branching occurs when a user or multiple users suggest a change to sectors that do not overlap with those affected by a prior change. In that case, for various embodiments multiple child change records will be created under a single parent change record, related to non-overlapping sectors.

Branching also occurs when distinct users (or the same user from different sessions) suggest different changes to follow the same prior change, affecting overlapping sectors. This can happen when two users (or the same user in two sessions) check out a page before either of them updates the page. Such changes are considered to conflict.

Conflicts can also happen in systems that require moderators to approve user changes before they become visible, as described above under "Moderation". With such moderation, after any change (including augmentations, not just modifications) is submitted, the change is marked as requiring approval. Only one current record may exist for any entity key value and view (global or for a particular user). Database records can be given an additional key of the user whose unapproved changes are reflected, or such content can be derived as necessary on page loads from the global content by applying unapproved change records for that user. In either case, change records for unapproved changes should be identified by user and the latest such records may be made accessible for any user, entity, and sector selection.

Merging occurs when a user suggests a single change that affects the sectors of multiple prior changes, either directly (discussed above under "Recording Independent Changes in Alternate Branches" as "If a later change subsumes multiple previous changes") or when asserted as a resolution of conflicting prior changes. Conflict resolutions may or may not themselves be considered to conflict with changes that affect any of the same sectors as affected by the changes being resolved (including other resolutions of the same conflict).

For creation of a root entity, it is only necessary to create a user or global change record (depending on whether approval is required) with all sectors marked as affected and to associate this with a new user or global current record representing the entity.

When the server satisfies a load request for an existing entity for the client, it can pass the client the mapping from sectors to change records. If the client then asks to mutate the entity, with that change request it can pass back to the server that mapping, or it can compute the previous change records for the affected sectors, and just pass identifiers for those records. Alternatively, the server can track which client sessions are working off of which change records. When the server receives from the client a request to make a particular change to a particular record, it may need to create a change record for the affected sectors along with any number of associations with the previous change records for overlapping sectors, update the current record, and associate it with the new change record.

Even after a change record is accepted and a current record updated (for either approved or unapproved records), a subsequent request may be received that builds off of a prior change record. In such a case, embodiments may create a conflict post-facto and roll back the intervening changes so that the current record reflects the last common state of both sequences. In some situations, it may not be possible for more than a single change to have been made since the last common state.

Creation of a conflict record allows an administrator for a global view or the user for a user view, to quickly identify and resolve the conflict. It contains references to the conflicting change records and the sectors affected (in some unambiguous format such as in terms of the common ancestor state).

So first, if any approved change had been entered by any user or any unapproved change had been entered by the same user (where approval is required) for an entity of the same key values, potentially conflicting sectors, and distinct changes, off of the same prior change record, neither has any clear precedence and only one current record may exist for that entity's key value and that view, so some embodiments may mark such approved changes as unapproved and no longer current and create a conflict for an administrator to resolve, or mark such unapproved changes as no longer current and create a conflict for that user to resolve. Alternatively, it is possible to leave the change that had succeeded until the conflict is resolved.

The server can determine whether the change record upon which edits are based is still current for the sectors affected. If no approval is required, it is only necessary to check whether the global record upon which the edits are based is still current. If not, there is a conflict which may be flagged. One approach is to consider the recent changes to be unapproved changes belonging to the user who made them and restore the global record by rolling them back until the global record upon which the edits are based is current. Then create a new unapproved change record, create a current record for the user reflecting those changes, and associate the new change record with the previous change record and the new current record. Another approach is to leave the global current record as is and create a new unapproved change record and unapproved current record for this user view. If approval is required, the server should check both whether the user has any more recent change records and whether the global record upon which any sequence of user edits was based is still current. If more recent user change records are found, either of the options mentioned can be applied for the user, and the user can be left to resolve the conflict. If more recent global records are found, it is not appropriate to roll anything back. Again leave the global current record as is and create a new unapproved change record and unapproved current record for this user view. A process for handling change requests is in FIG. 232.

On viewing the log, an administrator should see a list of conflicts for different sectors and be permitted to select one to resolve. Resolutions should allow selecting one of the updates or copying and pasting text between them, and then approving that change, or rejecting all changes. If the embodiment allows approval and rejection of changes to conflict with other changes, a new resolution change is requested using Request Change 001.

To approve a user change request for global view, the server should check for subsequent global changes that build off of a later change record for the affected sectors. If any exist, the unapproved change record should be made to follow those after assuring the conflict is appropriately resolved. Then, the change record can be marked as approved and the current global record updated to reflect the changes. The current global record should be associated with this change record. If this was the final remaining unapproved change for that entity and user view, there is no need for a current user record so it may be deleted. Finally, if this approval is resolving a conflict, the conflict flag can be removed. A process for approving change requests is in FIG. 233. We assume here that all preceding change records are approved. To operate with unapproved preceding change records, the process should be iterated over those, earliest first. Since change records form a DAG, embodiments may record visited records so as to process each only once.

Rejecting a change is slightly simpler. Delete the unapproved change record and then undo the changes it specifies in the user's current record for that entity. The user current record should be associated with the prior change records. The remaining steps are similar to those of FIG. 233. A process for rejecting change requests is in FIG. 234. We assume here that all preceding change records are approved. To operate with unapproved preceding change records, the process should be iterated over those, latest first. Since change records form a DAG, embodiments may record visited records so as to process each only once.

A user may also view the log to select a change record to be rolled back. Administrators select an approved change or a user's unapproved change to be rolled back, while general users select only their own unapproved change to be rolled back. A change record not already rolled back may be selected to be rolled back. The operation of undoing changes specified in a change record across alternative paths should be commutative, which should be possible since the changes on distinct paths should be independent of each other. Users may, for example, restore records that have been deleted, so that they are available to be updated by a current change based off of a prior state. This involves marking the change record as rolled back so that its display can indicate this and so that it can be available for having the rollback undone. It also involves undoing the specified changes in the current record and associating the current record with any change records prior to the one being rolled back. Again, we delete the user's current record if it is no longer distinguished from the global one. A process for rolling back a single change record is in FIG. 235. We assume here that any subsequent change records have already been rolled back and that preceding change records have not been rolled back. To operate with subsequent change records not yet rolled back, the process should be iterated over those, latest first. Since change records form a DAG, embodiments may record visited records so as to process each only once.

If change approvals and rejections appear in the log with other changes, embodiments may support rolling them back, either explicitly or due to later, conflicting approvals.

Preferred embodiments make rollbacks not necessarily permanent (a rogue or mistaken rollback could otherwise be very damaging). Rolled back changes could be displayed as grayed out in the log. Thus rollbacks could themselves be undone. Undoing a roll-back would make it as if the rollback never happened (so that there is no need to roll back an undo of a rollback).

A rollback could be done either by an administrator for global or individual view or by an individual user only for individual view. A current user record may need to be created if it did not already exist and the rollback is being undone for a user. The change record should be marked as not rolled back and made accessible from the current record, upon which the changes are replayed. A process for undoing rollbacks is shown in FIG. 236. We assume here that any previous change records are not rolled back. To operate with rolled back previous change records, the process should be iterated over those, earliest first. Since change records form a DAG, embodiments may record visited records so as to process each only once.

Other Issues

Mutating DAGs

Because structures are rarely created perfectly the first time through, many embodiments may support operations to mutate the structure of a DAG. These operations could take place in the substructure or context, but some embodiments may restrict them to only the substructure.

Editing

Editing is the most straightforward form of DAG mutation, as it leaves the structure in place. Just as individual nodes were modified during in-place iteration, the same occurs during editing except that instead of implicitly creating new nodes, the client and server really do modify the information at a particular node.

Unlinking

Unlinking a node involves separating it from its parent in the logical tree forming the substructure or the context. It may still be connected by other links. If not, however, the node and all of its descendants that are not connected to other parts of the logical tree may be destroyed, as they will for various embodiments become unreachable. This can be implemented by descending through the tree, removing nodes with only a single parent. Upon reaching a node with multiple parents, remove the link to the one from which it was reached and stop descending.

The client may perform this operation on the local DAG. The server may need to repeat it on the global DAG, and may find that nodes that were unreachable in the local DAG are in fact reachable in the global DAG, and thus are not destroyed.

A locus node cannot be unlinked.

Deleting

There are actually two potential operations here, that can be distinguished based on whether the node being deleted has a non-empty subtree expanded, or whether it is either empty or closed.

If it is empty or closed, various embodiments may simply destroy the node and all of its descendants (in the logical tree). As embodiments descend, they may remove any links to the nodes being deleted from other nodes. This operation can be performed on both the client and the server, the only difference being that the server may remove additional links.

If the node's expansion folder is open, embodiments can destroy just the one node and replace in each of its children's list of parents, the node being destroyed with the parent node from which it was accessed, and replace in the list of children of the parent node from which it was accessed, the node being destroyed with each element of the list of children of the node being destroyed.

Additional operations can be provided to delete a locus node, which might handle the various cases of its context and substructure folders being open, closed, or empty as above.

The operation on open expansion folders is best suited for situations where there is only one relation between any two kinds of entities. Otherwise, the user may need to be queried for the relation that they want to use in bridging the gap over the deleted node.

Cutting and Pasting

It is useful to be able to select a node, cutting it, and pasting it elsewhere. This can again take the form of multiple operations, depending on whether the expansion folder of the node being cut is open or closed/empty.

If the node being cut has a closed expansion folder, the intention is to move the entire subtree elsewhere. The path to the locus from the node being cut is captured and saved, and (as is standard practice) the image of the cut node blurred slightly to indicate that it has been cut. If there is no subsequent paste operation, (again as is standard practice) the cut node is restored unchanged. If there is a paste operation, the cut node is unlinked (just that node, which is not destroyed) and the parent by which it was accessed is replaced with the node to which it is being pasted.

If indirect objects are stored and the correspondence constraints under "Explicit DAG Augmentation by Specialization/Multiple simultaneous refinement" or "DAG Generalization" are enforced, a proof is required that is similar to the case of "DAG Refinement of Existing Entities" above when a refinement association is being created and the root node being moved is a child in the local DAG of its object.

Cutting a node where its expansion folder is open can be interpreted as splicing out that node (similar to deletion of an open node above), and inserting it at the paste point as a child. Some embodiments might, if the expansion folder at the past point is open, splice in the single node below the past point node but above its children, but there is no similar splicing operation for an entire subtree.

The operation of cutting from an open expansion folder is again best suited for situations where there is only one relation between any two kinds of entities, for the same reason as for deletion above.

Refinement Text as Difference with Refined

Rather than merely using the text of a refined entity as the default initial text for a specializing entity or the text of a refining entity as the default initial text for a generalizing entity, to be edited and discarded, embodiments may choose to store the difference in text along with the new text. Then, if part of the text that was not changed is modified in the original entity, we can adjust the new entity's difference specification and recalculate its text so as to incorporate the change to the original entity. For example, if in a specialization text of 5 characters is added at a position 10 characters into the string, and a later update to the refined node removes 3 characters (the fourth through sixth), the difference specification would be modified to say that the text of 5 characters is added at a position 7 characters into the string and those three characters deleted from the refining text as well. This requires recording the specializing or generalizing entities of any existing entity or marking each refinement association with the direction in which it was applied, so that upon a modification, any specializing or generalizing entities (whether direct or via a sequence of refinements) can be adjusted appropriately.

Project Governance

Individuals may associate with projects under various roles (potentially including administrator, advisor, collaborator, investor). An administrator is responsible for moderating project activity; and advisor for providing feedback on ideas presented; a collaborator for helping to implement projects (perhaps only solutions). An investor (funder) may or may not be treated as an advisor.

Various centralized and decentralized forms of project governance are possible using these techniques, so it is an ideal framework with which to compare their effectiveness. A centralized structure would have a fixed set of administrators who would moderate all content. A less centralized structure would allow individuals associated with (or having created) more general problems and solutions to make decisions on behalf of those projects, with those higher in the project hierarchy overruling those lower in the hierarchy. Augmentations to the project hierarchy would then be reviewed by those responsible for the entity or entities being augmented. Additionally, any or selected actions taken by the user augmenting the project might be reviewable by administrators of the augmented projects whenever such administrators deemed such oversight appropriate.

Alternatively, a voting mechanism could be established, likely apportioning votes based on inferred influence within the project. Since some individuals may necessarily be more involved in the details of projects than others, but many individuals may know who they trust and respect on a project, many embodiments may support governance by proxies, where people give to others authority to vote on their behalf to answer questions such as when solutions are to be implemented and how conflicts in modifying project structure are to be resolved. Such grants of authority can be made for a particular project and be inherited through the substructure of that project, but may be overridden for any particular elements of the substructure and their descendants. Various embodiments may support chaining of proxy assignments.

Influence on a project can be inferred by subsequent activity related to project structures created and/or edited by that individual, including but not exclusively augmentation of those project structures.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently.

The datastores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

The invention claimed is:

1. An apparatus comprising:
a processor-implemented engine;
memory coupled to the processor-implemented engine; and
a display coupled to the processor-implemented engine, the apparatus implementing aspects of a project management system, wherein the processor-implemented engine is directed according to instructions stored in the memory, for each input tree of one or more input trees, that input tree comprising a root node and for each other node a parent node of that other node, the one or more input trees encompassed by a directed acyclic graph (DAG) in which that input tree is inverted such that that other node is a parent in the DAG of the parent node of that other node in that input tree, at least one project node of that input tree indicating at least one project of a plurality of projects, to embed a respective displayed subtree of that input tree comprising the root node of that input tree and consisting of a connected set of descendants of the root node of that input tree, the respective displayed subtree growing in a first direction, within a substrate tree growing in a different direction than the first direction, each displayed node of each displayed subtree being indicated by a respective substrate node of the substrate tree and each displayed child of that displayed node being indicated by an ancestor in the substrate tree of the respective substrate node indicating that displayed node, a respective extended displayed subtree of that input tree subsuming the respective displayed subtree for each displayed node in the respective displayed subtree of that input tree with children in that input tree, the respective extended displayed subtree comprising a respective list of at least one parent node, the respective list of at least one parent node containing one parent node for each parent in the DAG of that displayed node with children, by:
a) receiving the one or more input trees;
b) for each input tree of the one or more input trees, presenting on the display via the substrate tree the respective displayed subtree of that input tree; and
c) upon direction by a user, expanding a given displayed node without children in the respective displayed subtree of a given input tree of the one or more input trees and with children in the given input tree, the given displayed node indicating a given displayed project of the plurality of projects, embedding the respective extended displayed subtree for the given displayed node within the substrate tree, by:
   i) dynamically allocating in the substrate tree a respective list of at least one parent substrate node for the given displayed node, each parent substrate node in the respective list of at least one parent substrate node indicating a displayed child of the given displayed node in the respective extended displayed subtree, the respective list of at least one parent substrate node comprising a first parent substrate node and a last parent substrate node; and
   ii) moving the respective substrate node indicating the given displayed node to descend in the substrate tree from the last parent substrate node of the respective list of at least one parent substrate node for the given displayed node, thereby enabling the user to explore the plurality of projects through the respective displayed subtree of the given input tree, growing in the first direction, embedded within the substrate tree, growing in the different direction than the first direction.

2. The apparatus of claim 1, wherein the given displayed node has a child displayed node in the DAG and the given displayed node is of greater height in the given input tree than any other parent in the DAG of the child displayed node and the given displayed node is not already indicated by the first parent substrate node of the respective list of at least one parent substrate node for the child displayed node, and the processor-implemented engine is further directed to:

move the respective substrate node indicating the given displayed node to be sequenced as the first parent substrate node of the respective list of at least one parent substrate node for the child displayed node,
thereby maintaining expansion of the first parent substrate node of each list of at least one parent substrate node at least as far as any other parent substrate node of that list of at least one parent substrate node.

3. The apparatus of claim 2, wherein the given displayed node was initially indicated by the last parent substrate node of the respective list of at least one parent substrate node for the child displayed node and the processor-implemented engine is further directed to:
move a plurality of descendant nodes that are descended in the substrate tree from the respective substrate node initially indicating the given displayed node to descend in the substrate tree from the parent substrate node now sequenced as the last parent substrate node of the respective list of at least one parent substrate node for the child displayed node,
thereby maintaining each substrate node indicating a respective child node that is related as a child to the parent node of the given displayed node in the given input tree within a context exploration of the respective substrate node indicating the parent node of the given displayed node in the given input tree.

4. The apparatus of claim 2, a plurality of the root node of each input tree of the one or more input trees sharing a common ancestor in the DAG, wherein:
a) the substrate tree comprises a plurality of lists of at least one substrate node, each list of at least one substrate node of the plurality of lists of at least one substrate node comprising a last substrate node, and a plurality of context frame forests, an inner list of at least one substrate node of the plurality of lists of at least one substrate node being nested within a context frame tree of an outer context frame forest of the plurality of context frame forests in the substrate tree and an inner context frame forest of the plurality of context frame forests comprising at least one context frame tree being nested within an outer list of at least one substrate node of the plurality of lists of at least one substrate node in the substrate tree, wherein:
 i) a respective list of at least one substrate node of the plurality of lists of at least one substrate node is descended in the substrate tree from each context frame tree of each context frame forest of the substrate tree; and
 ii) the inner context frame forest is descended in the substrate tree from the last substrate node in the outer list of at least one substrate node;
b) the outer list of at least one substrate node comprises the substrate node indicating each parent in the DAG of the displayed node indicated by the first substrate node of the list of at least one substrate node nested within each context frame tree in the inner context frame forest, the outer list of at least one substrate node being the respective list of at least one parent substrate node for the first substrate node of the list of at least one substrate node nested within the first context frame tree in the inner context frame forest; and
c) each context frame forest of the plurality of context frame forests represents a DAG context exploration from each first substrate node of the list of at least one substrate node of each context frame tree of that context frame forest, an outermost context frame forest representing the DAG context exploration in a suspended state and the inner context frame forest representing the DAG context exploration in an active state,
thereby displaying a single representation of the DAG context exploration from the common ancestor in the DAG of the plurality of the root node of each input tree of the one or more input trees.

5. An apparatus comprising:
a processor-implemented engine;
memory coupled to the processor-implemented engine; and
a display coupled to the processor-implemented engine,
the apparatus implementing aspects of a project management system, wherein the processor-implemented engine is directed according to instructions stored in the memory to:
a) receive a localized DAG comprising a plurality of local entities and a plurality of local associations, the plurality of local entities subsuming a plurality of local projects, the plurality of local projects comprising at least one locus project, each local association of the plurality of local associations relating a child entity and a parent entity of the plurality of local entities, each local entity of the plurality of local entities being ascended or descended in the localized DAG from a respective at least one source locus project of the at least one locus project for that local entity;
b) visually present each locus project of the at least one locus project on the display, that locus project indicated by:
 i) a context root node of a respective context tree growing in a first direction from that locus project, a respective context subtree rooted at each node of the respective context tree, the respective context tree being the respective context subtree for the context root node; or
 ii) a substructure root node of a respective substructure tree growing in a different direction than the first direction from that locus project, a respective substructure subtree rooted at each node of the respective substructure tree, the respective substructure tree being the respective substructure subtree for the substructure root node,
the context root node and the substructure root node coinciding and indicating the locus project where both the context root node and the substructure root node are presented for a locus project of the at least one locus project; and
c) upon direction by a user, collapse and expand:
 i) the respective context subtree for a given context node indicating a given context project of the plurality of local projects, within the respective context tree for a given context source locus project of the respective at least one source locus project for the given context project, wherein upon expansion of the given context node, prior to presenting a plurality of presented given context project ancestor entities that are ascended in the localized DAG from the given context project, the plurality of presented given context project ancestor entities comprising at least one already-visible proper context entity, each already-visible proper context entity of the at least one already-visible proper context entity indicated by a respective already-visible proper context node on the respective context tree for the given context source locus project, the respective already-visible proper context node already visible on the display as a child of a respective already-visible parent context node, the apparatus selectively collapses the respective already-visible parent context node for each already-visible proper context entity of the at least one already-visible proper context entity; or
  ii) the respective substructure subtree for a given substructure node indicating a given substructure project of the plurality of local projects, within the respective substructure tree for a given substructure source locus project of the respective at least one source locus project for the given substructure project, wherein upon expansion of the given substructure node, prior to presenting a plurality of presented given substructure project descendant entities that are descended in the localized DAG from the given substructure project, the plurality of presented given substructure project descendant entities comprising at least one already-visible proper substructure entity, each already-visible proper substructure entity of the at least one already-visible proper substructure entity indicated by a respective already-visible proper substructure node on the respective substructure tree for the given substructure source locus project, the respective already-visible proper substructure node already visible on the display as a child of a respective already-visible parent substructure node, the apparatus selectively collapses the respective already-visible parent substructure node for each already-visible proper substructure entity of the at least one already-visible proper substructure entity, thereby enabling the user to explore the plurality of local entities as being ascended or descended in the localized DAG from each locus project of the at least one locus project, via the respective context tree for that locus project or the respective substructure tree for that locus project, respectively, with each entity of the plurality of local entities indicated by at most one visible node.

6. The apparatus of claim 5, wherein the processor-implemented engine is further directed to:
  a) where the at least one locus project comprises a second given context source locus project distinct from the given context source locus project, upon expansion of the given context node:
    i) for a first presented given context project ancestor entity of the plurality of presented given context project ancestor entities, each parent entity that is related as a parent in the localized DAG to the first presented given context project ancestor entity being indicated by a first respective already-visible child proper context node that is a child of a common already-visible parent context node on the respective context tree for the second given context source locus project, arrange the first presented given context project ancestor entity on the display to share the first respective already-visible child proper context node indicating each parent entity with the common already-visible parent context node as context; and
    ii) for a second presented given context project ancestor entity of the plurality of presented given context project ancestor entities, prior to presenting a plurality of parents-to-be-displayed within the plurality of presented given context project ancestor entities on the display, a respective association of the localized DAG relating each parent-to-be-displayed of the plurality of parents-to-be-displayed as parent of the second presented given context project ancestor entity, each already-visible parent entity of at least one already-visible parent entity of the plurality of parents-to-be-displayed indicated by a second respective already-visible child proper context node that is a child of an already-visible parent context node on the respective context tree for the second given context source locus project, and each not-yet-visible parent entity of at least one not-yet-visible parent entity of the plurality of parents-to-be-displayed not indicated by any already-visible node on the display, selectively collapse the already-visible parent context node on the display; or
  b) where the at least one locus project comprises a second given substructure source locus project distinct from the given substructure source locus project, upon expansion of the given substructure node,
    i) for a first presented given substructure project descendant entity of the plurality of presented given substructure project descendant entities, each child entity that is related as a child in the localized DAG to the first presented given substructure project descendant entity being indicated by a first respective already-visible child proper substructure node that is a child of a common already-visible parent substructure node on the respective substructure tree for the second given substructure source locus project, arrange the first presented given substructure project descendant entity on the display to share the first respective already-visible child proper substructure node indicating each child entity with the common already-visible parent substructure node as substructure; and
    ii) for a second presented given substructure project descendant entity of the plurality of presented given substructure project descendant entities, prior to presenting a plurality of children-to-be-displayed within the plurality of presented given substructure project descendant entities on the display, a respective association of the localized DAG relating each child-to-be-displayed of the plurality of children-to-be-displayed as child of the second presented given substructure project descendant entity, each already-visible child entity of at least one already-visible child entity of the plurality of children-to-be-displayed indicated by a second respective already-visible child proper substructure node that is a child of an already-visible parent substructure node on the respective substructure tree for the second given substructure source locus project, and each of at least one not-yet-visible child entity of the plurality of children-to-be-displayed not indicated by any already-visible node on the display, selectively collapse the already-visible parent substructure node on the display, thereby presenting to the user a common context exploration from the respective context tree for the given context source locus project and the respective context tree for the second given context source locus project or a common substructure exploration from the respective substructure tree for the given substructure source locus project and the respective substructure tree for the second given substructure source locus project, with each set of local entities within the plurality of local entities represented on the display by at most one visible set of children nodes.

7. The apparatus of claim 5, each contributing local project of a plurality of contributing local projects within the plurality of local projects being associated with ordered auxiliary project information, the ordered auxiliary project information comprising a plurality of items maintained to be accessed in order as sorted by a key, wherein the processor-implemented engine is further directed to:
  a) dynamically aggregate the ordered auxiliary project information via a merging process across a plurality of visible local projects currently visible to the user within the plurality of local projects, generating a dynamically-changing aggregation comprising an aggregated plurality of items within the plurality of items; and
  b) present the dynamically-changing aggregation to the user,
  thereby enabling the user, while exploring the plurality of local projects, being a customized collection of projects, as ascended or descended in the localized DAG from the at least one locus project, to visualize the dynamically-changing aggregation of the ordered auxiliary project information across the plurality of visible local projects, the ordered auxiliary project information associated with a now-hidden project of the plurality of contributing local projects being removed from the dynamically-changing aggregation upon removal of a node indicating the now-hidden project from the display, a particular item of the aggregated plurality of items being of the auxiliary project information associated with a common ancestor project of the plurality of contributing local projects, the common ancestor project ascended in the localized DAG from a first locus project of the at least one locus project and from a second locus project of a second at least one locus project of the plurality of local projects, the particular item appearing in a second dynamically-changing aggregation alongside a neighboring item of the plurality of items but not of the aggregated plurality of items.

8. The apparatus of claim 7, the apparatus implementing aspects of a social network, the apparatus comprising networking hardware supporting the processor-implemented engine in acting as a client communicating with one or more computing devices, wherein the processor-implemented engine is further directed to request and receive the localized DAG from a server, the localized DAG extracted by the server from a global DAG, the plurality of associations comprising:
  a) a social refinement association indicating that the child entity for the social refinement association refines the parent entity for the social refinement association, the child entity and the parent entity for the social refinement association being of the plurality of contributing local projects and of the plurality of visible local projects, the child entity for the social refinement association being created by a first user and being associated with a first organization and the parent entity for the social refinement association being created by a second user and being associated with a second organization, the social refinement association being a mutually approved, directed connection; and
  b) a non-social association, the child entity and the parent entity for the non-social association being of the plurality of contributing local projects and of the plurality of visible local projects and being created by the second user and being associated with the second organization, the non-social association not requiring mutual approval,
  thereby causing the dynamically-changing aggregation to include ordered auxiliary project information for the child entity and the parent entity for both the social refinement association and the non-social association.

9. An apparatus comprising:
a processor-implemented engine;
memory coupled to the processor-implemented engine; and
networking hardware supporting the processor-implemented engine in acting as a server communicating with one or more computing devices,
wherein the processor-implemented engine is directed according to instructions stored in the memory to:
  a) receive identification of at least one locus project of a plurality of projects from a client;
  b) extract a respective localized directed acyclic graph (DAG) localized to the at least one locus project, the respective localized DAG of a plurality of localized DAGs, from a global DAG comprising a plurality of entities and a plurality of associations, the plurality of entities subsuming the plurality of projects, each association of the plurality of associations relating a child entity and a parent entity of the plurality of entities;
  c) perform a reconfiguration upon the respective localized DAG; and
  d) transfer the respective localized DAG to the client,
  the respective localized DAG comprising:
  1) a plurality of local entities comprising a constituent entity corresponding to each entity of a plurality of particular reachable entities within the plurality of entities, each entity of the plurality of particular reachable entities being ascended or descended in the global DAG from a respective at least one source locus project of the at least one locus project of the plurality of projects by a respective at least one path, at least one constituent locus project corresponding to the at least one locus project; and
  2) a plurality of local associations comprising a constituent association corresponding to each association of the plurality of associations on the respective at least one path for each entity of the plurality of particular reachable entities, that constituent association relating the constituent entity corresponding to the child entity for that association as a child local entity and the constituent entity corresponding to the parent entity for that association as a parent local entity, wherein:
    i) the plurality of associations subsumes a plurality of refinement associations, each refinement association of the plurality of refinement associations indicating that the child entity for that refinement association refines the parent entity for that refinement association,
  the reconfiguration comprising, for each inheritable entity of a respective at least one inheritable entity of the plurality of entities for the at least one locus project, that inheritable entity descended in the global DAG from a respective inheritable child entity by a respective inheritable entity path, the plurality of projects comprising a respective proper refinement ancestor project that is related as a parent in the global DAG to the respective inheritable child entity and that is ascended in the global DAG from a respective inheriting locus project of the at least one locus project by a respective inheritance path by way of a respective sequence of one or more refinement associations of the plurality of refinement associations, a deep inheritable component of the respective at least one inheritable entity not being the respective inheritable child entity, a respective constituent inheriting locus project of the at least one constituent locus project corresponding to the respective inheriting locus project:
  A) where that inheritable entity is a non-locus-descended inheritable entity not descended in the global DAG from any locus project of the at least one locus project:
    I) the plurality of local entities comprising a respective inherited entity corresponding to the non-locus-descended inheritable entity; and
    II) the plurality of local associations comprising a respective inheriting association with the respective inherited entity corresponding to the non-locus-descended inheritable entity as the child local entity and with the respective constituent inheriting locus project for that inheritable entity being ascended in the respective localized DAG for the at least one locus project from the parent local entity; and
  B) where that inheritable entity is a locus-descended inheritable component, an already-inherited-or-constituent component corresponding to the locus-descended inheritable component being descended in the respective localized DAG for the at least one locus project from the respective constituent inheriting locus project for that inheritable entity:
    I) the plurality of local associations comprising a respective merging association with the already-inherited-or-constituent component as the child local entity and with a parent inherited entity corresponding to the parent of the locus-descended inheritable component along the respective inheritable entity path as the parent local entity,
thereby supporting the client in enabling a user of the client to request the respective localized DAG for the at least one locus project and then visualize as descended from the respective constituent inheriting locus project and initiate an operation upon the respective inherited entity corresponding to the deep inheritable component within an integrated hierarchy with parents comprising at least one inherited parent entity corresponding to an inheritable parent entity on the respective inheritable entity path for the deep inheritable component and at least one other parent entity not corresponding to any inheritable parent entity on the respective inheritable entity path for the deep inheritable component.

10. The apparatus of claim 9, the apparatus implementing aspects of a social network, the respective inheritance path for an automatically-shared inheritable entity of the respective at least one inheritable entity comprising:
  a) a social refinement association, the child entity for the social refinement association being created by a first user of the client and being associated with a first organization and the parent entity for the social refinement association being created by a second user of the client and being associated with a second organization, the social refinement association being a mutually approved, directed connection; and
  b) a non-social refinement association, the child entity and the parent entity for the non-social refinement association being created by the second user and being associated with the second organization, the non-social refinement association not requiring mutual approval,
thereby inheriting the automatically-shared inheritable entity as the respective inherited entity corresponding to the automatically-shared inheritable entity through the social refinement association and through the non-social refinement association.

11. The apparatus of claim 9, wherein:
  a) the plurality of projects subsumes a plurality of problems and a plurality of solutions, no project being in both the plurality of problems and the plurality of solutions;
  b) the plurality of refinement associations comprises:
    i) a problem refinement association that relates a child problem of the plurality of problems and a parent problem of the plurality of problems, indicating that the child problem specializes the parent problem; or
    ii) a solution refinement association that relates a child solution of the plurality of solutions and a parent solution of the plurality of solutions, indicating that the child solution elaborates upon the parent solution; and
  c) the respective at least one inheritable entity comprises an inheritable project of the plurality of projects, wherein:
    i) the inheritable project is an inheritable solution of the plurality of solutions, the respective inherited entity corresponding to the inheritable solution being an inherited solution of the plurality of local entities, the respective inheriting locus project for the inheritable solution being a respective inheriting locus problem of the plurality of problems and the respective proper refinement ancestor project for the inheritable solution being a respective proper refinement ancestor problem of the plurality of problems; or
    ii) the inheritable project is an inheritable problem of the plurality of problems, the respective inherited entity corresponding to the inheritable problem being an inherited problem of the plurality of local entities, the respective inheriting locus project for the inheritable problem being a respective inheriting locus solution of the plurality of solutions and the respective proper refinement ancestor project for the inheritable problem being a respective proper refinement ancestor solution of the plurality of solutions,
  thereby supporting the client enabling the user to visualize as descended in the respective localized DAG for the at least one locus project from the respective constituent inheriting locus project and initiate the operation upon the inherited solution corresponding to the inheritable solution, the inheritable solution addressing the respective proper refinement ancestor problem, a more general problem than the respective inheriting locus problem, or the inherited problem corresponding to the inheritable problem, the inheritable problem decomposing the respective proper refinement ancestor solution, a less elaborate solution than the respective inheriting locus solution.

12. The apparatus of claim 11, the at least one locus project being at least one locus problem of the plurality of problems, the plurality of entities subsuming a plurality of condition components, the respective at least one inheritable entity being a respective at least one inheritable condition component of the plurality of condition components, wherein:
  a) at least one data-based context problem of the plurality of problems is the respective proper refinement ancestor project for each inheritable condition component of the respective at least one inheritable condition component, the at least one data-based context problem being implicitly or explicitly associated with a respective database of a plurality of databases, the respective database for each data-based context problem comprising data arranged as a plurality of attributes, at least one data-based inheriting locus problem being the respective inheriting locus project for each inheritable condition component of the respective at least one inheritable condition component;
b) the plurality of condition components subsumes a plurality of terms that express equalities or inequalities over at least one attribute for at least one database of the plurality of databases and comprises at least one Boolean operator;
c) each attribute referenced by a term of each condition component of the plurality of condition components is for a database associated with a data-based context problem ascended in the global DAG from that condition component; and
d) the processor-implemented engine is further directed to:
  i) formulate a query relating to the at least one locus problem, the query comprising a condition comprising the respective at least one inheritable condition component, the query supporting aggregation of results;
  ii) resolve the query on the respective database of each condition component of the query to obtain a query result; and
  iii) transfer the query result to the client,
thereby integrating the structure of the respective at least one inherited entity corresponding to the respective at least one inheritable condition component with the structure of at least one already-inherited-or-constituent condition component descended in the respective localized DAG for the at least one locus problem from the at least one constituent inheriting locus project for the respective at least one inheritable condition component, the at least one inherited condition component and the at least one already-inherited-or-constituent condition component being of the plurality of condition components, supporting the client in motivating and tracking progress in addressing the at least one locus problem by presenting the query result, serving as a measure by which the at least one locus problem is quantified, the query formulated from the respective at least one inheritable condition component for the at least one locus problem, gathered as relevant to the at least one data-based inheriting locus problem.

13. The apparatus of claim 12, wherein:
a refining data-based problem of the at least one data-based inheriting locus problem refines each refined data-based problem of at least one refined data-based problem of the at least one data-based context problem, each refined data-based problem of the at least one refined data-based problem having a respective at least one condition component descendant in the global DAG, and the condition for the refining data-based problem being formulated as a conjunctive condition, being a conjunction of a respective condition formulated for each refined data-based problem of the at least one refined data-based problem from the respective at least one condition component descendant for that refined data-based problem,
thereby supporting the client in enabling the user to implicitly associate the conjunctive condition with the refining data-based problem upon navigation to the refining data-based problem.

14. The apparatus of claim 12, wherein:
a refined data-based problem of the at least one data-based inheriting locus problem is refined by each refining data-based problem of at least one refining data-based problem of the plurality of problems, each refining data-based problem of the at least one refining data-based problem having a respective at least one condition component descendant in the global DAG, and the condition for the refined data-based problem being formulated as a disjunctive condition, being a disjunction of a respective condition formulated for each refining data-based problem of the at least one refining data-based problem from the respective at least one condition component descendant for that refining data-based problem,
thereby supporting the client in enabling the user to implicitly associate the disjunctive condition with the refined data-based problem upon navigation to the refined data-based problem.

15. The apparatus of claim 12, the query result comprising a plurality of data items, wherein:
the server labels at least one labeled local refinement association of the constituent association corresponding to each refinement association of the plurality of refinement associations with at least one constraint that the child project of that refinement association requires, beyond any constraint required by the parent project of that refinement association,
thereby supporting the client in incrementally presenting a dynamically-changing aggregation of data items across a customized collection of projects determined by the user.

16. The apparatus of claim 11, the plurality of entities subsuming a plurality of state machine components, the respective at least one inheritable entity being a respective at least one inheritable state machine component of the plurality of state machine components, wherein:
a) at least one state-based context project of the plurality of projects is the respective proper refinement ancestor project for each inheritable state machine component of the respective at least one inheritable state machine component, at least one state-based inheriting locus project being the respective inheriting locus project for each inheritable state machine component of the respective at least one inheritable state machine component;
b) the plurality of state machine components subsumes a plurality of state machine states; and
c) the processor-implemented engine is further directed to:
  i) formulate a state machine relating to the at least one locus project, the state machine comprising the respective at least one inheritable state machine component; and
  ii) transfer a form of the state machine to the client,
thereby associating a hierarchical state machine, layered over the respective localized DAG for the at least one locus project as a hierarchy of problems and solutions, formulated from the respective at least one inheritable state machine component for the at least one locus project, gathered as relevant to the at least one state-based inheriting locus project, and integrating the structure of the respective at least one inherited entity corresponding to the respective at least one inheritable state machine component with the structure of at least one already-inherited-or-constituent state machine component descended in the respective localized DAG for the at least one locus project from the at least one constituent inheriting locus project for the respective at least one inheritable state machine component, the at least one inherited state machine component and the at least one already-inherited-or-constituent state machine component being of the plurality of state machine components.

17. The apparatus of claim 16, wherein the processor-implemented engine is further directed to:
   a) gather a plurality of records, each record comprising at least one attribute value of the respective proper refinement ancestor project for an inheritable state machine component of the respective at least one inheritable state machine component, along with a plurality of ordered pairs of states, each inheritable state of an ordered pair of inheritable states of the plurality of ordered pairs of states being of the respective at least one inheritable state machine component, each ordered pair of states of the plurality of ordered pairs of states indicating a respective transition from the first state of that ordered pair to the second state of that ordered pair, for a project described by the at least one attribute value of that record; and
   b) formulate the state machine from the plurality of ordered pairs of states for each record of the plurality of records as training data,
   thereby enabling a distinct state machine to be derived from the plurality of records as a customized combination of training data relevant to the at least one locus project, the training data comprising the respective transition for the ordered pair of inheritable states.

18. The apparatus of claim 9, wherein:
upon direction from the client based on a modification by the user to an original inherited entity, the original inherited entity being the respective inherited entity corresponding to a given inheritable entity of the respective at least one inheritable entity for the at least one locus project, yielding a modified inherited entity, the original inherited entity corresponding to the given inheritable entity being descended in the respective localized DAG for the at least one locus project from the respective constituent inheriting locus project for the given inheritable entity by the respective inheriting association, the server relates the given inheritable entity to the respective inheriting locus project for the given inheritable entity by creating in the global DAG, yielding a resulting global DAG:
   a) a restating entity, wherein the restating entity is created as an entity in the plurality of entities and the modified inherited entity corresponds to the restating entity;
   b) a first association with the restating entity as the child entity and with the respective inheriting locus project for the given inheritable entity as the parent entity, wherein the first association is created as an association in the plurality of associations; and
   c) a second association with the restating entity as the child entity and with the given inheritable entity as the parent entity, wherein the second association is created as a refinement association in the plurality of refinement associations,
thereby creating the restating entity to restate the given inheritable entity with respect to the respective inheriting locus project for the given inheritable entity, supporting the client in implementing an in-place modification of the original inherited entity to the modified inherited entity.

19. The apparatus of claim 18, wherein the server receives identification of a second at least one locus project of the plurality of projects from a second client and transfers to the second client the respective localized DAG for the second at least one locus project, the at least one locus project being a first at least one locus project, the second at least one locus project comprising another refinement descendant in the global DAG of the respective proper refinement ancestor project for the given inheritable entity, the other refinement descendant not being ascended or descended in the global DAG from the respective inheriting locus project for the given inheritable entity, wherein:
   the restating entity is not among the respective at least one inheritable entity for the second at least one locus project,
   thereby supporting the client in avoiding distracting the user navigating to the second at least one locus project with the restating entity, restating with respect to the respective inheriting locus project for the given inheritable entity, unrelated to the other refinement descendant.

20. The apparatus of claim 18, wherein the server receives identification of a second at least one locus project of the plurality of projects from a second client and transfers to the second client the respective localized DAG for the second at least one locus project, the at least one locus project being a first at least one locus project, a refinement descendant locus project of the second at least one locus project being descended in the global DAG from the respective inheriting locus project of the first at least one locus project for the given inheritable entity, a first inheriting locus project, by a continued inheritance path from the refinement descendant locus project by way of a continued sequence of one or more refinement associations of the plurality of refinement associations, wherein:
   the given inheritable entity is not among the respective at least one inheritable entity for the second at least one locus project,
   thereby supporting the client in avoiding distracting the user navigating to the second at least one locus project with the given inheritable entity, related to the respective proper refinement ancestor project for the given inheritable entity by the respective inheritable entity path to the respective inheritable child entity, the restating entity being among the respective at least one inheritable entity for the second at least one locus project and refining the given inheritable entity, the restating entity being related by the first association to the first inheriting locus project, descended in the global DAG from the respective proper refinement ancestor project by the respective inheritance path.

21. An apparatus comprising:
a processor-implemented engine,
memory coupled to the processor-implemented engine; and
networking hardware supporting the processor-implemented engine in acting as a client communicating with one or more computing devices,
wherein the processor-implemented engine is directed according to instructions stored in the memory to request and receive a localized directed acyclic graph (DAG) from a server, the localized DAG extracted by the server from a global DAG, the global DAG comprising a plurality of entities and a plurality of associations, the plurality of entities subsuming a plurality of projects, each association of the plurality of associations relating a child entity and a parent entity of the plurality of entities, wherein the localized DAG comprises:

1) a plurality of local entities comprising a constituent entity corresponding to each entity of a plurality of particular reachable entities within the plurality of entities, each entity of the plurality of particular reachable entities being ascended or descended in the global DAG from a respective at least one source locus project of at least one locus project of the plurality of projects by a respective at least one path, at least one constituent locus project corresponding to the at least one locus project, a respective at least one source constituent locus project of the at least one constituent locus project corresponding to the respective at least one source locus project; and 2) a plurality of local associations comprising a constituent association corresponding to each association of the plurality of associations on the respective at least one path for each entity of the plurality of particular reachable entities, that constituent association relating the constituent entity corresponding to the child entity for that association as a child local entity and the constituent entity corresponding to the parent entity for that association as a parent local entity, the localized DAG having been reconfigured by the server, presenting to a user who navigates to the at least one locus project a manner of exploring through related entities, wherein:

a) the plurality of associations subsumes a plurality of refinement associations, each refinement association of the plurality of refinement associations indicating that the child entity of that refinement association refines the parent entity of that refinement association; and b) the user is enabled to visualize as descended in the localized DAG from a respective constituent inheriting locus project of the at least one constituent locus project a respective inherited entity of the plurality of local entities corresponding to each inheritable entity of at least one inheritable entity of the plurality of entities, each inheritable entity of the at least one inheritable entity descended in the global DAG from a respective inheritable child entity by a respective inheritable entity path, the plurality of projects comprising a respective proper refinement ancestor project that is related as a parent in the global DAG to the respective inheritable child entity and that is ascended in the global DAG from a respective inheriting locus project of the at least one locus project by a respective inheritance path by way of a respective sequence of one or more refinement associations of the plurality of refinement associations, the respective inheriting locus project corresponding to the respective constituent inheriting locus project, a deep inheritable component of the at least one inheritable entity not being the respective inheritable child entity, the localized DAG having been reconfigured such that for each inheritable entity of the at least one inheritable entity:

A) where that inheritable entity is a non-locus-descended inheritable entity not descended in the global DAG from any locus project of the at least one locus project:

I) the plurality of local entities comprising the respective inherited entity corresponding to the non-locus-descended inheritable entity; and II) the plurality of local associations comprising a respective inheriting association with the respective inherited entity corresponding to the non-locus-descended inheritable entity as the child local entity and with the respective constituent inheriting locus project for that inheritable entity being ascended in the localized DAG from the parent local entity; and B) where that inheritable entity is a locus-descended inheritable component, an already-inherited-or-constituent component corresponding to the locus-descended inheritable component being descended in the localized DAG from the respective constituent inheriting locus project for that inheritable entity:

I) the plurality of local associations comprising a respective merging association with the already-inherited-or-constituent component as the child local entity and with a parent inherited entity corresponding to the parent of the locus-descended inheritable component along the respective inheritable entity path as the parent local entity, thereby enabling the user to visualize as descended from the respective constituent inheriting locus project and to initiate an operation upon the respective inherited entity corresponding to the deep inheritable component within an integrated hierarchy with parents comprising at least one inherited parent entity corresponding to an inheritable parent entity on the respective inheritable entity path for the deep inheritable component and at least one other parent entity not corresponding to any inheritable parent entity on the respective inheritable entity path for the deep inheritable component.

22. The apparatus of claim 21, each contributing project of a plurality of contributing projects within the plurality of projects being associated with ordered auxiliary project information, the ordered auxiliary project information comprising a plurality of items maintained to be accessed in order as sorted by a key, the local entity corresponding to each contributing project being associated with the ordered auxiliary project information also associated with that contributing project, wherein:

the processor-implemented engine is further directed to generate via a merging process and present to the user an aggregation of the ordered auxiliary project information comprising an aggregated plurality of items:

a) across a plurality of substructure projects within the plurality of local entities, each substructure project of the plurality of substructure projects being descended in the localized DAG from the respective at least one source constituent locus project for that substructure project and corresponding to a global substructure project of the plurality of projects; or b) across both the plurality of substructure projects and a plurality of context projects within the plurality of local entities, each context project of the plurality of context projects being ascended in the localized DAG from the respective at least one source constituent locus project for that context project and corresponding to a global context project of the plurality of projects, the plurality of substructure projects comprising the respective inherited entity corresponding to an inheritable contributing project of the at least one inheritable entity and of the plurality of contributing projects, thereby enabling the user to visualize the aggregation of the ordered auxiliary project information across the plurality of substructure projects or the aggregation of the ordered auxiliary project information across both the plurality of substructure projects and the plurality of context projects, the plurality of substructure projects comprising the respective inherited entity corresponding to the inheritable contributing project within the integrated hierarchy, a first item of the aggregated plurality of items being of the ordered auxiliary project information associated with a first inheritable contributing ancestor of the inheritable contributing project through the respective proper refinement ancestor project for the first inheritable contributing ancestor and a second item of the aggregated plurality of items being of the ordered auxiliary project information associated with a second inheritable contributing ancestor of the inheritable contributing project through the respective proper refinement ancestor project for the second inheritable contributing ancestor.

23. The apparatus of claim 21, each contributing project of a plurality of contributing projects within the plurality of projects being associated with ordered auxiliary project information, the ordered auxiliary project information comprising a plurality of items maintained to be accessed in order as sorted by a key, the local entity corresponding to each contributing project being associated with the ordered auxiliary project information also associated with that contributing project, wherein the processor-implemented engine is further directed to:

a) dynamically aggregate the ordered auxiliary project information via a merging process across a contiguous plurality of local projects selected by the user within the plurality of local entities and comprising the respective at least one source constituent locus project for each project in the contiguous plurality of local projects and the respective inherited entity corresponding to an inheritable contributing project of the at least one inheritable entity and of the plurality of contributing projects, generating a dynamically-changing aggregation comprising an aggregated plurality of items within the plurality of items; and b) present the dynamically-changing aggregation to the user, thereby enabling the user, while exploring the plurality of local projects, being a customized collection of projects comprising the respective inherited entity corresponding to the inheritable contributing project within the integrated hierarchy, as ascended or descended in the localized DAG from the at least one constituent locus project, to visualize the dynamically-changing aggregation of the ordered auxiliary project information across the contiguous plurality of local projects, the ordered auxiliary project information associated with a now-excluded project of the plurality of contributing projects being removed from the dynamically-changing aggregation upon removal of the local project corresponding to the now-excluded project from the contiguous plurality of local projects, a first item of the aggregated plurality of items being of the ordered auxiliary project information associated with a first inheritable contributing ancestor of the inheritable contributing project through the respective proper refinement ancestor project for the first inheritable contributing ancestor and a second item of the aggregated plurality of items being of the ordered auxiliary project information associated with a second inheritable contributing ancestor of the inheritable contributing project through the respective proper refinement ancestor project for the second inheritable contributing ancestor.

24. The apparatus of claim 21, wherein:

upon an in-place modification by the user to an original inherited entity, the original inherited entity being the respective inherited entity corresponding to a given inheritable entity of the at least one inheritable entity, yielding a modified inherited entity, the original inherited entity corresponding to the given inheritable entity being descended in the localized DAG from the respective constituent inheriting locus project for the given inheritable entity by the respective inheriting association, the client relates the original inherited entity to the respective constituent inheriting locus project for the given inheritable entity by requesting the server to create in the global DAG, yielding a resulting global DAG:

a) a restating entity, wherein the restating entity is created as an entity in the plurality of entities and the modified inherited entity corresponds to the restating entity;

b) a first association with the restating entity as the child entity and with the respective inheriting locus project for the given inheritable entity as the parent entity, wherein the first association is created as an association in the plurality of associations; and c) a second association with the restating entity as the child entity and with the given inheritable entity as the parent entity, wherein the second association is created as a refinement association in the plurality of refinement associations, thereby enabling the user to relate the original inherited entity corresponding to the given inheritable entity to the respective constituent inheriting locus project for the given inheritable entity in-place, the server maintaining the in-place modification in the restating entity and leaving the given inheritable entity unchanged.

25. The apparatus of claim 24, wherein:

a) the plurality of projects subsumes a plurality of problems and a plurality of solutions, no project being in both the plurality of problems and the plurality of solutions;

b) the plurality of refinement associations comprises:
 i) a problem refinement association that relates a child problem of the plurality of problems and a parent problem of the plurality of problems, indicating that the child problem specializes the parent problem; or
 ii) a solution refinement association that relates a child solution of the plurality of solutions and a parent solution of the plurality of solutions, indicating that the child solution elaborates upon the parent solution; and c) the given inheritable entity is a given inheritable project of the plurality of projects and the restating entity is a restating project of the plurality of projects, wherein:
 i) the given inheritable project is a given inheritable solution of the plurality of solutions, the respective inherited entity corresponding to the given inheritable solution being a given inherited solution of the plurality of local entities, the respective inheriting locus project for the given inheritable solution being a respective inheriting locus problem of the plurality of problems and the respective proper refinement ancestor project for the given inheritable solution being a respective proper refinement ancestor problem of the plurality of problems, and the restating project is a restating solution created as a solution in the plurality of solutions; or
ii) the given inheritable project is a given inheritable problem of the plurality of problems, the respective inherited entity corresponding to the given inheritable problem being a given inherited problem of the plurality of local entities, the respective inheriting locus project for the given inheritable problem being a respective inheriting locus solution of the plurality of solutions and the respective proper refinement ancestor project for the given inheritable problem being a respective proper refinement ancestor solution of the plurality of solutions, and the restating project is a restating problem created as a problem in the plurality of problems, thereby enabling the user to visualize as descended in the localized DAG from the respective constituent inheriting locus project and to initiate the in-place modification upon the given inherited solution corresponding to the given inheritable solution, the given inheritable solution addressing the respective proper refinement ancestor problem, a more general problem than the respective inheriting locus problem, and the restating solution addressing the respective inheriting locus problem, the server maintaining the in-place modification in the restating solution and leaving the given inheritable solution unchanged, or the given inherited problem corresponding to the given inheritable problem, the given inheritable problem decomposing the respective proper refinement ancestor solution, a less elaborate solution than the respective inheriting locus solution, and the restating problem decomposing the respective inheriting locus solution, the server maintaining the in-place modification in the restating problem and leaving the given inheritable problem unchanged.

26. The apparatus of claim 25, the at least one locus project being at least one locus problem of the plurality of problems, the at least one locus problem being descended in the global DAG from at least one data-based context problem of the plurality of problems, each data-based context problem of the at least one data-based context problem being implicitly or explicitly associated with a respective database of a plurality of databases, the respective database for each data-based context problem comprising data arranged as a plurality of attributes, wherein:
a) the plurality of entities subsumes a plurality of condition components subsuming a plurality of terms that express equalities or inequalities over at least one attribute for at least one database of the plurality of databases and comprising at least one Boolean operator;
b) the given inheritable entity is a given inheritable condition component of the plurality of condition components, the respective inherited entity corresponding to the given inheritable condition component being an original inherited condition component of the plurality of local entities;
c) the in-place modification by the user comprises a condition specialization operation performed upon a representation of the original inherited condition component corresponding to the given inheritable condition component within a representation of a condition associated with the at least one locus problem; and
d) the restating entity is a restating condition component of the plurality of condition components, thereby enabling the user to specialize the condition by applying the condition specialization operation in-place to the original inherited condition component corresponding to the given inheritable condition component, the server maintaining the in-place modification in the restating condition component and leaving the given inheritable condition component unchanged.

27. The apparatus of claim 26, wherein:
a) the plurality of condition components comprises a disjunct deletion operator;
b) the given inheritable condition component is a given inheritable disjunct-to-be-deleted;
c) the condition is a disjunction and the in-place modification by the user comprises a deletion operation; and
d) the restating entity is the disjunct deletion operator, thereby enabling the user to specialize a disjunction condition associated with the at least one locus problem by removing the given inheritable disjunct-to-be-deleted in-place from the disjunction condition.

28. The apparatus of claim 25 wherein:
a) the plurality of entities subsumes a plurality of state machine components subsuming a plurality of state machine states;
b) the given inheritable entity is a given inheritable state machine component of the plurality of state machine components, the respective inherited entity corresponding to the given inheritable state machine component being an original inherited state machine component of the plurality of local entities;
c) the in-place modification by the user comprises a state machine elaboration operation performed upon a representation of the original inherited state machine component corresponding to the given inheritable state machine component within a representation of a state machine associated with the at least one locus project; and
d) the restating entity is a restating state machine component of the plurality of state machine components, thereby enabling the user to elaborate the state machine by applying the state machine elaboration operation in-place to the original inherited state machine component, the server maintaining the in-place modification in the restating entity to participate in a lower-level state machine and leaving the given inheritable entity unchanged to participate in a higher-level state machine.

29. The apparatus of claim 21, wherein:
for each selected inherited entity of at least one selected inherited entity of the plurality of local entities, that selected inherited entity corresponding to a respective selected inheritable entity, that selected inherited entity being descended in the localized DAG from the respective constituent inheriting locus project for the respective selected inheritable entity by an inherited entity path, the inherited entity path being a sequence comprising at least one original inherited path entity of the plurality of local entities, the client relates that selected inherited entity to the respective constituent inheriting locus project for the respective selected inheritable entity by, for each original inherited path entity not already visited of the at least one original inherited path entity, that original inherited path entity being the respective inherited entity corresponding to a respective given inheritable path entity of the at least one inheritable entity, prompting the user for an in-place modification to restate that original inherited path entity to the respective constituent inheriting locus project for the respective selected inheritable entity, yielding a modified inherited path entity, and requesting the server to create in the global DAG, yielding a resulting global DAG:
   a) a restating entity that restates the respective given inheritable path entity for that original inherited path entity, wherein the restating entity that restates the respective given inheritable path entity is created as an entity in the plurality of entities and the modified inherited path entity corresponds to the restating entity that restates the respective given inheritable path entity;
   b) a first association with the restating entity that restates the respective given inheritable path entity as the child entity and either with the respective inheriting locus project for the respective given inheritable path entity as the parent entity, if the respective inheriting locus project for the respective given inheritable path entity is the parent entity of the modified inherited path entity along the respective inherited entity path, or else with the restating entity that restates the immediately subsequent entity as the parent entity, wherein the first association is created as an association in the plurality of associations; and
   c) a second association with the restating entity that restates the respective given inheritable path entity as the child entity and with the respective given inheritable path entity as the parent entity, wherein the second association is created as a refinement association in the plurality of refinement associations,
thereby enabling the user to relate each selected inherited entity to the respective constituent inheriting locus project for the respective selected inheritable entity by modifying in-place each inherited path entity along each inherited entity path, the server maintaining the in-place modification in each restating entity and leaving the respective given inheritable path entity for each original inherited path entity unchanged.

30. The apparatus of claim 21, wherein:
for each selected inherited entity of at least one selected inherited entity of the plurality of local entities, that selected inherited entity corresponding to a respective selected inheritable entity, that selected inherited entity being descended in the localized DAG from the respective constituent inheriting locus project for the respective selected inheritable entity by an inherited entity path, the inherited entity path being a sequence comprising at least one original inherited path entity of the plurality of local entities, the client relates that selected inherited entity to the respective constituent inheriting locus project for the respective selected inheritable entity by, for each original inherited path entity not already visited of the at least one original inherited path entity and of one or more inherited entities to be restated, the one or more inherited entities to be restated comprising at least one inherited entity from within any contiguous sequence of entities along the inherited entity path, any pair of adjacent entities within that contiguous sequence being related by refinement, at least one inherited path entity not to be restated being of the at least one original inherited path entity and not being of the one or more inherited entities to be restated, that original inherited path entity being the respective inherited entity corresponding to a respective given inheritable path entity of the at least one inheritable entity, prompting the user for an in-place modification to restate that original inherited path entity to the respective constituent inheriting locus project for the respective selected inheritable entity, yielding a modified inherited path entity, and requesting the server to create in the global DAG, yielding a resulting global DAG:
   a) a restating entity that restates the respective given inheritable path entity for that original inherited path entity, wherein the restating entity that restates the respective given inheritable path entity is created as an entity in the plurality of entities and the modified inherited path entity corresponds to the restating entity that restates the respective given inheritable path entity;
   b) a first association with the restating entity that restates the respective given inheritable path entity as the child entity and either with the respective inheriting locus project for the respective selected inheritable entity as the parent entity, if no subsequent original inherited path entity subsequent to that original inherited path entity along the respective inherited entity path is among the one or more inherited entities to be restated, or else with the restating entity that restates a nearest subsequent inheritable path entity as the parent entity, a nearest subsequent original inherited path entity towards the respective constituent inheriting locus project for the respective selected inheritable entity along the respective inherited entity path among the one or more inherited entities to be restated corresponding to the nearest subsequent inheritable path entity, wherein the first association is created as an association in the plurality of associations; and
   c) a second association with the restating entity that restates the respective given inheritable path entity as the child entity and with the respective given inheritable path entity as the parent entity, wherein the second association is created as a refinement association in the plurality of refinement associations,
thereby enabling the user to relate each selected inherited entity to the respective constituent inheriting locus project for the respective selected inheritable entity by modifying in-place at least one representative inherited path entity in each sequence of refinement associations along each inherited entity path, the server maintaining the in-place modification in each restating entity and leaving the respective given inheritable path entity for each of the at least one representative inherited path entity unchanged, avoiding creation of entities and associations to restate the at least one inherited path entity not to be restated.

31. An apparatus comprising:
a processor-implemented engine,
memory coupled to the processor-implemented engine; and
networking hardware supporting the processor-implemented engine in acting as a server communicating with one or more computing devices,
wherein the processor-implemented engine is directed according to instructions stored in the memory to:
a) receive identification of at least one locus entity of a plurality of entities from a client;
b) extract a respective localized directed acyclic graph (DAG) localized to the at lease one locus entity, the respective localized DAG of a plurality of localized DAGs, from a global DAG comprising the plurality of entities and a plurality of associations, each association of the plurality of associations relating a child entity and a parent entity of the plurality of entities, and;
c) transfer the respective localized DAG to the client, the respective localized DAG comprising:
1) a plurality of local entities comprising a constituent entity corresponding to each entity of a plurality of particular reachable entities within the plurality of entities, each entity of the plurality of particular reachable entities being ascended or descended in the global DAG from a respective at least one source locus entity of the at least one locus entity by a respective at least one path, at least one constituent locus entity corresponding to the at least one locus entity; and
2) a plurality of local associations comprising a constituent association corresponding to each association of the plurality of associations on the respective at least one path for each entity of the plurality of particular reachable entities, that constituent association relating the constituent entity corresponding to the child entity for that association as a child local entity and the constituent entity corresponding to the parent entity for that association as a parent local entity, wherein:
i) the plurality of entities subsumes a plurality of projects and the plurality of associations subsumes a plurality of refinement associations, each refinement association of the plurality of refinement associations indicating that the child entity for that refinement association refines the parent entity for that refinement association; and
ii) for a selected context project of the plurality of local entities and corresponding to a selected project of the plurality of projects, the server generalizes the respective at least one path for the selected context project by, for each context collection in a sequence of context collections, the sequence of context collections comprising a first context collection and a final context collection, that context collection comprising one or more context entities of the plurality of local entities, the one or more context entities not related to each other as ancestors or descendants in the respective localized DAG, each context entity of the one or more context entities of the first context collection corresponding to a respective locus entity of the at least one locus entity, each parent context entity in the parent context collection being properly ascended in the global DAG from at least one entity in that context collection, the parent context collection comprising a proper ancestor of each context entity in the context collection, creating in the global DAG, yielding a resulting global DAG:
   a. a generalizing entity that generalizes that context collection, wherein the generalizing entity is created as an entity in the plurality of entities based on input provided by a user of the client;
   b. a first association with the generalizing entity that generalizes that context collection as the child entity and either with the generalizing entity that generalizes a parent context collection succeeding that context collection in the sequence of context collections, or, where that context collection is the final context collection in the sequence of context collections, with the selected context project as the parent entity, wherein the first association is created as an association in the plurality of associations; and
   c. for each context entity in that context collection, a respective second association with that context entity as the child entity and with the generalizing entity as the parent entity, wherein the respective second association is created as a refinement association in the plurality of refinement associations, thereby generalizing each context collection in the sequence of context collections, supporting the client in enabling the user to generalize the respective at least one path for the selected context project.

32. The apparatus of claim 31, wherein the server receives identification of at least one locus project of the plurality of projects from a second client and transfers to the second client the respective localized DAG for the at least one locus project, the sequence of context collections being a single context collection, the respective at least one source locus entity of the at least one locus entity for the selected project being one source locus entity, a path of the respective at least one path from the one source locus entity for the selected project comprising a refinement descendant project that is descended in the global DAG from the selected project by a refinement path by way of a sequence of one or more refinement associations of the plurality of refinement associations, the at least one locus project comprising a refinement descendant locus project that is descended in the global DAG from the selected project by a second refinement path, the refinement descendant locus project not being ascended or descended in the global DAG from the refinement descendant project, wherein:

the processor-implemented engine is further directed to perform a reconfiguration upon the respective localized DAG for the at least one locus project, the reconfiguration comprising, for each inheritable entity of a respective at least one inheritable entity of the plurality of entities for the at least one locus project, that inheritable entity descended in the global DAG from a respective inheritable child entity by a respective inheritable entity path, the plurality of projects comprising a respective proper refinement ancestor project that is related as a parent in the global DAG to the respective inheritable child entity and that is ascended in the global DAG from a respective inheriting locus project of the at least one locus project by a respective inheritance path by way of a respective sequence of one or more refinement associations of the plurality of refinement associations, a respective constituent inheriting locus project of the at least one constituent locus project corresponding to the respective inheriting locus project:
   A) where that inheritable entity is a non-locus-descended inheritable entity not descended in the global DAG from any locus project of the at least one locus project:
      I) the plurality of local entities of the respective localized DAG for the at least one locus project comprising a respective inherited entity corresponding to the non-locus-descended inheritable entity; and
      II) the plurality of local associations of the respective localized DAG for the at least one locus project comprising a respective inheriting association with the respective inherited entity corresponding to the non-locus-descended inheritable entity as the child local entity and with the respective constituent inheriting locus project for that inheritable entity being ascended in the respective localized DAG for the at least one locus project from the parent local entity; and B) where that inheritable entity is a locus-descended inheritable component, an already-inherited-or-constituent component corresponding to the locus-descended inheritable component being descended in the respective localized DAG for the at least one locus project from the respective constituent inheriting locus project for that inheritable entity:
  I) the plurality of local associations of the respective localized DAG for the at least one locus project comprising a respective merging association with the already-inherited-or-constituent component as the child local entity and with a parent inherited entity corresponding to the parent of the locus-descended inheritable component along the respective inheritable entity path as the parent local entity,
wherein the one source locus entity is not among the respective at least one inheritable entity for the at least one locus project
thereby supporting the client in avoiding distracting the user navigating to the at least one locus project with the one source locus entity, restating with respect to the refinement descendant project, unrelated to the refinement descendant locus project.

33. The apparatus of claim 31, wherein the server receives identification of at least one locus project of the plurality of projects from a second client and transfers to the second client the respective localized DAG for the at least one locus project, the sequence of context collections being a single context collection, the respective at least one source locus entity for the selected project being one source locus entity, a path of the respective at least one path for the selected project and the one source locus entity comprising a refinement descendant project that is descended in the global DAG from the selected project by a refinement path by way of a sequence of one or more refinement associations of the plurality of refinement associations, the at least one locus project comprising a refinement descendant locus project that is descended in the global DAG from the refinement descendant project, being related as a parent to the one source locus entity by an association, by a continued refinement path by way of a continued sequence of one or more refinement associations of the plurality of refinement associations wherein:

the processor-implemented engine is further directed to perform a reconfiguration upon the respective localized DAG for the at least one locus project, the reconfiguration comprising, for each inheritable entity of a respective at least one inheritable entity of the plurality of entities for the at least one locus project, that inheritable entity descended in the global DAG from a respective inheritable child entity by a respective inheritable entity path, the plurality of projects comprising a respective proper refinement ancestor project that is related as a parent in the global DAG to the respective inheritable child entity and that is ascended in the global DAG from a respective inheriting locus project of the at least one locus project by a respective inheritance path by way of a respective sequence of one or more refinement associations, a respective constituent inheriting locus project of the at least one constituent locus project corresponding to the respective inheriting locus project:
A) where that inheritable entity is a non-locus-descended inheritable entity not descended in the global DAG from any locus project of the at least one locus project:
  I) the plurality of local entities of the respective localized DAG for the at least one locus project comprising a respective inherited entity corresponding to the non-locus-descended inheritable entity; and
  II) the plurality of local associations of the respective localized DAG for the at least one locus project comprising a respective inheriting association with the respective inherited entity corresponding to the non-locus-descended inheritable entity as the child local entity and with the respective constituent inheriting locus project for that inheritable entity being ascended in the respective localized DAG for the at least one locus project from the parent local entity; and
B) where that inheritable entity is a locus-descended inheritable component, an already-inherited-or-constituent component corresponding to the locus-descended inheritable component being descended in the respective localized DAG for the at least one locus project from the respective constituent inheriting locus project for that inheritable entity:
  I) the plurality of local associations of the respective localized DAG for the at least one locus project comprising a respective merging association with the already-inherited-or-constituent component as the child local entity and with a parent inherited entity corresponding to the parent of the locus-descended inheritable component along the respective inheritable entity path as the parent local entity,
wherein the generalizing entity is not among the respective at least one inheritable entity for the at least one locus project,
thereby supporting the client in avoiding distracting the user navigating to the at least one locus project with the generalizing entity, related to the selected project by the first association, the one source locus entity being among the respective at least one inheritable entity for the at least one locus project and refining the generalizing entity, the one source locus entity related as a child to the refinement descendant project by the association, the refinement descendant project descended in the global DAG from the selected project by the refinement path.

* * * * *